US010638756B2

(12) United States Patent
LePlae, Jr. et al.

(10) Patent No.: US 10,638,756 B2
(45) Date of Patent: May 5, 2020

(54) MOLECULES HAVING PESTICIDAL UTILITY, AND INTERMEDIATES, COMPOSITIONS, AND PROCESSES, RELATED THERETO

(71) Applicant: Dow AgroSciences LLC, Indianapolis, IN (US)

(72) Inventors: Paul R. LePlae, Jr., Brownsburg, IN (US); Thomas Barton, Indianapolis, IN (US); Xin Gao, Carmel, IN (US); James E. Hunter, Indianapolis, IN (US); William C. Lo, Fishers, IN (US); Joshodeep Boruwa, Guwahati (IN); Raghuram Tangirala, Bengaluru (IN); Gerald B. Watson, Zionsville, IN (US); John Herbert, Brownsburg, IN (US); David A. Demeter, Fishers, IN (US); Hemant Joshi, Navi Mumbai (IN)

(73) Assignee: DOW AGROSCIENCES LLC, Indianapolis, IN (US)

( * ) Notice: Subject to any disclaimer, the term of this patent is extended or adjusted under 35 U.S.C. 154(b) by 0 days.

(21) Appl. No.: 15/939,341

(22) Filed: Mar. 29, 2018

(65) Prior Publication Data

US 2018/0279612 A1 Oct. 4, 2018

(30) Foreign Application Priority Data

Mar. 31, 2017 (IN) ............................. 201711011770
Mar. 31, 2017 (IN) ............................. 201711011775

(51) Int. Cl.

| | |
|---|---|
| *A01N 37/46* | (2006.01) |
| *A01N 43/54* | (2006.01) |
| *A01N 37/34* | (2006.01) |
| *A01N 37/10* | (2006.01) |
| *A01N 43/78* | (2006.01) |
| *A01N 43/38* | (2006.01) |
| *A01N 37/28* | (2006.01) |
| *A01N 43/713* | (2006.01) |
| *A01N 43/653* | (2006.01) |
| *A01N 43/66* | (2006.01) |
| *A01N 43/60* | (2006.01) |
| *A01N 43/58* | (2006.01) |
| *A01N 43/10* | (2006.01) |
| *A01N 43/40* | (2006.01) |
| *A01N 43/50* | (2006.01) |

(52) U.S. Cl.

CPC ............. *A01N 37/46* (2013.01); *A01N 37/10* (2013.01); *A01N 37/28* (2013.01); *A01N 37/34* (2013.01); *A01N 43/10* (2013.01); *A01N 43/38* (2013.01); *A01N 43/40* (2013.01); *A01N 43/50* (2013.01); *A01N 43/54* (2013.01); *A01N 43/58* (2013.01); *A01N 43/60* (2013.01); *A01N 43/653* (2013.01); *A01N 43/66* (2013.01); *A01N 43/713* (2013.01); *A01N 43/78* (2013.01)

(58) Field of Classification Search

USPC .......................................................... 564/149
See application file for complete search history.

(56) References Cited

U.S. PATENT DOCUMENTS

| | | | |
|---|---|---|---|
| 3,655,765 | A | 4/1972 | Gelfand |
| 4,607,053 | A | 8/1986 | Karanewsky |
| 4,833,158 | A | 5/1989 | Twydell |
| 4,873,329 | A | 10/1989 | Hughes |
| 6,013,836 | A | 1/2000 | Hsu |
| 6,013,837 | A | 1/2000 | Demassey |
| 6,028,192 | A | 2/2000 | Becherer |
| 7,375,232 | B2 | 5/2008 | Clark |
| 7,629,463 | B2 | 12/2009 | Clark |
| 7,951,828 | B1 | 5/2011 | Mita |
| 8,093,241 | B2 | 1/2012 | Nakamura |

(Continued)

FOREIGN PATENT DOCUMENTS

| | | | |
|---|---|---|---|
| CN | 86104207 | A | 4/1987 |
| CN | 1543460 | A | 11/2004 |

(Continued)

OTHER PUBLICATIONS

Byrn et al. Solid State Chemistry of Dugs; 1999; 232-233.*

(Continued)

*Primary Examiner* — Ana Z Muresan

(57) ABSTRACT

This disclosure relates to the field of molecules having pesticidal utility against pests in Phyla Arthropoda, Mollusca, and Nematoda, processes to produce such molecules, intermediates used in such processes, pesticidal compositions containing such molecules, and processes of using such pesticidal compositions against such pests. These pesticidal compositions may be used, for example, as acaricides, insecticides, miticides, molluscicides, and nematicides. This document discloses molecules having the following formula ("Formula One").

Formula One

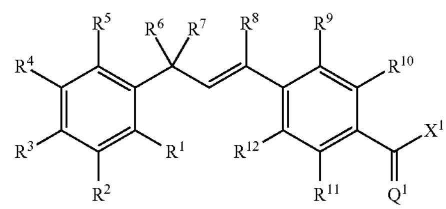

14 Claims, No Drawings

(56) References Cited

U.S. PATENT DOCUMENTS

| | | | |
|---|---|---|---|
| 8,350,044 B2 | 1/2013 | Trullinger | |
| 8,673,951 B2 | 3/2014 | Mita | |
| 9,210,927 B2 | 12/2015 | Lo | |
| 9,211,280 B2 | 12/2015 | Lo | |
| 9,211,281 B2 | 12/2015 | Lo | |
| 9,212,163 B2 | 12/2015 | Lo | |
| 9,212,164 B2 | 12/2015 | Lo | |
| 9,215,870 B2 | 12/2015 | Lo | |
| 9,226,500 B2 | 1/2016 | Lo | |
| 9,226,501 B2 | 1/2016 | Lo | |
| 9,295,260 B2 | 3/2016 | Zhang | |
| 9,510,592 B2 | 12/2016 | Lo | |
| 9,538,756 B2 | 1/2017 | Lo | |
| 9,615,576 B2 | 4/2017 | Hunter | |
| 9,622,477 B2 | 4/2017 | Lo | |
| 9,629,363 B2 | 4/2017 | Lo | |
| 9,629,369 B2 | 4/2017 | Lo | |
| 9,630,910 B2 | 4/2017 | Lo | |
| 9,635,859 B2 | 5/2017 | Lo | |
| 9,676,704 B2 | 6/2017 | LePlae | |
| 9,701,620 B2 | 7/2017 | Lo | |
| 9,781,935 B2 | 10/2017 | Heemstra | |
| 9,839,216 B2 | 12/2017 | Pitterna | |
| 9,924,716 B2 | 3/2018 | Barton | |
| 9,924,717 B2 | 3/2018 | Barton | |
| 9,930,892 B2 | 4/2018 | Barton | |
| 10,251,394 B2 | 4/2019 | Barton | |
| 2002/0068838 A1 | 6/2002 | Demassey | |
| 2003/0225302 A1 | 12/2003 | Demassey | |
| 2004/0152598 A1 | 8/2004 | Goto | |
| 2007/0027034 A1 | 2/2007 | Tank | |
| 2007/0066617 A1 | 3/2007 | Mita | |
| 2007/0207093 A1 | 9/2007 | Bryant | |
| 2008/0063678 A1 | 3/2008 | Von Deyn | |
| 2010/0093707 A1 | 4/2010 | Nakamura | |
| 2010/0254959 A1 | 10/2010 | Lahm | |
| 2010/0292253 A1 | 11/2010 | Trullinger | |
| 2011/0144334 A1 | 6/2011 | Mita | |
| 2011/0160054 A1 | 6/2011 | Breuninger | |
| 2012/0053146 A1 | 3/2012 | Parker | |
| 2012/0316124 A1 | 12/2012 | Pitterna | |
| 2012/0329649 A1* | 12/2012 | Hunter | C07C 255/57 504/100 |
| 2012/0329769 A1 | 12/2012 | Qacemi | |
| 2013/0019348 A1 | 1/2013 | Crouse | |
| 2013/0288893 A1 | 10/2013 | Buysse | |
| 2014/0343049 A1 | 11/2014 | Toueg | |
| 2015/0257387 A1 | 9/2015 | Coqueron | |
| 2016/0029635 A1 | 2/2016 | Lo | |
| 2017/0022148 A1 | 1/2017 | Lo | |
| 2017/0088507 A1 | 3/2017 | Lo | |
| 2017/0156320 A1 | 6/2017 | Lo | |
| 2017/0158597 A1 | 6/2017 | Lo | |
| 2017/0158598 A1 | 6/2017 | Lo | |
| 2017/0158624 A1 | 6/2017 | Lo | |
| 2017/0158674 A1 | 6/2017 | Hunter | |
| 2017/0158675 A1 | 6/2017 | Lo | |
| 2017/0208806 A1 | 7/2017 | Barton | |
| 2017/0210723 A1 | 7/2017 | LePlae | |
| 2017/0217876 A1 | 8/2017 | LePlae | |
| 2017/0267629 A1 | 9/2017 | Lo | |
| 2018/0009737 A1 | 1/2018 | LePlae | |
| 2018/0279612 A1 | 10/2018 | LePlae | |

FOREIGN PATENT DOCUMENTS

| | | | |
|---|---|---|---|
| CN | 101765592 | A | 6/2010 |
| CN | 102137593 | A | 7/2011 |
| CN | 102458403 | A | 5/2012 |
| EP | 2723729 | A1 | 4/2014 |
| JP | H072801 | A | 1/1995 |
| JP | 2002507978 | A | 3/2002 |
| JP | 2003176258 | A | 6/2003 |
| JP | 2005502661 | A | 1/2005 |
| JP | 2005126418 | A | 5/2005 |
| JP | 2007308471 | A | 11/2007 |
| JP | 2012526123 | A | 10/2012 |
| JP | 2014517135 | A | 9/2014 |
| WO | 8607590 | A1 | 12/1986 |
| WO | 9901422 | A1 | 1/1999 |
| WO | 2003016304 | A1 | 2/2003 |
| WO | 2009002809 | A2 | 12/2008 |
| WO | 2010023171 | A2 | 3/2010 |
| WO | 2010078300 | A1 | 7/2010 |
| WO | 2010129497 | A1 | 11/2010 |
| WO | 2012004326 | A1 | 1/2012 |
| WO | 2012148772 | A1 | 11/2012 |
| WO | 2012177813 | A1 | 12/2012 |
| WO | 2013174947 | A1 | 11/2013 |
| WO | 2014100163 | A1 | 6/2014 |
| WO | 2014100166 | A1 | 6/2014 |
| WO | 2014100170 | A1 | 6/2014 |
| WO | 2014100190 | A1 | 6/2014 |
| WO | 2014100206 | A1 | 6/2014 |
| WO | 2014120355 | A1 | 8/2014 |
| WO | 2015097094 | A1 | 7/2015 |
| WO | 2015191430 | A1 | 12/2015 |
| WO | 2017132014 | A1 | 8/2017 |
| WO | 2017132015 | A1 | 8/2017 |
| WO | 2017132019 | A1 | 8/2017 |
| WO | 2017132021 | A1 | 8/2017 |
| WO | 2017132022 | A1 | 8/2017 |
| WO | 2017132023 | A1 | 8/2017 |
| WO | 2018183601 | A1 | 10/2018 |

OTHER PUBLICATIONS

T. Konno, et al.: "A first high enantioncontrol of an asymmetric tertiary carbon center attached with a fluoroalkyl group via Rh(I)-catalyzed conjugate addition reaction", Tetrahedron Letters, Mar. 24, 2008, pp. 2106 to 2110, vol. 49, No. 13, Elsevier Science Publishers, Amsterdam, NL.

A. Unsinn, et al.: "Stereoselective synthesis of tetrasubstituted alkenes via a sequential carbocupration and a new sulfur-lithium exchange", Beilstein Journal of Organic Chemistry, Dec. 18, 2012, pp. 2202 to 2206, vol. 8, No. 248, Beilstein Institut, Frankfurt am Main, DE.

Cornell University Cooperative Extension: "Pesticide Safety Education Program (PSEP)", http://psep.cce.cornell.edu/issues/foodsafety-issues.aspx, cached Jun. 29, 2010.

S. Kagabu et al.: "Insecticidal and Neuroblocking Activites of Thiamethoxam-Type Compounds in the American Cockroach (*Periplaneta americana* L.)", Journal of Pesticide Science, 2005, pp. 111 to 115, vol. 30, No. 2, Pesticide Science Society of Japan, Tokyo, Japan.

Y. Shiga et al.: "Synthesis and Acaricidal Activity of N-(1,3,4-Thiadiazol-2-yl)carboxamides", Journal of Pesticide Science, 2003, pp. 58 to 60, vol. 28, No. 1, Pesticide Science Society of Japan, Tokyo, Japan.

Pubchem, Substance Record for SID 236248093, Available Date: Feb. 13, 2015 Retrieved from the Internet: https://pubchem.ncbi.nlm.nih.gov/substance/236248093.

M. D. Taylor et al. (Eds.), Pesticide Residues in Coastal Tropical Ecosystems: Distribution, Fate and Effects, Nov. 21, 2002, p. 204, CRC Press, New York, USA.

C. Mitsos, "Isosteres in medicinal chemistry" https://www.scripps.edu/baran/images/grpmtgpdf/Mitsos_Feb_06.pdf, Feb. 1, 2006, no pagination. (Year: 2006).

F. Matsumura, Toxicology of Insecticides, 2nd ed., 1985, p. 11, Plenum Press, New York, USA.

S. J. Yu, The Toxicology and Biochemistry of Insecticides, 2nd ed., 2015, p. 103, CRC Press, Boca Raton, FL.

S. Kagabu and S. Medej, "Stability Comparison of Imidacloprid and Related Compounds under Simulated Sunlight, Hydrolysis Conditions, and to Oxygen", Bioscience, Biotechnology, and Biochemistry, 1995, pp. 980 to 985, vol. 59, Japan Society for Bioscience, Biotechnology, and Agrochemistry, Taylor & Francis Group.

(56) References Cited

OTHER PUBLICATIONS

W. D. Kollmeyer, et al., "Discovery of the Nitromethylene Heterocycle Insecticides" in Nicotinoid Insecticides and the Nicotinic Acetylcholine Receptor, I. Yamamoto and J. E. Casida, Eds., 1999, pp. 71 to 89, Springer Japan.
P. Jeschke, "The Unique Role of Fluorine in the Design of Active Ingredients for Modern Crop Protection" pp. 586-587, 2004, pp. 570 to 589, ChemBioChem vol. 5, Wiley-VCH Verlag GmbH & Co. KGaA, Weinheim, DE.
A. Burger, "Isosterism and bioisoterism in drug design" 1991, p. 318, Progress in Drug Research, edited by J. A. Salmon.
P. Ertl, "Cheminformatics Analysis of Organic Substituents: Identification of the Most Common Substituents, Calculation of Substituents Properties, and Automatic Identification of Drug-like Bioisosteric Groups" Journal of Chemical Information and Computer Sciences, Mar. 1, 2003, pp. 374 to 380, vol. 43 No. 2, ACS Publications, Washington, DC, USA.
International Search Report for PCT/US2012/043418 aka WO 2012/177813 A1.
Written Opinion for PCT/US2012/043418 aka WO 2012/177813 A1.
Supplementary European Search Report for EP 2723729.
European Opinion for EP 2723729.
International Search Report for PCT/US2013/076079 aka WO 2014/120355 A1.
Written Opinion for PCT/US2013/076079 aka WO 2014/120355 A1.
International Search Report for PCT/US2013/076096 aka WO 2014/100163 A1.
Written Opinion for PCT/US2013/076096 aka WO 2014/100163 A1.
International Search Report for PCT/US2013/076101 aka WO 2014/100166 A1.
Written Opinion for PCT/US2013/076101 aka WO 2014/100166 A1.
International Search Report for PCT/US2013/076113 aka WO 2014/100170 A1.
Written Opinion for PCT/US2013/076113 aka WO 2014/100170 A1.
International Search Report and Written Opinion for PCT/US2013/076142 aka WO 2014/100190 A1.
Supplementary Search Report for EP 2934117.
International Search Report for PCT/US2013/076170 aka WO 2014/100206 A1.
Written Opinion for PCT/US2013/076170 aka WO 2014/100206 A1.
International Search Report for PCT/US2017/013848 aka WO 2017/132014 A1.
Written Opinion for PCT/US2017/013848 aka WO 2017/132014 A1.
International Search Report for PCT/US2015/034648 aka WO 2015/191430 A1.
Written Opinion for PCT/US2015/034648 aka WO 2015/191430 A1.
Supplementary European Search Report for EP 3152189.
International Search Report for PCT/US2017/013856 aka WO 2017/132015 A1.
Written Opinion for PCT/US2017/013856 aka WO 2017/132015 A1.
International Search Report for PCT/US2017/013886 aka WO 2017/132019 A1.
Written Opinion for PCT/US2017/013886 aka WO 2017/132019 A1.
International Search Report for PCT/US2017/013891 aka WO 2017/132021 A1.
Written Opinion for PCT/US2017/013891 aka WO 2017/132021 A1.
International Search Report for PCT/US2017/013910 aka WO 2017/132022 A1.
Written Opinion for PCT/US2017/013910 aka WO 2017/132022 A1.
International Search Report for PCT/US2017/013915 aka WO 2017/132023 A1.
Written Opinion for PCT/US2017/013915 aka WO 2017/132023 A1.
International Search Report for PCT/US2018/025024 aka WO 2018/183601 A1.
Written Opinion for PCT/US2018/025024 aka WO 2018/183601 A1.
Supplementary Search Report for EP 2934142.
EP Opinion for EP 2934142.
Supplementary Search Report for EP 2934135.
EP Opinion for EP 2934135.
Supplementary Search Report for EP 2934118.
EP Opinion for EP 2934118.
EP Opinion for EP 2934117.
Supplementary Search Report for EP 3408262.
EP Opinion for EP 3408262.
EP Opinion for EP 3152189.
Supplementary Search Report for EP 3407716.
EP Opinion for EP 3407716.
Supplementary Search Report for EP 3407717.
EP Opinion for EP 3407717.
Supplementary Search Report for EP 3408263.
EP Opinion for EP 3408263.
Supplementary Search Report for EP 3407718.
EP Opinion for EP 34087718.
Supplementary Search Report for EP 3407720.
EP Opinion for EP 3407720.
Search Report Eng Trans for CN 105025715 A.

* cited by examiner

MOLECULES HAVING PESTICIDAL UTILITY, AND INTERMEDIATES, COMPOSITIONS, AND PROCESSES, RELATED THERETO

CROSS REFERENCE TO RELATED APPLICATIONS

This application claims the benefit of Indian Provisional Patent Application Serial No. 201711011770 filed Mar. 31, 2017 and Indian Provisional Patent Application Serial No. 201711011775 filed Mar. 31, 2017

FIELD OF THIS DISCLOSURE

This disclosure relates to the field of molecules having pesticidal utility against pests in Phyla Arthropoda, Mollusca, and Nematoda, processes to produce such molecules, intermediates used in such processes, pesticidal compositions containing such molecules, and processes of using such pesticidal compositions against such pests. These pesticidal compositions may be used, for example, as acaricides, insecticides, miticides, molluscicides, and nematicides.

BACKGROUND OF THIS DISCLOSURE

"Many of the most dangerous human diseases are transmitted by insect vectors" (Rivero et al.). "Historically, malaria, dengue, yellow fever, plague, filariasis, louse-borne typhus, trypanomiasis, leishmaniasis, and other vector borne diseases were responsible for more human disease and death in the 17$^{th}$ through the early 20$^{th}$ centuries than all other causes combined" (Gubler). Vector-borne diseases are responsible for about 17% of the global parasitic and infectious diseases. Malaria alone causes over 800,000 deaths a year, 85% of which occur in children under five years of age. Each year there are about 50 to about 100 million cases of dengue fever. A further 250,000 to 500,000 cases of dengue hemorrhagic fever occur each year (Matthews). Vector control plays a critical role in the prevention and control of infectious diseases. However, insecticide resistance, including resistance to multiple insecticides, has arisen in all insect species that are major vectors of human diseases (Rivero et al.). Recently, more than 550 arthropod species have developed resistance to at least one pesticide (Whalon et al.). Furthermore, the cases of insect resistance continue to exceed by far the number of cases of herbicide and fungicide resistance (Sparks et al.).

Each year insects, plant pathogens, and weeds, destroy more than 40% of all food production. This loss occurs despite the application of pesticides and the use of a wide array of non-chemical controls, such as, crop rotations, and biological controls. If just some of this food could be saved, it could be used to feed the more than three billion people in the world who are malnourished (Pimental).

Plant parasitic nematodes are among the most widespread pests, and are frequently one of the most insidious and costly. It has been estimated that losses attributable to nematodes are from about 9% in developed countries to about 15% in undeveloped countries. However, in the United States of America a survey of 35 States on various crops indicated nematode-derived losses of up to 25% (Nicol et al.).

It is noted that gastropods (slugs and snails) are pests of less economic importance than other arthropods or nematodes, but in certain places, they may reduce yields substantially, severely affecting the quality of harvested products, as well as, transmitting human, animal, and plant diseases. While only a few dozen species of gastropods are serious regional pests, a handful of species are important pests on a worldwide scale. In particular, gastropods affect a wide variety of agricultural and horticultural crops, such as, arable, pastoral, and fiber crops; vegetables; bush and tree fruits; herbs; and ornamentals (Speiser).

Termites cause damage to all types of private and public structures, as well as to agricultural and forestry resources. In 2005, it was estimated that termites cause over US$50 billion in damage worldwide each year (Korb).

Consequently, for many reasons, including those mentioned above, there is an on-going need for the costly (estimated to be about US$256 million per pesticide in 2010), time-consuming (on average about 10 years per pesticide), and difficult, development of new pesticides (CropLife America).

CERTAIN REFERENCES CITED IN THIS DISCLOSURE

CropLife America, The Cost of New Agrochemical Product Discovery, Development & Registration, and Research & Development predictions for the Future, 2010.

Drewes, M., Tietjen, K., Sparks, T. C., High-Throughput Screening in Agrochemical Research, *Modern Methods in Crop Protection Research*, Part I, *Methods for the Design and Optimization of New Active Ingredients*, Edited by Jeschke, P., Kramer, W., Schirmer, U., and Matthias W., p. 1-20, 2012.

Gubler, D., Resurgent Vector-Borne Diseases as a Global Health Problem, Emerging Infectious Diseases, Vol. 4, No. 3, p. 442-450, 1998.

Korb, J., Termites, *Current Biology*, Vol. 17, No. 23, 2007.

Matthews, G., Integrated Vector Management: Controlling Vectors of Malaria and Other Insect Vector Borne Diseases, Ch. 1, p. 1, 2011.

Nicol, J., Turner S., Coyne, L., den Nijs, L., Hocksland, L., Tahna-Maafi, Z., Current Nematode Threats to World Agriculture, *Genomic and Molecular Genetics of Plant—Nematode Interactions*, p. 21-43, 2011.

Pimental, D., Pest Control in World Agriculture, *Agricultural Sciences*—Vol. II, 2009.

Rivero, A., Vezilier, J., Weill, M., Read, A., Gandon, S., Insect Control of Vector-Borne Diseases: When is Insect Resistance a Problem? *Public Library of Science Pathogens*, Vol. 6, No. 8, p. 1-9, 2010.

Sparks T. C., Nauen R., IRAC: Mode of action classification and insecticide resistance management, *Pesticide Biochemistry and Physiology* (2014) available online 4 Dec. 2014.

Speiser, B., Molluscicides, *Encyclopedia of Pest Management*, Ch. 219, p. 506-508, 2002.

Whalon, M., Mota-Sanchez, D., Hollingworth, R., Analysis of Global Pesticide Resistance in Arthropods, *Global Pesticide Resistance in Arthropods*, Ch. 1, p. 5-33, 2008.

Definitions Used in this Disclosure

The examples given in these definitions are generally non-exhaustive and must not be construed as limiting this disclosure. It is understood that a substituent should comply with chemical bonding rules and steric compatibility constraints in relation to the particular molecule to which it is attached. These definitions are only to be used for the purposes of this disclosure.

The phrase "active ingredient" means a material having activity useful in controlling pests, and/or that is useful in helping other materials have better activity in controlling pests, examples of such materials include, but are not limited to, acaricides, algicides, antifeedants, avicides, bactericides, bird repellents, chemosterilants, fungicides, herbicide safeners, herbicides, insect attractants, insect repellents, insecticides, mammal repellents, mating disrupters, molluscicides, nematicides, plant activators, plant growth regulators, rodenticides, synergists, and virucides (see alanwood.net). Specific examples of such materials include, but are not limited to, the materials listed in active ingredient group alpha.

The phrase "active ingredient group alpha" (hereafter "AIGA") means collectively the following materials:

(1) (3-ethoxypropyl)mercury bromide, 1,2-dibromoethane, 1,2-dichloroethane, 1,2-dichloropropane, 1,3-dichloropropene, 1-MCP, 1-methylcyclopropene, 1-naphthol, 2-(octylthio)ethanol, 2,3,3-TPA, 2,3,5-tri-iodobenzoic acid, 2,3,6-TBA, 2,4,5-T, 2,4,5-TB, 2,4,5-TP, 2,4-D, 2,4-DB, 2,4-DEB, 2,4-DEP, 2,4-DES, 2,4-DP, 2,4-MCPA, 2,4-MCPB, 2iP, 2-methoxyethylmercury chloride, 2-phenylphenol, 3,4-DA, 3,4-DB, 3,4-DP, 3,6-dichloropicolinic acid, 4-aminopyridine, 4-CPA, 4-CPB, 4-CPP, 4-hydroxyphenethyl alcohol, 8-hydroxyquinoline sulfate, 8-phenylmercurioxyquinoline, abamectin, abamectin-aminomethyl, abscisic acid, ACC, acephate, acequinocyl, acetamiprid, acethion, acetochlor, acetofenate, acetophos, acetoprole, acibenzolar, acifluorfen, aclonifen, ACN, acrep, acrinathrin, acrolein, acrylonitrile, acypetacs, afidopyropen, afoxolaner, alachlor, alanap, alanycarb, albendazole, aldicarb, aldicarb sulfone, aldimorph, aldoxycarb, aldrin, allethrin, allicin, allidochlor, allosamidin, alloxydim, allyl alcohol, allyxycarb, alorac, alpha-cypermethrin, alpha-endosulfan, alphamethrin, altretamine, aluminium phosphide, aluminum phosphide, ametoctradin, ametridione, ametryn, ametryne, amibuzin, amicarbazone, amicarthiazol, amidithion, amidoflumet, amidosulfuron, aminocarb, aminocyclopyrachlor, aminopyralid, aminotriazole, amiprofos-methyl, amiprophos, amiprophos-methyl, amisulbrom, amiton, amitraz, amitrole, ammonium sulfamate, amobam, amorphous silica gel, amorphous silicon dioxide, ampropylfos, AMS, anabasine, ancymidol, anilazine, anilofos, anisuron, anthraquinone, antu, apholate, aramite, arprocarb, arsenous oxide, asomate, aspirin, asulam, athidathion, atraton, atrazine, aureofungin, avermectin B1, AVG, aviglycine, azaconazole, azadirachtin, azafenidin, azamethiphos, azidithion, azimsulfuron, azinphosethyl, azinphos-ethyl, azinphosmethyl, azinphos-methyl, aziprotryn, aziprotryne, azithiram, azobenzene, azocyclotin, azothoate, azoxystrobin, bachmedesh, barban, barbanate, barium hexafluorosilicate, barium polysulfide, barium silicofluoride, barthrin, basic copper carbonate, basic copper chloride, basic copper sulfate, BCPC, beflubutamid, benalaxyl, benalaxyl-M, benazolin, bencarbazone, benclothiaz, bendaqingbingzhi, bendiocarb, bendioxide, benefin, benfluralin, benfuracarb, benfuresate, benmihuangcaoan, benodanil, benomyl, benoxacor, benoxafos, benquinox, bensulfuron, bensulide, bensultap, bentaluron, bentazon, bentazone, benthiavalicarb, benthiazole, benthiocarb, bentranil, benzadox, benzalkonium chloride, benzamacril, benzamizole, benzamorf, benzene hexachloride, benzfendizone, benzimine, benzipram, benzobicyclon, benzoepin, benzofenap, benzofluor, benzohydroxamic acid, benzomate, benzophosphate, benzothiadiazole, benzovindiflupyr, benzoximate, benzoylprop, benzthiazuron, benzuocaotong, benzyl benzoate, benzyladenine, berberine, beta-cyfluthrin, beta-cypermethrin, bethoxazin, BHC, bialaphos, bicyclopyrone, bifenazate, bifenox, bifenthrin, bifujunzhi, bilanafos, binapacryl, bingqingxiao, bioallethrin, bioethanomethrin, biopermethrin, bioresmethrin, biphenyl, bisazir, bismerthiazol, bismerthiazol-copper, bisphenylmercury methylenedi(x-naphthalene-y-sulphonate), bispyribac, bistrifluron, bisultap, bitertanol, bithionol, bixafen, blasticidin-S, borax, Bordeaux mixture, boric acid, boscalid, BPPS, brassinolide, brassinolide-ethyl, brevicomin, brodifacoum, brofenprox, brofenvalerate, broflanilide, brofluthrinate, bromacil, bromadiolone, bromchlophos, bromethalin, bromethrin, bromfenvinfos, bromoacetamide, bromobonil, bromobutide, bromociclen, bromocyclen, bromo-DDT, bromofenoxim, bromofos, bromomethane, bromophos, bromophos-ethyl, bromopropylate, bromothalonil, bromoxynil, brompyrazon, bromuconazole, bronopol, BRP, BTH, bucarpolate, bufencarb, buminafos, bupirimate, buprofezin, Burgundy mixture, busulfan, busulphan, butacarb, butachlor, butafenacil, butam, butamifos, butane-fipronil, butathiofos, butenachlor, butene-fipronil, butethrin, buthidazole, buthiobate, buthiuron, butifos, butocarboxim, butonate, butopyronoxyl, butoxycarboxim, butralin, butrizol, butroxydim, buturon, butylamine, butylate, butylchlorophos, butylene-fipronil, cacodylic acid, cadusafos, cafenstrole, calciferol, calcium arsenate, calcium chlorate, calcium cyanamide, calcium cyanide, calcium polysulfide, calvinphos, cambendichlor, camphechlor, camphor, captafol, captan, carbam, carbamorph, carbanolate, carbaril, carbaryl, carbasulam, carbathion, carbendazim, carbendazol, carbetamide, carbofenotion, carbofuran, carbon disulfide, carbon tetrachloride, carbonyl sulfide, carbophenothion, carbophos, carbosulfan, carboxazole, carboxide, carboxin, carfentrazone, carpropamid, cartap, carvacrol, carvone, CAVP, CDAA, CDEA, CDEC, cellocidin, CEPC, ceralure, cerenox, cevadilla, Cheshunt mixture, chinalphos, chinalphos-methyl, chinomethionat, chinomethionate, chiralaxyl, chitosan, chlobenthiazone, chlomethoxyfen, chloralose, chloramben, chloramine phosphorus, chloramphenicol, chloraniformethan, chloranil, chloranocryl, chlorantraniliprole, chlorazifop, chlorazine, chlorbenside, chlorbenzuron, chlorbicyclen, chlorbromuron, chlorbufam, chlordane, chlordecone, chlordimeform, chlorempenthrin, chloretazate, chlorethephon, chlorethoxyfos, chloreturon, chlorfenac, chlorfenapyr, chlorfenazole, chlorfenethol, chlorfenidim, chlorfenprop, chlorfenson, chlorfensulphide, chlorfenvinphos, chlorfenvinphos-methyl, chlorfluazuron, chlorflurazole, chlorflurecol, chlorfluren, chlorflurenol, chloridazon, chlorimuron, chlorinate, chlor-IPC, chlormephos, chlormequat, chlormesulone, chlormethoxynil, chlornidine, chlornitrofen, chloroacetic acid, chlorobenzilate, chlorodinitronaphthalenes, chlorofénizon, chloroform, chloromebuform, chloromethiuron, chloroneb, chlorophacinone, chlorophos, chloropicrin, chloropon, chloroprallethrin, chloropropylate, chlorothalonil, chlorotoluron, chloroxifenidim, chloroxuron, chloroxynil, chlorphonium, chlorphoxim, chlorprazophos, chlorprocarb, chlorpropham, chlorpyrifos, chlorpyrifos-methyl, chlorquinox, chlorsulfuron, chlorthal, chlorthiamid, chlorthiophos, chlortoluron, chlozolinate, chltosan, cholecalciferol, choline chloride, chromafenozide, cicloheximide, cimectacarb, cimetacarb, cinerin I, cinerin II, cinerins, cinidon-ethyl, cinmethylin, cinosulfuron, cintofen, ciobutide, cisanilide, cismethrin, clacyfos, clefoxydim, clenpirin, clenpyrin, clethodim, climbazole, cliodinate, clodinafop, cloethocarb, clofencet, clofenotane, clofentezine, clofenvinfos, clofibric acid, clofop, clomazone, clomeprop, clonitralid, cloprop, cloproxydim, clopyralid, cloquintocet, cloransulam, closantel, clothianidin, clotrimazole, cloxyfonac, cloxylacon, clozylacon, CMA, CMMP, CMP, CMU, codlelure, colecalciferol, colophonate, copper 8-quinolinolate, copper acetate, copper acetoarsenite, copper arsenate, copper carbonate, basic, copper hydroxide, copper naphthenate, copper oleate, copper oxychloride, copper silicate, copper sulfate, copper sulfate, basic, copper zinc chromate, coumachlor, coumafene, coumafos, coumafuryl, coumaphos, coumatetralyl, coumethoxystrobin, coumithoate, coumoxystrobin, CPMC, CPMF, CPPC, credazine, cresol, cresylic acid, crimidine, crotamiton, crotoxyfos, crotoxyphos, crufomate, cryolite, cue-lure, cufraneb, cumyleron, cumyluron, cuprobam, cuprous oxide, curcumenol, CVMP, cyanamide, cyanatryn, cyanazine, cyanofenphos, cyanogen, cyanophos, cyanthoate, cyantraniliprole, cyanuric acid, cyazofamid, cybutryne, cyclafuramid, cyclanilide, cyclaniliprole, cyclethrin, cycloate, cycloheximide, cycloprate, cycloprothrin, cyclopyrimorate, cyclosulfamuron, cycloxydim, cycluron, cyenopyrafen, cyflufenamid, cyflumetofen, cyfluthrin, cyhalodiamide, cyhalofop, cyhalothrin, cyhexatin, cymiazole, cymoxanil, cyometrinil, cypendazole, cypermethrin, cyperquat, cyphenothrin, cyprazine, cyprazole, cyproconazole, cyprodinil, cyprofuram, cypromid, cyprosulfamide, cyromazine, cythioate, cytrex, daimuron, dalapon, daminozide, dayoutong, dazomet, DBCP, d-camphor, DCB, DCIP, DCPA, DCPTA, DCU, DDD, DDPP, DDT, DDVP, debacarb, decafentin, decamethrin, decarbofuran, deet, dehydroacetic acid, deiquat, delachlor, delnav, deltamethrin, demephion, demephion-O, demephion-S, demeton, demeton-methyl, demeton-O, demeton-O-methyl, demeton-S, demeton-S-methyl, demeton-S-methyl sulphone, demeton-S-methylsulphon, DEP, depalléthrine, derris, desmedipham, desmetryn, desmetryne, d-fanshiluquebingjuzhi, diafenthiuron, dialifor, dialifos, diallate, diamidafos, dianat, diatomaceous earth, diatomite, diazinon, dibrom, dibutyl phthalate, dibutyl succinate, dicamba, dicapthon, dichlobenil, dichlobentiazox, dichlofenthion, dichlofluanid, dichlone, dichloralurea, dichlorbenzuron, dichlorfenidim, dichlorflurecol, dichlorflurenol, dichlormate, dichlormid, dichloromethane, dicloromezotiaz, dichlorophen, dichlorprop, dichlorprop-P, dichlorvos, dichlozolin, dichlozoline, diclobutrazol, diclocymet, diclofop, diclomezine, dicloran, diclosulam, dicofol, dicophane, dicoumarol, dicresyl, dicrotophos, dicryl, dicumarol, dicyclanil, dicyclonon, dieldrin, dienochlor, diethamquat, diethatyl, diethion, diethion, diethofencarb, dietholate, diethon, diethyl pyrocarbonate, diethyltoluamide, difenacoum, difenoconazole, difenopenten, difenoxuron, difenzoquat, difethialone, diflovidazin, diflubenzuron, diflufenican, diflufenicanil, diflufenzopyr, diflumetorim, dikegulac, dilor, dimatif, dimefluthrin, dimefox, dimefuron, dimehypo, dimepiperate, dimetachlone, dimetan, dimethacarb, dimethachlone, dimethachlor, dimethametryn, dimethenamid, dimethenamid-P, dimethipin, dimethirimol, dimethoate, dimethomorph, dimethrin, dimethyl carbate, dimethyl disulfide, dimethyl phthalate, dimethylvinphos, dimetilan, dimexano, dimidazon, dimoxystrobin, dimpylate, dimuron, dinex, dingjunezuo, diniconazole, diniconazole-M, dinitramine, dinitrophenols, dinobuton, dinocap, dinocap-4, dinocap-6, dinocton, dinofenate, dinopenton, dinoprop, dinosam, dinoseb, dinosulfon, dinotefuran, dinoterb, dinoterbon, diofenolan, dioxabenzofos, dioxacarb, dioxathion, dioxation, diphacin, diphacinone, diphenadione, diphenamid, diphenamide, diphenyl sulfone, diphenylamine, diphenylsulphide, diprogulic acid, dipropalin, dipropetryn, dipterex, dipymetitrone, dipyrithione, diquat, disodium tetraborate, disosultap, disparlure, disugran, disul, disulfiram, disulfoton, ditalimfos, dithianon, dithicrofos, dithioether, dithiometon, dithiopyr, diuron, dixanthogen, d-limonene, DMDS, DMPA, DNOC, dodemorph, dodicin, dodine, dofenapyn, doguadine, dominicalure, doramectin, DPC, drazoxolon, DSMA, d-trans-allethrin, d-trans-resmethrin, dufulin, dymron, EBEP, EBP, ebufos, ecdysterone, echlomezol, EDB, EDC, EDDP, edifenphos, eglinazine, emamectin, EMPC, empenthrin, enadenine, endosulfan, endothal, endothall, endothion, endrin, enestroburin, enilconazole, enoxastrobin, ephirsulfonate, EPN, epocholeone, epofenonane, epoxiconazole, eprinomectin, epronaz, epsilon-metofluthrin, epsilon-momfluorothrin, EPTC, erbon, ergocalciferol, erlujixiancaoan, esdepalléthrine, esfenvalerate, ESP, esprocarb, etacelasil, etaconazole, etaphos, etem, ethaboxam, ethachlor, ethalfluralin, ethametsulfuron, ethaprochlor, ethephon, ethidimuron, ethiofencarb, ethiolate, ethion, ethiozin, ethiprole, ethirimol, ethoate-methyl, ethobenzanid, ethofumesate, ethohexadiol, ethoprop, ethoprophos, ethoxyfen, ethoxyquin, ethoxysulfuron, ethychlozate, ethyl formate, ethyl pyrophosphate, ethylan, ethyl-DDD, ethylene, ethylene dibromide, ethylene dichloride, ethylene oxide, ethylicin, ethylmercury 2,3-dihydroxypropyl mercaptide, ethylmercury acetate, ethylmercury bromide, ethylmercury chloride, ethylmercury phosphate, etinofen, ETM, etnipromid, etobenzanid, etofenprox, etoxazole, etridiazole, etrimfos, etrimphos, eugenol, EXD, famoxadone, famphur, fenac, fenamidone, fenaminosulf, fenaminstrobin, fenamiphos, fenapanil, fenarimol, fenasulam, fenazaflor, fenazaquin, fenbuconazole, fenbutatin oxide, fenchlorazole, fenchlorphos, fenclofos, fenclorim, fenethacarb, fenfluthrin, fenfuram, fenhexamid, fenidin, fenitropan, fenitrothion, fénizon, fenjuntong, fenobucarb, fenolovo, fenoprop, fenothiocarb, fenoxacrim, fenoxanil, fenoxaprop, fenoxaprop-P, fenoxasulfone, fenoxycarb, fenpiclonil, fenpicoxamid, fenpirithrin, fenpropathrin, fenpropidin, fenpropimorph, fenpyrazamine, fenpyroximate, fenquinotrione, fenridazon, fenson, fensulfothion, fenteracol, fenthiaprop, fenthion, fenthion-ethyl, fentiaprop, fentin, fentrazamide, fentrifanil, fenuron, fenuron-TCA, fenvalerate, ferbam, ferimzone, ferric phosphate, ferrous sulfate, fipronil, flamprop, flamprop-M, flazasulfuron, flocoumafen, flometoquin, flonicamid, florasulam, florpyrauxifen, fluacrypyrim, fluazaindolizine, fluazifop, fluazifop-P, fluazinam, fluazolate, fluazuron, flubendiamide, flubenzimine, flubrocythrinate, flucarbazone, flucetosulfuron, fluchloralin, flucofuron, flucycloxuron, flucythrinate, fludioxonil, fluénéthyl, fluenetil, fluensulfone, flufenacet, flufenerim, flufenican, flufenoxuron, flufenoxystrobin, flufenprox, flufenpyr, flufenzine, flufiprole, fluhexafon, flumethrin, flumetover, flumetralin, flumetsulam, flumezin, flumiclorac, flumioxazin, flumipropyn, flumorph, fluometuron, fluopicolide, fluopyram, fluorbenside, fluoridamid, fluoroacetamide, fluoroacetic acid, fluorochloridone, fluorodifen, fluoroglycofen, fluoroimide, fluoromide, fluoromidine, fluoronitrofen, fluoroxypyr, fluothiuron, fluotrimazole, fluoxastrobin, flupoxam, flupropacil, flupropadine, flupropanate, flupyradifurone, flupyrsulfuron, fluquinconazole, fluralaner, flurazole, flurecol, flurenol, fluridone, flurochloridone, fluromidine, fluroxypyr, flurprimidol, flursulamid, flurtamone, flusilazole, flusulfamide, flutenzine, fluthiacet, fluthiamide, flutianil, flutolanil, flutriafol, fluvalinate, fluxametamide, fluxapyroxad, fluxofenim, folpel, folpet, fomesafen, fonofos, foramsulfuron, forchlorfenuron, formaldehyde, formetanate, formothion, formparanate, fosamine, fosetyl, fosmethilan, fospirate, fosthiazate, fosthietan, frontalin, fthalide, fuberidazole, fucaojing, fucaomi, fujunmanzhi, fulumi, fumarin, funaihecaoling, fuphenthiourea, furalane, furalaxyl, furamethrin, furametpyr, furan tebufenozide, furathiocarb, furcarbanil, furconazole, furconazole-cis, furethrin, furfural, furilazole, furmecyclox, furophanate, furyloxyfen, gamma-BHC, gamma-cyhalothrin, gamma-HCH, genit, gibberellic acid, gibberellin A3, gibberellins, gliftor, glitor, glucochloralose, glufosinate, glufosinate-P, glyodin, glyoxime, glyphosate, glyphosine, gossyplure, grandlure, griseofulvin, guanoctine, guazatine, halacrinate, halauxifen, halfenprox, halofenozide, halosafen, halosulfuron, haloxydine, haloxyfop, haloxyfop-P, haloxyfop-R, HCA, HCB, HCH, hemel, hempa, HEOD, heptachlor, heptafluthrin, heptenophos, heptopargil, herbimycin, herbimycin A, heterophos, hexachlor, hexachloran, hexachloroacetone, hexachlorobenzene, hexachlorobutadiene, hexachlorophene, hexaconazole, hexaflumuron, hexafluoramin, hexaflurate, hexalure, hexamide, hexazinone, hexylthiofos, hexythiazox, HHDN, holosulf, homobrassinolide, huancaiwo, huanchongjing, huangcaoling, huanjunzuo, hydramethylnon, hydrargaphen, hydrated lime, hydrogen cyanamide, hydrogen cyanide, hydroprene, hydroxyisoxazole, hymexazol, hyquincarb, IAA, IBA, IBP, icaridin, imazalil, imazamethabenz, imazamox, imazapic, imazapyr, imazaquin, imazethapyr, imazosulfuron, imibenconazole, imicyafos, imidacloprid, imidaclothiz, iminoctadine, imiprothrin, inabenfide, indanofan, indaziflam, indoxacarb, inezin, infusorial earth, iodobonil, iodocarb, iodofenphos, iodomethane, iodosulfuron, iofensulfuron, ioxynil, ipazine, IPC, ipconazole, ipfencarbazone, ipfentrifluconazole, iprobenfos, iprodione, iprovalicarb, iprymidam, ipsdienol, ipsenol, IPSP, IPX, isamidofos, isazofos, isobenzan, isocarbamid, isocarbamide, isocarbophos, isocil, isodrin, isofenphos, isofenphos-methyl, isofetamid, isolan, isomethiozin, isonoruron, isopamphos, isopolinate, isoprocarb, isoprocil, isopropalin, isopropazol, isoprothiolane, isoproturon, isopyrazam, isopyrimol, isothioate, isotianil, isouron, isovaledione, isoxaben, isoxachlortole, isoxadifen, isoxaflutole, isoxapyrifop, isoxathion, isuron, ivermectin, ixoxaben, izopamfos, izopamphos, japonilure, japothrins, jasmolin I, jasmolin II, jasmonic acid, jiahuangchongzong, jiajizengxiaolin, jiaxiangjunzhi, jiecaowan, jiecaoxi, jinganmycin A, jodfenphos, juvenile hormone I, juvenile hormone II, juvenile hormone III, kadethrin, kappa-bifenthrin, kappa-tefluthrin, karbutilate, karetazan, kasugamycin, kejunlin, kelevan, ketospiradox, kieselguhr, kinetin, kinoprene, kiralaxyl, kresoxim-methyl, kuicaoxi, lactofen, lambda-cyhalothrin, lancotrione, latilure, lead arsenate, lenacil, lepimectin, leptophos, lianbenjingzhi, lime sulfur, lindane, lineatin, linuron, lirimfos, litlure, looplure, lufenuron, lüxiancaolin, lvdingjunzhi, lvfumijvzhi, lvxiancaolin, lythidathion, M-74, M-81, MAA, magnesium phosphide, malathion, maldison, maleic hydrazide, malonoben, maltodextrin, MAMA, mancopper, mancozeb, mandestrobin, mandipropamid, maneb, matrine, mazidox, MCC, MCP, MCPA, MCPA-thioethyl, MCPB, MCPP, mebenil, mecarbam, mecarbinzid, mecarphon, mecoprop, mecoprop-P, medimeform, medinoterb, medlure, mefenacet, mefenoxam, mefenpyr, mefentrifluconazole, mefluidide, megatomoic acid, melissyl alcohol, melitoxin, MEMC, menazon, MEP, mepanipyrim, meperfluthrin, mephenate, mephosfolan, mepiquat, mepronil, meptyldinocap, mercaptodimethur, mercaptophos, mercaptophos thiol, mercaptothion, mercuric chloride, mercuric oxide, mercurous chloride, merphos, merphos oxide, mesoprazine, mesosulfuron, mesotrione, mesulfen, mesulfenfos, mesulphen, metacresol, metaflumizone, metalaxyl, metalaxyl-M, metaldehyde, metam, metamifop, metamitron, metaphos, metaxon, metazachlor, metazosulfuron, metazoxolon, metconazole, metepa, metflurazon, methabenzthiazuron, methacrifos, methalpropalin, metham, methamidophos, methasulfocarb, methazole, methfuroxam, methibenzuron, methidathion, methiobencarb, methiocarb, methiopyrisulfuron, methiotepa, methiozolin, methiuron, methocrotophos, metholcarb, methometon, methomyl, methoprene, methoprotryn, methoprotryne, methoquin-butyl, methothrin, methoxychlor, methoxyfenozide, methoxyphenone, methyl apholate, methyl bromide, methyl eugenol, methyl iodide, methyl isothiocyanate, methyl parathion, methylacetophos, methylchloroform, methyldithiocarbamic acid, methyldymron, methylene chloride, methyl-isofenphos, methylmercaptophos, methylmercaptophos oxide, methylmercaptophos thiol, methylmercury benzoate, methylmercury dicyandiamide, methylmercury pentachlorophenoxide, methylneodecanamide, methylnitrophos, methyltriazothion, metiozolin, metiram, metiram-zinc, metobenzuron, metobromuron, metofluthrin, metolachlor, metolcarb, metometuron, metominostrobin, metosulam, metoxadiazone, metoxuron, metrafenone, metriam, metribuzin, metrifonate, metriphonate, metsulfovax, metsulfuron, mevinphos, mexacarbate, miechuwei, mieshuan, miewenjuzhi, milbemectin, milbemycin oxime, milneb, mima2nan, mipafox, MIPC, mirex, MNAF, moguchun, molinate, molosultap, momfluorothrin, monalide, monisuron, monoamitraz, monochloroacetic acid, monocrotophos, monolinuron, monomehypo, monosulfiram, monosulfuron, monosultap, monuron, monuron-TCA, morfamquat, moroxydine, morphothion, morzid, moxidectin, MPMC, MSMA, MTMC, muscalure, myclobutanil, myclozolin, myricyl alcohol, N-(ethylmercury)-p-toluenesulphonanilide, NAA, NAAm, nabam, naftalofos, naled, naphthalene, naphthaleneacetamide, naphthalic anhydride, naphthalophos, naphthoxyacetic acids, naphthylacetic acids, naphthylindane-1,3-diones, naphthyloxyacetic acids, naproanilide, napropamide, napropamide-M, naptalam, natamycin, NBPOS, neburea, neburon, nendrin, neonicotine, nichlorfos, niclofen, niclosamide, nicobifen, nicosulfuron, nicotine, nicotine sulfate, nifluridide, nikkomycins, NIP, nipyraclofen, nipyralofen, nitenpyram, nithiazine, nitralin, nitrapyrin, nitrilacarb, nitrofen, nitrofluorfen, nitrostyrene, nitrothal-isopropyl, nobormide, nonanol, norbormide, norea, norflurazon, nornicotine, noruron, novaluron, noviflumuron, NPA, nuarimol, nuranone, OCH, octachlorodipropyl ether, octhilinone, o-dichlorobenzene, ofurace, omethoate, o-phenylphenol, orbencarb, orfralure, orthobencarb, ortho-dichlorobenzene, orthosulfamuron, oryctalure, orysastrobin, oryzalin, osthol, osthole, ostramone, ovatron, ovex, oxabetrinil, oxadiargyl, oxadiazon, oxadixyl, oxamate, oxamyl, oxapyrazon, oxapyrazone, oxasulfuron, oxathiapiprolin, oxaziclomefone, oxine-copper, oxine-Cu, oxolinic acid, oxpoconazole, oxycarboxin, oxydemeton-methyl, oxydeprofos, oxydisulfoton, oxyenadenine, oxyfluorfen, oxymatrine, oxytetracycline, oxythioquinox, PAC, paclobutrazol, paichongding, palléthrine, PAP, para-dichlorobenzene, parafluron, paraquat, parathion, parathion-methyl, parinol, Paris green, PCNB, PCP, PCP-Na, p-dichlorobenzene, PDJ, pebulate, pédinex, pefurazoate, pelargonic acid, penconazole, pencycuron, pendimethalin, penfenate, penflufen, penfluron, penoxalin, penoxsulam, pentachlorophenol, pentachlorophenyl laurate, pentanochlor, penthiopyrad, pentmethrin, pentoxazone, perchlordecone, perfluidone, permethrin, pethoxamid, PHC, phenamacril, phenamacril-ethyl, phénaminosulf, phenazine oxide, phenetacarbe, phenisopham, phenkapton, phenmedipham, phenmedipham-ethyl, phenobenzuron, phenothiol, phenothrin, phenproxide, phenthoate, phenylmercuriurea, phenylmercury acetate, phenylmercury chloride, phenylmercury derivative of pyrocatechol, phenylmercury nitrate, phenylmercury salicylate, phorate, phosacetim, phosalone, phosametine, phosazetim, phosazetin, phoscyclotin, phosdiphen, phosethyl, phosfolan, phosfolan-methyl, phosglycin, phosmet, phosnichlor, phosphamide, phosphamidon, phosphine, phosphinothricin, phosphocarb, phosphorus, phostin, phoxim, phoxim-methyl, phthalide, phthalophos, phthalthrin, picarbutrazox, picaridin, picloram, picolinafen, picoxystrobin, pimaricin, pindone, pinoxaden, piperalin, piperazine, piperonyl butoxide, piperonyl cyclonene, piperophos, piproctanly, piproctanyl, piprotal, pirimetaphos, pirimicarb, piriminil, pirimioxyphos, pirimiphos-ethyl, pirimiphos-methyl, pival, pivaldione, plifenate, PMA, PMP, polybutenes, polycarbamate, polychlorcamphene, polyethoxyquinoline, polyoxin D, polyoxins, polyoxorim, polythialan, potassium arsenite, potassium azide, potassium cyanate, potassium ethylxanthate, potassium naphthenate, potassium polysulfide, potassium thiocyanate, pp'-DDT, prallethrin, precocene I, precocene II, precocene III, pretilachlor, primidophos, primisulfuron, probenazole, prochloraz, proclonol, procyazine, procymidone, prodiamine, profenofos, profluazol, profluralin, profluthrin, profoxydim, profurite-aminium, proglinazine, prohexadione, prohydrojasmon, promacyl, promecarb, prometon, prometryn, prometryne, promurit, pronamide, propachlor, propafos, propamidine, propamocarb, propanil, propaphos, propaquizafop, propargite, proparthrin, propazine, propetamphos, propham, propiconazole, propidine, propineb, propisochlor, propoxur, propoxycarbazone, propyl isome, propyrisulfuron, propyzamide, proquinazid, prosuler, prosulfalin, prosulfocarb, prosulfuron, prothidathion, prothiocarb, prothioconazole, prothiofos, prothoate, protrifenbute, proxan, prymidophos, prynachlor, psoralen, psoralene, pydanon, pydiflumetofen, pyflubumide, pymetrozine, pyracarbolid, pyraclofos, pyraclonil, pyraclostrobin, pyraflufen, pyrafluprole, pyramat, pyrametostrobin, pyraoxystrobin, pyrasulfotole, pyraziflumid, pyrazolate, pyrazolynate, pyrazon, pyrazophos, pyrazosulfuron, pyrazothion, pyrazoxyfen, pyresmethrin, pyrethrin I, pyrethrin II, pyrethrins, pyribambenz-isopropyl, pyribambenz-propyl, pyribencarb, pyribenzoxim, pyributicarb, pyriclor, pyridaben, pyridafol, pyridalyl, pyridaphenthion, pyridaphenthione, pyridate, pyridinitril, pyrifenox, pyrifluquinazon, pyriftalid, pyrimétaphos, pyrimethanil, pyrimicarbe, pyrimidifen, pyriminobac, pyriminostrobin, pyrimiphos-éthyl, pyrimiphos-méthyl, pyrimisulfan, pyrimitate, pyrinuron, pyriofenone, pyriprole, pyripropanol, pyriproxyfen, pyrisoxazole, pyrithiobac, pyrolan, pyroquilon, pyroxasulfone, pyroxsulam, pyroxychlor, pyroxyfur, qincaosuan, qingkuling, quassia, quinacetol, quinalphos, quinalphos-methyl, quinazamid, quinclorac, quinconazole, quinmerac, quinoclamine, quinofumelin, quinomethionate, quinonamid, quinothion, quinoxyfen, quintiofos, quintozene, quizalofop, quizalofop-P, quwenzhi, quyingding, rabenzazole, rafoxanide, R-diniconazole, rebemide, reglone, renriduron, rescalure, resmethrin, rhodethanil, rhodojaponin-III, ribavirin, rimsulfuron, rizazole, R-metalaxyl, rodethanil, ronnel, rotenone, ryania, sabadilla, saflufenacil, saijunmao, saisentong, salicylanilide, salifluofen, sanguinarine, santonin, S-bioallethrin, schradan, scilliroside, sebuthylazine, secbumeton, sedaxane, selamectin, semiamitraz, sesamex, sesamolin, sesone, sethoxydim, sevin, shuangjiaancaolin, shuangjianancaolin, S-hydroprene, siduron, sifumijvzhi, siglure, silafluofen, silatrane, silica aerogel, silica gel, silthiofam, silthiopham, silthiophan, silvex, simazine, simeconazole, simeton, simetryn, simetryne, sintofen, S-kinoprene, slaked lime, SMA, S-methoprene, S-metolachlor, sodium arsenite, sodium azide, sodium chlorate, sodium cyanide, sodium fluoride, sodium fluoroacetate, sodium hexafluorosilicate, sodium naphthenate, sodium o-phenylphenoxide, sodium orthophenylphenoxide, sodium pentachlorophenate, sodium pentachlorophenoxide, sodium polysulfide, sodium silicofluoride, sodium tetrathiocarbonate, sodium thiocyanate, solan, sophamide, spinetoram, spinosad, spirodiclofen, spiromesifen, spirotetramat, spiroxamine, stirofos, streptomycin, strychnine, sulcatol, sulcofuron, sulcotrione, sulfallate, sulfentrazone, sulfiram, sulfluramid, sulfodiazole, sulfometuron, sulfosate, sulfosulfuron, sulfotep, sulfotepp, sulfoxaflor, sulfoxide, sulfoxime, sulfur, sulfuric acid, sulfuryl fluoride, sulglycapin, sulphosate, sulprofos, sultropen, swep, tau-fluvalinate, tavron, tazimcarb, TBTO, TBZ, TCA, TCBA, TCMTB, TCNB, TDE, tebuconazole, tebufenozide, tebufenpyrad, tebufloquin, tebupirimfos, tebutam, tebuthiuron, tecloftalam, tecnazene, tecoram, tedion, teflubenzuron, tefluthrin, tefuryltrione, tembotrione, temefos, temephos, tepa, TEPP, tepraloxydim, teproloxydim, terallethrin, terbacil, terbucarb, terbuchlor, terbufos, terbumeton, terbuthylazine, terbutol, terbutryn, terbutryne, terraclor, terramicin, terramycin, tetcyclacis, tetrachloroethane, tetrachlorvinphos, tetraconazole, tetradifon, tetradisul, tetrafluron, tetramethrin, tetra methylfluthrin, tetramine, tetranactin, tetraniliprole, tetrapion, tetrasul, thallium sulfate, thallous sulfate, thenylchlor, theta-cypermethrin, thiabendazole, thiacloprid, thiadiazine, thiadifluor, thiamethoxam, thiameturon, thiapronil, thiazafluron, thiazfluron, thiazone, thiazopyr, thicrofos, thicyofen, thidiazimin, thidiazuron, thiencarbazone, thifensulfuron, thifluzamide, thimerosal, thimet, thiobencarb, thiocarboxime, thiochlorfenphim, thiochlorphenphime, thiocyanatodinitrobenzenes, thiocyclam, thiodan, thiodiazole-copper, thiodicarb, thiofanocarb, thiofanox, thiofluoximate, thiohempa, thiomersal, thiometon, thionazin, thiophanate, thiophanate-ethyl, thiophanate-methyl, thiophos, thioquinox, thiosemicarbazide, thiosultap, thiotepa, thioxamyl, thiram, thiuram, thuringiensin, tiabendazole, tiadinil, tiafenacil, tiaojiean, TIBA, tifatol, tiocarbazil, tioclorim, tioxazafen, tioxymid, tirpate, TMTD, tolclofos-methyl, tolfenpyrad, tolprocarb, tolpyralate, tolyfluanid, tolylfluanid, tolylmercury acetate, tomarin, topramezone, toxaphene, TPN, tralkoxydim, tralocythrin, tralomethrin, tralopyril, transfluthrin, transpermethrin, tretamine, triacontanol, triadimefon, triadimenol, triafamone, triallate, triallate, triamiphos, triapenthenol, triarathene, triarimol, triasulfuron, triazamate, triazbutil, triaziflam, triazophos, triazothion, triazoxide, tribasic copper chloride, tribasic copper sulfate, tribenuron, tribufos, tributyltin oxide, tricamba, trichlamide, trichlopyr, trichlorfon, trichlormetaphos-3, trichloronat, trichloronate, trichlorotrinitrobenzenes, trichlorphon, triclopyr, triclopyricarb, tricresol, tricyclazole, tricyclohexyltin hydroxide, tridemorph, tridiphane, trietazine, trifenmorph, trifenofos, trifloxystrobin, trifloxysulfuron, trifludimoxazin, triflumezopyrim, triflumizole, triflumuron, trifluralin, triflusulfuron, trifop, trifopsime, triforine, trihydroxytriazine, trimedlure, trimethacarb, trimeturon, trinexapac, triphenyltin, triprene, tripropindan, triptolide, tritac, trithialan, triticonazole, tritosulfuron, trunc-call, tuoyelin, uniconazole, uniconazole-P, urbacide, uredepa, valerate, validamycin, validamycin A, valifenalate, valone, vamidothion, vangard, vaniliprole, vernolate, vinclozolin, vitamin D3, warfarin, xiaochongliulin, xinjunan, xiwojunan, xiwojunzhi, XMC, xylachlor, xylenols, xylylcarb, xymiazole, yishijing, zarilamid, zeatin, zengxiaoan, zengxiaolin, zeta-cypermethrin, zinc naphthenate, zinc phosphide, zinc thiazole, zinc thiozole, zinc trichlorophenate, zinc trichlorophenoxide, zineb, ziram, zolaprofos, zoocoumarin, zoxamide, zuoanjunzhi, zuocaoan, zuojunzhi, zuomihuanglong, α-chlorohydrin, α-ecdysone, α-multistriatin, α-naphthaleneacetic acids, and β-ecdysone;

(2) N-(3-chloro-1-(pyridin-3-yl)-1H-pyrazol-4-yl)-N-ethyl-3-((3,3,3-trifluoropropyl)thio)propanamide (hereafter "AI-1")
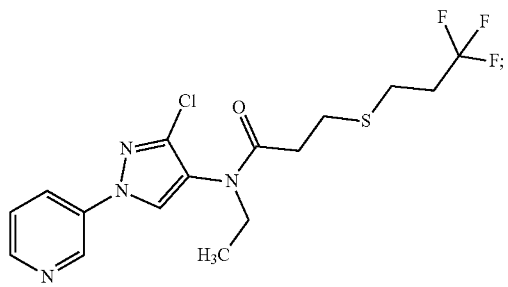 [SMILES: CCN(C(=O)CCSCCC(F)(F)F)c1cn(-c2cccnc2)nc1Cl]
(3) a molecule known as Lotilaner that has the following structure
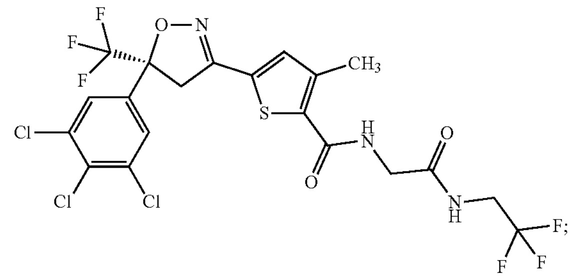 [SMILES: Cc1cc(C2=NO[C@@](c3cc(Cl)c(Cl)c(Cl)c3)(C(F)(F)F)C2)sc1C(=O)NCC(=O)NCC(F)(F)F]
and
(4) the following molecules in Table A
TABLE A
| Structure of M#—active ingredients | |
|---|---|
| M# | Structure |
| M1 | 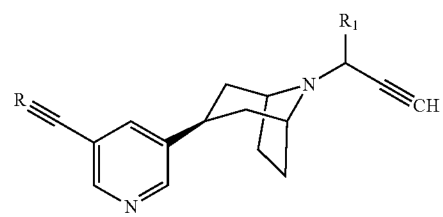 R = CH, N; $R^1$ = H, Me |
| M2 | 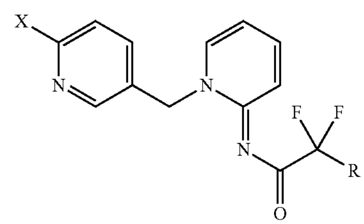 X = F, Cl; R = H, F |
| M3 | 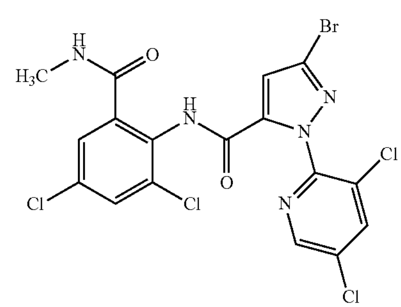 [SMILES: CNC(=O)c1cc(Cl)cc(Cl)c1NC(=O)c1cc(Br)nn1-c1ncc(Cl)cc1Cl] |

TABLE A-continued

| Structure of M#—active ingredients | |
|---|---|
| M# | Structure |
| M4 | 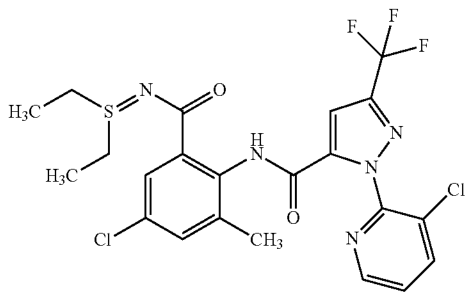 [SMILES: CCS(CC)=NC(=O)c1cc(Cl)cc(C)c1NC(=O)c1cc(C(F)(F)F)nn1-c1ncccc1Cl] |
| M5 | 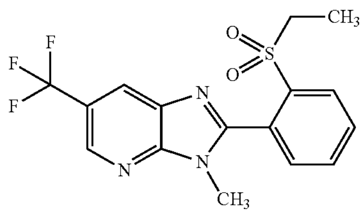 [SMILES: CCS(=O)(=O)c1ccccc1-c1nc2cc(C(F)(F)F)cnc2n1C] |
| M6 | 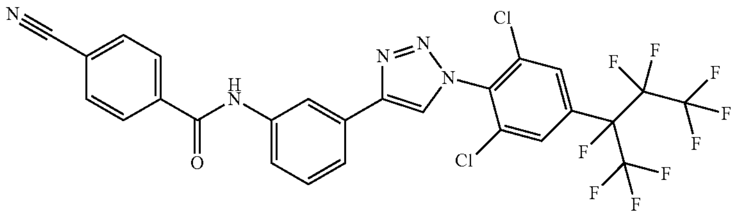 [SMILES: N#Cc1ccc(C(=O)Nc2cccc(-c3cn(-c4c(Cl)cc(C(F)(C(F)(F)F)C(F)(F)C(F)(F)F)cc4Cl)nn3)c2)cc1] |
| M7 | 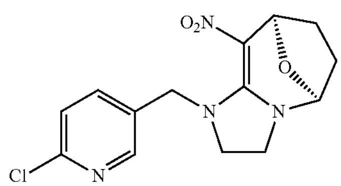 [SMILES: O=[N+]([O-])C1=C2N(Cc3ccc(Cl)nc3)CCN2[C@@H]2CC[C@H]1O2] cycloxaprid |

As used in this disclosure, each of the above is an active ingredient. For more information consult the "Compendium of Pesticide Common Names" located at Alanwood.net and various editions, including the on-line edition, of "The Pesticide Manual" located at bcpcdata.com.

A particularly preferred selection of active ingredients are 1,3 dichloropropene, chlorpyrifos, hexaflumuron, methoxyfenozide, noviflumuron, spinetoram, spinosad, and sulfoxaflor (hereafter "AIGA-2").

Additionally, another particularly preferred selection of active ingredients are acequinocyl, acetamiprid, acetoprole, avermectin, azinphos-methyl, bifenazate, bifenthrin, carbaryl, carbofuran, chlorfenapyr, chlorfluazuron, chromafenozide, clothianidin, cyfluthrin, cypermethrin, deltamethrin, diafenthiuron, emamectin benzoate, endosulfan, esfenvalerate, ethiprole, etoxazole, fipronil, flonicamid, fluacrypyrim, gamma-cyhalothrin, halofenozide, indoxacarb, lambda-cyhalothrin, lufenuron, malathion, methomyl, novaluron, permethrin, pyridalyl, pyrimidifen, spirodiclofen, tebufenozide, thiacloprid, thiamethoxam, thiodicarb, tolfenpyrad, and zeta-cypermethrin (hereafter "AIGA-3").

Additionally, another particularly preferred selection of active ingredients are afidopyropen, broflanilide, cyantraniliprole, cyclaniliprole, cycloxaprid, cyhalodiamide, dicloromezotiaz, flometoquin, fluhexafon, flupyradifurone, fluxametamide, spirotetramat, tetraniliprole, and triflumezopyrim (hereafter "AIGA-4").

The term "alkenyl" means an acyclic, unsaturated (at least one carbon-carbon double bond), branched or unbranched, substituent consisting of carbon and hydrogen, for example, vinyl, allyl, butenyl, pentenyl, and hexenyl.

The term "alkenyloxy" means an alkenyl further consisting of a carbon-oxygen single bond, for example, allyloxy, butenyloxy, pentenyloxy, hexenyloxy.

The term "alkoxy" means an alkyl further consisting of a carbon-oxygen single bond, for example, methoxy, ethoxy, propoxy, isopropoxy, butoxy, isobutoxy, and tertbutoxy.

The term "alkyl" means an acyclic, saturated, branched or unbranched, substituent consisting of carbon and hydrogen, for example, methyl, ethyl, propyl, isopropyl, butyl, and tertbutyl.

The term "alkynyl" means an acyclic, unsaturated (at least one carbon-carbon triple bond), branched or unbranched, substituent consisting of carbon and hydrogen, for example, ethynyl, propargyl, butynyl, and pentynyl.

The term "alkynyloxy" means an alkynyl further consisting of a carbon-oxygen single bond, for example, pentynyloxy, hexynyloxy, heptynyloxy, and octynyloxy.

The term "aryl" means a cyclic, aromatic substituent consisting of hydrogen and carbon, for example, phenyl, naphthyl, and biphenyl.

The term "biopesticide" means a microbial biological pest control agent that, in general, is applied in a similar manner to chemical pesticides. Commonly they are bacterial, but there are also examples of fungal control agents, including *Trichoderma* spp. and *Ampelomyces quisqualis*. One well-known biopesticide example is *Bacillus* species, a bacterial disease of Lepidoptera, Coleoptera, and Diptera. Biopesticides include products based on entomopathogenic fungi (e.g. *Metarhizium anisopliae*), entomopathogenic nematodes (e.g. *Steinernema feltiae*), and entomopathogenic viruses (e.g. *Cydia pomonella* granulovirus). Other examples of entomopathogenic organisms include, but are not limited to, baculoviruses, protozoa, and Microsporidia. For the avoidance of doubt, biopesticides are active ingredients.

The term "cycloalkenyl" means a monocyclic or polycyclic, unsaturated (at least one carbon-carbon double bond) substituent consisting of carbon and hydrogen, for example, cyclobutenyl, cyclopentenyl, cyclohexenyl, norbornenyl, bicyclo[2.2.2]octenyl, tetrahydronaphthyl, hexahydronaphthyl, and octahydronaphthyl.

The term "cycloalkenyloxy" means a cycloalkenyl further consisting of a carbon-oxygen single bond, for example, cyclobutenyloxy, cyclopentenyloxy, norbornenyloxy, and bicyclo[2.2.2]octenyloxy.

The term "cycloalkyl" means a monocyclic or polycyclic, saturated substituent consisting of carbon and hydrogen, for example, cyclopropyl, cyclobutyl, cyclopentyl, norbornyl, bicyclo[2.2.2]octyl, and decahydronaphthyl.

The term "cycloalkoxy" means a cycloalkyl further consisting of a carbon-oxygen single bond, for example, cyclopropyloxy, cyclobutyloxy, cyclopentyloxy, norbornyloxy, and bicyclo[2.2.2]octyloxy.

The term "halo" means fluoro, chloro, bromo, and iodo.

The term "haloalkoxy" means an alkoxy further consisting of, from one to the maximum possible number of identical or different, halos, for example, fluoromethoxy, trifluoromethoxy, 2,2-difluoropropoxy, chloromethoxy, trichloromethoxy, 1,1,2,2-tetrafluoroethoxy, and pentafluoroethoxy.

The term "haloalkyl" means an alkyl further consisting of, from one to the maximum possible number of, identical or different, halos, for example, fluoromethyl, trifluoromethyl, 2,2-difluoropropyl, chloromethyl, trichloromethyl, and 1,1,2,2-tetrafluoroethyl.

The term "heterocyclyl" means a cyclic substituent that may be aromatic, fully saturated, or partially or fully unsaturated, where the cyclic structure contains at least one carbon and at least one heteroatom, where said heteroatom is nitrogen, sulfur, or oxygen. Examples are:

(1) aromatic heterocyclyl substituents include, but are not limited to, benzofuranyl, benzoisothiazolyl, benzoisoxazolyl, benzothienyl, benzothiazolyl, benzoxazolyl, cinnolinyl, furanyl, imidazolyl, indazolyl, indolyl, isoindolyl, isoquinolinyl, isothiazolyl, isoxazolyl, oxadiazolyl, oxazolinyl, oxazolyl, phthalazinyl, pyrazinyl, pyrazolinyl, pyrazolyl, pyridazinyl, pyridyl, pyrimidinyl, pyrrolyl, quinazolinyl, quinolinyl, quinoxalinyl, tetrazolyl, thiazolinyl, thiazolyl, thienyl, triazinyl, and triazolyl;

(2) fully saturated heterocyclyl substituents include, but are not limited to, piperazinyl, piperidinyl, morpholinyl, pyrrolidinyl, tetrahydrofuranyl, and tetrahydropyranyl;

(3) partially or fully unsaturated heterocyclyl substituents include, but are not limited to, 4,5-dihydro-isoxazolyl, 4,5-dihydro-oxazolyl, 4,5-dihydro-1H-pyrazolyl, 2,3-dihydro-[1,3,4]-oxadiazolyl, and 1,2,3,4-tetrahydro-quinolinyl; and (4) Additional examples of heterocyclyls include the following:

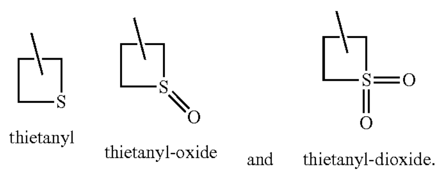

thietanyl thietanyl-oxide and thietanyl-dioxide.

The term "locus" means a habitat, breeding ground, plant, seed, soil, material, or environment, in which a pest is growing, may grow, or may traverse. For example, a locus may be: where crops, trees, fruits, cereals, fodder species, vines, turf, and/or ornamental plants, are growing; where domesticated animals are residing; the interior or exterior surfaces of buildings (such as places where grains are stored); the materials of construction used in buildings (such as impregnated wood); and the soil around buildings.

The phrase "MoA Material" means an active ingredient having a mode of action ("MoA") as indicated in IRAC MoA Classification v. 7.3, located at irac-online.org., which describes the following groups.

(1) Acetylcholinesterase (AChE) inhibitors, includes the following active ingredients alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion.

(2) GABA-gated chloride channel blockers, includes the following active ingredients chlordane, endosulfan, ethiprole, and fipronil.

(3) Sodium channel modulators, includes the following active ingredients acrinathrin, allethrin, d-cis-trans allethrin, d-trans allethrin, bifenthrin, bioallethrin, bioallethrin S-cyclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomers], deltamethrin, empenthrin [(EZ)-(1R)-isomers], esfenvalerate, etofenprox, fenpropathrin, fenvalerate, flucythrinate, flumethrin, tau-fluvalinate, halfenprox, imiprothrin, kadethrin, permethrin, phenothrin [(1R)-trans-isomer], prallethrin, pyrethrins (pyrethrum), resmethrin, silafluofen, tefluthrin, tetramethrin, tetramethrin [(1R)-isomers], tralomethrin, and transfluthrin, DDT, and methoxychlor.

(4) Nicotinic acetylcholine receptor (nAChR) competitive modulators, includes the following active ingredients (4A) acetamiprid, clothianidin, dinotefuran, imidacloprid, nitenpyram, thiacloprid, thiamethoxam, (4B) nicotine, (4C) sulfoxaflor, (4D) flupyradifurone, (4E) triflumezopyrim.

(5) Nicotinic acetylcholine receptor (nAChR) allosteric activators, includes the following active ingredients spinetoram and spinosad.

(6) Glutamate-gated chloride channel (GluCl) allosteric modulators, includes the following active ingredients abamectin, emamectin benzoate, lepimectin, and milbemectin.

(7) Juvenile hormone mimics, includes the following active ingredients hydroprene, kinoprene, methoprene, fenoxycarb, and pyriproxyfen.

(8) Miscellaneous nonspecific (multi-site) inhibitors, includes the following active ingredients methyl bromide, chloropicrin, cryolite (sodium aluminum fluoride), sulfuryl fluoride, borax, boric acid, disodium octaborate, sodium borate, sodium metaborate, tartar emetic, dazomet, metam.

(9) Modulators of Chordotonal Organs, includes the following active ingredients pymetrozine and pyrifluquinazon.

(10) Mite growth inhibitors, includes the following active ingredients clofentezine, hexythiazox, diflovidazin, and etoxazole.

(11) Microbial disruptors of insect midgut membranes, includes the following active ingredients *Bacillus thuringiensis* subsp. *israelensis, Bacillus thuringiensis* subsp. *aizawai, Bacillus thuringiensis* subsp. *kurstaki, Bacillus thuringiensis* subsp. *tenebrionenis*, Bt crop proteins (Cry1Ab, Cry1Ac, Cry1Fa, Cry1A.105, Cry2Ab, Vip3A, mCry3A, Cry3Ab, Cry3Bb, Cry34Ab1/Cry35Ab1), and *Bacillus sphaericus.*

(12) Inhibitors of mitochondrial ATP synthase, includes the following active ingredients tetradifon, propargite, azocyclotin, cyhexatin, fenbutatin oxide, and diafenthiuron.

(13) Uncouplers of oxidative phosphorylation via disruption of the proton gradient, includes the following active ingredients chlorfenapyr, DNOC, and sulfluramid.

(14) Nicotinic acetylcholine receptor (nAChR) channel blockers, includes the following active ingredients bensultap, cartap hydrochloride, thiocyclam, and thiosultap-sodium.

(15) Inhibitors of chitin biosynthesis, type 0, includes the following active ingredients bistrifluron, chlorfluazuron, diflubenzuron, flucycloxuron, flufenoxuron, hexaflumuron, lufenuron, novaluron, noviflumuron, teflubenzuron, and triflumuron.

(16) Inhibitors of chitin biosynthesis, type 1, includes the following active ingredient buprofezin.

(17) Moulting disruptor, Dipteran, includes the following active ingredient cyromazine.

(18) Ecdysone receptor agonists, includes the following active ingredients chromafenozide, halofenozide, methoxyfenozide, and tebufenozide.

(19) Octopamine receptor agonists, includes the following active ingredient amitraz.

(20) Mitochondrial complex III electron transport inhibitors, includes the following active ingredients hydramethylnon, acequinocyl, fluacrypyrim, and bifenazate.

(21) Mitochondrial complex I electron transport inhibitors, includes the following active ingredients fenazaquin, fenpyroximate, pyrimidifen, pyridaben, tebufenpyrad, tolfenpyrad, and rotenone.

(22) Voltage-dependent sodium channel blockers, includes the following active ingredients indoxacarb and metaflumizone.

(23) Inhibitors of acetyl CoA carboxylase, includes the following active ingredients spirodiclofen, spiromesifen, and spirotetramat.

(24) Mitochondrial complex IV electron transport inhibitors, includes the following active ingredients, aluminium phosphide, calcium phosphide, phosphine, zinc phosphide, calcium cyanide, potassium cyanide, and sodium cyanide.

(25) Mitochondrial complex II electron transport inhibitors, includes the following active ingredients cyenopyrafen, cyflumetofen, and pyflubumide.

(28) Ryanodine receptor modulators, includes the following active ingredients chlorantraniliprole, cyantraniliprole, and flubendiamide.

(29) Chordotonal organ modulators—undefined target site, includes the following active ingredients flonicamid.

Groups 26 and 27 are unassigned in this version of the classification scheme. Additionally, there is a Group UN that contains active ingredients of unknown or uncertain mode of action. This group includes the following active ingredients, azadirachtin, benzoximate, bromopropylate, chinomethionat, dicofol, GS-omega/kappa HXTX-Hv1a peptide, lime sulfur, pyridalyl, and pyrifluquinazon.

The term "pest" means an organism that is detrimental to humans, or human concerns (such as, crops, food, livestock, etc.), where said organism is from Phyla Arthropoda, Mollusca, or Nematoda. Particular examples are ants, aphids, bed bugs, beetles, bristletails, caterpillars, cockroaches, crickets, earwigs, fleas, flies, grasshoppers, grubs, hornets, killer bees, leafhoppers, lice, locusts, maggots, mites, moths, nematodes, planthoppers, psyllids, sawflies, scales, sea lice, silverfish, slugs, snails, spiders, springtails, stink bugs, symphylans, termites, *thrips*, ticks, wasps, whiteflies, and wireworms.

Additional examples are pests in (1) Subphyla Chelicerata, Myriapoda, Crustacea, and Hexapoda.

(2) Classes of Arachnida, Symphyla, Maxillopoda, and Insecta.

(3) Order Anoplura. A non-exhaustive list of particular genera includes, but is not limited to, *Haematopinus* spp., *Hoplopleura* spp., *Linognathus* spp., *Pediculus* spp., *Polyplax* spp., *Solenopotes* spp., and *Neohaematopinis* spp. A non-exhaustive list of particular species includes, but is not limited to, *Haematopinus asini, Haematopinus suis, Linognathus setosus, Linognathus ovillus, Pediculus humanus capitis, Pediculus humanus humanus*, and *Pthirus pubis.*

(4) Order Coleoptera. A non-exhaustive list of particular genera includes, but is not limited to, *Acanthoscelides* spp., *Agriotes* spp., *Anthonomus* spp., *Apion* spp., *Apogonia* spp., *Araecerus* spp., *Aulacophora* spp., *Bruchus* spp., *Cerosterna* spp., *Cerotoma* spp., *Ceutorhynchus* spp., *Chaetocnema* spp., *Colaspis* spp., *Ctenicera* spp., *Curculio* spp., *Cyclocephala* spp., *Diabrotica* spp., *Dinoderus* spp., *Gnathocerus* spp., *Hemicoelus* spp., *Heterobostruchus* spp., *Hypera* spp., *Ips* spp., *Lyctus* spp., *Megascelis* spp., *Meligethes* spp., *Mezium* spp., *Niptus* spp., *Otiorhynchus* spp., *Pantomorus* spp., *Phyllophaga* spp., *Phyllotreta* spp., *Ptinus* spp.,

*Rhizotrogus* spp., *Rhynchites* spp., *Rhynchophorus* spp., *Scolytus* spp., *Sphenophorus* spp., *Sitophilus* spp., *Tenebrio* spp., and *Tribolium* spp. A non-exhaustive list of particular species includes, but is not limited to, *Acanthoscelides obtectus, Agrilus planipennis, Ahasverus advena, Alphitobius diaperinus, Anoplophora glabripennis, Anthonomus grandis, Anthrenus verbasci, Anthrenus falvipes, Ataenius spretulus, Atomaria linearis, Attagenus unicolor, Bothynoderes punctiventris, Bruchus pisorum, Callosobruchus maculatus, Carpophilus hemipterus, Cassida vittata, Cathartus quadricollis, Cerotoma trifurcata, Ceutorhynchus assimilis, Ceutorhynchus napi, Conoderus scalaris, Conoderus stigmosus, Conotrachelus nenuphar, Cotinis nitida, Crioceris asparagi, Cryptolestes ferrugineus, Cryptolestes pusillus, Cryptolestes turcicus, Cylindrocopturus adspersus, Deporaus marginatus, Dermestes lardarius, Dermestes maculatus, Epilachna varivestis, Euvrilletta peltata, Faustinus cubae, Hylobius pales, Hylotrupes bajulus, Hypera postica, Hypothenemus hampei, Lasioderma serricorne, Leptinotarsa decemlineata, Limonius canus, Liogenys fuscus, Liogenys suturalis, Lissorhoptrus oryzophilus, Lophocateres pusillus, Lyctus planicollis, Maecolaspis joliveti, Melanotus communis, Meligethes aeneus, Melolontha melolontha, Necrobia rufipes, Oberea brevis, Oberea linearis, Oryctes rhinoceros, Oryzaephilus mercator, Oryzaephilus surinamensis, Oulema melanopus, Oulema oryzae, Phyllophaga cuyabana, Polycaon stoutti, Popillia japonica, Prostephanus truncatus, Rhyzopertha dominica, Sitona lineatus, Sitophilus granarius, Sitophilus oryzae, Sitophilus zeamais, Stegobium paniceum, Tenebroides mauritanicus, Tribolium castaneum, Tribolium confusum, Trogoderma granarium, Trogoderma variabile, Xestobium rufovillosum*, and *Zabrus tenebrioides*.

(5) Order Dermaptera. A non-exhaustive list of particular species includes, but is not limited to, *Forficula auricularia*.

(6) Order Blattaria. A non-exhaustive list of particular species includes, but is not limited to, *Blattella germanica, Blattella asahinai, Blatta orientalis, Blatta lateralis, Parcoblatta pennsylvanica, Periplaneta americana, Periplaneta australasiae, Periplaneta brunnea, Periplaneta fuliginosa, Pycnoscelus surinamensis*, and *Supella longipalpa*.

(7) Order Diptera. A non-exhaustive list of particular genera includes, but is not limited to, *Aedes* spp., *Agromyza* spp., *Anastrepha* spp., *Anopheles* spp., *Bactrocera* spp., *Ceratitis* spp., *Chrysops* spp., *Cochliomyia* spp., *Contarinia* spp., *Culex* spp., *Culicoides* spp., *Dasineura* spp., *Delia* spp., *Drosophila* spp., *Fannia* spp., *Hylemya* spp., *Liriomyza* spp., *Musca* spp., *Phorbia* spp., *Pollenia* spp., *Psychoda* spp., *Simulium* spp., *Tabanus* spp., and *Tipula* spp. A non-exhaustive list of particular species includes, but is not limited to, *Agromyza frontella, Anastrepha suspensa, Anastrepha ludens, Anastrepha obliqua, Bactrocera cucurbitae, Bactrocera dorsalis, Bactrocera invadens, Bactrocera zonata, Ceratitis capitata, Dasineura brassicae, Delia platura, Fannia canicularis, Fannia scalaris, Gasterophilus intestinalis, Gracillia perseae, Haematobia irritans, Hypoderma lineatum, Liriomyza brassicae, Melophagus ovinus, Musca autumnalis, Musca domestica, Oestrus ovis, Oscinella frit, Pegomya betae, Piophila casei, Psila rosae, Rhagoletis cerasi, Rhagoletis pomonella, Rhagoletis mendax, Sitodiplosis mosellana*, and *Stomoxys calcitrans*.

(8) Order Hemiptera. A non-exhaustive list of particular genera includes, but is not limited to, *Adelges* spp., *Aulacaspis* spp., *Aphrophora* spp., *Aphis* spp., *Bemisia* spp., *Ceroplastes* spp., *Chionaspis* spp., *Chrysomphalus* spp., *Coccus* spp., *Empoasca* spp., *Euschistus* spp., *Lepidosaphes* spp., *Lagynotomus* spp., *Lygus* spp., *Macrosiphum* spp., *Nephotettix* spp., *Nezara* spp., *Nilaparvata* spp., *Philaenus* spp., *Phytocoris* spp., *Piezodorus* spp., *Planococcus* spp., *Pseudococcus* spp., *Rhopalosiphum* spp., *Saissetia* spp., *Therioaphis* spp., *Toumeyella* spp., *Toxoptera* spp., *Trialeurodes* spp., *Triatoma* spp., and *Unaspis* spp. A non-exhaustive list of particular species includes, but is not limited to, *Acrosternum hilare, Acyrthosiphon pisum, Aleyrodes proletella, Aleurodicus dispersus, Aleurothrixus floccosus, Amrasca biguttula biguttula, Aonidiella aurantii, Aphis gossypii, Aphis glycines, Aphis pomi, Aulacorthum solani, Bactericera cockerelli, Bagrada hilaris, Bemisia argentifolii, Bemisia tabaci, Blissus leucopterus, Boisea trivittata, Brachycorynella asparagi, Brevennia rehi, Brevicoryne brassicae, Cacopsylla pyri, Cacopsylla pyricola, Calocoris norvegicus, Ceroplastes rubens, Cimex hemipterus, Cimex lectularius, Dagbertus fasciatus, Dichelops furcatus, Diuraphis noxia, Diaphorina citri, Dysaphis plantaginea, Dysdercus suturellus, Edessa meditabunda, Eriosoma lanigerum, Eurygaster maura, Euschistus conspersus, Euschistus heros, Euschistus servus, Halyomorpha halys, Helopeltis antonii, Helopeltis theivora, Icerya purchasi, Idioscopus nitidulus, Laodelphax striatellus, Leptocorisa oratorius, Leptocorisa varicornis, Lygus hesperus, Maconellicoccus hirsutus, Macrosiphum euphorbiae, Macrosiphum granarium, Macrosiphum rosae, Macrosteles quadrilineatus, Mahanarva frimbiolata, Megacopta cribraria, Metopolophium dirhodum, Mictis longicornis, Myzus persicae, Nephotettix cincticeps, Neurocolpus longirostris, Nezara viridula, Nilaparvata lugens, Parlatoria pergandii, Parlatoria ziziphi, Peregrinus maidis, Phylloxera vitifoliae, Physokermes piceae, Phytocoris californicus, Phytocoris relativus, Piezodorus guildinii, Poecilocapsus lineatus, Psallus vaccinicola, Pseudacysta perseae, Pseudococcus brevipes, Quadraspidiotus perniciosus, Rhopalosiphum maidis, Rhopalosiphum padi, Saissetia oleae, Scaptocoris castanea, Schizaphis graminum, Sitobion avenae, Sogatella furcifera, Trialeurodes vaporariorum, Trialeurodes abutiloneus, Unaspis yanonensis*, and *Zulia entrerriana*.

(9) Order Hymenoptera. A non-exhaustive list of particular genera includes, but is not limited to, *Acromyrmex* spp., *Atta* spp., *Camponotus* spp., *Diprion* spp., *Dolichovespula* spp., *Formica* spp., *Monomorium* spp., *Neodiprion* spp., *Paratrechina* spp., *Pheidole* spp., *Pogonomyrmex* spp., *Polistes* spp., *Solenopsis* spp., *Technomyrmex*, spp., *Tetramorium* spp., *Vespula* spp., *Vespa* spp., and *Xylocopa* spp. A non-exhaustive list of particular species includes, but is not limited to, *Athalia rosae, Atta texana, Caliroa cerasi, Cimbex americana, Iridomyrmex humilis, Linepithema humile, Mellifera Scutellata, Monomorium minimum, Monomorium pharaonis, Neodiprion sertifer, Solenopsis invicta, Solenopsis geminata, Solenopsis molesta, Solenopsis richtery, Solenopsis xyloni, Tapinoma sessile*, and *Wasmannia auropunctata*.

(10) Order Isoptera. A non-exhaustive list of particular genera includes, but is not limited to, *Coptotermes* spp., *Cornitermes* spp., *Cryptotermes* spp., *Heterotermes* spp., *Kalotermes* spp., *Incisitermes* spp., *Macrotermes* spp., *Marginitermes* spp., *Microcerotermes* spp., *Procornitermes* spp., *Reticulitermes* spp., *Schedorhinotermes* spp., and *Zootermopsis* spp. A non-exhaustive list of particular species includes, but is not limited to, *Coptotermes acinaciformis, Coptotermes curvignathus, Coptotermes frenchi, Coptotermes formosanus, Coptotermes gestroi, Cryptotermes brevis, Heterotermes aureus, Heterotermes tenuis, Incisitermes minor, Incisitermes snyderi, Microtermes obesi, Nasutitermes corniger, Odontotermes formosanus, Odontotermes obesus, Reticulitermes banyulensis, Reticulitermes grassei,*

*Reticulitermes flavipes, Reticulitermes hageni, Reticulitermes hesperus, Reticulitermes santonensis, Reticulitermes speratus, Reticulitermes tibialis*, and *Reticulitermes virginicus.*

(11) Order Lepidoptera. A non-exhaustive list of particular genera includes, but is not limited to, *Adoxophyes* spp., *Agrotis* spp., *Argyrotaenia* spp., *Cacoecia* spp., *Caloptilia* spp., *Chilo* spp., *Chrysodeixis* spp., *Colias* spp., *Crambus* spp., *Diaphania* spp., *Diatraea* spp., *Earias* spp., *Ephestia* spp., *Epimecis* spp., *Feltia* spp., *Gortyna* spp., *Helicoverpa* spp., *Heliothis* spp., *Indarbela* spp., *Lithocolletis* spp., *Loxagrotis* spp., *Malacosoma* spp., Nemapogon spp., *Peridroma* spp., *Phyllonorycter* spp., *Pseudaletia* spp., *Plutella* spp., *Sesamia* spp., *Spodoptera* spp., *Synanthedon* spp., and *Yponomeuta* spp. A non-exhaustive list of particular species includes, but is not limited to, *Achaea janata, Adoxophyes orana, Agrotis ipsilon, Alabama argillacea, Amorbia cuneana, Amyelois transitella, Anacamptodes defectaria, Anarsia lineatella, Anomis sabulifera, Anticarsia gemmatalis, Archips argyrospila, Archips rosana, Argyrotaenia citrana, Autographa gamma, Bonagota cranaodes, Borbo cinnara, Bucculatrix thurberiella, Capua reticulana, Carposina niponensis, Chlumetia transversa, Choristoneura rosaceana, Cnaphalocrocis medinalis, Conopomorpha cramerella, Corcyra cephalonica, Cossus cossus, Cydia caryana, Cydia funebrana, Cydia molesta, Cydia nigricana, Cydia pomonella, Darna diducta, Diaphania nitidalis, Diatraea saccharalis, Diatraea grandiosella, Earias insulana, Earias vittella, Ecdytolopha aurantianum, Elasmopalpus lignosellus, Ephestia cautella, Ephestia elutella, Ephestia kuehniella, Epinotia aporema, Epiphyas postvittana, Erionota thrax, Estigmene acrea, Eupoecilia ambiguella, Euxoa auxiliaris, Galleria mellonella, Grapholita molesta, Hedylepta indicata, Helicoverpa armigera, Helicoverpa zea, Heliothis virescens, Hellula undalis, Keiferia lycopersicella, Leucinodes orbonalis, Leucoptera coffeella, Leucoptera malifoliella, Lobesia botrana, Loxagrotis albicosta, Lymantria dispar, Lyonetia clerkella, Mahasena corbetti, Mamestra brassicae, Manduca sexta, Maruca testulalis, Metisa plana, Mythimna unipuncta, Neoleucinodes elegantalis, Nymphula depunctalis, Operophtera brumata, Ostrinia nubilalis, Oxydia vesulia, Pandemis cerasana, Pandemis heparana, Papilio demodocus, Pectinophora gossypiella, Peridroma saucia, Perileucoptera coffeella, Phthorimaea operculella, Phyllocnistis citrella, Phyllonorycter blancardella, Pieris rapae, Plathypena scabra, Platynota idaeusalis, Plodia interpunctella, Plutella xylostella, Polychrosis viteana, Prays endocarpa, Prays oeae, Pseudaletia unipuncta, Pseudoplusia includens, Rachiplusia nu, Scirpophaga incertulas, Sesamia inferens, Sesamia nonagrioides, Setora nitens, Sitotroga cerealella, Sparganothis pilleriana, Spodoptera exigua, Spodoptera frugiperda, Spodoptera eridania, Thecla basilides, Tinea pellionella, Tineola bisselliella, Trichoplusia ni, Tuta absoluta, Zeuzera coffeae*, and *Zeuzea pyrina.*

(12) Order Mallophaga. A non-exhaustive list of particular genera includes, but is not limited to, *Anaticola* spp., *Bovicola* spp., *Chelopistes* spp., *Goniodes* spp., *Menacanthus* spp., and *Trichodectes* spp. A non-exhaustive list of particular species includes, but is not limited to, *Bovicola bovis, Bovicola caprae, Bovicola ovis, Chelopistes meleagridis, Goniodes dissimilis, Goniodes gigas, Menacanthus stramineus, Menopon gallinae*, and *Trichodectes canis.*

(13) Order Orthoptera. A non-exhaustive list of particular genera includes, but is not limited to, *Melanoplus* spp. and *Pterophylla* spp. A non-exhaustive list of particular species includes, but is not limited to, *Acheta domesticus, Anabrus simplex, Gryllotalpa africana, Gryllotalpa australis, Gryllotalpa brachyptera, Gryllotalpa hexadactyla, Locusta migratoria, Microcentrum retinerve, Schistocerca gregaria*, and *Scudderia furcata.*

(14) Order Psocoptera. A non-exhaustive list of particular species includes, but is not limited to, *Liposcelis decolor, Liposcelis entomophila, Lachesilla quercus*, and *Trogium pulsatorium.*

(15) Order Siphonaptera. A non-exhaustive list of particular species includes, but is not limited to, *Ceratophyllus gallinae, Ceratophyllus niger, Ctenocephalides canis, Ctenocephalides felis*, and *Pulex irritans.*

(16) Order Siphonostomatoida. A non-exhaustive list of particular species includes, but is not limited to, *Lepeophtheirus salmonis, Lepeophtheirus pectoralis, Caligus elongatus*, and *Caligus clemensi.*

(17) Order Thysanoptera. A non-exhaustive list of particular genera includes, but is not limited to, *Caliothrips* spp., *Frankliniella* spp., *Scirtothrips* spp., and *Thrips* spp. A non-exhaustive list of particular species includes, but is not limited to, *Frankliniella bispinosa, Frankliniella fusca, Frankliniella occidentalis, Frankliniella schultzei, Frankliniella tritici, Frankliniella williamsi, Heliothrips haemorrhoidalis, Rhipiphorothrips cruentatus, Scirtothrips citri, Scirtothrips dorsalis, Taeniothrips rhopalantennalis, Thrips hawaiiensis, Thrips nigropilosus, Thrips orientalis, Thrips palmi*, and *Thrips tabaci.*

(18) Order Thysanura. A non-exhaustive list of particular genera includes, but is not limited to, *Lepisma* spp. and *Thermobia* spp.

(19) Order Acarina. A non-exhaustive list of particular genera includes, but is not limited to, *Acarus* spp., *Aculops* spp., *Argus* spp., *Boophilus* spp., *Demodex* spp., *Dermacentor* spp., *Epitrimerus* spp., *Eriophyes* spp., *Ixodes* spp., *Oligonychus* spp., *Panonychus* spp., *Rhizoglyphus* spp., and *Tetranychus* spp. A non-exhaustive list of particular species includes, but is not limited to, *Acarapis woodi, Acarus siro, Aceria mangiferae, Aculops lycopersici, Aculus pelekassi, Aculus schlechtendali, Amblyomma americanum, Brevipalpus obovatus, Brevipalpus phoenicis, Dermacentor variabilis, Dermatophagoides pteronyssinus, Eotetranychus carpini, Liponyssoides sanguineus, Notoedres cati, Oligonychus coffeae, Oligonychus ilicis, Ornithonyssus bacoti, Panonychus citri, Panonychus ulmi, Phyllocoptruta oleivora, Polyphagotarsonemus latus, Rhipicephalus sanguineus, Sarcoptes scabiei, Tegolophus perseaflorae, Tetranychus urticae, Tyrophagus longior*, and *Varroa destructor.*

(20) Order Araneae. A non-exhaustive list of particular genera includes, but is not limited to, *Loxosceles* spp., *Latrodectus* spp., and *Atrax* spp. A non-exhaustive list of particular species includes, but is not limited to, *Loxosceles reclusa, Latrodectus mactans*, and *Atrax robustus.*

(21) Class Symphyla. A non-exhaustive list of particular species includes, but is not limited to, *Scutigerella immaculata.*

(22) Subclass Collembola. A non-exhaustive list of particular species includes, but is not limited to, *Bourletiella hortensis, Onychiurus armatus, Onychiurus fimetarius*, and *Sminthurus viridis.*

(23) Phylum Nematoda. A non-exhaustive list of particular genera includes, but is not limited to, *Aphelenchoides* spp., *Belonolaimus* spp., *Criconemella* spp., *Ditylenchus* spp., *Globodera* spp., *Heterodera* spp., *Hirschmanniella* spp., *Hoplolaimus* spp., *Meloidogyne* spp., *Pratylenchus* spp., and *Radopholus* spp. A non-exhaustive list of particular species includes, but is not limited to, *Dirofilaria immitis,*

*Globodera pallida, Heterodera glycines, Heterodera zeae, Meloidogyne incognita, Meloidogyne javanica, Onchocerca volvulus, Pratylenchus penetrans, Radopholus similis, and Rotylenchulus reniformis.*

(24) Phylum Mollusca. A non-exhaustive list of particular species includes, but is not limited to, *Arion vulgaris, Cornu aspersum, Deroceras reticulatum, Limax flavus, Milax gagates*, and *Pomacea canaliculata.*

A particularly preferred pest group to control is sap-feeding pests. Sap-feeding pests, in general, have piercing and/or sucking mouthparts and feed on the sap and inner plant tissues of plants. Examples of sap-feeding pests of particular concern to agriculture include, but are not limited to, aphids, leafhoppers, moths, scales, *thrips*, psyllids, mealybugs, stinkbugs, and whiteflies. Specific examples of Orders that have sap-feeding pests of concern in agriculture include but are not limited to, Anoplura and Hemiptera. Specific examples of Hemiptera that are of concern in agriculture include, but are not limited to, *Aulacaspis* spp., *Aphrophora* spp., *Aphis* spp., *Bemisia* spp., *Coccus* spp., *Euschistus* spp., *Lygus* spp., *Macrosiphum* spp., *Nezara* spp., and *Rhopalosiphum* spp.

Another particularly preferred pest group to control is chewing pests. Chewing pests, in general, have mouthparts that allow them to chew on the plant tissue including roots, stems, leaves, buds, and reproductive tissues (including, but not limited to flowers, fruit, and seeds). Examples of chewing pests of particular concern to agricultural include, but are not limited to, caterpillars, beetles, grasshoppers, and locusts. Specific examples of Orders that have chewing pests of concern in agriculture include but are not limited to, Coleoptera and Lepidoptera. Specific examples of Coleoptera that are of concern in agriculture include, but are not limited to, *Anthonomus* spp., *Cerotoma* spp., *Chaetocnema* spp., *Colaspis* spp., *Cyclocephala* spp., *Diabrotica* spp., *Hypera* spp., *Phyllophaga* spp., *Phyllotreta* spp., *Sphenophorus* spp., *Sitophilus* spp.

The phrase "pesticidally effective amount" means the amount of a pesticide needed to achieve an observable effect on a pest, for example, the effects of necrosis, death, retardation, prevention, removal, destruction, or otherwise diminishing the occurrence and/or activity of a pest in a locus. This effect may come about when pest populations are repulsed from a locus, pests are incapacitated in, or around, a locus, and/or pests are exterminated in, or around, a locus. Of course, a combination of these effects can occur. Generally, pest populations, activity, or both are desirably reduced more than fifty percent, preferably more than 90 percent, and most preferably more than 99 percent. In general, a pesticidally effective amount, for agricultural purposes, is from about 0.0001 grams per hectare to about 5000 grams per hectare, preferably from about 0.0001 grams per hectare to about 500 grams per hectare, and it is even more preferably from about 0.0001 grams per hectare to about 50 grams per hectare.

DETAILED DESCRIPTION OF THIS DISCLOSURE

This document discloses molecules of Formula One

Formula One

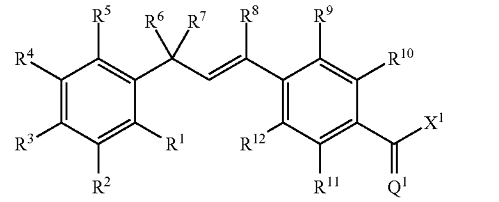

wherein:

(A) $R^1$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O—$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl and $(C_1-C_6)$haloalkyl;

(B) $R^2$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O—$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(C) $R^3$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O—$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(D) $R^4$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O—$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(E) $R^5$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O—$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl and $(C_1-C_6)$haloalkyl;

(F) $R^6$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy;

(G) $R^7$ is $(C_1-C_6)$haloalkyl;

(H) $R^8$ is F;

(I) $R^9$ is selected from the group consisting of (O), H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O—$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(J) $R^{10}$ is selected from the group consisting of (O), F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O—$(C_1-C_6)$alkyl, $(C_2-C_6)$alkynyl, $(C_3-C_6)$cycloalkyl, C(=O)H, $SR^x$, $SOR^x$, $SO_2R^x$, wherein $R^x$ is selected from the group consisting of ($C_1$-$C_6$)alkyl, ($C_1$-$C_6$)haloalkyl, and ($C_3$-$C_6$)cycloalkyl;

(K) $R^{11}$ is selected from the group consisting of H, F, Cl, Br, I, CN, $NO_2$, ($C_1$-$C_6$)alkyl, ($C_1$-$C_6$)haloalkyl, ($C_1$-$C_6$) alkoxy, ($C_1$-$C_6$)haloalkoxy, ($C_2$-$C_6$)alkenyl, ($C_2$-$C_6$)alkenyl-O—($C_1$-$C_6$)alkyl, ($C_2$-$C_6$)alkynyl, ($C_3$-$C_6$)cycloalkyl, C(=O)H, $SR^x$, $SOR^x$, $SO_2R^x$, wherein $R^x$ is selected from the group consisting of ($C_1$-$C_6$)alkyl, ($C_1$-$C_6$)haloalkyl, and ($C_3$-$C_6$)cycloalkyl;

(L) $R^{12}$ is selected from the group consisting of H, F, Cl, Br, I, CN, $NO_2$, ($C_1$-$C_6$)alkyl, ($C_1$-$C_6$)haloalkyl, ($C_1$-$C_6$) alkoxy, ($C_1$-$C_6$)haloalkoxy, ($C_2$-$C_6$)alkenyl, ($C_2$-$C_6$)alkenyl-O—($C_1$-$C_6$)alkyl, ($C_2$-$C_6$)alkynyl, ($C_3$-$C_6$)cycloalkyl, C(=O)H, $SR^x$, $SOR^x$, $SO_2R^x$, wherein $R^x$ is selected from the group consisting of ($C_1$-$C_6$)alkyl, ($C_1$-$C_6$)haloalkyl, and ($C_3$-$C_6$)cycloalkyl;

(M) $Q^1$ is selected from the group consisting of O and S;

(N) $X^1$ is selected from (1), (2), (3), and (4)

(1) $N(R^{13})N(R^{14})(R^{15})$ wherein (a) said $R^{13}$ is selected from the group consisting of H, ($C_1$-$C_6$)alkyl, ($C_1$-$C_6$)alkyl nitrile, ($C_1$-$C_6$)alkylC(=O)N(H)(($C_1$-$C_6$)alkyl), ($C_1$-$C_6$)alkylC(=O)N(H)(($C_1$-$C_6$)haloalkyl), ($C_1$-$C_6$)alkyl-O—($C_1$-$C_6$)alkyl, ($C_1$-$C_6$)alkyl($C_3$-$C_6$)cycloalkyl, ($C_2$-$C_6$)alkenyl, ($C_2$-$C_6$)alkynyl, ($C_1$-$C_6$)haloalkyl, ($C_1$-$C_6$)alkoxy, ($C_1$-$C_6$)haloalkoxy, ($C_3$-$C_6$)cycloalkyl, phenyl, heterocyclyl, substituted phenyl, and substituted heterocyclyl, wherein said substituted phenyl and substituted heterocyclyl are substituted with one or more substituents independently selected from the group consisting of F, Cl, Br, CN, $NO_2$, $NH_2$, OH, ($C_1$-$C_6$) alkyl, ($C_1$-$C_6$)haloalkyl, ($C_3$-$C_6$)cycloalkyl, ($C_1$-$C_6$) alkoxy, ($C_1$-$C_6$)haloalkoxy, C(=O)O($C_1$-$C_6$)alkyl, oxo, C(=O)NH($C_1$-$C_6$)alkyl, C(=O)NH($C_1$-$C_6$)haloalkyl, S($C_1$-$C_6$)alkyl, $S(O)_2$($C_1$-$C_6$)alkyl, S(O)($C_1$-$C_6$)alkyl, and N(($C_1$-$C_6$)alkyl$)_2$, (b) said $R^{14}$ is selected from the group consisting of H, ($C_1$-$C_6$)alkyl, ($C_1$-$C_6$)alkyl nitrile, ($C_1$-$C_6$)alkylC(=O)N(H)(($C_1$-$C_6$)alkyl), ($C_1$-$C_6$)alkylC(=O)N(H)(($C_1$-$C_6$)haloalkyl), ($C_1$-$C_6$)alkyl-O—($C_1$-$C_6$)alkyl, ($C_1$-$C_6$)alkyl($C_3$-$C_6$)cycloalkyl, ($C_2$-$C_6$)alkenyl, ($C_2$-$C_6$)alkynyl, ($C_1$-$C_6$)haloalkyl, ($C_1$-$C_6$)alkoxy, ($C_1$-$C_6$)haloalkoxy, ($C_3$-$C_6$)cycloalkyl, phenyl, heterocyclyl, substituted phenyl, and substituted heterocyclyl, wherein said substituted phenyl and substituted heterocyclyl are substituted with one or more substituents independently selected from the group consisting of F, Cl, Br, CN, $NO_2$, $NH_2$, OH, ($C_1$-$C_6$) alkyl, ($C_1$-$C_6$)haloalkyl, ($C_3$-$C_6$)cycloalkyl, ($C_1$-$C_6$) alkoxy, ($C_1$-$C_6$)haloalkoxy, C(=O)O($C_1$-$C_6$)alkyl, oxo, C(=O)NH($C_1$-$C_6$)alkyl, C(=O)NH($C_1$-$C_6$)haloalkyl, S($C_1$-$C_6$)alkyl, $S(O)_2$($C_1$-$C_6$)alkyl, S(O)($C_1$-$C_6$)alkyl, and N(($C_1$-$C_6$)alkyl$)_2$, (c) said $R^{15}$ is selected from the group consisting of (i) H, ($C_1$-$C_6$)alkyl, ($C_1$-$C_6$)haloalkyl, ($C_1$-$C_6$)alkyl nitrile, ($C_2$-$C_6$)alkenyl, ($C_2$-$C_6$)alkynyl, ($C_1$-$C_6$) alkoxy, ($C_1$-$C_6$)haloalkoxy, wherein each of which may be substituted with, F, Cl, Br, I, CN, $NO_2$, $NH_2$, OH, ($C_1$-$C_6$)haloalkyl, ($C_3$-$C_6$)cycloalkyl, O($C_1$-$C_6$)alkyl, O($C_1$-$C_6$)haloalkyl, C(=O)O($C_1$-$C_6$)alkyl, S($C_1$-$C_6$)alkyl, $S(O)_2$($C_1$-$C_6$)alkyl, S(O)($C_1$-$C_6$)alkyl, and N(($C_1$-$C_6$)alkyl$)_2$, (ii) ($C_1$-$C_6$)alkyl($C_3$-$C_6$)cycloalkyl, ($C_1$-$C_6$)alkylphenyl, ($C_3$-$C_6$)cycloalkyl, phenyl, and heterocyclyl, wherein each of which may be substituted with, H to saturate an unsaturation, F, Cl, Br, I, CN, $NO_2$, $NH_2$, OH, ($C_1$-$C_6$)alkyl, ($C_1$-$C_6$)haloalkyl, O($C_1$-$C_6$)alkyl, O($C_1$-$C_6$)haloalkyl, C(=O)O($C_1$-$C_6$)alkyl, oxo, SO($C_1$-$C_6$)alkyl, $S(O)_2$($C_1$-$C_6$)alkyl, S(O)($C_1$-$C_6$)alkyl, and N(($C_1$-$C_6$)alkyl$)_2$;

(2) $N(R^{16})N{=}C(R^{17})(R^{18})$ wherein $R^{16}$ and $R^{17}$ are H, $R^{18}$ is a selected from the group consisting of substituted or unsubstituted phenyl, and substituted or unsubstituted heterocyclyl, wherein said substituents on said substituted phenyl and substituted heterocyclyl are selected from the group consisting of wherein each of which may be substituted with, H to saturate an unsaturation, F, Cl, Br, I, CN, $NO_2$, $NH_2$, OH, ($C_1$-$C_6$)alkyl, ($C_1$-$C_6$)haloalkyl, O($C_1$-$C_6$)alkyl, C(=O)O O($C_1$-$C_6$) alkyl, oxo, SO($C_1$-$C_6$)alkyl, $S(O)_2$($C_1$-$C_6$)alkyl, S(O)($C_1$-$C_6$)alkyl, and N(($C_1$-$C_6$)alkyl$)_z$;

(3) $N{=}N(R^{19})$ wherein said $R^{19}$ is selected from the group consisting substituted or unsubstituted phenyl, and substituted or unsubstituted heterocyclyl, wherein said substituents on said substituted phenyl and substituted heterocyclyl are selected from the group consisting of wherein each of which may be substituted with, H to saturate an unsaturation, F, Cl, Br, I, CN, $NO_2$, $NH_2$, OH, ($C_1$-$C_6$)alkyl, ($C_1$-$C_6$)haloalkyl, O($C_1$-$C_6$) alkyl, C(=O)O O($C_1$-$C_6$)alkyl, oxo, SO($C_1$-$C_6$)alkyl, $S(O)_2$($C_1$-$C_6$)alkyl, S(O)($C_1$-$C_6$)alkyl, and N(($C_1$-$C_6$) alkyl$)_z$, (4) N(H)—$R^{20}$ wherein $R^{20}$ is a heterocyclyl containing at least one nitrogen atom, wherein said nitrogen atom is bonded to N(H)—, wherein said heterocyclyl may be substituted with, H to saturate an unsaturation, F, Cl, Br, I, CN, $NO_2$, $NH_2$, OH, ($C_1$-$C_6$)alkyl, ($C_1$-$C_6$)haloalkyl, O($C_1$-$C_6$)alkyl, C(=O)O O($C_1$-$C_6$)alkyl, oxo, SO($C_1$-$C_6$)alkyl, $S(O)_2$($C_1$-$C_6$)alkyl, S(O)($C_1$-$C_6$) alkyl, and N(($C_1$-$C_6$)alkyl$)_2$;

(O) $R^9$ and $R^{10}$ together can optionally form a 3- to 5-membered saturated or unsaturated, hydrocarbyl link, wherein said hydrocarbyl link may optionally be substituted with one or more substituents independently selected from the group consisting of F, Cl, Br, I, CN, OH, and oxo;

and N-oxides, pro-insecticides, agriculturally acceptable acid addition salts, salt derivatives, solvates, ester derivatives, crystal polymorphs, isotopes, resolved stereoisomers, and tautomers, of the molecules of Formula One with the proviso that the following molecules are excluded

EM-1

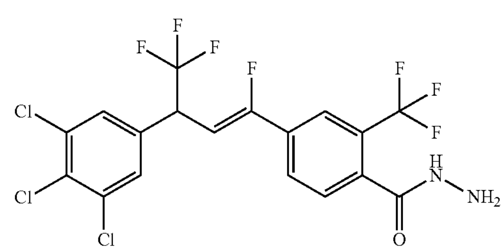

-continued

EM-2

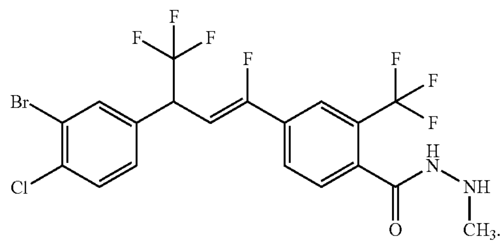

In another embodiment $R^1$ is H.

In another embodiment $R^2$ is selected from the group consisting of H, F, Cl, Br, CH═$CH_2$, $CF_3$, C(═O)H, and cyclopropyl.

In another embodiment $R^3$ is selected from the group consisting of H, F, Cl, Br, C($OCH_2CH_3$)═$CH_2$, $CF_3$, and $OCF_3$.

In another embodiment $R^4$ is selected from the group consisting of H, F, Cl, Br, CH═$CH_2$, $CF_3$, C(═O)H, and cyclopropyl.

In another embodiment $R^5$ is H.

In another embodiment $R^1$ and $R^5$ are H, and $R^2$, $R^3$, and $R^4$, are Cl.

In another embodiment $R^6$ is H.

In another embodiment $R^7$ is $CF_3$.

In another embodiment $R^9$ is H.

In another embodiment $R^{10}$ is selected from the group consisting of Cl, Br, $CH_3$, and $CF_3$.

In another embodiment $R^{10}$ is $CF_3$.

In another embodiment $R^{11}$ is H.

In another embodiment $R^{12}$ is H.

In another embodiment $R^1$, $R^5$, $R^{11}$, $R^{12}$ are H, $R^2$, $R^3$, and $R^4$, are Cl, and $R^{10}$ is $CF_3$.

In another embodiment $Q^1$ is O.

In another embodiment $X^1$ is $N(R^{13})N(R^{14})(R^{15})$.

In another embodiment $R^{13}$ is selected from the group consisting of H, $CH(CH_3)_2$, $CH_2$cyclopropyl, $CH_2C$(═O)N(H)$CH_2CF_3$, propargyl, cyclopropyl, thiazolyl, and pyridazinyl, wherein said thiazolyl, and pyridazinyl, may be optionally substituted with one or more substituents independently selected from the group consisting of CN, Cl, $CH_3$, cyclopropyl, and $CH_2C$(═O)NH($C_1$-$C_6$)haloalkyl.

In another embodiment $R^{13}$ is H.

In another embodiment $R^{14}$ is selected from the group consisting of H, $CH_3$, $CH_2CH_3$, propargyl, $CH_2CH$═$CH_2$, $CH(CH_3)_2$, $CH_2OCH_3$, and $CH_2CN$.

In another embodiment $R^{14}$ is selected from the group consisting of H and $CH_3$.

In another embodiment $R^{15}$ is selected from the group consisting of H, ($C_1$-$C_6$)alkyl, $CH_2$cyclopropyl, $CH_2$phenyl, ($C_1$-$C_6$)alkylN(($C_1$-$C_6$)alkyl)$_2$, ($C_1$-$C_6$)haloalkyl, ($C_3$-$C_6$)cycloalkyl, phenyl, pyrimidinyl, pyridinyl, 1,3,5-triazinyl, thienyl, tetrahydropyrimidinyl, pyridazinyl, pyrazinyl, tetrazolyl, imidazolyl, tetrahydrothiophenyl, thiazolyl, wherein said ($C_3$-$C_6$)cycloalkyl, phenyl, pyrimidinyl, pyridinyl, 1,3,5-triazinyl, thienyl, tetrahydropyrimidinyl, pyridazinyl, pyrazinyl, tetrazolyl, imidazolyl, tetrahydrothiophenyl, and thiazolyl, may be substituted with one or more substituents selected from the group consisting of F, Cl, Br, $NO_2$, CN, OH, $NH_2$, ($C_1$-$C_2$)haloalkyl, S($C_1$-$C_2$)alkyl, O($C_1$-$C_2$)alkyl, C(═O)O($C_1$-$C_2$)alkyl, S(O), S(O)$_2$, S(O)($C_1$-$C_2$)alkyl, and S(O)$_2$($C_1$-$C_2$)alkyl.

In another embodiment $R^{15}$ is selected from the group consisting of pyrimidin-2-yl, pyrimidin-4-yl, pyridin-2-yl, 1,3,5-triazin-2-yl, 3-thienyl, pyridin-4-yl, 1,4,5,6-tetrahydropyrimidin-2-yl, pyrimidin-5-yl, pyridazin-4-yl, pyridazin-3-yl, pyrazin-2-yl, 1H-tetrazol-5-yl, 4,5-dihydro-1H-imidazol-2-yl, pyridin-3-yl, 1,1-dioxidotetrahydrothiophen-3-yl, thiazol-2-yl, wherein said each heterocyclyl may be substituted with one or more substituents selected from the group consisting of F, Cl, Br, $NO_2$, CN, OH, $NH_2$, ($C_1$-$C_2$)haloalkyl, S($C_1$-$C_2$)alkyl, O($C_1$-$C_2$)alkyl, C(═O)O($C_1$-$C_2$)alkyl, S(O), S(O)$_2$, S(O)($C_1$-$C_2$)alkyl, and S(O)$_2$($C_1$-$C_2$)alkyl.

In another embodiment (A) $R^1$ is H;

(B) $R^2$ is selected from the group consisting of H, F, Cl, Br, ($C_1$-$C_2$)haloalkyl, ($C_1$-$C_2$)haloalkoxy, C(═O)H, ($C_2$-$C_3$)alkenyl, and ($C_3$-$C_4$)cycloalkyl;

(C) $R^3$ is selected from the group consisting of H, F, Cl, Br, ($C_1$-$C_2$)haloalkyl, ($C_1$-$C_2$)haloalkoxy, and ($C_2$-$C_3$)alkenyl-O—($C_1$-$C_2$)alkyl;

(D) $R^4$ is selected from the group consisting of H, F, Cl, Br, ($C_1$-$C_2$)haloalkyl, ($C_1$-$C_2$)haloalkoxy, C(═O)H, ($C_2$-$C_3$)alkenyl, and ($C_3$-$C_4$)cycloalkyl;

(E) $R^5$ is H;

(F) $R^6$ is H;

(G) $R^7$ is ($C_1$-$C_2$)haloalkyl;

(H) $R^8$ is F;

(I) $R^9$ is H;

(J) $R^{10}$ is selected from the group consisting of Cl, Br, ($C_1$-$C_2$)haloalkyl, and ($C_1$-$C_2$)alkyl;

(K) $R^{11}$ is H;

(L) $R^{12}$ is H;

(M) $Q^1$ is O; and (N) $X^1$ is selected from (1) $N(R^{13})N(R^{14})(R^{15})$ wherein (a) said $R^{13}$ is selected from the group consisting of H, ($C_1$-$C_3$)alkyl, ($C_1$-$C_3$)alkyl nitrile, ($C_1$-$C_3$)alkylC(═O)N(H)(($C_1$-$C_3$)haloalkyl), ($C_2$-$C_4$)alkenyl, ($C_1$-$C_3$)alkyl-O—($C_1$-$C_3$)alkyl, $CH_2$($C_3$-$C_4$)cycloalkyl, ($C_3$-$C_4$)cycloalkyl, ($C_3$-$C_4$)alkynyl, phenyl, heterocyclyl, substituted phenyl, and substituted heterocyclyl, wherein said substituents are selected from the group consisting of F, Cl, Br, CN, $NO_2$, $NH_2$, OH, $CH_3$, $CH_2CH_3$, $CF_3$, $OCH_3$, C(═O)$OCH_3$, oxo, $SCH_3$, S(O)$_2CH_3$, S(O)$CH_3$, and N($CH_3$)$_2$, (b) said $R^{14}$ is selected from the group consisting of H, ($C_1$-$C_3$)alkyl, ($C_1$-$C_3$)alkyl nitrile, ($C_1$-$C_3$)alkylC(═O)N(H)(($C_1$-$C_3$)haloalkyl), ($C_2$-$C_4$)alkenyl, ($C_1$-$C_3$)alkyl-O—($C_1$-$C_3$)alkyl, $CH_2$($C_3$-$C_4$)cycloalkyl, ($C_3$-$C_4$)cycloalkyl, ($C_3$-$C_4$)alkynyl, phenyl, heterocyclyl, substituted phenyl, and substituted heterocyclyl, wherein said substituents are selected from the group consisting of F, Cl, Br, CN, $NO_2$, $NH_2$, OH, $CH_3$, $CH_2CH_3$, $CF_3$, $OCH_3$, C(═O)$OCH_3$, oxo, $SCH_3$, S(O)$_2CH_3$, S(O)$CH_3$, and N($CH_3$)$_2$, (c) said $R^{15}$ is selected from the group consisting of (i) H, ($C_1$-$C_6$)alkyl, ($C_1$-$C_6$)haloalkyl, ($C_1$-$C_6$)alkyl nitrile, wherein each of which may be substituted with, F, Cl, Br, CN, $NO_2$, $NH_2$, OH, $CF_3$, $OCH_3$, C(═O)$OCH_3$, $SCH_3$, $S(O)_2CH_3$, S(O)$CH_3$, and $N(CH_3)_2$, (ii) $CH_2$-cyclopropyl, $CH_2$-phenyl, cyclohexyl, cyclopentyl, imidazolyl phenyl, pyrazinyl, pyridazinyl, pyridinyl, pyrimidinyl, tetrahydrothiophenyl, tetrazolyl, thiazolyl, thienyl, and 1,3,5-triazinyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, C(═O)$OCH_3$, oxo, $SCH_3$, $S(O)_2CH_3$, S(O)$CH_3$, and $N(CH_3)_2$, (2) N(H)N═C(H)($R^{18}$) wherein $R^{18}$ is phenyl or a heterocyclyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, C(═O)$OCH_3$, oxo, $SCH_3$, $S(O)_2CH_3$, S(O)$CH_3$, and $N(CH_3)_2$, (3) N═N($R^{19}$) wherein said $R^{19}$ is phenyl or a heterocyclyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, C(═O)$OCH_3$, oxo, $SCH_3$, $S(O)_2CH_3$, S(O)$CH_3$, and $N(CH_3)_2$, (4) N(H)—$R^{20}$ wherein $R^{20}$ is selected from the group consisting of indolyl, imidazolyl, pyrrolyl, thiomorpholino, and triazolyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, C(═O)$OCH_3$, oxo, $SCH_3$, $S(O)_2CH_3$, S(O)$CH_3$, and $N(CH_3)_2$;

In another embodiment (A) $R^1$ is H;

(B) $R^2$ is selected from the group consisting of H, F, Cl, Br, $CF_3$, $CHF_2$, $OCF_3$, C(═O)H, C═$CH_2$, and cyclopropyl;

(C) $R^3$ is selected from the group consisting of H, F, Cl, Br, $CF_3$, $OCF_3$, and C($OCH_2CH_3$)(═$CH_2$);

(D) $R^4$ is selected from the group consisting of H, F, Cl, Br, $CF_3$, $CHF_2$, $OCF_3$, C(═O)H, C═$CH_2$, and cyclopropyl;

(E) $R^5$ is H;

(F) $R^6$ is H;

(G) $R^7$ is $CF_3$;

(H) $R^8$ is F;

(I) $R^9$ is H;

(J) $R^{10}$ is selected from the group consisting of Cl, Br, $CF_3$, and $CH_3$;

(K) $R^{11}$ is H;

(L) $R^{12}$ is H;

(M) $Q^1$ is O; and (N) $X^1$ is selected from (1) N($R^{13}$)N($R^{14}$)($R^{15}$) wherein (a) said $R^{13}$ is selected from the group consisting of H, $CH_3$, $CH_2CH_3$, $CH(CH_3)_2$, $CH_2CN$, $CH_2C$(═O)N(H)($CH_2CF_3$), $CH_2CH$═$CH_2$, $CH_2$—O—$CH_3$, $CH_2$cyclopropyl, cyclopropyl, propargyl, dichloropyridazinyl, and methylthiazolyl, (b) said $R^{14}$ is selected from the group consisting of H, $CH_3$, $CH_2CH_3$, $CH(CH_3)_2$, $CH_2CN$, $CH_2C$(═O)N(H)($CH_2CF_3$), $CH_2CH$═$CH_2$, $CH_2$—O—$CH_3$, $CH_2$cyclopropyl, cyclopropyl, propargyl, dichloropyridazinyl, and methylthiazolyl, (c) said $R^{15}$ is selected from the group consisting of (i) H, $CH_3$, $CH_2CH_2$, $C(CH_3)_3$, $CH_2C(CH_3)_3$, $CH_2CH_2CH(CH_3)_2$, $CH_2CH(CH_3)_2$, $CH_2CF_3$, $CH_2CH_2CH_2CF_3$, $CH_2CH_2CN$, wherein each of which may be substituted with, F, Cl, Br, CN, $NO_2$, $NH_2$, OH, $CF_3$, $OCH_3$, C(═O)$OCH_3$, $SCH_3$, $S(O)_2CH_3$, S(O)$CH_3$, and $N(CH_3)_2$, (ii) $CH_2$-cyclopropyl, $CH_2$-phenyl, cyclohexyl, cyclopentyl, imidazolyl phenyl, pyrazinyl, pyridazinyl, pyridinyl, pyrimidinyl, tetrahydrothiophenyl, tetrazolyl, thiazolyl, thienyl, and 1,3,5-triazinyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, C(═O)$OCH_3$, oxo, $SCH_3$, $S(O)_2CH_3$, S(O)$CH_3$, and $N(CH_3)_2$, (2) N(H)N═C(H)($R^{18}$) wherein $R^{18}$ is phenyl or a heterocyclyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, C(═O)$OCH_3$, oxo, $SCH_3$, $S(O)_2CH_3$, S(O)$CH_3$, and $N(CH_3)_2$, (3) N═N($R^{19}$) wherein said $R^{19}$ is phenyl or a heterocyclyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, C(═O)$OCH_3$, oxo, $SCH_3$, $S(O)_2CH_3$, S(O)$CH_3$, and $N(CH_3)_2$, (4) N(H)—$R^{20}$ wherein $R^{20}$ is selected from the group consisting of indolyl, imidazolyl, pyrrolyl, thiomorpholino, and triazolyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, C(═O)$OCH_3$, oxo, $SCH_3$, $S(O)_2CH_3$, S(O)$CH_3$, and $N(CH_3)_2$.

Molecules of Formula One may exist as one or more stereoisomers. Thus, certain molecules may be produced as racemic mixtures. Certain molecules disclosed in this document can exist as two or more isomers. The various isomers include geometric isomers, diastereomers, and enantiomers. It will be appreciated by those skilled in the art that one stereoisomer may be more active than the other stereoisomers. Individual stereoisomers may be obtained by known selective synthetic procedures, by conventional synthetic procedures using resolved starting materials, or by conventional resolution procedures. There may be double bonds present in the molecule, in which case compounds of Formula One may exist as single geometric isomers (cis or trans, E or Z), or mixtures of geometric isomers (cis and trans, E and Z). Centers of tautomerisation may be present. This disclosure covers all such isomers, tautomers, and mixtures thereof, in all proportions. The structures disclosed in the present disclosure are drawn in only one geometric and tautomeric form for clarity, but are intended to represent all geometric and tautomeric forms of the molecule. One example of different geometric and tautomeric forms is the following group of tautomers and their geometric isomers.

Tautomer Table

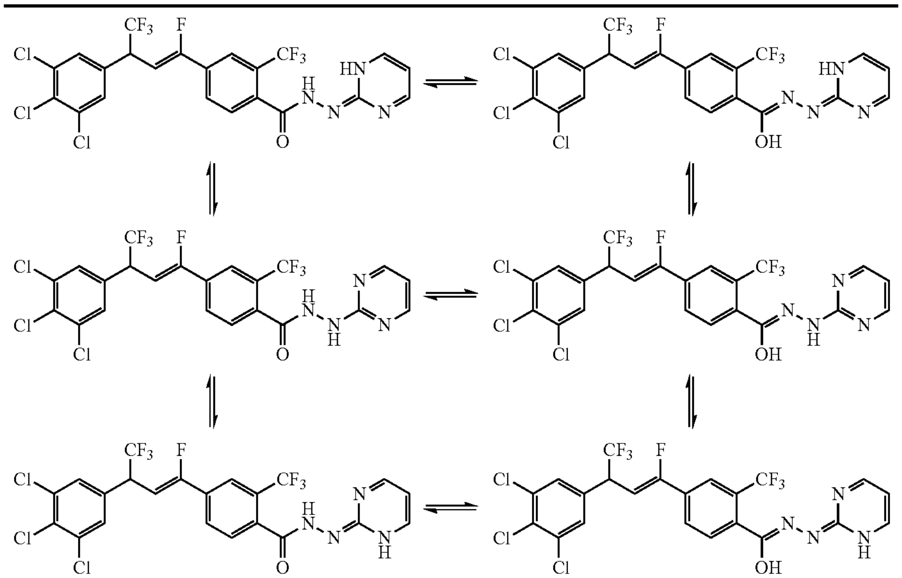

Preparation of Benzyl Halides

Benzyl alcohol 1-3, wherein $R^1$, $R^2$, $R^3$, $R^4$, $R^5$, $R^6$, and $R^7$ are as previously disclosed, may be prepared in several ways. Ketones 1-1 may be prepared by treating bromobenzenes with a lithium base such as n-butyllithium or a Grignard such as isopropyl magnesium chloride-lithium chloride complex in a polar, aprotic solvent preferably diethyl ether or tetrahydrofuran at temperatures from about −78° C. to about 0° C. followed by treatment with esters $R^7C(O)O(C_1\text{-}C_4)$alkyl, wherein $R^7$ is as previously disclosed, such as ethyl 2,2-difluoropropanoate (not shown). Treatment of ketones 1-1, wherein $R^1$, $R^2$, $R^3$, $R^4$, $R^5$, and $R^7$ are as previously disclosed, with a reducing agent such as sodium borohydride in a polar, protic solvent preferably methanol at about −10° C. to about 10° C. may provide benzyl alcohols 1-3 (Scheme 1, step a). Alternatively, aldehydes 1-2, wherein $R^6$ is H and $R^1$, $R^2$, $R^3$, $R^4$, and $R^5$ are as previously disclosed, may be allowed to react with trifluorotrimethylsilane in the presence of a catalytic amount of tetrabutylammonium fluoride or lithium acetate in a polar, aprotic solvent preferably tetrahydrofuran (Scheme 1, step b), then treated with an acid such as hydrochloric or glacial acetic acid to provide benzyl alcohols 1-3, wherein $R^7$ is $CF_3$. Subsequently, benzyl alcohols 1-3 may be converted into benzyl halides 1-4, wherein E is Br, Cl, or I, and $R^1$, $R^2$, $R^3$, $R^4$, $R^5$, $R^6$, and $R^7$ are as previously disclosed, by treatment with a halogenating reagent, such as N-bromosuccinimide, and triethylphosphite in a solvent that does not react with the reagents preferably dichloromethane at about 40° C. to provide benzyl halides 1-4, where E is Br (Scheme 1, step c). Alternatively, benzyl alcohols 1-3 may be converted into benzyl halides 1-4, where E is Br by treatment with a sulfonyl chloride such as methanesulfonyl chloride in the presence of a base such as triethylamine and subsequent treatment of the resultant sulfonate with a transition metal bromide such as iron(III) bromide. Additionally, treatment with chlorinating reagents such as thionyl chloride in the presence of a base such as pyridine in a hydrocarbon solvent such as toluene at about 110° C. may provide benzyl halides 1-4, where E is $C_1$ (Scheme 1, step c).

Scheme 1

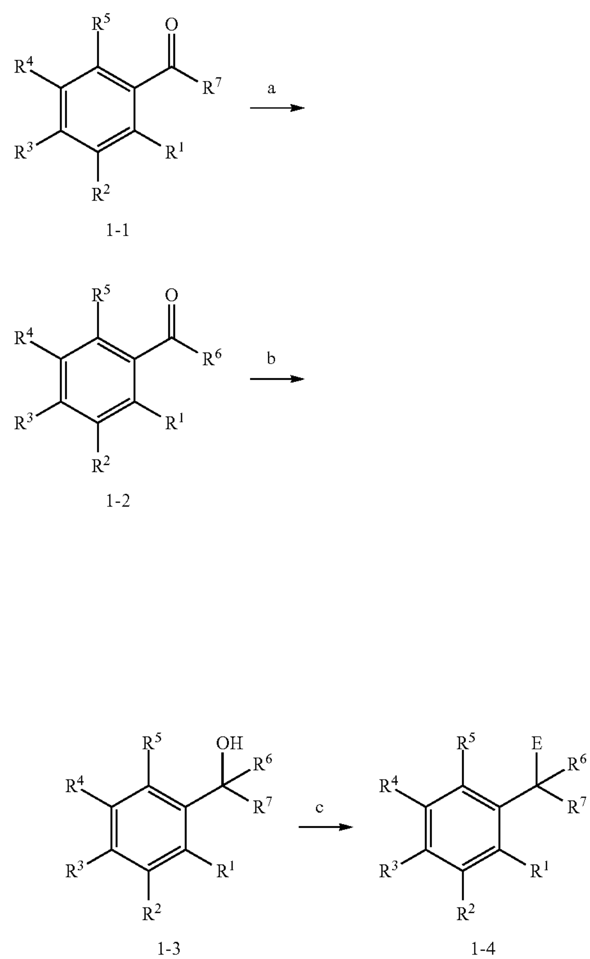

Preparation of Fluorinated Vinylbenzoic Esters and Acids

Halobenzoic acids 2-1, wherein $R^9$, $R^{10}$, $R^{11}$, and $R^{12}$ are as previously disclosed may be converted to halobenzoic acid esters 2-2, wherein $R^9$, $R^{10}$, $R^{11}$, and $R^{12}$ are as previously disclosed. Halobenzoic acids 2-1, may be treated with an acid, such as sulfuric acid, in the presence of a ($C_1$-$C_8$)alcohol such as ethanol, to provide halobenzoic acid ethyl esters 2-2 (Scheme 2, step a). Fluorinated vinylbenzoic acid esters 2-3 may be accessed via reaction of 2-2 with a fluorinated vinyl silane in the presence of a palladium catalyst such as tetrakis(triphenylphospine)palladium(0), a copper additive such as copper(I) iodide, and a fluoride source, such as cesium fluoride in a polar, aprotic solvent preferably 1,3-dimethyl-2-imidazolidinone at temperatures ranging from about ambient temperature to about 45° C., to provide fluorinated vinyl benzoic acid esters 2-3 (Scheme 2, step b). Fluorinated vinyl benzoic acid esters 2-3 may be treated with a metal hydroxide source such as lithium hydroxide in a mixed solvent system comprising a polar, aprotic solvent preferably tetrahydrofuran and polar, protic solvents preferably methanol and water at about ambient temperature to provide fluorinated vinyl benzoic acids 2-4 (Scheme 2, step c).

Scheme 2

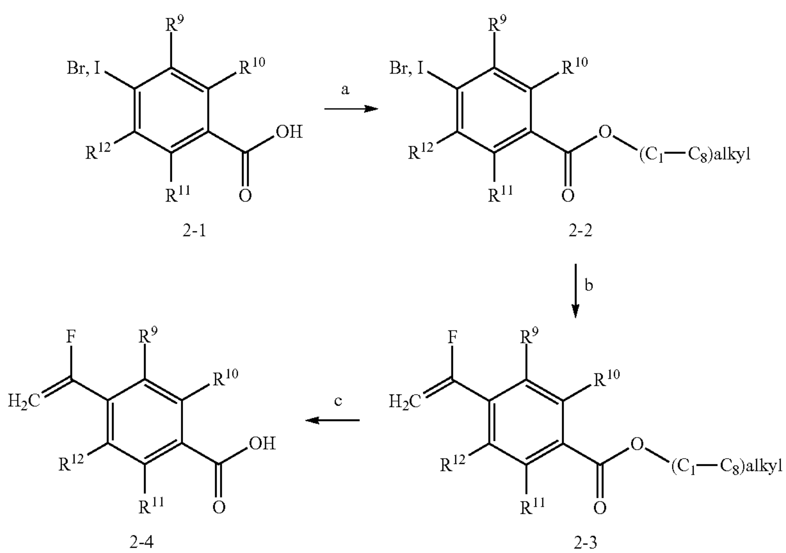

Alternatively, halobenzoic acids 2-1 may be directly treated with a vinyl borane source such as vinyltrifluoroborate or 3-hydroxy-2,3-dimethylbutan-2-yl hydrogen vinylboronate in the presence of a palladium catalyst such as 1,1'-bis(diphenylphosphino)ferrocene palladium(II) dichloride, and a base such as potassium carbonate, in a polar, aprotic solvent preferably dimethylsulfoxide at temperatures ranging from about 80° C. to about 140° C., to provide vinyl benzoic acids 3-1, wherein $R^9$, $R^{10}$, $R^{11}$, and $R^{12}$ are as previously disclosed (Scheme 3, step a). Vinyl benzoic acids 3-1 may be treated with bromine source such as N-bromosuccinimide, and a fluorine source such as triethylamine trihydrofluoride, in a polar, aprotic solvent preferably dichloromethane at about 0° C., to provide bromofluoroalkyl benzoic acids 3-2, wherein $R^9$, $R^{10}$, $R^{11}$, and $R^{12}$ are as previously disclosed (Scheme 3, step b). Bromofluoroalkyl benzoic acids 3-2 may be treated with a base such as potassium tert-butoxide, in a polar, protic solvent preferably methanol, at temperatures ranging from about 0° C. to about ambient temperature, to provide fluorinated vinyl benzoic acids 2-4 (Scheme 3, step c).

Scheme 3

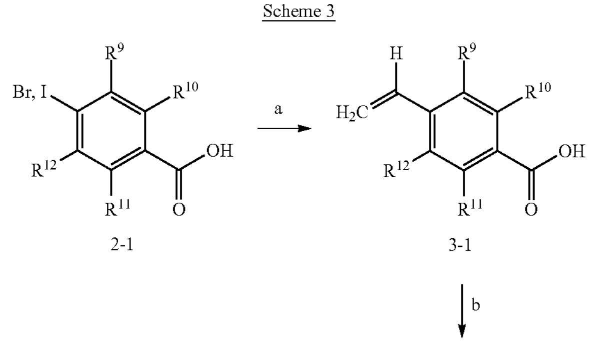

-continued

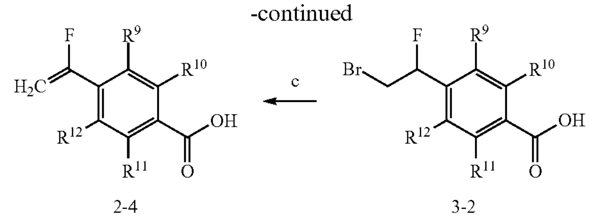

Preparation of Fluorinated Phenyl Allylbenzoic Acids

Benzyl halides 1-4 and fluorinated vinylbenzoic acids 2-4 may be treated with a copper(I) source such as copper(I) chloride or copper(I) bromide and a pyridine ligand such as 2,2-bipyridyl in a polar, aprotic solvent preferably N-methyl-2-pyrrolidone, at a temperature between about 100° C. to about 180° C. to provide fluorinated phenyl allylbenzoic acids 4-1, wherein $R^1$, $R^2$, $R^3$, $R^4$, $R^5$, $R^6$, $R^7$, $R^9$, $R^{10}$, $R^{11}$, and $R^{12}$ are as previously disclosed (Scheme 4, step a).

Scheme 4

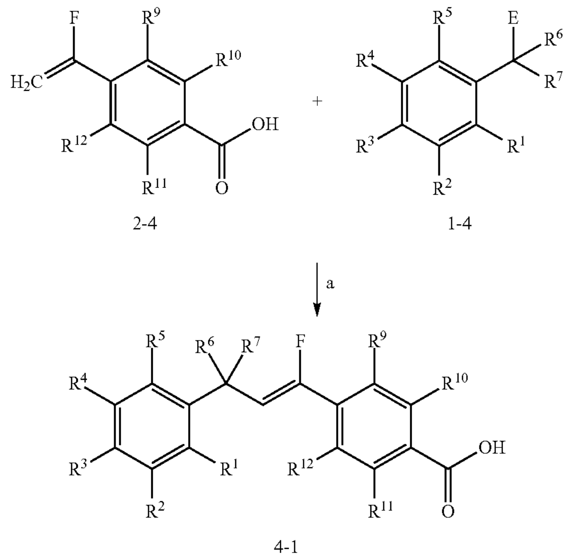

Preparation of Fluorinated Phenyl Allylbenzohydrazides

Fluorinated phenyl allylbenzohydrazides 5-3, wherein $X^1$ is $N(R^{13})N(R^{14})(R^{15})$, $Q^1$ is O, $R^1$, $R^2$, $R^3$, $R^4$, $R^5$, $R^6$, $R^7$, $R^9$, $R^{10}$, $R^{11}$, $R^{12}$, $R^{13}$, $R^{14}$, and $R^{15}$ are as previously disclosed may be prepared by treatment with hydrazines or hydrazine salts 5-2, wherein $R^{13}$, $R^{14}$, $R^{15}$ are as previously disclosed, and activated carboxylic acids 5-1, wherein A is an activating group, and $R^1$, $R^2$, $R^3$, $R^4$, $R^5$, $R^6$, $R^7$, $R^9$, $R^{10}$, $R^{11}$, and $R^{12}$ are as previously disclosed, with a base such as triethylamine, diisopropylethylamine, pyridine, or 4-methylmorpholine in an aprotic solvent such as acetonitrile, dichloromethane, chloroform, N,N-dimethylformamide, or any combination thereof, at temperatures between about 0° C. and about 120° C. (Scheme 5, step a).

Scheme 5

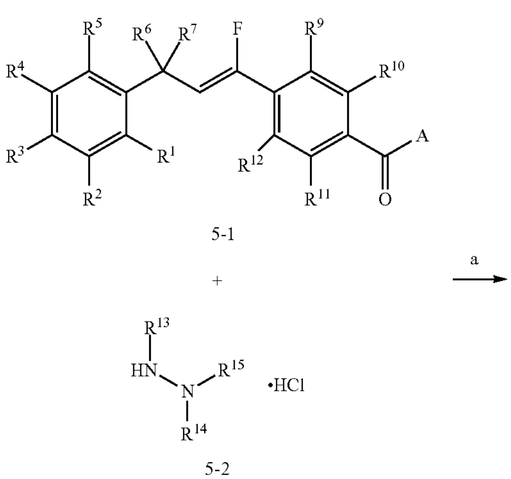

-continued

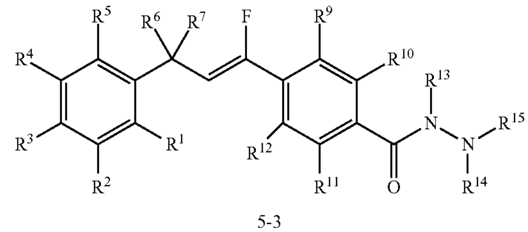

Activated carboxylic acids 5-1 may be an acid halide such as an acid chloride, an acid bromide, or an acid fluoride; a carboxylic ester such as a para-nitrophenyl ester, a pentafluorophenyl ester, an ethyl (hydroxyiminio)cyanoacetate ester, a methyl ester, an ethyl ester, a benzyl ester, an N-hydroxysuccinimidyl ester, a hydroxybenzotriazol-1-yl ester, or a hydroxypyridyltriazol-1-yl ester; an O-acylisourea; an acid anhydride; or a thioester. Acid chlorides may be prepared from the corresponding carboxylic acids by treatment with a dehydrating, chlorinating reagent such as oxalyl chloride or thionyl chloride. Activated carboxylic acids 5-1 may be prepared from carboxylic acids in situ with a uronium salt such as 1-[bis(dimethylamino)methylene]-1H-1,2,3-triazolo[4,5-b]pyridinium 3-oxid hexafluorophosphate (HATU), O-(benzotriazol-1-yl)-N,N,N',N'-tetramethyluronium hexafluorophosphate (HBTU), or (1-cyano-2-ethoxy-2-oxoethylidenaminooxy)dimethylamino-morpholino-carbenium hexafluorophosphate (COMU). Activated carboxylic acids 5-1 may also be prepared from carboxylic acids in situ with a phosphonium salt such as benzotriazol-1-yl-oxytripyrrolidinophosphonium hexafluorophosphate (PyBop). Activated carboxylic acids 5-1 may also be prepared from carboxylic acids in situ with a coupling reagent such as 1-(3-dimethylamino propyl)-3-ethylcarbodiimide, or dicyclohexylcarbodiimide in the presence of a triazole such as hydroxybenzotriazole-monohydrate (HOBt) or 1-hydroxy-7-azabenzotriazole (HOAt). O-Acylisoureas may be prepared with a dehydrating carbodimide such as 1-[3-(dimethylamino)propyl]-3-ethylcarbodiimide or dicyclohexylcarbodiimide. Activated carboxylic acids 5-1 may also be prepared from carboxylic acids in situ with a coupling reagent such as 2-chloro-1,3-dimethylimidazolidinium hexafluorophosphate (CIP) in the presence of a triazole such as 1-hydroxy-7-azabenzotriazole (HOAt).

Fluorinated phenyl allylbenzohydrazides or salts thereof 6-1, wherein $R^{13}$, $R^{14}$, and $R^{15}$ are H, $Q^1$ is O, $R^1$, $R^2$, $R^3$, $R^4$, $R^5$, $R^6$, $R^7$, $R^9$, $R^{10}$, $R^{11}$, and $R^{12}$ are as previously disclosed may be treated with an aldehyde in the presence of a reducing agent such as sodium cyanoborohydride in a polar, protic solvent such as methanol at ambient temperature to provide fluorinated phenyl allylbenzohydrazides 5-3, wherein $X^1$ is $N(R^{13})N(R^{14})(R^{15})$, $Q^1$ is O, $R^1$, $R^2$, $R^3$, $R^4$, $R^5$, $R^6$, $R^7$, $R^9$, $R^{10}$, $R^{11}$, $R^{12}$, $R^{13}$, $R^{14}$, and $R^{15}$ are as previously disclosed (Scheme 6, step a).

Scheme 6

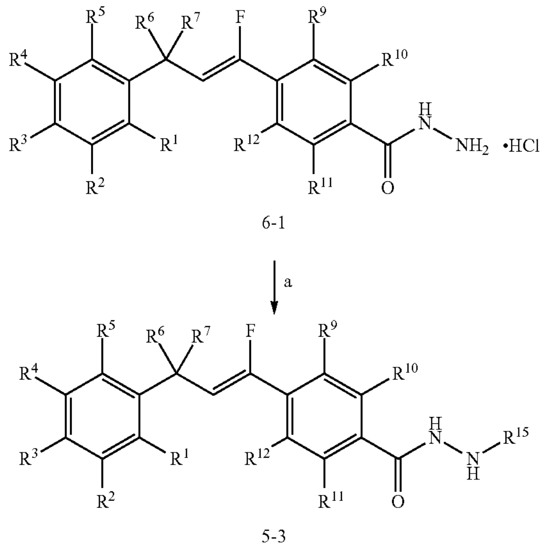

Alternatively, fluorinated phenyl allylbenzohydrazides 5-3, wherein $X^1$ is $N(R^{13})N(R^{14})(R^{15})$, $Q^1$ is O, $R^1$, $R^2$, $R^3$, $R^4$, $R^5$, $R^6$, $R^7$, $R^9$, $R^{10}$, $R^{11}$, $R^{12}$, $R^{13}$, $R^{14}$, and $R^{15}$ are as previously disclosed, may be generated via nucleophilic aromatic substitution of an aromatic halide such as 2-chlorothiazole by fluorinated phenyl allylbenzohydrazides or salts thereof 7-1, wherein $R^{13}$ and $R^{15}$ are H, $R^{14}$ is methyl, $Q^1$ is O, $R^1$, $R^2$, $R^3$, $R^4$, $R^5$, $R^6$, $R^7$, $R^9$, $R^{10}$, $R^{11}$, and $R^{12}$ are as previously disclosed, in the presence of a base such as diisopropylethylamine and a polar, protic solvent such as ethanol at a temperature of about 80 to about 100° C. (Scheme 7, step a).

Scheme 7

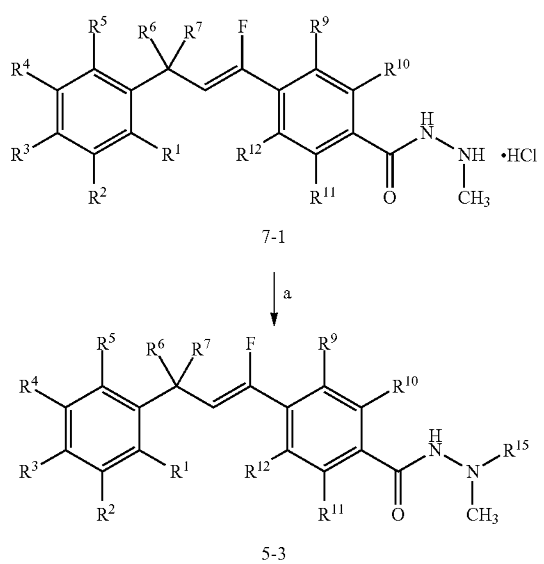

Fluorinated phenyl allylbenzohydrazides 5-3, wherein $X^1$ is $N(R^{13})N(R^{14})(R^{15})$, $Q^1$, $R^1$, $R^2$, $R^3$, $R^4$, $R^5$, $R^6$, $R^7$, $R^9$, $R^{10}$, $R^{11}$, $R^{12}$, $R^{13}$, $R^{14}$, and $R^{15}$ are as previously disclosed may be exposed to ultraviolet irradiation in deuterated or non-deuterated polar, aprotic solvents such as acetone or dimethyl sulfoxide to provide (E)-fluorinated phenyl allylbenzoic amides 8-1, wherein $X^1$ is $N(R^{13})N(R^{14})(R^{15})$, $Q^1$, $R^1$, $R^2$, $R^3$, $R^4$, $R^5$, $R^6$, $R^7$, $R^9$, $R^{10}$, $R^{11}$, $R^{12}$, $R^{13}$, $R^{14}$, and $R^{15}$ are as previously disclosed (Scheme 8, step a).

Scheme 8

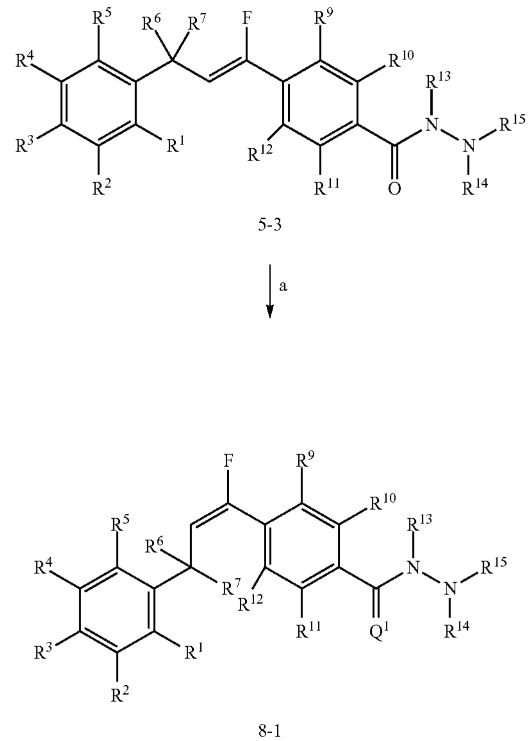

Fluorinated phenyl allylbenzohydrazides 9-1, wherein $X^1$ is $N(R^{16})N{=}C(R^{17})(R^{18})$, $Q^1$ is O, $R^1$, $R^2$, $R^3$, $R^4$, $R^5$, $R^6$, $R^7$, $R^9$, $R^{10}$, $R^{11}$, $R^{12}$ are as previously disclosed may be prepared by treatment of fluorinated phenyl allylbenzohydrazides or salts thereof 6-1, wherein $R^{13}$, $R^{14}$, and $R^{15}$ are H, $Q^1$ is O, $R^1$, $R^2$, $R^3$, $R^4$, $R^5$, $R^6$, $R^7$, $R^9$, $R^{10}$, $R^{11}$, and $R^{12}$ are as previously disclosed with an aldehyde in the presence of a base such as diisopropylethylamine in a polar, aprotic solvent such as dichloromethane at a temperature from ambient temperature to about 55° C. under pressure (Scheme 9, step a).

Scheme 9

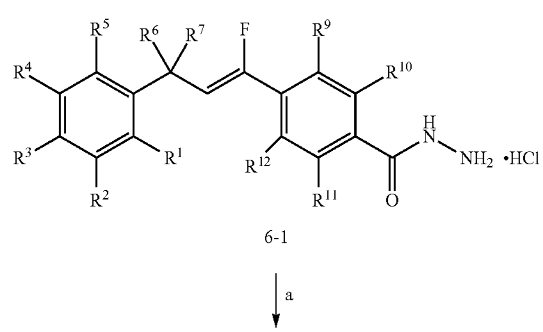

-continued

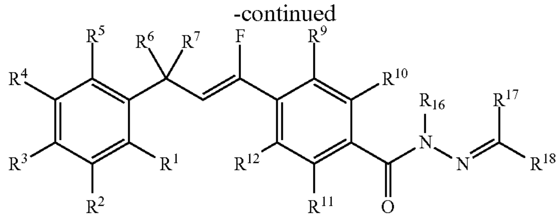

9-1

Fluorinated phenyl allylbenzohydrazides 10-1, wherein $X^1$ is N═N($R^{19}$), $Q^1$ is O, $R^1$, $R^2$, $R^3$, $R^4$, $R^5$, $R^6$, $R^7$, $R^9$, $R^{10}$, $R^{11}$, $R^{12}$ are as previously disclosed may be prepared by treatment of fluorinated phenyl allylbenzohydrazides or salts thereof 5-3, wherein $X^1$ is N($R^{13}$)N($R^{14}$)($R^{15}$), $Q^1$ is O, $R^1$, $R^2$, $R^3$, $R^4$, $R^5$, $R^6$, $R^7$, $R^9$, $R^{10}$, $R^{11}$, and $R^{12}$ are as previously disclosed with an oxidizing agent such as N-bromosuccinimide in the presence of a base such as pyridine in a polar, aprotic solvent such as dichloromethane at a temperature of about 0° C. (Scheme 10, step a).

Scheme 10

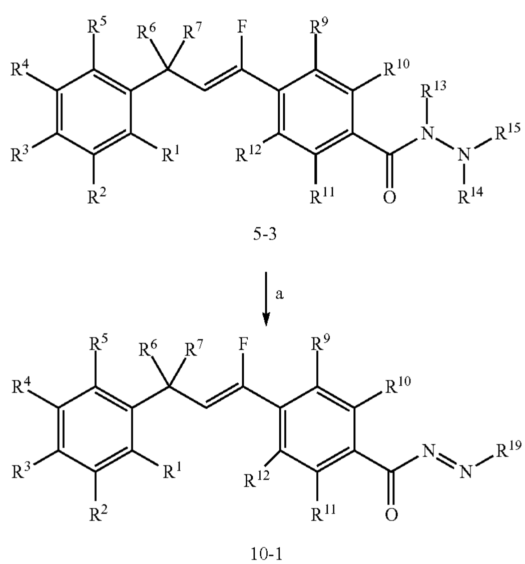

Preparation of Hydrazines

Hydrazine salts 5-2 may be generated in situ from the corresponding N-tert-butoxycarbonyl hydrazines by treatment with an acid such as hydrogen chloride. Optionally, the hydrazine salts 5-2 may be neutralized in the presence of a base such as sodium bicarbonate or triethylamine prior to reaction with activated carboxylic acids 5-1 or in situ during reaction with activated carboxylic acids 5-1 to provide fluorinated phenyl allylbenzohydrazides 5-3.

Hydrazines or protected hydrazines 5-2, wherein $R^{13}$, $R^{14}$, $R^{15}$ are as previously disclosed, may be generated via nucleophilic aromatic substitution of an aromatic halide such as 2-chloropyrimidine or 2-fluoropyridine with a hydrazine or protected hydrazine such as methylhydrazine or tert-butyl N-(ethylamino)carbamate, respectively, in the presence of a base such as cesium carbonate or diisopropylethylamine in a polar, aprotic solvent such as 1,4-dioxane, tetrahydrofuran, or N,N-dimethylformamide at a temperature from about 60 to about 100° C. Alternatively, hydrazines or protected hydrazines 5-2 may be generated via alkylation with alkyl halides such as bromoprop-1-yne or chloro(methoxymethane) with a hydrazine or protected hydrazine such as 2-(1-methylhydrazinyl)pyrimidine or protected hydrazine such as tert-butyl 2-(pyrimidin-2-yl)hydrazine-1-carboxylate or 2-(pyrimidin-2-ylamino)isoindoline-1,3-dione, respectively, in the presence of a base such as sodium hydride or potassium in a polar, aprotic solvent such as tetrahydrofuran, and/or N,N-dimethylformamide at a temperature from about 0° C. to about 100° C.

EXAMPLES

These examples are for illustration purposes and are not to be construed as limiting this disclosure to only the embodiments disclosed in these examples.

Starting materials, reagents, and solvents that were obtained from commercial sources were used without further purification. Anhydrous solvents were purchased as Sure/Seal™ from Aldrich and were used as received. Melting points were obtained on a Thomas Hoover Unimelt capillary melting point apparatus or an OptiMelt Automated Melting Point System from Stanford Research Systems and are uncorrected. Examples using "room temperature" were conducted in climate controlled laboratories with temperatures ranging from about 20° C. to about 24° C. Molecules are given their known names, named according to naming programs within ISIS Draw, ChemDraw, or ACD Name Pro. If such programs are unable to name a molecule, such molecule is named using conventional naming rules. $^1$H NMR spectral data are in ppm (δ) and were recorded at 300, 400, 500, or 600 MHz; $^{13}$C NMR spectral data are in ppm (δ) and were recorded at 75, 100, or 150 MHz; and $^{19}$F NMR spectral data are in ppm (δ) and were recorded at 376 MHz, unless otherwise stated.

Example 1: Preparation of (Z)-2-bromo-4-(1,4,4,4-tetrafluoro-3-(3,4,5-trichlorophenyl)but-1-en-1-yl) benzoic Acid (C1)

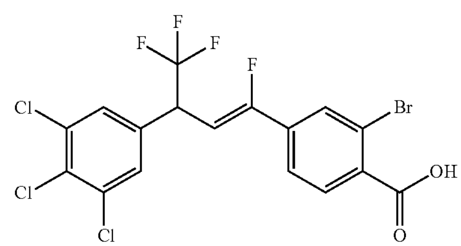

To a 25 mL round-bottomed flask were added 2,2'-bipyridine (0.255 g, 1.63 mmol), 2-bromo-4-(1-fluorovinyl) benzoic acid (C34) (1.00 g, 4.08 mmol), and 5-(1-bromo-2,2,2-trifluoroethyl)-1,2,3-trichlorobenzene (2.79 g, 8.16 mmol) in N-methylpyrrolidone (2.0 mL) to give a yellow solution. Copper(I) bromide (0.117 g, 0.816 mmol) was added and the reaction mixture was purged with nitrogen for 5 minutes. The reaction was then heated to 150° C. for 3 hours. The reaction mixture was poured into ice water (100 mL). The water was filtered and the resultant black gum was dissolved in ethyl acetate (800 mL), washed with brine (2×200 mL), and water (2×200 mL), dried over magnesium sulfate, filtered, and concentrated to provide the title compound as a brown oil (1.40 g, 64%): $^1$H NMR (400 MHz, $CDCl_3$) δ 8.03 (d, J=8.2 Hz, 1H), 7.89 (d, J=1.8 Hz, 1H), 7.59 (dd, J=8.3, 1.8 Hz, 1H), 7.43 (s, 2H), 5.83 (dd, J=32.4, 9.6 Hz, 1H), 4.60 (p, J=8.8 Hz, 1H); $^{19}$F NMR (376 MHz, $CDCl_3$) δ −69.32 (d, J=2.3 Hz), −108.70-119.01 (m); ESIMS m/z 505 ([M−H]$^-$).

The following compounds were prepared in like manner to the procedure outlined in Example 1:

(Z)-4-(1,4,4,4-Tetrafluoro-3-(3,4,5-trichlorophenyl)but-1-en-1-yl)-2-(trifluoromethyl)benzoic Acid (C2)

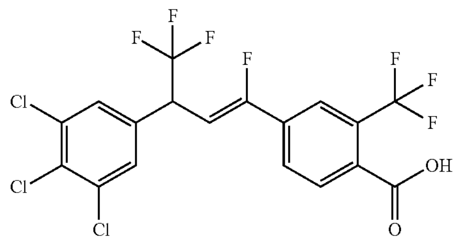

Isolated as a yellow oil (7.6 g, 68%): $^1$H NMR (400 MHz, $CDCl_3$) δ 8.04 (d, J=8.2 Hz, 1H), 7.99-7.94 (m, 1H), 7.84 (dd, J=8.2, 1.8 Hz, 1H), 7.44 (s, 2H), 5.90 (dd, J=32.4, 9.6 Hz, 1H), 4.62 (p, J=8.9 Hz, 1H); $^{19}$F NMR (376 MHz, $CDCl_3$) δ −59.60, −69.28 (d, J=2.3 Hz), −112.11; ESIMS m/z 493 ([M−H]$^-$).

(Z)-4-(3-(3,5-Dichloro-4-fluorophenyl)-1,4,4,4-tetrafluorobut-1-en-1-yl)-2-(trifluoromethyl)benzoic Acid (C3)

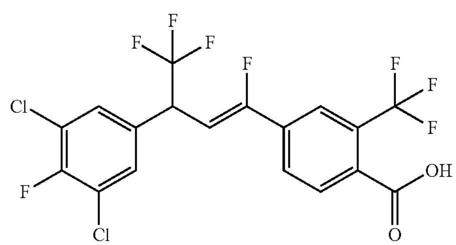

Isolated as a brown gum (1.20 g, 54%): $^1$H NMR (300 MHz, $CDCl_3$) δ 7.88 (s, 2H), 7.76-7.75 (m, 1H), 7.37 (d, J=6.0 Hz, 2H), 5.90 (dd, J=32.1, 9.0 Hz, 1H), 4.62-4.56 (p, 1H); IR (thin film) 3445, 2926, 1698, 1260, 750 cm$^{-1}$; ESIMS m/z 477 ([M−H]$^-$).

(Z)-4-(3-(3,4-Dichlorophenyl)-1,4,4,4-tetrafluorobut-1-en-1-yl)-2-(trifluoromethyl)benzoic Acid (C4)

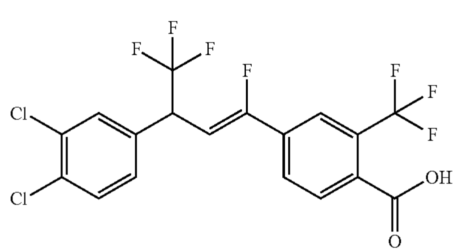

Isolated as a brown gum (2.50 g, 56%): $^1$H NMR (300 MHz, DMSO-$d_6$) δ 13.90 (br s, 1H), 8.16 (s, 1H), 8.09 (d, J=10.8 Hz, 1H), 8.08 (s, 1H), 7.92 (d, J=8.1 Hz, 1H), 7.75-7.65 (m, 2H), 6.90 (dd, J=36.0, 10.4 Hz, 1H), 5.22-5.16 (m, 1H); IR (thin film) 3440, 2927, 1716, 1175 cm$^{-1}$; ESIMS m/z 459 ([M−H]$^-$).

(Z)-4-(3-(4-Bromo-3-chlorophenyl)-1,4,4,4-tetrafluorobut-1-en-1-yl)-2-(trifluoromethyl)benzoic Acid (C5)

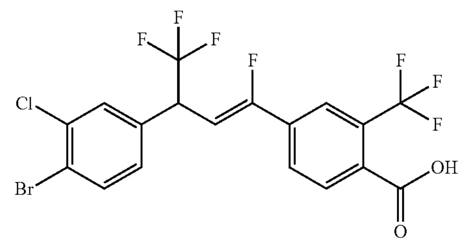 [SMILES: O=C(O)c1ccc(/C(F)=C/C(c2ccc(Cl)c(Cl)c2)C(F)(F)F)cc1C(F)(F)F]

Isolated as a brown gum (2.5 g, 68%): $^1$H NMR (400 MHz, $CDCl_3$) δ 8.02 (d, J=8.4 Hz, 1H), 7.94 (s, 1H), 7.83 (d, J=7.2 Hz, 1H), 7.66 (d, J=8.4 Hz, 1H), 7.50 (s, 1H), 7.17 (dd, J=2.0, 8.4 Hz, 1H), 5.96 (dd, J=9.2, 32.0 Hz, 1H), 4.65-4.61 (m, 1H); IR (thin film) 3447, 2927, 1715, 750 cm$^{-1}$; ESIMS m/z 504 ([M−H]$^-$).

(Z)-2-Chloro-4-(1,4,4,4-tetrafluoro-3-(3,4,5-trichlorophenyl)but-1-en-1-yl)benzoic Acid (C6)

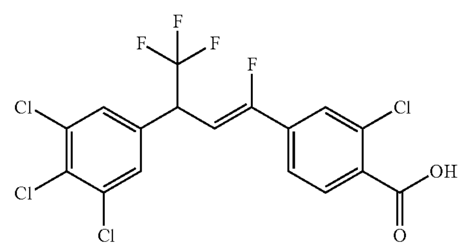

Isolated as a white solid (4.27 g, 88%): $^1$H NMR (400 MHz, $CDCl_3$) δ 8.07 (d, J=8.2 Hz, 1H), 7.68 (d, J=1.7 Hz, 1H), 7.54 (dd, J=8.3, 1.8 Hz, 1H), 7.43 (s, 2H), 5.85 (dd, J=32.4, 9.6 Hz, 1H), 4.60 (p, J=8.8 Hz, 1H); $^{19}$F NMR (376 MHz, $CDCl_3$) δ −69.33 (d, J=2.2 Hz), −112.18 (d, J=2.4 Hz); ESIMS m/z 461 ([M−H]$^-$).

(Z)-4-(1,4,4,4-Tetrafluoro-3-(4-fluoro-3-(trifluoromethyl)phenyl)but-1-en-1-yl)-2-(trifluoromethyl)benzoic Acid (C7)

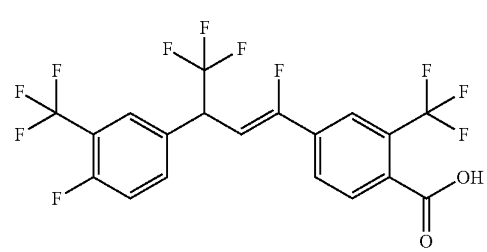 [SMILES: O=C(O)c1ccc(/C(F)=C/C(c2ccc(F)c(C(F)(F)F)c2)C(F)(F)F)cc1C(F)(F)F]

Isolated as a brown gum (1.0 g, 42%): $^1$H NMR (300 MHz, DMSO-$d_6$) δ 13.80 (br s, 1H), 8.16 (s, 1H), 8.12-8.07 (m, 3H), 7.92 (d, J=8.7 Hz, 1H), 7.66 (d, J=10.2 Hz, 1H), 6.96 (dd, J=9.9, 35.4 Hz, 1H), 5.36-5.29 (m, 1H); IR (thin film) 2926, 1715, 765 cm$^{-1}$; ESIMS m/z 477 ([M−H]$^-$).

(Z)-4-(3-(4-Chloro-3-(trifluoromethoxy)phenyl)-1,4,4,4-tetrafluorobut-1-en-1-yl)-2-(trifluoromethyl)benzoic Acid (C8)

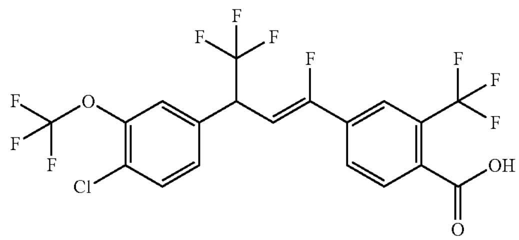 [SMILES: O=C(O)c1ccc(/C(F)=C/C(c2ccc(Cl)c(OC(F)(F)F)c2)C(F)(F)F)cc1C(F)(F)F]

Isolated as an orange oil (0.712 g, 65%): $^1$H NMR (400 MHz, $CDCl_3$) δ 8.03 (d, J=8.1 Hz, 1H), 7.95 (d, J=1.6 Hz, 1H), 7.83 (dd, J=8.2, 1.8 Hz, 1H), 7.53 (d, J=8.3 Hz, 1H), 7.37 (s, 1H), 7.32 (dd, J=8.5, 2.1 Hz, 1H), 5.92 (dd, J=32.5, 9.6 Hz, 1H), 4.69 (p, J=8.9 Hz, 1H); $^{19}$F NMR (376 MHz, $CDCl_3$) δ −57.85, −59.63, −69.49 (d, J=2.2 Hz), −112.48 (t, J=2.7 Hz); IR (thin film) 3089, 1713, 1490 cm$^{-1}$; ESIMS m/z 509 ([M−H]$^-$).

(Z)-4-(3-(3-Chloro-4-(trifluoromethoxy)phenyl)-1,4,4,4-tetrafluorobut-1-en-1-yl)-2-(trifluoromethyl)benzoic Acid (C9)

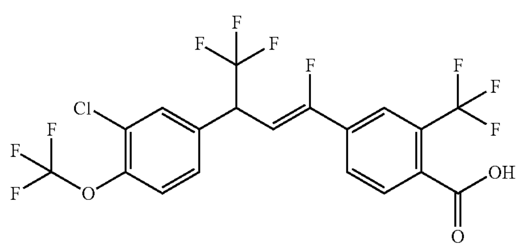 [SMILES: O=C(O)c1ccc(/C(F)=C/C(c2ccc(OC(F)(F)F)c(Cl)c2)C(F)(F)F)cc1C(F)(F)F]

Isolated as an orange oil (0.428 g, 56%): $^1$H NMR (400 MHz, $CDCl_3$) δ 8.04 (d, J=8.2 Hz, 1H), 7.99-7.94 (m, 1H), 7.84 (dd, J=8.2, 1.8 Hz, 1H), 7.54 (s, 1H), 7.36 (q, J=1.0 Hz, 2H), 5.93 (dd, J=32.5, 9.7 Hz, 1H), 4.68 (p, J=8.9 Hz, 1H); $^{19}$F NMR (376 MHz, $CDCl_3$) δ −57.82, −59.60, −69.36 (d, J=2.2 Hz), −112.78 (d, J=2.7 Hz); IR (thin film) 3010, 1711, 1497, 1412 cm$^{-1}$; ESIMS m/z 509 ([M−H]$^-$).

(Z)-2-Methyl-4-(1,4,4,4-tetrafluoro-3-(3,4,5-trichlorophenyl)but-1-en-1-yl)benzoic Acid (C10)

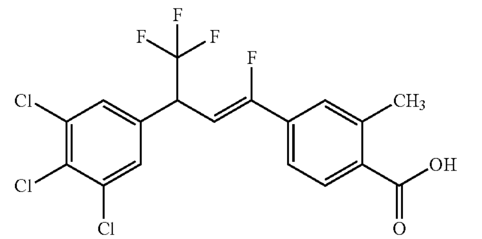

Isolated as an orange oil (0.94 g, 61%): $^1$H NMR (400 MHz, $CDCl_3$) δ 8.09 (d, J=8.8 Hz, 1H), 7.49-7.45 (m, 2H), 7.44 (s, 2H), 5.80 (dd, J=32.7, 9.6 Hz, 1H), 4.60 (p, J=8.9 Hz, 1H), 2.69 (s, 3H); $^{19}$F NMR (376 MHz, $CDCl_3$) δ −69.40 (d, J=2.3 Hz), −108.40-−115.65 (m); ESIMS m/z 441 ([M−H]$^-$).

(Z)-4-(3-(3,5-Dichlorophenyl)-1,4,4,4-tetrafluorobut-1-en-1-yl)-2-(trifluoromethyl)benzoic Acid (C11)

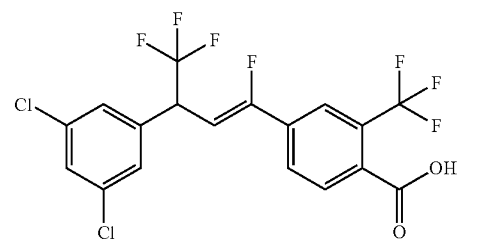 [SMILES: O=C(O)c1ccc(/C(F)=C/C(c2cc(Cl)cc(Cl)c2)C(F)(F)F)cc1C(F)(F)F]

Isolated as a brown gum (0.50 g, 43%): $^1$H NMR (400 MHz, DMSO-$d_6$) δ 13.9 (br s, 1H), 8.16 (s, 1H), 8.09 (d, J=8.0 Hz, 1H), 7.92 (d, J=8.0 Hz, 1H), 7.82 (s, 2H), 7.64 (t, J=6.0 Hz, 1H), 6.90 (dd, J=36.0, 10.4 Hz, 1H), 5.26-5.17 (m, 1H); IR (thin film) 3416, 2926, 1716, 1119 cm$^{-1}$.

(Z)-4-(3-(3-Chloro-5-(trifluoromethoxy)phenyl)-1,4,4,4-tetrafluorobut-1-en-1-yl)-2-(trifluoromethyl)benzoic Acid (C12)

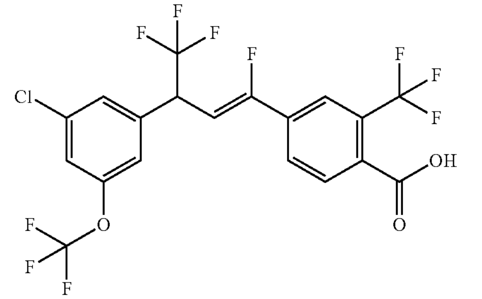 [SMILES: O=C(O)c1ccc(/C(F)=C/C(c2cc(Cl)cc(OC(F)(F)F)c2)C(F)(F)F)cc1C(F)(F)F]

Isolated as an orange oil (0.744 g, 68%): $^1$H NMR (400 MHz, $CDCl_3$) δ 8.04 (d, J=8.2 Hz, 1H), 8.01-7.94 (m, 1H), 7.84 (dd, J=8.2, 1.7 Hz, 1H), 7.36 (d, J=1.6 Hz, 1H), 7.27 (dt, J=2.3, 1.1 Hz, 1H), 7.17 (s, 1H), 5.91 (dd, J=32.4, 9.6

Hz, 1H), 4.68 (p, J=8.8 Hz, 1H); $^{19}$F NMR (376 MHz, $CDCl_3$) δ −57.93, −59.60, −69.24 (d, J=2.5 Hz), −112.31 (d, J=2.6 Hz); IR (thin film) 3005, 1712, 1605, 1507, 1408 $cm^{-1}$; ESIMS m/z 509 ($[M-H]^-$).

(Z)-4-(3-(3-Chloro-5-(trifluoromethyl)phenyl)-1,4,4,4-tetrafluorobut-1-en-1-yl)-2-(trifluoromethyl)benzoic Acid (C13)

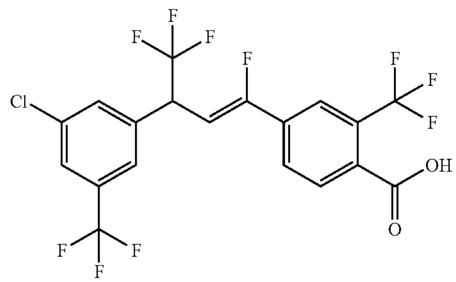 [SMILES: O=C(O)c1ccc(/C(F)=C/C(c2cc(Cl)cc(C(F)(F)F)c2)C(F)(F)F)cc1C(F)(F)F]

Isolated as a brown solid (1.0 g, 47%): $^1$H NMR (300 MHz, DMSO-$d_6$) δ 13.80 (s, 1H), 8.17-8.12 (m, 3H), 7.91-7.86 (m, 3H), 6.87 (dd, J=9.9, 36.0 Hz, 1H), 5.39-5.32 (m, 1H); ESIMS m/z 493 ($[M-H]^-$).

(Z)-4-(3-(3-Bromo-4-chlorophenyl)-1,4,4,4-tetrafluorobut-1-en-1-yl)-2-(trifluoromethyl)benzoic Acid (C14)

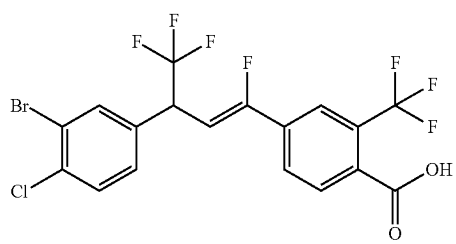

Isolated as a brown gum (2.5 g, 46%): $^1$H NMR (300 MHz, DMSO-$d_6$) δ 13.79 (br s, 1H), 8.15-8.06 (m, 3H), 7.91 (d, J=8.1 Hz, 1H), 7.71 (s, 2H), 6.90 (dd, J=36.0, 10.2 Hz, 1H), 5.21-5.15 (m, 1H); IR (thin film) 3431, 2924, 1623, 597 $cm^{-1}$; ESIMS m/z 503 ($[M-H]^-$).

(Z)-4-(3-(3-Bromo-4,5-dichlorophenyl)-1,4,4,4-tetrafluorobut-1-en-1-yl)-2-(trifluoromethyl)benzoic Acid (C15)

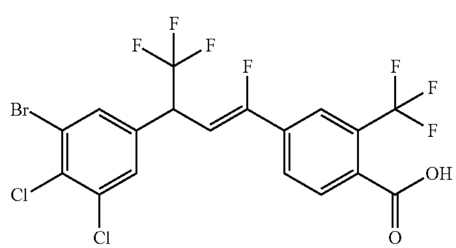

Isolated as a yellow gum (2.6 g, 27%): $^1$H NMR (400 MHz, $CDCl_3$) δ 11.66 (s, 1H), 8.04 (d, J=7.3 Hz, 1H), 7.97 (d, J=1.7 Hz, 1H), 7.84 (dd, J=8.2, 1.8 Hz, 1H), 7.60 (d, J=2.0 Hz, 1H), 7.49 (d, J=2.1 Hz, 1H), 5.91 (dd, J=32.4, 9.6 Hz, 1H), 4.62 (p, J=8.8 Hz, 1H); 19F NMR (376 MHz, $CDCl_3$) δ −57.06, −66.85, −110.35; ESIMS m/z 540 ($[M-H]^-$).

Z)-4-(1,4,4,4-Tetrafluoro-3-(3,4,5-trichlorophenyl)but-1-en-1-yl)benzoic Acid (CC1)

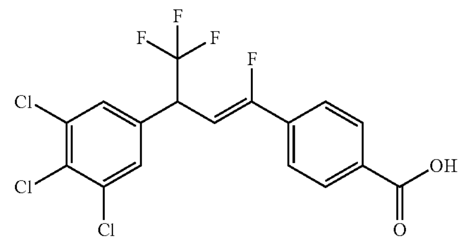 [SMILES: O=C(O)c1ccc(/C(F)=C/C(c2cc(Cl)c(Cl)c(Cl)c2)C(F)(F)F)cc1]

Isolated as a yellow gum (1.1 g, 56%): $^1$H NMR (400 MHz, $CDCl_3$) δ 8.15 (d, J=8.2 Hz, 2H), 7.67 (d, J=8.3 Hz, 2H), 7.44 (s, 2H), 5.84 (dd, J=32.6, 9.6 Hz, 1H), 4.61 (p, J=8.9 Hz, 1H); $^{19}$F NMR (376 MHz, $CDCl_3$) δ −69.38 (d, J=2.2 Hz), −109.75-−116.47 (m); ESIMS m/z 427 ($[M-H]^-$).

(Z)-4-(3-(3-Chloro-4-(trifluoromethyl)phenyl)-1,4,4,4-tetrafluorobut-1-en-1-yl)-2-(trifluoromethyl)benzoic Acid (C16)

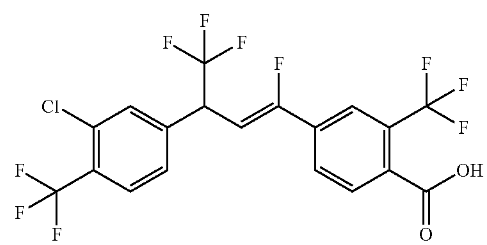 [SMILES: O=C(O)c1ccc(/C(F)=C/C(c2ccc(C(F)(F)F)c(Cl)c2)C(F)(F)F)cc1C(F)(F)F]

Isolated as an orange oil (1.22 g, 58%): $^1$H NMR (400 MHz, $CDCl_3$) δ 8.04 (d, J=8.2 Hz, 1H), 7.96 (d, J=1.7 Hz, 1H), 7.84 (dd, J=8.3, 1.8 Hz, 1H), 7.74 (d, J=8.2 Hz, 1H), 7.57 (d, J=1.6 Hz, 1H), 7.43 (d, J=8.2 Hz, 1H), 5.94 (dd, J=32.5, 9.6 Hz, 1H), 4.73 (p, J=8.9 Hz, 1H); IR (thin film) 3022, 1710 $cm^{-1}$; ESIMS m/z 493 ($[M-H]^-$).

(Z)-4-(3-(4-Bromo-3,5-dichlorophenyl)-1,4,4,4-tetrafluorobut-1-en-1-yl)-2-(trifluoromethyl)benzoic Acid (C17)

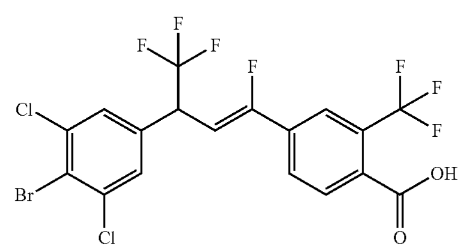

Isolated as a brown solid (1.50 g, 65%): mp 78-81° C.; $^{1}$H NMR (300 MHz, $CDCl_3$) δ 8.09-7.99 (m, 2H), 7.83-7.81 (m, 1H), 7.42 (s, 2H), 5.95 (dd, J=32.4 Hz, 9.6 Hz, 1H), 4.63-4.57 (m, 1H); IR (thin film) 3445, 1713, 852 $cm^{-1}$; ESIMS m/z 538 ($[M+H]^+$).

(Z)-4-(3-(3-Bromo-5-chlorophenyl)-1,4,4,4-tetrafluorobut-1-en-1-yl)-2-(trifluoromethyl)benzoic Acid (C18)

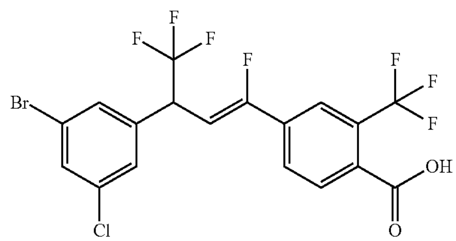

Isolated as a brown gum (2.0 g, 62%): $^{1}$H NMR (300 MHz, DMSO-$d_6$) δ 13.80 (br s, 1H), 8.15 (s, 1H), 8.09 (d, J=8.1 Hz, 1H), 7.93-7.78 (m, 4H), 6.91 (dd, J=35.7, 10.2 Hz, 1H), 5.27-5.14 (m, 1H); IR (thin film) 3081, 2927, 1714, 776 $cm^{-1}$; ESIMS m/z 503 ($[M-H]^-$).

(Z)-4-(3-(3-Chloro-4,5-difluorophenyl)-1,4,4,4-tetrafluorobut-1-en-1-yl)-2-(trifluoromethyl)benzoic Acid (C19)

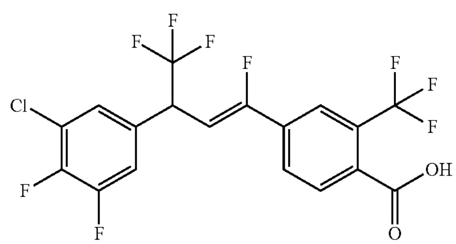

Isolated as a brown gum (0.55 g, 56%): $^{1}$H NMR (300 MHz, DMSO-$d_6$) δ 13.92 (br s, 1H), 8.14 (s, 1H), 8.08 (d, J=8.1 Hz, 1H), 7.92-7.85 (s, 3H), 6.87 (dd, J=9.9, 35.4 Hz, 1H), 5.24-5.18 (m, 1H); IR (thin film) 3085, 1715, 659 $cm^{-1}$; ESIMS m/z 461 ($[M-H]^-$).

(Z)-4-(3-(3,5-Dibromophenyl)-1,4,4,4-tetrafluorobut-1-en-1-yl)-2-(trifluoromethyl)benzoic Acid (C20)

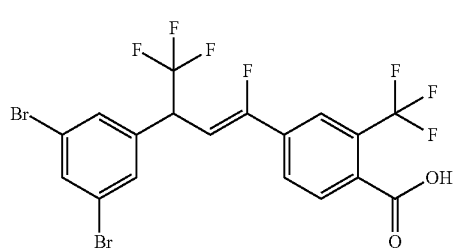

Isolated as a brown gum (2.20 g, 39%): $^{1}$H NMR (300 MHz, $CDCl_3$) δ 8.05-7.95 (m, 2H), 7.84 (d, J=7.2 Hz, 1H), 7.69-7.68 (m, 1H), 7.49 (s, 2H), 5.95 (dd, J=32.7, 9.6 Hz, 1H), 4.64-4.58 (m, 1H); IR (thin film) 3439, 2925, 1714, 1118, 746 $cm^{-1}$; ESIMS m/z 549 ($[M-H]^-$).

(Z)-4-(3-(3,4-Dibromophenyl)-1,4,4,4-tetrafluorobut-1-en-1-yl)-2-(trifluoromethyl)benzoic Acid (C21)

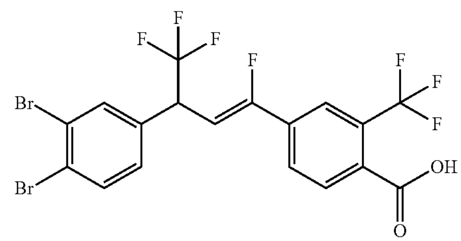

Isolated as a yellow gum (2.1 g, 78%): $^{1}$H NMR (400 MHz, $CDCl_3$) δ 8.02 (d, J=8.4 Hz, 1H), 7.94 (s, 1H), 7.83 (d, J=8.4 Hz, 1H), 7.66 (d, J=8.4 Hz, 2H), 7.26-7.21 (m, 1H), 5.96 (dd, J=32.4, 9.2 Hz, 1H), 4.67-4.58 (m, 1H); IR (thin film) 3426, 2925, 1714, 1115 $cm^{-1}$; ESIMS m/z 547 ($[M-H]^-$).

(Z)-4-(3-(3-Chloro-4-fluorophenyl)-1,4,4,4-tetrafluorobut-1-en-1-yl)-2-(trifluoromethyl)benzoic Acid (C22)

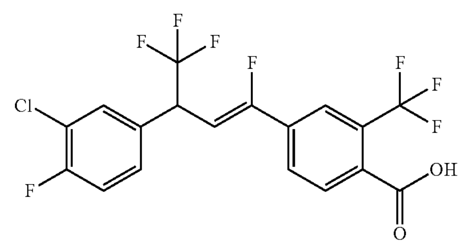

Isolated as a yellow gum (1.50 g, 57%): $^{1}$H NMR (300 MHz, $CDCl_3$) δ 8.01 (d, J=8.1 Hz, 2H) 7.94 (s, 2H), 7.76-7.75 (m, 1H), 7.37 (d, J=6.0 Hz, 2H), 5.90 (dd, J=32.1, 9.0 Hz, 1H); IR (thin film) 3445, 2926, 1698, 1260, 750 $cm^{-1}$; ESIMS m/z 443 ($[M-H]^-$).

(Z)-4-(3-(3,5-Dibromo-4-chlorophenyl)-1,4,4,4-tetrafluorobut-1-en-1-yl)-2-(trifluoromethyl)benzoic Acid (C23)

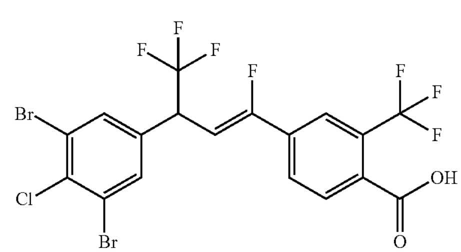

Isolated as a brown gum (2.00 g, 37%): ESIMS m/z 583 ([M−H]$^-$).

(Z)-4-(3-(3,5-Dibromo-4-fluorophenyl)-1,4,4,4-tetrafluorobut-1-en-1-yl)-2-(trifluoromethyl)benzoic Acid (C24)

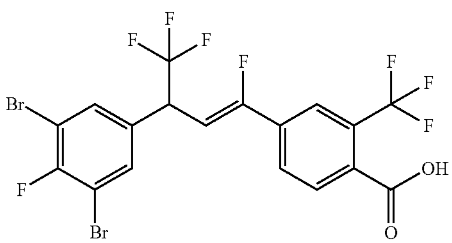

Isolated as a yellow oil (0.298 g, 41%); $^1$H NMR (400 MHz, $CDCl_3$) δ 8.04 (d, J=8.2 Hz, 1H), 7.96 (d, J=1.8 Hz, 1H), 7.84 (dd, J=8.2, 1.8 Hz, 1H), 7.56 (d, J=5.6 Hz, 2H), 5.90 (dd, J=32.5, 9.6 Hz, 1H), 4.62 (p, J=8.9 Hz, 1H); 19F NMR (376 MHz, $CDCl_3$) δ −59.57, −69.46 (d, J=2.1 Hz), −98.42, −112.28 (d, J=2.3 Hz); IR (thin film) 3003, 1713 cm$^{-1}$; ESIMS m/z 567 ([M−H]$^-$).

(Z)-4-(1,4,4,4-Tetrafluoro-3-(3,4,5-trichlorophenyl)but-1-en-1-yl)-2-(trifluoromethyl)benzonitrile (C25)

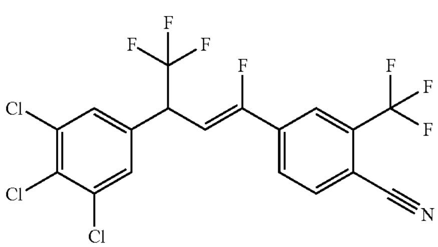 [SMILES: N#Cc1ccc(/C(F)=C/C(c2cc(Cl)c(Cl)c(Cl)c2)C(F)(F)F)cc1C(F)(F)F]

Isolated as a yellow wax (0.83 g, 51%): $^1$H NMR (400 MHz, $CDCl_3$) δ 7.95 (dd, J=1.8, 0.8 Hz, 1H), 7.93-7.89 (m, 1H), 7.87 (dd, J=8.3, 1.7 Hz, 1H), 7.43 (s, 2H), 5.94 (dd, J=32.3, 9.6 Hz, 1H), 4.62 (p, J=8.8 Hz, 1H); $^{19}$F NMR (376 MHz, $CDCl_3$) δ −62.16, −69.22, −112.49; ESIMS m/z 476 ([M−H]$^-$).

(Z)-4-(3-(4-Bromo-3-(trifluoromethyl)phenyl)-1,4,4,4-tetrafluorobut-1-en-1-yl)-2-(trifluoromethyl)benzoic Acid (C26)

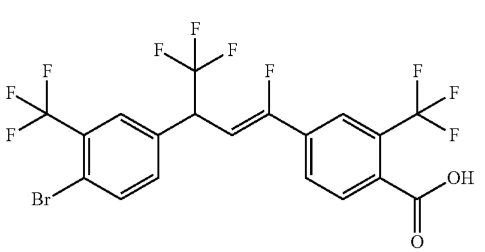 [SMILES: O=C(O)c1ccc(/C(F)=C/C(c2ccc(Br)c(C(F)(F)F)c2)C(F)(F)F)cc1C(F)(F)F]

Isolated as a brown gum (0.40 g, 43%): $^1$H NMR (400 MHz, DMSO-$d_6$) δ 13.80 (br s, 1H), 8.15 (s, 2H), 8.07 (d, J=8.4 Hz, 1H), 8.01 (d, J=8.4 Hz, 1H), 7.91 (d, J=8.4 Hz, 2H), 6.93 (dd, J=9.9, 36.0 Hz, 1H), 5.36-5.31 (m, 1H); IR (thin film) 3093, 1714, 1139 cm$^{-1}$; ESIMS m/z 537 ([M−H]$^-$).

(Z)-4-(3-(4-Chloro-3,5-difluorophenyl)-1,4,4,4-tetrafluorobut-1-en-1-yl)-2-(trifluoromethyl)benzoic Acid (C27)

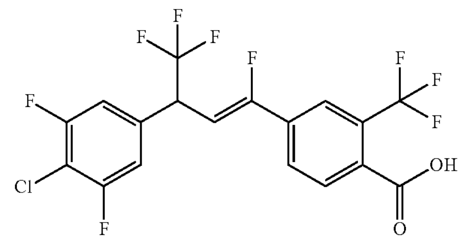 [SMILES: O=C(O)c1ccc(/C(F)=C/C(c2cc(F)c(Cl)c(F)c2)C(F)(F)F)cc1C(F)(F)F]

Isolated as a brown gum (0.40 g, 18%): $^1$H NMR (300 MHz, DMSO-$d_6$) δ 10.82 (s, 1H), 8.14 (s, 1H), 8.08 (d, J=7.8 Hz, 1H), 7.91 (d, J=7.5 Hz, 1H), 7.75 (d, J=8.1 Hz, 2H), 6.85 (dd, J=9.9, 35.4 Hz, 1H), 5.27-5.21 (m, 1H); ESIMS m/z 461 ([M−H]$^-$).

(Z)-4-(1,4,4,4-Tetrafluoro-3-(3,4,5-trichlorophenyl)but-1-en-1-yl)-1-naphthoic Acid (C99)

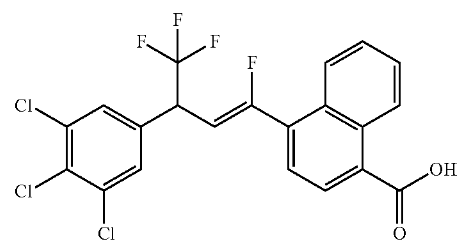 [SMILES: O=C(O)c1ccc(/C(F)=C/C(c2cc(Cl)c(Cl)c(Cl)c2)C(F)(F)F)c2ccccc12]

Isolated as a yellow solid (0.85 g, 53%): $^1$H NMR (300 MHz, $CDCl_3$) δ 8.30 (d, J=7.5 Hz, 1H), 8.07-8.05 (m, 1H), 7.70-7.61 (m, 4H), 7.49 (s, 2H), 5.69 (dd, J=9.9, 31.2 Hz, 1H), 4.75-4.69 (m, 1H); IR (thin film) 3445, 1684, 1260, 750 cm$^{-1}$; ESIMS m/z 475 ([M]$^-$).

Example 2: Preparation of (Z)-4-(3-(3,4-Dichloro-5-vinylphenyl)-1,4,4,4-tetrafluorobut-1-en-1-yl)-2-(trifluoromethyl)benzoic Acid (C28)

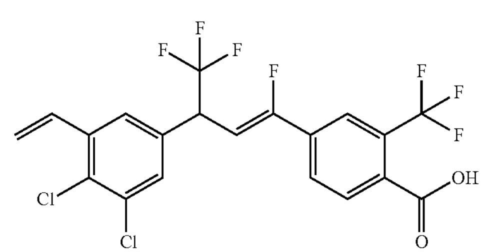 [SMILES: C=Cc1cc(C(/C=C(\F)c2ccc(C(=O)O)c(C(F)(F)F)c2)C(F)(F)F)cc(Cl)c1Cl]

Tetrakis(triphenylphosphine)palladium(0) (70 mg, 0.061 mmol) was added to a solution of (Z)-4-(1,4,4,4-tetrafluoro- 3-(3,4,5-trichlorophenyl)but-1-en-1-yl)-2-(trifluoromethyl) benzoic acid (C2) (0.3 g, 0.605 mmol) in toluene (3.0 mL) at room temperature. The reaction mixture was degassed by purging with nitrogen (3×10 minutes). Tributyl vinyl stannane (0.384 g, 1.21 mmol) was added to the reaction mixture. The reaction mixture was again degassed by purging with nitrogen (3×10 minutes) and stirred at 110° C. for 12 hours. The reaction mixture was quenched with water and then extracted with ethyl acetate. The organic layer was dried over sodium sulfate, filtered, and concentrated. Purification by flash column chromatography using 30% ethyl acetate/hexanes provided the title compound as a pale yellow wax (0.30 g, 94%): $^{1}$H NMR (400 MHz, $CDCl_3$) δ 9.76 (s, 1H), 8.02 (d, J=8.2 Hz, 1H), 7.95 (s, 1H), 7.82 (d, J=8.2 Hz, 1H), 7.52-7.39 (m, 2H), 7.09 (dd, J=17.5, 11.0 Hz, 1H), 6.04-5.85 (m, 1H), 5.76 (dd, J=17.5, 13.8 Hz, 1H), 5.55-5.45 (m, 1H), 4.65 (p, J=8.9 Hz, 1H); 19F NMR (376 MHz, $CDCl_3$) δ −59.56, −67.15, −113.15; ESIMS m/z 487 ([M−H]$^-$).

The following compounds were prepared in like manner to the procedure outlined in Example 2:

(Z)-4-(3-(3,4-Dichloro-5-cyclopropylphenyl)-1,4,4,4-tetrafluorobut-1-en-1-yl)-2-(trifluoromethyl)benzoic Acid (C29)

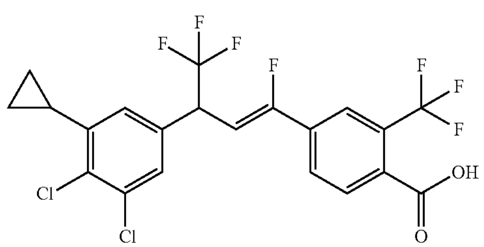 [SMILES: O=C(O)c1ccc(/C(F)=C/C(c2cc(Cl)c(Cl)c(C3CC3)c2)C(F)(F)F)cc1C(F)(F)F]

Isolated as a yellow gum (0.041 g, 80%): $^{1}$H NMR (400 MHz, $CDCl_3$) δ 8.64 (s, 1H), 8.02 (d, J=8.0 Hz, 1H), 7.94 (s, 1H), 7.81 (d, J=8.1 Hz, 1H), 7.39-7.31 (m, 1H), 6.89 (d, J=2.1 Hz, 1H), 5.90 (dt, J=32.7, 11.0 Hz, 1H), 4.59 (p, J=9.0 Hz, 1H), 1.64 (q, J=7.8 Hz, 1H), 1.08 (dddd, J=8.8, 7.3, 5.7, 2.3 Hz, 2H), 0.77-0.63 (m, 2H); $^{19}$F NMR (376 MHz, $CDCl_3$) δ −57.88--62.06 (m), −68.19--73.80 (m), −110.87--115.65 (m); ESIMS m/z 500 ([M−H]$^-$).

(Z)-4-(3-(3,4-Dichloro-5-vinylphenyl)-1,4,4,4-tetrafluorobut-1-en-1-yl)-2-(trifluoromethyl)benzonitrile (C30)

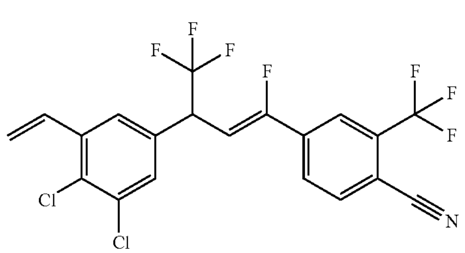 [SMILES: C=Cc1cc(C(/C=C(\F)c2ccc(C#N)c(C(F)(F)F)c2)C(F)(F)F)cc(Cl)c1Cl]

Isolated as a yellow wax (0.19 g, 65%): $^{1}$H NMR (400 MHz, $CDCl_3$) δ 9.76 (s, 1H), 8.02 (d, J=8.2 Hz, 1H), 7.95 (s, 1H), 7.82 (d, J=8.2 Hz, 1H), 7.52-7.39 (m, 2H), 7.09 (dd, J=17.5, 11.0 Hz, 1H), 6.04-5.85 (m, 1H), 5.76 (dd, J=17.5, 13.8 Hz, 1H), 5.55-5.45 (m, 1H), 4.65 (p, J=8.9 Hz, 1H); $^{19}$F NMR (376 MHz, $CDCl_3$) δ −59.56, −67.15, −113.15; ESIMS m/z 466 ([M−H]$^-$).

(Z)-4-(3-(3,5-Dichloro-4-(1-ethoxyvinyl)phenyl)-1,4,4,4-tetrafluorobut-1-en-1-yl)-2-(trifluoromethyl) benzoic Acid (C31)

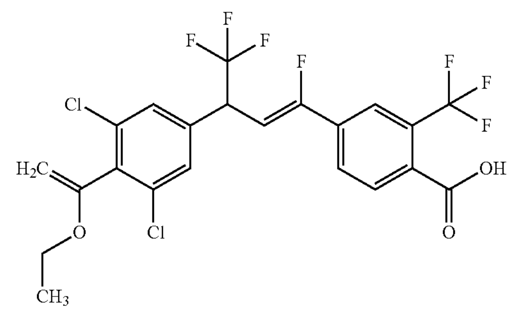 [SMILES: C=C(OCC)c1c(Cl)cc(C(/C=C(\F)c2ccc(C(=O)O)c(C(F)(F)F)c2)C(F)(F)F)cc1Cl]

Isolated as a brown gum (0.020 g, 23%): ESIMS m/z 529 ([M−H]$^-$).

Example 3: Preparation of (Z)-4-(3-(3,4-dichloro-5-(difluoromethyl)phenyl)-1,4,4,4-tetrafluorobut-1-en-1-yl)-2-(trifluoromethyl)benzonitrile (C32)

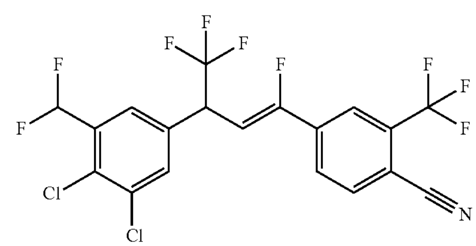 [SMILES: N#Cc1ccc(/C(F)=C/C(c2cc(Cl)c(Cl)c(C(F)F)c2)C(F)(F)F)cc1C(F)(F)F]

Bis(2-methoxyethyl)aminosulfur trifluoride (0.282 g, 1.276 mmol) was added to a solution of (Z)-4-(3-(3,4-dichloro-5-formylphenyl)-1,4,4,4-tetrafluorobut-1-en-1-yl)-2-(trifluoromethyl)benzonitrile (C79) (0.300 g, 0.638 mmol) in dichloromethane (6.5 mL) at room temperature. One drop of methanol was added and the reaction mixture was stirred at 20° C. for 12 hours. The reaction mixture was quenched with water (50 mL) and then extracted with ethyl acetate (15 mL). The organic layer was dried over sodium sulfate, filtered, and concentrated. Purification by flash column chromatography using 35% ethyl acetate/hexanes provided the title compound as a white wax (0.100 g, 30%): $^{1}$H NMR (400 MHz, $CDCl_3$) δ 7.96 (d, J=1.7 Hz, 1H), 7.93-7.85 (m, 2H), 7.62 (dd, J=13.4, 2.0 Hz, 1H), 7.42 (d, J=5.1 Hz, 1H), 6.95 (t, J=54.6 Hz, 1H), 5.98 (dd, J=32.2, 9.6 Hz, 1H), 4.68 (dt, J=18.6, 8.9 Hz, 1H); $^{19}$F NMR (376 MHz, $CDCl_3$) δ −62.17, −69.26, −112.34, −113.93--118.42 (m); ESIMS m/z 492 ([M−H]$^-$).

Example 4: Preparation of (Z)-4-(3-(3,4-dichloro-5-(difluoromethyl)phenyl)-1,4,4,4-tetrafluorobut-1-en-1-yl)-2-(trifluoromethyl)benzoic Acid (C33)

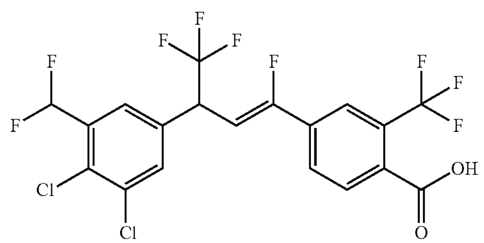 [SMILES: O=C(O)c1ccc(/C(F)=C/C(c2cc(Cl)c(Cl)c(C(F)F)c2)C(F)(F)F)cc1C(F)(F)F]

To a stirred solution of (Z)-4-(3-(3,4-dichloro-5-(difluoromethyl)phenyl)-1,4,4,4-tetrafluorobut-1-en-1-yl)-2-(trifluoromethyl)benzonitrile (C32) (0.150 g, 0.305 mmol) in acetic acid (2.5 mL) was added sulfuric acid (0.25 mL, 0.305 mmol). The reaction mixture was heated in a 130° C. bath for 48 hours. The reaction mixture was cooled to ambient temperature and diluted with water (15 mL). The mixture was extracted with ethyl acetate. The organic layer was washed with brine, dried over sodium sulfate and concentrated under reduced pressure to afford crude compound. Purification by column chromatography (silica gel, eluting with 0-10% methanol in dichloromethane) afforded the title compound as a yellow gum (0.048 g, 28%): $^1$H NMR (400 MHz, $CDCl_3$) δ 11.18 (s, 1H), 8.29 (d, J=1.8 Hz, 1H), 8.17 (dd, J=8.1, 1.8 Hz, 1H), 8.01 (t, J=7.7 Hz, 1H), 7.64 (dt, J=13.0, 1.9 Hz, 1H), 7.45 (dd, J=4.8, 1.7 Hz, 1H), 6.93 (td, J=54.6, 12.6 Hz, 1H), 5.94 (dd, J=32.5, 9.7 Hz, 1H), 4.68 (dt, J=26.6, 8.7 Hz, 1H); $^{19}$F NMR (376 MHz, $CDCl_3$) δ −59.60, −69.48, −112.04, −115.81; ESIMS m/z 509 ([M−H]$^-$).

Example 5: Preparation of 2-bromo-4-(1-fluorovinyl)benzoic Acid (C34)

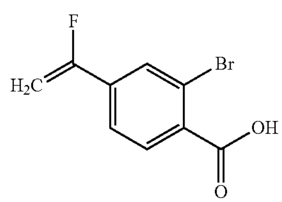

To a 250 mL round-bottomed flask were added methyl 2-bromo-4-(1-fluorovinyl)benzoate (C39) (1.8 g, 7.0 mmol), lithium hydroxide hydrate (0.88 g, 21 mmol), methanol (7.0 mL), tetrahydrofuran (21 mL), and water (7.0 mL), and the reaction mixture was stirred overnight at room temperature. The mixture was concentrated, quenched with a pH 4 buffer, and extracted with ethyl acetate to provide the title compound as a white solid (1.0 g, 56%): $^1$H NMR (400 MHz, $CDCl_3$) δ 8.01 (d, J=8.2 Hz, 1H), 7.89 (d, J=1.8 Hz, 1H), 7.57 (dd, J=8.3, 1.8 Hz, 1H), 5.21 (dd, J=48.6, 4.0 Hz, 1H), 5.06 (dd, J=17.3, 3.9 Hz, 1H); $^{19}$F NMR (471 MHz, $CDCl_3$) δ −108.71 (d, J=1.4 Hz); ESIMS m/z 244 ([M−H]$^-$).

The following compounds were prepared in like manner to the procedure outlined in Example 5:

4-(1-Fluorovinyl)-2-(trifluoromethyl)benzoic Acid (C35)

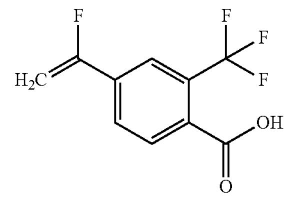 [SMILES: C=C(F)c1ccc(C(=O)O)c(C(F)(F)F)c1]

Isolated as a white solid (1.9 g, 93%): $^1$H NMR (400 MHz, methanol-$d_4$) δ 7.95 (d, J=1.5 Hz, 1H), 7.95-7.91 (m, 1H), 7.90-7.86 (m, 1H), 5.46 (dd, J=50.0, 4.1 Hz, 1H), 5.09 (dd, J=18.0, 4.1 Hz, 1H); $^{19}$F NMR (376 MHz, methanol-$d_4$) δ −61.04 (d, J=1.1 Hz), −110.93; ESIMS m/z 233 ([M−H]$^-$).

2-Chloro-4-(1-fluorovinyl)benzoic Acid (C36)

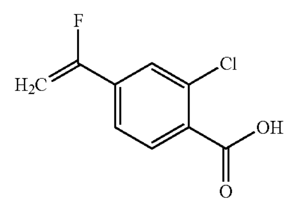

Isolated as a white solid (3.5 g, 75%): $^1$H NMR (400 MHz, acetone-$d_6$) δ 7.97 (dd, J=8.2, 0.9 Hz, 1H), 7.76 (d, J=1.7 Hz, 1H), 7.70 (dd, J=8.2, 1.7 Hz, 1H), 5.68-5.45 (m, 1H), 5.11 (dd, J=18.2, 4.1 Hz, 1H); $^{19}$F NMR (376 MHz, acetone-$d_6$) δ −108.71; ESIMS m/z 200 ([M−H]$^-$).

4-(1-Fluorovinyl)-2-methylbenzoic Acid (C37)

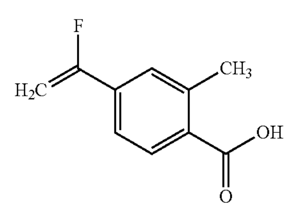

Isolated as a white solid (0.550 g, 89%): $^1$H NMR (400 MHz, methanol-$d_4$) δ 7.92 (d, J=8.1 Hz, 1H), 7.59-7.52 (m, 1H), 7.52-7.44 (m, 1H), 5.29 (dd, J=50.1, 3.7 Hz, 1H), 4.93 (dd, J=18.1, 3.7 Hz, 1H), 2.60 (s, 3H); $^{19}$F NMR (376 MHz, methanol-$d_4$) δ −110.32 (d, J=2.1 Hz); ESIMS m/z 181 ([M+H]$^+$).

Example 6: Preparation of methyl 4-(1-fluorovinyl)-2-(trifluoromethyl)benzoate (C38)

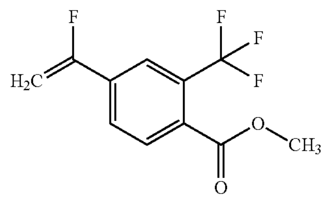 [SMILES: C=C(F)c1ccc(C(=O)OC)c(C(F)(F)F)c1]

To a 100 mL round-bottomed flask was added methyl 4-bromo-2-(trifluoromethyl)benzoate (2.25 g, 8.00 mmol), (1-fluorovinyl)(methyl)diphenylsilane (3.58 g, 14.8 mmol), and 1,3-dimethylimidazolidin-2-one (40 mL). Tetrakis(triphenylphosphine)palladium(0) (0.459 g, 0.400 mmol), copper(I) iodide (0.0760 mg, 0.400 mmol), and cesium fluoride (3.62 g, 23.9 mmol) were added and the reaction mixture was stirred at room temperature for 24 hours under a nitrogen atmosphere. Water was added to the mixture and the mixture was diluted with 3:1 hexanes/diethyl ether. The organic layer was dried over sodium sulfate, filtered and concentrated. Purification by flash column chromatography provided the title compound as a colorless oil (2.00 g, 96%): $^{1}$H NMR (400 MHz, $CDCl_3$) δ 7.96-7.87 (m, 1H), 7.83 (dq, J=8.1, 0.7 Hz, 1H), 7.77 (dd, J=8.2, 1.7 Hz, 1H), 5.23 (dd, J=48.6, 4.0 Hz, 1H), 5.07 (dd, J=17.4, 4.0 Hz, 1H), 3.95 (s, 3H); 19F NMR (376 MHz, $CDCl_3$) δ −59.92, −108.73 (d, J=1.4 Hz); EIMS m/z 248 ($[M]^+$).

The following compounds were prepared in like manner to the procedure outlined in Example 6:

Methyl 2-bromo-4-(1-fluorovinyl)benzoate (C39)

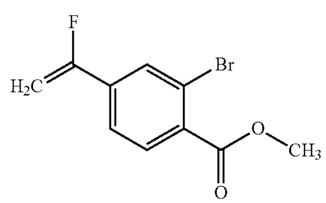

Isolated as a colorless oil (1.8 g, 93%): $^{1}$H NMR (400 MHz, $CDCl_3$) δ 7.84 (d, J=1.7 Hz, 1H), 7.82 (dd, J=8.2, 0.9 Hz, 1H), 7.50 (d, J=1.5 Hz, 1H), 5.16 (dd, J=48.7, 3.9 Hz, 1H), 5.01 (dd, J=17.3, 3.9 Hz, 1H), 3.94 (d, J=2.2 Hz, 3H); $^{19}$F NMR (376 MHz, $CDCl_3$) δ −108.61 (d, J=1.5 Hz); ESIMS m/z 258 ($[M-H]^-$).

Methyl 2-chloro-4-(1-fluorovinyl)benzoate (C40)

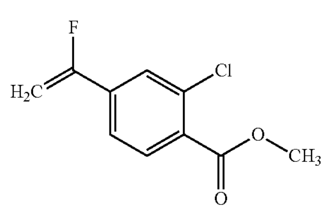

Isolated as a colorless oil (2.1 g, 99%): $^{1}$H NMR (400 MHz, $CDCl_3$) δ 7.86 (dd, J=8.2, 0.9 Hz, 1H), 7.64 (d, J=1.7 Hz, 1H), 7.48 (dd, J=8.3, 1.8 Hz, 1H), 5.17 (dd, J=48.7, 3.8 Hz, 1H), 5.02 (dd, J=17.3, 3.9 Hz, 1H), 3.94 (s, 3H); 19F NMR (376 MHz, $CDCl_3$) δ −108.63 (d, J=1.4 Hz); ESIMS m/z 214 ($[M-H]^-$).

Methyl 4-(1-fluorovinyl)-2-methylbenzoate (C41)

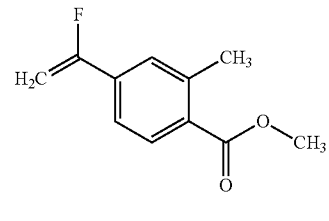

Isolated as a colorless oil (0.5 g, 85%): $^{1}$H NMR (400 MHz, methanol-$d_4$) δ 7.90 (d, J=8.2 Hz, 1H), 7.51 (s, 1H), 7.49 (dd, J=8.0, 1.6 Hz, 1H), 5.30 (dd, J=50.1, 3.7 Hz, 1H), 4.95 (dd, J=18.0, 3.7 Hz, 1H), 3.88 (d, J=5.9 Hz, 3H), 2.59 (s, 3H); $^{19}$F NMR (376 MHz, methanol-$d_4$) δ −110.41 (d, J=1.3 Hz); ESIMS m/z 195 ($[M+H]^+$).

Example 7: Preparation of 4-(1-fluorovinyl)-2-(trifluoromethyl)benzoic Acid (C35)

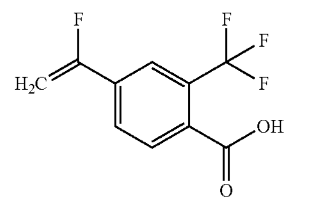 [SMILES: C=C(F)c1ccc(C(=O)O)c(C(F)(F)F)c1]

Step 1: 4-(2-Bromo-1-fluoroethyl)-2-(trifluoromethyl)benzoic Acid (C42)

2-(Trifluoromethyl)-4-vinylbenzoic acid (5.3 g, 24 mmol) was dissolved in dichloromethane (123 mL) at 0° C., and triethylamine trihydrofluoride (8.0 mL, 49 mmol) was added followed by N-bromosuccinimide (8.7 g, 49 mmol). The cooling bath was removed and the reaction mixture was allowed to warm to room temperature and stir for 16 hours. The mixture was partitioned between water and dichloromethane. The organic layer was dried over sodium sulfate, filtered, and concentrated providing the title compound as a yellow oil which was used without further purification (5.0 g, 65%).

Step 2: 4-(1-Fluorovinyl)-2-(trifluoromethyl)benzoic Acid (C35)

4-(2-Bromo-1-fluoroethyl)-2-(trifluoromethyl)benzoic acid (4.3 g, 14 mmol) was dissolved in methanol (68 mL) at 0° C. and potassium tert-butoxide (4.6 g, 41 mmol) was added as a solid while stirring. The reaction mixture was allowed to slowly warm to room temperature and then stirred for 4 hours. Hydrochloric acid (1 N) was slowly added, and the mixture was extracted with ethyl acetate.

Purification by flash column chromatography using 0-40% acetone/hexanes provided the title compound as an off-white solid (1.7 g, 53%): $^1$H NMR (400 MHz, $CDCl_3$) δ 8.02 (d, J=8.2 Hz, 1H), 8.00-7.93 (m, 1H), 7.82 (dd, J=8.2, 1.8 Hz, 1H), 5.27 (dd, J=48.5, 4.1 Hz, 1H), 5.11 (dd, J=17.3, 4.1 Hz, 1H).

The following compounds were prepared in like manner to the procedure outlined in Example 7:

4-(1-Fluorovinyl)benzoic Acid (C43)

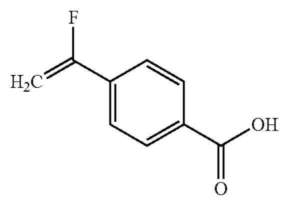

Isolated as a white solid (6.5 g, 86%): $^1$H NMR (400 MHz, $CDCl_3$) δ 8.13 (d, J=8.2 Hz, 2H), 7.69-7.62 (m, 2H), 5.21 (dd, J=49.0, 3.7 Hz, 1H), 5.02 (dd, J=17.5, 3.7 Hz, 1H); $^{19}$F NMR (376 MHz, $CDCl_3$) δ −108.35; ESIMS m/z 165 ($[M-H]^-$).

4-(1-Fluorovinyl)-2-methylbenzoic Acid (C37)

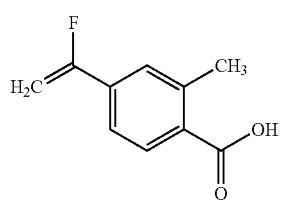

Isolated as a colorless oil (0.165 g, 89%): $^1$H NMR (400 MHz, $CDCl_3$) δ 8.12-8.03 (m, 1H), 7.46 (dd, J=5.8, 2.1 Hz, 2H), 5.17 (dd, J=49.1, 3.7 Hz, 1H), 4.98 (dd, J=17.5, 3.7 Hz, 1H), 2.68 (s, 3H); $^{19}$F NMR (376 MHz, $CDCl_3$) δ −108.50.

4-(1-Fluorovinyl)-1-naphthoic Acid (C100)

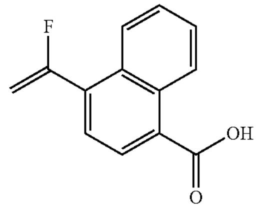 [SMILES: C=C(F)c1ccc(C(=O)O)c2ccccc12]

Isolated as an off-white solid (0.70 g, 52%): mp 154-156° C.; $^1$H NMR (400 MHz, DMSO-$d_6$) δ 13.40 (br s, 1H), 8.88-8.84 (m, 1H), 8.17-8.10 (m, 2H), 7.75-7.66 (m, 3H), 5.39 (dd, J=3.6, 17.2 Hz, 1H), 5.23 (dd, J=36.0, 50.4 Hz, 1H); ESIMS m/z 215 ($[M-H]^-$).

Example 8: Preparation of 1,3-dibromo-5-(1-bromo-2,2,2-trifluoroethyl)-2-fluorobenzene (C44)

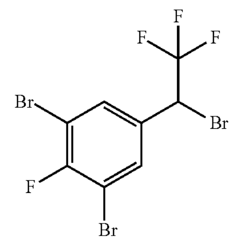

To a stirred solution of 1-(3,5-dibromo-4-fluorophenyl)-2,2,2-trifluoroethan-1-ol (C68) (22 g, 62.51 mmol) in dichloromethane (200 mL) were added N-bromosuccinimide (16.6 g, 93.77 mmol) and triphenyl phosphite (29 g, 93.77 mmol), and the reaction mixture was stirred at 40° C. for 16 hours. The reaction mixture was cooled to room temperature and concentrated under reduced pressure. Purification by column chromatography (silica gel 100-200 mesh) with petroleum ether as eluent yielded the title compound as a yellow oil (9.5 g, 37%): $^1$H NMR (300 MHz, $CDCl_3$) δ 7.66 (d, J=5.4 Hz, 2H), 5.02 (q, J=6.8 Hz, 1H); $^{19}$F NMR (282 MHz, $CDCl_3$) δ −70.60, −96.00; EIMS m/z 412 ($[M]^+$). Note: Reaction times range from 3 to 16 hours depending upon the substrate.

The following compounds were prepared in like manner to the procedure outlined in Example 8:

1-Bromo-4-(1-bromo-2,2,2-trifluoroethyl)-2-chlorobenzene (C45)

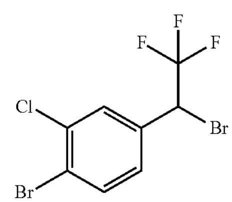

Isolated as a light yellow oil (7.0 g, 51%): $^1$H NMR (400 MHz, $CDCl_3$) δ 7.65-7.62 (m, 1H), 7.61-7.59 (m, 1H), 7.29-7.25 (m, 1H), 5.08-5.02 (m, 1H); EIMS m/z 352 ($[M]^+$).

4-(1-Bromo-2,2,2-trifluoroethyl)-1-chloro-2-(trifluoromethoxy)benzene (C46)

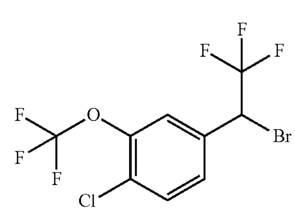 [SMILES: FC(F)(F)Oc1cc(C(Br)C(F)(F)F)ccc1Cl]

Isolated as a clear oil (2.50 g, 56%): $^1$H NMR (400 MHz, $CDCl_3$) δ 7.52 (d, J=8.4 Hz, 1H), 7.48 (s, 1H), 7.41 (dd, J=8.4, 2.1 Hz, 1H), 5.10 (q, J=7.1 Hz, 1H); $^{19}$F NMR (376 MHz, $CDCl_3$) δ −57.94, −70.63; IR (thin film) 1492, 1423 $cm^{-1}$; EIMS m/z 356 ($[M]^+$).

4-(1-Bromo-2,2,2-trifluoroethyl)-2-chloro-1-(trifluoromethoxy)benzene (C47)

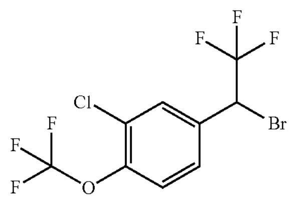 [SMILES: FC(F)(F)Oc1ccc(C(Br)C(F)(F)F)cc1Cl]

Isolated as a colorless oil (2.83 g, 62%): $^1$H NMR (400 MHz, $CDCl_3$) δ 7.65 (d, J=2.2 Hz, 1H), 7.45 (dd, J=8.6, 2.3 Hz, 1H), 7.36 (dd, J=8.6, 1.5 Hz, 1H), 5.09 (q, J=7.1 Hz, 1H); $^{19}$F NMR (376 MHz, $CDCl_3$) δ −57.75, −70.52; IR (thin film) 1497 $cm^{-1}$; EIMS m/z 356 ($[M]^+$).

1-(1-Bromo-2,2,2-trifluoroethyl)-3-chloro-5-(trifluoromethoxy)benzene (C48)

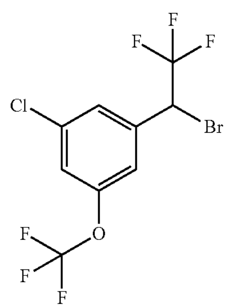 [SMILES: FC(F)(F)Oc1cc(Cl)cc(C(Br)C(F)(F)F)c1]

Isolated as a colorless oil (2.27 g, 60%): $^1$H NMR (400 MHz, $CDCl_3$) δ 7.45 (d, J=1.7 Hz, 1H), 7.30 (s, 1H), 7.28 (s, 1H), 5.07 (q, J=7.1 Hz, 1H); $^{19}$F NMR (376 MHz, $CDCl_3$) δ −58.02, −70.44; IR (thin film) 1588, 1450 $cm^{-1}$; EIMS m/z 358 ($[M]^+$).

2-Bromo-4-(1-bromo-2,2,2-trifluoroethyl)-1-chlorobenzene (C49)

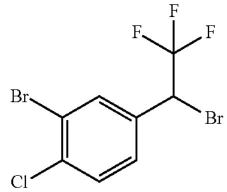

Isolated as a colorless liquid (10.5 g, 54%): $^1$H NMR (400 MHz, $CDCl_3$) δ 7.76 (d, J=1.2 Hz, 1H), 7.49-7.47 (m, 1H), 7.41-7.39 (m, 1H), 5.07-5.02 (m, 1H); IR (thin film) 3437, 2924, 1631, 1114 $cm^{-1}$; EIMS m/z 350 ($[M]^+$).

1-Bromo-5-(1-bromo-2,2,2-trifluoroethyl)-2,3-dichlorobenzene (C50)

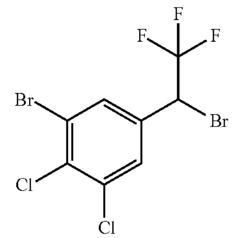

Isolated as a yellow oil (4.5 g, 46%): $^1$H NMR (400 MHz, $CDCl_3$) δ 7.58 (d, J=2.1 Hz, 1H), 7.46 (d, J=2.1 Hz, 1H), 4.35 (s, 1H); 19F NMR (376 MHz, $CDCl_3$) δ −70.40; ESIMS m/z 386 ($[M-H]^-$).

4-(1-Bromo-2,2,2-trifluoroethyl)-2-chloro-1-(trifluoromethyl)benzene (C51)

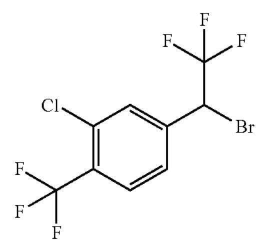 [SMILES: FC(F)(F)c1ccc(C(Br)C(F)(F)F)cc1Cl]

Isolated as a colorless oil (3.33 g, 46%): $^1$H NMR (300 MHz, $CDCl_3$) δ 7.73 (d, J=8.2 Hz, 1H), 7.68 (s, 1H), 7.52 (d, J=8.2 Hz, 1H), 5.11 (q, J=7.1 Hz, 1H); $^{13}$C NMR (75 MHz, $CDCl_3$) δ 137.94, 133.06 (d, J=1.9 Hz), 132.10, 129.93 (q, J=32.0 Hz), 128.10 (q, J=5.3 Hz), 127.47, 124.46 (d, J=48.7 Hz), 120.81 (d, J=43.9 Hz), 44.84 (q, J=34.8 Hz); EIMS m/z 342 ($[M+H]^+$).

2-Bromo-5-(1-bromo-2,2,2-trifluoroethyl)-1,3-dichlorobenzene (C52)

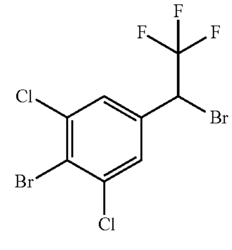

Isolated as a clear oil (19 g, 46%): $^1$H NMR (400 MHz, $CDCl_3$) δ 7.54-7.51 (m, 2H), 5.03-4.98 (m, 1H); $^{19}$F NMR (376 MHz, $CDCl_3$) δ −70.38.

4-(1-Bromo-2,2,2-trifluoroethyl)-2-chloro-1-fluorobenzene (C53)

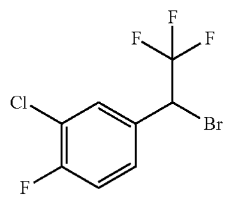 [SMILES: Fc1ccc(C(Br)C(F)(F)F)cc1Cl]

Isolated as a colorless oil (8.0 g, 73%): $^{1}$H NMR (300 MHz, $CDCl_3$) δ 7.59-7.57 (m, 1H), 7.42-7.33 (m, 1H), 7.20-7.14 (m, 1H), 5.10-5.03 (m, 1H); IR (thin film) 3429, 2926, 1502, 750 $cm^{-1}$; EIMS m/z 292 ($[M+H]^+$).

1,3-Dibromo-5-(1-bromo-2,2,2-trifluoroethyl)-2-chlorobenzene (C54)

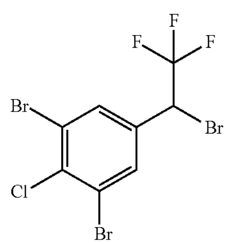

Isolated as a clear oil (28 g, 56%): $^{1}$H NMR (400 MHz, DMSO-$d_6$) δ 8.01-7.97 (m, 2H), 6.26-6.20 (m, 1H); IR (thin film) 1168, 736, 557 $cm^{-1}$; ESIMS m/z 428 ($[M+H]^+$).

5-(1-Bromo-2,2,2-trifluoroethyl)-1-chloro-2,3-difluorobenzene (C55)

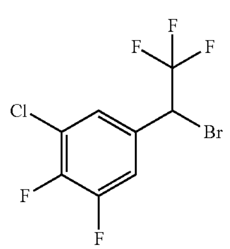 [SMILES: Fc1cc(C(Br)C(F)(F)F)cc(Cl)c1F]

Isolated as a colorless oil (2.5 g, 31%): $^{1}$H NMR (400 MHz, $CDCl_3$) δ 7.35-7.28 (m, 2H), 5.05-4.99 (m, 1H); IR (thin film) 2965, 1508, 758 $cm^{-1}$; EIMS m/z 308 ($[M]^+$).

1-Bromo-4-(1-bromo-2,2,2-trifluoroethyl)-2-(trifluoromethyl)benzene (C56)

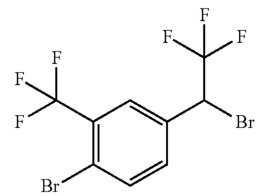 [SMILES: FC(F)(F)c1cc(C(Br)C(F)(F)F)ccc1Br]

Isolated as a yellow oil (6.5 g, 52%): $^{1}$H NMR (300 MHz, $CDCl_3$) δ 7.79 (s, 1H), 7.76 (d, J=8.7 Hz, 1H), 7.57 (d, J=8.4 Hz, 1H), 5.16-5.09 (m, 1H); IR (thin film) 1275, 750 $cm^{-1}$; EIMS m/z 386 ($[M]^+$).

5-(1-Bromo-2,2,2-trifluoroethyl)-2-chloro-1,3-difluorobenzene (C57)

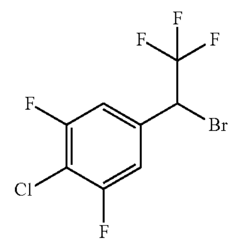 [SMILES: Fc1cc(C(Br)C(F)(F)F)cc(F)c1Cl]

Isolated as a brown oil (3.2 g, 48%): $^{1}$H NMR (400 MHz, $CDCl_3$) δ 7.17 (d, J=6.80 Hz, 2H), 5.06-5.01 (m, 1H); IR (thin film) 1038, 750, 620 $cm^{-1}$; EIMS m/z 308 ($[M]^+$).

Example 9: Preparation of 1-(3-bromo-4,5-dichlorophenyl)-2,2,2-trifluoroethan-1-ol (C58)

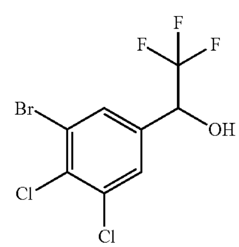

Trimethyl(trifluoromethyl)silane (3.14 mL, 21.3 mmol) and tetrabutylammonium fluoride (0.463 g, 1.77 mmol) were added to a stirred solution of 3-bromo-4,5-dichlorobenzaldehyde (4.50 g, 17.7 mmol) in tetrahydrofuran (118 mL) at room temperature and the reaction mixture was stirred for 15 hours. The reaction mixture was treated with 4 M hydrogen chloride in dioxane (5 mL). After 10 minutes the mixture was concentrated to afford the title compound as a green gum that was used without further purification (5.5 g, 86%): $^{1}$H NMR (400 MHz, $CDCl_3$) δ 7.68 (s, 1H), 7.57 (s, 1H), 5.00 (d, J=11.5 Hz, 1H), 4.75 (s, 1H); $^{19}$F NMR (376 MHz, $CDCl_3$) δ −78.32; EIMS m/z 323 ($[M-H]^-$).

The following compounds were prepared in like manner to the procedure outlined in Example 9:

1-(4-Bromo-3-chlorophenyl)-2,2,2-trifluoroethan-1-ol (C59)

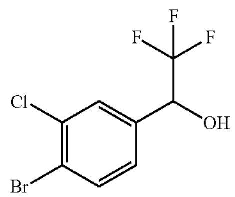 [SMILES: OC(c1ccc(Br)c(Cl)c1)C(F)(F)F]

Isolated as a brown gum (12 g, 77%): $^{1}$H NMR (400 MHz, $CDCl_3$) δ 7.65-7.60 (m, 1H), 7.59 (s, 1H), 7.23-7.19 (m, 1H), 5.09-5.01 (m, 1H), 2.86 (br s, 1H); EIMS m/z 290 ($[M]^+$).

1-(4-Chloro-3-(trifluoromethoxy)phenyl)-2,2,2-trifluoroethan-1-ol (C60)

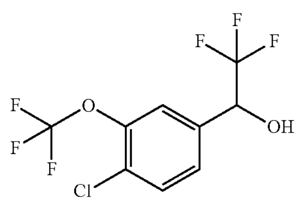 [SMILES: OC(c1ccc(Cl)c(OC(F)(F)F)c1)C(F)(F)F]

Isolated as a clear oil (3.72 g, 95%): $^{1}$H NMR (400 MHz, $CDCl_3$) δ 7.53 (d, J=8.3 Hz, 1H), 7.49 (s, 1H), 7.38 (d, J=8.4 Hz, 1H), 5.06 (dd, J=6.6, 3.4 Hz, 1H), 3.80-3.70 (m, 1H), 2.92 (s, 1H); $^{19}$F NMR (376 MHz, $CDCl_3$) δ −57.90, −78.59; IR (thin film) 3396, 1489 $cm^{-1}$; EIMS m/z 294 ($[M]^+$).

1-(3-Chloro-4-(trifluoromethoxy)phenyl)-2,2,2-trifluoroethan-1-ol (C61)

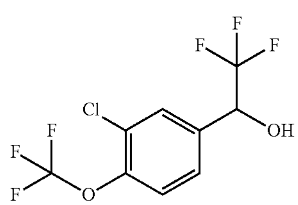 [SMILES: OC(c1ccc(OC(F)(F)F)c(Cl)c1)C(F)(F)F]

Isolated as a clear oil (3.4 g, 86%): 1H NMR (400 MHz, $CDCl_3$) δ 7.64 (dq, J=1.9, 0.6 Hz, 1H), 7.47-7.33 (m, 2H), 5.04 (qd, J=6.5, 4.4 Hz, 1H), 2.98 (d, J=4.1 Hz, 1H); IR (thin film) 3392, 1496 $cm^{-1}$; EIMS m/z 294 ($[M]^+$).

1-(3-Chloro-5-(trifluoromethoxy)phenyl)-2,2,2-trifluoroethan-1-ol (C62)

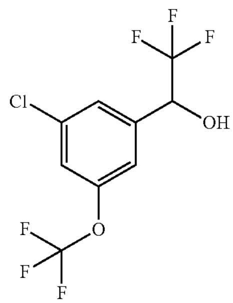 [SMILES: OC(c1cc(Cl)cc(OC(F)(F)F)c1)C(F)(F)F]

Isolated as a clear oil (3.15 g, 80%): $^{1}$H NMR (400 MHz, $CDCl_3$) δ 7.45 (s, 1H), 7.30-7.26 (m, 2H), 5.04 (q, J=6.4 Hz, 1H); $^{19}$F NMR (376 MHz, $CDCl_3$) δ −58.01, −78.40; IR (thin film) 3305, 1587, 1442 $cm^{-1}$; EIMS m/z 294 ($[M]^+$).

1-(3-Chloro-4-(trifluoromethyl)phenyl)-2,2,2-trifluoroethan-1-ol (C63)

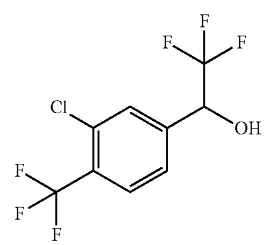 [SMILES: OC(c1ccc(C(F)(F)F)c(Cl)c1)C(F)(F)F]

Isolated as a colorless oil (5.90 g, 88%): $^{1}$H NMR (400 MHz, $CDCl_3$) δ 7.74 (d, J=8.2 Hz, 1H), 7.68 (s, 1H), 7.50 (d, J=8.1, 2.0, 0.9 Hz, 1H), 5.25-4.95 (m, 1H), 3.14 (s, 1H); $^{13}$C NMR (75 MHz, $CDCl_3$) δ 139.39, 132.66, 130.35, 129.22 (q, J=31.5 Hz), 127.67 (q, J=5.3 Hz), 129.69-116.91 (m), 117.16, 71.40 (q, J=32.4 Hz); EIMS m/z 278 ($[M]^+$).

1-(3-Chloro-4,5-difluorophenyl)-2,2,2-trifluoroethan-1-ol (C64)

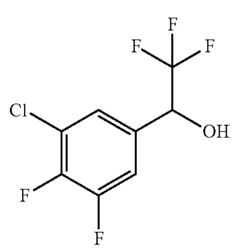 [SMILES: OC(c1cc(F)c(F)c(Cl)c1)C(F)(F)F]

Isolated as a colorless oil (4.6 g, 33%): $^{1}$H NMR (300 MHz, $CDCl_3$) δ 7.34-7.30 (m, 2H), 5.01-4.95 (m, 1H), 3.21 (br s, 1H); IR (thin film) 3302, 1709, 750 $cm^{-1}$; EIMS m/z 246 ($[M]^+$).

1-(3-Bromo-4-chlorophenyl)-2,2,2-trifluoroethan-1-ol (C65)

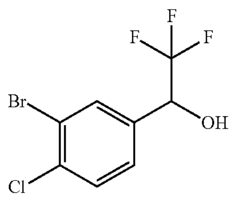 [SMILES: OC(c1ccc(Cl)c(Br)c1)C(F)(F)F]

Isolated as a brown oil (13.2 g, 94%): $^{1}$H NMR (300 MHz, DMSO-$d_6$) δ 7.76 (s, 1H), 7.50-7.48 (m, 1H), 7.38-7.35 (m, 1H), 5.03-4.97 (m, 1H), 2.95 (br s, 1H); IR (thin film) 3406, 2881, 1469, 814 $cm^{-1}$; EIMS m/z 288 ($[M]^+$).

1-(4-Bromo-3-(trifluoromethyl)phenyl)-2,2,2-trifluoroethan-1-ol (C66)

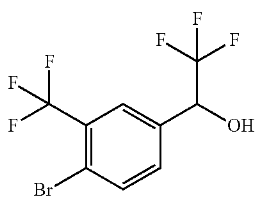

Isolated as a yellow oil (11.0 g, 75%): $^{1}$H NMR (400 MHz, $CDCl_3$) δ 7.81 (s, 1H), 7.88 (d, J=8.4 Hz, 1H), 7.54 (d, J=8.4 Hz, 1H), 5.11-5.05 (m, 1H), 2.95 (br s, 1H); IR (thin film) 1708, 1175, 790 $cm^{-1}$; EIMS m/z 322 ($[M]^+$).

1-(4-Chloro-3,5-difluorophenyl)-2,2,2-trifluoroethan-1-ol (C67)

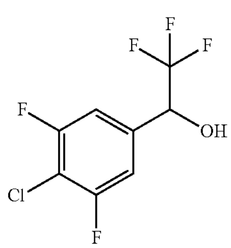 [SMILES: OC(c1cc(F)c(Cl)c(F)c1)C(F)(F)F]

Isolated as a brown oil (7.0 g, 78%): $^{1}$H NMR (400 MHz, $CDCl_3$) δ 7.16 (d, J=7.2 Hz, 2H), 5.04-5.00 (m, 1H), 2.79 (br s, 1H); IR (thin film) 1033, 750 $cm^{-1}$; EIMS m/z 246 ($[M]^+$).

Example 10: Preparation of 1-(3,5-dibromo-4-fluorophenyl)-2,2,2-trifluoroethan-1-ol (C68)

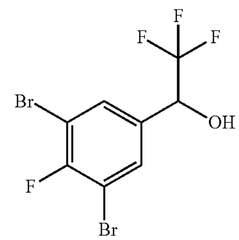

Step 1: 1-(3,5-Dibromo-4-fluorophenyl)-2,2,2-trifluoroethan-1-one

To a solution of 1-(3-bromo-4-fluorophenyl)-2,2,2-trifluoroethan-1-one (C69) (60 g, 222 mmol) in sulfuric acid (160 mL) at 0° C. was added N-bromosuccinimide (59.2 g, 333 mmol) portion-wise over a period of 15 minutes, and the reaction mixture was stirred at room temperature for 16 hours. The reaction mixture was poured carefully into ice water and was extracted with ethyl acetate (3×100 mL). The organic layer was washed with brine, dried over sodium sulfate, filtered and concentrated under reduced pressure. The crude product was taken up in petroleum ether (30 mL), filtered and the filtrate was concentrated under reduced pressure to afford the title compound (70 g, crude) as a yellow oil. The crude product was used in the next step without purification: ESIMS m/z 347 ($[M-H]^-$); 12% of starting material and 18% of the tribromo analog mass were also observed in the LC-MS. Note: The reaction was performed in four batches (4×15 g) and all four batches were combined prior to workup.

Step 2: 1-(3,5-Dibromo-4-fluorophenyl)-2,2,2-trifluoroethan-1-ol (C68)

To a solution of 1-(3,5-dibromo-4-fluorophenyl)-2,2,2-trifluoroethan-1-one (70 g, 200 mmol) in methanol (280 mL) was added sodium borohydride (11 g, 2911 mmol) portion-wise at 0° C., and the reaction mixture was stirred at room temperature for 2 hours. The reaction mixture was quenched with ice water and extracted with ethyl acetate (3×150 mL). The organic layer was washed with brine, dried over sodium sulfate, filtered and concentrated under reduced pressure. Purification by column chromatography (silica gel, 100-200 mesh) using 60-90% dichloromethane in petroleum ether as eluent afforded the title compound (22 g, 28% over two steps) as a yellow oil: 1H NMR (300 MHz, $CDCl_3$) δ 7.64 (d, J=6.0 Hz, 2H), 5.03-4.93 (m, 1H), 3.04 (d, J=4.2 Hz, 1H); $^{19}$F NMR (282 MHz, $CDCl_3$) δ −78.50, −97.60; ESIMS m/z 349 ($[M-H]^-$).

Example 11: Preparation of 1-(3-bromo-4-fluorophenyl)-2,2,2-trifluoroethan-1-one (C69)

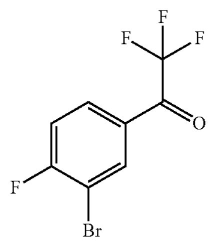 [SMILES: O=C(c1ccc(F)c(Br)c1)C(F)(F)F]

To a solution of 2,2,2,4-tetrafluoroacetophenone (48 g, 250 mmol) in sulfuric acid (96 mL) was added N-bromosuccinimide (48.9 g, 275 mmol) at room temperature in one portion, and the reaction mixture was stirred at 60° C. for 16 hours. The reaction mixture was poured carefully into ice water and was extracted with ethyl acetate (3×100 mL). The organic layer was washed with brine, dried over sodium sulfate, filtered and concentrated under reduced pressure. The crude product was taken up in petroleum ether (50 mL), filtered and the filtrate was concentrated under reduced pressure to afford the title compound (60 g, 89%) as a yellow oil. Note: The reaction was performed in four batches (4×12 g) and all four batches were combined before workup. $^{1}$H NMR (300 MHz, $CDCl_3$) δ 8.31 (d, J=5.1 Hz, 1H), 8.08-8.02 (m, 1H), 7.32-7.26 (m, 1H); $^{19}$F NMR (282 MHz, $CDCl_3$) δ −71.45, −93.85; ESIMS m/z 269 ([M−H]$^{-}$).

Example 12: Preparation of 4-bromo-3-(trifluoromethyl)benzaldehyde (C70)

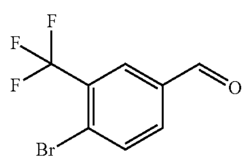 [SMILES: O=Cc1ccc(Br)c(C(F)(F)F)c1]

To a solution of (4-bromo-3-(trifluoromethyl)phenyl) methanol (C72) (12.0 g, 47.1 mmol) in dichloromethane (100 mL) was added manganese dioxide (25.6 g, 294 mmol). After stirring for 12 hours, the mixture was filtered through Celite® and the filtrate was concentrated in vacuo to afford the title compound as a pale yellow solid (10.0 g, 82%): $^{1}$H NMR (300 MHz, $CDCl_3$) δ 10.05 (s, 1H), 8.19 (s, 1H), 7.94-7.88 (m, 2H); IR (thin film) 1704, 1123 cm$^{-1}$; EIMS m/z 219 ([M]$^{+}$).

Example 13: Preparation of 4-chloro-3,5-difluorobenzaldehyde (C71)

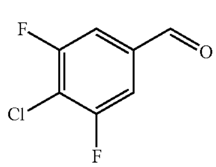 [SMILES: O=Cc1cc(F)c(Cl)c(F)c1]

To a solution of 5-bromo-2-chloro-1,3-difluorobenzene (6.0 g, 44.0 mmol) in anhydrous diethyl ether (100 mL) cooled in a −78° C. bath was added a solution of n-butyllithium in hexanes (17.6 mL, 44.0 mmol). After 30 minutes, N,N-dimethylformamide (3.21 g, 44.0 mmol) was added, the reaction mixture was stirred with cooling for 1 hour, then poured onto ice water. The mixture was extracted with dichloromethane. The organic phase was dried over sodium sulfate, filtered, and concentrated under reduced pressure. Purification by column chromatography (silica gel, eluting with 5% ethyl acetate in hexanes) afforded the title compound as an off-white solid (6.0 g, 76%): mp 54-56° C.; $^{1}$H NMR (300 MHz, $CDCl_3$) δ 9.92 (t, J=1.2 Hz, 1H), 7.52-7.49 (m, 2H); EIMS m/z 176 ([M]$^{+}$).

Example 14: Preparation of (4-bromo-3-(trifluoromethyl)phenyl)methanol (C72)

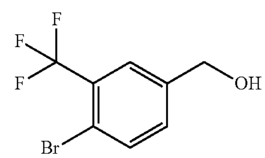 [SMILES: OCc1ccc(Br)c(C(F)(F)F)c1]

To a solution of 4-bromo-3-trifluoromethylbenzoic acid (15.0 g, 55.8 mmol) in tetrahydrofuran (100 mL) cooled in an ice bath was added a solution of borane-tetrahydrofuran complex in tetrahydrofuran (14.4 g, 0.167 mol). The reaction mixture was warmed to room temperature, stirred for 4 hours and then poured onto ice water. The mixture was extracted with ethyl acetate. The organic phase was dried over sodium sulfate, filtered, and concentrated under reduced pressure. The title compound was isolated as a pale yellow solid (12.0 g, 85%): $^{1}$H NMR (300 MHz, $CDCl_3$) δ 7.71 (d, J=8.1 Hz, 2H), 7.40 (d, J=7.8 Hz, 1H), 4.73 (s, 2H); IR (thin film) 3400, 2928, 1139 cm$^{-1}$; EIMS m/z 254 ([M]$^{+}$).

Example 15: Preparation of (Z)-4-(3-(3,5-dibromo-4-fluorophenyl)-1,4,4,4-tetrafluorobut-1-en-1-yl)-N'-phenyl-2-(trifluoromethyl)benzohydrazide (F45)

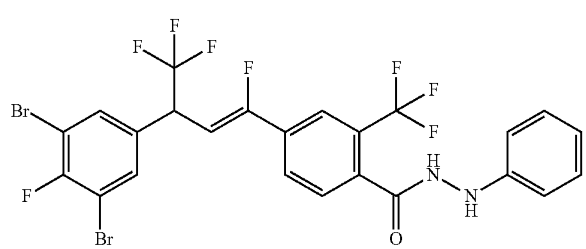 [SMILES: O=C(NNc1ccccc1)c1ccc(/C(F)=C/C(c2cc(Br)c(F)c(Br)c2)C(F)(F)F)cc1C(F)(F)F]

(Z)-4-(3-(3,5-Dibromo-4-fluorophenyl)-1,4,4,4-tetrafluorobut-1-en-1-yl)-2-(trifluoromethyl)benzoic acid (C24) (0.100 g, 0.176 mmol) was added to a vial with phenylhydrazine (0.035 mL, 0.352 mmol), and benzotriazol-1-yl-oxytripyrrolidinophosphonium hexafluorophosphate (0.183 g, 0.352 mmol). Dichloromethane (1.76 mL) and triethylamine (0.098 mL, 0.704 mmol) were added sequentially. The reaction mixture was stirred for 1 hour and was concentrated directly onto diatomaceous earth. Purification by silica gel chromatography eluting with a gradient of 0-30% acetone in hexanes provided the title compound as a yellow foam (0.068 g, 53%).

The following compounds were prepared in like manner to the procedure outlined in Example 15:

(Z)-4-(3-(3,5-Dibromo-4-fluorophenyl)-1,4,4,4-tetrafluorobut-1-en-1-yl)-N'-(pyridin-2-yl)-2-(trifluoromethyl)benzohydrazide (F6)

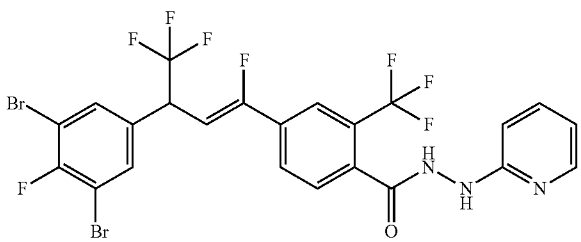

Isolated as a yellow foam (0.066 g, 51%).

(Z)—N-(1H-Imidazol-1-yl)-4-(1,4,4,4-tetrafluoro-3-(3,4,5-tri chlorophenyl)but-1-en-1-yl)-2-(trifluoromethyl)benzamide (F10)

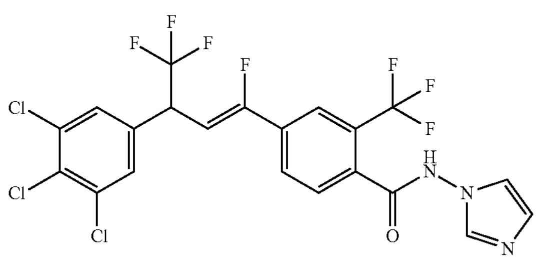 [SMILES: O=C(Nn1ccnc1)c1ccc(/C(F)=C/C(c2cc(Cl)c(Cl)c(Cl)c2)C(F)(F)F)cc1C(F)(F)F]

Isolated as a white amorphous solid (0.073 g, 86%).

(Z)—N'-(4,6-Dichloro-1,3,5-triazin-2-yl)-4-(1,4,4,4-tetrafluoro-3-(3,4,5-trichlorophenyl)but-1-en-1-yl)-2-(trifluoromethyl)benzohydrazide (F13)

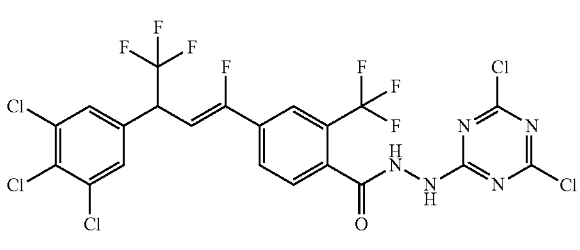 [SMILES: O=C(NNc1nc(Cl)nc(Cl)n1)c1ccc(/C(F)=C/C(c2cc(Cl)c(Cl)c(Cl)c2)C(F)(F)F)cc1C(F)(F)F]

Isolated as a pale yellow glass (0.056 g, 40%).

(Z)—N'-(6-Chloropyridin-2-yl)-4-(1,4,4,4-tetrafluoro-3-(3,4,5-trichlorophenyl)but-1-en-1-yl)-2-(trifluoromethyl)benzohydrazide (F18)

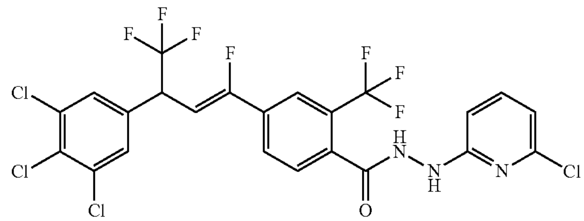 [SMILES: O=C(NNc1cccc(Cl)n1)c1ccc(/C(F)=C/C(c2cc(Cl)c(Cl)c(Cl)c2)C(F)(F)F)cc1C(F)(F)F]

Isolated as a pale yellow glass (0.050 g, 47%).

(Z)-4-(1,4,4,4-Tetrafluoro-3-(3,4,5-trichlorophenyl)but-1-en-1-yl)-N'-(1,4,5,6-tetrahydropyrimidin-2-yl)-2-(trifluoromethyl)benzohydrazide (F27)

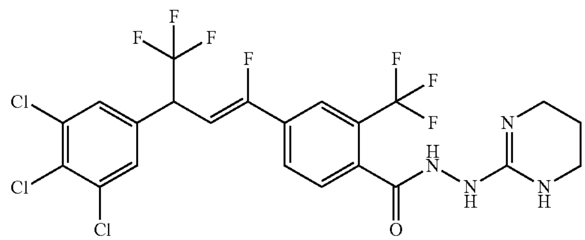 [SMILES: O=C(NNC1=NCCCN1)c1ccc(/C(F)=C/C(c2cc(Cl)c(Cl)c(Cl)c2)C(F)(F)F)cc1C(F)(F)F]

Isolated as a yellow amorphous solid (0.071 g, 72%).

(Z)—N'-(6-Fluoropyridin-2-yl)-4-(1,4,4,4-tetrafluoro-3-(3,4,5-trichlorophenyl)but-1-en-1-yl)-2-(trifluoromethyl)benzohydrazide (F34)

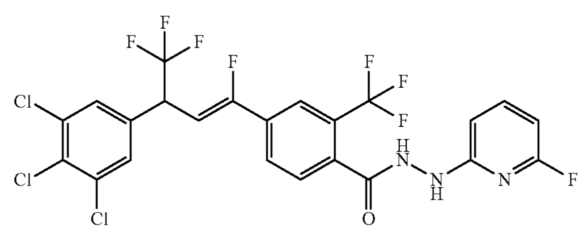 [SMILES: O=C(NNc1cccc(F)n1)c1ccc(/C(F)=C/C(c2cc(Cl)c(Cl)c(Cl)c2)C(F)(F)F)cc1C(F)(F)F]

Isolated as a white amorphous solid (0.076 g, 74%).

(Z)-4-(3-(4-Chloro-3-(trifluoromethoxy)phenyl)-1,4,4,4-tetrafluorobut-1-en-1-yl)-N'-(pyrimidin-2-yl)-2-(trifluoromethyl)benzohydrazide (F42)

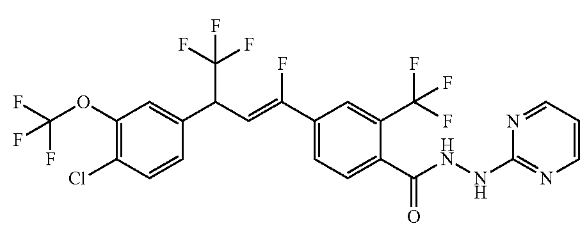 [SMILES: O=C(NNc1ncccn1)c1ccc(/C(F)=C/C(c2ccc(Cl)c(OC(F)(F)F)c2)C(F)(F)F)cc1C(F)(F)F]

Isolated as a pale yellow glass (0.046 g, 35%).

(Z)-4-(1,4,4,4-Tetrafluoro-3-(3,4,5-trichlorophenyl)but-1-en-1-yl)-N-(4H-1,2,4-triazol-4-yl)-2-(trifluoromethyl)benzamide (F48)

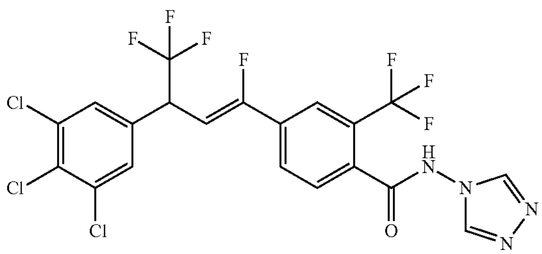 [SMILES: O=C(Nn1cnnc1)c1ccc(/C(F)=C/C(c2cc(Cl)c(Cl)c(Cl)c2)C(F)(F)F)cc1C(F)(F)F]

Isolated as a yellow glass (0.056 g, 59%).

(Z)-4-(3-(3-Chloro-4-(trifluoromethoxy)phenyl)-1,4,4,4-tetrafluorobut-1-en-1-yl)-N'-(pyrimidin-2-yl)-2-(trifluoromethyl)benzohydrazide (F50)

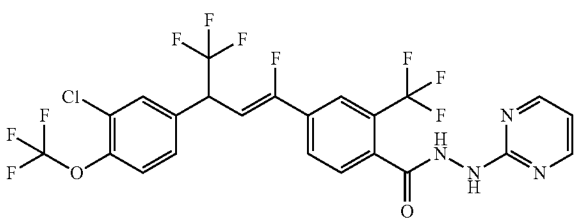 [SMILES: O=C(NNc1ncccn1)c1ccc(/C(F)=C/C(c2ccc(OC(F)(F)F)c(Cl)c2)C(F)(F)F)cc1C(F)(F)F]

Isolated as a pale yellow glass (0.033 g, 40%).

(Z)—N-(1H-Pyrrol-1-yl)-4-(1,4,4,4-tetrafluoro-3-(3,4,5-trichlorophenyl)but-1-en-1-yl)-2-(trifluoromethyl)benzamide (F51)

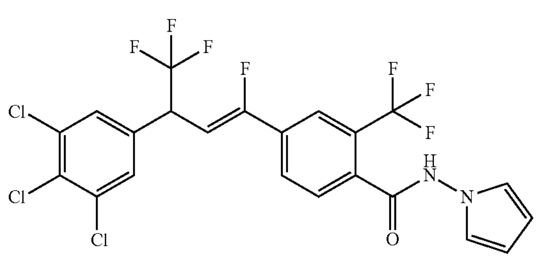 [SMILES: O=C(Nn1cccc1)c1ccc(/C(F)=C/C(c2cc(Cl)c(Cl)c(Cl)c2)C(F)(F)F)cc1C(F)(F)F]

Isolated as a yellow oil (0.043 g, 46%).

(Z)—N'-(4-Chloro-1,3,5-triazin-2-yl)-4-(1,4,4,4-tetrafluoro-3-(3,4,5-trichlorophenyl)but-1-en-1-yl)-2-(trifluoromethyl)benzohydrazide (F58)

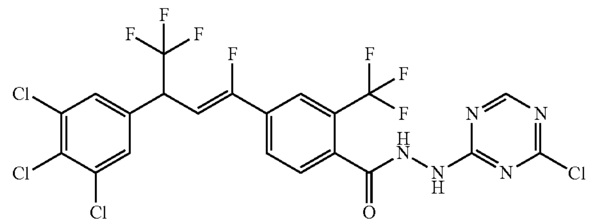 [SMILES: O=C(NNc1ncnc(Cl)n1)c1ccc(/C(F)=C/C(c2cc(Cl)c(Cl)c(Cl)c2)C(F)(F)F)cc1C(F)(F)F]

Isolated as a pale yellow oil (0.044 g, 39%).

(Z)-4-(3-(4-Chloro-3-(trifluoromethoxy)phenyl)-1,4,4,4-tetrafluorobut-1-en-1-yl)-N'-methyl-N'-(pyridin-2-yl)-2-(trifluoromethyl)benzohydrazide (F60)

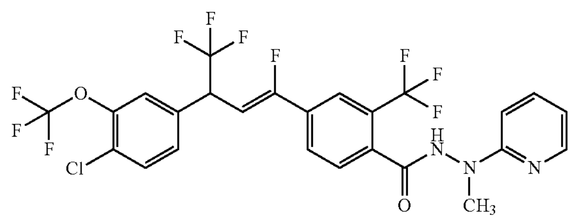 [SMILES: CN(NC(=O)c1ccc(/C(F)=C/C(c2ccc(Cl)c(OC(F)(F)F)c2)C(F)(F)F)cc1C(F)(F)F)c1ccccn1]

Isolated as a pale yellow glass (0.046 g, 32%).

(Z)-4-(3-(3-Chloro-5-(trifluoromethoxy)phenyl)-1,4,4,4-tetrafluorobut-1-en-1-yl)-N'-methyl-N'-(pyridin-2-yl)-2-(trifluoromethyl)benzohydrazide (F61)

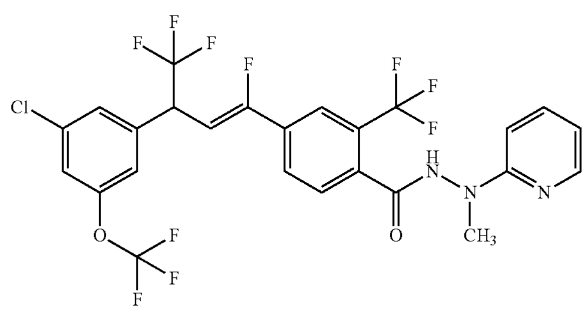 [SMILES: CN(NC(=O)c1ccc(/C(F)=C/C(c2cc(Cl)cc(OC(F)(F)F)c2)C(F)(F)F)cc1C(F)(F)F)c1ccccn1]

Isolated as a pale yellow glass (0.088 g, 91%).

(Z)-4-(1,4,4,4-Tetrafluoro-3-(3,4,5-trichlorophenyl)but-1-en-1-yl)-N-(1H-1,2,3-triazol-1-yl)-2-(trifluoromethyl)benzamide (F62)

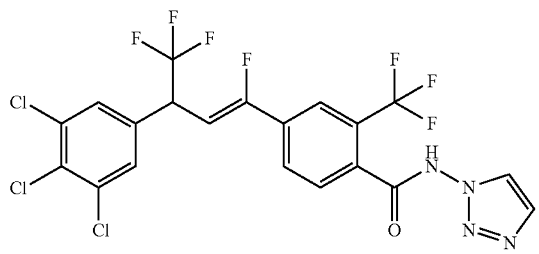 [SMILES: O=C(Nn1ccnn1)c1ccc(/C(F)=C/C(c2cc(Cl)c(Cl)c(Cl)c2)C(F)(F)F)cc1C(F)(F)F]

Isolated as a yellow oil (0.064 g, 68%).

(Z)-4-(1,4,4,4-Tetrafluoro-3-(3,4,5-trichlorophenyl)but-1-en-1-yl)-N'-(p-tolyl)-2-(trifluoromethyl)benzohydrazide (F68)

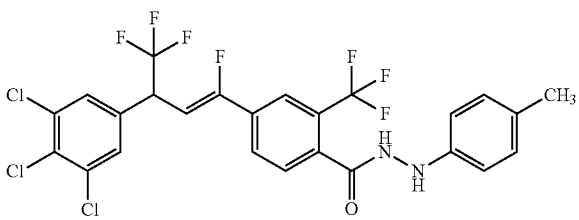 [SMILES: Cc1ccc(NNC(=O)c2ccc(/C(F)=C/C(c3cc(Cl)c(Cl)c(Cl)c3)C(F)(F)F)cc2C(F)(F)F)cc1]

Isolated as a pale yellow glass (0.074 g, 76%).

(Z)-4-(1,4,4,4-Tetrafluoro-3-(3,4,5-trichlorophenyl)but-1-en-1-yl)-2-(trifluoromethyl)-N'-(2,5,6-trimethylpyrimidin-4-yl)benzohydrazide (F75)

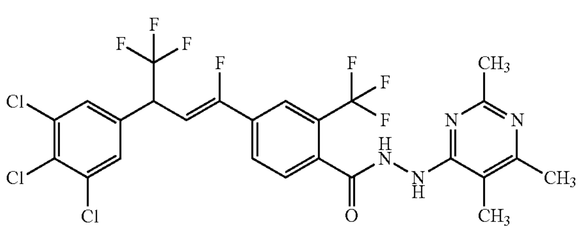 [SMILES: Cc1nc(C)c(C)c(NNC(=O)c2ccc(/C(F)=C/C(c3cc(Cl)c(Cl)c(Cl)c3)C(F)(F)F)cc2C(F)(F)F)n1]

Isolated as a pale yellow foam (0.098 g, 96%).

(Z)—N'-(6-Chloro-2-methylpyrimidin-4-yl)-4-(1,4,4,4-tetrafluoro-3-(3,4,5-trichlorophenyl)but-1-en-1-yl)-2-(trifluoromethyl)benzohydrazide (F79)

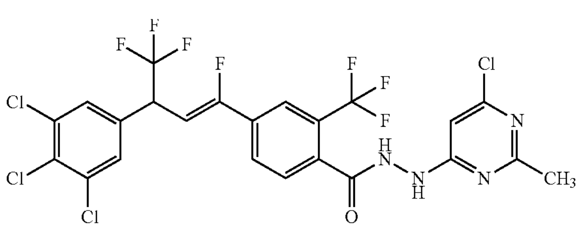 [SMILES: Cc1nc(Cl)cc(NNC(=O)c2ccc(/C(F)=C/C(c3cc(Cl)c(Cl)c(Cl)c3)C(F)(F)F)cc2C(F)(F)F)n1]

Isolated as a pale yellow glass (0.025 g, 24%).

(Z)—N-(1H-Indol-1-yl)-4-(1,4,4,4-tetrafluoro-3-(3,4,5-trichlorophenyl)but-1-en-1-yl)-2-(trifluoromethyl)benzamide (F89)

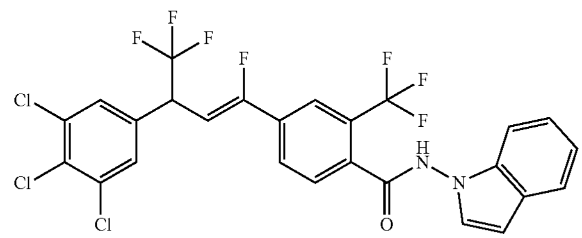 [SMILES: O=C(Nn1ccc2ccccc21)c1ccc(/C(F)=C/C(c2cc(Cl)c(Cl)c(Cl)c2)C(F)(F)F)cc1C(F)(F)F]

Isolated as a white foamy solid (0.020 g, 23%).

(Z)—N'-(5-Chloropyridin-2-yl)-4-(1,4,4,4-tetrafluoro-3-(3,4,5-trichlorophenyl)but-1-en-1-yl)-2-(trifluoromethyl)benzohydrazide (F93)

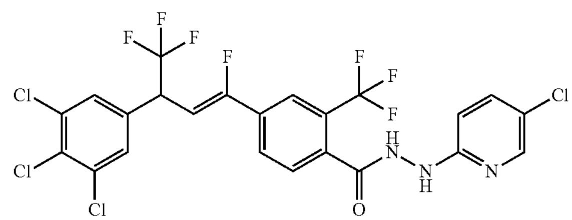 [SMILES: O=C(NNc1ccc(Cl)cn1)c1ccc(/C(F)=C/C(c2cc(Cl)c(Cl)c(Cl)c2)C(F)(F)F)cc1C(F)(F)F]

Isolated as a pale yellow glass (0.073 g, 73%).

(Z)-4-(3-(3-Chloro-5-(trifluoromethoxy)phenyl)-1,4,4,4-tetrafluorobut-1-en-1-yl)-N'-(pyrimidin-2-yl)-2-(trifluoromethyl)benzohydrazide (F106)

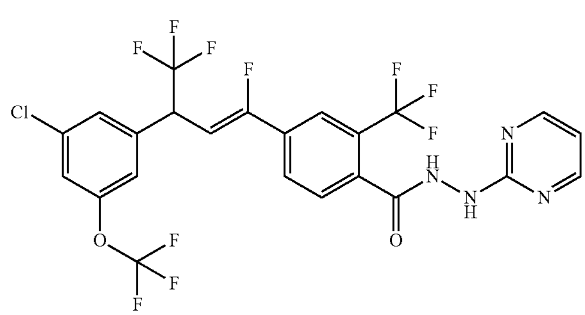 [SMILES: O=C(NNc1ncccn1)c1ccc(/C(F)=C/C(c2cc(Cl)cc(OC(F)(F)F)c2)C(F)(F)F)cc1C(F)(F)F]

Isolated as a pale yellow glass (0.026 g, 28%).

(Z)-4-(3-(3-Chloro-4-(trifluoromethoxy)phenyl)-1,4,4,4-tetrafluorobut-1-en-1-yl)-N'-methyl-N'-(pyridin-2-yl)-2-(trifluoromethyl)benzohydrazide (F107)

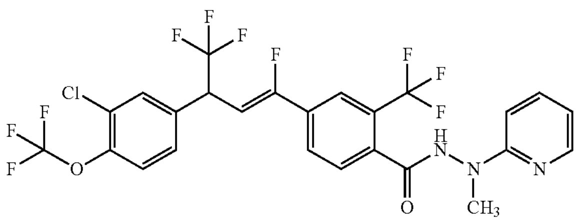 [SMILES: CN(NC(=O)c1ccc(/C(F)=C/C(c2ccc(OC(F)(F)F)c(Cl)c2)C(F)(F)F)cc1C(F)(F)F)c1ccccn1]

Isolated as a foamy clear oil (0.053 g, 70%).

(Z)—N'-(4,5-Dihydro-1H-imidazol-2-yl)-4-(1,4,4,4-tetrafluoro-3-(3,4,5-trichlorophenyl)but-1-en-1-yl)-2-(trifluoromethyl)benzohydrazide (F116)

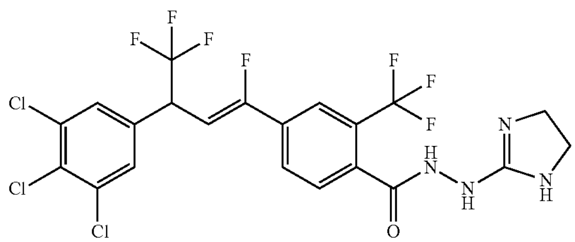 [SMILES: O=C(NNC1=NCCN1)c1ccc(/C(F)=C/C(c2cc(Cl)c(Cl)c(Cl)c2)C(F)(F)F)cc1C(F)(F)F]

Isolated as a white foamy solid (0.0573 g, 70%).

(Z)-4-(3-(3,5-Dibromo-4-fluorophenyl)-1,4,4,4-tetrafluorobut-1-en-1-yl)-N'-methyl-N'-phenyl-2-(trifluoromethyl)benzohydrazide (F123)

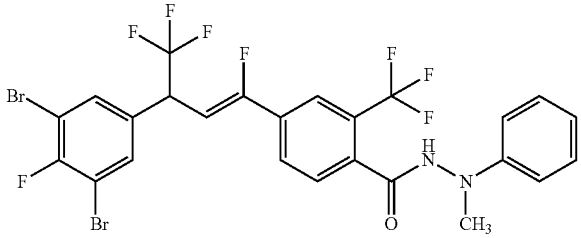

Isolated as a yellow foam (0.049 g, 37%).

(Z)—N'-(1,1-Dioxidotetrahydrothiophen-3-yl)-4-(1,4,4,4-tetrafluoro-3-(3,4,5-trichlorophenyl)but-1-en-1-yl)-2-(trifluoromethyl)benzohydrazide (F135)

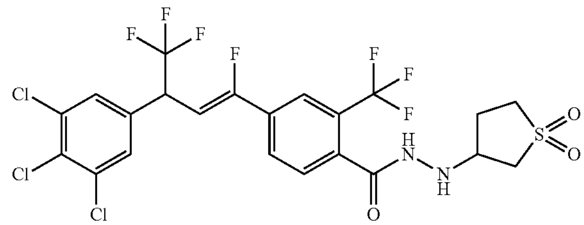 [SMILES: O=C(NNC1CCS(=O)(=O)C1)c1ccc(/C(F)=C/C(c2cc(Cl)c(Cl)c(Cl)c2)C(F)(F)F)cc1C(F)(F)F]

Isolated as a white foamy solid (0.068 g, 77%).

(Z)-4-(1,4,4,4-Tetrafluoro-3-(3,4,5-trichlorophenyl)but-1-en-1-yl)-2-(trifluoromethyl)-N'-(6-(trifluoromethyl)pyridin-2-yl)benzohydrazide (F141)

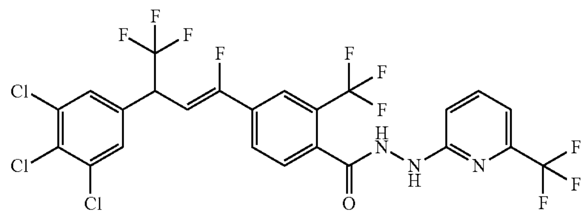 [SMILES: O=C(NNc1cccc(C(F)(F)F)n1)c1ccc(/C(F)=C/C(c2cc(Cl)c(Cl)c(Cl)c2)C(F)(F)F)cc1C(F)(F)F]

Isolated as a yellow glass (0.055 g, 52%).

(Z)—N'-(2-Cyanoethyl)-4-(1,4,4,4-tetrafluoro-3-(3,4,5-trichlorophenyl)but-1-en-1-yl)-2-(trifluoromethyl)benzohydrazide (F142)

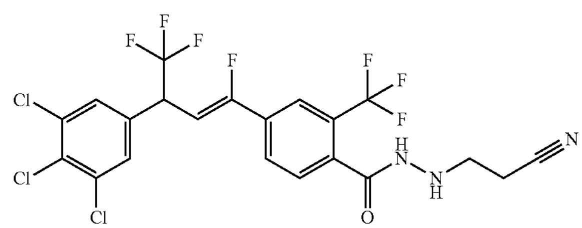 [SMILES: N#CCCNNC(=O)c1ccc(/C(F)=C/C(c2cc(Cl)c(Cl)c(Cl)c2)C(F)(F)F)cc1C(F)(F)F]

Isolated as a yellow glass (0.043 g, 47%).

(Z)—N'-(2-(Dimethylamino)ethyl)-4-(1,4,4,4-tetrafluoro-3-(3,4,5-trichlorophenyl)but-1-en-1-yl)-2-(trifluoromethyl)benzohydrazide (F143)

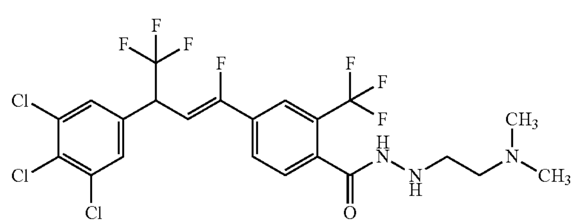 [SMILES: CN(C)CCNNC(=O)c1ccc(/C(F)=C/C(c2cc(Cl)c(Cl)c(Cl)c2)C(F)(F)F)cc1C(F)(F)F]

Isolated as a yellow glass (0.088 g, 80%).

(Z)—N'-Isopentyl-4-(1,4,4,4-tetrafluoro-3-(3,4,5-trichlorophenyl)but-1-en-1-yl)-2-(trifluoromethyl)benzohydrazide (F145)

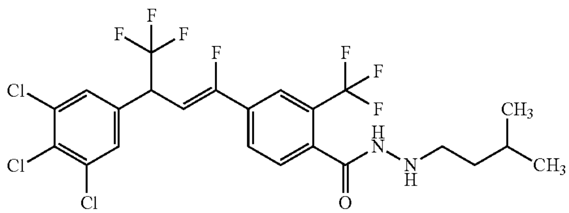 [SMILES: CC(C)CCNNC(=O)c1ccc(/C(F)=C/C(c2cc(Cl)c(Cl)c(Cl)c2)C(F)(F)F)cc1C(F)(F)F]

Isolated as a yellow glass (0.043 g, 46%).

(Z)—N'-Isobutyl-4-(1,4,4,4-tetrafluoro-3-(3,4,5-trichlorophenyl)but-1-en-1-yl)-2-(trifluoromethyl)benzohydrazide (F157)

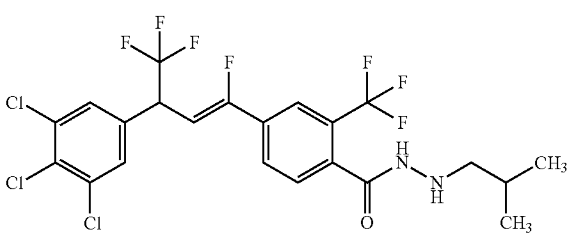 [SMILES: CC(C)CNNC(=O)c1ccc(/C(F)=C/C(c2cc(Cl)c(Cl)c(Cl)c2)C(F)(F)F)cc1C(F)(F)F]

Isolated as a yellow glass (0.036 g, 37%).

(Z)-4-(3-(3,5-Dibromo-4-fluorophenyl)-1,4,4,4-tetrafluorobut-1-en-1-yl)-N'-(pyrimidin-2-yl)-2-(trifluoromethyl)benzohydrazide (F163)

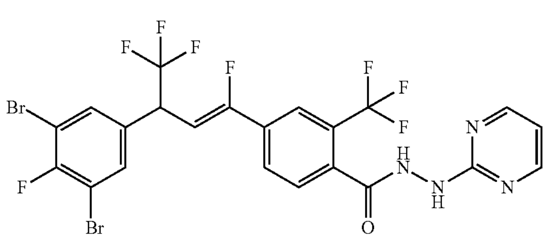

Isolated as an opaque solid (0.015 g, 13%).

(Z)-4-(3-(3-Chloro-4-(trifluoromethyl)phenyl)-1,4,4,4-tetrafluorobut-1-en-1-yl)-N'-(pyrimidin-2-yl)-2-(trifluoromethyl)benzohydrazide (F167)

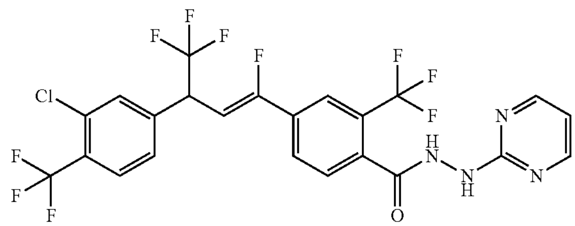 [SMILES: O=C(NNc1ncccn1)c1ccc(/C(F)=C/C(c2ccc(C(F)(F)F)c(Cl)c2)C(F)(F)F)cc1C(F)(F)F]

Isolated as a clear oil (0.017 g, 14%).

tert-Butyl (Z)-2-(4-(1,4,4,4-tetrafluoro-3-(3,4,5-trichlorophenyl)but-1-en-1-yl)-2-(trifluoromethyl)benzoyl)hydrazine-1-carboxylate (C73)

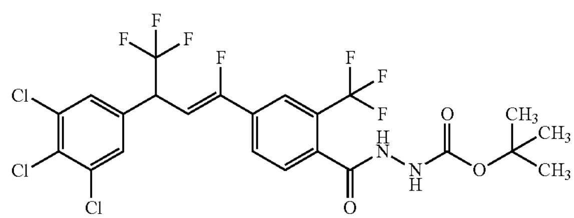 [SMILES: CC(C)(C)OC(=O)NNC(=O)c1ccc(/C(F)=C/C(c2cc(Cl)c(Cl)c(Cl)c2)C(F)(F)F)cc1C(F)(F)F]

Isolated as a clear foamy oil (0.606 g, 99%): $^1$H NMR (400 MHz, $CDCl_3$) δ 7.89 (d, J=1.5 Hz, 1H), 7.79 (dd, J=8.1, 1.7 Hz, 1H), 7.73 (d, J=8.7 Hz, 1H), 7.57 (s, 1H), 7.44 (s, 2H), 7.34 (s, 1H), 5.84 (dd, J=32.5, 9.6 Hz, 1H), 4.61 (p, J=8.8 Hz, 1H), 1.51 (s, 9H); ESIMS m/z 609 ([M+H]$^+$).

tert-Butyl (Z)-1-methyl-2-(4-(1,4,4,4-tetrafluoro-3-(3,4,5-trichlorophenyl)but-1-en-1-yl)-2-(trifluoromethyl)benzoyl)hydrazine-1-carboxylate (C74)

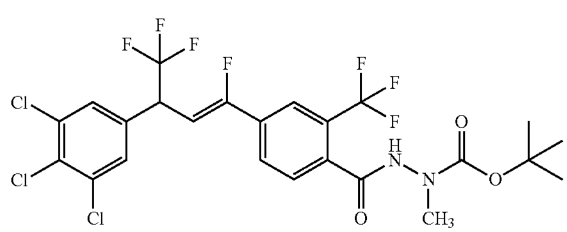 [SMILES: CN(NC(=O)c1ccc(/C(F)=C/C(c2cc(Cl)c(Cl)c(Cl)c2)C(F)(F)F)cc1C(F)(F)F)C(=O)OC(C)(C)C]

Isolated as a yellow glass (0.680 g, 77%): $^1$H NMR (400 MHz, $CDCl_3$) δ 7.88 (s, 1H), 7.80 (d, J=7.8 Hz, 1H), 7.51 (s, 1H), 7.44 (s, 2H), 5.84 (dd, J=32.5, 9.6 Hz, 1H), 4.61 (p, J=8.9 Hz, 1H), 3.24 (s, 3H), 1.51 (s, 9H); ESIMS m/z 623 ([M+H]$^+$).

Example 16: Preparation of (Z)-4-(1,4,4,4-tetrafluoro-3-(3,4,5-trichlorophenyl)but-1-en-1-yl)-N'-(2,2,2-trifluoroethyl)-2-(trifluoromethyl)benzohydrazide (F49)

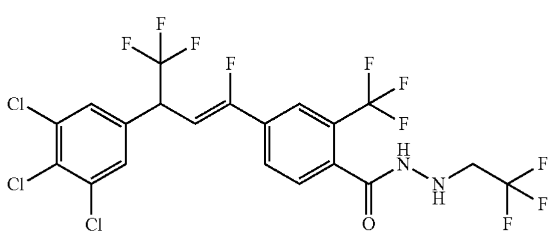 [SMILES: O=C(NNCC(F)(F)F)c1ccc(/C(F)=C/C(c2cc(Cl)c(Cl)c(Cl)c2)C(F)(F)F)cc1C(F)(F)F]

To a stirred solution of (Z)-4-(1,4,4,4-tetrafluoro-3-(3,4,5-trichlorophenyl)but-1-en-1-yl)-2-(trifluoromethyl)benzoic acid (C2) (0.100 g, 0.202 mmol) in dichloromethane (5.0 mL) were added sequentially (2,2,2-trifluoroethyl)hydrazine (0.0493 g, 0.303 mmol) followed by benzotriazol-1-yl-oxytripyrrolidinophosphonium hexafluorophosphate (0.158 g, 0.303 mmol) and triethylamine (0.113 mL, 0.807 mmol). The reaction mixture was stirred at room temperature for 18 hours. The reaction mixture was diluted with water and extracted with dichloromethane. The combined organic layer was washed with brine, dried over sodium sulfate and concentrated under reduced pressure. Purification by flash column chromatography (silica gel, 100-200 mesh; eluting with 40% ethyl acetate/petroleum ether) afforded the title compound as a yellow gum (0.095 g, 76%).

The following compounds were prepared in like manner to the procedure outlined in Example 16:

(Z)—N'-(2-(Methylthio)pyrimidin-4-yl)-4-(1,4,4,4-tetrafluoro-3-(3,4,5-trichlorophenyl)but-1-en-1-yl)-2-(trifluoromethyl)benzohydrazide (F5)

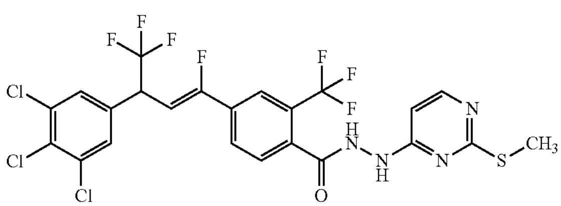 [SMILES: CSc1nccc(NNC(=O)c2ccc(/C(F)=C/C(c3cc(Cl)c(Cl)c(Cl)c3)C(F)(F)F)cc2C(F)(F)F)n1]

Isolated as a yellow gum (0.062 g, 14%).

(Z)—N'-(2,6-Di nitro-4-(trifluoromethyl)phenyl)-4-(1,4,4,4-tetrafluoro-3-(3,4,5-trichlorophenyl)but-1-en-1-yl)-2-(trifluoromethyl)benzohydrazide (F7)

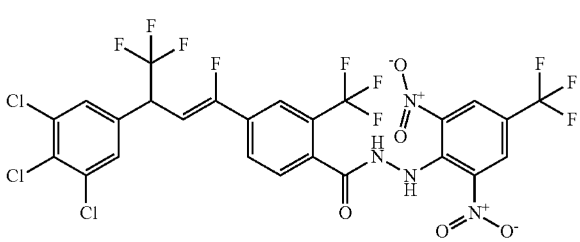

Isolated as a brown gum (0.005 g, 3%).

(Z)—N'-(Pyrimidin-4-yl)-4-(1,4,4,4-tetrafluoro-3-(3,4,5-trichlorophenyl)but-1-en-1-yl)-2-(trifluoromethyl)benzohydrazide (F19)

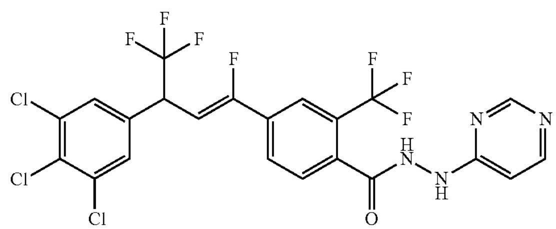

Isolated as a yellow gum (0.081 g, 56%).

(Z)—N'-(Pyrimidin-5-yl)-4-(1,4,4,4-tetrafluoro-3-(3,4,5-trichlorophenyl)but-1-en-1-yl)-2-(trifluoromethyl)benzohydrazide (F31)

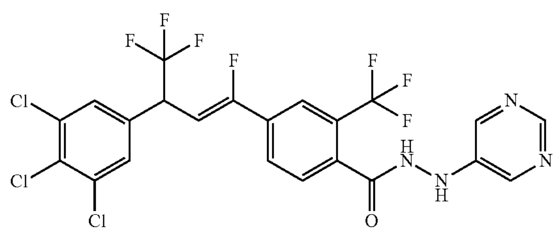

Isolated as a yellow gum (0.060 g, 48%).

(Z)—N'-(Pyridazin-4-yl)-4-(1,4,4,4-tetrafluoro-3-(3,4,5-trichlorophenyl)but-1-en-1-yl)-2-(trifluoromethyl)benzohydrazide (F33)

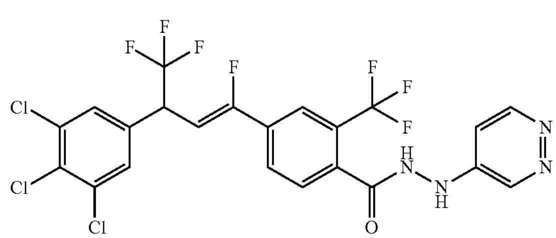

Isolated as a yellow gum (0.063 g, 51%).

(Z)—N'-(Pyridin-4-yl)-4-(1,4,4,4-tetrafluoro-3-(3,4,5-trichlorophenyl)but-1-en-1-yl)-2-(trifluoromethyl)benzohydrazide (F57)

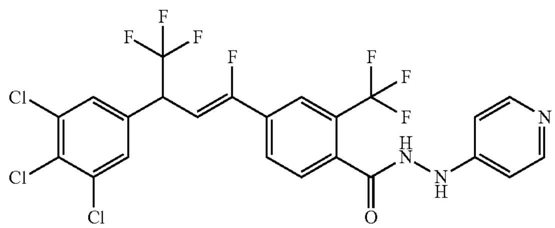

Isolated as a yellow gum (0.172 g, 65%).

(Z)—N'-(5-Chloropyrimidin-2-yl)-4-(1,4,4,4-tetrafluoro-3-(3,4,5-trichlorophenyl)but-1-en-1-yl)-2-(trifluoromethyl)benzohydrazide (F63)

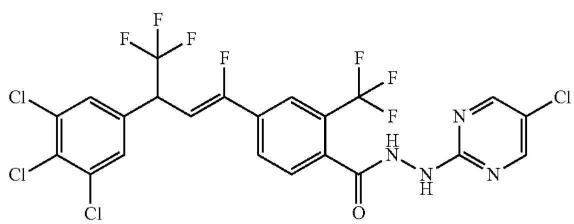

Isolated as a yellow wax (0.082 g, 62%).

(Z)—N'-(4,6-Dimethylpyrimidin-2-yl)-4-(1,4,4,4-tetrafluoro-3-(3,4,5-trichlorophenyl)but-1-en-1-yl)-2-(trifluoromethyl)benzohydrazide (F85)

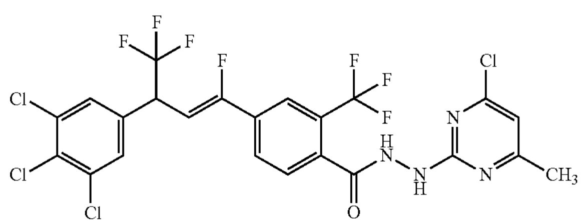 [SMILES: Cc1cc(Cl)nc(NNC(=O)c2ccc(/C(F)=C/C(c3cc(Cl)c(Cl)c(Cl)c3)C(F)(F)F)cc2C(F)(F)F)n1]

Isolated as a yellow gum (0.074 g, 50%).

(Z)—N'-Pyridazin-3-yl)-4-(1,4,4,4-tetrafluoro-3-(3,4,5-trichlorophenyl)but-1-en-1-yl)-2-(trifluoromethyl)benzohydrazide (F86)

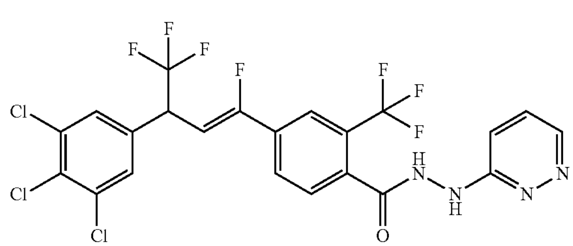 [SMILES: O=C(NNc1cccnn1)c1ccc(/C(F)=C/C(c2cc(Cl)c(Cl)c(Cl)c2)C(F)(F)F)cc1C(F)(F)F]

Isolated as a yellow gum (0.022 g, 18%).

(Z)—N'-(Pyrazin-2-yl)-4-(1,4,4,4-tetrafluoro-3-(3,4,5-trichlorophenyl)but-1-en-1-yl)-2-(trifluoromethyl)benzohydrazide (F92)

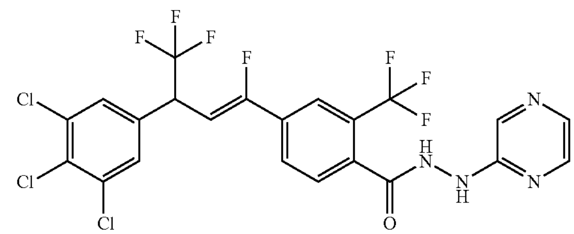 [SMILES: O=C(NNc1cnccn1)c1ccc(/C(F)=C/C(c2cc(Cl)c(Cl)c(Cl)c2)C(F)(F)F)cc1C(F)(F)F]

Isolated as a yellow gum (0.069 g, 52%).

(Z)-4-(1,4,4,4-Tetrafluoro-3-(3,4,5-trichlorophenyl)but-1-en-1-yl)-N'-(1H-tetrazol-5-yl)-2-(trifluoromethyl)benzohydrazide (F95)

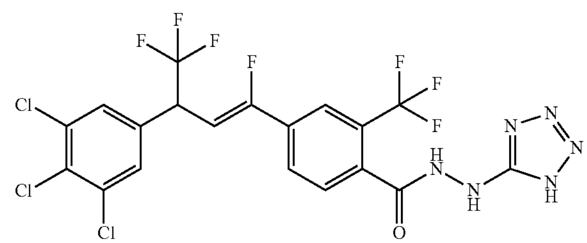 [SMILES: O=C(NNc1nnn[nH]1)c1ccc(/C(F)=C/C(c2cc(Cl)c(Cl)c(Cl)c2)C(F)(F)F)cc1C(F)(F)F]

Isolated as a yellow gum (0.041 g, 32%).

(Z)—N'-(Pyrimidin-2-yl)-4-(1,4,4,4-tetrafluoro-3-(3,4,5-trichlorophenyl)but-1-en-1-yl)-2-(trifluoromethyl)benzohydrazide (F97)

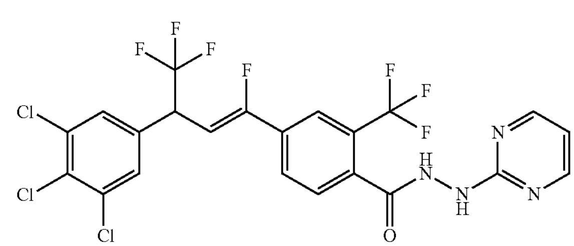 [SMILES: O=C(NNc1ncccn1)c1ccc(/C(F)=C/C(c2cc(Cl)c(Cl)c(Cl)c2)C(F)(F)F)cc1C(F)(F)F]

Isolated as a yellow wax (0.042 g, 34%).

(Z)—N'-(6-Chloropyrazin-2-yl)-4-(1,4,4,4-tetrafluoro-3-(3,4,5-trichlorophenyl)but-1-en-1-yl)-2-(trifluoromethyl)benzohydrazide (F104)

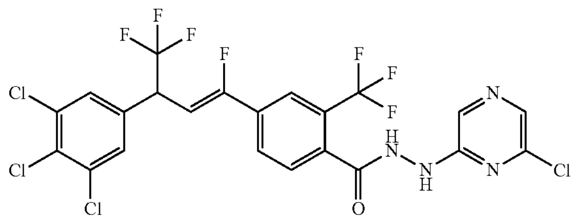 [SMILES: O=C(NNc1cncc(Cl)n1)c1ccc(/C(F)=C/C(c2cc(Cl)c(Cl)c(Cl)c2)C(F)(F)F)cc1C(F)(F)F]

Isolated as a yellow gum (0.020 g, 14%).

(Z)—N'-(4-Hydroxy-6-methylpyrimidin-2-yl)-4-(1,4,4,4-tetrafluoro-3-(3,4,5-trichlorophenyl)but-1-en-1-yl)-2-(trifluoromethyl)benzohydrazide (F105)

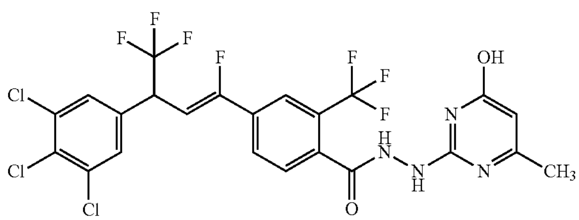 [SMILES: Cc1cc(O)nc(NNC(=O)c2ccc(/C(F)=C/C(c3cc(Cl)c(Cl)c(Cl)c3)C(F)(F)F)cc2C(F)(F)F)n1]

Isolated as a yellow gum (0.022 g, 18%).

(Z)—N-(4-Methylthiazol-2-yl)-4-(1,4,4,4-tetrafluoro-3-(3,4,5-trichlorophenyl)but-1-en-1-yl)-2-(trifluoromethyl)benzohydrazide (F109)

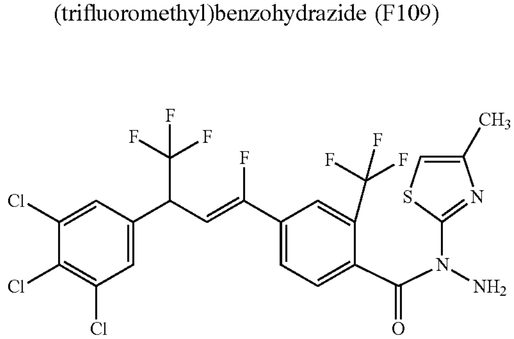

Isolated as a yellow gum (0.077 g, 60%).

(Z)—N'-(2-Nitrophenyl)-4-(1,4,4,4-tetrafluoro-3-(3,4,5-trichlorophenyl)but-1-en-1-yl)-2-(trifluoromethyl)benzohydrazide (F118)

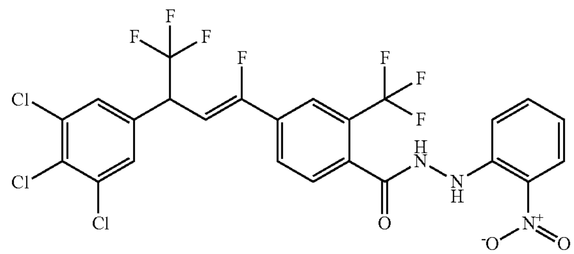

Isolated as a brown wax (0.150 g, 77%).

(Z)—N'-(Pyridin-3-yl)-4-(1,4,4,4-tetrafluoro-3-(3,4,5-trichlorophenyl)but-1-en-1-yl)-2-(trifluoromethyl)benzohydrazide (F121)

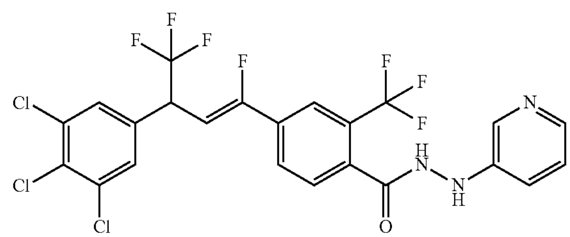 [SMILES: O=C(NNc1cccnc1)c1ccc(/C(F)=C/C(c2cc(Cl)c(Cl)c(Cl)c2)C(F)(F)F)cc1C(F)(F)F]

Isolated as a yellow gum (0.006 g, 4%).

(Z)—N'-(3-Nitropyridin-2-yl)-4-(1,4,4,4-tetrafluoro-3-(3,4,5-trichlorophenyl)but-1-en-1-yl)-2-(trifluoromethyl)benzohydrazide (F132)

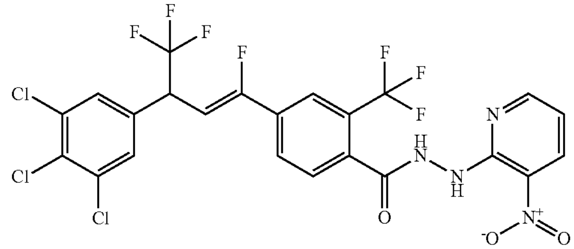

Isolated as a yellow gum (0.110 g, 82%).

(Z)—N'-(6-Chloropyridin-3-yl)-4-(1,4,4,4-tetrafluoro-3-(3,4,5-trichlorophenyl)but-1-en-1-yl)-2-(trifluoromethyl)benzohydrazide (F136)

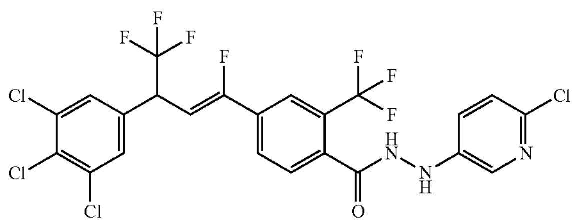 [SMILES: O=C(NNc1ccc(Cl)nc1)c1ccc(/C(F)=C/C(c2cc(Cl)c(Cl)c(Cl)c2)C(F)(F)F)cc1C(F)(F)F]

Isolated as a yellow gum (0.062 mg, 44%).

(Z)—N'-(3,6-Dichloropyridazin-4-yl)-4-(1,4,4,4-tetrafluoro-3-(3,4,5-trichlorophenyl)but-1-en-1-yl)-2-(trifluoromethyl)benzohydrazide and (Z)—N-(3,6-dichloropyridazin-4-yl)-4-(1,4,4,4-tetrafluoro-3-(3,4,5-trichlorophenyl)but-1-en-1-yl)-2-(trifluoromethyl)benzohydrazide (F147)

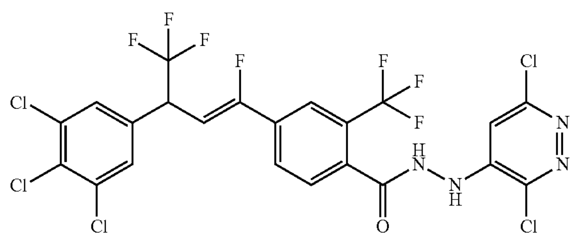

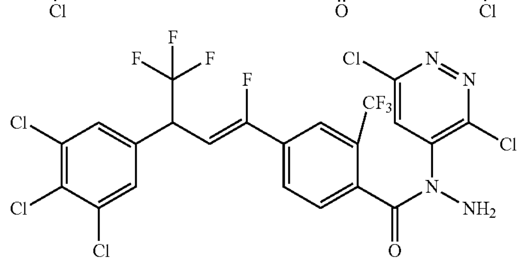

Isolated as a yellow wax (0.052 g, 19%).

(Z)—N'-(6-Hydroxypyrimidin-4-yl)-4-(1,4,4,4-tetrafluoro-3-(3,4,5-trichlorophenyl)but-1-en-1-yl)-2-(trifluoromethyl)benzohydrazide (F161)

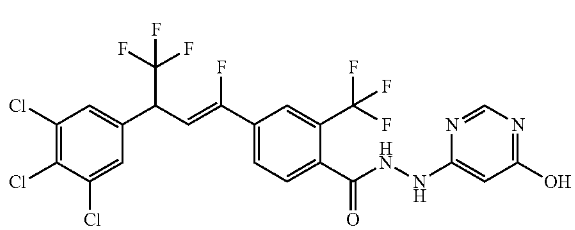 [SMILES: O=C(NNc1cc(O)ncn1)c1ccc(/C(F)=C/C(c2cc(Cl)c(Cl)c(Cl)c2)C(F)(F)F)cc1C(F)(F)F]

Isolated as a yellow gum (0.0062 g, 5%).

(Z)—N'-Methyl-N'-(5-nitropyrimidin-2-yl)-4-(1,4,4,4-tetrafluoro-3-(3,4,5-trichlorophenyl)but-1-en-1-yl)-2-(trifluoromethyl)benzohydrazide (F164)

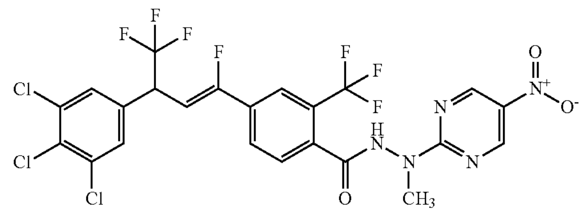 [SMILES: CN(NC(=O)c1ccc(/C(F)=C/C(c2cc(Cl)c(Cl)c(Cl)c2)C(F)(F)F)cc1C(F)(F)F)c1ncc([N+](=O)[O-])cn1]

Isolated as a yellow gum (0.121 g, 44%).

(Z)—N'-(6-Bromopyridin-2-yl)-4-(1,4,4,4-tetrafluoro-3-(3,4,5-trichlorophenyl)but-1-en-1-yl)-2-(trifluoromethyl)benzohydrazide (F165)

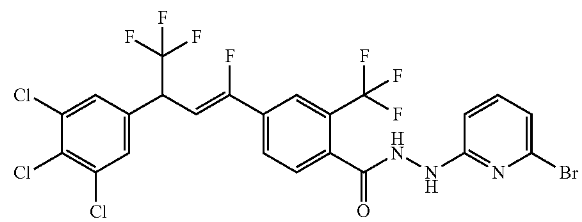 [SMILES: O=C(NNc1cccc(Br)n1)c1ccc(/C(F)=C/C(c2cc(Cl)c(Cl)c(Cl)c2)C(F)(F)F)cc1C(F)(F)F]

Isolated as an orange gum (0.081 g, 56%).

(Z)—N'-Isopropyl-N'-(pyrimidin-2-yl)-4-(1,4,4,4-tetrafluoro-3-(3,4,5-trichlorophenyl)but-1-en-1-yl)-2-(trifluoromethyl)benzohydrazide (F169)

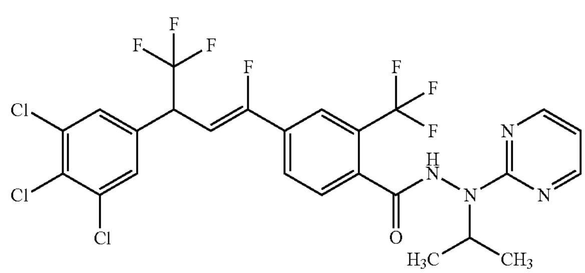 [SMILES: CC(C)N(NC(=O)c1ccc(/C(F)=C/C(c2cc(Cl)c(Cl)c(Cl)c2)C(F)(F)F)cc1C(F)(F)F)c1ncccn1]

Isolated as a yellow gum (0.160 g, 95%).

(Z)—N-Isopropyl-N'-(pyrimidin-2-yl)-4-(1,4,4,4-tetrafluoro-3-(3,4,5-trichlorophenyl)but-1-en-1-yl)-2-(trifluoromethyl)benzohydrazide (F170)

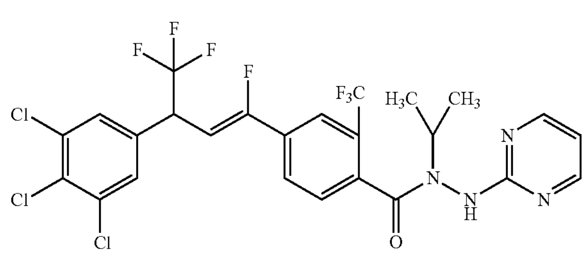 [SMILES: CC(C)N(Nc1ncccn1)C(=O)c1ccc(/C(F)=C/C(c2cc(Cl)c(Cl)c(Cl)c2)C(F)(F)F)cc1C(F)(F)F]

Isolated as a yellow gum (0.122 g, 71%).

(Z)-4-(3-(3,4-Dichloro-5-(difluoromethyl)phenyl)-1,4,4,4-tetrafluorobut-1-en-1-yl)-N'-(pyrimidin-2-yl)-2-(trifluoromethyl)benzohydrazide (F186)

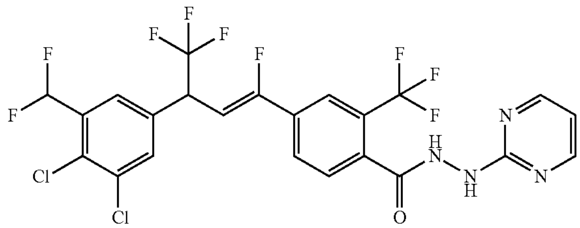 [SMILES: O=C(NNc1ncccn1)c1ccc(/C(F)=C/C(c2cc(Cl)c(Cl)c(C(F)F)c2)C(F)(F)F)cc1C(F)(F)F]

Isolated as a as a yellow gum (0.013 g, 50%).

Example 17: Preparation of (Z)—N'-(2-fluorophenyl)-4-(1,4,4,4-tetrafluoro-3-(3,4,5-trichlorophenyl) but-1-en-1-yl)-2(trifluoromethyl)benzohydrazide (F28)

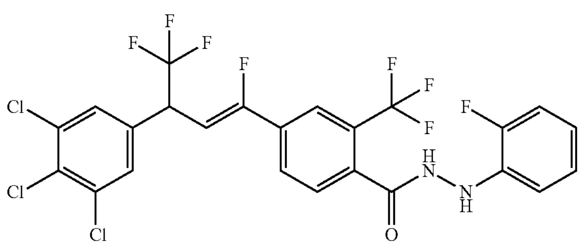 [SMILES: O=C(NNc1ccccc1F)c1ccc(/C(F)=C/C(c2cc(Cl)c(Cl)c(Cl)c2)C(F)(F)F)cc1C(F)(F)F]

In a one dram vial equipped with a magnetic stir vane were added (Z)-4-(1,4,4,4-tetrafluoro-3-(3,4,5-trichlorophenyl) but-1-en-1-yl)-2-(trifluoromethyl)benzoic acid (C2) (150 mg, 0.303 mmol), N-ethyl-N-isopropylpropan-2-amine (174 μL, 0.999 mmol), and 1-[bis(dimethylamino)-methylene]-1H-1,2,3-triazolo[4,5-b]pyridinium 3-oxid hexafluorophosphate (173 mg, 0.454 mmol) in N,N-dimethylformamide (1 mL) to give a brown solution. (2-Fluorophenyl) hydrazine hydrochloride (59.3 mg, 0.364 mmol) was added, and the reaction mixture was left to stir at ambient temperature for two hours. The reaction mixture was diluted with diethyl ether (10 mL) and water (10 mL), the phases where separated, and the aqueous layer was extracted with additional diethyl ether (10 mL) The organic extracts were pooled, washed with brine, dried with magnesium sulfate, filtered, and concentrated. Purification of the resulting residue by flash silica chromatography eluting with hexanes and ethylacetate provided the title compound as a yellow foam (0.108 g, 46%).

The following compounds were prepared in like manner to the procedure outlined in Example 17:

(Z)—N'-(Pyridin-2-yl)-4-(1,4,4,4-tetrafluoro-3-(3,4,5-trichlorophenyl)but-1-en-1-yl)-2-(trifluoromethyl) benzohydrazide (F9)

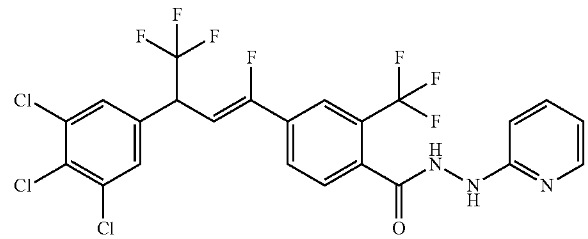 [SMILES: O=C(NNc1ccccn1)c1ccc(/C(F)=C/C(c2cc(Cl)c(Cl)c(Cl)c2)C(F)(F)F)cc1C(F)(F)F]

Isolated as a green glass (0.067 g, 36%).

(Z)—N'-Methyl-N'-phenyl-4-(1,4,4,4-tetrafluoro-3-(3,4,5-trichlorophenyl)but-1-en-1-yl)-2-(trifluoromethyl)benzohydrazide (F11)

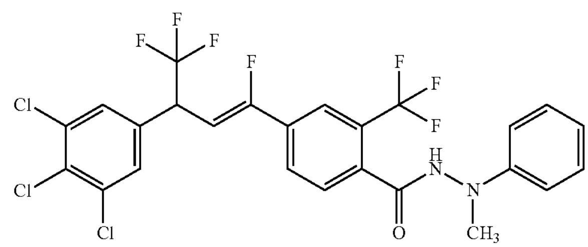

Isolated as a pale yellow glass (0.097 g, 34%).

(Z)—N'-(2,4-Difluorophenyl)-4-(1,4,4,4-tetrafluoro-3-(3,4,5-trichlorophenyl)but-1-en-1-yl)-2-(trifluoromethyl)benzohydrazide (F26)

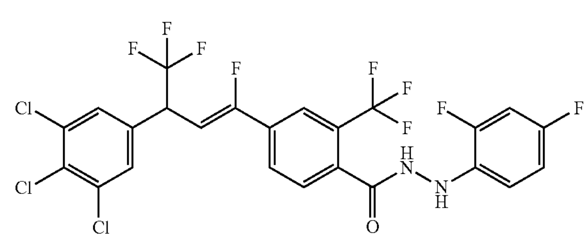 [SMILES: O=C(NNc1ccc(F)cc1F)c1ccc(/C(F)=C/C(c2cc(Cl)c(Cl)c(Cl)c2)C(F)(F)F)cc1C(F)(F)F]

Isolated as a yellow glass (0.069 g, 31%).

(Z)—N'-(4-Fluoro-2-methylphenyl)-4-(1,4,4,4-tetrafluoro-3-(3,4,5-trichlorophenyl)but-1-en-1-yl)-2-(trifluoromethyl)benzohydrazide (F35)

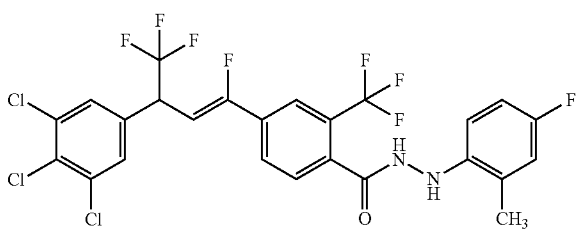 [SMILES: Cc1cc(F)ccc1NNC(=O)c1ccc(/C(F)=C/C(c2cc(Cl)c(Cl)c(Cl)c2)C(F)(F)F)cc1C(F)(F)F]

Isolated as a yellow-orange amorphous solid (0.143 g, 52%).

(Z)—N'-(4-Fluorophenyl-4-(1,4,4,4-tetrafluoro-3-(3,4,5-trichlorophenyl)but-1-en-1-yl)-2-(trifluoromethyl)benzohydrazide (F52)

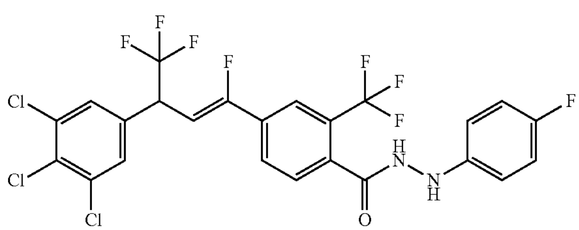 [SMILES: O=C(NNc1ccc(F)cc1)c1ccc(/C(F)=C/C(c2cc(Cl)c(Cl)c(Cl)c2)C(F)(F)F)cc1C(F)(F)F]

Isolated as an orange amorphous solid (0.105 g, 49%).

(Z)—N'-Methyl-N'-(pyridin-2-yl)-4-(1,4,4,4-tetrafluoro-3-(3,4,5-trichloro-phenyl)but-1-en-1-yl)-2-(trifluoromethyl)benzohydrazide (F59)

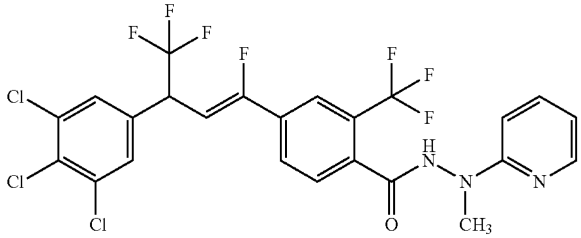

Isolated as a brown foam (0.330 g, 58%).

(Z)-4-(1,4,4,4-tetrafluoro-3-(3,4,5-trichlorophenyl)but-1-en-1-yl)-2-(trifluoromethyl)-N'-(4-(trifluoromethyl)phenyl)benzohydrazide (F70)

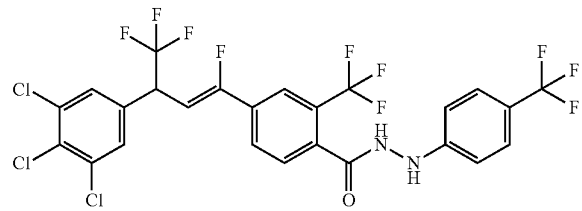 [SMILES: O=C(NNc1ccc(C(F)(F)F)cc1)c1ccc(/C(F)=C/C(c2cc(Cl)c(Cl)c(Cl)c2)C(F)(F)F)cc1C(F)(F)F]

Isolated as a yellow-orange amorphous solid (0.179 g, 81%).

(Z)—N'-(5-Cyanopyridin-2-yl)-N'-methyl-4-(1,4,4,4-tetrafluoro-3-(3,4,5-trichlorophenyl)but-1-en-1-yl)-2-(trifluoromethyl)benzohydrazide (F82)

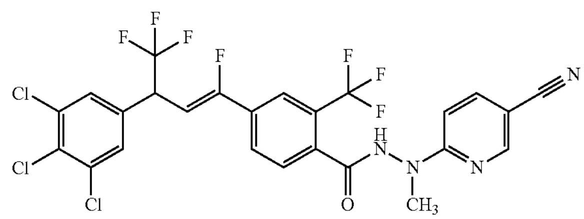 [SMILES: CN(NC(=O)c1ccc(/C(F)=C/C(c2cc(Cl)c(Cl)c(Cl)c2)C(F)(F)F)cc1C(F)(F)F)c1ccc(C#N)cn1]

Isolated as a red glass (0.141 g, 48%).

(Z)—N'-(3-Chloropyridin-2-yl)-4-(1,4,4,4-tetrafluoro-3-(3,4,5-trichlorophenyl)but-1-en-1-yl)-2-(trifluoromethyl)benzohydrazide (F99)

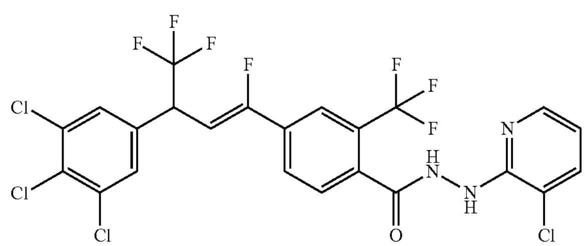 [SMILES: O=C(NNc1ncccc1Cl)c1ccc(/C(F)=C/C(c2cc(Cl)c(Cl)c(Cl)c2)C(F)(F)F)cc1C(F)(F)F]

Isolated as an orange glass (0.195 g, 66%).

(Z)—N'-(4-Cyanophenyl)-4-(1,4,4,4-tetrafluoro-3-(3,4,5-trichlorophenyl)but-1-en-1-yl)-2-(trifluoromethyl)benzohydrazide (F111)

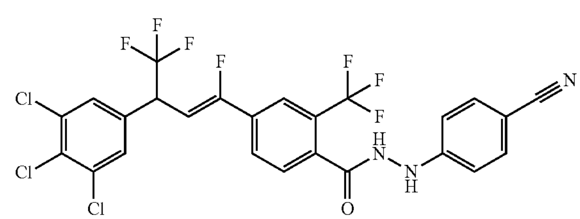 [SMILES: N#Cc1ccc(NNC(=O)c2ccc(/C(F)=C/C(c3cc(Cl)c(Cl)c(Cl)c3)C(F)(F)F)cc2C(F)(F)F)cc1]

Isolated as orange foam (0.173 g, 63%).

(Z)—N'-Phenyl-4-(1,4,4,4-tetrafluoro-3-(3,4,5-trichlorophenyl)but-1-en-1-yl)-2-(trifluoromethyl) benzohydrazide (F133)

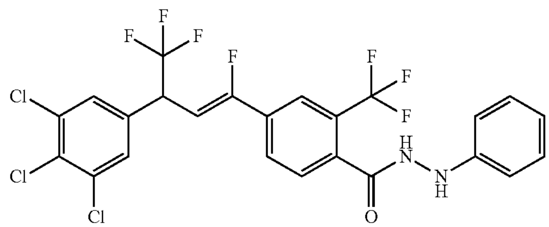 [SMILES: O=C(NNc1ccccc1)c1ccc(/C(F)=C/C(c2cc(Cl)c(Cl)c(Cl)c2)C(F)(F)F)cc1C(F)(F)F]

Isolated as an orange glass (0.114 g, 41%).

(Z)—N'-(2,5-Difluorophenyl)-4-(1,4,4,4-tetrafluoro-3-(3,4,5-trichlorophenyl)but-1-en-1-yl)-2-(trifluoromethyl)benzohydrazide (F134)

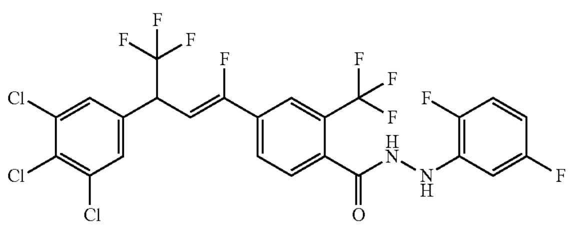 [SMILES: O=C(NNc1cc(F)ccc1F)c1ccc(/C(F)=C/C(c2cc(Cl)c(Cl)c(Cl)c2)C(F)(F)F)cc1C(F)(F)F]

Isolated as a pale orange, amorphous solid (0.154 g, 52%).

Example 18: Preparation of (Z)—N'-(2-chloro-6-fluorophenyl)-4-(1,4,4,4-tetrafluoro-3-(3,4,5-trichlorophenyl)but-1-en-1-yl)-2-(trifluoromethyl)benzohydrazide (F1)

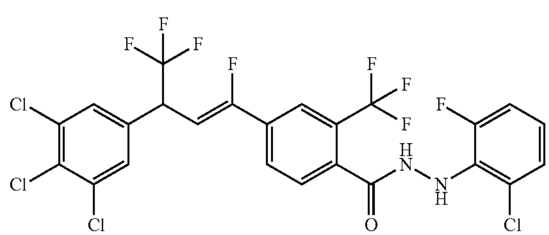 [SMILES: O=C(NNc1c(F)cccc1Cl)c1ccc(/C(F)=C/C(c2cc(Cl)c(Cl)c(Cl)c2)C(F)(F)F)cc1C(F)(F)F]

To a solution of (Z)-4-(1,4,4,4-tetrafluoro-3-(3,4,5-trichlorophenyl)but-1-en-1-yl)-2-(trifluoromethyl)benzoic acid (C2) (0.200 g, 0.404 mmol) in N,N-dimethylformamide (3 mL) were added N-ethyl-N-isopropylpropan-2-amine (0.170 g, 1.33 mmol) and 1-[bis(dimethylamino)-methylene]-1H-1,2,3-triazolo[4,5-b]pyridinium 3-oxid hexafluorophosphate (0.15 g, 0.40 mmol). After stirring for 5 minutes, (2-chloro-6-fluorophenyl)hydrazine hydrochloride (0.090 g, 0.44 mmol) was added and the reaction mixture was stirred at room temperature for 1 hour. The reaction mixture was then partitioned between water and ethyl acetate. The organic phase was dried over sodium sulfate, filtered, and concentrated under reduced pressure. Purification by column chromatography (silica gel, eluting with 40% ethyl acetate in petroleum ether) afforded the title compound as a yellow solid (0.145 g, 53%).

The following compounds were prepared in like manner to the procedure outlined in Example 18:

(Z)-4-(3-(3,5-Dichloro-4-fluorophenyl)-1,4,4,4-tetrafluorobut-1-en-1-yl)-N'-methyl-N'-(pyrimidin-2-yl)-2-(trifluoromethyl)benzohydrazide (F2)

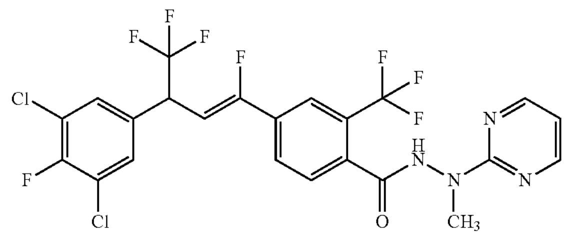

Isolated as a brown gum (0.070 g, 31%).

(Z)-4-(1,4,4,4-Tetrafluoro-3-(3,4,5-trichlorophenyl) but-1-en-1-yl)-2-(trifluoromethyl)-N'-(3-(trifluoromethyl)phenyl)benzohydrazide (F3)

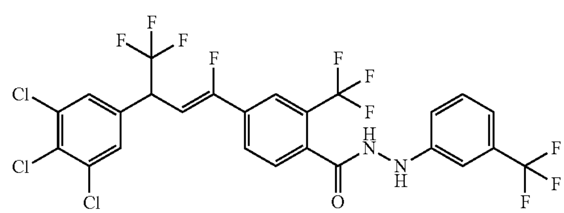 [SMILES: O=C(NNc1cccc(C(F)(F)F)c1)c1ccc(/C(F)=C/C(c2cc(Cl)c(Cl)c(Cl)c2)C(F)(F)F)cc1C(F)(F)F]

Isolated as a pale yellow solid (0.160 g, 41%), (Z)-4-(3-(3,5-Dichloro-4-fluorophenyl)-1,4,4,4-tetrafluorobut-1-en-1-yl)-N'-(pyrimidin-2-yl)-2-(trifluoromethyl)benzohydraziderazide (F4)

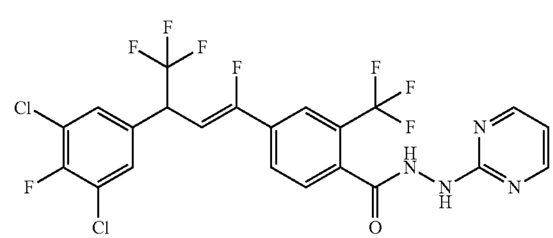 [SMILES: O=C(NNc1ncccn1)c1ccc(/C(F)=C/C(c2cc(Cl)c(F)c(Cl)c2)C(F)(F)F)cc1C(F)(F)F]

Isolated as an off-white solid (0.100 g, 52%).

(Z)-4-(3-(3,4-Dichlorophenyl)-1,4,4,4-tetrafluorobut-1-en-1-yl)-N'-methyl-N'-(pyrimidin-2-yl)-2-(trifluoromethyl)benzohydrazideazide (F8)

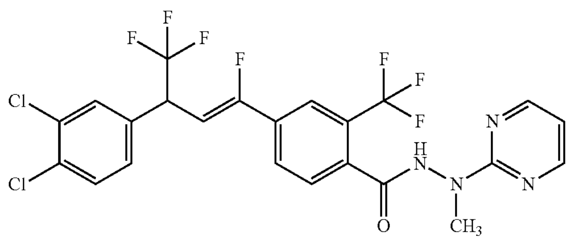

Isolated as a pale yellow solid (0.100 g, 54%).

(Z)—N'-(2-Methoxyphenyl)-4-(1,4,4,4-tetrafluoro-3-(3,4,5-trichlorophenyl)but-1-en-1-yl)-2-(trifluoromethyl)benzohydrazide (F14)

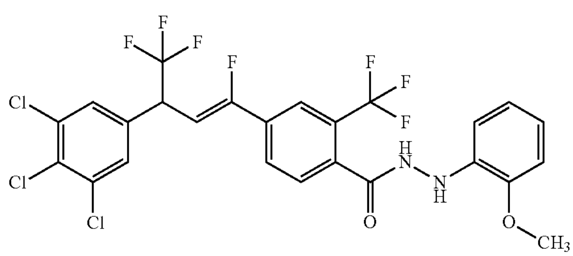 [SMILES: COc1ccccc1NNC(=O)c1ccc(/C(F)=C/C(c2cc(Cl)c(Cl)c(Cl)c2)C(F)(F)F)cc1C(F)(F)F]

Isolated as a yellow solid (0.120 g, 43%)

(Z)-4-(3-(4-Bromo-3-chlorophenyl)-1,4,4,4-tetrafluorobut-1-en-1-yl)-N'-(pyrimidin-2-yl)-2-(trifluoromethyl)benzohydrazide (F16)

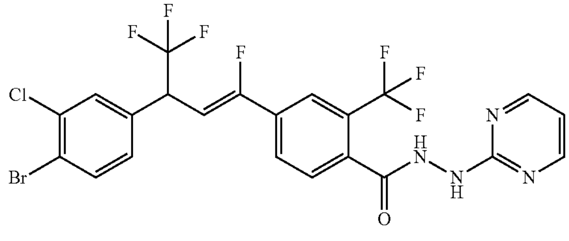

Isolated as an off-white solid (0.145 g, 54%).

(S,Z)—N'-Methyl-N'-(pyrimidin-2-yl)-4-(1,4,4,4-tetrafluoro-3-(3,4,5-trichlorophenyl)but-1-en-1-yl)-2-(trifluoromethyl)benzohydrazide (F17) and (R,Z)—N'-methyl N'-(pyrimidin-2-yl)-4-(1,4,4,4-tetrafluoro-3-(3,4,5-trichlorophenyl)but-1-en-1-yl)-2-(trifluoromethyl)benzohydrazide (F29)

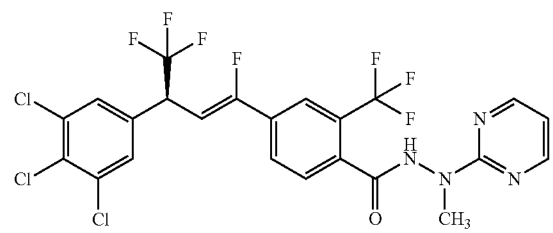

enantiomerically pure

F17 was isolated as an off-white solid $[\alpha]^{25}_{589}$=+70.4 (c, 0.25% in MeOH).

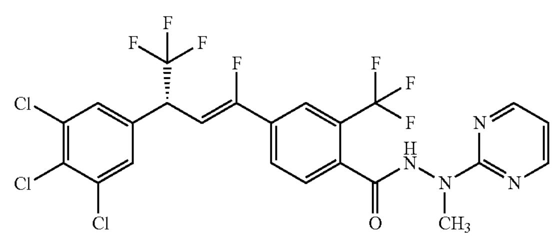

enantiomerically pure

F29 was isolated as an off-white solid $[\alpha]^{25}_{589}$=−76.0 (c, 0.25% in MeOH).

(Z)-2-Chloro-N'-(pyrimidin-2-yl)-4-(1,4,4,4-tetrafluoro-3-(3,4,5-trichlorophenyl)but-1-en-1-yl)benzohydrazide (F20)

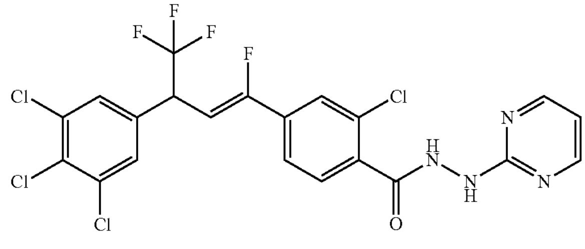 [SMILES: O=C(NNc1ncccn1)c1ccc(/C(F)=C/C(c2cc(Cl)c(Cl)c(Cl)c2)C(F)(F)F)cc1Cl]

Isolated as a yellow solid (0.117 g, 42%).

(Z)—N'-(Pyrimidin-2-yl)-4-(1,4,4,4-tetrafluoro-3-(4-fluoro-3-(trifluoromethyl)phenyl)but-1-en-1-yl)-2-(trifluoromethyl)benzohydrazide (F32)

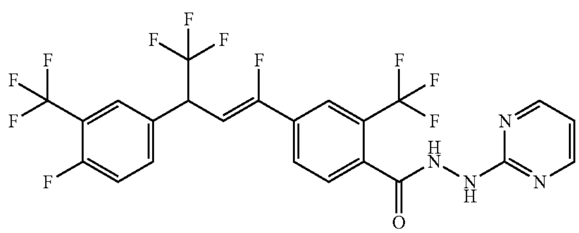 [SMILES: O=C(NNc1ncccn1)c1ccc(/C(F)=C/C(c2ccc(F)c(C(F)(F)F)c2)C(F)(F)F)cc1C(F)(F)F]

Isolated as an off-white solid (0.110 g, 35%).

(Z)-2-Methyl-N'-(pyrimidin-2-yl)-4-(1,4,4,4-tetrafluoro-3-(3,4,5-trichlorophenyl)but-1-en-1-yl)benzohydrazide (F37)

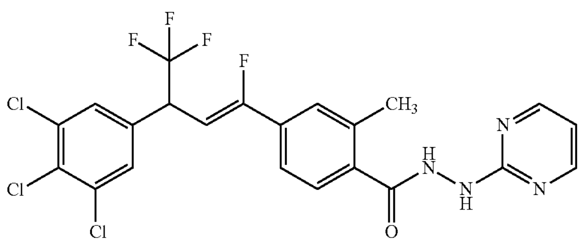

Isolated as an off-white solid (0.220 g, 73%).

(Z)-4-(3-(4-Bromo-3-(trifluoromethyl)phenyl)-1,4,4,4-tetrafluorobut-1-en-1-yl)-N'-methyl-N'-(pyrimidin-2-yl)-2-(trifluoromethyl)benzohydrazide (F39)

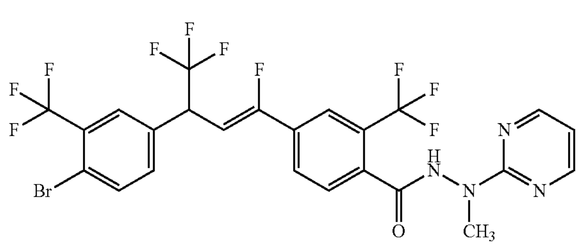 [SMILES: CN(NC(=O)c1ccc(/C(F)=C/C(c2ccc(Br)c(C(F)(F)F)c2)C(F)(F)F)cc1C(F)(F)F)c1ncccn1]

Isolated as a brown solid (0.140 g, 78%).

(Z)-2-Chloro-N'-methyl-N'-(pyrimidin-2-yl)-4-(1,4,4,4-tetrafluoro-3-(3,4,5-trichlorophenyl)but-1-en-1-yl)benzohydrazide (F43)

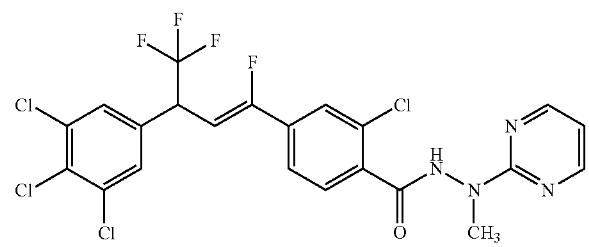 [SMILES: CN(NC(=O)c1ccc(/C(F)=C/C(c2cc(Cl)c(Cl)c(Cl)c2)C(F)(F)F)cc1Cl)c1ncccn1]

Isolated as a brown gum (0.095 g, 33%).

(Z)—N'-Benzyl-4-(1,4,4,4-tetrafluoro-3-(3,4,5-trichlorophenyl)but-1-en-1-yl)-2-(trifluoromethyl)benzohydrazide (F54)

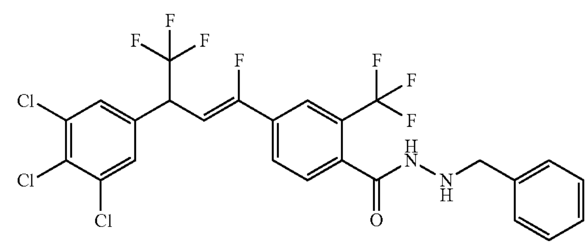 [SMILES: O=C(NNCc1ccccc1)c1ccc(/C(F)=C/C(c2cc(Cl)c(Cl)c(Cl)c2)C(F)(F)F)cc1C(F)(F)F]

Isolated as a yellow solid (0.115 g, 37%).

(Z)—N',2-Dimethyl-N'-(pyrimidin-2-yl)-4-(1,4,4,4-tetrafluoro-3-(3,4,5-trichlorophenyl)but-1-en-1-yl)benzohydrazide (F55)

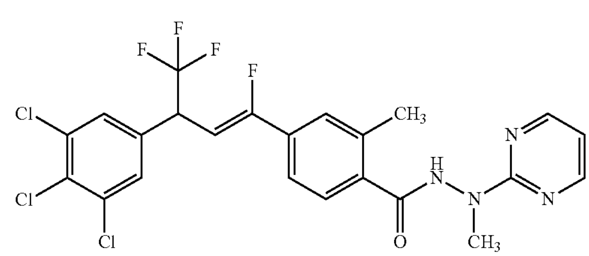 [SMILES: Cc1cc(/C(F)=C/C(c2cc(Cl)c(Cl)c(Cl)c2)C(F)(F)F)ccc1C(=O)NN(C)c1ncccn1]

Isolated as an off-white solid (0.130 g, 42%).

(Z)-4-(3-(3,5-Dichlorophenyl)-1,4,4,4-tetrafluorobut-1-en-1-yl)-N'-(pyrimidin-2-yl)-2-(trifluoromethyl)benzohydrazide (F56)

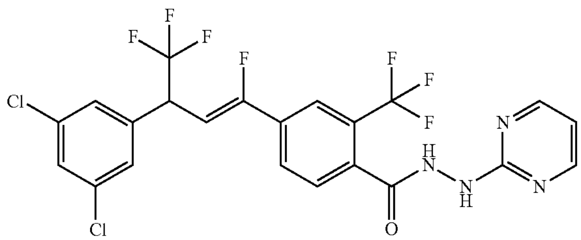 [SMILES: O=C(NNc1ncccn1)c1ccc(/C(F)=C/C(c2cc(Cl)cc(Cl)c2)C(F)(F)F)cc1C(F)(F)F]

Isolated as a pale yellow solid (0.150 g, 61%).

(Z)—N'-Methyl-N'-(pyrimidin-2-yl)-4-(1,4,4,4-tetrafluoro-3-(3,4,5-trichlorophenyl)but-1-en-1-yl)-2-(trifluoromethyl)benzohydrazide (F71)

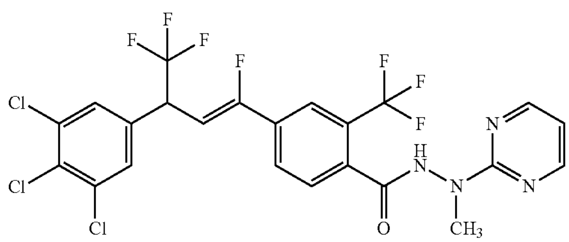

Isolated as an off-white solid (0.90 g, 73%).

(Z)-4-(3-(3-Chloro-5-(trifluoromethyl)phenyl)-1,4,4,4-tetrafluorobut-1-en-1-yl)-N'-(pyrimidin-2-yl)-2-(trifluoromethyl)benzohydrazide (F77)

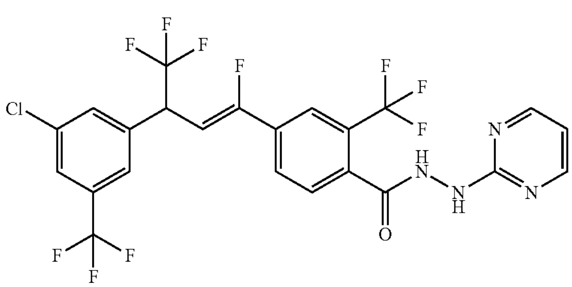 [SMILES: O=C(NNc1ncccn1)c1ccc(/C(F)=C/C(c2cc(Cl)cc(C(F)(F)F)c2)C(F)(F)F)cc1C(F)(F)F]

Isolated as a yellow solid (0.117 g, 46%).

(Z)-4-(3-(4-Bromo-3-(trifluoromethyl)phenyl)-1,4,4,4-tetrafluorobut-1-en-1-yl)-N'-(pyrimidin-2-yl)-2-(trifluoromethyl)benzohydrazide (F78)

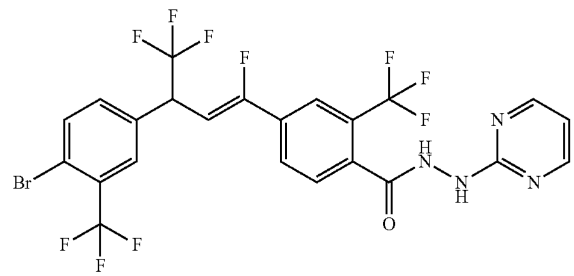 [SMILES: O=C(NNc1ncccn1)c1ccc(/C(F)=C/C(c2ccc(Br)c(C(F)(F)F)c2)C(F)(F)F)cc1C(F)(F)F]

Isolated as a light brown solid (0.130 g, 69%).

(Z)-4-(3-(3-Chloro-5-(trifluoromethyl)phenyl)-1,4,4,4-tetrafluorobut-1-en-1-yl)-N'-methyl-N'-(pyrimidin-2-yl)-2-(trifluoromethyl)benzohydrazide (F83)

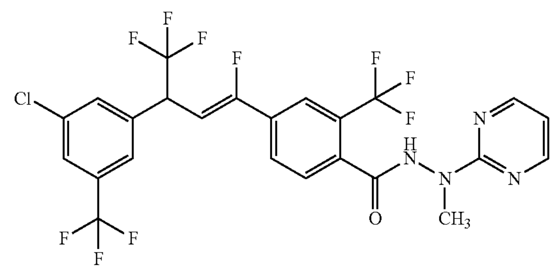 [SMILES: CN(NC(=O)c1ccc(/C(F)=C/C(c2cc(Cl)cc(C(F)(F)F)c2)C(F)(F)F)cc1C(F)(F)F)c1ncccn1]

Isolated as a yellow solid (0.70 g, 37%).

(S,Z)—N'-Pyrimidin-2-yl)-4-(1,4,4,4-tetrafluoro-3-(3,4,5-trichlorophenyl)but-1-en-1-yl)-2-(trifluoromethyl)benzohydrazide (F94) and (R,Z)—N'-(pyrimidin-2-yl)-4-(1,4,4,4-tetrafluoro-3-(3,4,5-trichlorophenyl)but-1-en-1-yl)-2-(trifluoromethyl) benzohydrazide (F120)

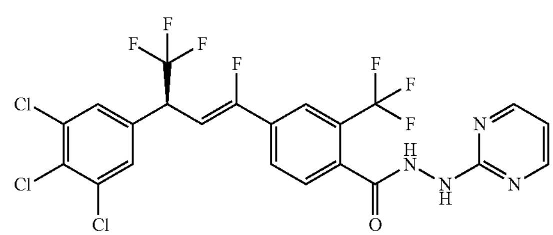

enantiomerically pure

F94 was isolated as an off-white solid $[\alpha]^{25}_{589}=-70.4$ (c, 0.25% in $CDCl_3$).

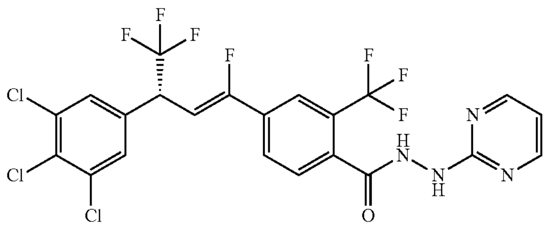

enantiomerically pure

F120 was isolated as an off-white solid $[\alpha]^{25}_{589}$=+69.6 (c, 0.25% in $CDCl_3$).

(Z)-4-(3-(3-Bromo-4,5-dichlorophenyl)-1,4,4,4-tetrafluorobut-1-en-1-yl)-N'-(pyrimidin-2-yl)-2-(trifluoromethyl)benzohydrazide (F96)

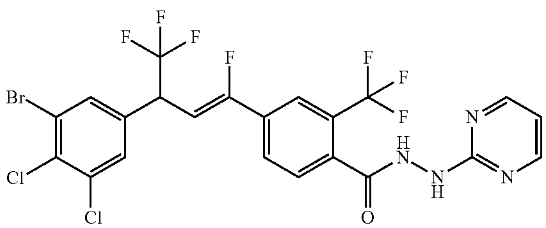

Isolated as a brown solid (0.054 g, 40%).

(Z)—N'-(Pyrimidin-2-yl)-4-(1,4,4,4-tetrafluoro-3-(3,4,5-trichlorophenyl)but-1-en-1-yl)-2-(trifluoromethyl)benzohydrazide (F971)

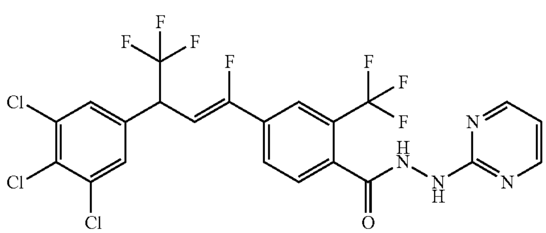 [SMILES: O=C(NNc1ncccn1)c1ccc(/C(F)=C/C(c2cc(Cl)c(Cl)c(Cl)c2)C(F)(F)F)cc1C(F)(F)F]

Isolated as an off-white solid (1.0 g, 42%).

(Z)—N'-(3-Cyanophenyl)-4-(1,4,4,4-tetrafluoro-3-(3,4,5-trichlorophenyl)but-1-en-1-yl)-2-(trifluoromethyl)benzohydrazide (F100)

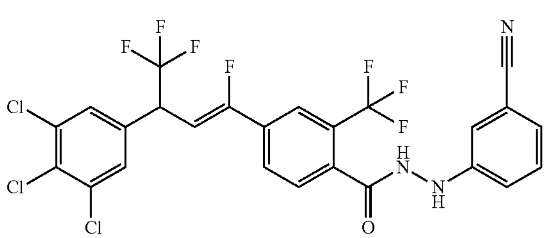 [SMILES: N#Cc1cccc(NNC(=O)c2ccc(/C(F)=C/C(c3cc(Cl)c(Cl)c(Cl)c3)C(F)(F)F)cc2C(F)(F)F)c1]

Isolated as a pale yellow oil (0.190 g, 56%).

(Z)-2-Bromo-N'-methyl-N'-(pyrimidin-2-yl)-4-(1,4,4,4-tetrafluoro-3-(3,4,5-trichlorophenyl)but-1-en-1-yl)benzohydrazide (F102)

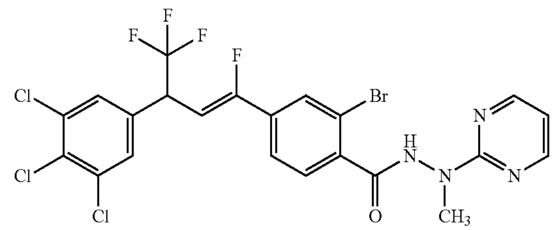 [SMILES: CN(NC(=O)c1ccc(/C(F)=C/C(c2cc(Cl)c(Cl)c(Cl)c2)C(F)(F)F)cc1Br)c1ncccn1]

Isolated as a pale yellow solid (0.100 g, 55%).

(Z)—N'-Methyl-N'-(pyrimidin-2-yl)-4-(1,4,4,4-tetrafluoro-3-(4-fluoro-3-(trifluoromethyl)phenyl)but-1-en-1-yl)-2-(trifluoromethyl)benzohydrazide (F113)

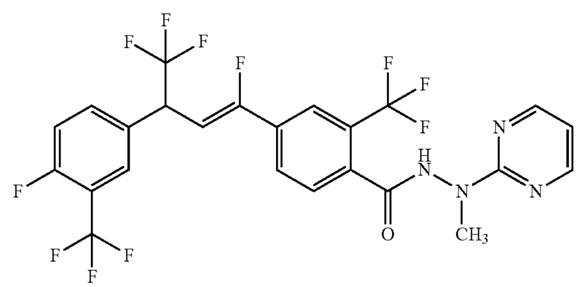 [SMILES: CN(NC(=O)c1ccc(/C(F)=C/C(c2ccc(F)c(C(F)(F)F)c2)C(F)(F)F)cc1C(F)(F)F)c1ncccn1]

Isolated as an off-white solid (0.080 g, 26%).

(Z)-4-(3-(3,4-Dichlorophenyl)-1,4,4,4-tetrafluorobut-1-en1-yl)-N'-(pyrimidin-2-yl)-2-(trifluoromethyl))benzohydrazide (F117)

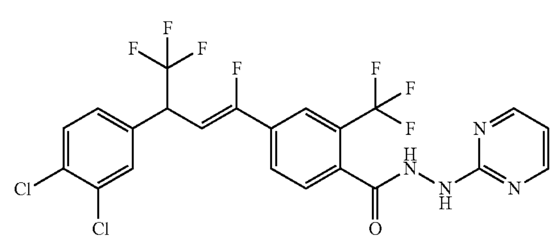 [SMILES: O=C(NNc1ncccn1)c1ccc(/C(F)=C/C(c2ccc(Cl)c(Cl)c2)C(F)(F)F)cc1C(F)(F)F]

Isolated as a brown solid (0.120 g, 67%).

(Z)-4-(3-(4-Bromo-3-chlorophenyl)-1,4,4,4-tetrafluorobut-1-en-1-yl)-N'-methyl-N'-(pyrimidin-2-yl)-2-(trifluoromethyl)benzohydrazide (F125)

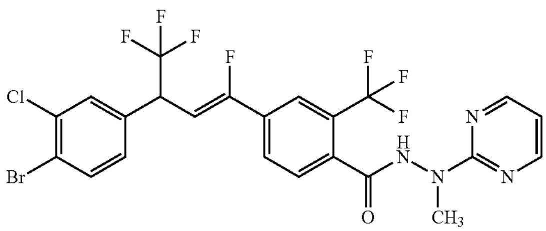

Isolated as a brown gum (0.115 g, 45%).

(Z)—N'-(4-Methoxyphenyl)-4-(1,4,4,4-tetrafluoro-3-(3,4,5-trichlorophenyl)but-1-en-1-yl)-2-(trifluoromethyl)benzohydrazide (F126)

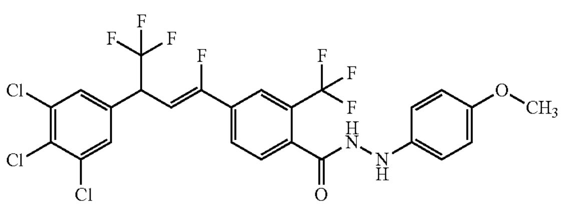 [SMILES: COc1ccc(NNC(=O)c2ccc(/C(F)=C/C(c3cc(Cl)c(Cl)c(Cl)c3)C(F)(F)F)cc2C(F)(F)F)cc1]

Isolated as a yellow solid (0.105 g, 34%).

(Z)-2-Bromo-N'-(pyrimidin-2-yl)-4-(1,4,4,4-tetrafluoro-3-(3,4,5-trichlorophenyl)but-1-en-1-yl)benzohydrazide (F128)

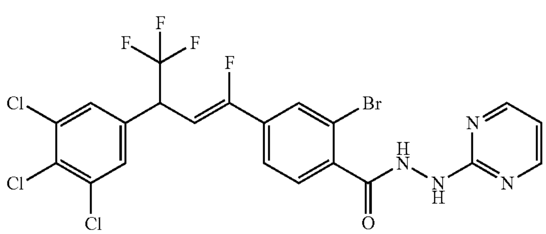 [SMILES: O=C(NNc1ncccn1)c1ccc(/C(F)=C/C(c2cc(Cl)c(Cl)c(Cl)c2)C(F)(F)F)cc1Br]

Isolated as an brown solid (0.160 g, 68%).

(Z)—N'-Ethyl-N'-(pyrimidin-2-yl)-4-(1,4,4,4-tetrafluoro-3-(3,4,5-trichlorophenyl)but-1-en-1-yl)-2-(trifluoromethyl)benzohydrazide (F130)

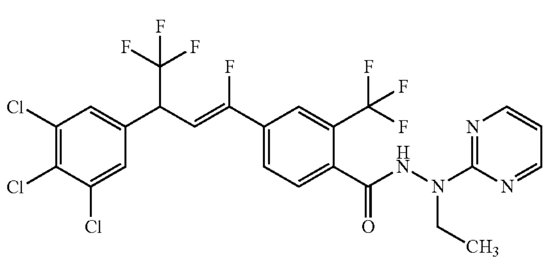 [SMILES: CCN(NC(=O)c1ccc(/C(F)=C/C(c2cc(Cl)c(Cl)c(Cl)c2)C(F)(F)F)cc1C(F)(F)F)c1ncccn1]

Isolated as a brown solid (0.100 g, 52%).

(Z)-2-Methyl-N'-(prop-2-yn-1-yl)-N'-(pyrimidin-2-yl)-4-(1,4,4,4-tetrafluoro-3-(3,4,5-trichlorophenyl)but-1-en-1-yl)benzohydrazide (F148)

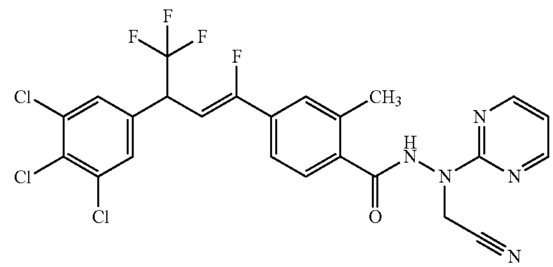 [SMILES: Cc1cc(/C(F)=C/C(c2cc(Cl)c(Cl)c(Cl)c2)C(F)(F)F)ccc1C(=O)NN(CC#N)c1ncccn1]

Isolated as an off-white solid (0.250 g, 91%).

(Z)—N'-(Prop-2-yn-1-yl)-N'-(pyrimidin-2-yl)-4-(1,4,4,4-tetrafluoro-3-(3,4,5-trichlorophenyl)but-1-en-1-yl)-2-(trifluoromethyl)benzohydrazide (F150)

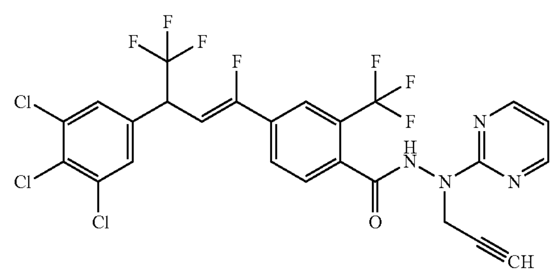 [SMILES: C#CCN(NC(=O)c1ccc(/C(F)=C/C(c2cc(Cl)c(Cl)c(Cl)c2)C(F)(F)F)cc1C(F)(F)F)c1ncccn1]

Isolated as an off-white solid (0.090 g, 27%).

(Z)-4-(3-(3,5-Dichlorophenyl)-1,4,4,4-tetrafluorobut-1-en-1-yl)-N'-methyl-N'-(pyrimidin-2-yl)-2-(trifluoromethyl)benzohydrazide (F151)

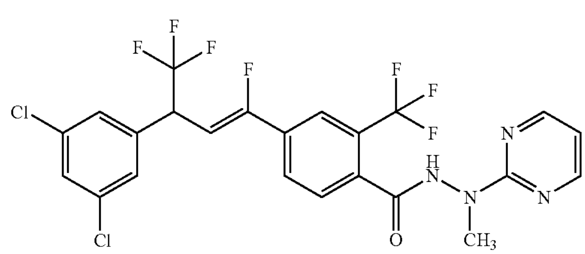

Isolated as a yellow solid (0.100 g, 54%).

(Z)—N'-Allyl-N'-(pyrimidin-2-yl)-4-(1,4,4,4-tetrafluoro-3-(3,4,5-trichlorophenyl)but-1-en-1-yl)-2-(trifluoromethyl)benzohydrazide (F152)

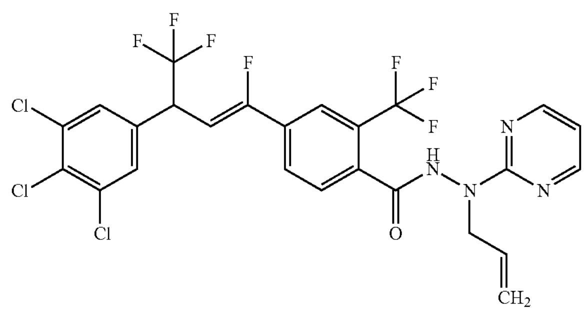 [SMILES: C=CCN(NC(=O)c1ccc(/C(F)=C/C(c2cc(Cl)c(Cl)c(Cl)c2)C(F)(F)F)cc1C(F)(F)F)c1ncccn1]

Isolated as a yellow solid (0.140 g, 66%).

(Z)-4-(3-(3-Bromo-4,5-dichlorophenyl)-1,4,4,4-tetrafluorobut-1-en-1-yl)-N'-methyl-N'-(pyrimidin-2-yl)-2-(trifluoromethyl)benzohydrazide (F171)

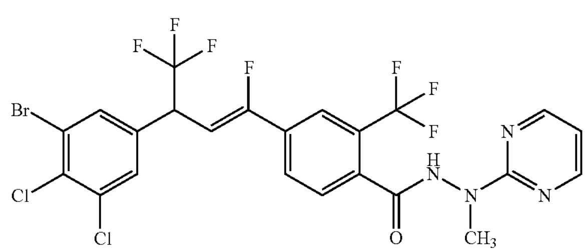

Isolated as a pale yellow solid (0.060 g, 29%).

(Z)-4-(3-(4-Bromo-3,5-dichlorophenyl)-1,4,4,4-tetrafluorobut-1-en-1-yl)-N'-(pyrimidin-2-yl)-2-(trifluoromethyl)benzohydrazide (F172)

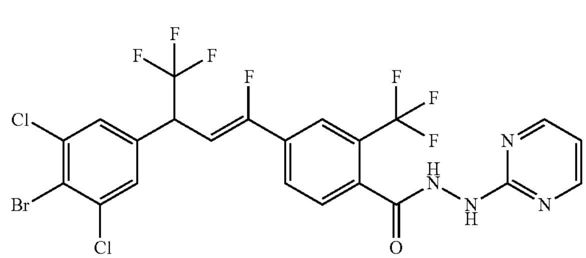

Isolated as a brown solid (0.150 g, 52%).

(Z)-4-(3-(3-Bromo-5-chlorophenyl)-1,4,4,4-tetrafluorobut-1-en-1-yl)-N'-(pyrimidin-2-yl)-2-(trifluoromethyl)benzohydrazide (F173)

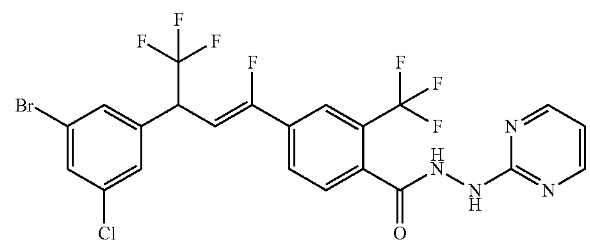

Isolated as a brown solid (0.080 g, 31%).

(Z)-4-(3-(3-Chloro-4,5-difluorophenyl)-1,4,4,4-tetrafluorobut-1-en-1-yl)-N'-(pyrimidin-2-yl)-2-(trifluoromethyl)benzohydrazide (F174)

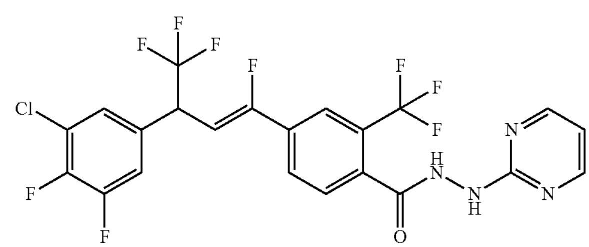 [SMILES: O=C(NNc1ncccn1)c1ccc(/C(F)=C/C(c2cc(F)c(F)c(Cl)c2)C(F)(F)F)cc1C(F)(F)F]

Isolated as a brown solid (0.071 g, 29%).

(Z)-4-(3-(3-Chloro-4,5-difluorophenyl)-1,4,4,4-tetrafluorobut-1-en-1-yl)-N'-methyl-N'-(pyrimidin-2-yl)-2-(trifluoromethyl)benzohydrazide (F175)

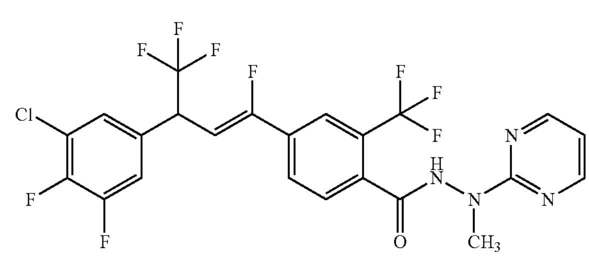

Isolated as a brown solid (0.040 g, 15%).

(Z)-4-(3-(3,5-Dibromophenyl)-1,4,4,4-tetrafluorobut-1-en-1-yl)-N'-(pyrimidin-2-yl)-2-(trifluoromethyl)benzohydrazide (F176)

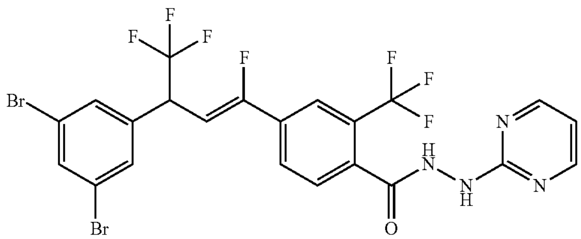

Isolated as a pale yellow solid (0.110 g, 52%).

(Z)-4-(3-(3,4-Dibromophenyl)-1,4,4,4-tetrafluorobut-1-en-1-yl)-N'-(pyrimidin-2-yl)-2-(trifluoromethyl)benzohydrazide (F177)

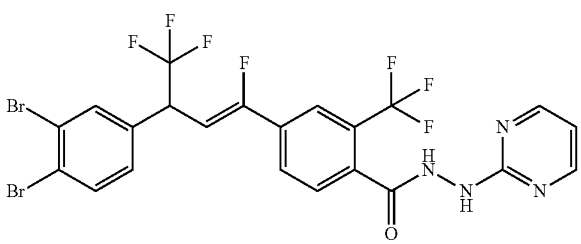

Isolated as a pale green solid (0.082 g, 29%).

(Z)-4-(3-(3-Bromo-4-chlorophenyl)-1,4,4,4-tetrafluorobut-1-en-1-yl)-N'-(pyrimidin-2-yl)-2-(trifluoromethyl)benzohydrazide (F178)

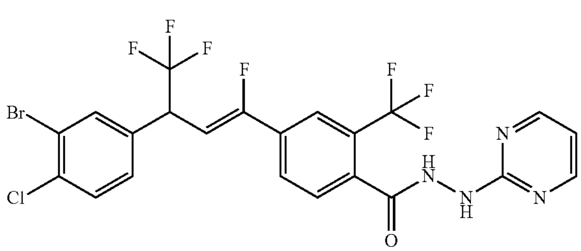

Isolated as a pale yellow solid (0.095 g, 33%).

(Z)-4-(3-(3-Chloro-4-fluorophenyl)-1,4,4,4-tetrafluorobut-1-en-1-yl)-N'-(pyrimidin-2-yl)-2-(trifluoromethyl)benzohydrazide (F182)

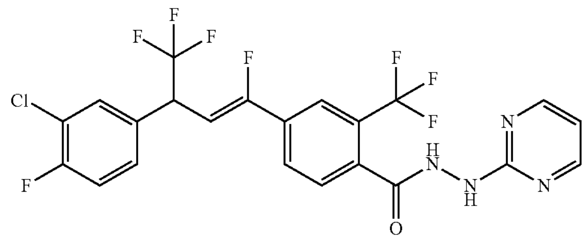 [SMILES: O=C(NNc1ncccn1)c1ccc(/C(F)=C/C(c2ccc(F)c(Cl)c2)C(F)(F)F)cc1C(F)(F)F]

Isolated as a light yellow oil (0.105 g, 50%).

(Z)-4-(3-(3,5-Dibromo-4-chlorophenyl)-1,4,4,4-tetrafluorobut-1-en-1-yl)-N'-(pyrimidin-2-yl)-2-(trifluoromethyl)benzohydrazide (F185)

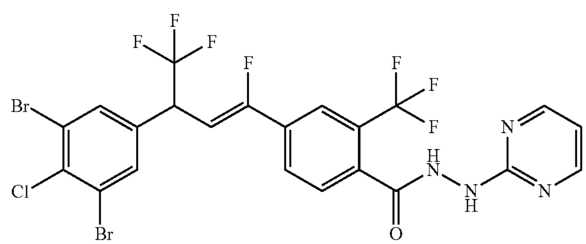

Isolated as an off-white solid (0.110 g, 47%).

(Z)-4-(3-(4-Chloro-3,5-difluorophenyl)-1,4,4,4-tetrafluorobut-1-en-1-yl)-N'-(pyrimidin-2-yl)-2-(trifluoromethyl)benzohydrazide (F188)

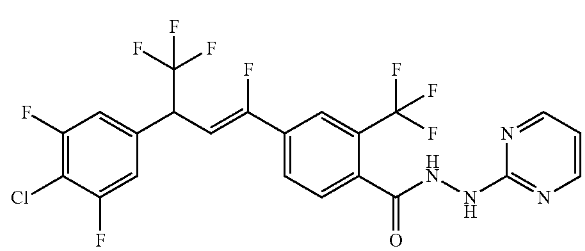 [SMILES: O=C(NNc1ncccn1)c1ccc(/C(F)=C/C(c2cc(F)c(Cl)c(F)c2)C(F)(F)F)cc1C(F)(F)F]

Isolated as a pale yellow solid (0.060 g, 12%).

(Z)-4-(3-(3,5-Dichloro-4-(1-ethoxyvinyl)phenyl)-1,4,4,4-tetrafluorobut-1-en-1-yl)-N'-(pyrimidin-2-yl)-2-(trifluoromethyl)benzohydrazide (F190)

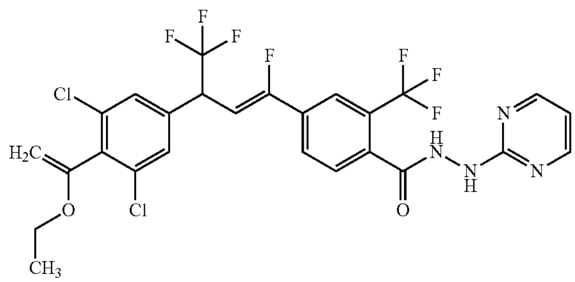 [SMILES: C=C(OCC)c1c(Cl)cc(C(/C=C(\F)c2ccc(C(=O)NNc3ncccn3)c(C(F)(F)F)c2)C(F)(F)F)cc1Cl]

Isolated as a yellow oil (0.003 g, 16%).

(Z)-4-(3-(3,4-Dichloro-5-cyclopropylphenyl)-1,4,4,4-tetrafluorobut-1-en-1-yl)-N'-(pyrimidin-2-yl)-2-(trifluoromethyl)benzohydrazide (F191)

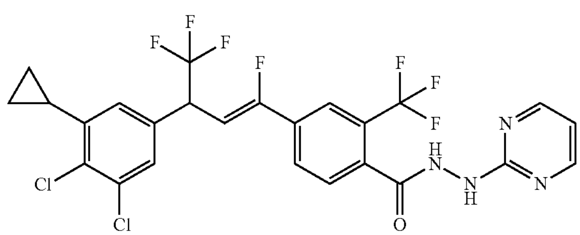 [SMILES: O=C(NNc1ncccn1)c1ccc(/C(F)=C/C(c2cc(Cl)c(Cl)c(C3CC3)c2)C(F)(F)F)cc1C(F)(F)F]

Isolated as an off-white gum (0.002 g, 3%).

(Z)—N'-(Pyrimidin-2-yl)-4-(1,4,4,4-tetrafluoro-3-(3,4,5-trichlorophenyl)but-1-en-1-yl)benzohydrazide (1A)

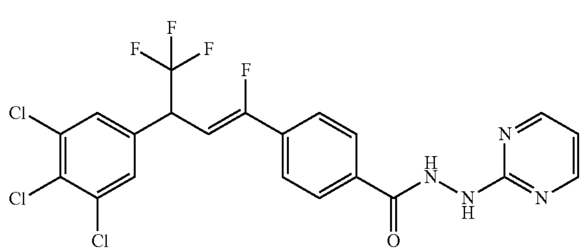 [SMILES: O=C(NNc1ncccn1)c1ccc(/C(F)=C/C(c2cc(Cl)c(Cl)c(Cl)c2)C(F)(F)F)cc1]

Isolated as a pale yellow gum (0.115 g, 42%): $^{1}$H NMR (300 MHz, DMSO-$d_6$) δ 10.55 (br s, 1H), 9.16 (s, 1H), 8.41 (d, J=4.8 Hz, 2H), 8.06 (m, 4H), 7.90 (d, J=8.4 Hz, 2H), 6.80 (t, J=4.5 Hz, 1H), 6.74 (dd, J=35.4, 10.2 Hz, 1H), 5.27-5.21 (m, 1H); IR (thin film) 3855, 3421, 2924, 1663 $cm^{-1}$; ESIMS m/z 519 ($[M+H]^+$).

Example 19: Preparation of (Z)—N'-(2,6-dichlorophenyl)-4-(1,4,4,4-tetrafluoro-3-(3,4,5-trichlorophenyl)but-1-en-1-yl)-2-(trifluoromethyl)benzohydrazide (F129)

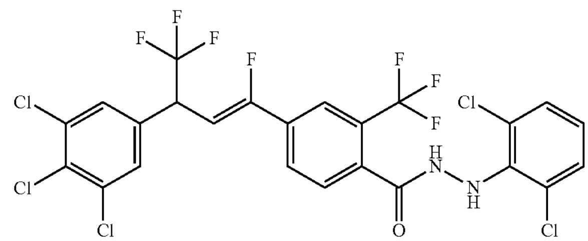 [SMILES: O=C(NNc1c(Cl)cccc1Cl)c1ccc(/C(F)=C/C(c2cc(Cl)c(Cl)c(Cl)c2)C(F)(F)F)cc1C(F)(F)F]

A solution of (Z)-4-(1,4,4,4-tetrafluoro-3-(3,4,5-trichlorophenyl)but-1-en-1-yl)-2-(trifluoromethyl)benzoic acid (C2) (0.100 g, 0.21 mmol) in thionyl chloride (2 mL) was heated up to 80° C. for two hours. The reaction mixture was cooled to room temperature and the volatile materials were removed via distillation. The crude gum was diluted with dichloromethane (2 mL), and (2,6-dichlorophenyl)hydrazine (0.053 g, 0.3 mmol) and 4-methylmorpholine (0.101 g, 1 mmol) were added. The reaction mixture was stirred at room temperature overnight. The mixture was purified by column chromatography (silica gel, eluting with 0-5% methanol in dichloromethane). The title compound was isolated as a yellow wax (0.081 g, 59%).

The following compounds were prepared in like manner to the procedure outlined in Example 19.

(Z)—N'-(5-Methoxypyrimidin-2-yl)-N'-methyl-4-(1,4,4,4-tetrafluoro-3-(3,4,5-trichlorophenyl)but-1-en-1-yl)-2-(trifluoromethyl)benzohydrazide (F12)

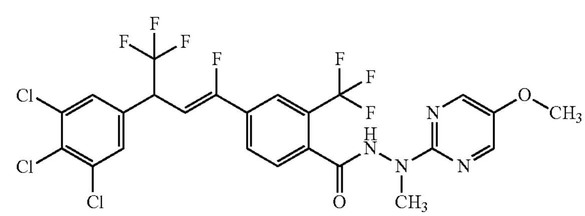 [SMILES: COc1cnc(N(C)NC(=O)c2ccc(/C(F)=C/C(c3cc(Cl)c(Cl)c(Cl)c3)C(F)(F)F)cc2C(F)(F)F)nc1]

Isolated as a yellow wax (0.068 g, 45%).

Methyl (Z)-4-methyl-3-(2-(4-(1,4,4,4-tetrafluoro-3-(3,4,5-trichlorophenyl)but-1-en-1-yl)-2-(trifluoromethyl)benzoyl)hydrazinyl)thiophene-2-carboxylate (F15)

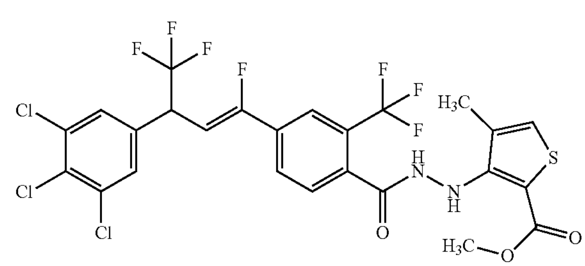 [SMILES: COC(=O)c1scc(C)c1NNC(=O)c1ccc(/C(F)=C/C(c2cc(Cl)c(Cl)c(Cl)c2)C(F)(F)F)cc1C(F)(F)F]

Isolated as a yellow wax (0.094 g, 62%).

(Z)-4-(1,4,4,4-Tetrafluoro-3-(3,4,5-trichlorophenyl)but-1-en-1-yl)-N'-(2,3,5-trichloro-6-methylsulfonyl-4-pyridin-4-yl)-2-(trifluoromethyl)benzohydrazide (F21)

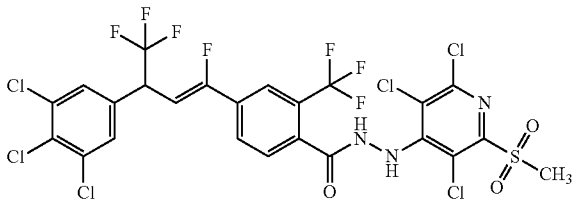 [SMILES: CS(=O)(=O)c1nc(Cl)c(Cl)c(NNC(=O)c2ccc(/C(F)=C/C(c3cc(Cl)c(Cl)c(Cl)c3)C(F)(F)F)cc2C(F)(F)F)c1Cl]

Isolated as a yellow wax (0.031 g, 19%).

(Z)-4-(1,4,4,4-Tetrafluoro-3-(3,4,5-trichlorophenyl)but-1-en-1-yl)-N'-(2,3,5-trichloro-4-pyridin-4-yl)-2-(trifluoromethyl)benzohydrazide (F30)

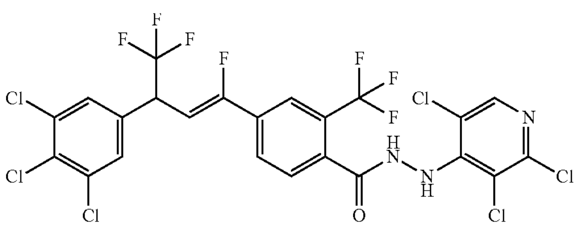 [SMILES: O=C(NNc1c(Cl)cnc(Cl)c1Cl)c1ccc(/C(F)=C/C(c2cc(Cl)c(Cl)c(Cl)c2)C(F)(F)F)cc1C(F)(F)F]

Isolated as a yellow wax (0.070 g, 48%).

(Z)—N'-(tert-Butyl)-4-(1,4,4,4-tetrafluoro-3-(3,4,5-trichlorophenyl)but-1-en-1-yl)-2-(trifluoromethyl)benzohydrazide (F40)

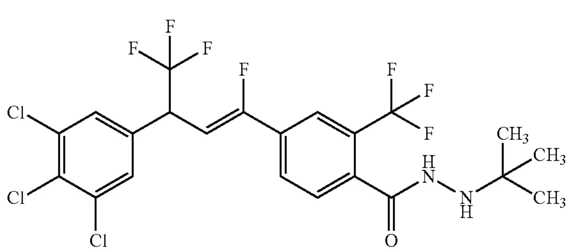 [SMILES: CC(C)(C)NNC(=O)c1ccc(/C(F)=C/C(c2cc(Cl)c(Cl)c(Cl)c2)C(F)(F)F)cc1C(F)(F)F]

Isolated as a tan foam (0.080 g, 45%).

(Z)—N'-(5-Ethylpyrimidin-2-yl)-N'-methyl-4-(1,4,4,4-tetrafluoro-3-(3,4,5-trichlorophenyl)but-1-en-1-yl)-2-(trifluoromethyl)benzohydrazide (F41)

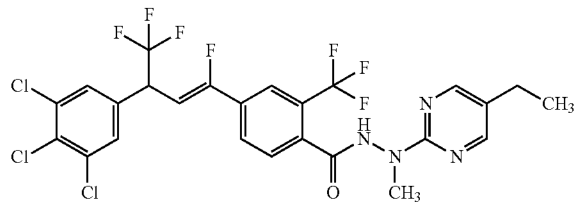

Isolated as a yellow wax (0.108 g, 71%).

(Z)-4-(1,4,4,4-Tetrafluoro-3-(3,4,5-trichlorophenyl)but-1-en-1-yl)-2-(trifluoromethyl)-N'-(4-(trifluoromethyl)pyrimidin-2-yl)benzohydrazide (F44)

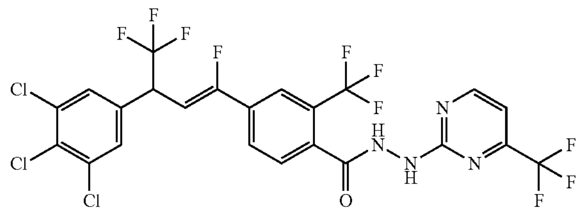 [SMILES: O=C(NNc1nccc(C(F)(F)F)n1)c1ccc(/C(F)=C/C(c2cc(Cl)c(Cl)c(Cl)c2)C(F)(F)F)cc1C(F)(F)F]

Isolated as a yellow wax (0.136 g, 86%).

(Z)—N'-(3,5-Dichloro-2-(trichloromethyl)-4-pyridin-4-yl)-4-(1,4,4,4-tetrafluoro-3-(3,4,5-trichlorophenyl)but-1-en-1-yl]-2-(trifluoromethyl)benzohydrazide (F69)

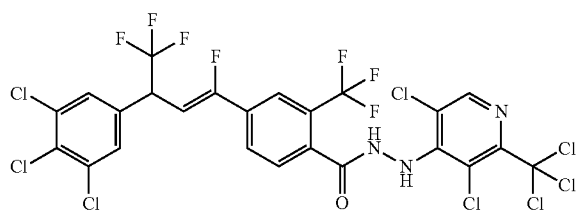 [SMILES: O=C(NNc1c(Cl)cnc(C(Cl)(Cl)Cl)c1Cl)c1ccc(/C(F)=C/C(c2cc(Cl)c(Cl)c(Cl)c2)C(F)(F)F)cc1C(F)(F)F]

Isolated as a yellow wax (0.067 g, 41%).

(Z)—N'-Methyl-N'-(pyrimidin-2-yl)-4-(1,4,4,4-tetrafluoro-3-(3,4,5-trichlorophenyl)but-1-en-1-yl)-2-(trifluoromethyl)benzohydrazide (F71)

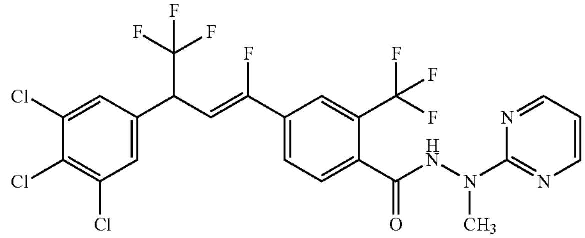

Isolated as a yellow gum (0.067 g, 45%).

(Z)—N'-Mesityl-4-(1,4,4,4-tetrafluoro-3-(3,4,5-trichlorophenyl)but-1-en-1-yl)-2-(trifluoromethyl) benzohydrazide (F73)

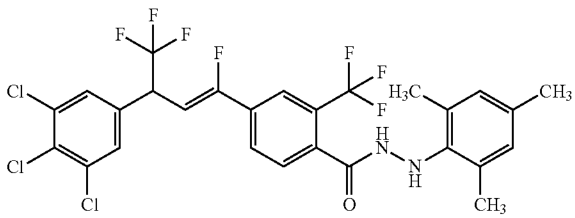 [SMILES: Cc1cc(C)c(NNC(=O)c2ccc(/C(F)=C/C(c3cc(Cl)c(Cl)c(Cl)c3)C(F)(F)F)cc2C(F)(F)F)c(C)c1]

Isolated as a yellow wax (0.065 g, 49%).

(Z)—N'-(5-Ethyl pyrimidin-2-yl)-4-(1,4,4,4-tetrafluoro-3-(3,4,5-trichlorophenyl)but-1-en-1-yl)-2-(trifluoromethyl)benzohydrazide (F84)

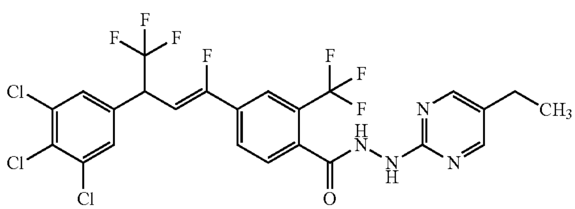 [SMILES: CCc1cnc(NNC(=O)c2ccc(/C(F)=C/C(c3cc(Cl)c(Cl)c(Cl)c3)C(F)(F)F)cc2C(F)(F)F)nc1]

Isolated as a yellow wax (0.110 g, 74%).

(Z)—N'-(2,6-Dichloro-4-(trifluoromethyl)phenyl)-4-(1,4,4,4-tetrafluoro-3-(3,4,5-trichlorophenyl)but-1-en-1-yl)-2-(trifluoromethyl)benzohydrazide (F87)

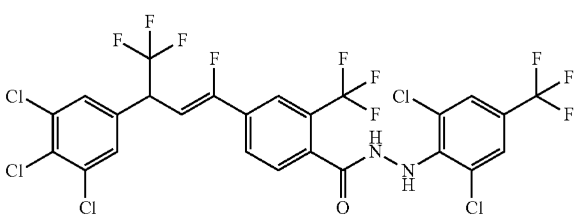 [SMILES: O=C(NNc1c(Cl)cc(C(F)(F)F)cc1Cl)c1ccc(/C(F)=C/C(c2cc(Cl)c(Cl)c(Cl)c2)C(F)(F)F)cc1C(F)(F)F]

Isolated as a yellow wax (0.094 g, 62%).

(Z)—N'-(5-Methoxypyrimidin-2-yl)-4-(1,4,4,4-tetrafluoro-3-(3,4,5-trichlorophenyl)but-1-en-1-yl)-2-(trifluoromethyl)benzohydrazide (F90)

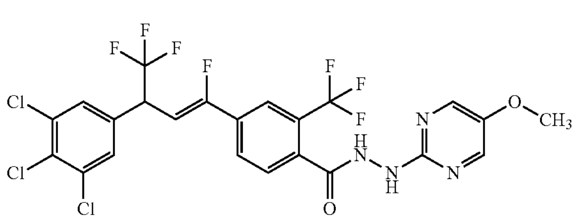 [SMILES: COc1cnc(NNC(=O)c2ccc(/C(F)=C/C(c3cc(Cl)c(Cl)c(Cl)c3)C(F)(F)F)cc2C(F)(F)F)nc1]

Isolated as a yellow wax (0.086 g, 57%).

(Z)—N'-(Pyrimidin-2-yl)-4-(1,4,4,4-tetrafluoro-3-(3,4,5-trichlorophenyl)but-1-en-1-yl)-2-(trifluoromethyl)benzohydrazide (F97)

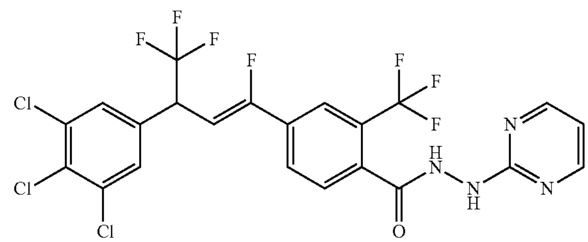 [SMILES: O=C(NNc1ncccn1)c1ccc(/C(F)=C/C(c2cc(Cl)c(Cl)c(Cl)c2)C(F)(F)F)cc1C(F)(F)F]

Isolated as a light brown solid (5.5 g, 49%).

(Z)—N-(Cyclopropyl methyl)-4-(1,4,4,4-tetrafluoro-3-(3,4,5-trichlorophenyl)but-1-en-1-yl)-2-(trifluoromethyl)benzohydrazide (F98)

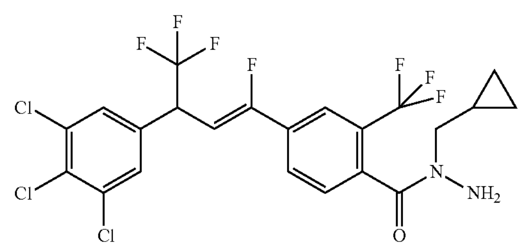 [SMILES: NN(CC1CC1)C(=O)c1ccc(/C(F)=C/C(c2cc(Cl)c(Cl)c(Cl)c2)C(F)(F)F)cc1C(F)(F)F]

Isolated as a yellow foam (0.060 g, 34%).

(Z)-4-(1,4,4,4-Tetrafluoro-3-(3,4,5-trichlorophenyl) but-1-en-1-yl)-2-(trifluoromethyl)-N'-(5-(trifluoromethyl)pyrimidin-2-yl)benzohydrazide (F101)

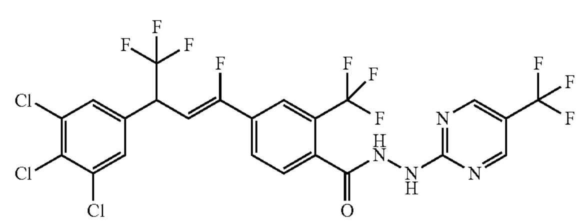 [SMILES: O=C(NNc1ncc(C(F)(F)F)cn1)c1ccc(/C(F)=C/C(c2cc(Cl)c(Cl)c(Cl)c2)C(F)(F)F)cc1C(F)(F)F]

Isolated as a yellow wax (0.109 g, 69%).

(Z)—N-Cyclopropyl-4-(1,4,4,4-tetrafluoro-3-(3,4,5-trichlorophenyl)but-1-en-1-yl)-2-(trifluoromethyl) benzohydrazide (F112)

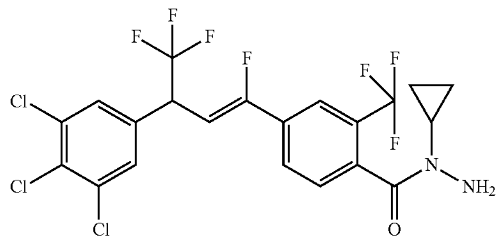 [SMILES: NN(C(=O)c1ccc(/C(F)=C/C(c2cc(Cl)c(Cl)c(Cl)c2)C(F)(F)F)cc1C(F)(F)F)C1CC1]

Isolated as a yellow oil (0.025 g, 15%).

(Z)—N'-(5-Fluoropyrimidin-2-yl)-4-(1,4,4,4-tetrafluoro-3-(3,4,5-trichlorophenyl)but-1-en-1-yl)-2-(trifluoromethyl)benzohydrazide (F114)

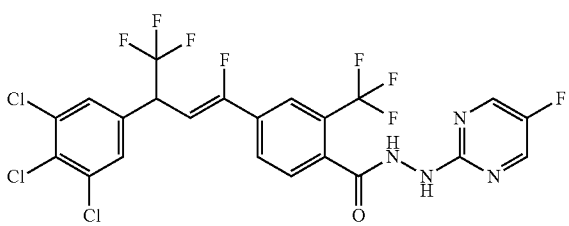 [SMILES: O=C(NNc1ncc(F)cn1)c1ccc(/C(F)=C/C(c2cc(Cl)c(Cl)c(Cl)c2)C(F)(F)F)cc1C(F)(F)F]

Isolated as a yellow wax (0.074 g, 51%).

(Z)—N'-(Perchloropyridin-4-yl)-4-(1,4,4,4-tetrafluoro-3-(3,4,5-trichlorophenyl)but-1-en-1-yl)-2-(trifluoromethyl)benzohydrazide (F131)

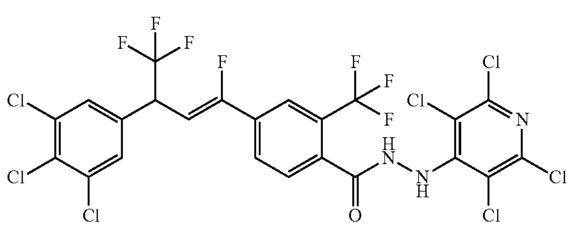 [SMILES: O=C(NNc1c(Cl)c(Cl)nc(Cl)c1Cl)c1ccc(/C(F)=C/C(c2cc(Cl)c(Cl)c(Cl)c2)C(F)(F)F)cc1C(F)(F)F]

Isolated as a yellow wax (0.035 g, 23%).

(Z)-4-(3-(3,4-Dichloro-5-vinylphenyl)-1,4,4,4-tetrafluorobut-1-en-1-yl)-N'-(pyrimidin-2-yl)-2-(trifluoromethyl)benzohydrazide (F168)

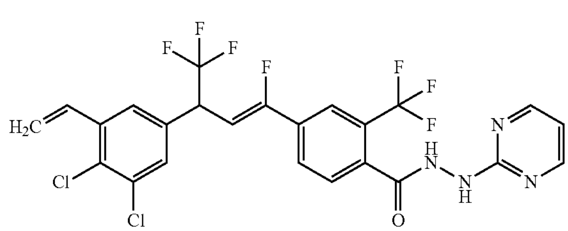 [SMILES: C=Cc1cc(C(/C=C(\F)c2ccc(C(=O)NNc3ncccn3)c(C(F)(F)F)c2)C(F)(F)F)cc(Cl)c1Cl]

Isolated as a yellow gum (0.130 g, 63%).

Example 20: Preparation of (Z)—N-(1,1-dioxidothiomorpholino)-4-(1,4,4,4-tetrafluoro-3-(3,4,5-trichlorophenyl)but-1-en-1-yl)-2-(trifluoromethyl) benzamide (F122)

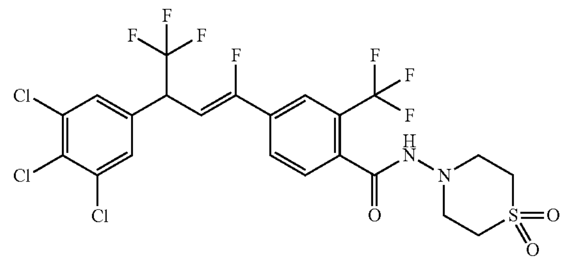 [SMILES: O=C(NN1CCS(=O)(=O)CC1)c1ccc(/C(F)=C/C(c2cc(Cl)c(Cl)c(Cl)c2)C(F)(F)F)cc1C(F)(F)F]

To a solution of (Z)-4-(1,4,4,4-tetrafluoro-3-(3,4,5-trichlorophenyl)but-1-en-1-yl)-2-(trifluoromethyl)benzoic acid (C2) (0.204 g, 0.412 mmol) in acetonitrile (4 mL) were added 1H-benzo[d][1,2,3]triazol-1-ol hydrate (0.079 g, 0.52 mmol), 0-(benzotriazol-1-yl)-N,N,N',N'-tetramethyluronium hexafluorophosphate (0.19 g, 0.51 mmol), 4-aminothiomorpholine 1,1-dioxide (0.186 g, 1.25 mmol) and N-ethyl-N-isopropylpropan-2-amine (0.20 mL, 1.15 mmol). The reaction mixture was stirred at room temperature for 18 hours, then concentrated under reduced pressure. The residue was taken up in ethyl acetate and the mixture was washed with 5% aqueous sodium bisulfate (3×), saturated aqueous sodium carbonate, and brine. The organic phase was dried over magnesium sulfate, filtered, and concentrated under reduce pressure. Purification by column chromatography (silica gel, eluting with a 0-100% gradient of ethyl acetate in hexanes) afforded the title compound as a white semi-solid (0.165 g, 64%).

Example 21: Preparation of (Z)—N'-(methoxymethyl)-N'-(pyrimidin-2-yl)-4-(1,4,4,4-tetrafluoro-3-(3,4,5-trichlorophenyl)but-1-en-1-yl)-2-(trifluoromethyl)benzohydrazide (F179)

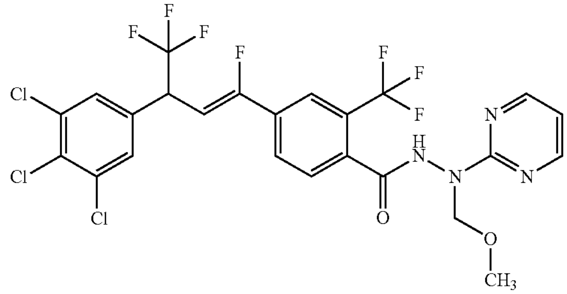 [SMILES: COCN(NC(=O)c1ccc(/C(F)=C/C(c2cc(Cl)c(Cl)c(Cl)c2)C(F)(F)F)cc1C(F)(F)F)c1ncccn1]

To a solution of (Z)-4-(1,4,4,4-tetrafluoro-3-(3,4,5-trichlorophenyl)but-1-en-1-yl)-2-(trifluoromethyl)benzoic acid (C2) (0.15 g, 0.30 mmol) and 2-(1-(methoxymethyl) hydrazinyl)-pyrimidine (0.060 g, 0.36 mmol) in chloroform (5 mL) cooled in an ice bath were added 2-chloro-1,3-dimethylimidazolidinium hexafluorophosphate (0.31 g, 1.82 mmol) and pyridine (0.190 g, 2.42 mmol). The mixture was allowed to warm to room temperature and stir for 2 hours.

The mixture was partitioned between ice cold water and methylene chloride. The organic phase was washed with brine, dried over sodium sulfate, filtered and concentrated under reduced pressure. Purification of the crude product by column chromatography (silica gel, 100-200 mesh, eluting with 50% ethyl acetate in petroleum ether) afforded the title compound as a yellow solid (0.050 g, 26%).

The following compounds were prepared in like manner to the procedure outlined in Example 21.

(Z)—N'-Methyl-N-(prop-2-yn-1-yl)-N'-(pyrimidin-2-yl)-4-(1,4,4,4-tetrafluoro-3-(3,4,5-trichlorophenyl)but-1-en-1-yl)-2-(trifluoromethyl)benzohydrazide (F180)

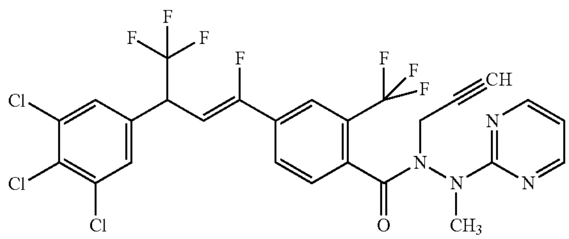 [SMILES: C#CCN(C(=O)c1ccc(/C(F)=C/C(c2cc(Cl)c(Cl)c(Cl)c2)C(F)(F)F)cc1C(F)(F)F)N(C)c1ncccn1]

Isolated as a yellow solid (0.150 g, 39%).

tert-Butyl (Z)-2-(2-oxo-2-((2,2,2-trifluoroethyl)amino)ethyl)-2-(4-(1,4,4,4-tetrafluoro-3-(3,4,5-trichlorophenyl)but-1-en-1-yl)-2-(trifluoromethyl)benzoyl)hydrazine-1-carboxylate (C75)

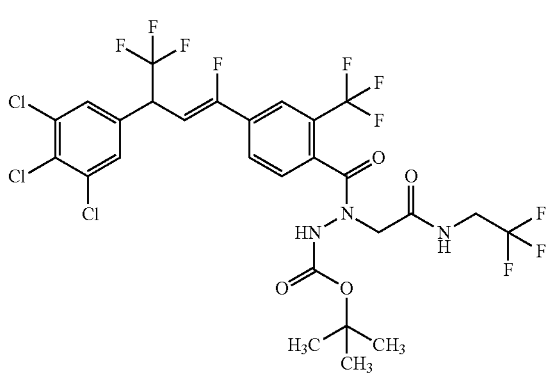 [SMILES: CC(C)(C)OC(=O)NN(CC(=O)NCC(F)(F)F)C(=O)c1ccc(/C(F)=C/C(c2cc(Cl)c(Cl)c(Cl)c2)C(F)(F)F)cc1C(F)(F)F]

Isolated and carried on without further purification as a light yellow solid (0.30 g, 79%): ESIMS m/z 748 ([M+H]$^+$).

tert-Butyl (Z)-1-methyl-2-(2-oxo-2-((2,2,2-trifluoroethyl)amino)ethyl)-2-(4-(1,4,4,4-tetrafluoro-3-(3,4,5-trichlorophenyl)but-1-en-1-yl)-2-(trifluoromethyl)benzoyl)hydrazine-1-carboxylate (C76)

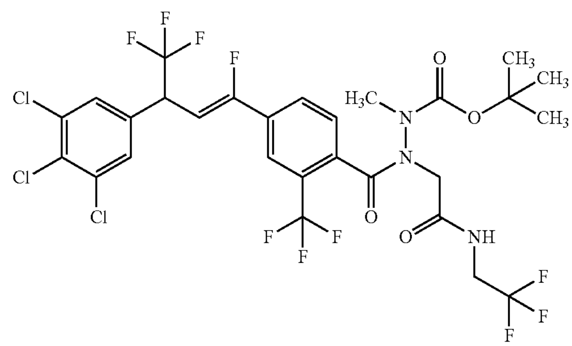 [SMILES: CN(C(=O)OC(C)(C)C)N(CC(=O)NCC(F)(F)F)C(=O)c1ccc(/C(F)=C/C(c2cc(Cl)c(Cl)c(Cl)c2)C(F)(F)F)cc1C(F)(F)F]

Isolated and carried on without further purification as a light yellow solid (0.60 g, 71%): ESIMS m/z 764 ([M+H]$^+$).

Example 22: Preparation of (Z)-4-(1,4,4,4-tetrafluoro-3-(3,4,5-trichlorophenyl)but-1-en-1-yl)-N'-(4,4,4-trifluorobutyl)-2-(trifluoromethyl)benzohydrazide (F103)

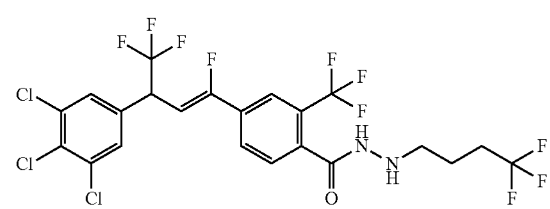 [SMILES: O=C(NNCCCC(F)(F)F)c1ccc(/C(F)=C/C(c2cc(Cl)c(Cl)c(Cl)c2)C(F)(F)F)cc1C(F)(F)F]

To a solution of (Z)-4-(1,4,4,4-tetrafluoro-3-(3,4,5-trichlorophenyl)but-1-en-1-yl)-2-(trifluoromethyl)benzohydrazide hydrochloride (C77) (0.075 g, 0.137 mmol) in methanol (0.549 mL) were added sequentially 4,4,4-trifluorobutanal (0.017 mL, 0.172 mmol) and sodium cyanoborohydride (0.013 g, 0.206 mmol). The reaction mixture was stirred at room temperature for 1 hour. The reaction mixture was directly concentrated onto diatomaceous earth and was purified by silica gel chromatography eluting with a gradient of 0-30% acetone in hexanes. The title compound was isolated as a clear, foamy glass (0.022 g, 26%).

The following compounds were prepared in like manner to the procedure outlined in Example 22:

(Z)—N'-Cyclopentyl-4-(1,4,4,4-tetrafluoro-3-(3,4,5-trichlorophenyl)but-1-en-1-yl)-2-(trifluoromethyl)benzohydrazide (F110)

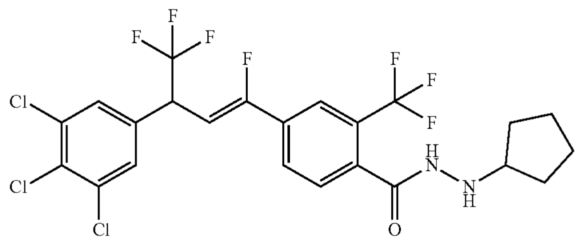 [SMILES: O=C(NNC1CCCC1)c1ccc(/C(F)=C/C(c2cc(Cl)c(Cl)c(Cl)c2)C(F)(F)F)cc1C(F)(F)F]

Isolated as a yellow glass (0.041 g, 48%).

(Z)—N'-Cyclohexyl-4-(1,4,4,4-tetrafluoro-3-(3,4,5-trichlorophenyl)but-1-en-1-yl)-2-(trifluoromethyl)benzohydrazide (F137)

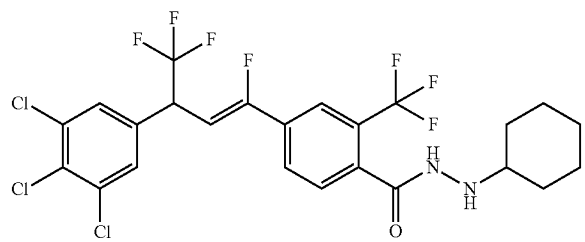 [SMILES: O=C(NNC1CCCCC1)c1ccc(/C(F)=C/C(c2cc(Cl)c(Cl)c(Cl)c2)C(F)(F)F)cc1C(F)(F)F]

Isolated as a pale yellow glass (0.036 g, 33%).

(Z)—N'-Cyclobutyl-4-(1,4,4,4-tetrafluoro-3-(3,4,5-trichlorophenyl)but-1-en-1-yl)-2-(trifluoromethyl)benzohydrazide (F138)

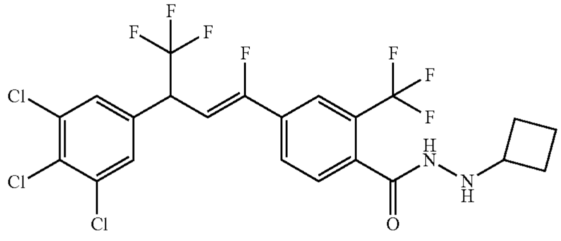 [SMILES: O=C(NNC1CCC1)c1ccc(/C(F)=C/C(c2cc(Cl)c(Cl)c(Cl)c2)C(F)(F)F)cc1C(F)(F)F]

Isolated as a pale yellow glass (0.030 g, 29%).

(Z)—N'-Neopentyl-4-(1,4,4,4-tetrafluoro-3-(3,4,5-trichlorophenyl)but-1-en-1-yl)-2-(trifluoromethyl)benzohydrazide (F140)

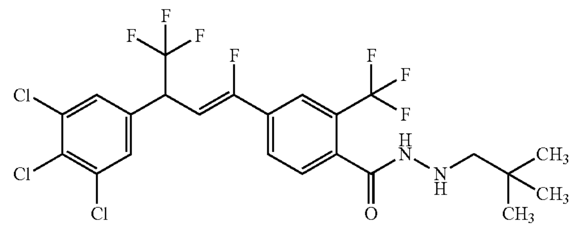 [SMILES: CC(C)(C)CNNC(=O)c1ccc(/C(F)=C/C(c2cc(Cl)c(Cl)c(Cl)c2)C(F)(F)F)cc1C(F)(F)F]

Isolated as a pale yellow glass (0.030 g, 28%).

(Z)—N'-Cyclopentyl-N'-methyl-4-(1,4,4,4-tetrafluoro-3-(3,4,5-trichlorophenyl)but-1-en-1-yl)-2-(trifluoromethyl)benzohydrazide (F144)

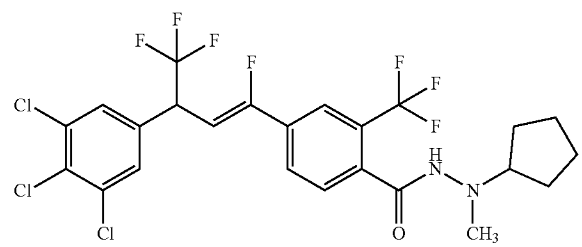 [SMILES: CN(NC(=O)c1ccc(/C(F)=C/C(c2cc(Cl)c(Cl)c(Cl)c2)C(F)(F)F)cc1C(F)(F)F)C1CCCC1]

Isolated as a yellow glass (0.075 g, 66%).

(Z)—N'-(4,4-Difluorocyclohexyl)-4-(1,4,4,4-tetrafluoro-3-(3,4,5-trichlorophenyl)but-1-en-1-yl)-2-(trifluoromethyl)benzohydrazide (F146)

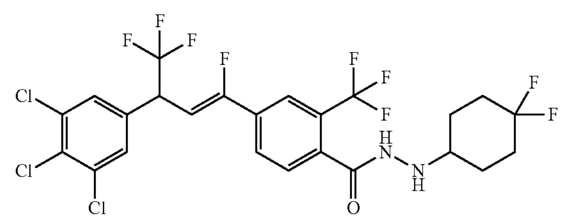 [SMILES: O=C(NNC1CCC(F)(F)CC1)c1ccc(/C(F)=C/C(c2cc(Cl)c(Cl)c(Cl)c2)C(F)(F)F)cc1C(F)(F)F]

Isolated as a yellow glass (0.059 g, 48%).

(Z)—N'-Methyl-4-(1,4,4,4-tetrafluoro-3-(3,4,5-trichlorophenyl)but-1-en-1-yl)-N'-(4,4,4-trifluorobutyl)-2-(trifluoromethyl)benzohydrazide (F155)

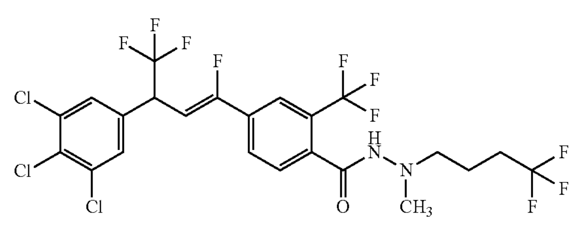 [SMILES: CN(CCCC(F)(F)F)NC(=O)c1ccc(/C(F)=C/C(c2cc(Cl)c(Cl)c(Cl)c2)C(F)(F)F)cc1C(F)(F)F]

Isolated as a yellow glass (0.070 g, 55%).

(Z)—N'-(Cyclopropylmethyl)-N'-methyl-4-(1,4,4,4-tetrafluoro-3-(3,4,5-trichlorophenyl)but-1-en-1-yl)-2-(trifluoromethyl)benzohydrazide (F159)

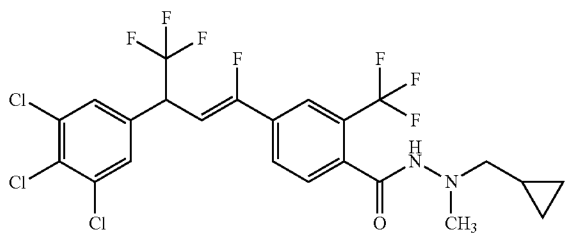 [SMILES: CN(CC1CC1)NC(=O)c1ccc(/C(F)=C/C(c2cc(Cl)c(Cl)c(Cl)c2)C(F)(F)F)cc1C(F)(F)F]

Isolated as a yellow glass (0.034 g, 33%).

(Z)—N'-Isopentyl-N'-methyl-4-(1,4,4,4-tetrafluoro-3-(3,4,5-trichlorophenyl)but-1-en-1-yl)-2-(trifluoromethyl)benzohydrazide (F160)

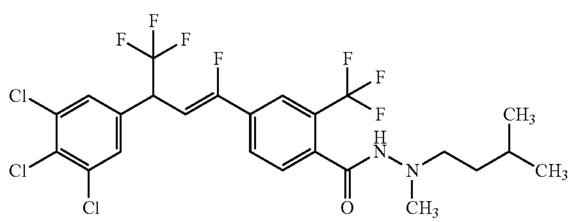 [SMILES: CC(C)CCN(C)NC(=O)c1ccc(/C(F)=C/C(c2cc(Cl)c(Cl)c(Cl)c2)C(F)(F)F)cc1C(F)(F)F]

Isolated as a yellow glass (0.067 g, 63%).

(Z)—N'-(Cyclopropyl methyl)-4-(1,4,4,4-tetrafluoro-3-(3,4,5-trichlorophenyl)but-1-en-1-yl)-2-(trifluoromethyl)benzohydrazide (F162)

n

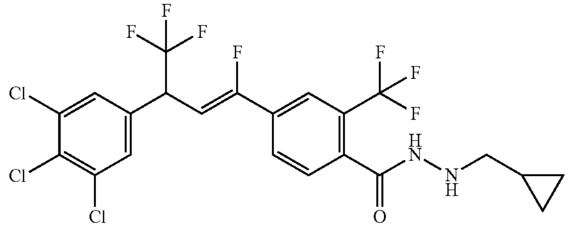 [SMILES: O=C(NNCC1CC1)c1ccc(/C(F)=C/C(c2cc(Cl)c(Cl)c(Cl)c2)C(F)(F)F)cc1C(F)(F)F]

Isolated as a white foam (0.030 g, 23%).

Example 23: Preparation of (Z)—N'-methyl-4-(1,4,4,4-tetrafluoro-3-(3,4,5-trichlorophenyl)but-1-en-1-yl)-N'-(thiazol-2-yl)-2-(trifluoromethyl)benzohydrazide (F158)

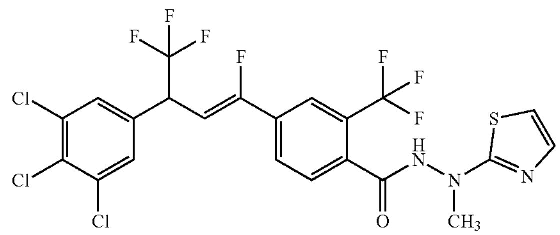 [SMILES: CN(NC(=O)c1ccc(/C(F)=C/C(c2cc(Cl)c(Cl)c(Cl)c2)C(F)(F)F)cc1C(F)(F)F)c1nccs1]

(Z)—N'-Methyl-4-(1,4,4,4-tetrafluoro-3-(3,4,5-trichlorophenyl)but-1-en-1-yl)-2-(trifluoromethyl)benzohydrazide hydrochloride (C78) (0.100 g, 0.179 mmol) was suspended in ethanol (0.893 mL) to which were added N-ethyl-N-isopropylpropan-2-amine (0.047 mL, 0.268 mmol) and 2-chlorothiazole (0.061 mL, 0.714 mmol). The reaction mixture was sealed in a pressure vessel and heated to 90° C. After 6 hours, the reaction mixture was concentrated. Purification by silica gel chromatography eluting with a gradient of 0-30% acetone in hexanes afforded the title compound as a foamy glass (0.066 g, 61%).

Example 24: Preparation of N'-((E)-benzylidene)-4-((Z)-1,4,4,4-tetrafluoro-3-(3,4,5-trichlorophenyl)but-1-en-1-yl)-2-(trifluoromethyl)benzohydrazide (F38)

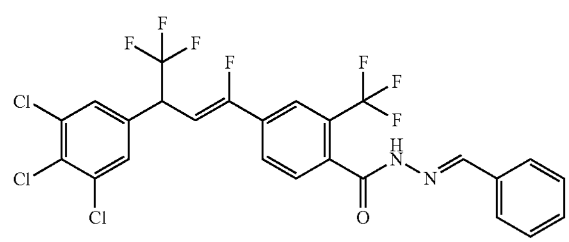 [SMILES: O=C(N/N=C/c1ccccc1)c1ccc(/C(F)=C/C(c2cc(Cl)c(Cl)c(Cl)c2)C(F)(F)F)cc1C(F)(F)F]

(Z)-4-(1,4,4,4-Tetrafluoro-3-(3,4,5-trichlorophenyl)but-1-en-1-yl)-2-(trifluoromethyl)benzohydrazide hydrochloride (C77) (0.095 g, 0.174 mmol) was suspended in dichloromethane at room temperature to which were added in rapid succession N-ethyl-N-isopropylpropan-2-amine (0.061 mL, 0.348 mmol) and benzaldehyde (0.023 mL, 0.226 mmol). The reaction mixture was stirred overnight at room temperature and then was heated to 55° C. in a pressure vial for 3 hours. The reaction mixture was concentrated. Purification by silica gel chromatography eluting with 0-30% acetone in hexanes provided the title compound as a colorless glass (0.018 g, 16%).

Example 25: Preparation of (Z)-2-(1-(4-(1,4,4,4-tetrafluoro-3-(3,4,5-trichlorophenyl)but-1-en-1-yl)-2-(trifluoromethyl)benzoyl)hydrazinyl)-N-(2,2,2-trifluoroethyl)acetamide (F149)

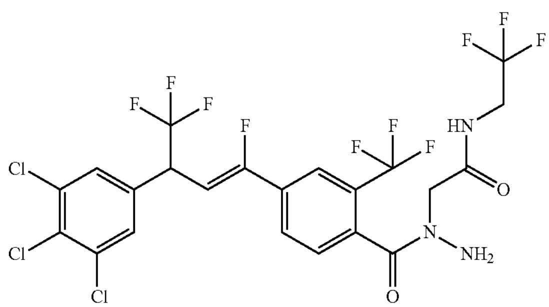 [SMILES: NN(CC(=O)NCC(F)(F)F)C(=O)c1ccc(/C(F)=C/C(c2cc(Cl)c(Cl)c(Cl)c2)C(F)(F)F)cc1C(F)(F)F]

To tert-butyl (Z)-2-(2-oxo-2-((2,2,2-trifluoroethyl)amino)ethyl)-2-(4-(1,4,4,4-tetrafluoro-3-(3,4,5-trichlorophenyl)but-1-en-1-yl)-2-(trifluoromethyl)benzoyl)hydrazine-1-carboxylate (C75) (0.300 g, 0.401 mmol) in 1,4-dioxane (8 mL) cooled in an ice bath was added 4 M hydrogen chloride in dioxane (8 mL). The solution was warmed to room temperature and stirred for 12 hours. The reaction mixture was concentrated under reduced pressure and the residue partitioned between ethyl acetate and aqueous sodium carbonate. The organic phase was washed brine, dried over sodium sulfate, filtered and concentrated under reduce pressure. Purification by column chromatography afforded the title compound as an off-white solid (0.120 g, 45%).

The following compounds were prepared in like manner to the procedure outlined in Example 25:

(Z)-2-(2-Methyl-1-(4-(1,4,4,4-tetrafluoro-3-(3,4,5-trichlorophenyl)but-1-en-1-yl)-2-(trifluoromethyl)benzoyl)hydrazinyl)-N-(2,2,2-trifluoroethyl)acetamide (F183)

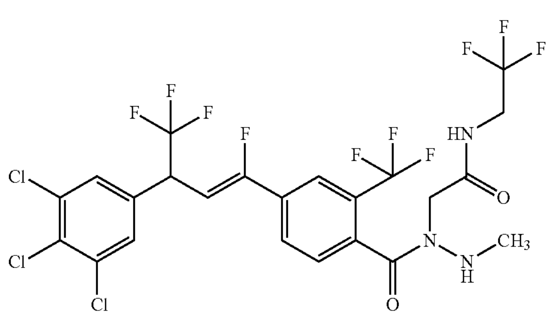 [SMILES: CNN(CC(=O)NCC(F)(F)F)C(=O)c1ccc(/C(F)=C/C(c2cc(Cl)c(Cl)c(Cl)c2)C(F)(F)F)cc1C(F)(F)F]

Isolated as an off-white solid (0.400 g, 74%).

Example 26: Preparation of (Z)-2-(2,2-dimethyl-1-(4-(1,4,4,4-tetrafluoro-3-(3,4,5-trichlorophenyl)but-1-en-1-yl)-2-(trifluoromethyl)benzoyl)hydrazinyl)-N-(2,2,2-trifluoroethyl)acetamide (F184)

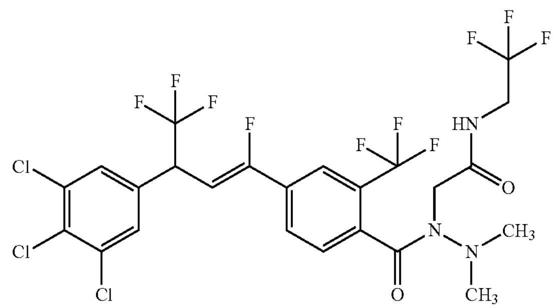 [SMILES: CN(C)N(CC(=O)NCC(F)(F)F)C(=O)c1ccc(/C(F)=C/C(c2cc(Cl)c(Cl)c(Cl)c2)C(F)(F)F)cc1C(F)(F)F]

To a solution of (Z)-2-(2-methyl-1-(4-(1,4,4,4-tetrafluoro-3-(3,4,5-trichlorophenyl)but-1-en-1-yl)-2-(trifluoromethyl)benzoyl)hydrazinyl)-N-(2,2,2-trifluoroethyl)acetamide (F183) (0.280 g, 0.42 mmol) in N,N-dimethylformamide (8 mL) at room temperature were added triethylamine (0.29 mL, 2.1 mmol) and methyl iodide (0.080 g, 1.27 mmol). The mixture was heated to 40° C. for 12 hours and then partitioned between ice water and ethyl acetate. The organic phase was washed with brine, dried over sodium sulfate, filtered and concentrated under reduced pressure. The title compound was isolated as a pale yellow solid (0.180 g, 55%).

Example 27: Preparation of (Z)—N,N'-bis(cyanomethyl)-N'-(pyrimidin-2-yl)-4-(1,4,4,4-tetrafluoro-3-(3,4,5-trichlorophenyl)but-1-en-1-yl)-2-(trifluoromethyl)benzohydrazide (F187)

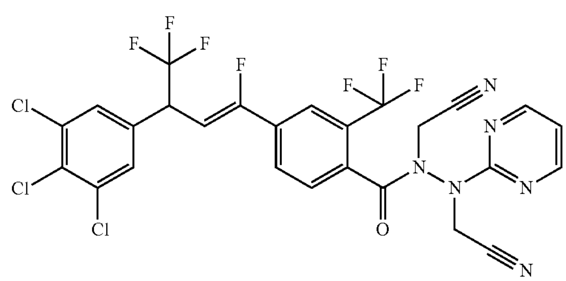 [SMILES: N#CCN(C(=O)c1ccc(/C(F)=C/C(c2cc(Cl)c(Cl)c(Cl)c2)C(F)(F)F)cc1C(F)(F)F)N(CC#N)c1ncccn1]

To a solution of (Z)—N'-(pyrimidin-2-yl)-4-(1,4,4,4-tetrafluoro-3-(3,4,5-trichlorophenyl)but-1-en-1-yl)-2-(trifluoromethyl)benzohydrazide (F97) (0.20 g, 0.34 mmol) and 2-bromoacetonitrile (0.050 g, 0.41 mmol) in N,N-dimethylformamide (5 mL) was added triethylamine (0.090 mL, 0.51 mmol). After stirring for 1 hour at room temperature the mixture was partitioned between ice water and ethyl acetate. The organic phase was washed with brine, dried over sodium sulfate, filtered and concentrated under reduced pressure. Purification of the crude product by column chromatography (silica gel, 100-200 mesh, eluting with 50% ethyl acetate in hexanes) afforded the title compound as a brown oil (0.060 g, 26%).

Example 28: Preparation of (Z)—N'-(cyanomethyl)-N'-(pyrimidin-2-yl)-4-(1,4,4,4-tetrafluoro-3-(3,4,5-trichlorophenyl)but-1-en-1-yl)-2-(trifluoromethyl)benzohydrazide (F189)

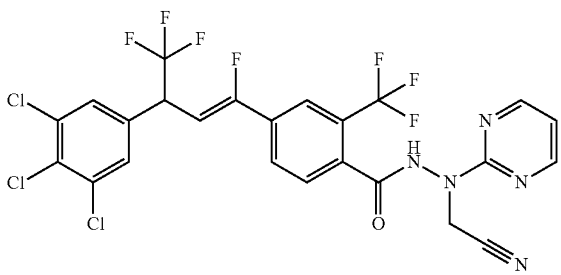 [SMILES: N#CCN(NC(=O)c1ccc(/C(F)=C/C(c2cc(Cl)c(Cl)c(Cl)c2)C(F)(F)F)cc1C(F)(F)F)c1ncccn1]

To a solution of (Z)—N'-(pyrimidin-2-yl)-4-(1,4,4,4-tetrafluoro-3-(3,4,5-trichlorophenyl)but-1-en-1-yl)-2-(trifluoromethyl)benzohydrazide (F97) (1.10 g, 1.87 mmol) in N,N-dimethylformamide (15 mL) were added triethylamine (0.35 mL, 2.1 mmol) and 2-bromoacetonitrile (0.11 g, 0.94 mmol). After stirring for 48 hour at room temperature the mixture was partitioned between ice water and ethyl acetate. The organic phase was washed with brine, dried over sodium sulfate, filtered and concentrated under reduced pressure. Purification of the crude product by column chromatography (silica gel, 100-200 mesh, eluting with 30% ethyl acetate in hexanes) afforded the title compound an off-white solid (0.060 g, 5%).

Example 29: Preparation of (Z)-4-(1,4,4,4-Tetrafluoro-3-(3,4,5-trichlorophenyl)but-1-en-1-yl)-2-(trifluoromethyl)benzohydrazide Hydrochloride (C77)

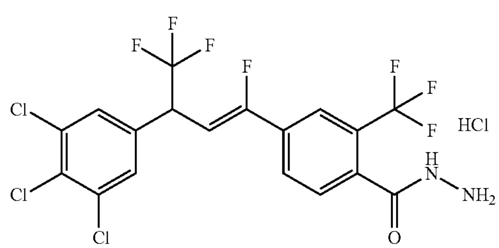 [SMILES: NNC(=O)c1ccc(/C(F)=C/C(c2cc(Cl)c(Cl)c(Cl)c2)C(F)(F)F)cc1C(F)(F)F ; Cl]

Hydrochloric acid (4 M in dioxane, 3.00 mL) was added to tert-butyl (Z)-2-(4-(1,4,4,4-tetrafluoro-3-(3,4,5-trichlorophenyl) but-1-en-1-yl)-2-(trifluoromethyl)benzoyl)hydrazine-1-carboxylate (C73) (2.44 g, 4.00 mmol). The reaction mixture was stirred for 1 hour, and the solvent was removed overnight under a stream of nitrogen. The title compound was isolated as a white amorphous solid (2.01 g, 92%): $^{1}$H NMR (400 MHz, Methanol-$d_4$) δ 8.14 (d, J=1.6 Hz, 1H), 8.08 (dd, J=8.1, 1.7 Hz, 1H), 7.78 (s, 2H), 7.74 (d, J=8.1 Hz, 1H), 6.53 (dd, J=34.0, 9.8 Hz, 1H), 5.00 (q, J=9.1 Hz, 1H); $^{19}$F NMR (376 MHz, Methanol-$d_4$) δ −60.62, −71.14 (d, J=2.6 Hz), −115.23 (d, J=2.9 Hz); ESIMS m/z 509 ([M+H]$^{+}$).

The following compounds were prepared in like manner to the procedure outlined in Example 29:

(Z)—N'-Methyl-4-(1,4,4,4-tetrafluoro-3-(3,4,5-trichlorophenyl)but-1-en-1-yl)-2-(trifluoromethyl)benzohydrazide hydrochloride (C78)

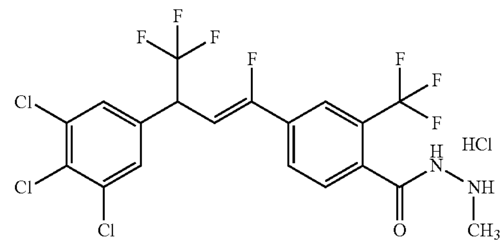 [SMILES: CNNC(=O)c1ccc(/C(F)=C/C(c2cc(Cl)c(Cl)c(Cl)c2)C(F)(F)F)cc1C(F)(F)F ; Cl]

Isolated as a yellow powder (0.590 g, 97%): $^{1}$H NMR (400 MHz, Methanol-$d_4$) δ 8.15 (d, J=1.6 Hz, 1H), 8.09 (dd, J=8.2, 1.7 Hz, 1H), 7.77 (d, J=6.2 Hz, 3H), 6.63 6.46 (m, 1H), 4.98 (q, J=9.1 Hz, 1H), 3.04 (s, 3H); $^{19}$F NMR (376 MHz, Methanol-$d_4$) δ −60.49, −71.12 (d, J=2.2 Hz), −115.24 (d, J=2.8 Hz); ESIMS m/z 523 ([M+H]$^{+}$).

Example 30: Preparation of (Z)—N'-methyl-4-(1,4,4,4-tetrafluoro-3-(3,4,5-trichlorophenyl)but-1-en-1-yl)-2-(trifluoromethyl)-N'-(4-(trifluoromethyl)pyrimidin-2-yl)benzohydrazide (F91)

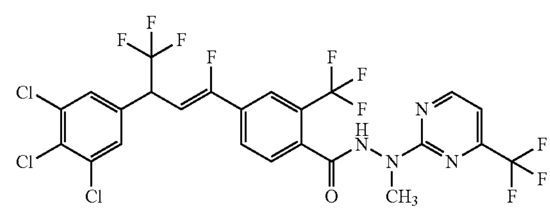 [SMILES: CN(NC(=O)c1ccc(/C(F)=C/C(c2cc(Cl)c(Cl)c(Cl)c2)C(F)(F)F)cc1C(F)(F)F)c1nccc(C(F)(F)F)n1]

To a stirred solution of (Z)—N'-methyl-4-(1,4,4,4-tetrafluoro-3-(3,4,5-trichlorophenyl)but-1-en-1-yl)-2-(trifluoromethyl)benzohydrazide hydrochloride (C78) (0.060 g, 0.115 mmol) and 2-chloro-4-(trifluoromethyl)pyrimidine (31.4 mg, 0.172 mmol) in ethanol (0.4 mL) was added N-ethyl-N-isopropylpropan-2-amine (61.2 μL, 0.344 mmol). The reaction mixture was heated in a 65° C. bath for 2 hours. The reaction mixture was cooled to ambient temperature and diluted with water (15 mL). The mixture was extracted with ethyl acetate. The organic layer was washed with brine, dried over sodium sulfate and concentrated under reduced pressure to afford crude compound. Purification of the crude compound by column chromatography (silica gel, eluting with 0-10% methanol in dichloromethane) afforded the title compound as a yellow gum (0.042 g, 52%).

Example 31: Preparation of ((E)-pyrimidin-2-yldiazenyl)(4-((Z)-1,4,4,4-tetrafluoro-3-(3,4,5-trichlorophenyl)but-1-en-1-yl)-2-(trifluoromethyl)phenyl)methanone (F192)

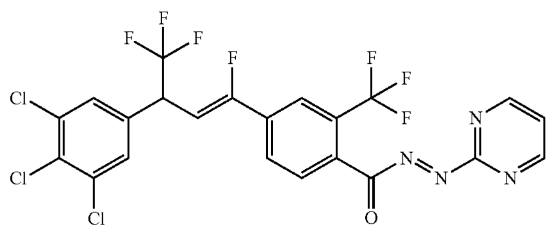 [SMILES: O=C(/N=N/c1ncccn1)c1ccc(/C(F)=C/C(c2cc(Cl)c(Cl)c(Cl)c2)C(F)(F)F)cc1C(F)(F)F]

To a stirred solution of (Z)—N'-(pyrimidin-2-yl)-4-(1,4,4,4-tetrafluoro-3-(3,4,5-trichlorophenyl)but-1-en-1-yl)-2-(trifluoromethyl)benzohydrazide (F97) (0.100 g, 0.170 mmol) in dichloromethane (1.7 mL) were added pyridine (14.8 mg, 0.187 mmol) and 1-bromopyrrolidine-2,5-dione (33.3 mg, 0.187 mmol) at 0° C. The reaction mixture was stirred in a 0° C. bath for 1 hour. The reaction mixture was warmed to ambient temperature and diluted with water (15 mL). The mixture was extracted with ethyl acetate. The organic layer was washed with brine, dried over sodium sulfate and concentrated under reduced pressure to afford crude compound. Purification of the crude compound by column chromatography (silica gel, eluting with 0-10% methanol in dichloromethane) afforded the title compound as a yellow gum (0.052 g, 50%).

Example 32: Preparation of (Z)-4-(3-(3,4-dichloro-5-formylphenyl)-1,4,4,4-tetrafluorobut-1-en-1-yl)-N'-(pyrimidin-2-yl)-2-(trifluoromethyl)benzohydrazide (F181)

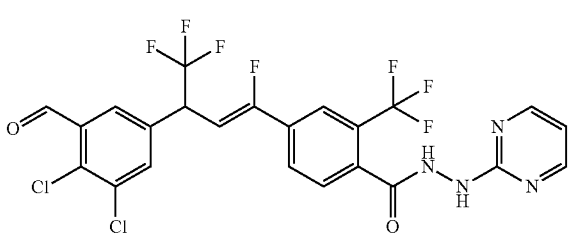 [SMILES: O=Cc1cc(C(/C=C(\F)c2ccc(C(=O)NNc3ncccn3)c(C(F)(F)F)c2)C(F)(F)F)cc(Cl)c1Cl]

Osmium tetraoxide (2.5% in tert-butanol, 0.053 g, 0.005 mmol) was added to a solution of (Z)-4-(3-(3,4-dichloro-5-vinylphenyl)-1,4,4,4-tetrafluorobut-1-en-1-yl)-N'-(pyrimidin-2-yl)-2-(trifluoromethyl)benzohydrazide (F168) (0.060 g, 0.104 mmol) in tetrahydrofuran-water (2:1, 1.1 mL) at room temperature. The reaction mixture was stirred for 5 minutes. Sodium periodate (0.067 g, 0.311 mmol) was added to the reaction mixture. The reaction mixture was stirred at room temperature for 12 hours. The reaction mixture was quenched with sodium bisulfate (100 mg) and then extracted with ethyl acetate (10 mL). The organic layer was dried over sodium sulfate, filtered, and concentrated. Purification by flash column chromatography using 40% ethyl acetate/hexanes provided the title compound as a yellow gum (0.047 g, 70%).

The following compounds were prepared in like manner to the procedure outlined in Example 32:

(Z)-4-(3-(3,4-Dichloro-5-formylphenyl)-1,4,4,4-tetrafluorobut-1-en-1-yl)-2-(trifluoromethyl)benzonitrile (C79)

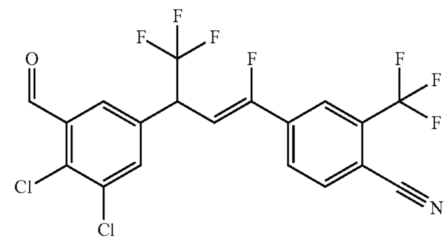 [SMILES: N#Cc1ccc(/C(F)=C/C(c2cc(Cl)c(Cl)c(C=O)c2)C(F)(F)F)cc1C(F)(F)F]

Isolated as a yellow gum (0.122 g, 71%): $^1$H NMR (400 MHz, $CDCl_3$) δ 10.48 (s, 1H), 7.98-7.94 (m, 1H), 7.93-7.83 (m, 2H), 7.75 (d, J=2.2 Hz, 1H), 7.44 (d, J=4.1 Hz, 1H), 6.01 (dd, J=32.3, 9.6 Hz, 1H), 4.71 (p, J=8.8 Hz, 1H); $^{19}$F NMR (376 MHz, $CDCl_3$) δ −62.16, −69.31 (d, J=2.3 Hz), −112.21 (d, J=2.6 Hz); ESIMS m/z 468 ([M−H]$^-$).

Example 33: Preparation of (Z)—N'-(2-aminophenyl)-4-(1,4,4,4-tetrafluoro-3-(3,4,5-trichlorophenyl)but-1-en-1-yl)-2-(trifluoromethyl)benzohydrazide (F156)

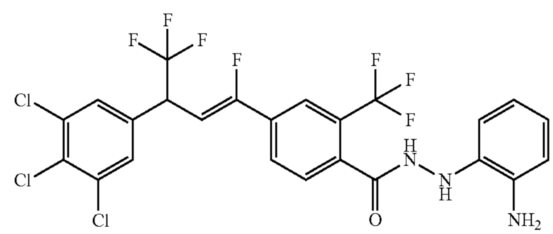 [SMILES: Nc1ccccc1NNC(=O)c1ccc(/C(F)=C/C(c2cc(Cl)c(Cl)c(Cl)c2)C(F)(F)F)cc1C(F)(F)F]

To a stirred solution of (Z)—N'-(2-nitrophenyl)-4-(1,4,4,4-tetrafluoro-3-(3,4,5-trichlorophenyl)but-1-en-1-yl)-2-(trifluoromethyl)benzohydrazide (F118) (0.0801 g, 0.127 mmol) in ethanol-water (1:1, 1.4 mL) was added iron (0.0284 g, 0.51 mmol) and ammonium chloride (0.024 g, 0.38 mmol). The reaction mixture was heated in a 90° C. bath for 2 hours. The reaction mixture was cooled to ambient temperature and diluted with 15 mL of water. The mixture was extracted with ethyl acetate. The organic layer was washed with brine, dried over sodium sulfate, filtered and concentrated under reduced pressure to afford crude compound. Purification of the crude compound by column chromatography (silica gel, eluting with 0-10% methanol in dichloromethane) afforded the title compound as a yellow gum (0.041 g, 49%).

The following compounds were prepared in like manner to the procedure outlined in Example 33:

(Z)—N'-(5-Aminopyrimidin-2-yl)-N'-methyl-4-(1,4,4,4-tetrafluoro-3-(3,4,5-trichlorophenyl)but-1-en-1-yl)-2-(trifluoromethyl)benzohydrazide (F166)

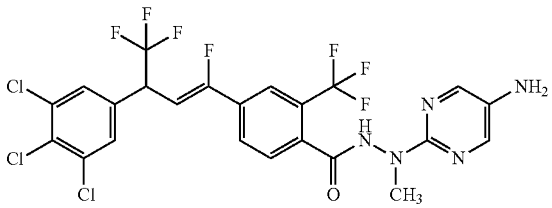 [SMILES: CN(NC(=O)c1ccc(/C(F)=C/C(c2cc(Cl)c(Cl)c(Cl)c2)C(F)(F)F)cc1C(F)(F)F)c1ncc(N)cn1]

Isolated as a yellow gum (0.026 g, 31%).

Example 34: Preparation of (E)-N'-(pyrimidin-2-yl)-4-(1,4,4,4-tetrafluoro-3-(3,4,5-trichlorophenyl)but-1-en-1-yl)-2-(trifluoromethyl)benzohydrazide (F74)

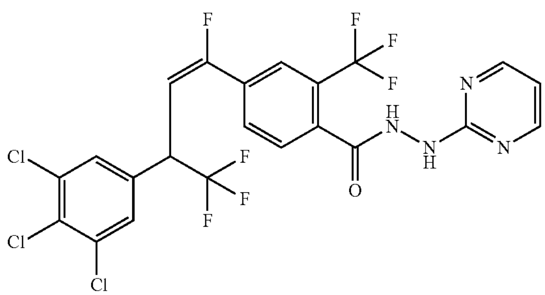 [SMILES: O=C(NNc1ncccn1)c1ccc(/C(F)=C\C(c2cc(Cl)c(Cl)c(Cl)c2)C(F)(F)F)cc1C(F)(F)F]

A silicon borate vial was charged with (Z)—N'-(pyrimidin-2-yl)-4-(1,4,4,4-tetrafluoro-3-(3,4,5-trichlorophenyl)but-1-en-1-yl)-2-(trifluoromethyl)benzohydrazide (F97) (0.400 g, 0.681 mmol) and dimethyl sulfoxide (10 mL). The mixture was placed within 0.6 to 1 meter (m) of a bank of eight 115 watt Sylvania FR48T12/350BL/VHO/180 Fluorescent Tube Black Lights and four 115 watt Sylvania (daylight) F48T12/D/VHO Straight T12 Fluorescent Tube Lights for 19 days. The mixture was concentrated in vacuo. Purification by column chromatography (silica gel, gradient of 0 to 50% ethyl acetate in hexanes) afforded the title compound as a white solid (0.059 g, 15%).

Example 35: Separation of (S,Z)—N'-methyl-N'-(pyrimidin-2-yl)-4-(1,4,4,4-tetrafluoro-3-(3,4,5-trichlorophenyl)but-1-en-1-yl)-2-(trifluoromethyl)benzohydrazide (F17) and (R,Z)—N'-methyl N'-(pyrimidin-2-yl)-4-(1,4,4,4-tetrafluoro-3-(3,4,5-trichlorophenyl)but-1-en-1-yl)-2-(trifluoromethyl)benzohydrazide (F29)

The title molecules were prepared as a mixture as described in Example 18. The enantiomers were separated by chiral supercritical fluid chromatography using Chiralpak AD-H (4.6 mm×250 mm), 5 μm column eluting with 50% carbon dioxide ($CO_2$, 100 bar) and 50% methanol with a flow rate 4 g/min at 30.0° C. Enantiomer F17 (peak-1) was collected at a retention time of 1.70 min. Enantiomer F29 (peak-2) was collected at 3.87 min.

F17 was isolated as an off-white solid $[\alpha]^{25}_{589}$=+70.4 (c, 0.25% in MeOH).

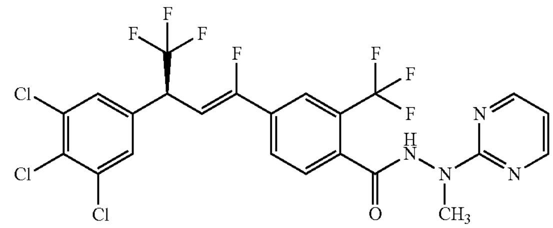 [SMILES: CN(NC(=O)c1ccc(/C(F)=C/[C@@H](c2cc(Cl)c(Cl)c(Cl)c2)C(F)(F)F)cc1C(F)(F)F)c1ncccn1]

F29 was isolated as an off-white solid $[\alpha]^{25}_{589}$=−76.0 (c, 0.25% in MeOH).

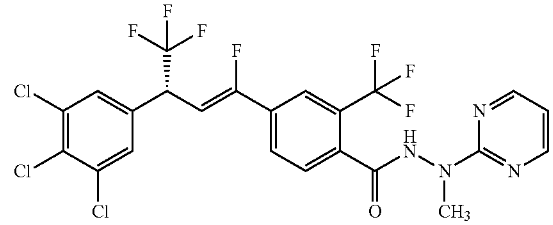

Example 36: Separation of (S,Z)—N'-pyrimidin-2-yl)-4-(1,4,4,4-tetrafluoro-3-(3,4,5-trichlorophenyl)but-1-en-1-yl)-2-(trifluoromethyl)benzohydrazide (F94) and (R,Z)—N'-(pyrimidin-2-yl)-4-(1,4,4,4-tetrafluoro-3-(3,4,5-trichlorophenyl)but-1-en-1-yl)-2-(trifluoromethyl)benzohydrazide (F120)

The title molecules were prepared as as a mixture as described in Example 16. The enantiomers were separated by chiral high performance liquid chromatography (HPLC) using Chiralpak AD-H (4.6×250 mm), 5 μm column using 0.1% trifluoroacetic acid in hexane and methanol as the mobile phase (isocratic 70:30) with a flow rate 1.0 milliliter per minute (mL/min) at ambient temperature. Enantiomer F94 (peak-1) was collected at a retention time of 12.96 minutes and possessed an optical rotation of $[\alpha]^{25}_{589}$=−70.4 (c, 0.25% in $CDCl_3$). Enantiomer F120 (peak-2) was collected at 19.23 minutes and possessed an optical rotation of $[\alpha]^{25}_{589}$=+69.6 (c, 0.25% in $CDCl_3$).

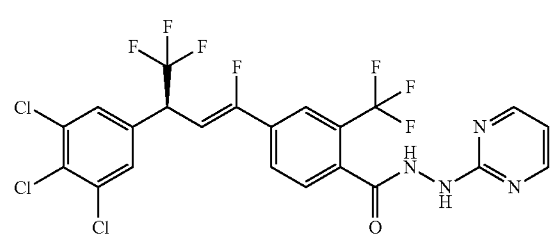 [SMILES: O=C(NNc1ncccn1)c1ccc(/C(F)=C/[C@@H](c2cc(Cl)c(Cl)c(Cl)c2)C(F)(F)F)cc1C(F)(F)F]

F94 was isolated as an off-white solid.

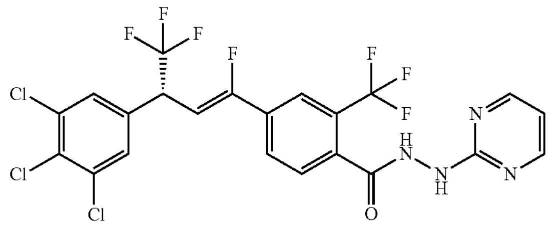

F120 was isolated as an off-white solid.

F94 and F120 stereochemical assignment. F94 and F120 were dissolved in $CDCl_3$ and placed in a 100 μm path length cell with $BaF_2$ windows. IR and vibrational circular dichroism (VCD) spectra were recorded on an IR-2XTM VCD spectrometer (BioTools, Inc.) equipped with dual PEM accessory, with 4 $cm^{-1}$ resolution. The sample and $CDCl_3$ spectra were acquired for 9 hours on an instrument optimized at 1400 $cm^{-1}$. The solvent-subtracted IR and VCD spectra were collected.

Theoretical Calculations: F97 with R- and S-configurations were built with Maestro (Schrodinger, LLC. New York, N.Y.). The conformational search was carried out with MacroModel (Schrodinger, LLC. New York, N.Y.) with MMFF94x force field to generate low-energy conformers. The top conformers were then selected for high-level Density Functional Theory (DFT) calculations based on a predefined energy threshold. Energy, geometry, IR and VCD calculations were performed for the selected conformers with level (B3LYP/lacvp) in Jaguar (Schrodinger, LLC. New York, N.Y.). Analysis: For F97 with R- and S-configurations, the top 200 low-energy conformers were generated with MacroModel and only the conformers with their energy less than 5 kcal/mol above the global minimum were selected for DFT calculations. These calculations resulted in 9 conformers, for each enantiomer that have energies within 2 kcal/mol higher than the lowest energy conformer for R- and S-configurations. The frequency calculations were performed on these conformers to determine the IR and VCD spectra. The Boltzmann-weighted IR and VCD spectra of these conformers were compared with the observed IR and VCD spectra. Based on the overall agreement in VCD pattern between the observed and calculated spectra, the absolute configuration of F94 was assigned as the S-configuration and F120 as the R-configuration. The assignment was evaluated by CompareVOA program (BioTools). The confidence level of the assignments are 99% based on a database that includes 80 previous correct assignments for different chiral structures.

Example 37: Preparation of 2-(1-hydrazinyl)pyridine Hydrofluoride (C80)

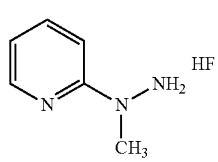

A 2 mL microwave vial was charged with N-ethyl-N-isopropylpropan-2-amine (0.899 mL, 5.15 mmol), methylhydrazine (0.237 g, 5.15 mmol), 2-fluoropyridine (0.500 g, 5.15 mmol) and 1,4-dioxane (1 mL) to give a pale yellow solution. After flushing the vial with nitrogen, the vial was capped and placed in the microwave for 8 hours at 100° C. The colorless reaction solution was decanted away from the title compound, which was isolated as a yellow oil (0.410 g, 58%): $^{1}H$ NMR (300 MHz, DMSO-$d_6$) δ 8.01 (ddd, J=4.9, 2.0, 0.9 Hz, 1H), 7.45 (ddd, J=8.8, 7.0, 2.0 Hz, 1H), 7.13 (dt, J=8.6, 1.0 Hz, 1H), 6.51 (ddd, J=7.0, 4.9, 1.0 Hz, 1H), 4.52 (s, 2H), 3.17 (s, 3H); $^{13}C$ NMR (101 MHz, DMSO-$d_6$) δ 162.20, 147.39, 137.14, 112.12, 107.83, 40.73; EIMS m/z 123 ([M]$^+$).

Example 38: Preparation of tert-butyl 2-ethyl-2-(pyrimidin-2-yl)hydrazine-1-carboxylate (C81)

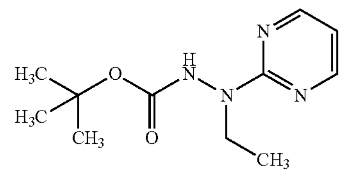 [SMILES: CCN(NC(=O)OC(C)(C)C)c1ncccn1]

To a solution of tert-butyl N-(ethylamino)carbamate (1.00 g, 6.24 mmol) and 2-chloropyrimidine (0.79 g, 6.87 mmol) in N,N-dimethylformamide (10 mL) was added cesium carbonate (3.05 g, 9.36 mmol). The mixture was heated at 75° C. for 12 hours, then cooled to room temperature, poured onto ice water and extracted with ethyl acetate. The organic layer was dried over sodium sulfate, filtered, and concentrated under reduced pressure. Purification of the residue by column chromatography on silica (100-200 mesh) eluting with 10% ethyl acetate in petroleum ether afforded the title compound as a yellow solid (0.80 g, 37%): $^{1}H$ NMR (300 MHz, DMSO-$d_6$) δ 10.25 (br s, 1H), 8.40 (d, J=4.8 Hz, 2H), 6.74 (t, J=4.8 Hz, 1H), 3.75-3.68 (m, 2H), 1.38 (s, 9H), 1.13-1.07 (m, 3H); ESIMS m/z 239 ([M+H]$^+$).

The following compounds were prepared in like manner to the procedure outlined in Example 38:

tert-Butyl 2-methyl-2-(pyrimidin-2-yl)hydrazine-1-carboxylate (C82)

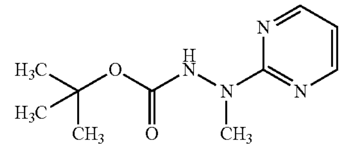

Isolated as a yellow gum (1.0 g, 31%): $^{1}H$ NMR (300 MHz, DMSO-$d_6$) 9.15 (s, 1H), 8.42 (d, J=4.4 Hz, 2H), 6.76 (t, J=4.4 Hz, 1H), 3.25 (s, 3H), 1.43 (s, 9H); IR (thin film) 1723, 1601, 764 $cm^{-1}$; ESIMS m/z 225 ([M+H]$^+$).

Example 39: Preparation of 2-(1-ethylhydrazinyl)pyrimidine Hydrochloride (C83)

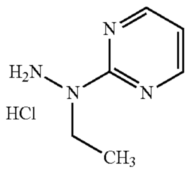

To a solution of tert-butyl 2-ethyl-2-(pyrimidin-2-yl)hydrazine-1-carboxylate (C81) (0.60 g, 2.52 mmol) in diethyl ether (10 mL) at room temperature was added 4 M hydrogen chloride in 1,4-dioxane (10 mL) and the reaction mixture was stirred at room temperature for 2 hours. The mixture was concentrated under reduced pressure and the residue triturated with diethyl ether to afford the title compound as an off-white solid (0.20 g, 46%): $^{1}$H NMR (300 MHz, DMSO-$d_6$) δ 8.35 (d, J=4.2 Hz, 2H), 6.58 (t, J=4.8 Hz, 1H), 4.67 (br s, 2H), 3.73-3.65 (m, 2H), 1.22-1.09 (m, 3H).

The following compounds were prepared in like manner to the procedure outlined in Example 39:

2-(1-Methylhydrazinyl)pyrimidine Hydrochloride (C84)

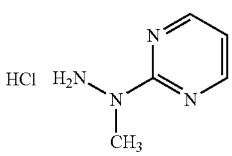

Isolated as a yellow solid (0.60 g, 84%): $^{1}$H NMR (300 MHz, DMSO-$d_6$) δ 10.20 (br s, 3H), 8.65 (d, J=4.5 Hz, 2H), 7.09 (t, J=4.2 Hz, 1H), 3.42 (s, 3H).

Example 40: Preparation of 2-(1-allylhydrazinyl)pyrimidine (C85)

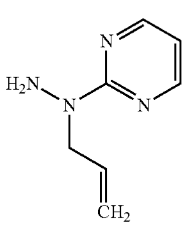

To a solution of 2-chloropyrimidine (0.60 g, 8.73 mmol) and allyl hydrazine hydrochoride (1.42 g, 13.1 mmol) in N,N-dimethylformamide (10 mL) was added cesium carbonate (4.27 g, 13.1 mmol). The mixture was heated at 75° C. for 12 hours, then cooled to room temperature, poured onto ice water and extracted with ethyl acetate. The organic layer was dried over sodium sulfate, filtered, and concentrated under reduced pressure. Purification of the residue by column chromatography on silica afforded the title compound as a yellow oil (0.50 g, 38%): $^{1}$H NMR (400 MHz, DMSO-$d_6$) δ 8.37 (d, J=5.2 Hz, 2H), 6.62 (t, J=5.2 Hz, 1H), 5.91-5.82 (m, 1H), 5.14-5.07 (m, 2H), 4.72 (br s, 2H), 4.03 (d, J=5.2 Hz, 2H); IR (thin film) 3316, 1586, 982 $cm^{-1}$; ESIMS m/z 150 ($[M]^+$).

Example 41: Preparation of tert-butyl 2-(prop-2-yn-1-yl)-2-(pyrimidin-2-yl)hydrazine-1-carboxylate (C86)

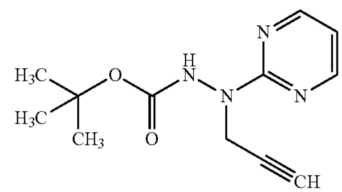 [SMILES: C#CCN(NC(=O)OC(C)(C)C)c1ncccn1]

To a solution of tert-butyl 2-(pyrimidin-2-yl)hydrazine-1-carboxylate (C98) (3.50 g, 16.65 mmol) in a mixture of tetrahydrofuran (27 mL) and N,N-dimethylformamide (3 mL) at room temperature was added potassium carbonate (6.90 g, 49.94 mmol). After stirring for 30 min at room temperature the reaction mixture was heated to 100° C. and 3-bromoprop-1-yne (5.94 g, 49.94 mmol) was added dropwise. After stirring for 3 hours at 100° C., the mixture was cooled to room temperature, poured into water and extracted with ethyl acetate. The organic layer was dried over sodium sulfate, filtered, and concentrated under reduced pressure. Purification of the residue by column chromatography on silica (100-200 mesh) eluting with 30% ethyl acetate in petroleum ether afforded the title compound as an off-white solid (1.80 g, 44%): $^{1}$H NMR (300 MHz, DMSO-$d_6$) δ 9.31 (s, 1H), 8.47 (d, J=4.8 Hz, 2H), 6.84 (t, J=4.8 Hz, 1H), 4.50 (s, 2H), 3.14 (s, 1H), 1.42 (s, 9H); IR (thin film) 3436, 2925, 1735, 1587 $cm^{-1}$.

The following compounds were prepared in like manner to the procedure outlined in Example 41:

2-(1-Methyl-2-(prop-2-yn-1-yl)hydrazinyl)pyrimidine (C87)

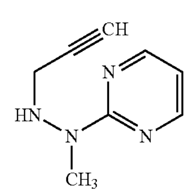

Isolated as a yellow liquid (0.450 g, 23%): $^{1}$H NMR (300 MHz, DMSO-$d_6$) δ 8.40 (d, J=4.8 Hz, 2H), 6.67 (t, J=4.8 Hz, 1H), 5.68 (t, J=5.4 Hz, 1H), 3.64-3.62 (m, 2H), 3.25 (s, 3H), 3.09 (t, J=2.4 Hz, 1H); IR (thin film) 3259, 2119, 1203, 908 $cm^{-1}$; 163 ($[M+H]^+$).

Example 42: Preparation of 2-(1-(prop-2-yn-1-yl) hydrazinyl)pyrimidine Hydrochloride (C88)

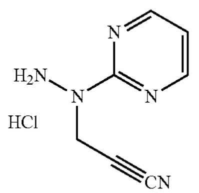

To a solution of tert-butyl N-[prop-2-ynyl(pyrimidin-2-yl)amino]carbamate (1.80 g, 7.25 mmol) in 1,4-dioxane (10 mL) cooled in an ice bath was added 4 M hydrogen chloride in 1,4-dioxane (10 mL). The reaction mixture was allowed to warm to room temperature and was stirred for 2 hours. The mixture was concentrated under reduced pressure and the residue was triturated with pentane to afford the title compound as a pale yellow solid (1.00 g, 75%): 1H NMR (300 MHz, DMSO-$d_6$) δ 11.00 (br s, 3H), 8.71 (d, J=4.8 Hz, 2H), 7.17 (t, J=5.1 Hz, 1H), 1.79 (s, 2H), 3.34 (s, 1H); IR (thin film) 3259, 2119, 1203, 908 $cm^{-1}$.

Example 43: Preparation of 2-(pyrimidin-2-ylamino)isoindoline-1,3-dione (C89)

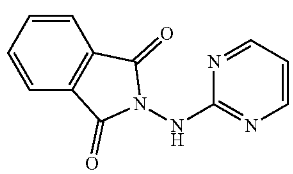 [SMILES: O=C1c2ccccc2C(=O)N1Nc1ncccn1]

A round bottom flask equipped with a Dean-Stark trap was charged with isobenzofuran-1,3-dione (9.68 g, 65.4 mmol), 2-hydrazinylpyrimidine (6.00 g, 54.5 mmol) and toluene (60 mL). The mixture was heated to reflux for 12 hours, then concentrated under reduced pressure. Trituration with n-pentane afforded the title compound as an off-white solid (5.0, 38%): $^1$H NMR (300 MHz, DMSO-$d_6$) δ 9.94 (s, 1H), 8.41-8.40 (m, 2H), 8.07-7.92 (m, 4H), 6.91 (t, J=4.8 Hz, 1H); IR (thin film) 3255, 1793, 1727, 707 $cm^{-1}$; ESIMS m/z 241 ($[M+H]^+$).

Example 44: Preparation of 2-((methoxymethyl) (pyrimidin-2-yl)amino)isoindoline-1,3-dione (C90)

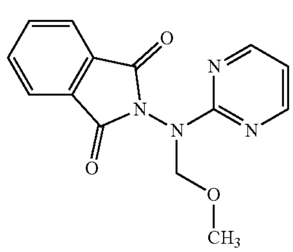 [SMILES: COCN(c1ncccn1)N1C(=O)c2ccccc2C1=O]

To a solution of 2-(pyrimidin-2-ylamino)isoindoline-1,3-dione (C89) (0.250 g, 1.40 mmol) in tetrahydrofuran (5 mL) cooled in an ice bath was added sodium hydride (0.038 g, 1.56 mmol). After stirring for 30 minutes with cooling from an ice bath, chloro(methoxy)methane (0.126 g, 1.56 mmol) was added. After stirring at room temperature for 2 hours, the mixture was partitioned between water and ethyl acetate. The organic layer was dried over sodium sulfate, filtered, and concentrated under reduced pressure. Purification of the residue by column chromatography on silica afforded the title compound as an off-white (0.100 g, 34%): $^1$H NMR (300 MHz, DMSO-$d_6$) δ 8.51-8.50 (m, 2H), 8.02-7.95 (m, 4H), 7.02 (t, J=4.8 Hz, 1H), 8.35 (s, 2H), 8.42 (s, 3H); IR (thin film) 2948, 1735, 1377, 712 $cm^{-1}$; ESIMS m/z 285 ($[M+H]^+$).

Example 45: Preparation of 2-(1-(methoxymethyl)hydrazinyl)pyrimidine (C91)

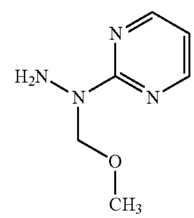

To a solution of 2-((methoxymethyl)(pyrimidin-2-yl) amino)isoindoline-1,3-dione (0.650 g, 2.29 mmol) in ethanol (5 mL) was added hydrazine monohydrate (0.458 g, 9.15 mmol). After stirring for 12 hours at room temperature, the mixture was filtered and the filtrate was concentrated under reduced pressure. Purification of the residue by column chromatography on silica afforded the title compound as an oil (0.240 g, 68%): 1H NMR (300 MHz, DMSO-$d_6$) δ 8.45 (d, J=4.8 Hz, 2H), 6.76 (t, J=4.7 Hz, 1H), 5.08 (s, 2H), 4.77 (s, 2H), 3.26 (s, 3H).

Example 46: Preparation of tert-butyl 1-methyl-2-(2-oxo-2-((2,2,2-trifluoroethyl)amino)ethyl)hydrazine-1-carboxylate (C92)

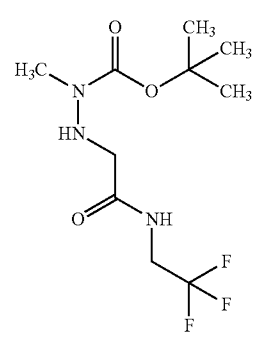 [SMILES: CN(NCC(=O)NCC(F)(F)F)C(=O)OC(C)(C)C]

To a solution of ((tert-butoxycarbonyl)(methyl)amino) glycine (1.50 g, 7.34 mmol) and 2,2,2-trifluoroethylamine (0.80 g, 0.81 mmol) in N,N-dimethylformamide (20 mL) were added 1-[bis(dimethylamino)-methylene]-1H-1,2,3-triazolo[4,5-b]pyridinium 3-oxid hexafluorophosphate (3.35 g, 8.81 mmol) and N-ethyl-N-isopropylpropan-2-amine (3.77 mL, 22.0 mmol). After stirring at room temperature for 12 hours, the reaction mixture was partitioned between ice water and ethyl acetate. The organic phase was dried over sodium sulfate, filtered, concentrated under reduced pressure. The title compound was isolated as a yellow gum (1.2 g, 56%): $^{1}$H NMR (300 MHz, DMSO-$d_6$) δ 8.70 (br s, 1H), 5.35 (t, J=4.2 Hz, 1H), 3.99-3.87 (m, 2H), 3.40 (d, J=3.9 Hz, 2H), 2.92 (s, 3H), 1.40 (s, 9H); IR (thin film) 3301, 2980, 1694, 1160, 750 cm$^{-1}$; ESIMS m/z 286 ([M+H]$^{+}$).

Example 47: Preparation of 2-(1-methylhydrazinyl)pyrimidine Hydrochloride (C84)

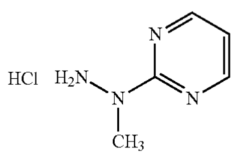

To a stirred solution of 2-chloropyrimidine (0.500 g, 4.37 mmol) in ethanol (8.7 mL) was added methylhydrazine (0.402 g, 8.73 mmol). The reaction mixture was stirred in a 65° C. bath for 15 hours. The reaction mixture was cooled to ambient temperature and the volatile component was removed to afford the title compound as a yellow gum (0.052 g, 50%): $^{1}$H NMR (400 MHz, $CDCl_3$) δ 8.34 (d, J=4.8 Hz, 2H), 6.76 (br s, 3H), 6.51 (t, J=4.8 Hz, 1H), 3.38 (s, 3H); 13C NMR (101 MHz, $CDCl_3$) δ 157.70, 109.67, 104.91, 38.73; ESIMS m/z 540 ([M−H]$^{-}$).

The following compounds were prepared in like manner to the procedure outlined in Example 47:

2-(1-Methylhydrazinyl)-5-nitropyrimidine (C93)

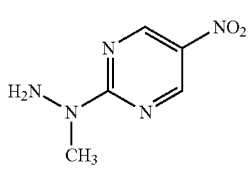

Isolated as a yellow gum (0.117 g, 82%): $^{1}$H NMR (400 MHz, $CDCl_3$) δ 9.08 (s, 2H), 4.81 (s, 2H), 3.51 (s, 3H); ESIMS m/z 169 ([M−H]$^{-}$).

2-(1-Isopropylhydrazinyl)pyrimidine (C94)

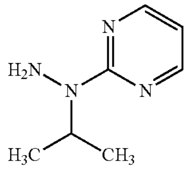

Isolated as a yellow gum (1.1 g, 79%): $^{1}$H NMR (400 MHz, $CDCl_3$) δ 8.33 (d, J=4.7 Hz, 2H), 6.48 (t, J=4.7 Hz, 1H), 4.95 (p, J=6.6 Hz, 1H), 3.91 (s, 2H), 1.22 (d, J=6.6 Hz, 6H); EIMS m/z 152 ([M]$^{+}$).

2-(2-Isopropylhydrazinyl)pyrimidine (C95)

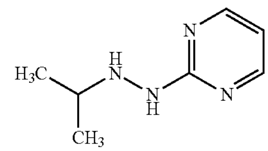

Isolated as a yellow gum (0.4 g, 29%): $^{1}$H NMR (400 MHz, $CDCl_3$) δ 8.32 (d, J=4.8 Hz, 2H), 6.94 (s, 1H), 6.58 (t, J=4.8 Hz, 1H), 4.41 (s, 1H), 3.22 (p, J=6.3 Hz, 1H), 1.10 (d, J=6.3 Hz, 6H); $^{13}$C NMR (101 MHz, $CDCl_3$) δ 163.40, 158.16, 111.49, 50.23, 20.68; ESIMS m/z 152 ([M]$^{+}$).

5-Ethyl-2-(1-methylhydrazinyl)pyrimidine (C96)

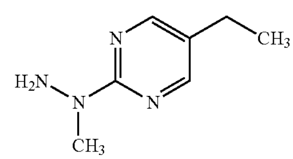

Isolated as a yellow wax (0.224 g, 70%): $^{1}$H NMR (500 MHz, Methanol-$d_4$) δ 8.20 (s, 2H), 4.91 (s, 2H), 3.29 (s, 3H), 2.46 (q, J=7.6 Hz, 2H), 1.17 (t, J=7.6 Hz, 3H); $^{13}$C NMR (126 MHz, Methanol-$d_4$) δ 162.21, 156.92, 124.61, 37.95, 22.12, 14.68; EIMS m/z 152 ([M]$^{+}$).

5-Methoxy-2-(1-methylhydrazinyl)pyrimidine (C97)

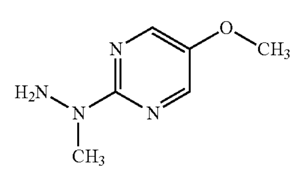

Isolated as a yellow wax (0.094 g, 29%): $^{1}$H NMR (500 MHz, Methanol-$d_4$) δ 8.14 (s, 2H), 4.87 (s, 2H), 3.81 (s, 3H), 3.26 (s, 3H); $^{13}$C NMR (126 MHz, Methanol-$d_4$) δ 159.54, 146.68, 144.58, 55.95, 38.46; EIMS m/z 154 ([M]$^{+}$).

Example 48: Preparation of tert-butyl 2-(pyrimidin-2-yl)hydrazine-1-carboxylate (C98)

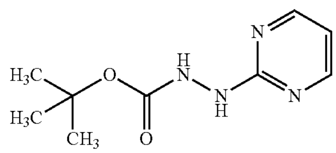

To a solution of 2-hydrazinylpyrimidine (2.50 g, 22.7 mmol) in dichloromethane (30 mL) was added triethylamine (3.45 g, 34.1 mmol) and di-tert-butyl dicarbonate (7.43 g, 34.1 mmol). After stirring for 12 hours at room temperature, the reaction mixture was partitioned between ice water and dichloromethane. The organic layer was dried over sodium sulfate, filtered, and concentrated under reduced pressure. The residue was triturated with n-pentane. The title compound was isolated as a yellow solid (3.50 g, 77%): $^{1}$H NMR (300 MHz, DMSO-$d_6$) δ 8.75 (s, 1H), 8.72 (s, 1H), 8.35 (d, J=4.5 Hz, 2H), 6.73 (t, J=4.8 Hz, 1H), 1.40 (s, 9H); IR (thin film) 3241, 2978, 1734, 1179 cm$^{-1}$; ESIMS m/z 211 ([M+H]$^+$).

Example 49: Preparation of 4-vinyl-1-naphthoic Acid (C101)

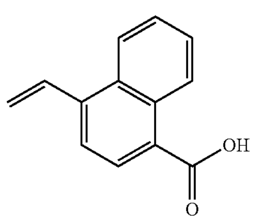

To a stirred solution of 4-bromo-1-naphthoic acid (2.50 g, 9.98 mmol) in dimethyl sulfoxide (32.3 mL) was added potassium vinyltrifluoroborate (1.33 g, 9.96 mmol), potassium carbonate (3.85 g, 27.9 mmol) and [1,1'-bis(diphenylphosphino)ferrocene]-dichloropalladium(II) (0.364 g, 0.498 mmol). The reaction mixture was heated in an 80° C. bath for 18 hours. The reaction mixture was cooled to ambient temperature and diluted with 1 N aqueous hydrochloric acid solution (150 mL) and water (150 mL). The mixture was extracted with ethyl acetate. The organic layer was washed with brine, dried over sodium sulfate and concentrated under reduced pressure to afford crude compound. The crude compound was purified by column chromatography ($SiO_2$, eluting with 0-100% ethyl acetate gradient in hexanes) to afford the title compound as a bright yellow solid (1.36 g, 62%): mp 147-155° C.; 1H NMR (300 MHz, acetone-$d_6$) δ 11.42 (s, 1H), 9.16-9.03 (m, 1H), 8.31-8.25 (m, 2H), 7.77 (dd, J=7.7, 0.7 Hz, 1H), 7.70-7.57 (m, 3H), 5.95 (dd, J=17.2, 1.5 Hz, 1H), 5.62 (dd, J=11.1, 1.5 Hz, 1H); ESIMS m/z 197 ([M−H]$^-$).

Example 50: Preparation of 4-(1-fluorovinyl)-2-(trifluoromethyl)benzonitrile (C102)

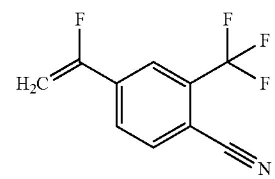

To a stirred solution of 4-bromo-2-(trifluoromethyl)benzonitrile (250 mg, 1.00 mmol), (1-fluorovinyl)(methyl)diphenylsilane (356 μL, 1.50 mmol), and tetrakis(triphenylphosphine)palladium(0) (57.8 mg, 0.050 mmol) in 1,3-dimethyl-2-imidazolidinone (5 mL) were added copper(I) iodide (9.52 mg, 0.050 mmol) and cesium fluoride (456 mg, 3.00 mmol). The reaction mixture was stirred at room temperature for 24 hours. The reaction mixture was diluted with water (35 mL) and extracted with hexane (3×20 mL). The combined organic extracts were washed with brine, dried over sodium sulfate and concentrated under reduced pressure. Purification of the crude compound by column chromatography (silica gel, eluting with 0-10% ethyl acetate in hexanes) afforded the title compound as a yellow oil (0.108 g, 48%): $^{1}$H NMR (400 MHz, $CDCl_3$) δ 7.94 (dd, J=1.6, 0.8 Hz, 1H), 7.89-7.86 (m, 1H), 7.83 (dd, J=8.2, 1.7 Hz, 1H), 5.32 (dd, J=48.0, 4.2 Hz, 1H), 5.18 (dd, J=17.1, 4.3 Hz, 1H); $^{19}$F NMR (376 MHz, $CDCl_3$) δ −62.17, −109.13; ESIMS m/z 215 ([M]$^-$).

The following molecules in Table P may be prepared according to the procedures disclosed in

TABLE P

Structure and preparation method for prophetic molecules

| No. | Structure | Prep* |
|---|---|---|
| P1 | 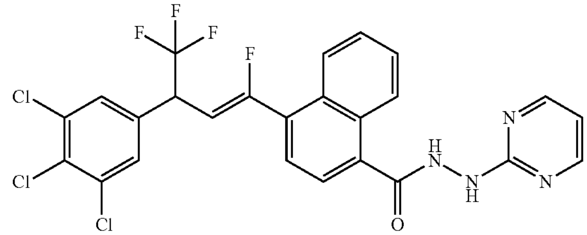 [SMILES: O=C(NNc1ncccn1)c1ccc(/C(F)=C/C(c2cc(Cl)c(Cl)c(Cl)c2)C(F)(F)F)c2ccccc12] | 15, 16 |

Prep* Means Prepare According to Example

It is recognized that some reagents and reaction conditions may not be compatible with certain functionalities that may be present in certain molecules of Formula One or certain molecules used in the preparation of certain molecules of Formula One. In such cases, it may be necessary to employ standard protection and deprotection protocols comprehensively reported in the literature and well known to a person skilled in the art. In addition, in some cases it may be necessary to perform further routine synthetic steps not described herein to complete the synthesis of desired molecules. A person skilled in the art will also recognize that it may be possible to achieve the synthesis of desired molecules by performing some of the steps of the synthetic routes in a different order to that described. A person skilled in the art will also recognize that it may be possible to perform standard functional group interconversions or substitution reactions on desired molecules to introduce or modify substituents.

Biological Assays

The following bioassays against Beet Armyworm (*Spodoptera exigua*), Cabbage Looper (*Trichoplusia ni*), Green Peach Aphid (*Myzus persicae*), and Yellow Fever Mosquito (*Aedes aegypti*), are included herein due to the damage they inflict. Furthermore, the Beet Armyworm and Cabbage Looper are two good indicator species for a broad range of chewing pests. Additionally, the Green Peach Aphid is a good indicator species for a broad range of sap-feeding pests. The results with these indicator species along with the Yellow Fever Mosquito show the broad usefulness of the molecules of Formula One in controlling pests in Phyla Arthropoda, Mollusca, and Nematoda (Drewes et al.)

Example A: Bioassays on Beet Armyworm (*Spodoptera exigua*, LAPHEG) ("BAW") and Cabbage Looper (*Trichoplusia ni*, TRIPNI) ("CL")

Beet armyworm is a serious pest of economic concern for alfalfa, asparagus, beets, citrus, corn, cotton, onions, peas, peppers, potatoes, soybeans, sugar beets, sunflowers, tobacco, and tomatoes, among other crops. It is native to Southeast Asia but is now found in Africa, Australia, Japan, North America, and Southern Europe. The larvae may feed in large swarms causing devastating crop losses. It is known to be resistant to several pesticides.

Cabbage looper is a serious pest found throughout the world. It attacks alfalfa, beans, beets, broccoli, Brussel sprouts, cabbage, cantaloupe, cauliflower, celery, collards, cotton, cucumbers, eggplant, kale, lettuce, melons, mustard, parsley, peas, peppers, potatoes, soybeans, spinach, squash, tomatoes, turnips, and watermelons, among other crops. This species is very destructive to plants due to its voracious appetite. The larvae consume three times their weight in food daily. The feeding sites are marked by large accumulations of sticky, wet, fecal material, which may contribute to higher disease pressure thereby causing secondary problems on the plants in the site. It is known to be resistant to several pesticides.

Consequently, because of the above factors control of these pests is important. Furthermore, molecules that control these pests (BAW and CL), which are known as chewing pests, will be useful in controlling other pests that chew on plants.

Certain molecules disclosed in this document were tested against BAW and CL using procedures described in the following examples. In the reporting of the results, the "BAW & CL Rating Table" was used (See Table Section).

Bioassays on BAW

Bioassays on BAW were conducted using a 128-well diet tray assay. One to five second instar BAW larvae were placed in each well (3 mL) of the diet tray that had been previously filled with 1 mL of artificial diet to which 50 $\mu g/cm^2$ of the test molecule (dissolved in 50 μL of 90:10 acetone-water mixture) had been applied (to each of eight wells) and then allowed to dry. Trays were covered with a clear self-adhesive cover, vented to allow gas exchange, and held at 25° C., 14:10 light-dark for five to seven days. Percent mortality was recorded for the larvae in each well; activity in the eight wells was then averaged. The results are indicated in the table entitled "Table ABC: Biological Results" (See Table Section).

Bioassays on CL

Bioassays on CL were conducted using a 128-well diet tray assay. One to five second instar CL larvae were placed in each well (3 mL) of the diet tray that had been previously filled with 1 mL of artificial diet to which 50 $\mu g/cm^2$ of the test molecule (dissolved in 50 μL of 90:10 acetone-water mixture) had been applied (to each of eight wells) and then allowed to dry. Trays were covered with a clear self-adhesive cover, vented to allow gas exchange, and held at 25° C., 14:10 light-dark for five to seven days. Percent mortality was recorded for the larvae in each well; activity in the eight wells was then averaged. The results are indicated in the table entitled "Table ABC: Biological Results" (See Table Section).

Example B: Bioassays on Green Peach Aphid (*Myzus persicae*, MYZUPE) ("GPA")

GPA is the most significant aphid pest of peach trees, causing decreased growth, shriveling of the leaves, and the death of various tissues. It is also hazardous because it acts as a vector for the transport of plant viruses, such as potato virus Y and potato leafroll virus to members of the nightshade/potato family Solanaceae, and various mosaic viruses to many other food crops. GPA attacks such plants as broccoli, burdock, cabbage, carrot, cauliflower, daikon, eggplant, green beans, lettuce, macadamia, papaya, peppers, sweet potatoes, tomatoes, watercress, and zucchini, among other crops. GPA also attacks many ornamental crops such as carnation, chrysanthemum, flowering white cabbage, poinsettia, and roses. GPA has developed resistance to many pesticides. Currently, it is a pest that has the third largest number of reported cases of insect resistance (Sparks et al.). Consequently, because of the above factors control of this pest is important. Furthermore, molecules that control this pest (GPA), which is known as a sap-feeding pest, are useful in controlling other pests that feed on the sap from plants.

Certain molecules disclosed in this document were tested against GPA using procedures described in the following example. In the reporting of the results, the "GPA & YFM Rating Table" was used (See Table Section).

Cabbage seedlings grown in 3-inch pots, with 2-3 small (3-5 cm) true leaves, were used as test substrate. The seedlings were infested with 20-50 GPA (wingless adult and nymph stages) one day prior to chemical application. Four pots with individual seedlings were used for each treatment. Test molecules (2 mg) were dissolved in 2 mL of acetone/methanol (1:1) solvent, forming stock solutions of 1000 ppm test molecule. The stock solutions were diluted 5× with 0.025% Tween 20 in water to obtain the solution at 200 ppm test molecule. A hand-held aspirator-type sprayer was used for spraying a solution to both sides of cabbage leaves until runoff. Reference plants (solvent check) were sprayed with the diluent only containing 20% by volume of acetone/methanol (1:1) solvent. Treated plants were held in a holding room for three days at approximately 25° C. and ambient relative humidity (RH) prior to grading. Evaluation was conducted by counting the number of live aphids per plant under a microscope. Percent control was measured using Abbott's correction formula (W. S. Abbott, "A Method of Computing the Effectiveness of an Insecticide" J. Econ. Entomol. 18 (1925), pp. 265-267) as follows. Corrected % Control=100*(X−Y)/X where X=No. of live aphids on solvent check plants and Y=No. of live aphids on treated plants. The results are indicated in the table entitled "Table ABC: Biological Results" (See Table Section).

Example C: Bioassays on Yellow Fever Mosquito (*Aedes aegypti*, AEDSAE) ("YFM")

YFM prefers to feed on humans during the daytime and is most frequently found in or near human habitations. YFM is a vector for transmitting several diseases. It is a mosquito that can spread the dengue fever and yellow fever viruses. Yellow fever is the second most dangerous mosquito-borne disease after malaria. Yellow fever is an acute viral hemorrhagic disease and up to 50% of severely affected persons without treatment will die from yellow fever. There are an estimated 200,000 cases of yellow fever, causing 30,000 deaths worldwide each year. Dengue fever is a nasty, viral disease; it is sometimes called "breakbone fever" or "breakheart fever" because of the intense pain it can produce. Dengue fever kills about 20,000 people annually. Consequently, because of the above factors control of this pest is important. Furthermore, molecules that control this pest (YFM), which is known as a sucking pest, are useful in controlling other pests that cause human and animal suffering.

Certain molecules disclosed in this document were tested against YFM using procedures described in the following paragraph. In the reporting of the results, the "GPA & YFM Rating Table" was used (See Table Section).

Master plates containing 400 μg of a molecule dissolved in 100 μL of dimethyl sulfoxide (DMSO) (equivalent to a 4000 ppm solution) are used. A master plate of assembled molecules contains 15 μL per well. To this plate, 135 μL of a 90:10 water/acetone mixture is added to each well. A robot (Biomek® NXP Laboratory Automation Workstation) is programmed to dispense 15 μL aspirations from the master plate into an empty 96-well shallow plate ("daughter" plate). There are 6 reps ("daughter" plates) created per master. The created "daughter" plates are then immediately infested with YFM larvae.

The day before plates are to be treated, mosquito eggs are placed in Millipore water containing liver powder to begin hatching (4 g. into 400 mL). After the "daughter" plates are created using the robot, they are infested with 220 μL of the liver powder/larval mosquito mixture (about 1 day-old larvae). After plates are infested with mosquito larvae, a non-evaporative lid is used to cover the plate to reduce drying. Plates are held at room temperature for 3 days prior to grading. After 3 days, each well is observed and scored based on mortality. The results are indicated in the table entitled "Table ABC: Biological Results" (See Table Section).

Agriculturally Acceptable Acid Addition Salts, Salt Derivatives, Solvates, Ester Derivatives, Polymorphs, Isotopes, and Radionuclides Molecules of Formula One may be formulated into agriculturally acceptable acid addition salts. By way of a non-limiting example, an amine function can form salts with hydrochloric, hydrobromic, sulfuric, phosphoric, acetic, benzoic, citric, malonic, salicylic, malic, fumaric, oxalic, succinic, tartaric, lactic, gluconic, ascorbic, maleic, aspartic, benzenesulfonic, methanesulfonic, ethanesulfonic, hydroxyl-methanesulfonic, and hydroxyethanesulfonic acids. Additionally, by way of a non-limiting example, an acid function can form salts including those derived from alkali or alkaline earth metals and those derived from ammonia and amines. Examples of preferred cations include sodium, potassium, and magnesium.

Molecules of Formula One may be formulated into salt derivatives. By way of a non-limiting example, a salt derivative may be prepared by contacting a free base with a sufficient amount of the desired acid to produce a salt. A free base may be regenerated by treating the salt with a suitable dilute aqueous base solution such as dilute aqueous sodium hydroxide, potassium carbonate, ammonia, and sodium bicarbonate. As an example, in many cases, a pesticide, such as 2,4-D, is made more water-soluble by converting it to its dimethylamine salt.

Molecules of Formula One may be formulated into stable complexes with a solvent, such that the complex remains intact after the non-complexed solvent is removed. These complexes are often referred to as "solvates." However, it is particularly desirable to form stable hydrates with water as the solvent.

Molecules of Formula One containing an acid functionality may be made into ester derivatives. These ester derivatives can then be applied in the same manner as the molecules disclosed in this document are applied.

Molecules of Formula One may be made as various crystal polymorphs. Polymorphism is important in the development of agrochemicals since different crystal polymorphs or structures of the same molecule can have vastly different physical properties and biological performances.

Molecules of Formula One may be made with different isotopes. Of particular importance are molecules having $^{2}H$ (also known as deuterium) or $^{3}H$ (also known as tritium) in place of $^{1}H$. Molecules of Formula One may be made with different radionuclides. Of particular importance are molecules having $^{14}C$ (also known as radiocarbon). Molecules of Formula One having deuterium, tritium, or $^{14}C$ may be used in biological studies allowing tracing in chemical and physiological processes and half-life studies, as well as, MoA studies.

Combinations

In another embodiment of this invention, molecules of Formula One may be used in combination (such as, in a compositional mixture, or a simultaneous or sequential application) with one or more active ingredients.

In another embodiment of this invention, molecules of Formula One may be used in combination (such as, in a compositional mixture, or a simultaneous or sequential application) with one or more active ingredients each having a MoA that is the same as, similar to, but more likely—different from, the MoA of the molecules of Formula One.

In another embodiment, molecules of Formula One may be used in combination (such as, in a compositional mixture, or a simultaneous or sequential application) with one or more molecules having acaricidal, algicidal, avicidal, bactericidal, fungicidal, herbicidal, insecticidal, molluscicidal, nematicidal, rodenticidal, and/or virucidal properties.

In another embodiment, the molecules of Formula One may be used in combination (such as, in a compositional mixture, or a simultaneous or sequential application) with one or more molecules that are antifeedants, bird repellents, chemosterilants, herbicide safeners, insect attractants, insect repellents, mammal repellents, mating disrupters, plant activators, plant growth regulators, and/or synergists.

In another embodiment, molecules of Formula One may also be used in combination (such as in a compositional mixture, or a simultaneous or sequential application) with one or more biopesticides.

In another embodiment, in a pesticidal composition combinations of a molecule of Formula One and an active ingredient may be used in a wide variety of weight ratios. For example, in a two-component mixture, the weight ratio of a molecule of Formula One to an active ingredient, the weight ratios in Table B may be used. However, in general, weight ratios less than about 10:1 to about 1:10 are preferred. It is also preferred sometimes to use a three, four, five, six, seven, or more, component mixture comprising a molecule of Formula One and an additional two or more active ingredients.

Weight ratios of a molecule of Formula One to an active ingredient may also be depicted as X:Y; wherein X is the parts by weight of a molecule of Formula One and Y is the parts by weight of active ingredient. The numerical range of the parts by weight for X is $0<X\leq 100$ and the parts by weight for Y is $0<Y\leq 100$ and is shown graphically in TABLE C. By way of non-limiting example, the weight ratio of a molecule of Formula One to an active ingredient may be 20:1.

Ranges of weight ratios of a molecule of Formula One to an active ingredient may be depicted as $X_1:Y_1$ to $X_2:Y_2$, wherein X and Y are defined as above.

In one embodiment, the range of weight ratios may be $X_1:Y_1$ to $X_2:Y_2$, wherein $X_1>Y_1$ and $X_2<Y_2$. By way of non-limiting example, the range of a weight ratio of a molecule of Formula One to an active ingredient may be between 3:1 and 1:3, inclusive of the endpoints.

In another embodiment, the range of weight ratios may be $X_1:Y_1$ to $X_2:Y_2$, wherein $X_1>Y_1$ and $X_2>Y_2$. By way of non-limiting example, the range of weight ratio of a molecule of Formula One to an active ingredient may be between 15:1 and 3:1, inclusive of the endpoints.

In another embodiment, the range of weight ratios may be $X_1:Y_1$ to $X_2:Y_2$, wherein $X_1<Y_1$ and $X_2<Y_2$. By way of non-limiting example, the range of weight ratios of a molecule of Formula One to an active ingredient may be between about 1:3 and about 1:20, inclusive of the endpoints.

Formulations

A pesticide is many times not suitable for application in its pure form. It is usually necessary to add other substances, for example a carrier, so that the pesticide may be used at the required concentration and in an appropriate form, permitting ease of application, handling, transportation, storage, and maximum pesticide activity. Thus, pesticides are formulated into, for example, baits, concentrated emulsions, dusts, emulsifiable concentrates, fumigants, gels, granules, microencapsulations, seed treatments, suspension concentrates, suspoemulsions, tablets, water soluble liquids, water dispersible granules or dry flowables, wettable powders, and ultra-low volume solutions.

Pesticides are applied most often as aqueous suspensions or emulsions prepared from concentrated formulations of such pesticides. Such water-soluble, water-suspendable, or emulsifiable formulations are either solids, usually known as wettable powders, water dispersible granules, liquids usually known as emulsifiable concentrates, or aqueous suspensions. Wettable powders, which may be compacted to form water dispersible granules, comprise an intimate mixture of the pesticide, a carrier, and surfactants. The concentration of the pesticide is usually from about 10% to about 90% by weight. The carrier is usually selected from among the attapulgite clays, the montmorillonite clays, the diatomaceous earths, or the purified silicates. Effective surfactants, comprising from about 0.5% to about 10% of the wettable powder, are found among sulfonated lignins, condensed naphthalenesulfonates, naphthalenesulfonates, alkylbenzenesulfonates, alkyl sulfates, and non-ionic surfactants such as ethylene oxide adducts of alkyl phenols.

Emulsifiable concentrates of pesticides comprise a convenient concentration of a pesticide, such as from about 50 to about 500 grams per liter of liquid dissolved in a carrier that is either a water miscible solvent or a mixture of water-immiscible organic solvent and emulsifiers. Useful organic solvents include aromatics, especially xylenes and petroleum fractions, especially the high-boiling naphthalenic and olefinic portions of petroleum such as heavy aromatic naphtha. Other organic solvents may also be used, such as the terpenic solvents including rosin derivatives, aliphatic ketones such as cyclohexanone, and complex alcohols such as 2-ethoxyethanol. Suitable emulsifiers for emulsifiable concentrates are selected from conventional anionic and non-ionic surfactants.

Aqueous suspensions comprise suspensions of water-insoluble pesticides dispersed in an aqueous carrier at a concentration in the range from about 5% to about 50% by weight. Suspensions are prepared by finely grinding the pesticide and vigorously mixing it into a carrier comprised of water and surfactants. Ingredients, such as inorganic salts and synthetic or natural gums may, also be added to increase the density and viscosity of the aqueous carrier. It is often most effective to grind and mix the pesticide at the same time by preparing the aqueous mixture and homogenizing it in an implement such as a sand mill, ball mill, or piston-type homogenizer. The pesticide in suspension might be microencapsulated in plastic polymer.

Oil dispersions (OD) comprise suspensions of organic solvent-insoluble pesticides finely dispersed in a mixture of organic solvent and emulsifiers at a concentration in the range from about 2% to about 50% by weight. One or more pesticide might be dissolved in the organic solvent. Useful organic solvents include aromatics, especially xylenes and petroleum fractions, especially the high-boiling naphthalenic and olefinic portions of petroleum such as heavy aromatic naphtha. Other solvents may include vegetable oils, seed oils, and esters of vegetable and seed oils. Suitable emulsifiers for oil dispersions are selected from conventional anionic and non-ionic surfactants. Thickeners or gelling agents are added in the formulation of oil dispersions to modify the rheology or flow properties of the liquid and to prevent separation and settling of the dispersed particles or droplets.

Pesticides may also be applied as granular compositions that are particularly useful for applications to the soil. Granular compositions usually contain from about 0.5% to about 10% by weight of the pesticide, dispersed in a carrier that comprises clay or a similar substance. Such compositions are usually prepared by dissolving the pesticide in a suitable solvent and applying it to a granular carrier, which has been pre-formed to the appropriate particle size, in the range of from about 0.5 mm to about 3 mm. Such compositions may also be formulated by making a dough or paste of the carrier and molecule, and then crushing and drying to obtain the desired granular particle size. Another form of granules is a water emulsifiable granule (EG). It is a formulation consisting of granules to be applied as a conventional oil-in-water emulsion of the active ingredient(s), either solubilized or diluted in an organic solvent, after disintegration and dissolution in water. Water emulsifiable granules comprise one or several active ingredient(s), either solubilized or diluted in a suitable organic solvent that is (are) absorbed in a water soluble polymeric shell or some other type of soluble or insoluble matrix.

Dusts containing a pesticide are prepared by intimately mixing the pesticide in powdered form with a suitable dusty agricultural carrier, such as kaolin clay, ground volcanic rock, and the like. Dusts can suitably contain from about 1% to about 10% of the pesticide. Dusts may be applied as a seed dressing or as a foliage application with a dust blower machine.

It is equally practical to apply a pesticide in the form of a solution in an appropriate organic solvent, usually petroleum oil, such as the spray oils, which are widely used in agricultural chemistry.

Pesticides can also be applied in the form of an aerosol composition. In such compositions, the pesticide is dissolved or dispersed in a carrier, which is a pressure-generating propellant mixture. The aerosol composition is packaged in a container from which the mixture is dispensed through an atomizing valve.

Pesticide baits are formed when the pesticide is mixed with food or an attractant or both. When the pests eat the bait, they also consume the pesticide. Baits may take the form of granules, gels, flowable powders, liquids, or solids. Baits may be used in pest harborages.

Fumigants are pesticides that have a relatively high vapor pressure and hence can exist as a gas in sufficient concentrations to kill pests in soil or enclosed spaces. The toxicity of the fumigant is proportional to its concentration and the exposure time. They are characterized by a good capacity for diffusion and act by penetrating the pest's respiratory system or being absorbed through the pest's cuticle. Fumigants are applied to control stored product pests under gas proof sheets, in gas sealed rooms or buildings, or in special chambers.

Pesticides may be microencapsulated by suspending the pesticide particles or droplets in plastic polymers of various types. By altering, the chemistry of the polymer or by changing factors in the processing, microcapsules may be formed of various sizes, solubility, wall thicknesses, and degrees of penetrability. These factors govern the speed with which the active ingredient within is released, which in turn, affects the residual performance, speed of action, and odor of the product. The microcapsules might be formulated as suspension concentrates or water dispersible granules.

Oil solution concentrates are made by dissolving pesticide in a solvent that will hold the pesticide in solution. Oil solutions of a pesticide usually provide faster knockdown and kill of pests than other formulations due to the solvents themselves having pesticidal action and the dissolution of the waxy covering of the integument increasing the speed of uptake of the pesticide. Other advantages of oil solutions include better storage stability, better penetration of crevices, and better adhesion to greasy surfaces.

Another embodiment is an oil-in-water emulsion, wherein the emulsion comprises oily globules which are each provided with a lamellar liquid crystal coating and are dispersed in an aqueous phase, wherein each oily globule comprises at least one molecule which is agriculturally active, and is individually coated with a monolamellar or oligolamellar layer comprising: (1) at least one non-ionic lipophilic surface-active agent, (2) at least one non-ionic hydrophilic surface-active agent, and (3) at least one ionic surface-active agent, wherein the globules having a mean particle diameter of less than 800 nanometers.

Other Formulation Components

Generally, when the molecules disclosed in Formula One are used in a formulation, such formulation can also contain other components. These components include, but are not limited to, (this is a non-exhaustive and non-mutually exclusive list) wetters, spreaders, stickers, penetrants, buffers, sequestering agents, drift reduction agents, compatibility agents, anti-foam agents, cleaning agents, and emulsifiers. A few components are described forthwith.

A wetting agent is a substance that when added to a liquid increases the spreading or penetration power of the liquid by reducing the interfacial tension between the liquid and the surface on which it is spreading. Wetting agents are used for two main functions in agrochemical formulations: during processing and manufacture to increase the rate of wetting of powders in water to make concentrates for soluble liquids or suspension concentrates; and during mixing of a product with water in a spray tank to reduce the wetting time of wettable powders and to improve the penetration of water into water-dispersible granules. Examples of wetting agents used in wettable powder, suspension concentrate, and water-dispersible granule formulations are: sodium lauryl sulfate; sodium dioctyl sulfosuccinate; alkyl phenol ethoxylates; and aliphatic alcohol ethoxylates.

A dispersing agent is a substance that adsorbs onto the surface of particles, helps to preserve the state of dispersion of the particles, and prevents them from reaggregating. Dispersing agents are added to agrochemical formulations to facilitate dispersion and suspension during manufacture, and to ensure the particles redisperse into water in a spray tank. They are widely used in wettable powders, suspension concentrates, and water-dispersible granules. Surfactants that are used as dispersing agents have the ability to adsorb strongly onto a particle surface and provide a charged or steric barrier to reaggregation of particles. The most commonly used surfactants are anionic, non-ionic, or mixtures of the two types. For wettable powder formulations, the most common dispersing agents are sodium lignosulfonates. For suspension concentrates, very good adsorption and stabilization are obtained using polyelectrolytes, such as sodium-naphthalene-sulfonate-formaldehyde-condensates. Tristyrylphenol ethoxylate phosphate esters are also used. Non-ionics such as alkylarylethylene oxide condensates and EO-PO block copolymers are sometimes combined with anionics as dispersing agents for suspension concentrates. In recent years, new types of very high molecular weight polymeric surfactants have been developed as dispersing agents. These have very long hydrophobic 'backbones' and a large number of ethylene oxide chains forming the 'teeth' of a 'comb' surfactant. These high molecular weight polymers can give very good long-term stability to suspension concentrates because the hydrophobic backbones have many anchoring points onto the particle surfaces. Examples of dispersing agents used in agrochemical formulations are: sodium lignosulfonates; sodium naphthalene sulfonate formaldehyde condensates; tristyrylphenol-ethoxylate-phosphate-esters; aliphatic alcohol ethoxylates; alkyl ethoxylates; EO-PO block copolymers; and graft copolymers.

An emulsifying agent is a substance that stabilizes a suspension of droplets of one liquid phase in another liquid phase. Without the emulsifying agent, the two liquids would separate into two immiscible liquid phases. The most commonly used emulsifier blends contain an alkylphenol or an aliphatic alcohol with twelve or more ethylene oxide units and the oil-soluble calcium salt of dodecylbenzenesulfonic acid. A range of hydrophile-lipophile balance ("HLB") values from about 8 to about 18 will normally provide good stable emulsions. Emulsion stability can sometimes be improved by the addition of a small amount of an EO-PO block copolymer surfactant.

A solubilizing agent is a surfactant that will form micelles in water at concentrations above the critical micelle concentration. The micelles are then able to dissolve or solubilize water-insoluble materials inside the hydrophobic part of the micelle. The types of surfactants usually used for solubilization are non-ionics, sorbitan monooleates, sorbitan monooleate ethoxylates, and methyl oleate esters.

Surfactants are sometimes used, either alone or with other additives such as mineral or vegetable oils as adjuvants to spray-tank mixes to improve the biological performance of the pesticide on the target. The types of surfactants used for bioenhancement depend generally on the nature and mode of action of the pesticide. However, they are often non-ionics such as: alkyl ethoxylates; linear aliphatic alcohol ethoxylates; and aliphatic amine ethoxylates.

A carrier or diluent in an agricultural formulation is a material added to the pesticide to give a product of the required strength. Carriers are usually materials with high absorptive capacities, while diluents are usually materials with low absorptive capacities. Carriers and diluents are used in the formulation of dusts, wettable powders, granules, and water-dispersible granules.

Organic solvents are used mainly in the formulation of emulsifiable concentrates, oil-in-water emulsions, suspoemulsions, oil dispersions, and ultra-low volume formulations, and to a lesser extent, granular formulations. Sometimes mixtures of solvents are used. The first main groups of solvents are aliphatic paraffinic oils such as kerosene or refined paraffins. The second main group (and the most common) comprises the aromatic solvents such as xylene and higher molecular weight fractions of C9 and C10 aromatic solvents. Chlorinated hydrocarbons are useful as cosolvents to prevent crystallization of pesticides when the formulation is emulsified into water. Alcohols are sometimes used as cosolvents to increase solvent power. Other solvents may include vegetable oils, seed oils, and esters of vegetable and seed oils.

Thickeners or gelling agents are used mainly in the formulation of suspension concentrates, oil dispersions, emulsions and suspoemulsions to modify the rheology or flow properties of the liquid and to prevent separation and settling of the dispersed particles or droplets. Thickening, gelling, and anti-settling agents generally fall into two categories, namely water-insoluble particulates and water-soluble polymers. It is possible to produce suspension concentrate and oil dispersion formulations using clays and silicas. Examples of these types of materials, include, but are not limited to, montmorillonite, bentonite, magnesium aluminum silicate, and attapulgite. Water-soluble polysaccharides in water based suspension concentrates have been used as thickening-gelling agents for many years. The types of polysaccharides most commonly used are natural extracts of seeds and seaweeds or are synthetic derivatives of cellulose. Examples of these types of materials include, but are not limited to, guar gum; locust bean gum; carrageenam; alginates; methyl cellulose; sodium carboxymethyl cellulose (SCMC); and hydroxyethyl cellulose (HEC). Other types of anti-settling agents are based on modified starches, polyacrylates, polyvinyl alcohol, and polyethylene oxide. Another good anti-settling agent is xanthan gum.

Microorganisms can cause spoilage of formulated products. Therefore, preservation agents are used to eliminate or reduce their effect. Examples of such agents include, but are not limited to: propionic acid and its sodium salt; sorbic acid and its sodium or potassium salts; benzoic acid and its sodium salt; p-hydroxybenzoic acid sodium salt; methyl p-hydroxybenzoate; and 1,2-benzisothiazolin-3-one (BIT).

The presence of surfactants often causes water-based formulations to foam during mixing operations in production and in application through a spray tank. In order to reduce the tendency to foam, anti-foam agents are often added either during the production stage or before filling into bottles. Generally, there are two types of anti-foam agents, namely silicones and non-silicones. Silicones are usually aqueous emulsions of dimethyl polysiloxane, while the non-silicone anti-foam agents are water-insoluble oils, such as octanol and nonanol, or silica. In both cases, the function of the anti-foam agent is to displace the surfactant from the air-water interface.

"Green" agents (e.g., adjuvants, surfactants, solvents) can reduce the overall environmental footprint of crop protection formulations. Green agents are biodegradable and generally derived from natural and/or sustainable sources, e.g. plant and animal sources. Specific examples are: vegetable oils, seed oils, and esters thereof, also alkoxylated alkyl polyglucosides.

Applications

Molecules of Formula One may be applied to any locus. Particular loci to apply such molecules include loci where alfalfa, almonds, apples, barley, beans, canola, corn, cotton, crucifers, flowers, fodder species (Rye Grass, Sudan Grass, Tall Fescue, Kentucky Blue Grass, and Clover), fruits, lettuce, oats, oil seed crops, oranges, peanuts, pears, peppers, potatoes, rice, sorghum, soybeans, strawberries, sugarcane, sugarbeets, sunflowers, tobacco, tomatoes, wheat (for example, Hard Red Winter Wheat, Soft Red Winter Wheat, White Winter Wheat, Hard Red Spring Wheat, and Durum Spring Wheat), and other valuable crops are growing or the seeds thereof are going to be planted.

Molecules of Formula One may also be applied where plants, such as crops, are growing and where there are low levels (even no actual presence) of pests that can commercially damage such plants. Applying such molecules in such locus is to benefit the plants being grown in such locus. Such benefits, may include, but are not limited to: helping the plant grow a better root system; helping the plant better withstand stressful growing conditions; improving the health of a plant; improving the yield of a plant (e.g. increased biomass and/or increased content of valuable ingredients); improving the vigor of a plant (e.g. improved plant growth and/or greener leaves); improving the quality of a plant (e.g. improved content or composition of certain ingredients); and improving the tolerance to abiotic and/or biotic stress of the plant.

Molecules of Formula One may be applied with ammonium sulfate when growing various plants as this may provide additional benefits.

Molecules of Formula One may be applied on, in, or around plants genetically modified to express specialized traits, such as *Bacillus thuringiensis* (for example, Cry1Ab, Cry1Ac, Cry1Fa, Cry1A.105, Cry2Ab, Vip3A, mCry3A, Cry3Ab, Cry3Bb, Cry34Ab1/Cry35Ab1), other insecticidal toxins, or those expressing herbicide tolerance, or those with "stacked" foreign genes expressing insecticidal toxins, herbicide tolerance, nutrition-enhancement, or any other beneficial traits.

Molecules of Formula One may be applied to the foliar and/or fruiting portions of plants to control pests. Either such molecules will come in direct contact with the pest, or the pest will consume such molecules when eating the plant or while extracting sap or other nutrients from the plant.

Molecules of Formula One may also be applied to the soil, and when applied in this manner, root and stem feeding pests may be controlled. The roots may absorb such molecules thereby taking it up into the foliar portions of the plant to control above ground chewing and sap feeding pests.

Systemic movement of pesticides in plants may be utilized to control pests on one portion of the plant by applying (for example by spraying a locus) a molecule of Formula One to a different portion of the plant. For example, control of foliar-feeding insects may be achieved by drip irrigation or furrow application, by treating the soil with for example pre- or post-planting soil drench, or by treating the seeds of a plant before planting.

Molecules of Formula One may be used with baits. Generally, with baits, the baits are placed in the ground where, for example, termites can come into contact with, and/or be attracted to, the bait. Baits can also be applied to a surface of a building, (horizontal, vertical, or slant surface) where, for example, ants, termites, cockroaches, and flies, can come into contact with, and/or be attracted to, the bait.

Molecules of Formula One may be encapsulated inside, or placed on the surface of a capsule. The size of the capsules can range from nanometer size (about 100-900 nanometers in diameter) to micrometer size (about 10-900 microns in diameter).

Molecules of Formula One may be applied to eggs of pests. Because of the unique ability of the eggs of some pests to resist certain pesticides, repeated applications of such molecules may be desirable to control newly emerged larvae.

Molecules of Formula One may be applied as seed treatments. Seed treatment may be applied to all types of seeds, including those from which plants genetically modified to express specialized traits will germinate. Representative examples include those expressing proteins toxic to invertebrate pests, such as *Bacillus thuringiensis* or other insecticidal toxins, those expressing herbicide tolerance, such as “Roundup Ready” seed, or those with “stacked” foreign genes expressing insecticidal toxins, herbicide tolerance, nutrition-enhancement, drought tolerance, or any other beneficial traits. Furthermore, such seed treatments with molecules of Formula One may further enhance the ability of a plant to withstand stressful growing conditions better. This results in a healthier, more vigorous plant, which can lead to higher yields at harvest time. Generally, about 1 gram of such molecules to about 500 grams per 100,000 seeds is expected to provide good benefits, amounts from about 10 grams to about 100 grams per 100,000 seeds is expected to provide better benefits, and amounts from about 25 grams to about 75 grams per 100,000 seeds is expected to provide even better benefits.

Molecules of Formula One may be applied with one or more active ingredients in a soil amendment.

Molecules of Formula One may be used for controlling endoparasites and ectoparasites in the veterinary medicine sector or in the field of non-human-animal keeping. Such molecules may be applied by oral administration in the form of, for example, tablets, capsules, drinks, granules, by dermal application in the form of, for example, dipping, spraying, pouring on, spotting on, and dusting, and by parenteral administration in the form of, for example, an injection.

Molecules of Formula One may also be employed advantageously in livestock keeping, for example, cattle, chickens, geese, goats, pigs, salmon, sheep, and turkeys. They may also be employed advantageously in pets such as, horses, dogs, and cats. Particular pests to control would be flies, fleas, and ticks that are bothersome to such animals. Suitable formulations are administered orally to the animals with the drinking water or feed. The dosages and formulations that are suitable depend on the species.

Molecules of Formula One may also be used for controlling parasitic worms, especially of the intestine, in the animals listed above.

Molecules of Formula One may also be employed in therapeutic methods for human health care. Such methods include, but are limited to, oral administration in the form of, for example, tablets, capsules, drinks, granules, and by dermal application.

Molecules of Formula One may also be applied to invasive pests. Pests around the world have been migrating to new environments (for such pest) and thereafter becoming a new invasive species in such new environment. Such molecules may also be used on such new invasive species to control them in such new environments.

Before a pesticide may be used or sold commercially, such pesticide undergoes lengthy evaluation processes by various governmental authorities (local, regional, state, national, and international). Voluminous data requirements are specified by regulatory authorities and must be addressed through data generation and submission by the product registrant or by a third party on the product registrant's behalf, often using a computer with a connection to the World Wide Web. These governmental authorities then review such data and if a determination of safety is concluded, provide the potential user or seller with product registration approval. Thereafter, in that locality where the product registration is granted and supported, such user or seller may use or sell such pesticide.

Molecules according to Formula One may be tested to determine its efficacy against pests. Additionally, a molecule of Formula One may be mixed with another active ingredient to form a pesticidal composition, and then that composition is tested to determine if it is synergistic using conventional testing procedures. Furthermore, mode of action studies may be conducted to determine if said molecule has a different mode of action than other pesticides. Thereafter, such acquired data may be disseminated, such as by the internet, to third parties.

The headings in this document are for convenience only and must not be used to interpret any portion hereof.

Table Section

TABLE B

| Weight Ratios<br>Molecule of the Formula One:active ingredient |
|---|
| 100:1 to 1:100 |
| 50:1 to 1:50 |
| 20:1 to 1:20 |
| 10:1 to 1:10 |
| 5:1 to 1:5 |
| 3:1 to 1:3 |
| 2:1 to 1:2 |
| 1:1 |

TABLE C
| active ingredient (Y) Parts by weight | | | | | | | | | | |
|---|---|---|---|---|---|---|---|---|---|---|
| | 100 | X, Y | | X, Y | | | X, Y | | | |
| | 50 | X, Y | X, Y | X, Y | | | X, Y | X, Y | | |
| | 20 | X, Y | | X, Y | X, Y | | X, Y | | X, Y | |
| | 15 | X, Y | X, Y | | | | | X, Y | X, Y | X, Y |
| | 10 | X, Y | | X, Y | | | | | | |
| | 5 | X, Y | X, Y | X, Y | | | | X, Y | | |
| | 3 | X, Y | X, Y | | X, Y | X, Y | | X, Y | X, Y | X, Y |
| | 2 | X, Y | | X, Y | X, Y | | X, Y | | X, Y | |
| | 1 | X, Y | X, Y | X, Y | X, Y | X, Y | X, Y | X, Y | X, Y | X, Y |
| | | 1 | 2 | 3 | 5 | 10 | 15 | 20 | 50 | 100 |
| | | molecule of Formula One (X) Parts by weight | | | | | | | | |
TABLE 2
| Structure and preparation method for F Series molecules | | |
|---|---|---|
| No. | Structure | Prep.* |
| F1 | 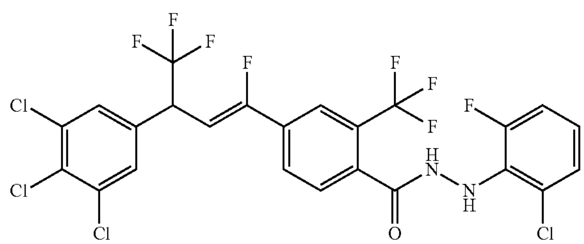 [SMILES: O=C(NNc1c(F)cccc1Cl)c1ccc(/C(F)=C/C(c2cc(Cl)c(Cl)c(Cl)c2)C(F)(F)F)cc1C(F)(F)F] | 18 |
| F2 | 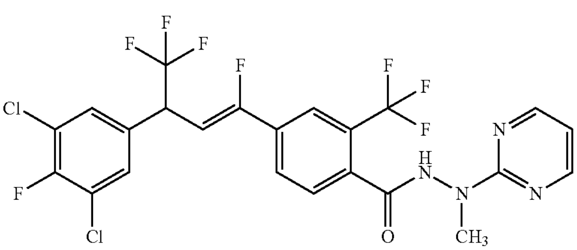 | 18 |
| F3 | 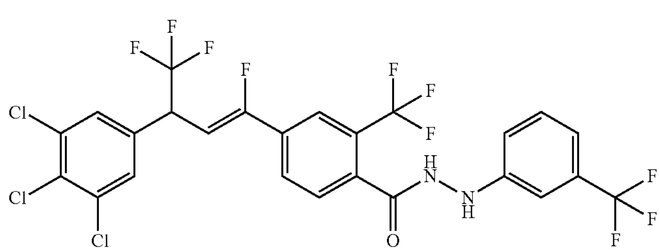 [SMILES: O=C(NNc1cccc(C(F)(F)F)c1)c1ccc(/C(F)=C/C(c2cc(Cl)c(Cl)c(Cl)c2)C(F)(F)F)cc1C(F)(F)F] | 18 |
| F4 | 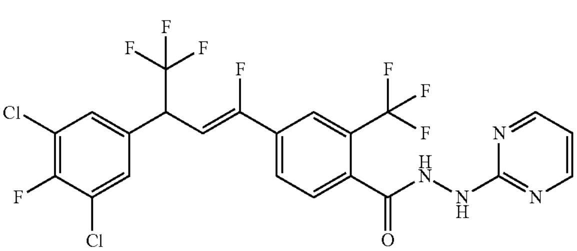 [SMILES: O=C(NNc1ncccn1)c1ccc(/C(F)=C/C(c2cc(Cl)c(F)c(Cl)c2)C(F)(F)F)cc1C(F)(F)F] | 18 |

TABLE 2-continued
Structure and preparation method for F Series molecules
| No. | Structure | Prep.* |
| --- | --- | --- |
| F5 | 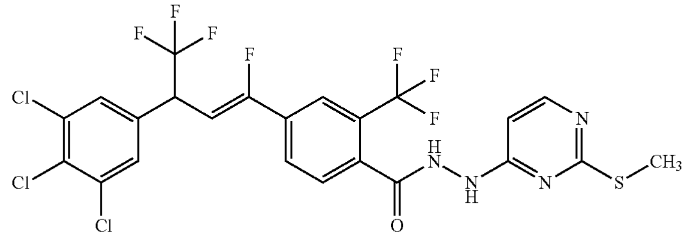 [SMILES: CSc1nccc(NNC(=O)c2ccc(/C(F)=C/C(c3cc(Cl)c(Cl)c(Cl)c3)C(F)(F)F)cc2C(F)(F)F)n1] | 16 |
| F6 | 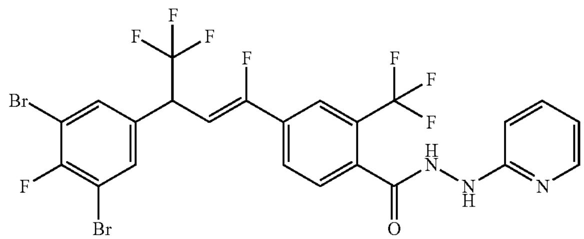 [SMILES: O=C(NNc1ccccn1)c1ccc(/C(F)=C/C(c2cc(Br)c(F)c(Br)c2)C(F)(F)F)cc1C(F)(F)F] | 15 |
| F7 | 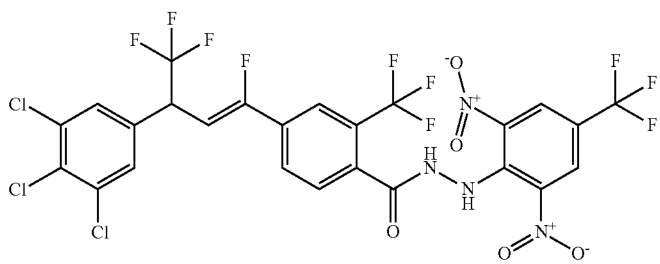 | 16 |
| F8 | 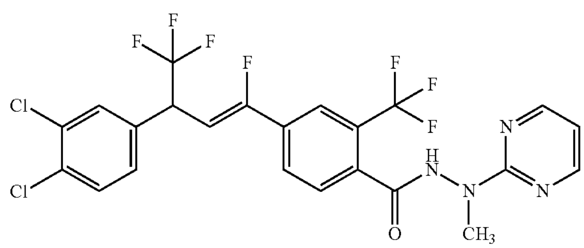 | 18 |
| F9 | 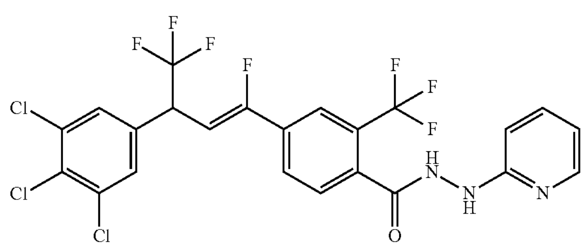 [SMILES: O=C(NNc1ccccn1)c1ccc(/C(F)=C/C(c2cc(Cl)c(Cl)c(Cl)c2)C(F)(F)F)cc1C(F)(F)F] | 17 |
| F10 | 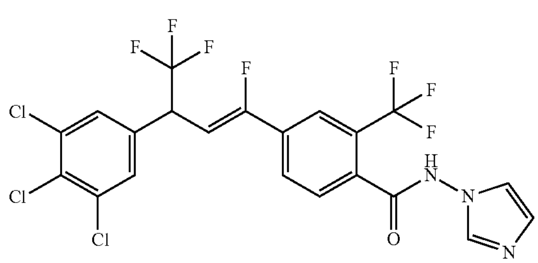 [SMILES: O=C(Nn1ccnc1)c1ccc(/C(F)=C/C(c2cc(Cl)c(Cl)c(Cl)c2)C(F)(F)F)cc1C(F)(F)F] | 15 |

TABLE 2-continued
| Structure and preparation method for F Series molecules | | |
|---|---|---|
| No. | Structure | Prep.* |
| F11 | 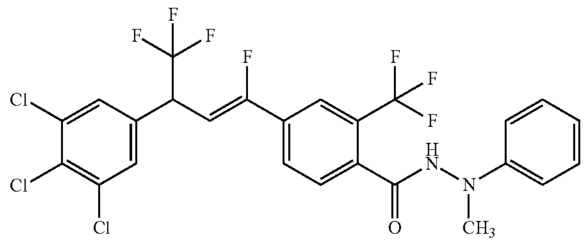 | 17 |
| F12 | 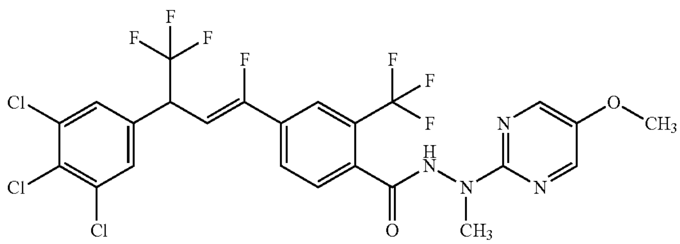 [SMILES: COc1cnc(N(C)NC(=O)c2ccc(/C(F)=C/C(c3cc(Cl)c(Cl)c(Cl)c3)C(F)(F)F)cc2C(F)(F)F)nc1] | 19 |
| F13 | 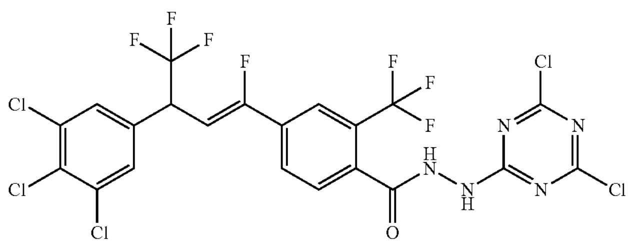 [SMILES: O=C(NNc1nc(Cl)nc(Cl)n1)c1ccc(/C(F)=C/C(c2cc(Cl)c(Cl)c(Cl)c2)C(F)(F)F)cc1C(F)(F)F] | 15 |
| F14 | 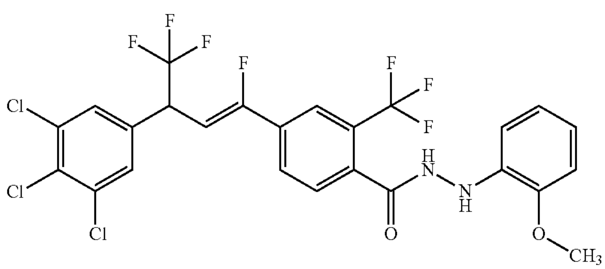 [SMILES: COc1ccccc1NNC(=O)c1ccc(/C(F)=C/C(c2cc(Cl)c(Cl)c(Cl)c2)C(F)(F)F)cc1C(F)(F)F] | 18 |
| F15 | 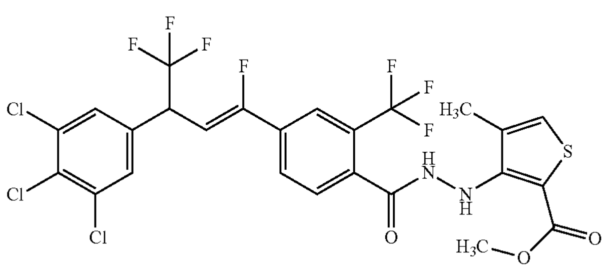 [SMILES: COC(=O)c1scc(C)c1NNC(=O)c1ccc(/C(F)=C/C(c2cc(Cl)c(Cl)c(Cl)c2)C(F)(F)F)cc1C(F)(F)F] | 19 |
| F16 | 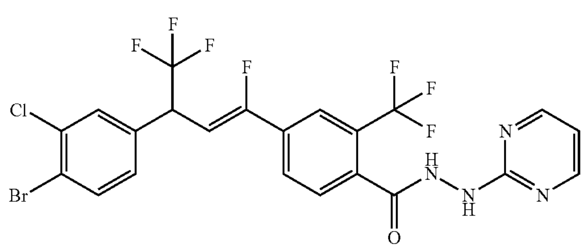 [SMILES: O=C(NNc1ncccn1)c1ccc(/C(F)=C/C(c2ccc(Br)c(Cl)c2)C(F)(F)F)cc1C(F)(F)F] | 18 |

TABLE 2-continued
Structure and preparation method for F Series molecules
| No. | Structure | Prep.* |
|---|---|---|
| F17 | 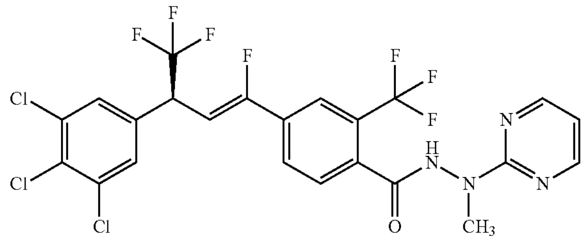 | 18, 35 |
| F18 | 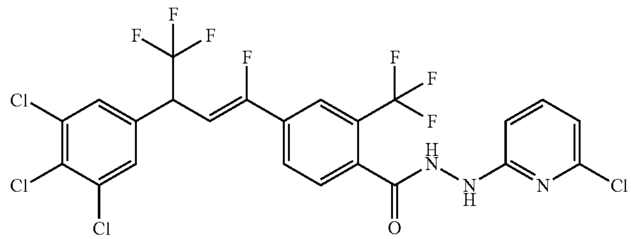 [SMILES: O=C(NNc1cccc(Cl)n1)c1ccc(/C(F)=C/C(c2cc(Cl)c(Cl)c(Cl)c2)C(F)(F)F)cc1C(F)(F)F] | 15 |
| F19 | 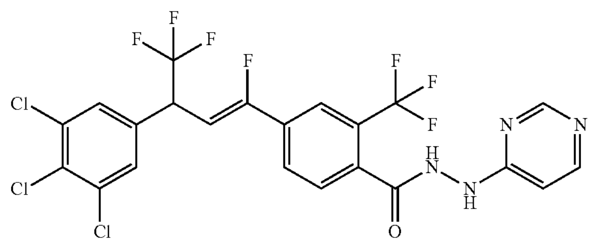 [SMILES: O=C(NNc1ccncn1)c1ccc(/C(F)=C/C(c2cc(Cl)c(Cl)c(Cl)c2)C(F)(F)F)cc1C(F)(F)F] | 16 |
| F20 | 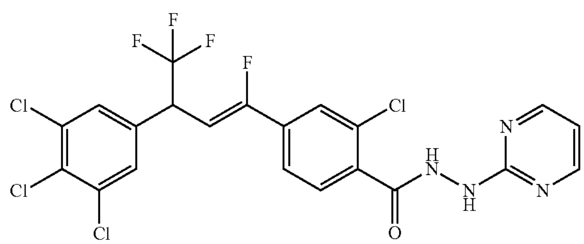 [SMILES: O=C(NNc1ncccn1)c1ccc(/C(F)=C/C(c2cc(Cl)c(Cl)c(Cl)c2)C(F)(F)F)cc1Cl] | 18 |
| F21 | 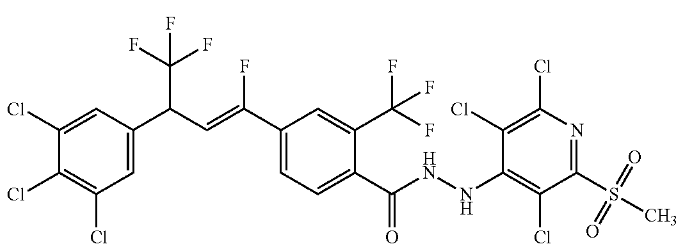 [SMILES: CS(=O)(=O)c1nc(Cl)c(Cl)c(NNC(=O)c2ccc(/C(F)=C/C(c3cc(Cl)c(Cl)c(Cl)c3)C(F)(F)F)cc2C(F)(F)F)c1Cl] | 19 |
| F26 | 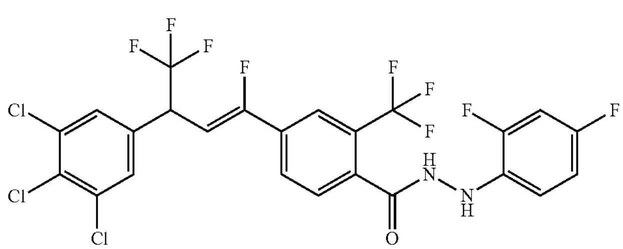 [SMILES: O=C(NNc1ccc(F)cc1F)c1ccc(/C(F)=C/C(c2cc(Cl)c(Cl)c(Cl)c2)C(F)(F)F)cc1C(F)(F)F] | 17 |

TABLE 2-continued
| Structure and preparation method for F Series molecules | | |
|---|---|---|
| No. | Structure | Prep.* |
| F27 | 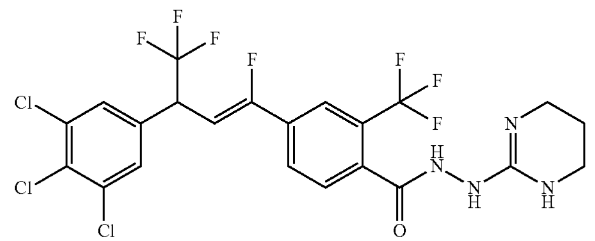 [SMILES: O=C(NNC1=NCCCN1)c1ccc(/C(F)=C/C(c2cc(Cl)c(Cl)c(Cl)c2)C(F)(F)F)cc1C(F)(F)F] | 15 |
| F28 | 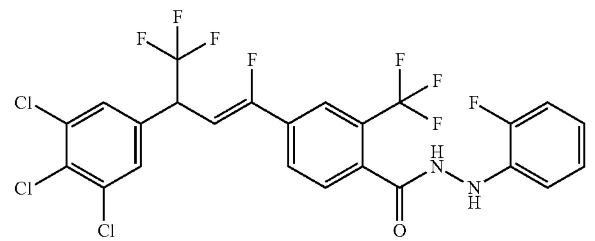 [SMILES: O=C(NNc1ccccc1F)c1ccc(/C(F)=C/C(c2cc(Cl)c(Cl)c(Cl)c2)C(F)(F)F)cc1C(F)(F)F] | 17 |
| F29 | 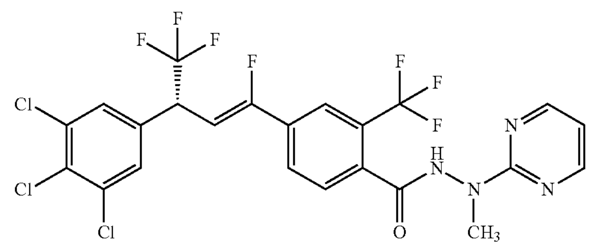 | 18, 35 |
| F30 | 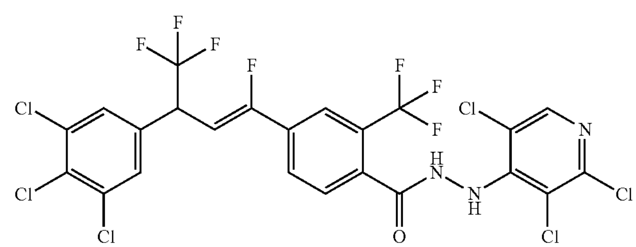 [SMILES: O=C(NNc1c(Cl)cnc(Cl)c1Cl)c1ccc(/C(F)=C/C(c2cc(Cl)c(Cl)c(Cl)c2)C(F)(F)F)cc1C(F)(F)F] | 19 |
| F31 | 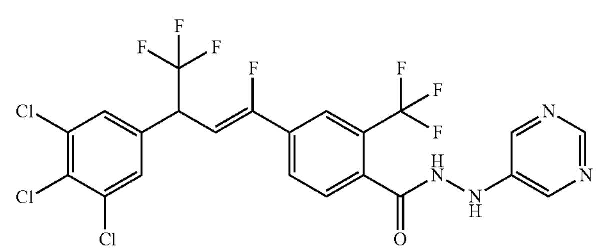 [SMILES: O=C(NNc1cncnc1)c1ccc(/C(F)=C/C(c2cc(Cl)c(Cl)c(Cl)c2)C(F)(F)F)cc1C(F)(F)F] | 16 |
| F32 | 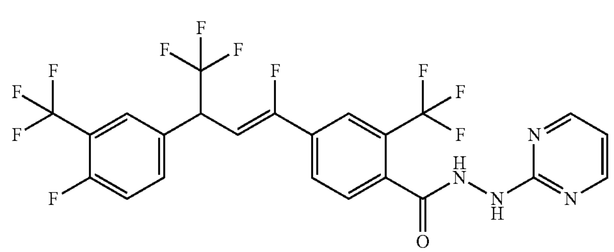 [SMILES: O=C(NNc1ncccn1)c1ccc(/C(F)=C/C(c2ccc(F)c(C(F)(F)F)c2)C(F)(F)F)cc1C(F)(F)F] | 18 |

TABLE 2-continued
| Structure and preparation method for F Series molecules | | |
|---|---|---|
| No. | Structure | Prep.* |
| F33 | 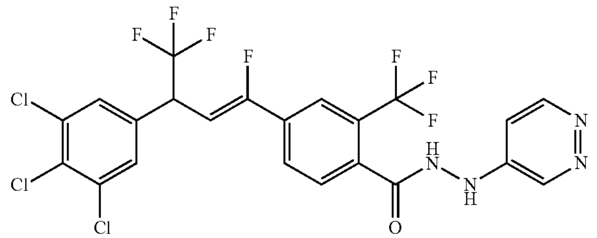 [SMILES: O=C(NNc1ccnnc1)c1ccc(/C(F)=C/C(c2cc(Cl)c(Cl)c(Cl)c2)C(F)(F)F)cc1C(F)(F)F] | 16 |
| F34 | 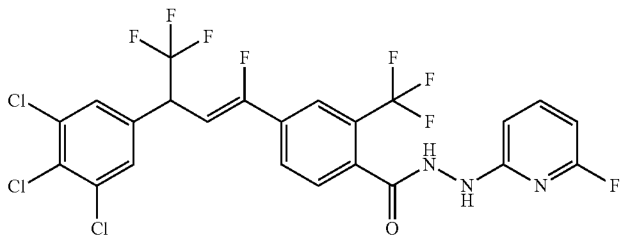 [SMILES: O=C(NNc1cccc(F)n1)c1ccc(/C(F)=C/C(c2cc(Cl)c(Cl)c(Cl)c2)C(F)(F)F)cc1C(F)(F)F] | 15 |
| F35 | 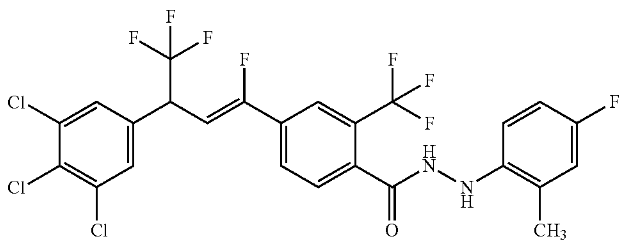 [SMILES: Cc1cc(F)ccc1NNC(=O)c1ccc(/C(F)=C/C(c2cc(Cl)c(Cl)c(Cl)c2)C(F)(F)F)cc1C(F)(F)F] | 17 |
| F37 | 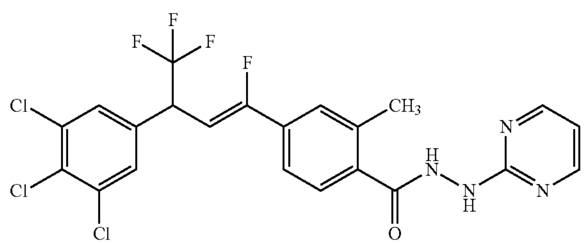 [SMILES: Cc1cc(/C(F)=C/C(c2cc(Cl)c(Cl)c(Cl)c2)C(F)(F)F)ccc1C(=O)NNc1ncccn1] | 18 |
| F38 | 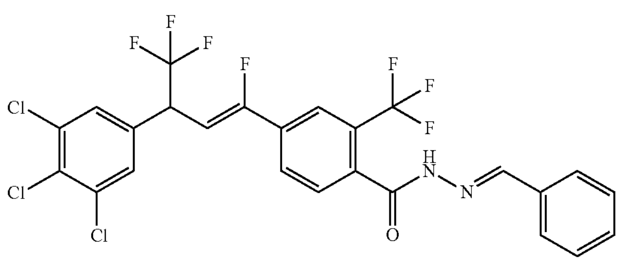 [SMILES: O=C(N/N=C/c1ccccc1)c1ccc(/C(F)=C/C(c2cc(Cl)c(Cl)c(Cl)c2)C(F)(F)F)cc1C(F)(F)F] | 24 |
| F39 | 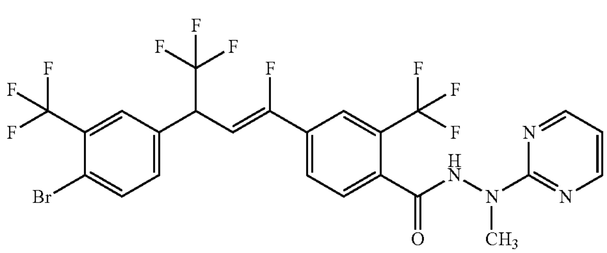 [SMILES: CN(NC(=O)c1ccc(/C(F)=C/C(c2ccc(Br)c(C(F)(F)F)c2)C(F)(F)F)cc1C(F)(F)F)c1ncccn1] | 18 |

TABLE 2-continued
Structure and preparation method for F Series molecules
| No. | Structure | Prep.* |
|---|---|---|
| F40 | 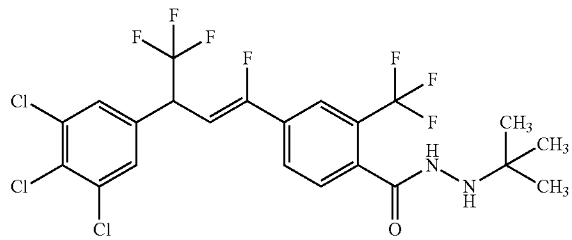 [SMILES: CC(C)(C)NNC(=O)c1ccc(/C(F)=C/C(c2cc(Cl)c(Cl)c(Cl)c2)C(F)(F)F)cc1C(F)(F)F] | 19 |
| F41 | 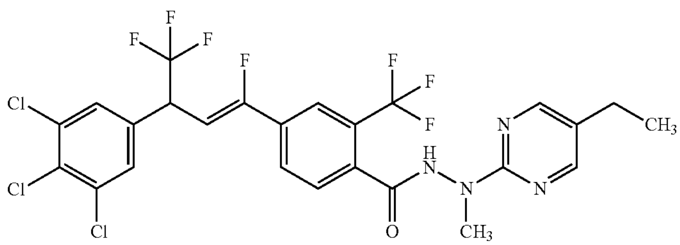 | 19 |
| F42 | 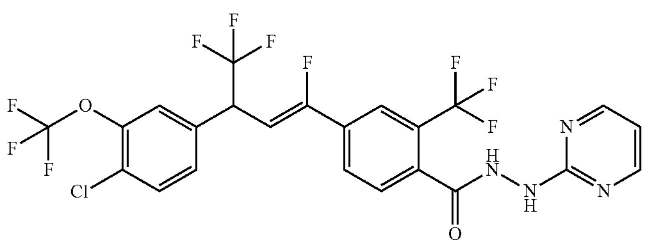 [SMILES: O=C(NNc1ncccn1)c1ccc(/C(F)=C/C(c2ccc(Cl)c(OC(F)(F)F)c2)C(F)(F)F)cc1C(F)(F)F] | 15 |
| F43 | 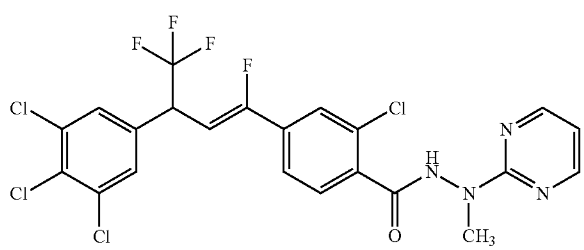 [SMILES: CN(NC(=O)c1ccc(/C(F)=C/C(c2cc(Cl)c(Cl)c(Cl)c2)C(F)(F)F)cc1Cl)c1ncccn1] | 18 |
| F44 | 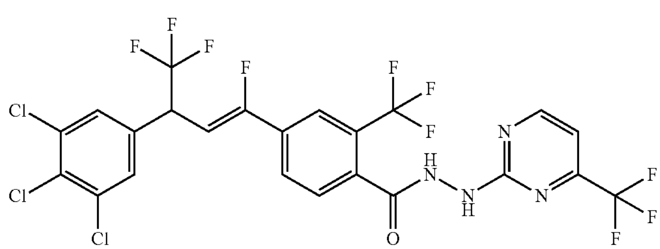 [SMILES: O=C(NNc1nccc(C(F)(F)F)n1)c1ccc(/C(F)=C/C(c2cc(Cl)c(Cl)c(Cl)c2)C(F)(F)F)cc1C(F)(F)F] | 19 |
| F45 | 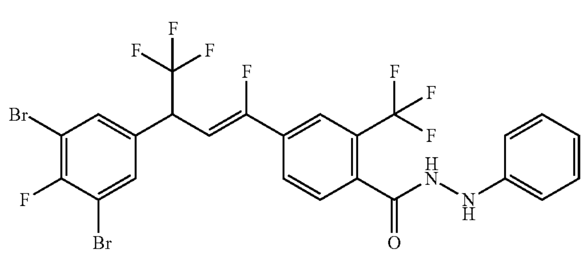 [SMILES: O=C(NNc1ccccc1)c1ccc(/C(F)=C/C(c2cc(Br)c(F)c(Br)c2)C(F)(F)F)cc1C(F)(F)F] | 15 |

TABLE 2-continued
| Structure and preparation method for F Series molecules | | |
|---|---|---|
| No. | Structure | Prep.* |
| F48 | 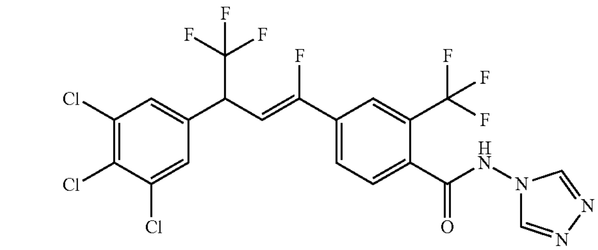 [SMILES: O=C(Nn1cnnc1)c1ccc(/C(F)=C/C(c2cc(Cl)c(Cl)c(Cl)c2)C(F)(F)F)cc1C(F)(F)F] | 15 |
| F49 | 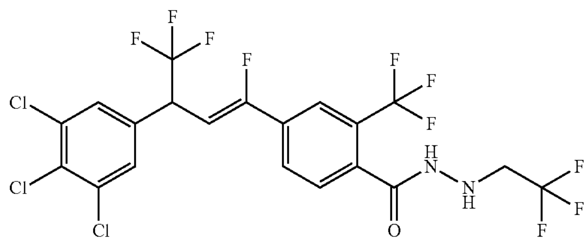 [SMILES: O=C(NNCC(F)(F)F)c1ccc(/C(F)=C/C(c2cc(Cl)c(Cl)c(Cl)c2)C(F)(F)F)cc1C(F)(F)F] | 16 |
| F50 | 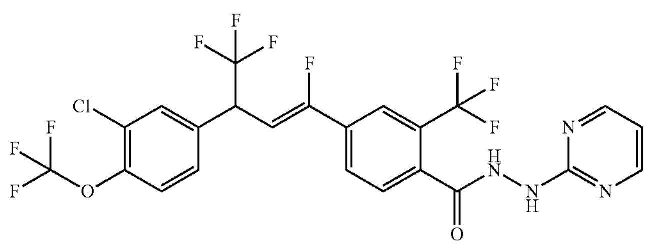 [SMILES: O=C(NNc1ncccn1)c1ccc(/C(F)=C/C(c2ccc(OC(F)(F)F)c(Cl)c2)C(F)(F)F)cc1C(F)(F)F] | 15 |
| F51 | 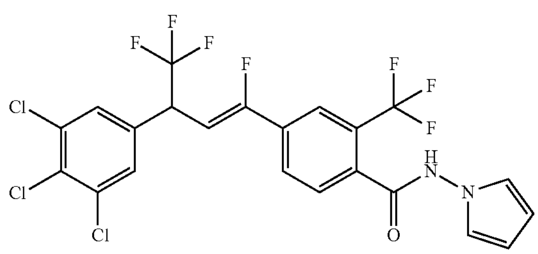 [SMILES: O=C(Nn1cccc1)c1ccc(/C(F)=C/C(c2cc(Cl)c(Cl)c(Cl)c2)C(F)(F)F)cc1C(F)(F)F] | 15 |
| F52 | 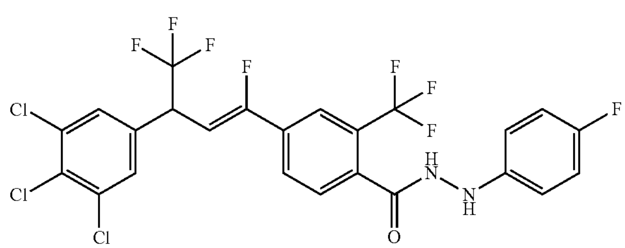 [SMILES: O=C(NNc1ccc(F)cc1)c1ccc(/C(F)=C/C(c2cc(Cl)c(Cl)c(Cl)c2)C(F)(F)F)cc1C(F)(F)F] | 17 |
| F54 | 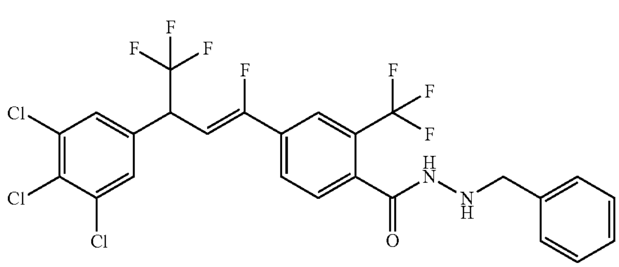 [SMILES: O=C(NNCc1ccccc1)c1ccc(/C(F)=C/C(c2cc(Cl)c(Cl)c(Cl)c2)C(F)(F)F)cc1C(F)(F)F] | 18 |

TABLE 2-continued
Structure and preparation method for F Series molecules
| No. | Structure | Prep.* |
| --- | --- | --- |
| F55 | 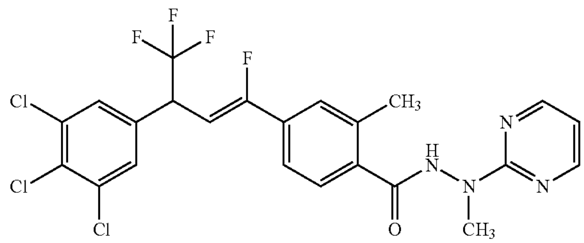 | 18 |
| F56 | 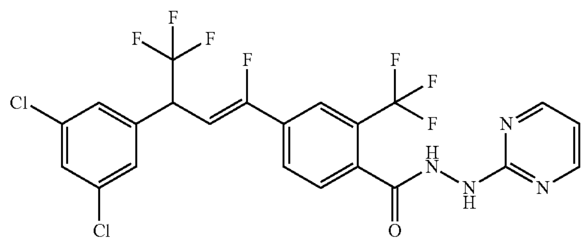 [SMILES: O=C(NNc1ncccn1)c1ccc(/C(F)=C/C(c2cc(Cl)cc(Cl)c2)C(F)(F)F)cc1C(F)(F)F] | 18 |
| F57 | 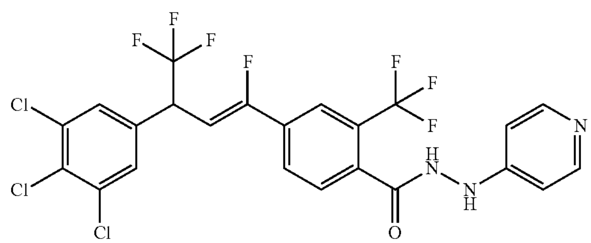 [SMILES: O=C(NNc1ccncc1)c1ccc(/C(F)=C/C(c2cc(Cl)c(Cl)c(Cl)c2)C(F)(F)F)cc1C(F)(F)F] | 16 |
| F58 | 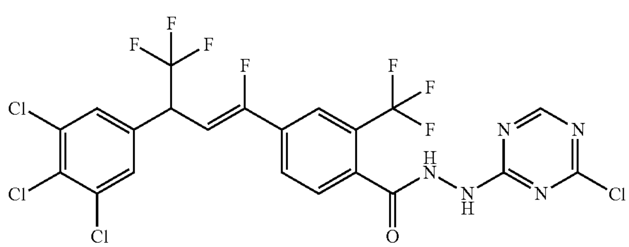 [SMILES: O=C(NNc1ncnc(Cl)n1)c1ccc(/C(F)=C/C(c2cc(Cl)c(Cl)c(Cl)c2)C(F)(F)F)cc1C(F)(F)F] | 15 |
| F59 | 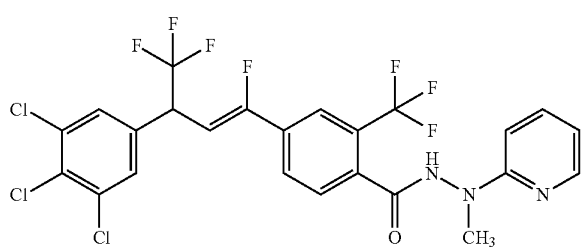 [SMILES: CN(NC(=O)c1ccc(/C(F)=C/C(c2cc(Cl)c(Cl)c(Cl)c2)C(F)(F)F)cc1C(F)(F)F)c1ccccn1] | 17 |
| F60 | 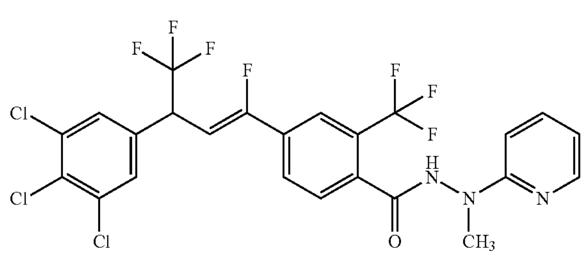 | 15 |

TABLE 2-continued
Structure and preparation method for F Series molecules
| No. | Structure | Prep.* |
| --- | --- | --- |
| F61 | 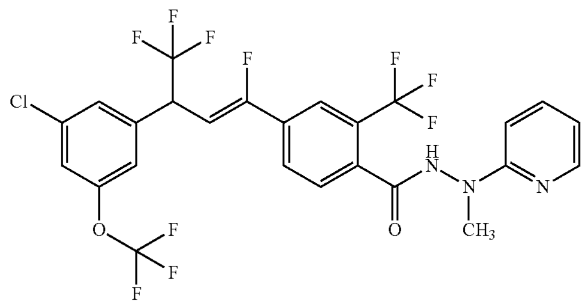 [SMILES: CN(NC(=O)c1ccc(/C(F)=C/C(c2cc(Cl)cc(OC(F)(F)F)c2)C(F)(F)F)cc1C(F)(F)F)c1ccccn1] | 15 |
| F62 | 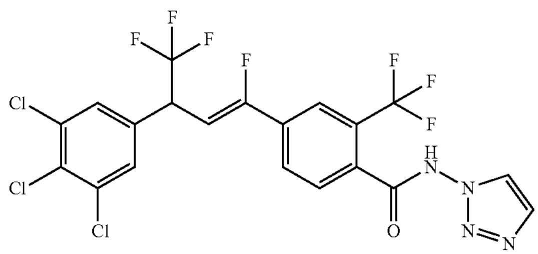 [SMILES: O=C(Nn1ccnn1)c1ccc(/C(F)=C/C(c2cc(Cl)c(Cl)c(Cl)c2)C(F)(F)F)cc1C(F)(F)F] | 15 |
| F63 | 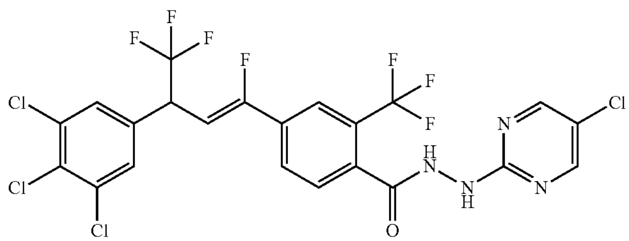 [SMILES: O=C(NNc1ncc(Cl)cn1)c1ccc(/C(F)=C/C(c2cc(Cl)c(Cl)c(Cl)c2)C(F)(F)F)cc1C(F)(F)F] | 16 |
| F68 | 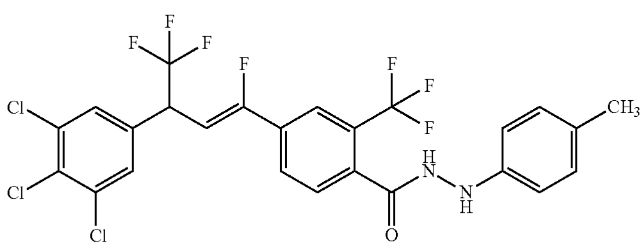 [SMILES: Cc1ccc(NNC(=O)c2ccc(/C(F)=C/C(c3cc(Cl)c(Cl)c(Cl)c3)C(F)(F)F)cc2C(F)(F)F)cc1] | 15 |
| F69 | 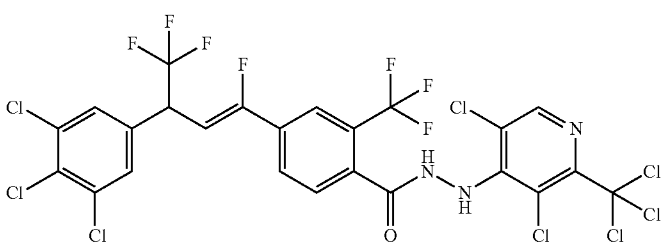 [SMILES: O=C(NNc1c(Cl)cnc(C(Cl)(Cl)Cl)c1Cl)c1ccc(/C(F)=C/C(c2cc(Cl)c(Cl)c(Cl)c2)C(F)(F)F)cc1C(F)(F)F] | 19 |
| F70 | 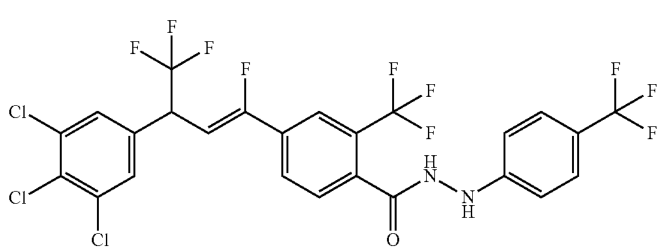 [SMILES: O=C(NNc1ccc(C(F)(F)F)cc1)c1ccc(/C(F)=C/C(c2cc(Cl)c(Cl)c(Cl)c2)C(F)(F)F)cc1C(F)(F)F] | 17 |

TABLE 2-continued
| Structure and preparation method for F Series molecules | | |
|---|---|---|
| No. | Structure | Prep.* |
| F71 | 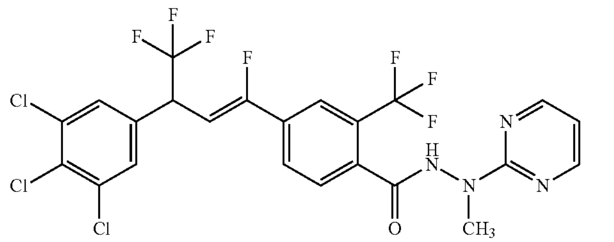 | 18, 19 |
| F73 | 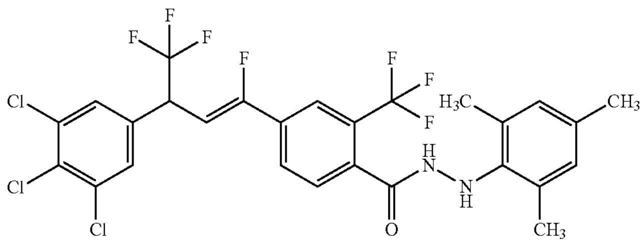 | 19 |
| F74 | 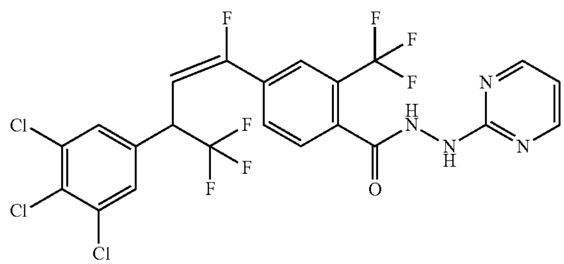 [SMILES: O=C(NNc1ncccn1)c1ccc(/C(F)=C\C(c2cc(Cl)c(Cl)c(Cl)c2)C(F)(F)F)cc1C(F)(F)F] | 34 |
| F75 | 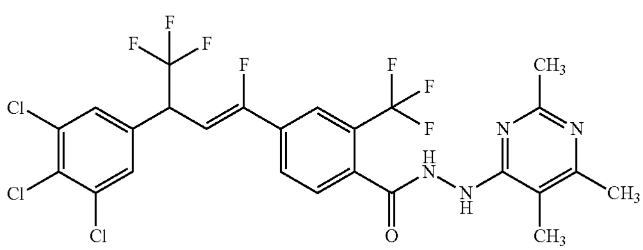 [SMILES: Cc1nc(C)c(C)c(NNC(=O)c2ccc(/C(F)=C/C(c3cc(Cl)c(Cl)c(Cl)c3)C(F)(F)F)cc2C(F)(F)F)n1] | 15 |
| F77 | 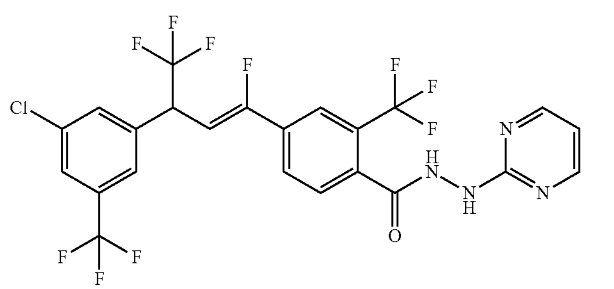 [SMILES: O=C(NNc1ncccn1)c1ccc(/C(F)=C/C(c2cc(Cl)cc(C(F)(F)F)c2)C(F)(F)F)cc1C(F)(F)F] | 18 |

TABLE 2-continued
Structure and preparation method for F Series molecules
| No. | Structure | Prep.* |
| --- | --- | --- |
| F78 | 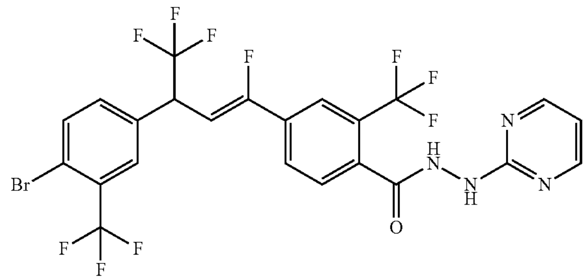 [SMILES: O=C(NNc1ncccn1)c1ccc(/C(F)=C/C(c2ccc(Br)c(C(F)(F)F)c2)C(F)(F)F)cc1C(F)(F)F] | 18 |
| F79 | 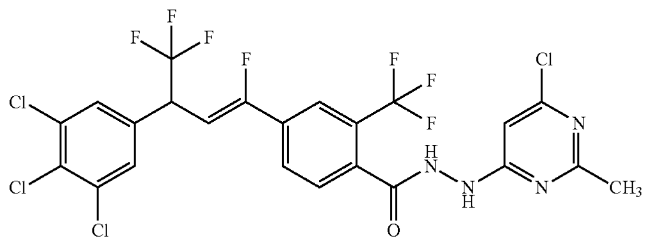 [SMILES: Cc1nc(Cl)cc(NNC(=O)c2ccc(/C(F)=C/C(c3cc(Cl)c(Cl)c(Cl)c3)C(F)(F)F)cc2C(F)(F)F)n1] | 15 |
| F82 | 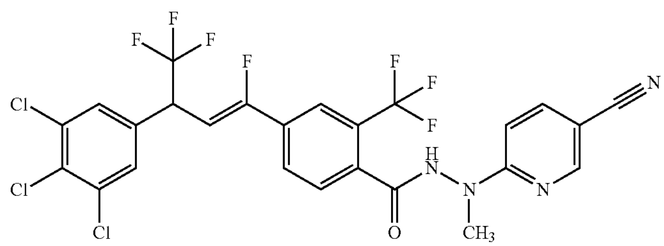 [SMILES: CN(NC(=O)c1ccc(/C(F)=C/C(c2cc(Cl)c(Cl)c(Cl)c2)C(F)(F)F)cc1C(F)(F)F)c1ccc(C#N)cn1] | 17 |
| F83 | 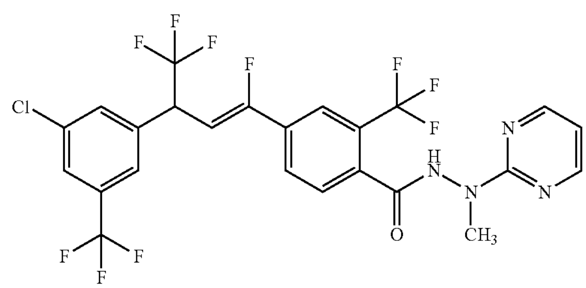 [SMILES: CN(NC(=O)c1ccc(/C(F)=C/C(c2cc(Cl)cc(C(F)(F)F)c2)C(F)(F)F)cc1C(F)(F)F)c1ncccn1] | 18 |
| F84 | 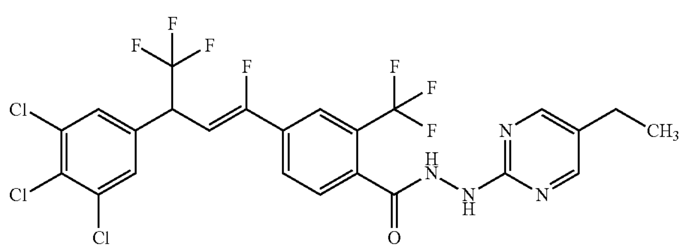 [SMILES: CCc1cnc(NNC(=O)c2ccc(/C(F)=C/C(c3cc(Cl)c(Cl)c(Cl)c3)C(F)(F)F)cc2C(F)(F)F)nc1] | 19 |
| F85 | 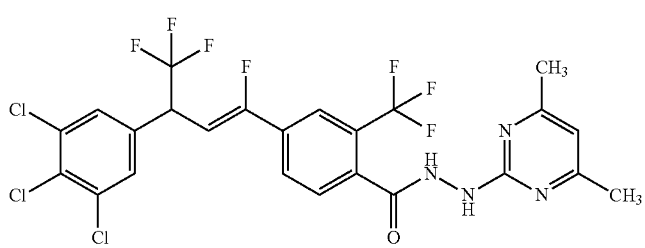 [SMILES: Cc1cc(C)nc(NNC(=O)c2ccc(/C(F)=C/C(c3cc(Cl)c(Cl)c(Cl)c3)C(F)(F)F)cc2C(F)(F)F)n1] | 16 |

TABLE 2-continued
| Structure and preparation method for F Series molecules | | |
|---|---|---|
| No. | Structure | Prep.* |
| F86 | 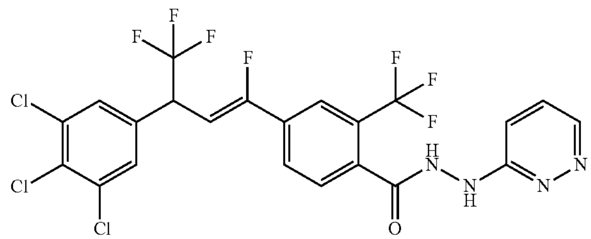 [SMILES: O=C(NNc1cccnn1)c1ccc(/C(F)=C/C(c2cc(Cl)c(Cl)c(Cl)c2)C(F)(F)F)cc1C(F)(F)F] | 16 |
| F87 | 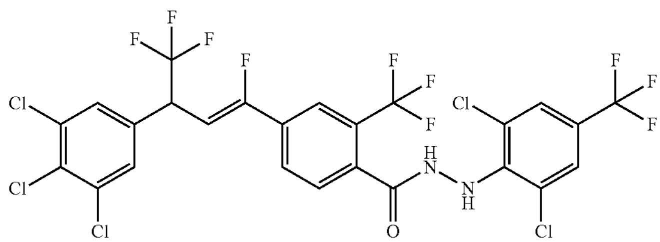 [SMILES: O=C(NNc1c(Cl)cc(C(F)(F)F)cc1Cl)c1ccc(/C(F)=C/C(c2cc(Cl)c(Cl)c(Cl)c2)C(F)(F)F)cc1C(F)(F)F] | 19 |
| F89 | 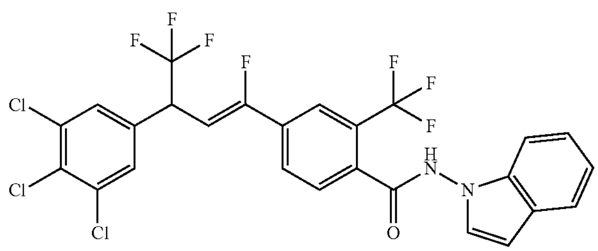 [SMILES: O=C(Nn1ccc2ccccc21)c1ccc(/C(F)=C/C(c2cc(Cl)c(Cl)c(Cl)c2)C(F)(F)F)cc1C(F)(F)F] | 15 |
| F90 | 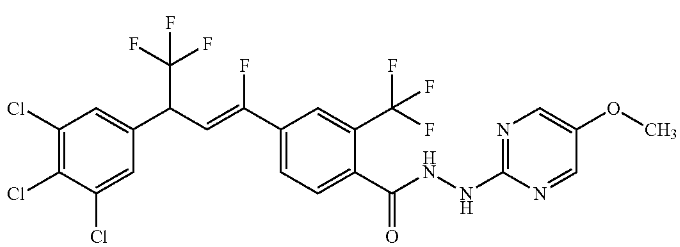 [SMILES: COc1cnc(NNC(=O)c2ccc(/C(F)=C/C(c3cc(Cl)c(Cl)c(Cl)c3)C(F)(F)F)cc2C(F)(F)F)nc1] | 19 |
| F91 | 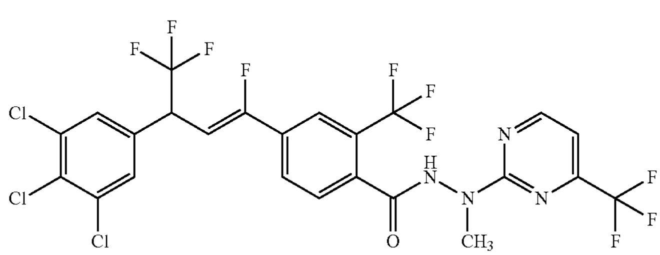 [SMILES: CN(NC(=O)c1ccc(/C(F)=C/C(c2cc(Cl)c(Cl)c(Cl)c2)C(F)(F)F)cc1C(F)(F)F)c1nccc(C(F)(F)F)n1] | 30 |
| F92 | 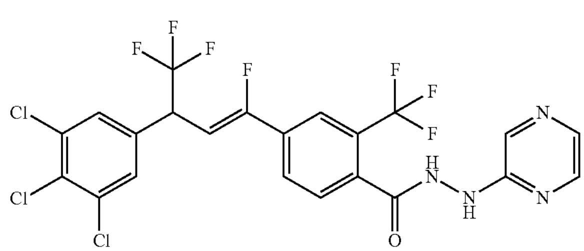 [SMILES: O=C(NNc1cnccn1)c1ccc(/C(F)=C/C(c2cc(Cl)c(Cl)c(Cl)c2)C(F)(F)F)cc1C(F)(F)F] | 16 |

TABLE 2-continued
Structure and preparation method for F Series molecules
| No. | Structure | Prep.* |
| --- | --- | --- |
| F93 | 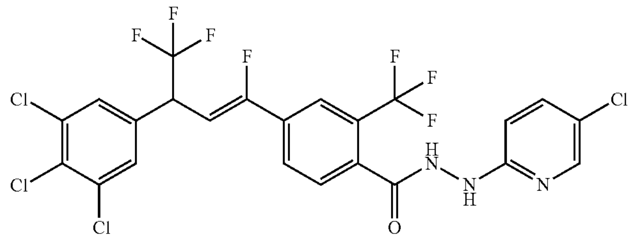 [SMILES: O=C(NNc1ccc(Cl)cn1)c1ccc(/C(F)=C/C(c2cc(Cl)c(Cl)c(Cl)c2)C(F)(F)F)cc1C(F)(F)F] | 15 |
| F94 | 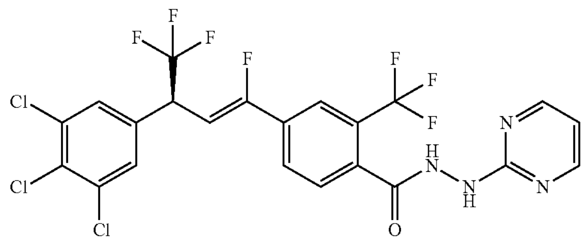 [SMILES: O=C(NNc1ncccn1)c1ccc(/C(F)=C/[C@@H](c2cc(Cl)c(Cl)c(Cl)c2)C(F)(F)F)cc1C(F)(F)F] | 18, 36 |
| F95 | 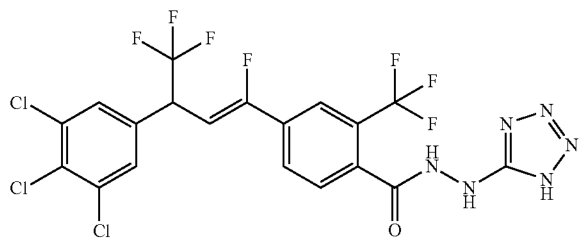 [SMILES: O=C(NNc1nnn[nH]1)c1ccc(/C(F)=C/C(c2cc(Cl)c(Cl)c(Cl)c2)C(F)(F)F)cc1C(F)(F)F] | 16 |
| F96 | 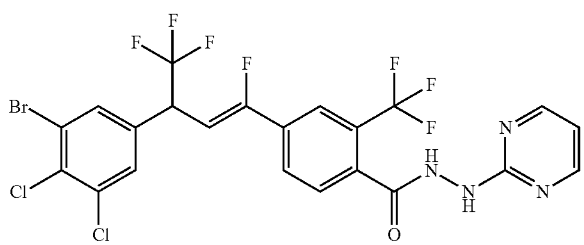 | 18 |
| F97 | 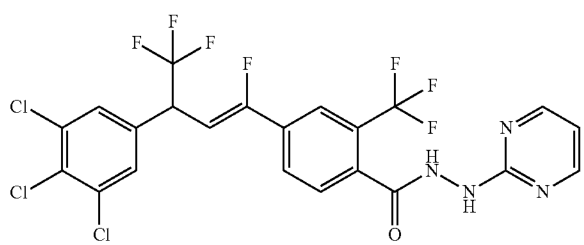 [SMILES: O=C(NNc1ncccn1)c1ccc(/C(F)=C/C(c2cc(Cl)c(Cl)c(Cl)c2)C(F)(F)F)cc1C(F)(F)F] | 16, 18, 19 |
| F98 | 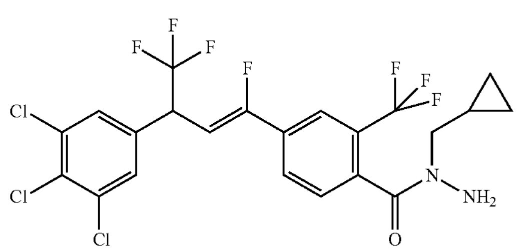 [SMILES: NN(CC1CC1)C(=O)c1ccc(/C(F)=C/C(c2cc(Cl)c(Cl)c(Cl)c2)C(F)(F)F)cc1C(F)(F)F] | 19 |

TABLE 2-continued
| Structure and preparation method for F Series molecules | | |
|---|---|---|
| No. | Structure | Prep.* |
| F99 | 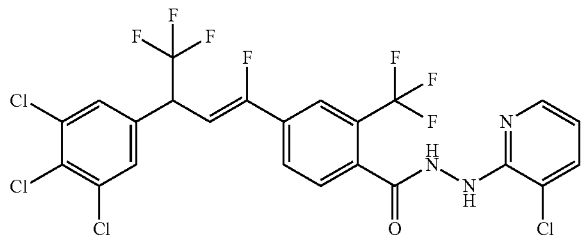 [SMILES: O=C(NNc1ncccc1Cl)c1ccc(/C(F)=C/C(c2cc(Cl)c(Cl)c(Cl)c2)C(F)(F)F)cc1C(F)(F)F] | 17 |
| F100 | 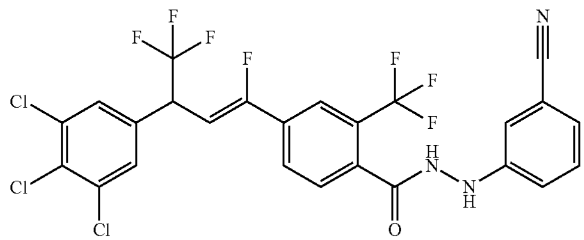 [SMILES: N#Cc1cccc(NNC(=O)c2ccc(/C(F)=C/C(c3cc(Cl)c(Cl)c(Cl)c3)C(F)(F)F)cc2C(F)(F)F)c1] | 18 |
| F101 | 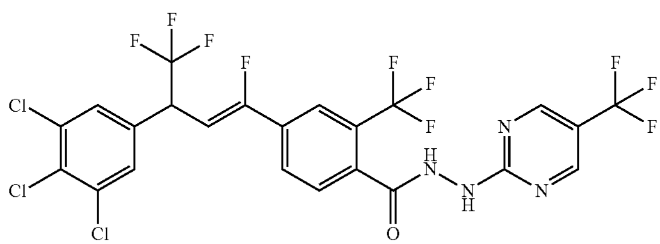 [SMILES: O=C(NNc1ncc(C(F)(F)F)cn1)c1ccc(/C(F)=C/C(c2cc(Cl)c(Cl)c(Cl)c2)C(F)(F)F)cc1C(F)(F)F] | 19 |
| F102 | 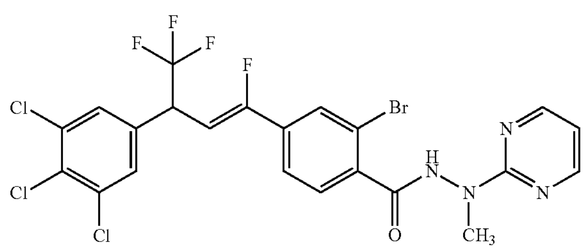 [SMILES: CN(NC(=O)c1ccc(/C(F)=C/C(c2cc(Cl)c(Cl)c(Cl)c2)C(F)(F)F)cc1Br)c1ncccn1] | 18 |
| F103 | 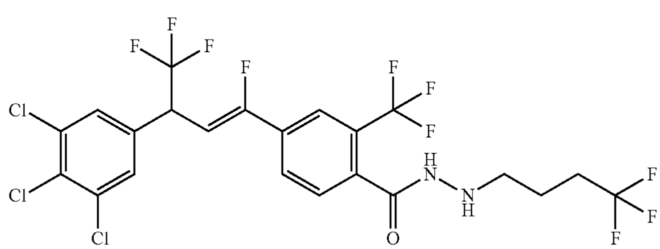 [SMILES: O=C(NNCCCC(F)(F)F)c1ccc(/C(F)=C/C(c2cc(Cl)c(Cl)c(Cl)c2)C(F)(F)F)cc1C(F)(F)F] | 22 |
| F104 | 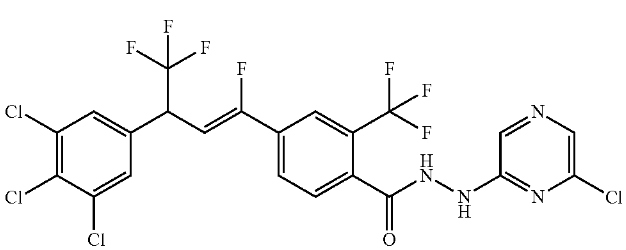 [SMILES: O=C(NNc1cncc(Cl)n1)c1ccc(/C(F)=C/C(c2cc(Cl)c(Cl)c(Cl)c2)C(F)(F)F)cc1C(F)(F)F] | 16 |

TABLE 2-continued
Structure and preparation method for F Series molecules
| No. | Structure | Prep.* |
|---|---|---|
| F105 | 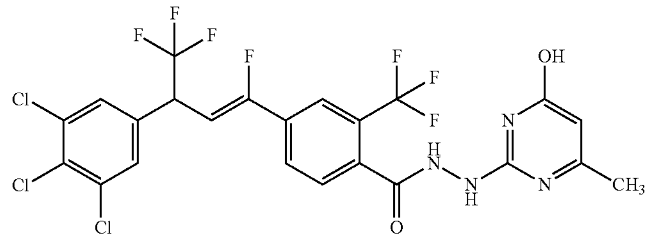 [SMILES: Cc1cc(O)nc(NNC(=O)c2ccc(/C(F)=C/C(c3cc(Cl)c(Cl)c(Cl)c3)C(F)(F)F)cc2C(F)(F)F)n1] | 16 |
| F106 | 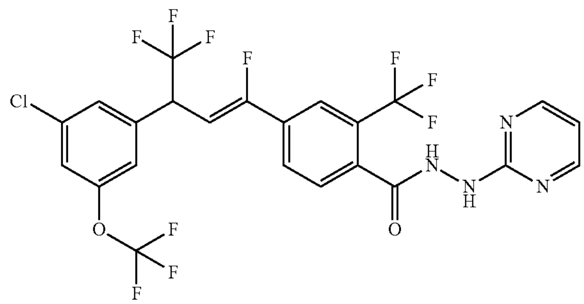 [SMILES: O=C(NNc1ncccn1)c1ccc(/C(F)=C/C(c2cc(Cl)cc(OC(F)(F)F)c2)C(F)(F)F)cc1C(F)(F)F] | 15 |
| F107 | 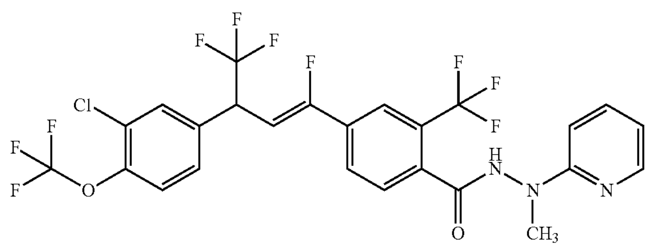 [SMILES: CN(NC(=O)c1ccc(/C(F)=C/C(c2ccc(OC(F)(F)F)c(Cl)c2)C(F)(F)F)cc1C(F)(F)F)c1ccccn1] | 15 |
| F109 | 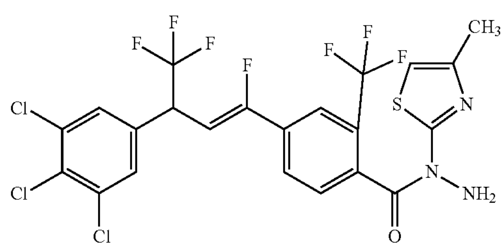 [SMILES: Cc1csc(N(N)C(=O)c2ccc(/C(F)=C/C(c3cc(Cl)c(Cl)c(Cl)c3)C(F)(F)F)cc2C(F)(F)F)n1] | 16 |
| F110 | 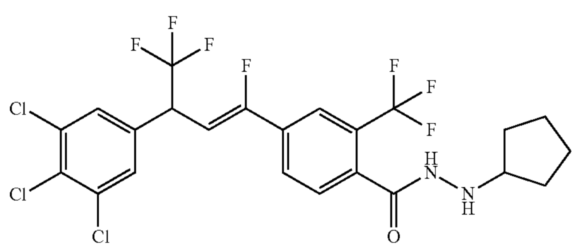 [SMILES: O=C(NNC1CCCC1)c1ccc(/C(F)=C/C(c2cc(Cl)c(Cl)c(Cl)c2)C(F)(F)F)cc1C(F)(F)F] | 22 |
| F111 | 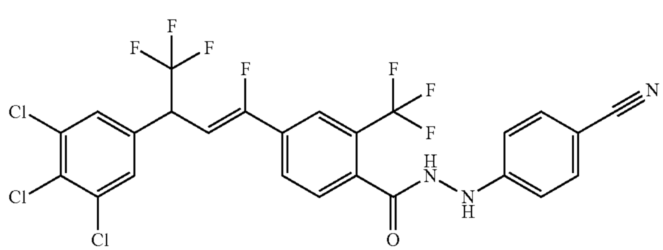 [SMILES: N#Cc1ccc(NNC(=O)c2ccc(/C(F)=C/C(c3cc(Cl)c(Cl)c(Cl)c3)C(F)(F)F)cc2C(F)(F)F)cc1] | 17 |

TABLE 2-continued
Structure and preparation method for F Series molecules
| No. | Structure | Prep.* |
|---|---|---|
| F112 | 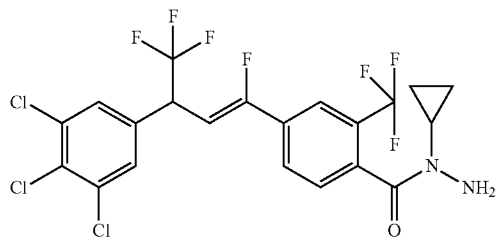 [SMILES: NN(C(=O)c1ccc(/C(F)=C/C(c2cc(Cl)c(Cl)c(Cl)c2)C(F)(F)F)cc1C(F)(F)F)C1CC1] | 19 |
| F113 | 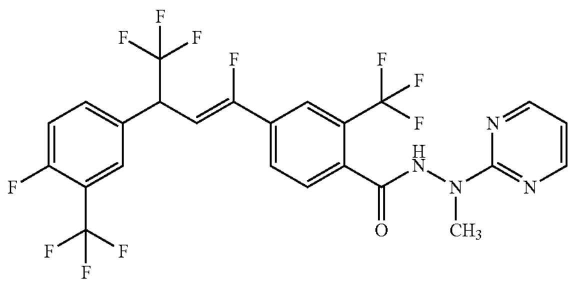 [SMILES: CN(NC(=O)c1ccc(/C(F)=C/C(c2ccc(F)c(C(F)(F)F)c2)C(F)(F)F)cc1C(F)(F)F)c1ncccn1] | 18 |
| F114 | 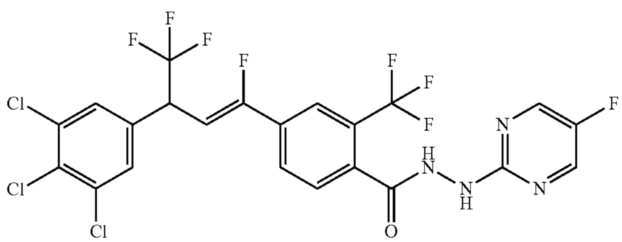 [SMILES: O=C(NNc1ncc(F)cn1)c1ccc(/C(F)=C/C(c2cc(Cl)c(Cl)c(Cl)c2)C(F)(F)F)cc1C(F)(F)F] | 19 |
| F116 | 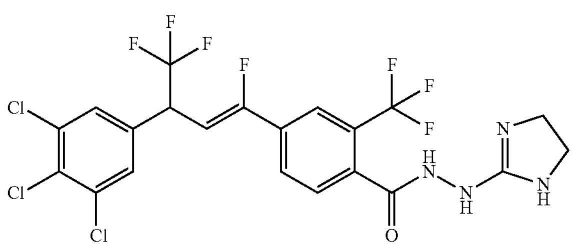 [SMILES: O=C(NNC1=NCCN1)c1ccc(/C(F)=C/C(c2cc(Cl)c(Cl)c(Cl)c2)C(F)(F)F)cc1C(F)(F)F] | 15 |
| F117 | 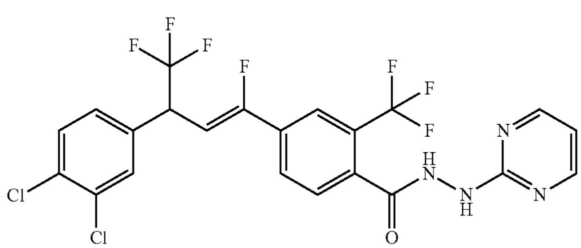 [SMILES: O=C(NNc1ncccn1)c1ccc(/C(F)=C/C(c2ccc(Cl)c(Cl)c2)C(F)(F)F)cc1C(F)(F)F] | 18 |
| F118 | 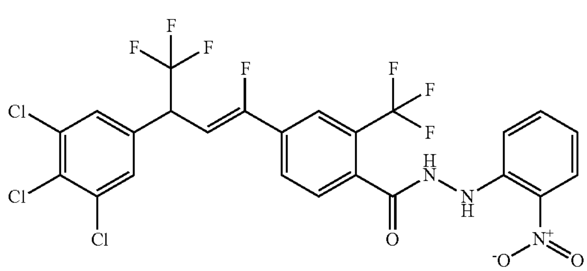 | 16 |

TABLE 2-continued
Structure and preparation method for F Series molecules
| No. | Structure | Prep.* |
| --- | --- | --- |
| F120 | 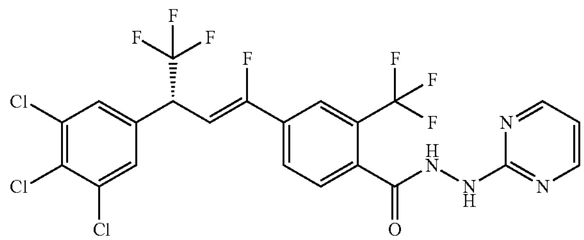 | 18, 36 |
| F121 | 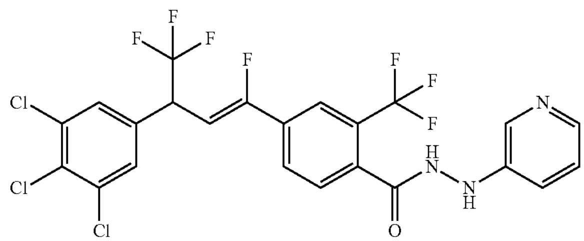 [SMILES: O=C(NNc1cccnc1)c1ccc(/C(F)=C/C(c2cc(Cl)c(Cl)c(Cl)c2)C(F)(F)F)cc1C(F)(F)F] | 16 |
| F122 | 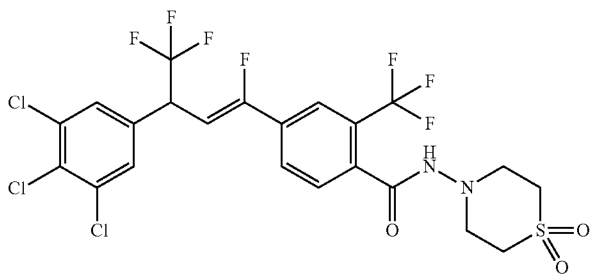 [SMILES: O=C(NN1CCS(=O)(=O)CC1)c1ccc(/C(F)=C/C(c2cc(Cl)c(Cl)c(Cl)c2)C(F)(F)F)cc1C(F)(F)F] | 20 |
| F123 | 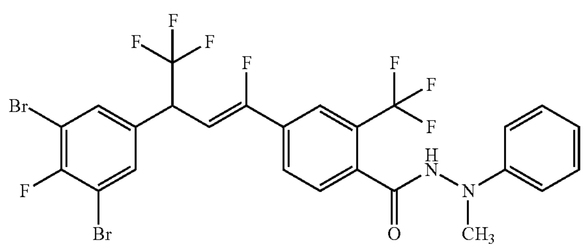 [SMILES: CN(NC(=O)c1ccc(/C(F)=C/C(c2cc(Br)c(F)c(Br)c2)C(F)(F)F)cc1C(F)(F)F)c1ccccc1] | 15 |
| F125 | 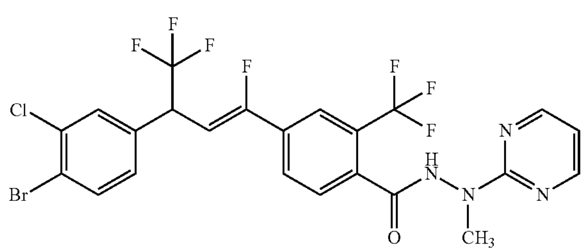 [SMILES: CN(NC(=O)c1ccc(/C(F)=C/C(c2ccc(Br)c(Cl)c2)C(F)(F)F)cc1C(F)(F)F)c1ncccn1] | 18 |
| F126 | 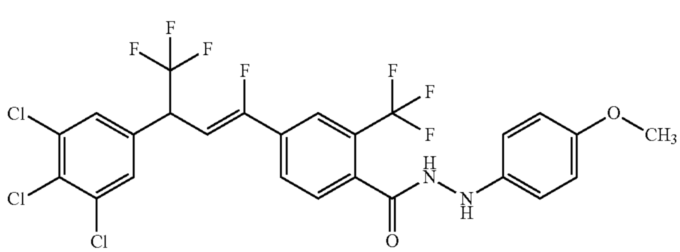 [SMILES: COc1ccc(NNC(=O)c2ccc(/C(F)=C/C(c3cc(Cl)c(Cl)c(Cl)c3)C(F)(F)F)cc2C(F)(F)F)cc1] | 18 |

TABLE 2-continued
| Structure and preparation method for F Series molecules | | |
|---|---|---|
| No. | Structure | Prep.* |
| F128 | 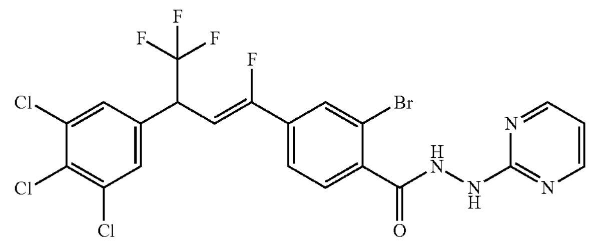 [SMILES: O=C(NNc1ncccn1)c1ccc(/C(F)=C/C(c2cc(Cl)c(Cl)c(Cl)c2)C(F)(F)F)cc1Br] | 18 |
| F129 | 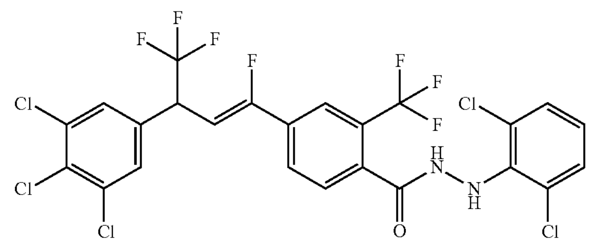 [SMILES: O=C(NNc1c(Cl)cccc1Cl)c1ccc(/C(F)=C/C(c2cc(Cl)c(Cl)c(Cl)c2)C(F)(F)F)cc1C(F)(F)F] | 19 |
| F130 | 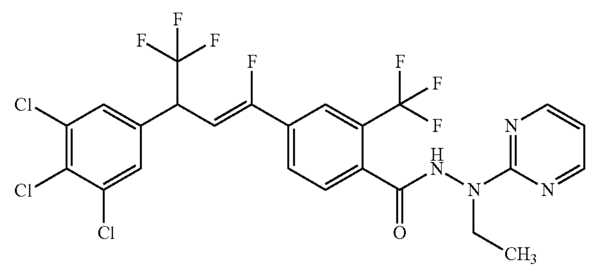 [SMILES: CCN(NC(=O)c1ccc(/C(F)=C/C(c2cc(Cl)c(Cl)c(Cl)c2)C(F)(F)F)cc1C(F)(F)F)c1ncccn1] | 18 |
| F131 | 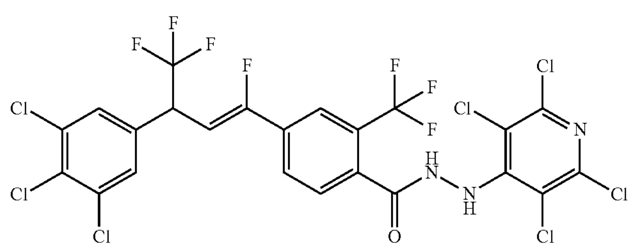 [SMILES: O=C(NNc1c(Cl)c(Cl)nc(Cl)c1Cl)c1ccc(/C(F)=C/C(c2cc(Cl)c(Cl)c(Cl)c2)C(F)(F)F)cc1C(F)(F)F] | 19 |
| F132 | 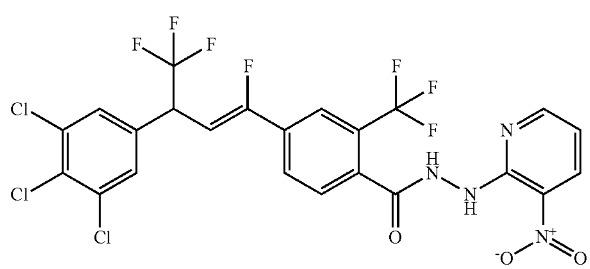 | 16 |
| F133 | 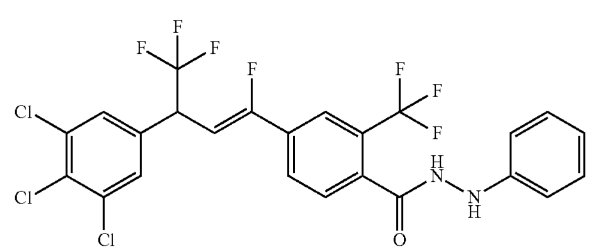 [SMILES: O=C(NNc1ccccc1)c1ccc(/C(F)=C/C(c2cc(Cl)c(Cl)c(Cl)c2)C(F)(F)F)cc1C(F)(F)F] | 17 |

TABLE 2-continued
Structure and preparation method for F Series molecules
| No. | Structure | Prep.* |
|---|---|---|
| F134 | 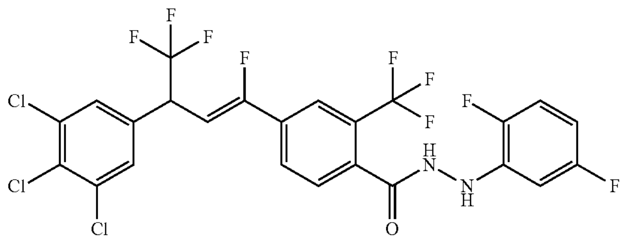 [SMILES: O=C(NNc1cc(F)ccc1F)c1ccc(/C(F)=C/C(c2cc(Cl)c(Cl)c(Cl)c2)C(F)(F)F)cc1C(F)(F)F] | 17 |
| F135 | 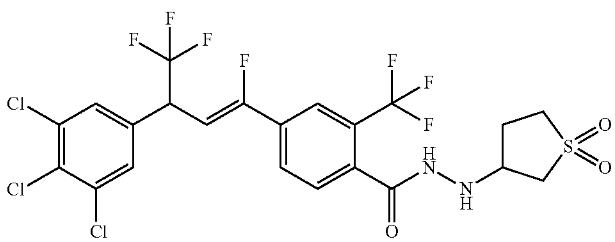 [SMILES: O=C(NNC1CCS(=O)(=O)C1)c1ccc(/C(F)=C/C(c2cc(Cl)c(Cl)c(Cl)c2)C(F)(F)F)cc1C(F)(F)F] | 15 |
| F136 | 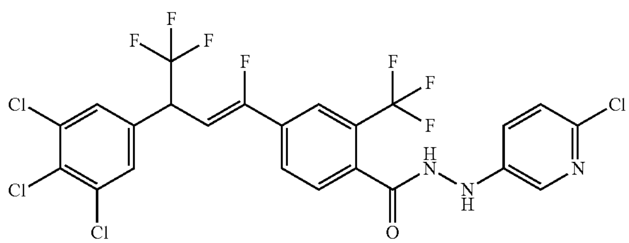 [SMILES: O=C(NNc1ccc(Cl)nc1)c1ccc(/C(F)=C/C(c2cc(Cl)c(Cl)c(Cl)c2)C(F)(F)F)cc1C(F)(F)F] | 16 |
| F137 | 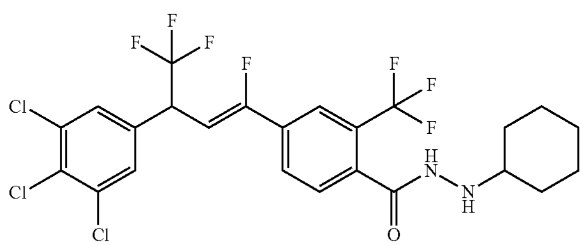 [SMILES: O=C(NNC1CCCCC1)c1ccc(/C(F)=C/C(c2cc(Cl)c(Cl)c(Cl)c2)C(F)(F)F)cc1C(F)(F)F] | 22 |
| F138 | 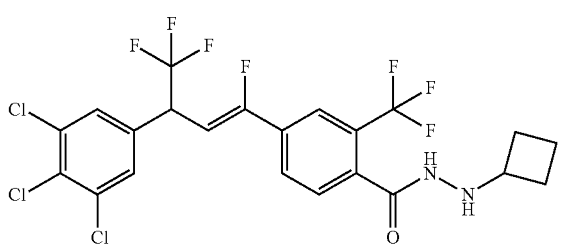 [SMILES: O=C(NNC1CCC1)c1ccc(/C(F)=C/C(c2cc(Cl)c(Cl)c(Cl)c2)C(F)(F)F)cc1C(F)(F)F] | 22 |
| F140 | 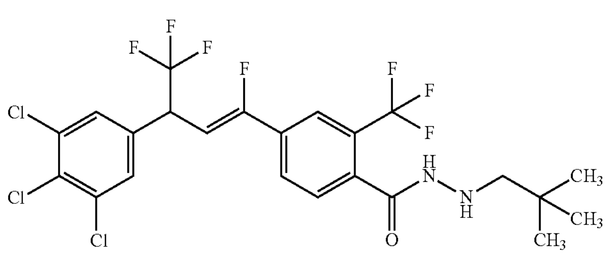 [SMILES: CC(C)(C)CNNC(=O)c1ccc(/C(F)=C/C(c2cc(Cl)c(Cl)c(Cl)c2)C(F)(F)F)cc1C(F)(F)F] | 22 |

TABLE 2-continued
Structure and preparation method for F Series molecules
| No. | Structure | Prep.* |
|---|---|---|
| F141 | 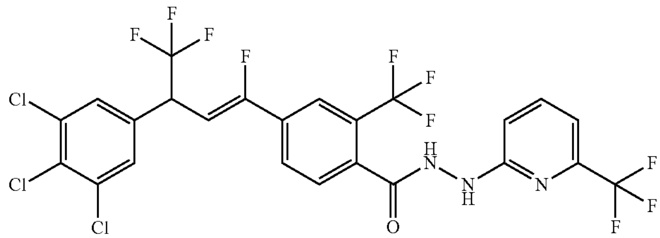 [SMILES: O=C(NNc1cccc(C(F)(F)F)n1)c1ccc(/C(F)=C/C(c2cc(Cl)c(Cl)c(Cl)c2)C(F)(F)F)cc1C(F)(F)F] | 15 |
| F142 | 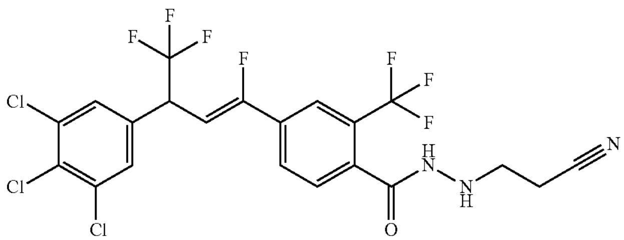 [SMILES: N#CCCNNC(=O)c1ccc(/C(F)=C/C(c2cc(Cl)c(Cl)c(Cl)c2)C(F)(F)F)cc1C(F)(F)F] | 15 |
| F143 | 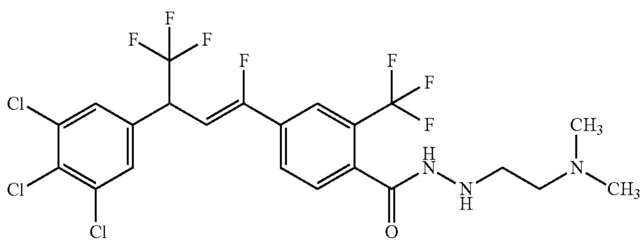 [SMILES: CN(C)CCNNC(=O)c1ccc(/C(F)=C/C(c2cc(Cl)c(Cl)c(Cl)c2)C(F)(F)F)cc1C(F)(F)F] | 15 |
| F144 | 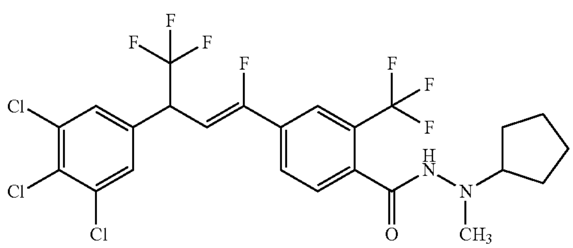 [SMILES: CN(NC(=O)c1ccc(/C(F)=C/C(c2cc(Cl)c(Cl)c(Cl)c2)C(F)(F)F)cc1C(F)(F)F)C1CCCC1] | 22 |
| F145 | 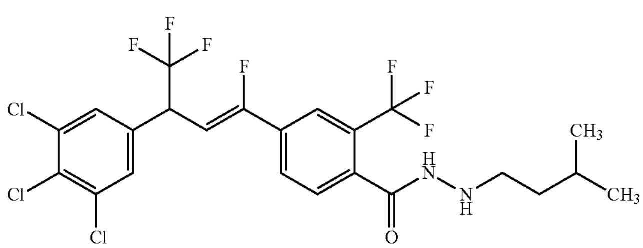 [SMILES: CC(C)CCNNC(=O)c1ccc(/C(F)=C/C(c2cc(Cl)c(Cl)c(Cl)c2)C(F)(F)F)cc1C(F)(F)F] | 15 |
| F146 | 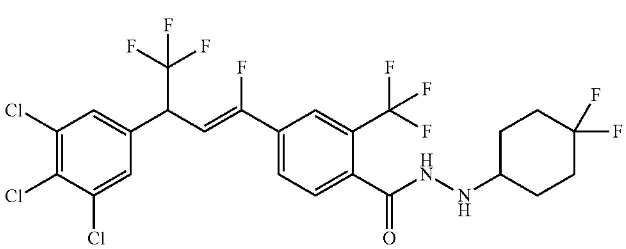 [SMILES: O=C(NNC1CCC(F)(F)CC1)c1ccc(/C(F)=C/C(c2cc(Cl)c(Cl)c(Cl)c2)C(F)(F)F)cc1C(F)(F)F] | 22 |

TABLE 2-continued
| No. | Structure | Prep.* |
|---|---|---|
| F147 | 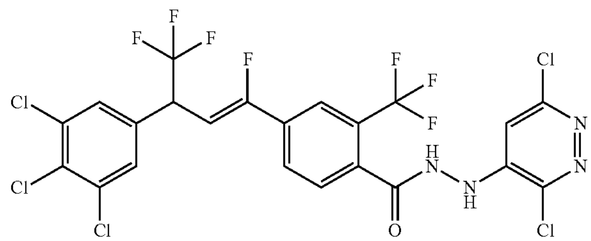 [SMILES: O=C(NNc1cc(Cl)nnc1Cl)c1ccc(/C(F)=C/C(c2cc(Cl)c(Cl)c(Cl)c2)C(F)(F)F)cc1C(F)(F)F] 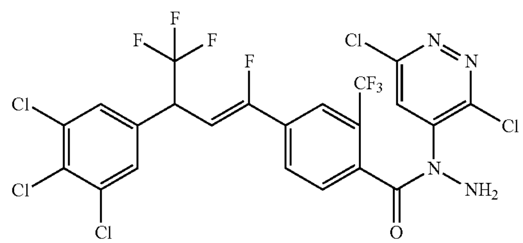 [SMILES: NN(C(=O)c1ccc(/C(F)=C/C(c2cc(Cl)c(Cl)c(Cl)c2)C(F)(F)F)cc1C(F)(F)F)c1cc(Cl)nnc1Cl] | 16 |
| F148 | 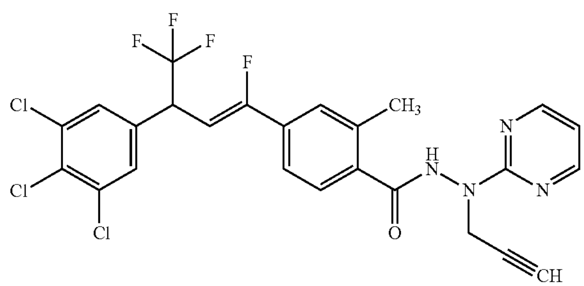 [SMILES: C#CCN(NC(=O)c1ccc(/C(F)=C/C(c2cc(Cl)c(Cl)c(Cl)c2)C(F)(F)F)cc1C)c1ncccn1] | 18 |
| F149 | 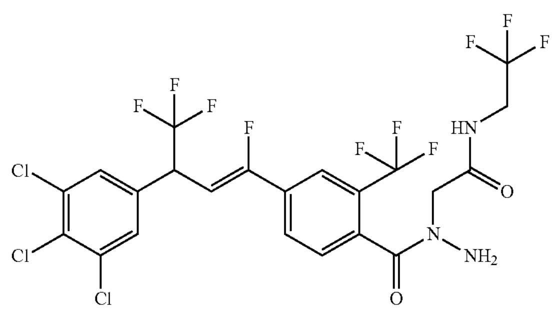 [SMILES: NN(CC(=O)NCC(F)(F)F)C(=O)c1ccc(/C(F)=C/C(c2cc(Cl)c(Cl)c(Cl)c2)C(F)(F)F)cc1C(F)(F)F] | 25 |
| F150 | 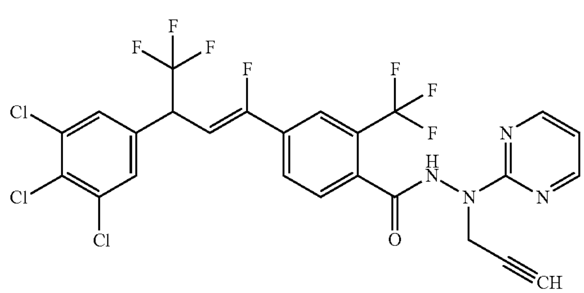 [SMILES: C#CCN(NC(=O)c1ccc(/C(F)=C/C(c2cc(Cl)c(Cl)c(Cl)c2)C(F)(F)F)cc1C(F)(F)F)c1ncccn1] | 18 |
Structure and preparation method for F Series molecules TABLE 2-continued
| Structure and preparation method for F Series molecules | | |
|---|---|---|
| No. | Structure | Prep.* |
| F151 | 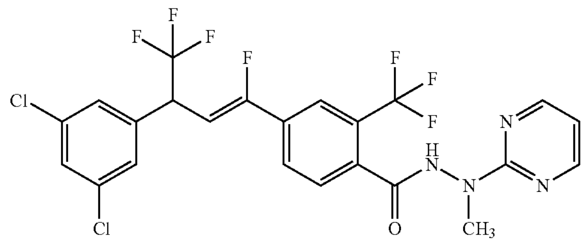 [SMILES: CN(NC(=O)c1ccc(/C(F)=C/C(c2cc(Cl)cc(Cl)c2)C(F)(F)F)cc1C(F)(F)F)c1ncccn1] | 18 |
| F152 | 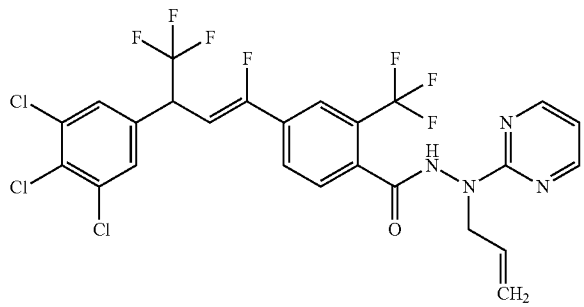 [SMILES: C=CCN(NC(=O)c1ccc(/C(F)=C/C(c2cc(Cl)c(Cl)c(Cl)c2)C(F)(F)F)cc1C(F)(F)F)c1ncccn1] | 18 |
| F155 | 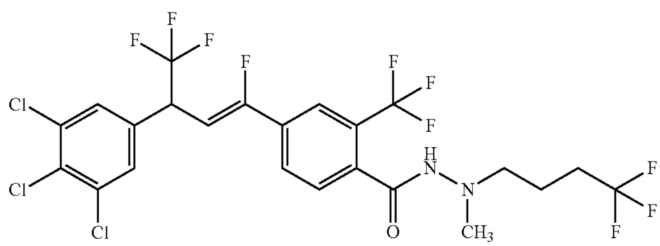 [SMILES: CN(CCCC(F)(F)F)NC(=O)c1ccc(/C(F)=C/C(c2cc(Cl)c(Cl)c(Cl)c2)C(F)(F)F)cc1C(F)(F)F] | 22 |
| F156 | 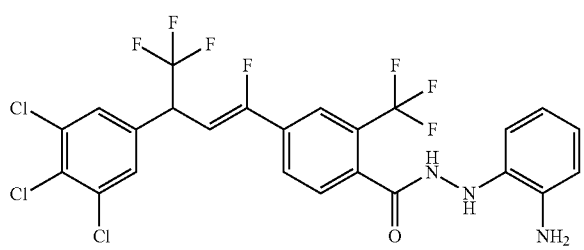 | 33 |
| F157 | 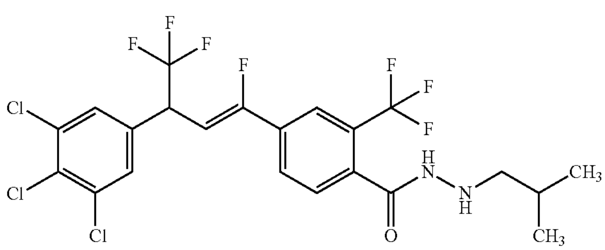 [SMILES: CC(C)CNNC(=O)c1ccc(/C(F)=C/C(c2cc(Cl)c(Cl)c(Cl)c2)C(F)(F)F)cc1C(F)(F)F] | 15 |
| F158 | 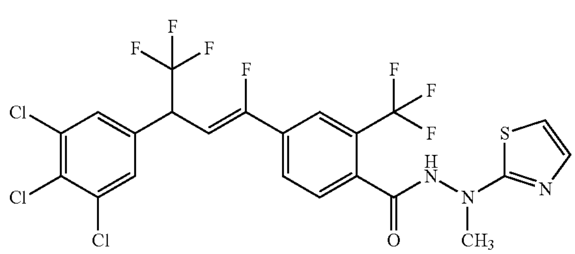 [SMILES: CN(NC(=O)c1ccc(/C(F)=C/C(c2cc(Cl)c(Cl)c(Cl)c2)C(F)(F)F)cc1C(F)(F)F)c1nccs1] | 23 |

TABLE 2-continued
| No. | Structure | Prep.* |
|---|---|---|
| F159 | 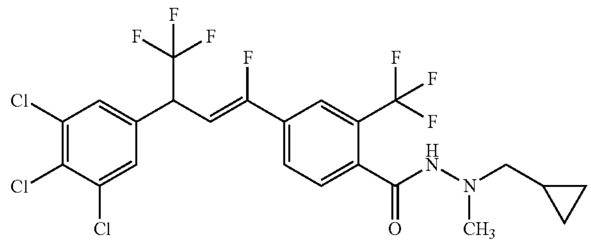 [SMILES: CN(CC1CC1)NC(=O)c1ccc(/C(F)=C/C(c2cc(Cl)c(Cl)c(Cl)c2)C(F)(F)F)cc1C(F)(F)F] | 22 |
| F160 | 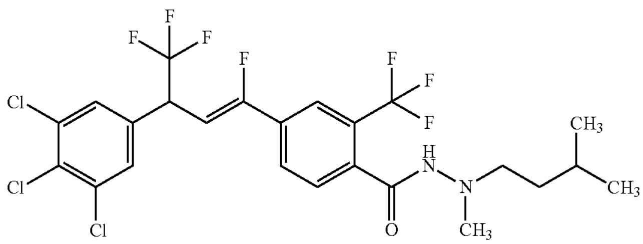 [SMILES: CC(C)CCN(C)NC(=O)c1ccc(/C(F)=C/C(c2cc(Cl)c(Cl)c(Cl)c2)C(F)(F)F)cc1C(F)(F)F] | 22 |
| F161 | 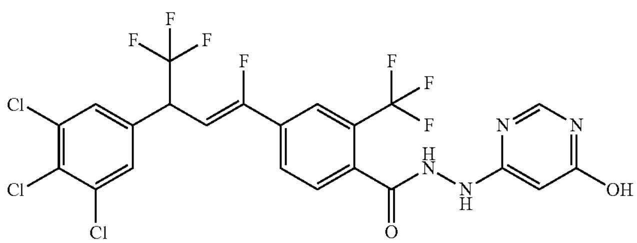 [SMILES: O=C(NNc1cc(O)ncn1)c1ccc(/C(F)=C/C(c2cc(Cl)c(Cl)c(Cl)c2)C(F)(F)F)cc1C(F)(F)F] | 16 |
| F162 | 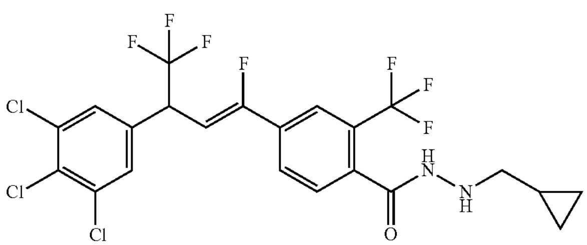 [SMILES: O=C(NNCC1CC1)c1ccc(/C(F)=C/C(c2cc(Cl)c(Cl)c(Cl)c2)C(F)(F)F)cc1C(F)(F)F] | 22 |
| F163 | 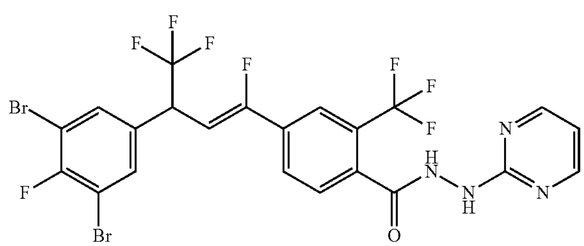 [SMILES: O=C(NNc1ncccn1)c1ccc(/C(F)=C/C(c2cc(Br)c(F)c(Br)c2)C(F)(F)F)cc1C(F)(F)F] | 15 |
| F164 | 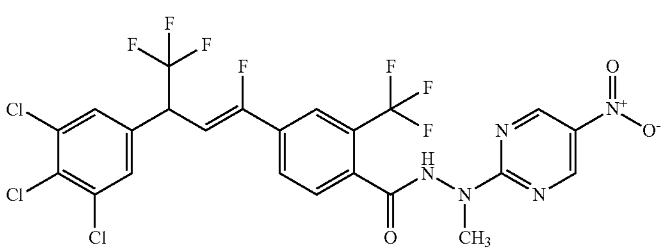 [SMILES: CN(NC(=O)c1ccc(/C(F)=C/C(c2cc(Cl)c(Cl)c(Cl)c2)C(F)(F)F)cc1C(F)(F)F)c1ncc([N+](=O)[O-])cn1] | 16 |
Structure and preparation method for F Series molecules TABLE 2-continued
Structure and preparation method for F Series molecules
| No. | Structure | Prep.* |
| --- | --- | --- |
| F165 | 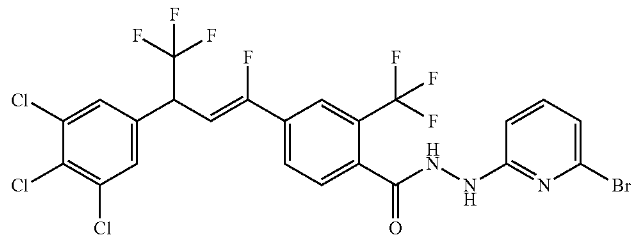 [SMILES: O=C(NNc1cccc(Br)n1)c1ccc(/C(F)=C/C(c2cc(Cl)c(Cl)c(Cl)c2)C(F)(F)F)cc1C(F)(F)F] | 16 |
| F166 | 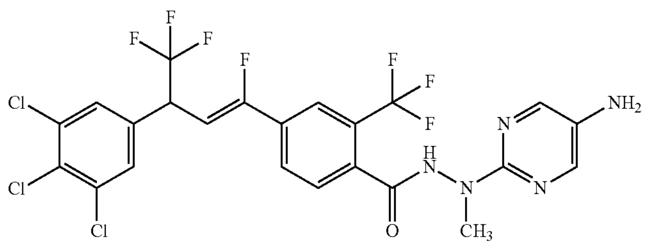 [SMILES: CN(NC(=O)c1ccc(/C(F)=C/C(c2cc(Cl)c(Cl)c(Cl)c2)C(F)(F)F)cc1C(F)(F)F)c1ncc(N)cn1] | 33 |
| F167 | 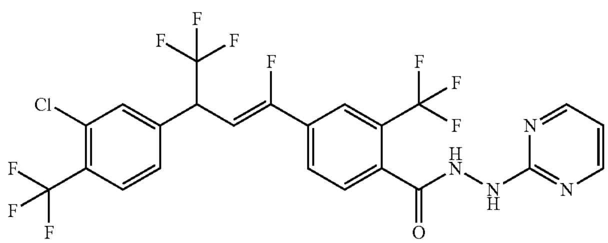 [SMILES: O=C(NNc1ncccn1)c1ccc(/C(F)=C/C(c2ccc(C(F)(F)F)c(Cl)c2)C(F)(F)F)cc1C(F)(F)F] | 15 |
| F168 | 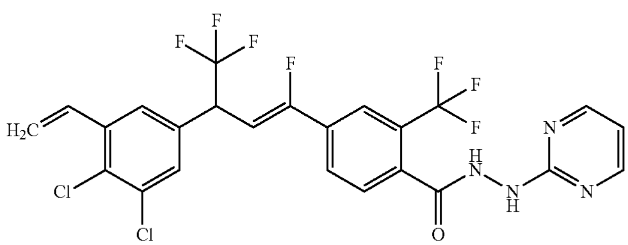 [SMILES: C=Cc1cc(C(/C=C(\F)c2ccc(C(=O)NNc3ncccn3)c(C(F)(F)F)c2)C(F)(F)F)cc(Cl)c1Cl] | 19 |
| F169 | 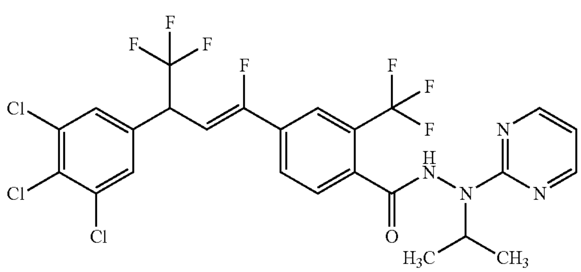 [SMILES: CC(C)N(NC(=O)c1ccc(/C(F)=C/C(c2cc(Cl)c(Cl)c(Cl)c2)C(F)(F)F)cc1C(F)(F)F)c1ncccn1] | 16 |
| F170 | 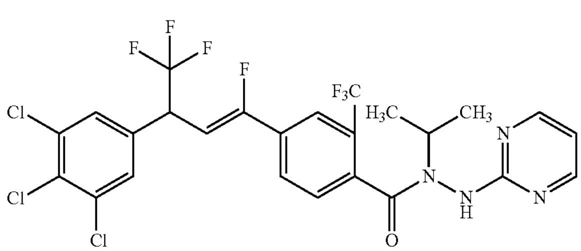 [SMILES: CC(C)N(Nc1ncccn1)C(=O)c1ccc(/C(F)=C/C(c2cc(Cl)c(Cl)c(Cl)c2)C(F)(F)F)cc1C(F)(F)F] | 16 |

TABLE 2-continued
Structure and preparation method for F Series molecules
| No. | Structure | Prep.* |
| --- | --- | --- |
| F171 | 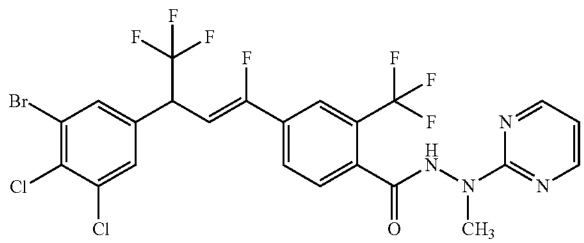 [SMILES: CN(NC(=O)c1ccc(/C(F)=C/C(c2cc(Cl)c(Cl)c(Br)c2)C(F)(F)F)cc1C(F)(F)F)c1ncccn1] | 18 |
| F172 | 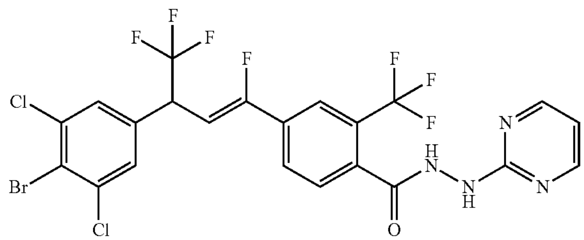 | 18 |
| F173 | 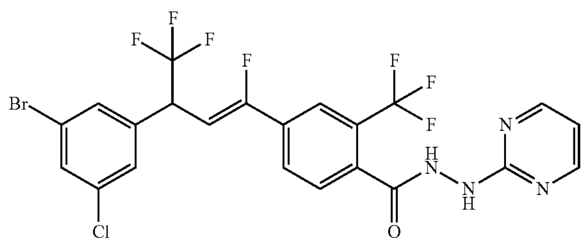 | 18 |
| F174 | 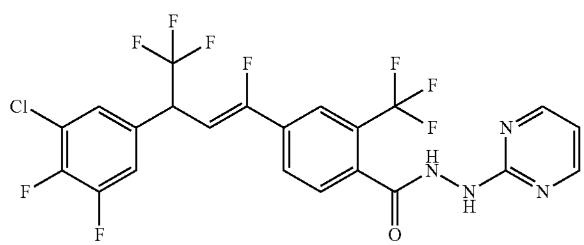 [SMILES: O=C(NNc1ncccn1)c1ccc(/C(F)=C/C(c2cc(F)c(F)c(Cl)c2)C(F)(F)F)cc1C(F)(F)F] | 18 |
| F175 | 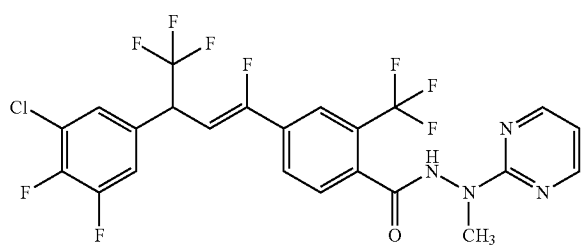 | 18 |
| F176 | 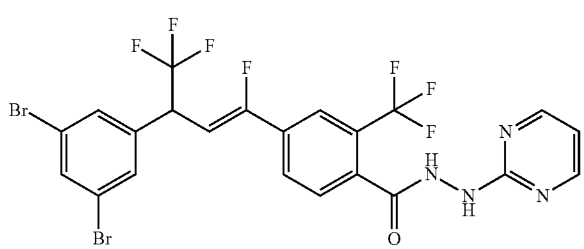 | 18 |

TABLE 2-continued
Structure and preparation method for F Series molecules
| No. | Structure | Prep.* |
| --- | --- | --- |
| F177 | 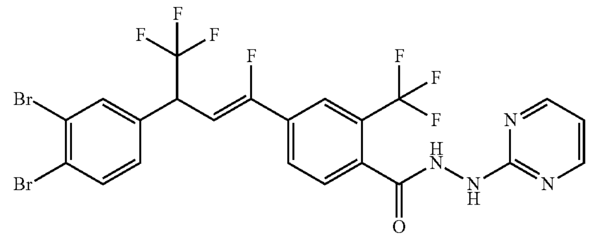 | 18 |
| F178 | 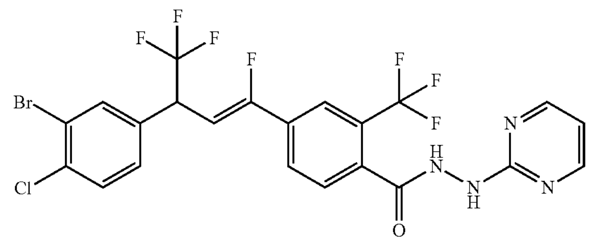 | 18 |
| F179 | 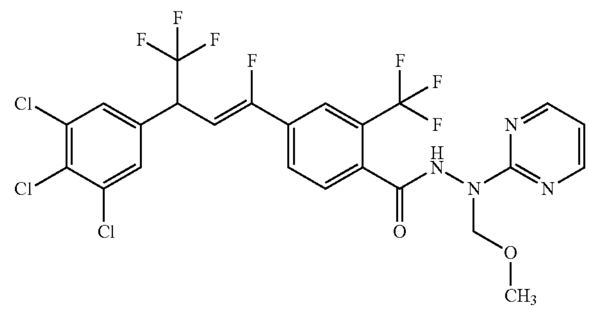 [SMILES: COCN(NC(=O)c1ccc(/C(F)=C/C(c2cc(Cl)c(Cl)c(Cl)c2)C(F)(F)F)cc1C(F)(F)F)c1ncccn1] | 21 |
| F180 | 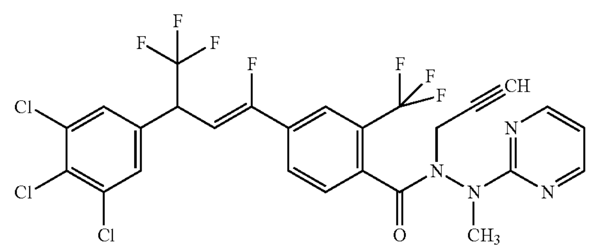 [SMILES: C#CCN(C(=O)c1ccc(/C(F)=C/C(c2cc(Cl)c(Cl)c(Cl)c2)C(F)(F)F)cc1C(F)(F)F)N(C)c1ncccn1] | 21 |
| F181 | 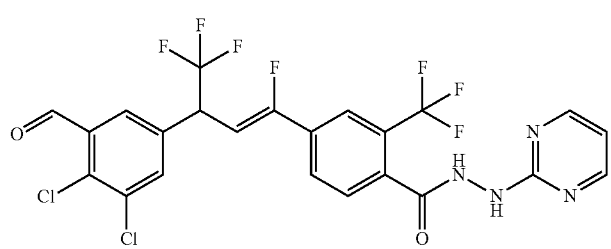 [SMILES: O=Cc1cc(C(/C=C(\F)c2ccc(C(=O)NNc3ncccn3)c(C(F)(F)F)c2)C(F)(F)F)cc(Cl)c1Cl] | 32 |
| F182 | 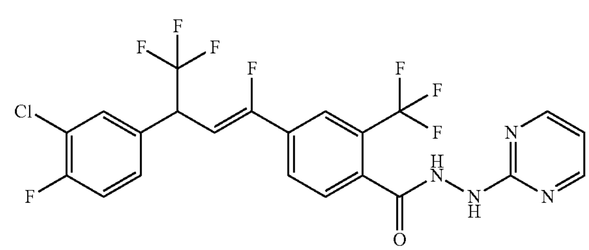 [SMILES: O=C(NNc1ncccn1)c1ccc(/C(F)=C/C(c2ccc(F)c(Cl)c2)C(F)(F)F)cc1C(F)(F)F] | 18 |

TABLE 2-continued
| Structure and preparation method for F Series molecules | | |
|---|---|---|
| No. | Structure | Prep.* |
| F183 | 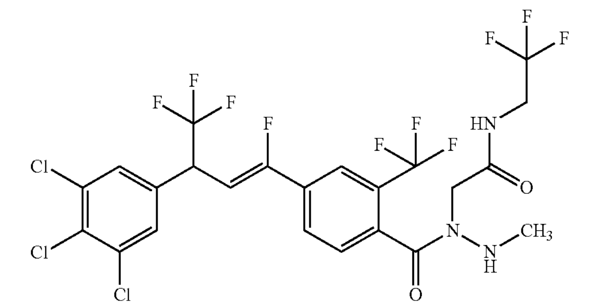 [SMILES: CNN(CC(=O)NCC(F)(F)F)C(=O)c1ccc(/C(F)=C/C(c2cc(Cl)c(Cl)c(Cl)c2)C(F)(F)F)cc1C(F)(F)F] | 25 |
| F184 | 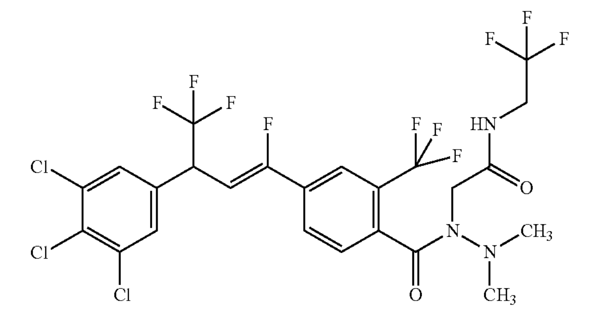 [SMILES: CN(C)N(CC(=O)NCC(F)(F)F)C(=O)c1ccc(/C(F)=C/C(c2cc(Cl)c(Cl)c(Cl)c2)C(F)(F)F)cc1C(F)(F)F] | 26 |
| F185 | 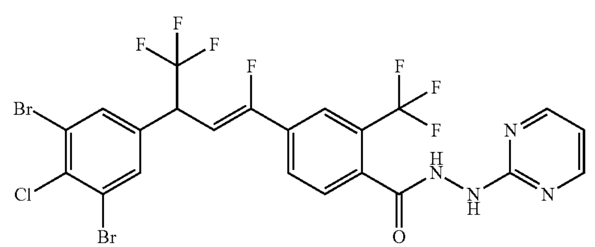 | 18 |
| F186 | 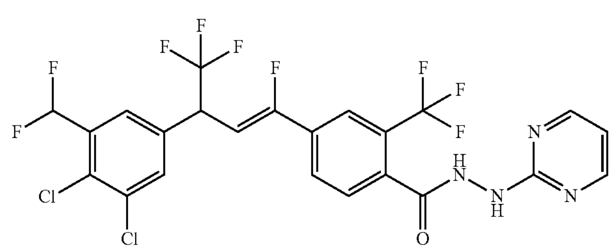 [SMILES: O=C(NNc1ncccn1)c1ccc(/C(F)=C/C(c2cc(Cl)c(Cl)c(C(F)F)c2)C(F)(F)F)cc1C(F)(F)F] | 16 |
| F187 | 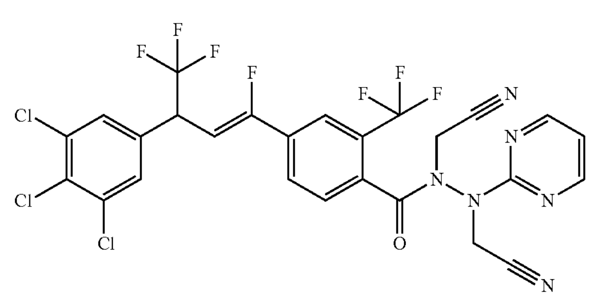 [SMILES: N#CCN(C(=O)c1ccc(/C(F)=C/C(c2cc(Cl)c(Cl)c(Cl)c2)C(F)(F)F)cc1C(F)(F)F)N(CC#N)c1ncccn1] | 27 |

TABLE 2-continued
Structure and preparation method for F Series molecules
| No. | Structure | Prep.* |
|---|---|---|
| F188 | 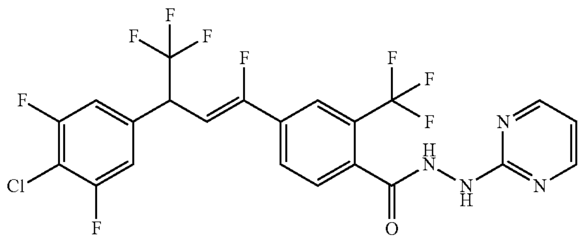 [SMILES: O=C(NNc1ncccn1)c1ccc(/C(F)=C/C(c2cc(F)c(Cl)c(F)c2)C(F)(F)F)cc1C(F)(F)F] | 18 |
| F189 | 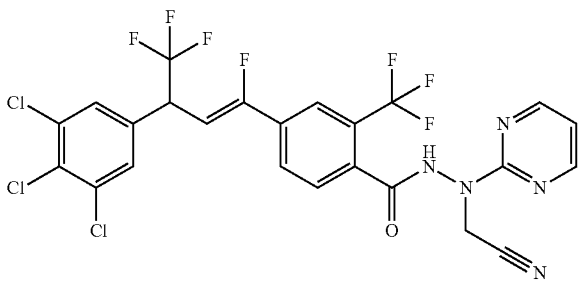 [SMILES: N#CCN(NC(=O)c1ccc(/C(F)=C/C(c2cc(Cl)c(Cl)c(Cl)c2)C(F)(F)F)cc1C(F)(F)F)c1ncccn1] | 28 |
| F190 | 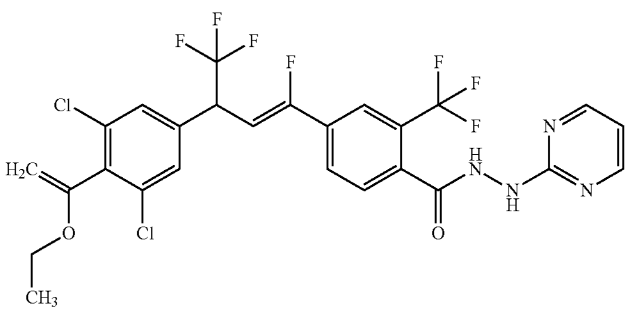 [SMILES: C=C(OCC)c1c(Cl)cc(C(/C=C(\F)c2ccc(C(=O)NNc3ncccn3)c(C(F)(F)F)c2)C(F)(F)F)cc1Cl] | 18 |
| F191 | 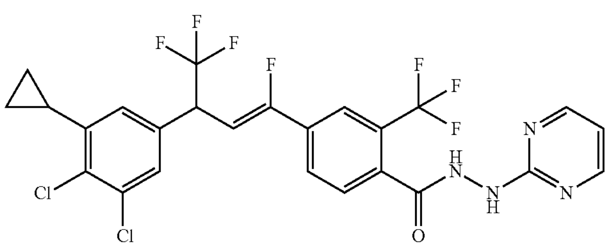 [SMILES: O=C(NNc1ncccn1)c1ccc(/C(F)=C/C(c2cc(Cl)c(Cl)c(C3CC3)c2)C(F)(F)F)cc1C(F)(F)F] | 18 |
| F192 | 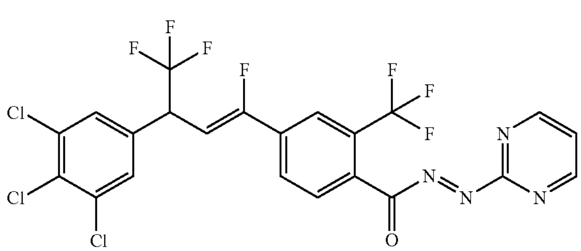 [SMILES: O=C(/N=N/c1ncccn1)c1ccc(/C(F)=C/C(c2cc(Cl)c(Cl)c(Cl)c2)C(F)(F)F)cc1C(F)(F)F] | 31 |
*prepared according to example number TABLE 3
| Structure and preparation method for C series molecules | | |
|---|---|---|
| No. | Structure | Prep.* |
| C1 | 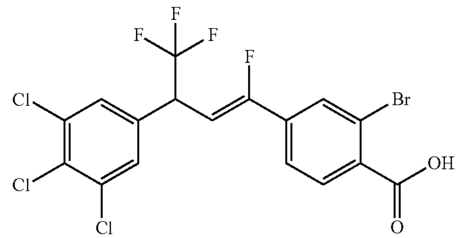 | 1 |
| C2 | 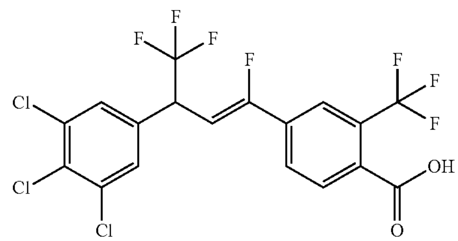 [SMILES: O=C(O)c1ccc(/C(F)=C/C(c2cc(Cl)c(Cl)c(Cl)c2)C(F)(F)F)cc1C(F)(F)F] | 1 |
| C3 | 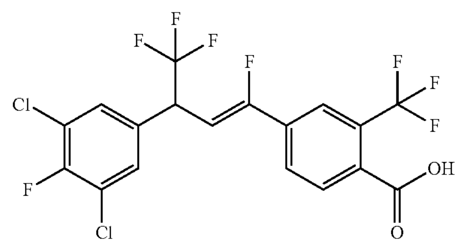 [SMILES: O=C(O)c1ccc(/C(F)=C/C(c2cc(Cl)c(F)c(Cl)c2)C(F)(F)F)cc1C(F)(F)F] | 1 |
| C4 | 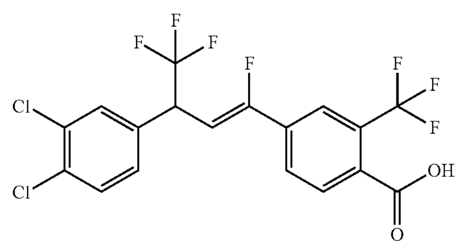 [SMILES: O=C(O)c1ccc(/C(F)=C/C(c2ccc(Cl)c(Cl)c2)C(F)(F)F)cc1C(F)(F)F] | 1 |
| C5 | 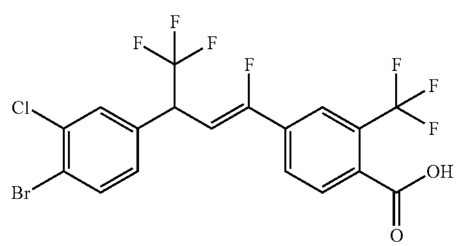 [SMILES: O=C(O)c1ccc(/C(F)=C/C(c2ccc(Br)c(Cl)c2)C(F)(F)F)cc1C(F)(F)F] | 1 |
| C6 | 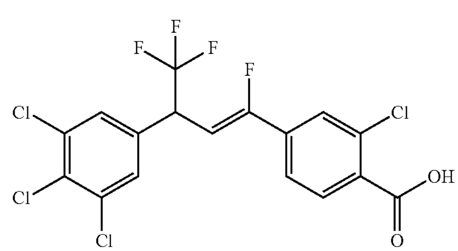 [SMILES: O=C(O)c1ccc(/C(F)=C/C(c2cc(Cl)c(Cl)c(Cl)c2)C(F)(F)F)cc1Cl] | 1 |

TABLE 3-continued
Structure and preparation method for C series molecules
| No. | Structure | Prep.* |
|---|---|---|
| C7 | 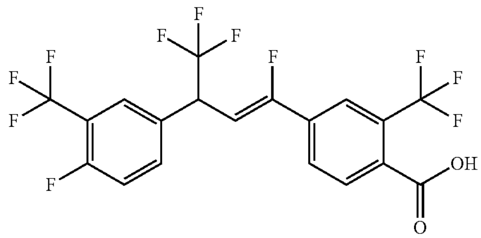 [SMILES: O=C(O)c1ccc(/C(F)=C/C(c2ccc(F)c(C(F)(F)F)c2)C(F)(F)F)cc1C(F)(F)F] | 1 |
| C8 | 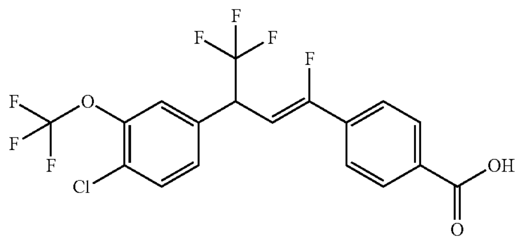 [SMILES: O=C(O)c1ccc(/C(F)=C/C(c2ccc(Cl)c(OC(F)(F)F)c2)C(F)(F)F)cc1] | 1 |
| C9 | 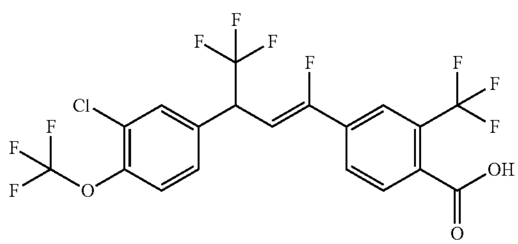 [SMILES: O=C(O)c1ccc(/C(F)=C/C(c2ccc(OC(F)(F)F)c(Cl)c2)C(F)(F)F)cc1C(F)(F)F] | 1 |
| C10 | 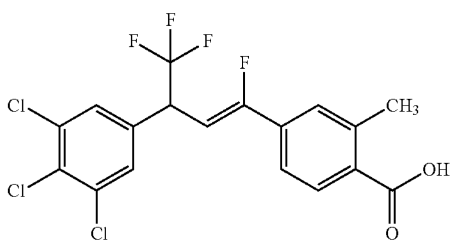 [SMILES: Cc1cc(/C(F)=C/C(c2cc(Cl)c(Cl)c(Cl)c2)C(F)(F)F)ccc1C(=O)O] | 1 |
| C11 | 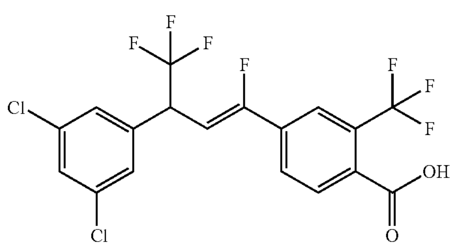 [SMILES: O=C(O)c1ccc(/C(F)=C/C(c2cc(Cl)cc(Cl)c2)C(F)(F)F)cc1C(F)(F)F] | 1 |
| C12 | 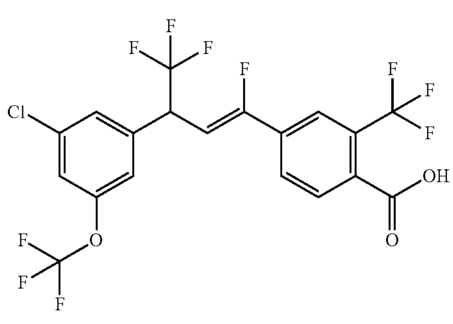 [SMILES: O=C(O)c1ccc(/C(F)=C/C(c2cc(Cl)cc(OC(F)(F)F)c2)C(F)(F)F)cc1C(F)(F)F] | 1 |

TABLE 3-continued
| Structure and preparation method for C series molecules | | |
|---|---|---|
| No. | Structure | Prep.* |
| C13 | 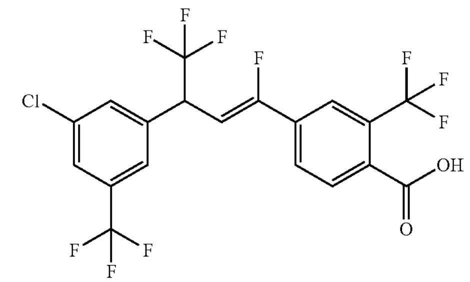 [SMILES: O=C(O)c1ccc(/C(F)=C/C(c2cc(Cl)cc(C(F)(F)F)c2)C(F)(F)F)cc1C(F)(F)F] | 1 |
| C14 | 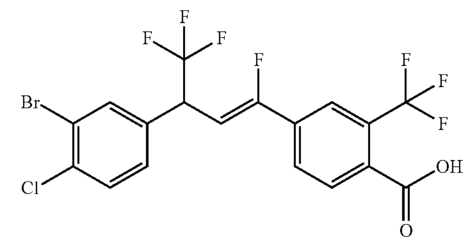 | 1 |
| C15 | 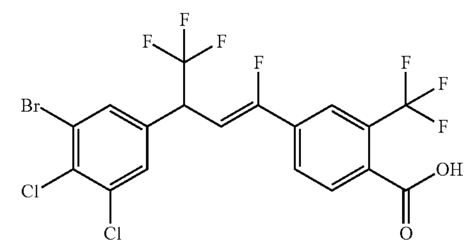 | 1 |
| C16 | 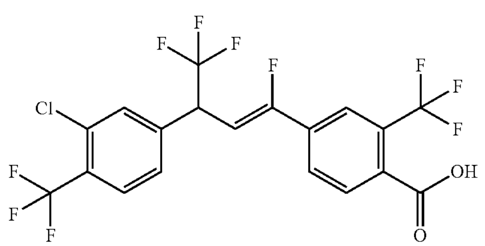 [SMILES: O=C(O)c1ccc(/C(F)=C/C(c2ccc(C(F)(F)F)c(Cl)c2)C(F)(F)F)cc1C(F)(F)F] | 1 |
| C17 | 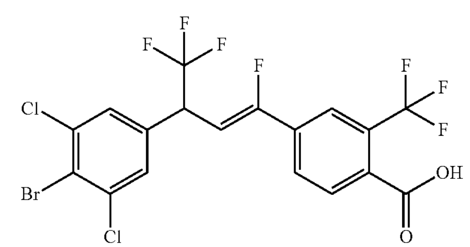 | 1 |
| C18 | 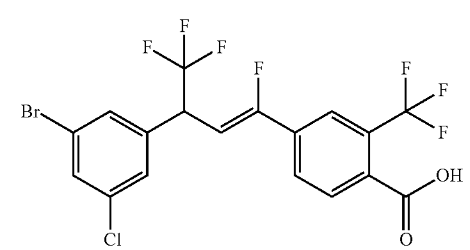 | 1 |

TABLE 3-continued
| Structure and preparation method for C series molecules | | |
|---|---|---|
| No. | Structure | Prep.* |
| C19 | 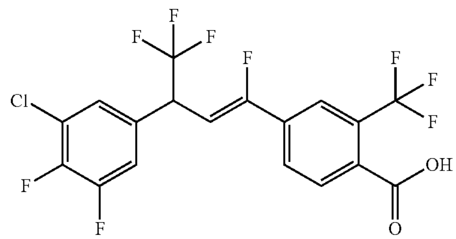 | 1 |
| C20 | 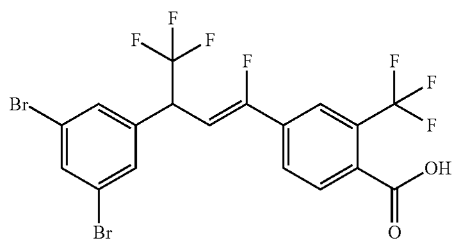 [SMILES: O=C(O)c1ccc(/C(F)=C/C(c2cc(Br)cc(Br)c2)C(F)(F)F)cc1C(F)(F)F] | 1 |
| C21 | 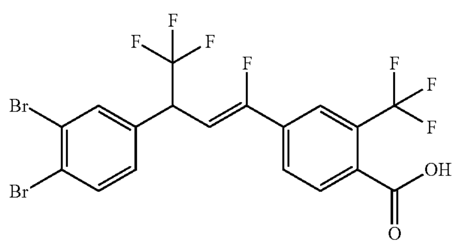 | 1 |
| C22 | 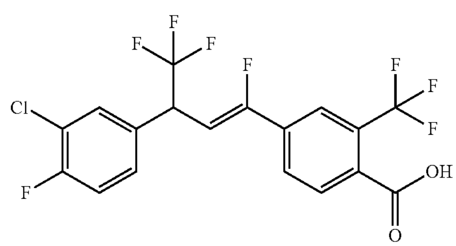 [SMILES: O=C(O)c1ccc(/C(F)=C/C(c2ccc(F)c(Cl)c2)C(F)(F)F)cc1C(F)(F)F] | 1 |
| C23 | 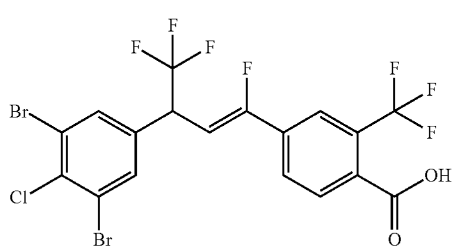 | 1 |
| C24 | 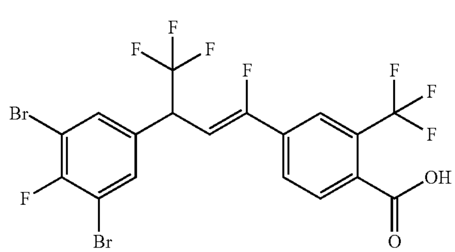 | 1 |

TABLE 3-continued
| Structure and preparation method for C series molecules | | |
|---|---|---|
| No. | Structure | Prep.* |
| C25 | 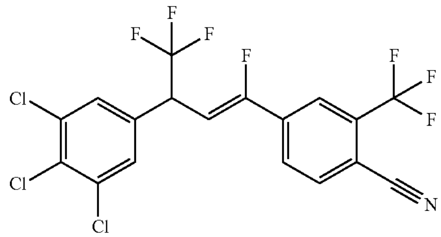 [SMILES: N#Cc1ccc(/C(F)=C/C(c2cc(Cl)c(Cl)c(Cl)c2)C(F)(F)F)cc1C(F)(F)F] | 1 |
| C26 | 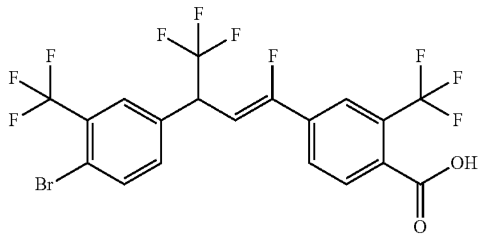 [SMILES: O=C(O)c1ccc(/C(F)=C/C(c2ccc(Br)c(C(F)(F)F)c2)C(F)(F)F)cc1C(F)(F)F] | 1 |
| C27 | 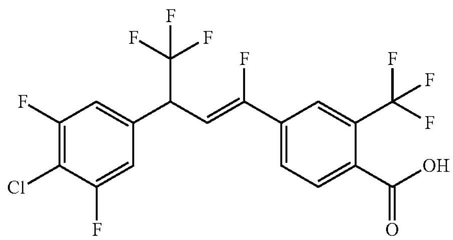 [SMILES: O=C(O)c1ccc(/C(F)=C/C(c2cc(F)c(Cl)c(F)c2)C(F)(F)F)cc1C(F)(F)F] | 1 |
| C28 | 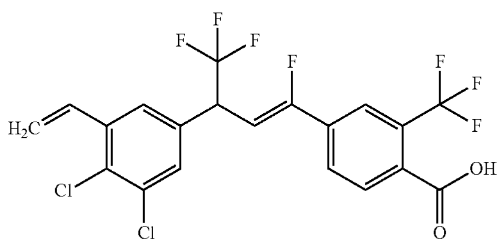 [SMILES: C=Cc1cc(C(/C=C(\F)c2ccc(C(=O)O)c(C(F)(F)F)c2)C(F)(F)F)cc(Cl)c1Cl] | 2 |
| C29 | 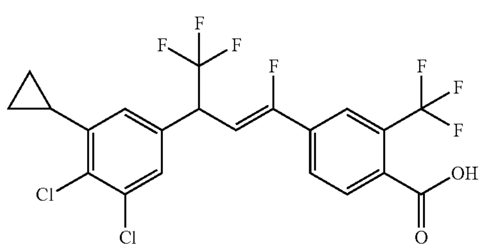 [SMILES: O=C(O)c1ccc(/C(F)=C/C(c2cc(Cl)c(Cl)c(C3CC3)c2)C(F)(F)F)cc1C(F)(F)F] | 2 |
| C30 | 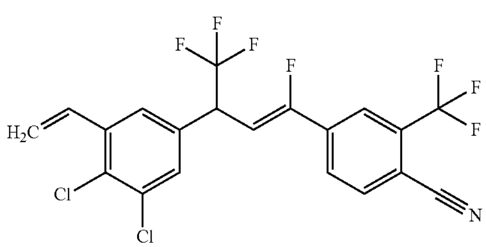 [SMILES: C=Cc1cc(C(/C=C(\F)c2ccc(C#N)c(C(F)(F)F)c2)C(F)(F)F)cc(Cl)c1Cl] | 2 |

TABLE 3-continued
| Structure and preparation method for C series molecules | | |
|---|---|---|
| No. | Structure | Prep.* |
| C31 | 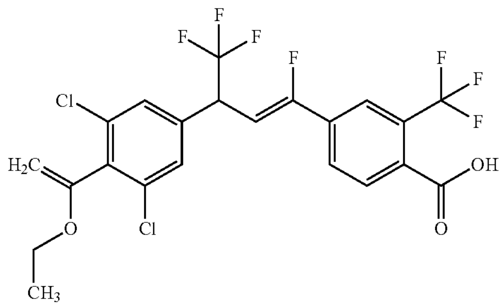 [SMILES: C=C(OCC)c1c(Cl)cc(C(/C=C(\F)c2ccc(C(=O)O)c(C(F)(F)F)c2)C(F)(F)F)cc1Cl] | 2 |
| C32 | 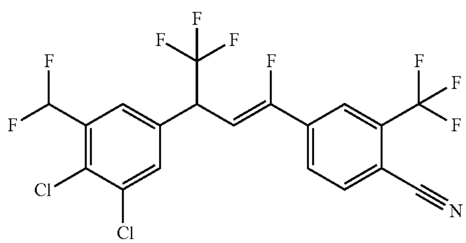 [SMILES: N#Cc1ccc(/C(F)=C/C(c2cc(Cl)c(Cl)c(C(F)F)c2)C(F)(F)F)cc1C(F)(F)F] | 3 |
| C33 | 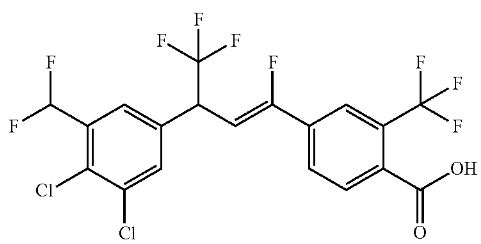 [SMILES: O=C(O)c1ccc(/C(F)=C/C(c2cc(Cl)c(Cl)c(C(F)F)c2)C(F)(F)F)cc1C(F)(F)F] | 4 |
| C34 | 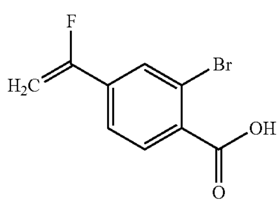 | 5 |
| C35 | 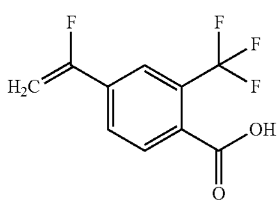 [SMILES: C=C(F)c1ccc(C(=O)O)c(C(F)(F)F)c1] | 5, 7 |
| C36 | 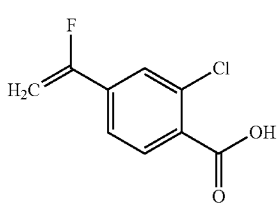 | 5 |

TABLE 3-continued
| Structure and preparation method for C series molecules | | |
|---|---|---|
| No. | Structure | Prep.* |
| C37 | 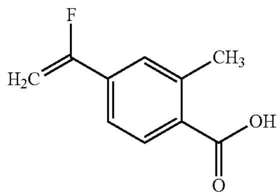 | 5, 7 |
| C38 | 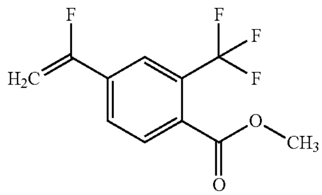 [SMILES: C=C(F)c1ccc(C(=O)OC)c(C(F)(F)F)c1] | 6 |
| C39 | 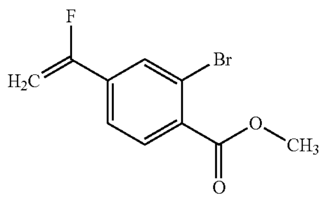 | 6 |
| C40 | 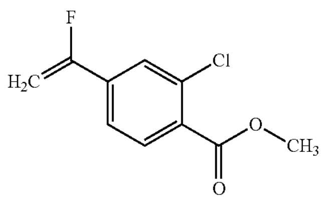 | 6 |
| C41 | 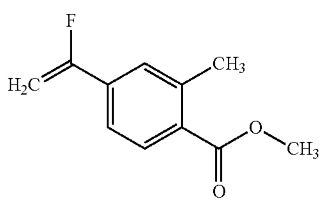 | 6 |
| C42 | 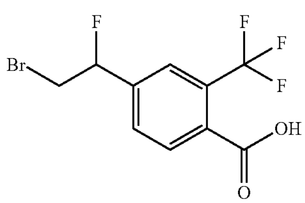 [SMILES: O=C(O)c1ccc(C(F)CBr)cc1C(F)(F)F] | 7 |
| C43 | 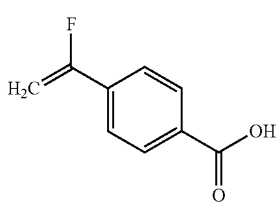 | 7 |

TABLE 3-continued
| Structure and preparation method for C series molecules | | |
|---|---|---|
| No. | Structure | Prep.* |
| C44 | 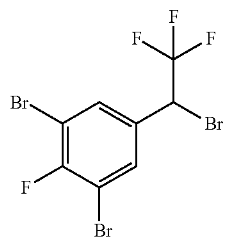 | 8 |
| C45 | 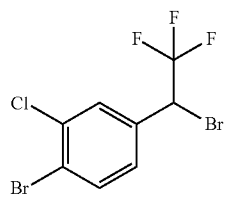 | 8 |
| C46 | 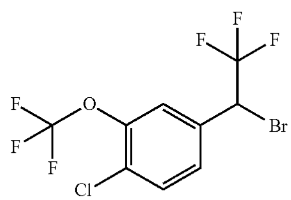 [SMILES: FC(F)(F)Oc1cc(C(Br)C(F)(F)F)ccc1Cl] | 8 |
| C47 | 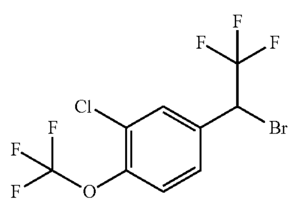 [SMILES: FC(F)(F)Oc1ccc(C(Br)C(F)(F)F)cc1Cl] | 8 |
| C48 | 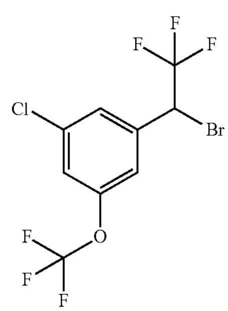 [SMILES: FC(F)(F)Oc1cc(Cl)cc(C(Br)C(F)(F)F)c1] | 8 |
| C49 | 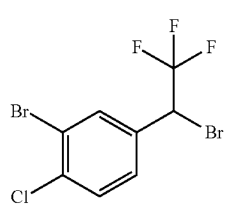 | 8 |

TABLE 3-continued
| Structure and preparation method for C series molecules | | |
|---|---|---|
| No. | Structure | Prep.* |
| C50 | 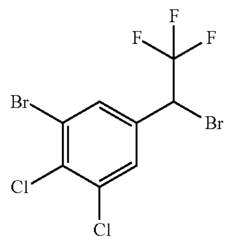 | 8 |
| C51 | 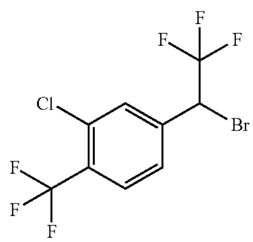 [SMILES: FC(F)(F)c1ccc(C(Br)C(F)(F)F)cc1Cl] | 8 |
| C52 | 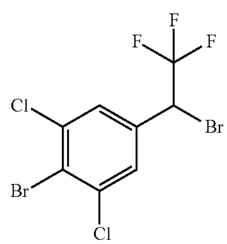 | 8 |
| C53 | 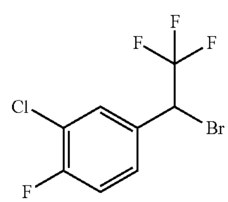 [SMILES: Fc1ccc(C(Br)C(F)(F)F)cc1Cl] | 8 |
| C54 | 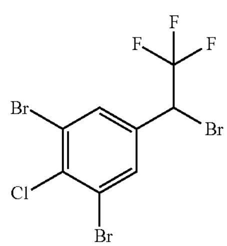 | 8 |
| C55 | 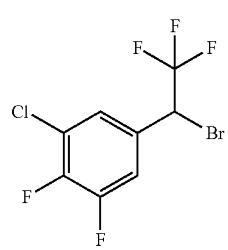 [SMILES: Fc1cc(C(Br)C(F)(F)F)cc(Cl)c1F] | 8 |

TABLE 3-continued
Structure and preparation method for C series molecules
| No. | Structure | Prep.* |
|---|---|---|
| C56 | 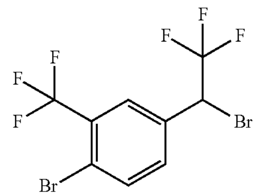 [SMILES: FC(F)(F)c1cc(C(Br)C(F)(F)F)ccc1Br] | 8 |
| C57 | 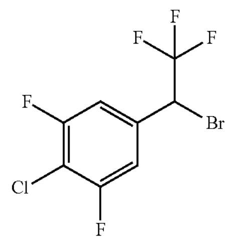 [SMILES: Fc1cc(C(Br)C(F)(F)F)cc(F)c1Cl] | 8 |
| C58 | 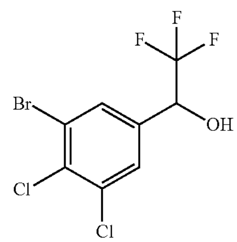 | 9 |
| C59 | 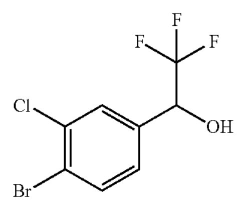 [SMILES: OC(c1ccc(Br)c(Cl)c1)C(F)(F)F] | 9 |
| C60 | 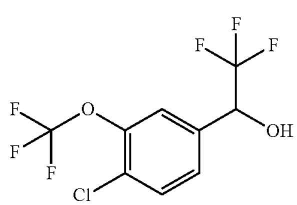 [SMILES: OC(c1ccc(Cl)c(OC(F)(F)F)c1)C(F)(F)F] | 9 |
| C61 | 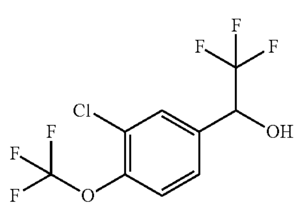 [SMILES: OC(c1ccc(OC(F)(F)F)c(Cl)c1)C(F)(F)F] | 9 |

TABLE 3-continued
| Structure and preparation method for C series molecules | | |
|---|---|---|
| No. | Structure | Prep.* |
| C62 | 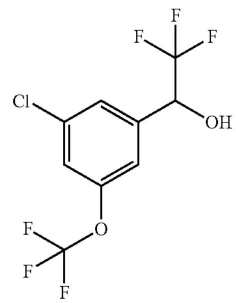 [SMILES: OC(c1cc(Cl)cc(OC(F)(F)F)c1)C(F)(F)F] | 10 |
| C63 | 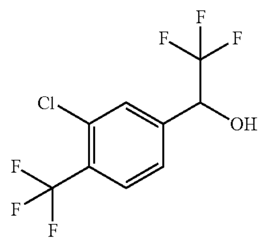 [SMILES: OC(c1ccc(C(F)(F)F)c(Cl)c1)C(F)(F)F] | 9 |
| C64 | 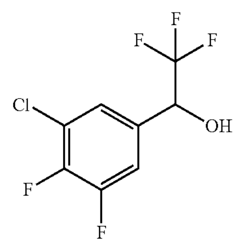 [SMILES: OC(c1cc(F)c(F)c(Cl)c1)C(F)(F)F] | 9 |
| C65 | 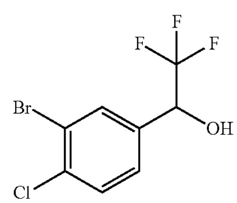 [SMILES: OC(c1ccc(Cl)c(Br)c1)C(F)(F)F] | 9 |
| C66 | 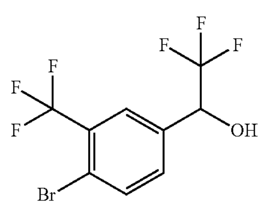 [SMILES: OC(c1ccc(Br)c(C(F)(F)F)c1)C(F)(F)F] | 9 |
| C67 | 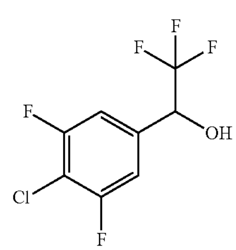 [SMILES: OC(c1cc(F)c(Cl)c(F)c1)C(F)(F)F] | 9 |

TABLE 3-continued
Structure and preparation method for C series molecules
| No. | Structure | Prep.* |
|---|---|---|
| C68 | 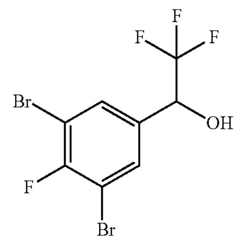 | 10 |
| C69 | 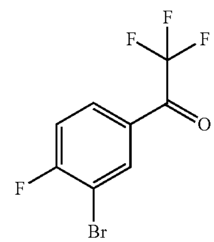 [SMILES: O=C(c1ccc(F)c(Br)c1)C(F)(F)F] | 11 |
| C70 | 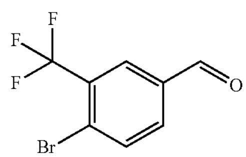 [SMILES: O=Cc1ccc(Br)c(C(F)(F)F)c1] | 12 |
| C71 | 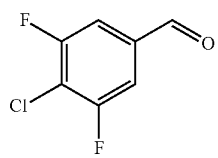 | 13 |
| C72 | 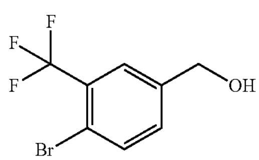 [SMILES: OCc1ccc(Br)c(C(F)(F)F)c1] | 14 |
| C73 | 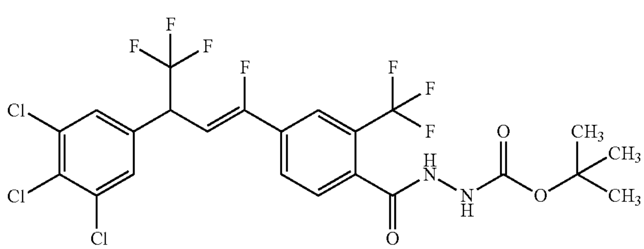 [SMILES: CC(C)(C)OC(=O)NNC(=O)c1ccc(/C(F)=C/C(c2cc(Cl)c(Cl)c(Cl)c2)C(F)(F)F)cc1C(F)(F)F] | 15 |
| C74 | 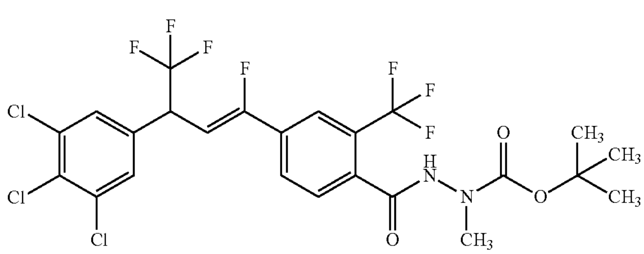 [SMILES: CN(NC(=O)c1ccc(/C(F)=C/C(c2cc(Cl)c(Cl)c(Cl)c2)C(F)(F)F)cc1C(F)(F)F)C(=O)OC(C)(C)C] | 15 |

TABLE 3-continued
| Structure and preparation method for C series molecules | | |
|---|---|---|
| No. | Structure | Prep.* |
| C75 | 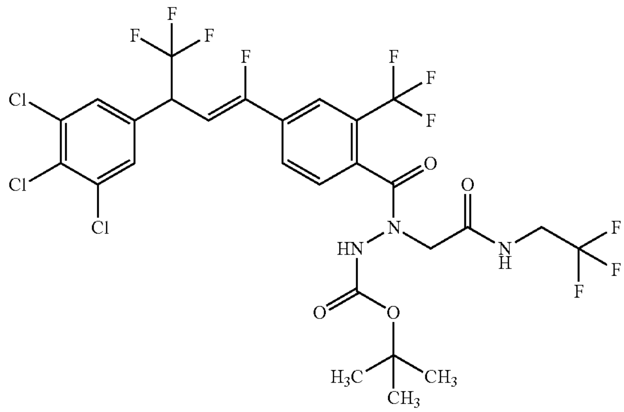 [SMILES: CC(C)(C)OC(=O)NN(CC(=O)NCC(F)(F)F)C(=O)c1ccc(/C(F)=C/C(c2cc(Cl)c(Cl)c(Cl)c2)C(F)(F)F)cc1C(F)(F)F] | 21 |
| C76 | 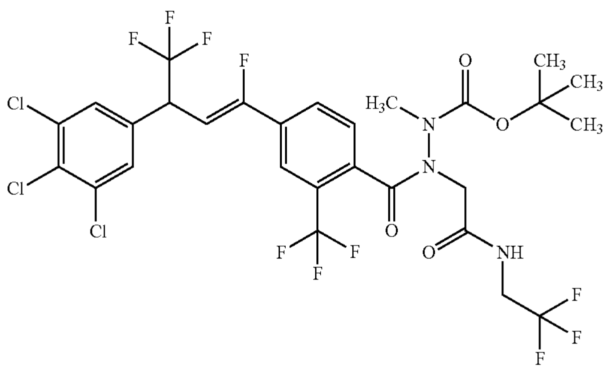 [SMILES: CN(C(=O)OC(C)(C)C)N(CC(=O)NCC(F)(F)F)C(=O)c1ccc(/C(F)=C/C(c2cc(Cl)c(Cl)c(Cl)c2)C(F)(F)F)cc1C(F)(F)F] | 21 |
| C77 | 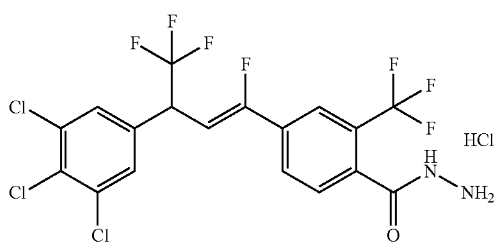 [SMILES: NNC(=O)c1ccc(/C(F)=C/C(c2cc(Cl)c(Cl)c(Cl)c2)C(F)(F)F)cc1C(F)(F)F ; Cl] | 29 |
| C78 | 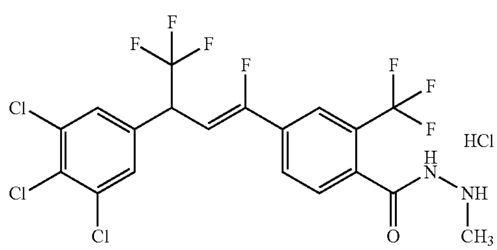 [SMILES: CNNC(=O)c1ccc(/C(F)=C/C(c2cc(Cl)c(Cl)c(Cl)c2)C(F)(F)F)cc1C(F)(F)F ; Cl] | 29 |
| C79 | 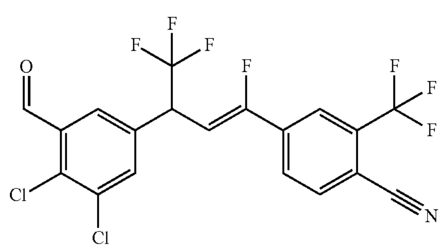 [SMILES: N#Cc1ccc(/C(F)=C/C(c2cc(Cl)c(Cl)c(C=O)c2)C(F)(F)F)cc1C(F)(F)F] | 32 |

TABLE 3-continued
| Structure and preparation method for C series molecules | | |
|---|---|---|
| No. | Structure | Prep.* |
| C80 | 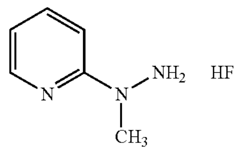 | 37 |
| C81 | 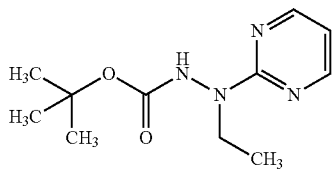 [SMILES: CCN(NC(=O)OC(C)(C)C)c1ncccn1] | 38 |
| C82 | 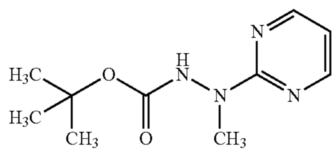 [SMILES: CN(NC(=O)OC(C)(C)C)c1ncccn1] | 38 |
| C83 | 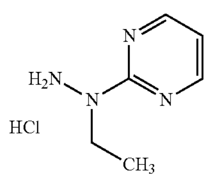 | 39 |
| C84 | 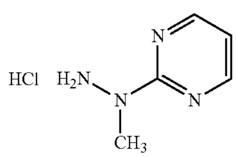 | 39, 47 |
| C85 | 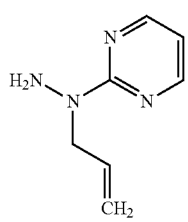 | 40 |
| C86 | 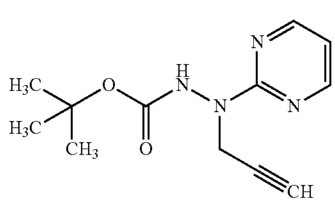 [SMILES: C#CCN(NC(=O)OC(C)(C)C)c1ncccn1] | 41 |
| C87 | 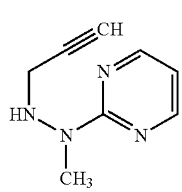 | 41 |

TABLE 3-continued
| Structure and preparation method for C series molecules | | |
|---|---|---|
| No. | Structure | Prep.* |
| C88 | 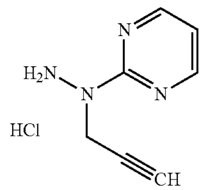 | 42 |
| C89 | 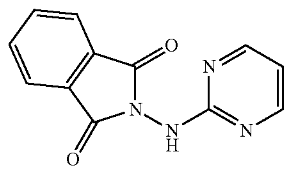 [SMILES: O=C1c2ccccc2C(=O)N1Nc1ncccn1] | 43 |
| C90 | 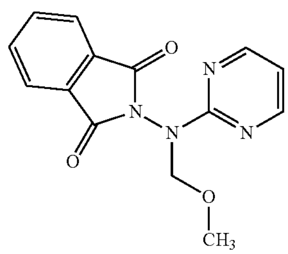 [SMILES: COCN(c1ncccn1)N1C(=O)c2ccccc2C1=O] | 44 |
| C91 | 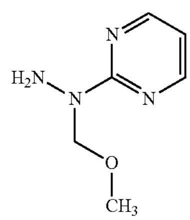 | 45 |
| C92 | 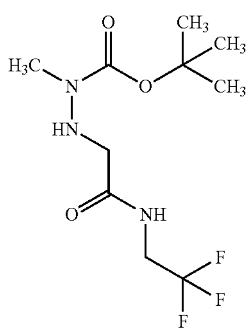 [SMILES: CN(NCC(=O)NCC(F)(F)F)C(=O)OC(C)(C)C] | 46 |
| C93 | 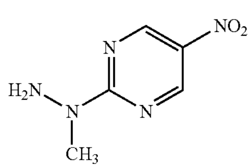 | 47 |
| C94 | 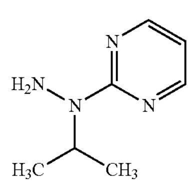 | 47 |

TABLE 3-continued
| Structure and preparation method for C series molecules | | |
|---|---|---|
| No. | Structure | Prep.* |
| C95 | 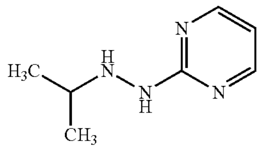 | 47 |
| C96 | 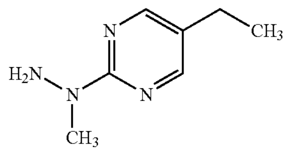 | 47 |
| C97 | 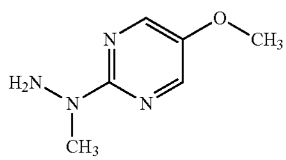 | 47 |
| C98 | 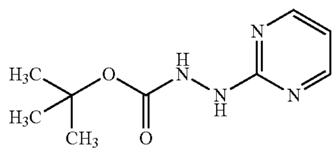 | 48 |
| C99 | 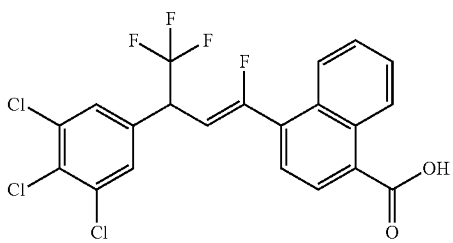 [SMILES: O=C(O)c1ccc(/C(F)=C/C(c2cc(Cl)c(Cl)c(Cl)c2)C(F)(F)F)c2ccccc12] | 1 |
| C100 | 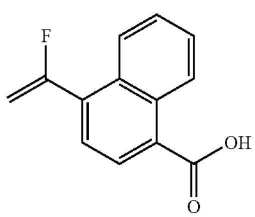 [SMILES: C=C(F)c1ccc(C(=O)O)c2ccccc12] | 7 |
| C101 | 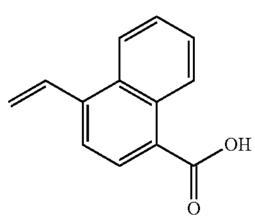 | 50 |
| C102 | 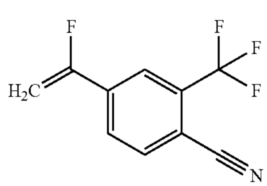 | 51 |
*prepared according to example number

TABLE 4

| Analytical data for molecules in Table 2 | | | | |
|---|---|---|---|---|
| No. | mp (° C.) | IR (thin film, $cm^{-1}$) | MASS SPEC | NMR ($^1$H, $^{13}$C, $^{19}$F) |
| F1 | | 3337, 2925, 1678, 807 | ESIMS m/z 637 ($[M + H]^+$) | $^1$H NMR (300 MHz, DMSO-$d_6$) δ 10.50 (s, 1H), 8.14-8.07 (m, 1H), 8.04 (s, 3H), 7.66 (d, J = 8.1 Hz, 1H), 7.46 (t, J = 2.1 Hz, 1H), 7.23-7.12 (m, 2H), 6.96-6.72 (m, 2H), 5.29-5.20 (m, 1H) |
| F2 | | 3246, 2930, 1689, 1175 | ESIMS m/z 587 ($[M + H]^+$) | $^1$H NMR (300 MHz, DMSO-$d_6$) δ 10.90 (s, 1H), 8.50 (d, J = 4.8 Hz, 2H), 8.13-8.10 (m, 1H), 8.01 (d, J = 6.0 Hz, 2H), 7.87 (d, J = 8.1 Hz, 2H), 6.90-6.75 (m, 2H), 5.27-5.21 (m, 1H), 3.37 (s, 3H) |
| F3 | | 3273, 2925, 1676, 1121, 772 | ESIMS m/z 653 ($[M + H]^+$) | $^1$H NMR (300 MHz, DMSO-$d_6$) δ 10.50 (s, 1H), 8.52 (d, J = 2.4 Hz, 1H), 8.20 (s, 1H), 8.13-8.00 (m, 3H), 7.79 (d, J = 8.1 Hz, 1H), 7.41 (t, J = 7.8 Hz, 1H), 7.11-6.98 (m, 3H), 6.92 (dd, J = 35.7, 10.5 Hz, 1H), 5.30 (t, J = 9.0 Hz, 1H) |
| F4 | | 3227, 2932, 1653, 1174 | ESIMS m/z 573 ($[M + H]^+$) | $^1$H NMR (400 MHz, DMSO-$d_6$) δ 10.38 (s, 1H), 9.23 (s, 1H), 8.43 (d, J = 4.4 Hz, 2H), 8.17 (s, 1H), 8.12 (d, J = 8.4 Hz, 1H), 8.43 (d, J = 6.4 Hz, 2H), 7.85 (d, J = 7.6 Hz, 1H), 6.86-6.75 (m, 2H), 5.26-5.21 (m, 1H) |
| F5 | | | ESIMS m/z 633 ($[M - H]^-$) | $^1$H NMR (400 MHz, $CDCl_3$) δ 8.35 (s, 1H), 8.15 (d, J = 5.8 Hz, 1H), 7.91 (s, 1H), 7.83 (dd, J = 8.0, 1.7 Hz, 1H), 7.76 (s, 1H), 7.64 (s, 1H), 7.45 (s, 2H), 6.35 (d, J = 5.8 Hz, 1H), 5.88 (dd, J = 32.5, 9.6 Hz, 1H), 4.62 (p, J = 8.8 Hz, 1H), 2.49 (s, 3H); $^{19}$F NMR (376 MHz, $CDCl_3$) δ −58.98, −69.29, −112.11 |
| F6 | | 3216, 1675, 1472 | ESIMS m/z 660 ($[M + H]^+$) | $^1$H NMR (400 MHz, $CDCl_3$) δ 8.19 (ddd, J = 5.0, 1.8, 0.9 Hz, 1H), 7.91 (s, 1H), 7.83 (d, J = 8.1 Hz, 1H), 7.78 (d, J = 8.1 Hz, 1H), 7.65-7.50 (m, 3H), 7.00 (s, 1H), 6.85 (ddd, J = 7.2, 5.0, 0.9 Hz, 1H), 6.78 (dt, J = 8.4, 0.9 Hz, 1H), 5.85 (dd, J = 32.5, 9.5 Hz, 1H), 4.61 (p, J = 9.1 Hz, 1H); $^{19}$F NMR (376 MHz, $CDCl_3$) δ −59.04, −69.46 (d, J = 2.4 Hz), −98.42, −112.11 (d, J = 2.8 Hz) |
| F7 | | | ESIMS m/z 741 ($[M - H]^-$) | $^1$H NMR (400 MHz, $CDCl_3$) δ 9.73 (s, 1H), 8.47 (s, 2H), 7.90 (s, 1H), 7.85 (d, J = 8.0 Hz, 1H), 7.59 (s, 1H), 7.51 (d, J = 8.1 Hz, 1H), 7.43 (s, 2H), 5.88 (dd, J = 32.4, 9.6 Hz, 1H), 4.61 (p, J = 8.7 Hz, 1H); $^{19}$F NMR (376 MHz, $CDCl_3$) δ −59.25, −62.45, −69.30, −112.21 |
| F8 | | 3427, 2925, 1682, 750 | ESIMS m/z 567 ($[M + H]^+$) | $^1$H NMR (400 MHz, DMSO-$d_6$) δ 10.85 (s, 1H), 8.50 (d, J = 4.8 Hz, 2H), 8.19 (s, 1H), 8.12 (d, J = 8.4 Hz, 1H), 8.06 (s, 1H), 7.85 (d, J = 8.4 Hz, 1H), 7.75-7.66 (m, 2H), 6.87-6.76 (m, 2H), 5.27-5.22 (m, 1H), 3.37 (s, 3H) |
| F9 | | 3210, 1679, 1601 | HRMS-ESI (m/z) $[M + H]^+$ calcd for $C_{23}H_{13}Cl_3F_7N_3O$, 586.0085; found, 586.0081 | $^1$H NMR (500 MHz, DMSO-$d_6$) δ 10.39 (s, 1H), 8.62-8.56 (m, 1H), 8.18 (d, J = 1.5 Hz, 1H), 8.11 (dt, J = 5.7, 1.5 Hz, 2H), 8.06 (s, 2H), 7.83 (d, J = 8.0 Hz, 1H), 7.57 (ddd, J = 8.8, 7.2, 2.0 Hz, 1H), 6.83 (dd, J = 35.7, 10.1 Hz, 1H), 6.76-6.73 (m, 1H), 6.69 (d, J = 8.4 Hz, 1H), 5.26 (p, J = 9.2 Hz, 1H); $^{19}$F NMR (471 MHz, DMSO-$d_6$) δ −57.73, −68.55 (d, J = 9.4 Hz), −113.64 (d, J = 35.8 Hz) |
| F10 | | 3182, 1700, 1533 | ESIMS m/z 560 ($[M + H]^+$) | $^1$H NMR (400 MHz, $CDCl_3$) δ 7.85 (s, 1H), 7.79 (s, 1H), 7.73-7.64 (m, 1H), 7.59 (d, J = 8.1 Hz, 1H), 7.44 |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^1H$, $^{13}C$, $^{19}F$) |
| | | | | (s, 2H), 7.08 (s, 1H), 6.89 (s, 1H), 5.84 (dd, J = 32.6, 9.6 Hz, 1H), 4.60 (p, J = 8.8 Hz, 1H); $^{19}F$ NMR (376 MHz, $CDCl_3$) δ −59.24, −69.31, −112.34 |
| F11 | | 3173, 2970, 1680, 1600, 1553, 1498 | HRMS-ESI (m/z) $[M + H]^+$ calcd for $C_{25}H_{16}Cl_3F_7N_2O$, 599.0289; found, 599.0290 | $^1H$ NMR (500 MHz, DMSO-$d_6$) δ 10.63 (s, 1H), 8.20 (d, J = 1.7 Hz, 1H), 8.09 (dd, J = 8.1, 1.7 Hz, 1H), 8.06 (s, 2H), 7.85 (d, J = 8.1 Hz, 1H), 7.29-7.19 (m, 2H), 6.95-6.76 (m, 4H), 5.26 (p, J = 9.4 Hz, 1H), 3.19 (s, 3H); $^{19}F$ NMR (471 MHz, DMSO-$d_6$) δ −57.76, −68.54 (d, J = 9.2 Hz), −113.62 (d, J = 35.9 Hz) |
| F12 | | | ESIMS m/z 631 ($[M − H]^-$) | $^1H$ NMR (500 MHz, $CDCl_3$) δ 8.53 (s, 1H), 8.07 (s, 2H), 7.86-7.79 (m, 1H), 7.77-7.67 (m, 2H), 7.45 (s, 2H), 5.83 (dd, J = 32.6, 9.6 Hz, 1H), 4.61 (q, J = 8.9 Hz, 1H), 3.80 (s, 3H), 3.47 (s, 3H); $^{19}F$ NMR (471 MHz, $CDCl_3$) δ −59.08, −69.32, −111.94 |
| F13 | | 3229, 1681, 1531 | ESIMS m/z 656 ($[M + H]^+$) | $^1H$ NMR (400 MHz, $CDCl_3$) δ 7.96-7.92 (m, 1H), 7.88 (d, J = 8.3 Hz, 1H), 7.81 (d, J = 8.1 Hz, 1H), 7.44 (s, 2H), 5.88 (dd, J = 32.5, 9.6 Hz, 1H), 4.62 (p, J = 8.8 Hz, 1H); $^{19}F$ NMR (376 MHz, $CDCl_3$) δ −59.07, −69.28 (d, J = 2.2 Hz), −112.08 (d, J = 2.6 Hz) |
| F14 | | 3249, 2934, 1679, 1117 | ESIMS m/z 617 ($[M + H]^+$) | $^1H$ NMR (300 MHz, DMSO-$d_6$) δ 8.17 (s, 1H), 8.05 (s, 3H), 7.79 (d, J = 8.1 Hz, 1H), 7.15 (d, J = 3.3 Hz, 1H), 6.94-6.75 (m, 6H), 5.29-5.20 (m, 1H), 3.84 (s, 3H) |
| F15 | | | ESIMS m/z 662 ($[M − H]^-$) | $^1H$ NMR (500 MHz, $CDCl_3$) δ 9.53 (d, J = 5.5 Hz, 1H), 8.00 (d, J = 5.5 Hz, 1H), 7.86 (d, J = 1.7 Hz, 1H), 7.75 (d, J = 1.7 Hz, 1H), 7.56 (d, J = 8.1 Hz, 1H), 7.44 (s, 2H), 7.05 (d, J = 1.1 Hz, 1H), 5.86 (dd, J = 32.6, 9.6 Hz, 1H), 4.62 (p, J = 8.9 Hz, 1H), 3.82 (s, 3H), 2.25 (d, J = 1.1 Hz, 3H); $^{19}F$ NMR (471 MHz, $CDCl_3$) δ −59.29, −67.61-−72.18 (m), −112.09 |
| F16 | | 3249, 2932, 1668, 845 | ESIMS m/z 597 ($[M + H]^+$) | $^1H$ NMR (400 MHz, DMSO-$d_6$) δ 10.37 (s, 1H), 9.22 (s, 1H), 8.43-8.42 (m, 2H), 8.18 (s, 1H), 8.12 (d, J = 7.6 Hz, 1H), 7.95 (s, 1H), 7.87-7.82 (m, 2H), 7.59-7.57 (m, 1H), 6.86-6.74 (m, 2H), 5.21-5.13 (m, 1H) |
| F17 | | | ESIMS m/z 600 ($[M − H]^-$) | $^1H$ NMR (400 MHz, $CDCl_3$) δ 8.37 (d, J = 4.8 Hz, 2H), 8.30 (s, 1H), 7.88-7.85 (m, 1H), 7.83 (d, J = 8.1 Hz, 1H), 7.77 (dd, J = 8.1, 1.6 Hz, 1H), 7.45 (s, 2H), 6.68 (t, J = 4.8 Hz, 1H), 5.84 (dd, J = 32.5, 9.6 Hz, 1H), 4.62 (p, J = 8.9 Hz, 1H), 3.53 (s, 3H); $^{19}F$ NMR (376 MHz, $CDCl_3$) δ −59.07, −69.33, −111.94 |
| F18 | | 3231, 1678, 1594, 1436 | ESIMS m/z 620 ($[M + H]^+$) | $^1H$ NMR (400 MHz, $CDCl_3$) δ 8.04 (d, J = 3.8 Hz, 1H), 7.90 (s, 1H), 7.86-7.78 (m, 2H), 7.51 (t, J = 7.8 Hz, 1H), 7.44 (s, 2H), 7.11 (d, J = 3.6 Hz, 1H), 6.85 (d, J = 7.5 Hz, 1H), 6.67 (d, J = 8.0 Hz, 1H), 5.86 (dd, J = 32.5, 9.6 Hz, 1H), 4.62 (p, J = 8.8 Hz, 1H); $^{19}F$ NMR (376 MHz, $CDCl_3$) δ −59.05, −69.30 (d, J = 2.1 Hz), −112.03 (d, J = 2.6 Hz) |
| F19 | | | ESIMS m/z 586 ($[M − H]^-$) | $^1H$ NMR (400 MHz, $CDCl_3$) δ 11.96 (s, 1H), 11.47 (d, J = 10.8 Hz, 1H), 8.01 |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^1H$, $^{13}C$, $^{19}F$) |
| | | | | (s, 1H), 7.94 (d, J = 1.6 Hz, 1H), 7.86 (dd, J = 8.1, 1.7 Hz, 1H), 7.75 (d, J = 8.1 Hz, 1H), 7.51-7.46 (m, 1H), 7.45 (s, 2H), 6.02-5.75 (m, 2H), 4.63 (p, J = 8.8 Hz, 1H); $^{19}F$ NMR (376 MHz, $CDCl_3$) δ −59.08, −69.31, −112.07 |
| F20 | | 3378, 1515, 1116 | ESIMS m/z 553 ([M + H]$^+$) | $^1H$ NMR (300 MHz, DMSO-$d_6$) δ 10.31 (s, 1H), 9.20 (s, 1H), 8.36 (s, 2H), 8.05 (s, 2H), 7.91 (s, 1H), 7.72-7.63 (m, 2H), 6.71-6.59 (m, 2H), 5.25-5.19 (m, 1H) |
| F21 | | | ESIMS m/z 767 ([M − H]$^-$) | $^1H$ NMR (500 MHz, $CDCl_3$) δ 8.06 (d, J = 3.1 Hz, 1H), 7.99-7.87 (m, 1H), 7.87-7.75 (m, 1H), 7.66 (d, J = 8.1 Hz, 1H), 7.44 (s, 2H), 7.29 (d, J = 3.1 Hz, 1H), 5.88 (ddd, J = 32.5, 9.6, 3.5 Hz, 1H), 4.61 (p, J = 8.8 Hz, 1H), 3.41 (s, 3H); $^{19}F$ NMR (471 MHz, $CDCl_3$) δ −59.11, −69.30, −109.92-−114.19 (m) |
| F26 | | | HRMS-ESI (m/z) [M + H]$^+$ calcd for $C_{24}H_{12}Cl_3F_9N_2O$, 620.9944; found, 620.9936 | $^1H$ NMR (500 MHz, DMSO-$d_6$) δ 10.45 (s, 1H), 8.21-8.15 (m, 1H), 8.09 (dd, J = 8.0, 1.7 Hz, 1H), 8.06 (s, 2H), 7.89 (d, J = 1.5 Hz, 1H), 7.77 (d, J = 8.1 Hz, 1H), 7.19 (ddd, J = 11.7, 8.9, 2.7 Hz, 1H), 7.01-6.89 (m, 2H), 6.84 (dd, J = 35.7, 10.1 Hz, 1H), 5.26 (p, J = 9.4 Hz, 1H); $^{19}F$ NMR (471 MHz, DMSO-$d_6$) δ −57.71, −68.56 (d, J = 9.4 Hz), −113.68 (d, J = 35.5 Hz), −123.40 (q, J = 7.8 Hz), −128.18 (t, J = 10.6 Hz) |
| F27 | | 3326, 1713, 1599 | ESIMS m/z 591 ([M + H]$^+$) | $^1H$ NMR (400 MHz, Acetone-$d_6$) δ 8.22 (s, 1H), 8.18 (dd, J = 8.2, 1.7 Hz, 1H), 7.97 (d, J = 8.2 Hz, 1H), 7.91 (s, 2H), 6.76 (dd, J = 34.3, 9.9 Hz, 1H), 5.34 (d, J = 5.4 Hz, 2H), 5.15 (p, J = 9.2 Hz, 1H), 3.75 (dd, J = 5.8 Hz, 4H), 2.14 (td, J = 6.5, 3.2 Hz, 2H), 2.06 (p, J = 2.2 Hz, 1H) |
| F28 | | 1677, 1498 | HRMS-ESI (m/z) [M + H]$^+$ calcd for $C_{24}H_{13}Cl_3F_8N_2O$, 603.0038; found, 603.0041 | $^1H$ NMR (500 MHz, DMSO-$d_6$) δ 10.43 (s, 1H), 8.22-8.18 (m, 1H), 8.10 (dd, J = 8.1, 1.7 Hz, 1H), 8.06 (s, 2H), 7.93 (d, J = 1.7 Hz, 1H), 7.78 (d, J = 8.1 Hz, 1H), 7.12 (ddd, J = 12.1, 8.1, 1.4 Hz, 1H), 7.05 (td, J = 7.7, 1.3 Hz, 1H), 6.93 (ddd, J = 9.2, 8.1, 1.6 Hz, 1H), 6.90-6.74 (m, 2H), 5.27 (p, J = 9.4 Hz, 1H); $^{19}F$ NMR (471 MHz, DMSO-$d_6$) δ −57.70, −68.56 (d, J = 9.1 Hz), −113.68 (d, J = 35.6 Hz), −132.76 (ddd, J = 12.8, 8.9, 4.9 Hz) |
| F29 | | | ESIMS m/z 600 ([M − H]$^-$) | $^1H$ NMR (400 MHz, $CDCl_3$) δ 8.37 (d, J = 4.8 Hz, 2H), 8.30 (s, 1H), 7.88-7.85 (m, 1H), 7.83 (d, J = 8.1 Hz, 1H), 7.77 (dd, J = 8.1, 1.6 Hz, 1H), 7.45 (s, 2H), 6.68 (t, J = 4.8 Hz, 1H), 5.84 (dd, J = 32.5, 9.6 Hz, 1H), 4.62 (p, J = 8.9 Hz, 1H), 3.53 (s, 3H); $^{19}F$ NMR (376 MHz, $CDCl_3$) δ −59.07, −69.33, −111.94 |
| F30 | | | ESIMS m/z 691 ([M − H]$^-$) | $^1H$ NMR (500 MHz, $CDCl_3$) δ 8.18 (s, 1H), 8.04 (d, J = 3.7 Hz, 1H), 7.94-7.85 (m, 1H), 7.83 (dd, J = 8.1, 1.7 Hz, 1H), 7.65 (d, J = 8.1 Hz, 1H), 7.44 (s, 2H), 7.11 (d, J = 3.7 Hz, 1H), 5.88 (dd, J = 32.5, 9.6 Hz, 1H), 4.79-4.41 (m, 1H); $^{19}F$ NMR (471 MHz, $CDCl_3$) δ −59.17, −69.31, −112.12 |
| F31 | | | ESIMS m/z 585 ([M − H]$^-$) | $^1H$ NMR (400 MHz, $CDCl_3$) δ 8.69 (s, 1H), 8.65 (s, 1H), 8.37 (s, 2H), 7.88 (s, 1H), 7.79 (d, J = 8.2 Hz, 1H), |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^1H$, $^{13}C$, $^{19}F$) |
| | | | | 7.65 (d, J = 8.2 Hz, 1H), 7.45 (s, 2H), 6.78 (s, 1H), 5.89 (dd, J = 32.6, 9.5 Hz, 1H), 4.61 (p, J = 8.7 Hz, 1H); $^{19}F$ NMR (376 MHz, $CDCl_3$) δ −59.03, −69.29, −112.26 |
| F32 | | 3229, 2932, 1654, 1171 | ESIMS m/z 571 ($[M + H]^+$) | $^1H$ NMR (300 MHz, DMSO-$d_6$) δ 10.30 (s, 1H), 9.23 (s, 1H), 8.43 (d, J = 4.5 Hz, 2H), 8.17-8.05 (m, 4H), 7.85 (d, J = 8.1 Hz, 1H), 7.71-7.60 (m, 1H), 6.96-6.72 (m, 2H), 5.36-5.30 (m, 1H) |
| F33 | | | ESIMS m/z 587 ($[M - H]^-$) | $^1H$ NMR (400 MHz, $CDCl_3$) δ 8.09 (d, J = 8.6 Hz, 1H), 7.97 (br s, 2H), 7.89 (d, J = 1.7 Hz, 1H), 7.83 (dd, J = 8.1, 1.7 Hz, 1H), 7.53-7.51 (m, 1H), 7.49 (d, J = 8.2 Hz, 1H), 7.45 (s, 2H), 6.87 (dd, J = 8.6, 2.6 Hz, 1H), 5.87 (dd, J = 32.6, 9.6 Hz, 1H), 4.63 (p, J = 8.8 Hz, 1H); $^{19}F$ NMR (376 MHz, $CDCl_3$) δ −60.14, −69.33, −112.14 |
| F34 | | 3237, 1712, 1678, 1616, 1456 | ESIMS m/z 604 ($[M + H]^+$) | $^1H$ NMR (400 MHz, $CDCl_3$) δ 8.09 (d, J = 3.9 Hz, 1H), 7.90 (s, 1H), 7.85-7.77 (m, 2H), 7.63 (dd, J = 7.9 Hz, 1H), 7.44 (s, 2H), 7.14 (d, J = 3.9 Hz, 1H), 6.61 (dd, J = 7.9, 2.0 Hz, 1H), 6.41 (dd, J = 7.9, 2.3 Hz, 1H), 5.86 (dd, J = 32.5, 9.6 Hz, 1H), 4.62 (p, J = 8.9 Hz, 1H); $^{19}F$ NMR (376 MHz, $CDCl_3$) δ −59.08, −69.30 (d, J = 2.3 Hz), −69.65, −112.04 (d, J = 2.6 Hz) |
| F35 | | 3212, 2972, 1677, 1553, 1494 | HRMS-ESI (m/z) $[M + H]^+$ calcd for $C_{25}H_{15}Cl_3F_8N_2O$, 617.0195; found, 617.0207 | $^1H$ NMR (500 MHz, DMSO-$d_6$) δ 10.46-10.32 (m, 1H), 8.22-8.17 (m, 1H), 8.10 (dd, J = 8.0, 1.8 Hz, 1H), 8.06 (s, 2H), 7.78 (d, J = 8.1 Hz, 1H), 7.29 (s, 1H), 6.99-6.74 (m, 4H), 5.26 (p, J = 9.5 Hz, 1H), 2.22 (s, 3H); $^{19}F$ NMR (471 MHz, DMSO-$d_6$) δ −57.68, −68.56 (d, J = 9.4 Hz), −113.69 (d, J = 35.8 Hz), −126.26 (dt, J = 9.2, 5.1 Hz) |
| F37 | | 3234, 2929, 1675, 847 | ESIMS m/z 533 ($[M + H]^+$) | $^1H$ NMR (300 MHz, DMSO-$d_6$) δ 10.13 (s, 1H), 9.09 (s, 1H), 8.41 (d, J = 4.8 Hz, 2H), 8.04 (s, 2H), 7.67-7.51 (m, 3H), 6.80 (t, J = 4.8 Hz, 1H), 6.62 (dd, J = 10.5, 36.0 Hz, 1H), 5.23-5.17 (m, 1H), 2.50 (s, 3H) |
| F38 | | 3198, 3031, 1666, 1553 | ESIMS m/z 597 ($[M + H]^+$) | $^1H$ NMR (400 MHz, $CDCl_3$) δ 10.27 (s, 1H), 7.94-7.87 (m, 2H), 7.83 (dd, J = 8.1, 1.8 Hz, 1H), 7.59 (d, J = 8.1 Hz, 1H), 7.47 (s, 2H), 7.45-7.37 (m, 3H), 7.35-7.28 (m, 2H), 5.87 (dd, J = 32.6, 9.6 Hz, 1H), 4.64 (p, J = 9.0 Hz, 1H); $^{19}F$ NMR (376 MHz, $CDCl_3$) δ −59.90, −69.27 (d, J = 2.1 Hz), −111.95 (d, J = 2.8 Hz) |
| F39 | | 3431, 2920, 1699, 764 | ESIMS m/z 645 ($[M + H]^+$) | $^1H$ NMR (400 MHz, DMSO-$d_6$) δ 10.85 (s, 1H), 8.50 (d, J = 4.4 Hz, 2H), 8.19 (s, 1H), 8.16 (s, 1H), 8.13 (d, J = 7.6 Hz, 1H), 8.02 (d, J = 8.4 Hz, 1H), 7.92 (d, J = 6.8 Hz, 1H), 7.85 (d, J = 8.0 Hz, 1H), 7.62 (t, J = 4.4 Hz, 1H), 6.85-6.81 (m, 1H), 5.35-5.32 (m, 1H), 3.37 (s, 3H) |
| F40 | | | ESIMS m/z 565 ($[M + H]^+$) | $^1H$ NMR (500 MHz, $CDCl_3$) δ 7.88 (d, J = 1.7 Hz, 1H), 7.79 (dd, J = 8.0, 1.7 Hz, 1H), 7.62 (d, J = 8.1 Hz, 1H), 7.43 (s, 2H), 7.01 (s, 1H), 5.83 (dd, J = 32.5, 9.6 Hz, 1H), 4.90 (s, 1H), 4.61 (p, J = 8.9 Hz, 1H), 1.18 (s, 9H); |

TABLE 4-continued

Analytical data for molecules in Table 2

| No. | mp (° C.) | IR (thin film, $cm^{-1}$) | MASS SPEC | NMR ($^1H$, $^{13}C$, $^{19}F$) |
|---|---|---|---|---|
| | | | | $^{19}F$ NMR (471 MHz, $CDCl_3$) δ −59.08, −69.32 (d, J = 8.6 Hz), −111.95 (d, J = 32.7 Hz) |
| F41 | | | ESIMS m/z 630 ($[M - H]^-$) | $^1H$ NMR (500 MHz, $CDCl_3$) δ 8.82 (s, 1H), 8.15 (s, 2H), 7.79 (d, J = 1.7 Hz, 1H), 7.72 (d, J = 8.0 Hz, 1H), 7.68 (dd, J = 8.1, 1.7 Hz, 1H), 7.45 (s, 2H), 5.81 (dd, J = 32.5, 9.6 Hz, 1H), 4.61 (q, J = 8.9 Hz, 1H), 3.49 (s, 3H), 2.45 (q, J = 7.6 Hz, 2H), 1.18 (t, J = 7.6 Hz, 3H); $^{19}F$ NMR (471 MHz, $CDCl_3$) δ −59.11, −69.31, −111.92 |
| F42 | | 3219, 1679, 1582, 1490 | ESIMS m/z 603 ($[M + H]^+$) | $^1H$ NMR (400 MHz, $CDCl_3$) δ 8.91 (s, 2H), 8.38 (d, J = 4.9 Hz, 2H), 7.85-7.81 (m, 1H), 7.75-7.71 (m, 2H), 7.52 (d, J = 8.3 Hz, 1H), 7.41-7.36 (m, 2H), 6.78 (t, J = 4.9 Hz, 1H), 5.86 (dd, J = 32.7, 9.6 Hz, 1H), 4.67 (p, J = 8.8 Hz, 1H); $^{19}F$ NMR (376 MHz, $CDCl_3$) δ −57.86, −59.20, −69.52 (d, J = 2.2 Hz), −112.48 (d, J = 2.5 Hz) |
| F43 | | 3430, 2920, 1682, 750 | ESIMS m/z 567 ($[M + H]^+$) | $^1H$ NMR (300 MHz, DMSO-$d_6$) δ 10.89 (s, 1H), 8.49-8.48 (m, 2H), 8.04-7.99 (m, 3H), 7.80-7.67 (m, 2H), 6.83 (t, J = 4.8 Hz, 1H), 6.79 (dd, J = 35.7, 10.2 Hz, 1H), 5.26-5.20 (m, 1H), 3.40 (s, 3H) |
| F44 | | | ESIMS m/z 654 ($[M - H]^-$) | $^1H$ NMR (500 MHz, $CDCl_3$) δ 8.65 (s, 2H), 8.59 (d, J = 4.9 Hz, 1H), 7.87-7.81 (m, 1H), 7.83-7.68 (m, 2H), 7.45 (s, 2H), 7.04 (d, J = 4.9 Hz, 1H), 5.87 (dd, J = 32.6, 9.6 Hz, 1H), 4.62 (p, J = 8.8 Hz, 1H); $^{19}F$ NMR (471 MHz, $CDCl_3$) δ −59.41, −69.40 (d, J = 8.9 Hz), −70.62, −112.26 |
| F45 | | 1652, 1472 | ESIMS m/z 659 ($[M + H]^+$) | $^1H$ NMR (400 MHz, $CDCl_3$) δ 7.73-7.68 (m, 1H), 7.56 (d, J = 4.6 Hz, 1H), 7.51 (dd, J = 5.9, 2.7 Hz, 2H), 7.45 (dd, J = 8.2, 1.8 Hz, 1H), 7.25-7.18 (m, 3H), 7.18-7.11 (m, 2H), 7.11-7.02 (m, 2H), 5.68 (dd, J = 32.6, 9.7 Hz, 1H), 4.58-4.49 (m, 1H); $^{19}F$ NMR (376 MHz, $CDCl_3$) δ −59.34, −69.50, −98.63, −112.36 (d, J = 2.7 Hz) |
| F48 | | 3143, 1710, 1401 | ESIMS m/z 561 ($[M + H]^+$) | $^1H$ NMR (400 MHz, $CDCl_3$) δ 8.36 (s, 2H), 7.88 (s, 1H), 7.82 (s, 2H), 7.72-7.63 (m, 1H), 7.45 (s, 2H), 5.91 (dd, J = 32.6, 9.6 Hz, 1H), 4.60 (p, J = 8.8 Hz, 1H) |
| F49 | | | ESIMS m/z 591 ($[M - H]^-$) | $^1H$ NMR (400 MHz, $CDCl_3$) δ 7.87 (d, J = 1.6 Hz, 1H), 7.79 (dd, J = 8.1, 1.7 Hz, 1H), 7.62 (d, J = 5.7 Hz, 1H), 7.56 (d, J = 8.0 Hz, 1H), 7.44 (s, 2H), 5.85 (dd, J = 32.5, 9.6 Hz, 1H), 5.02 (q, J = 4.8 Hz, 1H), 4.61 (p, J = 8.9 Hz, 1H), 3.53 (qd, J = 9.1, 3.8 Hz, 2H); $^{19}F$ NMR (376 MHz, $CDCl_3$) δ −59.21, −69.33, −71.71, −112.11 |
| F50 | | 3217, 1679, 1582, 1496 | ESIMS m/z 603 ($[M + H]^+$) | $^1H$ NMR (400 MHz, $CDCl_3$) δ 8.44 (d, J = 4.8 Hz, 2H), 8.13 (s, 1H), 7.90 (s, 1H), 7.87-7.79 (m, 3H), 7.53 (d, J = 7.9 Hz, 1H), 7.36 (s, 2H), 6.91-6.80 (m, 1H), 5.88 (dd, J = 32.6, 9.7 Hz, 1H), 4.68 (p, J = 9.2 Hz, 1H); $^{19}F$ NMR (376 MHz, $CDCl_3$) δ −57.81, −59.16, −69.38 (d, J = 2.4 Hz), −112.60 (d, J = 2.2 Hz) |
| F51 | | 3235, 1711, 1682 | ESIMS m/z 559 ($[M + H]^+$) | $^1H$ NMR (400 MHz, $CDCl_3$) δ 8.34 (s, 1H), 7.92 (s, 1H), 7.85 (d, J = 7.7 |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^{1}H$, $^{13}C$, $^{19}F$) |
| | | | | Hz, 1H), 7.74 (d, J = 8.1 Hz, 1H), 7.44 (s, 2H), 6.76 (t, J = 2.2 Hz, 2H), 6.24 (t, J = 2.3 Hz, 2H), 5.87 (dd, J = 32.4, 9.6 Hz, 1H), 4.61 (h, J = 8.5 Hz, 1H); $^{19}F$ NMR (376 MHz, $CDCl_3$) δ −58.79, −69.27 (d, J = 2.3 Hz), −111.69-−112.33 (m) |
| F52 | | 3247, 1673, 1507 | HRMS-ESI (m/z) $[M + H]^+$ calcd for $C_{24}H_{13}Cl_3F_8N_2O$, 603.0038; found, 603.0031 | $^{1}H$ NMR (500 MHz, DMSO-$d_6$) δ 10.45-10.35 (m, 1H), 8.20-8.17 (m, 1H), 8.08 (dd, J = 8.0, 1.7 Hz, 1H), 8.06 (s, 2H), 8.02 (s, 1H), 7.79 (d, J = 8.1 Hz, 1H), 7.08-7.01 (m, 2H), 6.91-6.78 (m, 3H), 5.26 (p, J = 9.5 Hz, 1H); $^{19}F$ NMR (471 MHz, DMSO-$d_6$) δ −57.75, −68.55 (d, J = 9.0 Hz), −113.67 (d, J = 35.9 Hz), −126.17 (tt, J = 8.8, 4.6 Hz) |
| F54 | | 3282, 1666, 1332, 807 | ESIMS m/z 599 ($[M + H]^+$) | $^{1}H$ NMR (300 MHz, DMSO-$d_6$) δ 9.97 (d, J = 5.4 Hz, 1H), 8.09 (d, J = 13.5 Hz 1H), 8.04 (s, 3H), 7.49 (d, J = 8.1 Hz, 1H), 7.39-7.37 (m, 5H), 6.85 (dd, J = 40.3, 10.5 Hz, 1H), 5.56 (d, J = 5.1 Hz, 1H), 5.26-5.20 (m, 1H), 3.99 (d, J = 4.2 Hz, 2H) |
| F55 | | 3240, 2926, 1681, 1173 | ESIMS m/z 549 ($[M + H]^+$) | $^{1}H$ NMR (300 MHz, DMSO-$d_6$) δ 10.50 (s, 1H), 8.47 (d, J = 4.8 Hz, 2H), 8.03 (s, 2H), 7.68-7.55 (m, 3H), 6.81 (t, J = 4.8 Hz, 1H), 6.63 (dd, J = 10.2, 36.0 Hz, 1H), 5.23-5.17 (m, 1H), 3.40 (s, 3H), 2.50 (s, 3H) |
| F56 | | 3421, 2924, 1682, 764 | ESIMS m/z 553 ($[M + H]^+$) | $^{1}H$ NMR (300 MHz, DMSO-$d_6$) δ 10.34 (s, 1H), 9.29 (s, 1H), 8.43 (d, J = 4.8 Hz, 2H), 8.18 (s, 1H), 8.13 (d, J = 8.1 Hz, 1H), 7.95 (s, 1H), 7.82 (s, 2H), 7.69 (t, J = 2.1 Hz, 1H), 6.90-6.74 (m, 2H), 5.32-5.16 (m, 1H) |
| F57 | | | ESIMS m/z 587 ($[M - H]^-$] | $^{1}H$ NMR (400 MHz, $CDCl_3$) δ 8.50 (s, 2H), 7.97 (s, 5H), 7.87 (s, 1H), 7.80 (d, J = 8.0 Hz, 1H), 7.49 (s, 2H), 5.95 (dd, J = 32.9, 9.6 Hz, 1H), 4.65 (p, J = 8.9 Hz, 1H); $^{19}F$ NMR (376 MHz, $CDCl_3$) δ −69.42, −73.87, −112.48 |
| F58 | | 3227, 1683, 1554, 1517 | ESIMS m/z 622 ($[M + H]^+$) | $^{1}H$ NMR (400 MHz, $CDCl_3$) δ 8.58 (s, 1H), 8.21 (s, 1H), 8.05 (d, J = 12.2 Hz, 1H), 7.93 (s, 1H), 7.85 (d, J = 10.8 Hz, 2H), 7.44 (s, 2H), 5.88 (dd, J = 32.5, 9.6 Hz, 1H), 4.62 (p, J = 8.8 Hz, 1H); $^{19}F$ NMR (376 MHz, $CDCl_3$) δ −59.10 (d, J = 13.0 Hz), −69.29 (d, J = 2.2 Hz), −112.05 |
| F59 | | 3170, 2971, 1685, 1595 | HRMS-ESI (m/z) $[M + H]^+$ calcd for $C_{24}H_{15}Cl_3F_7N_3O$, 600.0242; found, 600.0241 | $^{1}H$ NMR (500 MHz, DMSO-$d_6$) δ 10.80 (s, 1H), 8.21 (d, J = 1.7 Hz, 1H), 8.18 (ddd, J = 5.0, 1.9, 0.9 Hz, 1H), 8.11 (dd, J = 8.1, 1.7 Hz, 1H), 8.06 (s, 2H), 7.91 (d, J = 8.1 Hz, 1H), 7.61 (ddd, J = 8.8, 7.1, 1.9 Hz, 1H), 6.92-6.80 (m, 2H), 6.76 (ddd, J = 7.2, 4.9, 0.9 Hz, 1H), 5.27 (p, J = 9.4 Hz, 1H), 3.31 (s, 3H); $^{19}F$ NMR (471 MHz, DMSO-$d_6$) δ −57.76, −68.53 (d, J = 9.4 Hz), −113.62 (d, J = 35.7 Hz) |
| F60 | | 3197, 1657, 1596, 1486 | ESIMS m/z 616 ($[M + H]^+$) | $^{1}H$ NMR (400 MHz, $CDCl_3$) δ 8.25-8.19 (m, 1H), 7.92 (d, J = 9.7 Hz, 2H), 7.83 (dd, J = 8.0, 1.8 Hz, 1H), 7.79 (d, J = 8.1 Hz, 1H), 7.60-7.51 (m, 2H), 7.38 (s, 1H), 7.32 (dd, J = 8.4, 2.1 Hz, 1H), 6.84-6.76 (m, 2H), 5.88 (dd, J = 32.6, 9.6 Hz, 1H), 4.69 (p, J = 8.9 Hz, 1H), 3.46 (s, 3H); $^{19}F$ NMR (376 MHz, $CDCl_3$) |

TABLE 4-continued

Analytical data for molecules in Table 2

| No. | mp (° C.) | IR (thin film, $cm^{-1}$) | MASS SPEC | NMR ($^1H$, $^{13}C$, $^{19}F$) |
|---|---|---|---|---|
| | | | | δ −57.84, −58.83, −69.51 (d, J = 2.5 Hz), −112.25 (d, J = 2.7 Hz) |
| F61 | | 3192, 1676, 1596 | ESIMS m/z 616 ($[M + H]^+$) | $^1H$ NMR (400 MHz, $CDCl_3$) δ 8.21 (ddd, J = 5.0, 1.9, 0.9 Hz, 1H), 8.07 (s, 1H), 7.90 (d, J = 1.6 Hz, 1H), 7.84-7.75 (m, 2H), 7.56 (ddd, J = 8.8, 7.2, 1.9 Hz, 1H), 7.36 (d, J = 1.8 Hz, 1H), 7.28 (dt, J = 2.2, 1.1 Hz, 1H), 7.18 (s, 1H), 6.83-6.76 (m, 2H), 5.86 (dd, J = 32.5, 9.6 Hz, 1H), 4.68 (p, J = 8.8 Hz, 1H), 3.45 (s, 3H); $^{19}F$ NMR (376 MHz, $CDCl_3$) δ −57.93, −58.84, −69.26, −112.11 (d, J = 2.7 Hz) |
| F62 | | 3135, 1711, 1533 | ESIMS m/z 561 ($[M + H]^+$) | $^1H$ NMR (400 MHz, $CDCl_3$) δ 7.92 (s, 1H), 7.83 (s, 1H), 7.81 (d, J = 4.2 Hz, 1H), 7.71 (s, 1H), 7.57 (d, J = 1.0 Hz, 2H), 7.45 (s, 2H), 5.92 (dd, J = 32.6, 9.6 Hz, 1H), 4.62 (p, J = 8.8 Hz, 1H); $^{19}F$ NMR (376 MHz, $CDCl_3$) δ −59.19, −69.30 (d, J = 2.2 Hz), −112.29 |
| F63 | | | ESIMS m/z 623 ($[M - H]^-$) | $^1H$ NMR (400 MHz, $CDCl_3$) δ 8.60 (d, J = 3.1 Hz, 1H), 8.30 (s, 2H), 8.23 (d, J = 3.1 Hz, 1H), 7.87 (d, J = 1.5 Hz, 1H), 7.82-7.71 (m, 2H), 7.45 (s, 2H), 5.86 (dd, J = 32.6, 9.6 Hz, 1H), 4.61 (q, J = 9.0 Hz, 1H); $^{19}F$ NMR (376 MHz, $CDCl_3$) δ −59.23, −69.31, −112.10 |
| F68 | | 3248, 1674, 1512 | ESIMS m/z 599.0 ($[M + H]^+$) | $^1H$ NMR (400 MHz, $CDCl_3$) δ 7.91 (s, 1H), 7.83 (d, J = 7.4 Hz, 1H), 7.69 (d, J = 8.2 Hz, 1H), 7.49 (d, J = 4.4 Hz, 1H), 7.44 (s, 2H), 7.10 (d, J = 8.1 Hz, 2H), 6.86 (d, J = 8.3 Hz, 2H), 6.24 (d, J = 4.4 Hz, 1H), 5.85 (dd, J = 32.5, 9.6 Hz, 1H), 4.61 (dt, J = 18.5, 9.1 Hz, 1H), 2.29 (s, 3H); $^{19}F$ NMR (376 MHz, $CDCl_3$) δ −58.93, −69.29 (d, J = 2.5 Hz), −111.97 |
| F69 | | | ESIMS m/z 773 ($[M - H]^-$) | $^1H$ NMR (500 MHz, $CDCl_3$) δ 8.38 (s, 1H), 8.07 (d, J = 3.7 Hz, 1H), 7.94-7.85 (m, 1H), 7.82 (dd, J = 8.1, 1.7 Hz, 1H), 7.64 (d, J = 8.0 Hz, 1H), 7.44 (s, 2H), 7.32 (d, J = 3.6 Hz, 1H), 5.88 (dd, J = 32.5, 9.6 Hz, 1H), 4.61 (p, J = 8.8 Hz, 1H); $^{19}F$ NMR (471 MHz, $CDCl_3$) δ −59.15, −69.30, −112.14 |
| F70 | | 3263, 1677, 1618 | HRMS-ESI (m/z) $[M + H]^+$ calcd for $C_{25}H_{13}Cl_3F_{10}N_2O$, 653.0007; found, 652.9999 | $^1H$ NMR (500 MHz, DMSO-$d_6$) δ 10.53 (s, 1H), 8.70 (s, 1H), 8.25-8.19 (m, 1H), 8.10 (dd, J = 8.1, 1.7 Hz, 1H), 8.06 (s, 2H), 7.83 (d, J = 8.1 Hz, 1H), 7.52 (d, J = 8.5 Hz, 2H), 6.94 (d, J = 8.5 Hz, 2H), 6.85 (dd, J = 35.7, 10.1 Hz, 1H), 5.27 (p, J = 9.4 Hz, 1H); $^{19}F$ NMR (471 MHz, DMSO-$d_6$) δ −57.73, −59.34, −68.55 (d, J = 9.1 Hz), −113.67 (d, J = 35.7 Hz) |
| F71 | | | ESIMS m/z 600 ($[M - H]^-$) | $^1H$ NMR (400 MHz, $CDCl_3$) δ 8.37 (d, J = 4.8 Hz, 2H), 8.30 (s, 1H), 7.88-7.85 (m, 1H), 7.83 (d, J = 8.1 Hz, 1H), 7.77 (dd, J = 8.1, 1.6 Hz, 1H), 7.45 (s, 2H), 6.68 (t, J = 4.8 Hz, 1H), 5.84 (dd, J = 32.5, 9.6 Hz, 1H), 4.62 (p, J = 8.9 Hz, 1H), 3.53 (s, 3H); $^{19}F$ NMR (376 MHz, $CDCl_3$) δ −59.07, −69.33, −111.94 |
| F73 | | | ESIMS m/z 627 ($[M - H]^-$) | $^1H$ NMR (500 MHz, $CDCl_3$) δ 7.86 (d, J = 1.7 Hz, 1H), 7.75 (dd, J = 8.0, 1.7 Hz, 1H), 7.58-7.35 (m, 4H), 6.85 (s, 2H), 6.32 (s, 1H), 5.83 (dd, J = 32.6, 9.6 Hz, 1H), 4.60 (p, J = |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^1H$, $^{13}C$, $^{19}F$) |
| | | | | 8.9 Hz, 1H), 2.42 (s, 6H), 2.25 (s, 3H); $^{19}F$ NMR (471 MHz, $CDCl_3$) δ −59.20, −69.32, −111.99 |
| F74 | 174-177 | 3194, 2993, 1687, 1170, 1126, 1067 | ESIMS m/z 587 ($[M + H]^+$) | $^1H$ NMR (400 MHz, DMSO-$d_6$) δ 10.39 (s, 1H), 9.27 (s, 1H), 8.43 (d, J = 4.8 Hz, 2H), 7.97 (s, 2H), 7.95-7.77 (m, 2H), 7.69 (s, 1H), 6.83 (t, J = 4.8 Hz, 1H), 6.51 (dd, J = 19.5, 11.3 Hz, 1H), 4.87-4.67 (m, 1H); $^{19}F$ NMR (376 MHz, DMSO) δ −58.07, −68.91, −90.57 |
| F75 | | 1643, 1609, 1524 | ESIMS m/z 629 ($[M + H]^+$) | $^1H$ NMR (400 MHz, $CDCl_3$) δ 7.93 (s, 1H), 7.90-7.79 (m, 2H), 7.44 (s, 2H), 5.87 (dd, J = 32.5, 9.5 Hz, 1H), 4.68-4.55 (m, 1H), 2.50 (s, 3H), 2.42 (s, 3H), 2.10 (s, 3H); $^{19}F$ NMR (376 MHz, $CDCl_3$) δ −59.11, −69.31 (d, J = 2.2 Hz), −111.99 |
| F77 | | 3368, 2931, 1681, 1174 | ESIMS m/z 587 ($[M + H]^+$) | $^1H$ NMR (300 MHz, DMSO-$d_6$) δ 10.38 (s, 1H), 9.23 (s, 1H), 8.43 (d, J = 4.8 Hz, 2H), 8.18 (s, 1H), 8.14-8.10 (m, 3H), 7.95-7.91 (m, 1H), 7.85 (d, J = 8.1 Hz, 1H), 6.97-6.80 (m, 2H), 5.41-5.35 (m, 1H) |
| F78 | | 3237, 2931, 1682, 1586 | ESIMS m/z 631 ($[M + H]^+$) | $^1H$ NMR (300 MHz, DMSO-$d_6$) δ 10.38 (s, 1H), 9.23 (s, 1H), 8.43 (d, J = 4.8 Hz, 2H), 8.18 (s, 1H), 8.13 (d, J = 8.1 Hz, 2H), 7.99 (s, 1H), 7.95-7.82 (m, 3H), 6.93-6.81 (m, 2H) |
| F79 | | 3290, 2970, 1681, 1566 | ESIMS m/z 635 ([M + H]+) | $^1H$ NMR (400 MHz, $CDCl_3$) δ 8.11 (s, 1H), 7.94 (s, 1H), 7.90-7.82 (m, 1H), 7.76 (d, J = 8.1 Hz, 1H), 7.54 (s, 1H), 7.44 (s, 2H), 6.53 (s, 1H), 5.88 (dd, J = 32.5, 9.6 Hz, 1H), 4.62 (p, J = 8.8 Hz, 1H), 2.54 (s, 3H); $^{19}F$ NMR (376 MHz, $CDCl_3$) δ −58.93, −69.28 (d, J = 2.2 Hz), −112.07 |
| F82 | | 2936, 2219, 1696, 1598, 1552, 1497 | HRMS-ESI (m/z) $[M + H]^+$ calcd for $C_{25}H_{14}Cl_3F_7N_4O$, 625.0194; found, 625.0218 | $^1H$ NMR (500 MHz, DMSO-$d_6$) δ 11.17 (s, 1H), 8.63 (dd, J = 2.3, 0.8 Hz, 1H), 8.25-8.22 (m, 1H), 8.12 (dd, J = 8.1, 1.7 Hz, 1H), 8.06 (s, 2H), 8.02-7.96 (m, 2H), 6.95 (dd, J = 8.9, 0.8 Hz, 1H), 6.87 (dd, J = 35.7, 10.1 Hz, 1H), 5.27 (p, J = 9.4 Hz, 1H), 3.39 (s, 3H); $^{19}F$ NMR (471 MHz, DMSO-$d_6$) δ −57.75, −68.52 (d, J = 9.1 Hz), −113.61 (d, J = 35.8 Hz) |
| F83 | | 3246, 2928, 1702, 1173 | ESIMS m/z 601 ($[M + H]^+$) | $^1H$ NMR (400 MHz, DMSO-$d_6$) δ 10.85 (s, 1H), 8.50 (d, J = 4.8 Hz, 2H), 8.20 (d, J = 10.0 Hz, 2H), 8.14-8.10 (m, 2H), 7.94 (s, 1H), 7.86 (d, J = 8.4 Hz, 1H), 6.87-6.83 (m, 2H), 5.40-5.35 (m, 1H), 3.37 (s, 3H) |
| F84 | | | ESIMS m/z 616 ($[M − H]^-$) | $^1H$ NMR (500 MHz, $CDCl_3$) δ 9.57 (s, 1H), 8.88 (s, 1H), 8.11 (s, 2H), 7.85-7.74 (m, 2H), 7.65 (dd, J = 8.1, 1.8 Hz, 1H), 7.44 (s, 2H), 5.82 (dd, J = 32.6, 9.6 Hz, 1H), 4.60 (p, J = 8.9 Hz, 1H), 2.41 (q, J = 7.6 Hz, 2H), 1.13 (t, J = 7.6 Hz, 3H); $^{19}F$ NMR (471 MHz, $CDCl_3$) δ −59.23, −69.33, −112.12 |
| F85 | | | ESIMS m/z 614 ($[M − H]^-$) | $^1H$ NMR (500 MHz, $CDCl_3$) δ 8.97 (s, 2H), 7.85 (d, J = 1.6 Hz, 1H), 7.78 (d, J = 8.0 Hz, 1H), 7.74 (dd, J = 8.0, 1.7 Hz, 1H), 7.44 (s, 2H), 6.49 (s, 1H), 5.84 (dd, J = 32.6, 9.6 Hz, 1H), 4.69-4.50 (m, 1H), 2.30 (s, 6H); $^{19}F$ NMR (471 MHz, $CDCl_3$) δ −59.19, −69.32, −112.08 |
| F86 | | | ESIMS m/z 584 ($[M − H]^-$) | $^1H$ NMR (400 MHz, $CDCl_3$) δ 9.06 (s, 1H), 8.58 (s, 1H), 7.88 (s, 1H), 7.83 (d, J = 8.4 Hz, 1H), 7.57 (dd, J = 9.1, |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^1$H, $^{13}$C, $^{19}$F) |
| | | | | 4.7 Hz, 1H), 7.52 (d, J = 8.1 Hz, 1H), 7.44 (s, 2H), 5.83 (dd, J = 32.6, 9.5 Hz, 1H), 4.77 (s, 2H), 4.62 (p, J = 8.8 Hz, 1H); $^{19}$F NMR (376 MHz, $CDCl_3$) δ −60.42, −69.36, −111.97 |
| F87 | | | ESIMS m/z 721 ([M − H]$^-$) | $^1$H NMR (500 MHz, $CDCl_3$) δ 7.95-7.87 (m, 2H), 7.81 (dd, J = 8.0, 1.7 Hz, 1H), 7.62 (d, J = 8.1 Hz, 1H), 7.57 (d, J = 0.7 Hz, 2H), 7.43 (s, 2H), 7.06 (d, J = 4.6 Hz, 1H), 5.85 (dd, J = 32.5, 9.6 Hz, 1H), 4.72-4.43 (m, 1H); $^{19}$F NMR (471 MHz, $CDCl_3$) δ −59.24, −62.42, −69.32, −112.04 |
| F89 | | 3230, 1681 | ESIMS m/z 609 ([M + H]$^+$) | $^1$H NMR (400 MHz, Acetone-$d_6$) δ 10.86 (s, 1H), 8.25 (d, J = 1.7 Hz, 1H), 8.18 (dd, J = 8.2, 1.7 Hz, 1H), 8.13 (d, J = 8.1 Hz, 1H), 7.92 (s, 2H), 7.61 (d, J = 7.8 Hz, 1H), 7.49-7.41 (m, 1H), 7.35 (d, J = 3.4 Hz, 1H), 7.23 (ddd, J = 8.2, 7.0, 1.1 Hz, 1H), 7.12 (td, J = 7.5, 7.1, 1.0 Hz, 1H), 6.77 (dd, J = 34.3, 9.9 Hz, 1H), 6.56 (dd, J = 3.4, 0.9 Hz, 1H), 5.16 (p, J = 9.2 Hz, 1H); $^{19}$F NMR (376 MHz, Acetone-$d_6$) δ −59.46, −70.22 (d, J = 2.6 Hz), −114.47 (d, J = 2.7 Hz) |
| F90 | | | ESIMS m/z 617 ([M − H]$^-$) | $^1$H NMR (500 MHz, $CDCl_3$) δ 8.89 (d, J = 4.1 Hz, 1H), 8.05 (s, 3H), 7.83 (d, J = 1.6 Hz, 1H), 7.78 (d, J = 8.0 Hz, 1H), 7.71 (dd, J = 8.1, 1.7 Hz, 1H), 7.44 (s, 2H), 5.83 (dd, J = 32.6, 9.6 Hz, 1H), 4.61 (p, J = 8.8 Hz, 1H), 3.78 (s, 3H); $^{19}$F NMR (471 MHz, $CDCl_3$) δ −59.22, −67.08-−71.87 (m), −112.03 |
| F91 | | | ESIMS m/z 668 ([M − H]$^-$) | $^1$H NMR (400 MHz, $CDCl_3$) δ 8.65 (d, J = 4.9 Hz, 1H), 7.91 (d, J = 11.4 Hz, 2H), 7.87-7.78 (m, 2H), 7.45 (s, 2H), 7.02 (d, J = 4.9 Hz, 1H), 5.86 (dd, J = 32.5, 9.6 Hz, 1H), 4.62 (p, J = 8.9 Hz, 1H), 3.59 (s, 3H); $^{19}$F NMR (376 MHz, $CDCl_3$) δ −59.18, −69.32, −70.54, −108.93-−112.81 (m) |
| F92 | | | ESIMS m/z 586 ([M − H]$^-$) | $^1$H NMR (400 MHz, $CDCl_3$) δ 8.28 (d, J = 1.5 Hz, 1H), 8.06 (dd, J = 2.8, 1.5 Hz, 1H), 7.96 (d, J = 2.8 Hz, 1H), 7.80-7.77 (m, 1H), 7.71-7.70 (m, 1H), 7.45 (s, 2H), 7.43-7.34 (m, 3H), 5.85 (dd, J = 32.6, 9.6 Hz, 1H), 4.60 (p, J = 8.8 Hz, 1H); $^{19}$F NMR (376 MHz, $CDCl_3$) δ −59.19, −69.29, −112.26 |
| F93 | | 3217, 2970, 1676, 1595 | ESIMS m/z 622 ([M + H]$^+$) | $^1$H NMR (400 MHz, $CDCl_3$) δ 8.47 (s, 1H), 8.04 (d, J = 2.5 Hz, 1H), 7.88 (d, J = 1.6 Hz, 1H), 7.77 (dd, J = 8.1, 1.7 Hz, 1H), 7.71 (d, J = 8.1 Hz, 1H), 7.48 (dd, J = 8.8, 2.5 Hz, 1H), 7.44 (s, 2H), 7.36 (s, 1H), 6.71 (d, J = 8.8 Hz, 1H), 5.85 (dd, J = 32.6, 9.6 Hz, 1H), 4.61 (p, J = 8.9 Hz, 1H); $^{19}$F NMR (376 MHz, $CDCl_3$) δ −59.06, −69.29 (d, J = 2.1 Hz), −112.05 (d, J = 2.8 Hz) |
| F94 | 94-96 | | ESIMS m/z 586 ([M − H]$^-$) | $^1$H NMR (400 MHz, $CDCl_3$) δ 8.82 (s, 1H), 8.52 (s, 1H), 8.36 (d, J = 4.8 Hz, 2H), 7.85 (d, J = 1.6 Hz, 1H), 7.83 (d, J = 8.1 Hz, 1H), 7.74 (dd, J = 8.1, 1.7 Hz, 1H), 7.44 (s, 2H), 6.75 (t, J = 4.9 Hz, 1H), 5.83 (dd, J = 32.6, 9.6 Hz, 1H), 4.61 (p, J = 8.9 Hz, 1H); |

TABLE 4-continued

Analytical data for molecules in Table 2

| No. | mp (° C.) | IR (thin film, $cm^{-1}$) | MASS SPEC | NMR ($^1H$, $^{13}C$, $^{19}F$) |
|---|---|---|---|---|
| | | | | $^{19}F$ NMR (376 MHz, $CDCl_3$) δ −59.21, −69.33, −112.02 |
| F95 | | | ESIMS m/z 576 ([M − H]$^-$) | $^1H$ NMR (400 MHz, $CDCl_3$) δ 10.31 (s, 1H), 7.90-7.68 (m, 3H), 7.45 (s, 2H), 6.03-5.75 (m, 3H), 4.59 (q, J = 8.9 Hz, 1H); $^{19}F$ NMR (376 MHz, $CDCl_3$) δ −59.11, −69.33, −112.44 |
| F96 | | 3361, 2926, 1684, 1175 | ESIMS m/z 632 ([M + H]$^+$) | $^1H$ NMR (400 MHz, methanol-$d_4$) δ 8.43 (d, J = 5.2 Hz, 2H), 8.38-8.35 (m, 1H), 8.07-8.04 (m, 2H), 7.97-7.95 (m, 2H), 7.91 (s, 1H), 7.81 (m, 1H), 6.83-6.82 (m, 1H), 6.51-6.42 (m, 1H), 4.90-4.82 (m, 1H) |
| F97 | | | ESIMS m/z 586 ([M − H]$^-$) | $^1H$ NMR (400 MHz, $CDCl_3$) δ 8.82 (s, 1H), 8.52 (s, 1H), 8.36 (d, J = 4.8 Hz, 2H), 7.85 (d, J = 1.6 Hz, 1H), 7.83 (d, J = 8.1 Hz, 1H), 7.74 (dd, J = 8.1, 1.7 Hz, 1H), 7.44 (s, 2H), 6.75 (t, J = 4.9 Hz, 1H), 5.83 (dd, J = 32.6, 9.6 Hz, 1H), 4.61 (p, J = 8.9 Hz, 1H); $^{19}F$ NMR (376 MHz, $CDCl_3$) δ −59.21, −69.33, −112.02 |
| F98 | | | ESIMS m/z 565.09 ([M + H]$^+$) | Rotational isomers $^1H$ NMR (400 MHz, $CDCl_3$) δ 7.87-7.82 (m, 1H), 7.82-7.74 (m, 1H), 7.48-7.37 (m, 3H), 5.80 (m, 1H), 4.66 (s, 1H), 4.60 (m, 1H), 3.77 (s, 1H), 3.61 (br s, 2H, $NCH_2$ major rotamer), 3.11 (m, 1H, $NCH_2$ minor rotamer), 2.99 (m, 1H, $NCH_2$ minor rotamer), 1.17-0.93 (m, 1H), 0.70-0.05 (m, 4H); rotational isomers $^{19}F$ NMR (376 MHz, $CDCl_3$) δ −60.37, −60.65, −69.31-−69.29 (m), −111.81-−112.12 (m) |
| F99 | | 1682, 1589 | HRMS-ESI (m/z) [M + H]$^+$ calcd for $C_{23}H_{12}Cl_4F_7N_3O$, 621.9668; found, 621.9696 | $^1H$ NMR (500 MHz, DMSO-$d_6$) δ 10.38 (s, 1H), 8.71 (s, 1H), 8.17 (d, J = 1.5 Hz, 1H), 8.15-8.08 (m, 2H), 8.06 (s, 2H), 7.91 (d, J = 8.1 Hz, 1H), 7.73 (dd, J = 7.6, 1.5 Hz, 1H), 6.88-6.76 (m, 2H), 5.27 (p, J = 9.3 Hz, 1H); $^{19}F$ NMR (471 MHz, DMSO-$d_6$) δ −57.63, −68.55 (d, J = 9.3 Hz), −113.62 (d, J = 35.6 Hz) |
| F100 | | 3291, 2925, 1681, 1284, 784 | ESIMS m/z 608 ([M − H]$^-$) | $^1H$ NMR (300 MHz, DMSO-$d_6$) δ 10.50 (s, 1H), 8.56 (d, J = 2.4 Hz, 1H), 8.20 (s, 1H), 8.12-8.00 (m, 3H), 7.88 (d, J = 8.4 Hz, 1H), 7.40 (t, J = 8.1 Hz, 1H), 7.19-7.10 (m, 3H), 6.92 (dd, J = 9.9, 35.7 Hz, 1H), 5.26 (t, J = 9.6 Hz, 1H) |
| F101 | | | ESIMS m/z 656 ([M − H]$^-$) | $^1H$ NMR (500 MHz, $CDCl_3$) δ 9.31 (s, 1H), 8.98 (s, 1H), 8.63-8.41 (m, 2H), 7.86 (s, 1H), 7.79 (d, J = 8.1 Hz, 1H), 7.74 (dd, J = 8.1, 1.6 Hz, 1H), 7.45 (s, 2H), 5.87 (dd, J = 32.6, 9.6 Hz, 1H), 4.67-4.48 (m, 1H); $^{19}F$ NMR (471 MHz, $CDCl_3$) δ −59.37, −61.72, −69.40 (d, J = 8.5 Hz), −112.28 |
| F102 | | 3246, 2925, 1682, 764 | ESIMS m/z 611 ([M + H]$^+$) | $^1H$ NMR (300 MHz, DMSO-$d_6$) δ 10.76 (s, 1H), 8.49 (d, J = 4.8 Hz, 2H), 8.13 (s, 1H), 8.04 (s, 2H), 7.83 (d, J = 8.1 Hz, 1H), 7.66 (d, J = 7.8 Hz, 1H), 6.85 (t, J = 4.8 Hz, 1H), 6.77 (dd, J = 9.9, 35.4 Hz, 1H), 5.23-5.20 (m, 1H), 3.40 (s, 3H) |
| F103 | | 3251, 2970, 1657 | ESIMS m/z 619 ([M + H]$^+$) | $^1H$ NMR (400 MHz, $CDCl_3$) δ 7.88 (s, 1H), 7.83-7.75 (m, 1H), 7.60 (d, J = 8.0 Hz, 1H), 7.43 (s, 2H), 7.18 (d, J = 5.9 Hz, 1H), 5.84 (dd, J = 32.5, 9.6 Hz, 1H), 4.78 (d, J = 6.6 Hz, 1H), 4.61 (p, J = 8.8 Hz, 1H), 3.05 (q, J = 6.5 Hz, 2H), 2.28-2.13 (m, 2H), |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^{1}H$, $^{13}C$, $^{19}F$) |
| | | | | 1.85-1.74 (m, 2H); $^{19}F$ NMR (376 MHz, $CDCl_3$) δ −59.02, −66.38, −69.31 (d, J = 2.4 Hz), −111.96 (dd, J = 12.2, 2.7 Hz) |
| F104 | | | ESIMS m/z 622 ($[M - H]^-$) | $^{1}H$ NMR (400 MHz, $CDCl_3$) δ 8.11 (s, 1H), 8.10 (s, 1H), 8.03 (d, J = 3.5 Hz, 1H), 7.92 (s, 1H), 7.90-7.83 (m, 1H), 7.79 (d, J = 8.1 Hz, 1H), 7.45 (s, 2H), 7.35 (d, J = 3.5 Hz, 1H), 5.88 (dd, J = 32.5, 9.6 Hz, 1H), 4.61 (q, J = 8.9 Hz, 1H); $^{19}F$ NMR (376 MHz, $CDCl_3$) δ −59.06, −69.28, −112.07 |
| F105 | | | ESIMS m/z 617 ($[M - H]^-$) | $^{1}H$ NMR (400 MHz, $CDCl_3$) δ 11.88 (s, 1H), 7.95-7.73 (m, 2H), 7.46 (d, J = 9.8 Hz, 3H), 6.09 (s, 1H), 5.86 (dd, J = 32.6, 9.6 Hz, 1H), 4.62 (p, J = 8.8 Hz, 1H), 4.46 (s, 2H), 2.92 (s, 3H, $CH_3$ tautomer), 2.88 (s, 3H, $CH_3$ tautomer); $^{19}F$ NMR (376 MHz, $CDCl_3$) δ −60.29, −69.33, −112.08 |
| F106 | | 3219, 1680, 1586, 1449 | ESIMS m/z 603 ($[M + H]^+$) | $^{1}H$ NMR (400 MHz, $CDCl_3$) δ 8.54 (s, 1H), 8.40 (d, J = 4.9 Hz, 2H), 8.26 (d, J = 4.8 Hz, 1H), 8.03 (s, 1H), 7.91-7.76 (m, 2H), 7.36 (s, 1H), 7.27 (s, 1H), 7.18 (s, 1H), 6.78 (t, J = 4.8 Hz, 1H), 5.86 (dd, J = 32.5, 9.7 Hz, 1H), 4.66 (q, J = 9.0 Hz, 1H); $^{19}F$ NMR (376 MHz, $CDCl_3$) δ −58.04, −59.28, −69.38 (d, J = 2.4 Hz), −112.26 (d, J = 2.7 Hz) |
| F107 | | 3204, 1675, 1597, 1496 | ESIMS m/z 616 ($[M + H]^+$) | $^{1}H$ NMR (400 MHz, $CDCl_3$) δ 8.23 (d, J = 5.3 Hz, 1H), 7.91 (s, 1H), 7.90-7.76 (m, 3H), 7.62-7.50 (m, 2H), 7.36 (s, 2H), 6.86-6.75 (m, 2H), 5.89 (dd, J = 32.6, 9.7 Hz, 1H), 4.68 (dt, J = 17.8, 8.6 Hz, 1H), 3.46 (s, 3H); $^{19}F$ NMR (376 MHz, $CDCl_3$) δ −57.81, −58.81, −69.38 (d, J = 2.4 Hz), −112.55 (d, J = 2.7 Hz) |
| F109 | | | ESIMS m/z 606 ($[M - H]^-$) | $^{1}H$ NMR (400 MHz, $CDCl_3$) δ 7.94 (d, J = 8.1 Hz, 1H), 7.89 (d, J = 1.7 Hz, 1H), 7.76 (dd, J = 8.1, 1.8 Hz, 1H), 7.45 (s, 2H), 6.31 (q, J = 1.2 Hz, 1H), 5.82 (dd, J = 32.7, 9.6 Hz, 1H), 5.10 (s, 2H), 4.62 (p, J = 8.9 Hz, 1H), 2.37 (d, J = 1.3 Hz, 3H); $^{19}F$ NMR (376 MHz, $CDCl_3$) δ −58.26, −69.37, −111.78 |
| F110 | | 3259, 2596, 1650, 1553, 1434 | ESIMS m/z 577 ($[M + H]^+$) | $^{1}H$ NMR (400 MHz, $CDCl_3$) δ 7.87 (s, 1H), 7.78 (d, J = 8.1 Hz, 1H), 7.60 (d, J = 8.0 Hz, 1H), 7.43 (s, 2H), 7.18 (s, 1H), 5.83 (dd, J = 32.4, 9.7 Hz, 1H), 4.79 (s, 1H), 4.67-4.56 (m, 1H), 3.72-3.58 (m, 1H), 1.86-1.68 (m, 4H), 1.66-1.46 (m, 4H); $^{19}F$ NMR (376 MHz, $CDCl_3$) δ −59.08, −69.32 (d, J = 2.4 Hz), −111.93 (d, J = 2.9 Hz) |
| F111 | | 3216, 2985, 2217, 1681, 1607, 1553, 1508 | HRMS-ESI (m/z) $[M + H]^+$ calcd for $C_{25}H_{13}Cl_3F_7N_3O$, 610.0043; found, 610.0073 | $^{1}H$ NMR (500 MHz, DMSO-$d_6$) δ 10.57 (s, 1H), 8.93 (s, 1H), 8.21 (d, J = 1.6 Hz, 1H), 8.10 (dd, J = 8.0, 1.7 Hz, 1H), 8.06 (s, 2H), 7.85 (d, J = 8.0 Hz, 1H), 7.61 (d, J = 8.8 Hz, 2H), 6.93-6.76 (m, 3H), 5.27 (p, J = 9.4 Hz, 1H); $^{19}F$ NMR (471 MHz, DMSO-$d_6$) δ −57.73, −68.54 (d, J = 9.3 Hz), −113.67 (d, J = 35.5 Hz) |
| F112 | | | ESIMS m/z 551 ($[M + H]^+$) | $^{1}H$ NMR (400 MHz, $CDCl_3$) δ 7.88-7.80 (m, 1H), 7.80-7.72 (m, 1H), 7.46-7.37 (m, 3H), 5.90-5.71 (m, 1H), 4.61 (h, J = 8.6 Hz, 1H), 4.43 |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^{1}H$, $^{13}C$, $^{19}F$) |
| | | | | (s, 1H), 3.64 (s, 1H), 3.06 (dq, J = 7.2, 3.6 Hz, 1H, minor rotamer), 2.71 (tt, J = 7.3, 3.9 Hz, 1H, major rotamer), 1.01-0.53 (m, 4H); $^{19}F$ NMR (376 MHz, $CDCl_3$) δ −60.06, −60.68, −69.31 (d, J = 2.4 Hz), −69.40 (d, J = 2.3 Hz), −111.89, −112.07 |
| F113 | | 3249, 2929, 1690, 1118 | ESIMS m/z 585 ($[M + H]^+$) | $^{1}H$ NMR (300 MHz, DMSO-$d_6$) δ 8.50 (d, J = 4.8 Hz, 2H), 8.20-8.07 (m, 4H), 7.86 (d, J = 8.1 Hz, 1H), 7.67-7.61 (m, 1H), 6.95 (d, J = 10.2 Hz, 1H), 6.86-6.80 (m, 2H), 5.34 (t, J = 8.1 Hz, 1H), 3.37 (s, 3H) |
| F114 | | | ESIMS m/z 606 ($[M - H]^-$) | $^{1}H$ NMR (500 MHz, $CDCl_3$) δ 8.31 (s, 2H), 8.10 (d, J = 4.3 Hz, 1H), 7.90 (s, 1H), 7.81 (d, J = 1.2 Hz, 2H), 7.66 (d, J = 4.2 Hz, 1H), 7.44 (s, 2H), 5.85 (dd, J = 32.5, 9.6 Hz, 1H), 4.61 (p, J = 8.8 Hz, 1H); $^{19}F$ NMR (471 MHz, $CDCl_3$) δ −59.19, −68.53-−70.73 (m), −111.95, −149.81 |
| F116 | | 3400, 1715, 1594 | ESIMS m/z 577 ($[M + H]^+$) | $^{1}H$ NMR (500 MHz, Acetone-$d_6$) δ 9.13 (s, 1H), 8.29-8.24 (m, 1H), 8.18 (dd, J = 8.2, 1.7 Hz, 1H), 7.98 (d, J = 8.2 Hz, 1H), 7.90 (s, 2H), 6.77 (dd, J = 34.3, 9.9 Hz, 1H), 5.67 (d, J = 7.6 Hz, 1H), 5.16 (p, J = 9.1 Hz, 1H), 4.19 (s, 4H) |
| F117 | | 3228, 2924, 1653, 1203 | ESIMS m/z 553 ($[M + H]^+$) | $^{1}H$ NMR (400 MHz, DMSO-$d_6$) δ 10.37 (s, 1H), 9.22 (s, 1H), 8.43 (d, J = 4.8 Hz, 2H), 8.17 (s, 1H), 8.12 (d, J = 8.4 Hz, 1H), 8.10 (s, 1H), 7.84-7.82 (m, 1H), 7.75-7.66 (m, 2H), 6.82-6.65 (m, 2H), 5.25-5.22 (m, 1H) |
| F118 | | | ESIMS m/z 630 ($[M - H]^-$) | $^{1}H$ NMR (400 MHz, $CDCl_3$) δ 9.16-9.03 (m, 1H), 8.48-8.37 (m, 1H), 8.12 (d, J = 1.5 Hz, 1H), 7.82 (d, J = 1.3 Hz, 1H), 7.76-7.71 (m, 1H), 7.63 (d, J = 8.1 Hz, 1H), 7.47 (s, 3H), 7.10 (dd, J = 8.6, 1.2 Hz, 1H), 6.85 (ddd, J = 8.4, 7.0, 1.2 Hz, 1H), 5.89 (dd, J = 32.6, 9.6 Hz, 1H), 4.63 (p, J = 8.8 Hz, 1H); $^{19}F$ NMR (376 MHz, $CDCl_3$) δ −58.97, −69.26, −112.32 |
| F120 | 94-96 | | ESIMS m/z 586 ($[M - H]^-$) | $^{1}H$ NMR (400 MHz, $CDCl_3$) δ 8.82 (s, 1H), 8.52 (s, 1H), 8.36 (d, J = 4.8 Hz, 2H), 7.85 (d, J = 1.6 Hz, 1H), 7.83 (d, J = 8.1 Hz, 1H), 7.74 (dd, J = 8.1, 1.7 Hz, 1H), 7.44 (s, 2H), 6.75 (t, J = 4.9 Hz, 1H), 5.83 (dd, J = 32.6, 9.6 Hz, 1H), 4.61 (p, J = 8.9 Hz, 1H); $^{19}F$ NMR (376 MHz, $CDCl_3$) δ −59.21, −69.33, −112.02 |
| F121 | | | ESIMS m/z 588 ($[M - H]^-$) | $^{1}H$ NMR (500 MHz, $CDCl_3$) δ 8.34 (d, J = 2.6 Hz, 1H), 8.18 (d, J = 4.7 Hz, 1H), 8.04 (s, 1H), 7.94-7.88 (m, 1H), 7.82 (dd, J = 8.1, 1.7 Hz, 1H), 7.68 (d, J = 8.1 Hz, 1H), 7.44 (s, 2H), 7.26 (s, 1H), 7.21 (dd, J = 8.3, 4.6 Hz, 1H), 6.47 (s, 1H), 5.87 (dd, J = 32.5, 9.6 Hz, 1H), 4.61 (q, J = 8.8 Hz, 1H); $^{19}F$ NMR (471 MHz, $CDCl_3$) δ −58.93, −69.28, −112.06 |
| F122 | 116-160 | 3222, 1671, 1125 | ESIMS m/z 629 ($[M + H]^+$) | $^{1}H$ NMR (500 MHz, $CDCl_3$) δ minor rotamer 7.87 (s, 1H), major rotamer 7.85 (s, 1H), 7.82-7.73 (m, 1H), minor rotamer 7.64 (s, 1H), major rotamer 7.57 (d, J = 8.1 Hz, 1H), minor rotamer 7.46 (s, 2H), major rotamer 7.43 (s, 2H), minor rotamer 7.38 (d, J = 8.1 Hz, 1H), major rotamer 7.14 (s, 1H), 5.85 (dt, |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^1H$, $^{13}C$, $^{19}F$) |
| | | | | J = 32.6, 9.4 Hz, 1H), 4.68-4.35 (m, 1H), major rotamer 3.66-3.52 (m, 4H), minor rotamer 3.31 (t, J = 5.4 Hz, 4H), major rotamer 3.26 (t, J = 5.3 Hz, 4H), minor rotamer 3.01-2.88 (m, 4H); $^{19}F$ NMR (471 MHz, $CDCl_3$) δ major rotamer −58.69, minor rotamer −59.39, minor rotamer −69.23 (d, J = 8.5 Hz), major rotamer −69.29 (d, J = 8.2 Hz), major rotamer −111.97-−112.11 (m), minor rotamer −112.18 (d, J = 32.4 Hz) |
| F123 | | 3231, 1671, 1472 | ESIMS m/z 673 ([M + H]$^+$) | $^1H$ NMR (400 MHz, $CDCl_3$) δ 7.91 (s, 1H), 7.84 (d, J = 9.2 Hz, 1H), 7.72 (d, J = 8.1 Hz, 1H), 7.56 (d, J = 5.6 Hz, 2H), 7.51 (d, J = 5.6 Hz, 1H), 7.41 (s, 1H), 7.35-7.27 (m, 2H), 6.96-6.91 (m, 2H), 5.85 (dd, J = 32.4, 9.6 Hz, 1H), 4.68-4.54 (m, 1H), 3.31 (s, 3H); $^{19}F$ NMR (376 MHz, $CDCl_3$) δ −58.69 (d, J = 5.6 Hz), −69.46 (d, J = 2.4 Hz), −98.40, −112.08 (d, J = 2.8 Hz) |
| F125 | | 3429, 2919, 750 | ESIMS m/z 611 ([M + H]$^+$) | $^1H$ NMR (300 MHz, DMSO-$d_6$) δ 10.93 (s, 1H), 8.50-8.48 (m, 2H), 8.20 (s, 1H), 8.13 (d, J = 8.1 Hz, 1H), 7.99 (d, J = 1.8 Hz, 1H), 7.88-7.83 (m, 2H), 7.59 (d, J = 8.4 Hz, 1H), 6.89-6.74 (m, 2H), 5.22-5.15 (m, 1H), 3.37 (s, 3H) |
| F126 | | 3272, 2933, 1678, 824 | ESIMS m/z 615 ([M + H]$^+$) | $^1H$ NMR (300 MHz, DMSO-$d_6$) δ 10.30 (s, 1H), 8.17 (s, 1H), 8.05 (s, 3H), 7.76-7.71 (m, 2H), 6.90-6.67 (m, 5H), 5.28-5.22 (m, 1H), 3.68 (s, 3H) |
| F128 | | 3221, 2924, 1671, 805 | ESIMS m/z 597 ([M + H]$^+$) | $^1H$ NMR (300 MHz, DMSO-$d_6$) δ 10.29 (s, 1H), 9.22 (s, 1H), 8.43 (d, J = 4.8 Hz, 1H), 8.12 (s, 1H), 8.04 (s, 2H), 7.95 (s, 1H), 7.83-7.82 (m, 1H), 7.65 (d, J = 8.1 Hz, 1H), 6.83 (t, J = 4.8 Hz, 1H), 6.77 (dd, J = 9.9, 35.4 Hz, 1H), 5.25-5.22 (m, 1H) |
| F129 | | | ESIMS m/z 652 ([M − H]$^-$) | $^1H$ NMR (500 MHz, $CDCl_3$) δ 7.98 (d, J = 5.2 Hz, 1H), 7.88 (d, J = 1.6 Hz, 1H), 7.78 (dd, J = 8.1, 1.7 Hz, 1H), 7.61 (d, J = 8.1 Hz, 1H), 7.43 (s, 2H), 7.30 (d, J = 8.1 Hz, 2H), 7.02 (d, J = 5.2 Hz, 1H), 6.98 (t, J = 8.1 Hz, 1H), 5.84 (dd, J = 32.6, 9.6 Hz, 1H), 4.61 (p, J = 8.9 Hz, 1H); $^{19}F$ NMR (471 MHz, $CDCl_3$) δ −59.29, −68.22-−72.79 (m), −112.07 |
| F130 | | 3438, 2927, 1679, 751 | ESIMS m/z 615 ([M + H]$^+$) | $^1H$ NMR (400 MHz, DMSO-$d_6$) δ 10.71 (s, 1H), 9.22 (s, 1H), 8.49 (d, J = 5.2 Hz, 1H), 8.20 (s, 1H), 8.13 (d, J = 8.4 Hz, 1H), 8.05 (s, 2H), 7.90 (d, J = 8.4 Hz, 1H), 6.88-6.77 (m, 2H), 5.28-5.22 (m, 1H), 3.88-3.83 (m, 2H), 1.23-1.18 (m, 3H) |
| F131 | | | ESIMS m/z 721 ([M − H]$^-$) | $^1H$ NMR (500 MHz, $CDCl_3$) δ 7.94 (d, J = 3.5 Hz, 1H), 7.92 (d, J = 1.6 Hz, 1H), 7.84 (dd, J = 8.1, 1.7 Hz, 1H), 7.65 (d, J = 8.1 Hz, 1H), 7.43 (s, 2H), 7.16 (d, J = 3.5 Hz, 1H), 5.87 (dd, J = 32.4, 9.6 Hz, 1H), 4.61 (p, J = 8.8 Hz, 1H); $^{19}F$ NMR (471 MHz, $CDCl_3$) δ −59.14, −69.30, −112.13 |
| F132 | | | ESIMS m/z 631 ([M − H]$^-$) | $^1H$ NMR (400 MHz, $CDCl_3$) δ 10.06-9.89 (m, 1H), 8.93 (d, J = 4.7 Hz, 1H), 8.54-8.38 (m, 2H), 7.91 (s, 1H), 7.83 (d, J = 1.2 Hz, 2H), 7.46 (s, 2H), 6.91 (dd, J = 8.3, 4.6 Hz, 1H), 5.90 (dd, J = 32.6, 9.6 Hz, 1H), |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^{1}H$, $^{13}C$, $^{19}F$) |
| | | | | 4.63 (p, J = 8.9 Hz, 1H); $^{19}F$ NMR (376 MHz, $CDCl_3$) δ −59.13, −69.33, −112.11 |
| F133 | | 3234, 3058, 1678, 1602, 1553, 1496 | HRMS-ESI (m/z) $[M + H]^+$ calcd for $C_{24}H_{14}Cl_3F_7N_2O$, 585.0133; found, 585.0151 | $^{1}H$ NMR (500 MHz, DMSO-$d_6$) δ 10.35 (d, J = 2.7 Hz, 1H), 8.19 (d, J = 1.6 Hz, 1H), 8.09 (dd, J = 8.1, 1.7 Hz, 1H), 8.06 (s, 2H), 8.04 (d, J = 2.5 Hz, 1H), 7.79 (d, J = 8.0 Hz, 1H), 7.19 (dd, J = 8.5, 7.3 Hz, 2H), 6.90-6.72 (m, 4H), 5.26 (p, J = 9.5 Hz, 1H); $^{19}F$ NMR (471 MHz, DMSO-$d_6$) δ −57.74, −68.56 (d, J = 9.3 Hz), −113.67 (d, J = 35.6 Hz) |
| F134 | | 3204, 2983, 1682, 1632, 1511 | HRMS-ESI (m/z) $[M + H]^+$ calcd for $C_{24}H_{12}Cl_3F_9N_2O$, 620.9944; found, 620.9957 | $^{1}H$ NMR (500 MHz, DMSO-$d_6$) δ 10.49 (s, 1H), 8.29 (s, 1H), 8.20 (d, J = 1.6 Hz, 1H), 8.11 (dd, J = 8.1, 1.7 Hz, 1H), 8.06 (s, 2H), 7.79 (d, J = 8.1 Hz, 1H), 7.16 (ddd, J = 11.2, 8.8, 5.0 Hz, 1H), 6.84 (dd, J = 35.7, 10.1 Hz, 1H), 6.61 (ddd, J = 10.2, 6.9, 3.1 Hz, 1H), 6.55 (td, J = 8.3, 4.1 Hz, 1H), 5.27 (p, J = 9.3 Hz, 1H); $^{19}F$ NMR (471 MHz, DMSO-$d_6$) δ −57.68, −68.55 (d, J = 9.4 Hz), −113.69 (d, J = 35.6 Hz), −117.78-−118.02 (m), −138.00-−138.22 (m) |
| F135 | | 3283, 1657, 1553, 1434 | ESIMS m/z 629 ($[M + H]^+$) | $^{1}H$ NMR (400 MHz, $CDCl_3$) δ 7.89 (s, 1H), 7.85-7.78 (m, 1H), 7.59 (d, J = 8.0 Hz, 1H), 7.43 (s, 2H), 7.40 (d, J = 5.5 Hz, 1H), 5.85 (dd, J = 32.5, 9.6 Hz, 1H), 4.83 (dd, J = 5.6, 3.2 Hz, 1H), 4.61 (p, J = 8.8 Hz, 1H), 4.23 (d, J = 7.2 Hz, 1H), 3.37-3.20 (m, 2H), 3.20-3.01 (m, 2H), 2.52-2.35 (m, 1H), 2.35-2.21 (m, 1H); $^{19}F$ NMR (376 MHz, $CDCl_3$) δ −58.88, −69.28 (d, J = 2.4 Hz), −112.05 (d, J = 2.4 Hz) |
| F136 | | | ESIMS m/z 621 ($[M − H]^-$) | $^{1}H$ NMR (400 MHz, $CDCl_3$) δ 8.27 (d, J = 3.3 Hz, 1H), 8.06-7.99 (m, 1H), 7.89 (d, J = 1.6 Hz, 1H), 7.79 (dd, J = 8.1, 1.7 Hz, 1H), 7.61 (d, J = 8.1 Hz, 1H), 7.45 (s, 2H), 7.22-7.11 (m, 2H), 6.64 (d, J = 3.4 Hz, 1H), 5.89 (dd, J = 32.5, 9.6 Hz, 1H), 4.62 (p, J = 8.8 Hz, 1H); $^{19}F$ NMR (376 MHz, $CDCl_3$) δ −58.95, −69.28, −110.57-−114.23 (m) |
| F137 | | 3253, 2931, 1647, 1553, 1451 | ESIMS m/z 591 ($[M + H]^+$) | $^{1}H$ NMR (400 MHz, $CDCl_3$) δ 7.87 (s, 1H), 7.78 (d, J = 8.1 Hz, 1H), 7.60 (d, J = 8.1 Hz, 1H), 7.43 (s, 3H), 7.17 (s, 1H), 5.83 (dd, J = 32.5, 9.6 Hz, 1H), 4.79 (s, 1H), 4.60 (p, J = 8.9 Hz, 1H), 2.99-2.89 (m, 1H), 1.90 (d, J = 12.8 Hz, 3H), 1.83-1.72 (m, 2H), 1.75-1.50 (m, 2H), 1.30 (d, J = 11.8 Hz, 1H), 1.18 (q, J = 11.9, 10.1 Hz, 1H); $^{19}F$ NMR (376 MHz, $CDCl_3$) δ −59.13, −69.32 (d, J = 2.3 Hz), −111.93 (d, J = 2.5 Hz) |
| F138 | | 3244, 2970, 1657, 1553 | ESIMS m/z 563 ($[M + H]^+$) | $^{1}H$ NMR (400 MHz, $CDCl_3$) δ 7.87 (t, J = 2.2 Hz, 1H), 7.78 (dt, J = 8.2, 2.0 Hz, 1H), 7.59 (d, J = 8.1 Hz, 1H), 7.43 (s, 3H), 5.83 (ddd, J = 32.6, 9.6, 1.2 Hz, 1H), 4.92 (s, 1H), 4.60 (p, J = 8.9 Hz, 1H), 3.69 (p, J = 7.6 Hz, 1H), 2.13-1.45 (m, 6H); $^{19}F$ NMR (376 MHz, $CDCl_3$) δ −59.07, −69.32 (d, J = 2.2 Hz), −111.96 (d, J = 2.5 Hz) |
| F140 | | 3247, 2957, 1659, 1553 | ESIMS m/z 579 ($[M + H]^+$) | $^{1}H$ NMR (400 MHz, $CDCl_3$) δ 7.87 (d, J = 1.7 Hz, 1H), 7.78 (dd, J = 8.0, 1.7 Hz, 1H), 7.58 (d, J = 8.1 Hz, 1H), 7.43 (s, 2H), 7.21 (s, 1H), 5.83 (dd, |

TABLE 4-continued

Analytical data for molecules in Table 2

| No. | mp (° C.) | IR (thin film, $cm^{-1}$) | MASS SPEC | NMR ($^1H$, $^{13}C$, $^{19}F$) |
|---|---|---|---|---|
| | | | | J = 32.5, 9.7 Hz, 1H), 4.79 (s, 1H), 4.60 (p, J = 8.8 Hz, 1H), 2.77 (s, 2H), 0.99 (s, 9H); $^{19}F$ NMR (376 MHz, $CDCl_3$) δ −59.01, −69.32 (d, J = 2.4 Hz), −111.97 (d, J = 2.6 Hz) |
| F141 | | 3245, 1678, 1609, 1466 | ESIMS m/z 654 ($[M + H]^+$) | $^1H$ NMR (400 MHz, $CDCl_3$) δ 7.97 (d, J = 4.3 Hz, 1H), 7.92 (s, 1H), 7.86 (d, J = 1.2 Hz, 2H), 7.71 (t, J = 7.9 Hz, 1H), 7.45 (s, 2H), 7.22 (d, J = 7.4 Hz, 1H), 7.16 (d, J = 4.1 Hz, 1H), 6.93 (d, J = 8.4 Hz, 1H), 5.87 (dd, J = 32.5, 9.6 Hz, 1H), 4.62 (p, J = 8.8 Hz, 1H); $^{19}F$ NMR (376 MHz, $CDCl_3$) δ −59.16, −68.52, −69.30 (d, J = 2.2 Hz), −112.02 (d, J = 2.7 Hz) |
| F142 | | 3295, 2970, 2250, 1655 | ESIMS m/z 564 ($[M + H]^+$) | $^1H$ NMR (400 MHz, $CDCl_3$) δ 7.88 (d, J = 1.5 Hz, 1H), 7.84-7.76 (m, 1H), 7.64 (d, J = 8.0 Hz, 1H), 7.43 (s, 2H), 7.34 (d, J = 5.9 Hz, 1H), 5.84 (dd, J = 32.5, 9.6 Hz, 1H), 4.97 (q, J = 5.0 Hz, 1H), 4.61 (p, J = 8.9 Hz, 1H), 3.30 (td, J = 6.5, 4.6 Hz, 2H), 2.60 (t, J = 6.5 Hz, 2H); $^{19}F$ NMR (376 MHz, $CDCl_3$) δ −58.96, −69.30 (d, J = 2.3 Hz), −112.03 (d, J = 2.8 Hz) |
| F143 | | 2975, 1658, 1464 | ESIMS m/z 580 ($[M + H]^+$) | $^1H$ NMR (300 MHz, $CDCl_3$) δ 8.32 (s, 1H), 7.90-7.76 (m, 2H), 7.65 (d, J = 8.2 Hz, 1H), 7.43 (s, 2H), 5.86 (dd, J = 32.6, 9.6 Hz, 1H), 4.59 (t, J = 9.0 Hz, 1H), 3.40 (p, J = 3.4 Hz, 2H), 3.31 (s, 1H), 3.26-3.16 (m, 2H), 2.97 (s, 6H) |
| F144 | | 2961, 1661, 1552 | ESIMS m/z 591 ($[M + H]^+$) | $^1H$ NMR (300 MHz, $CDCl_3$) δ 7.85 (s, 1H), 7.77 (d, J = 8.0 Hz, 1H), 7.58 (d, J = 8.0 Hz, 1H), 7.43 (s, 2H), 6.36 (s, 1H), 5.81 (dd, J = 32.6, 9.6 Hz, 1H), 4.60 (p, J = 8.8 Hz, 1H), 3.14 (q, J = 7.2 Hz, 1H), 2.70 (s, 3H), 1.96-1.48 (m, 8H) |
| F145 | | 3275, 2958, 1638, 1553 | ESIMS m/z 579 ($[M + H]^+$) | $^1H$ NMR (300 MHz, $CDCl_3$) δ 7.87 (s, 1H), 7.79 (d, J = 8.3 Hz, 1H), 7.60 (d, J = 8.0 Hz, 1H), 7.43 (s, 2H), 7.16 (d, J = 6.0 Hz, 1H), 5.83 (dd, J = 32.5, 9.6 Hz, 1H), 4.78 (s, 1H), 4.60 (p, J = 8.8 Hz, 1H), 2.99 (q, J = 6.7 Hz, 2H), 1.68 (dq, J = 13.3, 6.6 Hz, 1H), 1.49-1.36 (m, 2H), 0.93 (d, J = 6.6 Hz, 6H) |
| F146 | | 3250, 2969, 1648, 1553 | ESIMS m/z 627 ($[M + H]^+$) | $^1H$ NMR (400 MHz, $CDCl_3$) δ 7.91-7.86 (m, 1H), 7.83-7.74 (m, 1H), 7.59 (d, J = 8.1 Hz, 1H), 7.43 (s, 2H), 7.20 (d, J = 6.0 Hz, 1H), 5.84 (dd, J = 32.5, 9.6 Hz, 1H), 4.61 (p, J = 8.9 Hz, 1H), 3.82-3.60 (m, 1H), 3.37-3.14 (m, 1H), 2.17-1.46 (m, 8H); $^{19}F$ NMR (376 MHz, $CDCl_3$) δ −59.05, −59.12, −69.32 (dd, J = 5.2, 2.3 Hz), −110.42-−115.65 (m) |
| F147 | | | ESIMS m/z 656 ($[M - H]^-$) | $^1H$ NMR (400 MHz, $CDCl_3$) δ 9.58 (s, 1H), 8.00 (s, 1H), 7.98-7.87 (m, 1H), 7.81 (ddd, J = 16.1, 8.2, 1.8 Hz, 1H), 7.72 (d, J = 8.1 Hz, 1H), 7.44 (d, J = 1.6 Hz, 2H), 6.92 (s, 1H), 5.88 (ddd, J = 32.6, 16.9, 9.6 Hz, 1H), 4.62 (td, J = 9.0, 2.4 Hz, 1H); $^{19}F$ NMR (376 MHz, $CDCl_3$) δ −59.26, −66.25-−76.86 (m), −106.16-−123.42 (m) |
| F148 | | 3304, 2925, 1682, 1582, | ESIMS m/z 573 ($[M + H]^+$) | $^1H$ NMR (300 MHz, DMSO-$d_6$) δ 11.00 (s, 1H), 8.53 (d, J = 4.5 Hz, 2H), |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^1H$, $^{13}C$, $^{19}F$) |
| | | 806 | | 8.04 (s, 2H), 7.70-7.57 (m, 3H), 6.90 (t, J = 4.5 Hz, 1H), 6.64 (dd, J = 9.9, 35.7 Hz, 1H), 5.21 (t, J = 9.6 Hz, 1H), 4.69 (s, 2H), 3.25 (t, J = 2.1 Hz, 1H), 2.48 (s, 3H) |
| F149 | | 3337, 2925, 1657, 1166, 807 | ESIMS m/z 648 ($[M + H]^+$) | $^1H$ NMR (300 MHz, DMSO-$d_6$) δ 8.80 (t, J = 6.6 Hz, 1H), 8.13-7.99 (m, 4H), 7.48 (d, J = 7.8 Hz, 1H), 5.23 (t, J = 9.6 Hz, 1H), 4.65 (s, 2H), 4.36 (s, 2H), 4.05-3.85 (m, 3H) |
| F150 | | 3246, 2925, 1690, 1176 | ESIMS m/z 623 ($[M - H]^-$) | $^1H$ NMR (300 MHz, DMSO-$d_6$) δ 11.10 (s, 1H), 8.55 (d, J = 4.8 Hz, 2H), 8.19 (s, 1H), 8.14 (d, J = 8.1 Hz, 1H), 8.05 (s, 2H), 7.88 (d, J = 8.1 Hz, 1H), 6.94-6.76 (m, 2H), 5.26 (t, J = 9.6 Hz, 1H), 4.65 (s, 2H), 3.22 (t, J = 2.7 Hz, 1H) |
| F151 | | 3422, 2924, 1683, 772 | ESIMS m/z 567 ($[M + H]^+$) | $^1H$ NMR (300 MHz, DMSO-$d_6$) δ 10.86 (s, 1H), 8.50 (d, J = 4.8 Hz, 2H), 8.20 (s, 1H), 8.13 (d, J = 8.4 Hz, 1H), 7.86 (d, J = 8.4 Hz, 1H), 7.82 (s, 2H), 7.69 (t, J = 3.3 Hz, 1H), 6.91-6.86 (m, 2H), 5.26-5.19 (m, 1H), 3.37 (s, 3H) |
| F152 | | 3430, 2924, 1682, 764 | ESIMS m/z 626 ($[M + H]^+$) | $^1H$ NMR (300 MHz, DMSO-$d_6$) δ 10.85 (s, 1H), 8.51 (d, J = 4.8 Hz, 2H), 8.26 (d, J = 4.8 Hz, 1H), 8.19 (br s, 1H), 8.13 (d, J = 8.1 Hz, 1H), 8.05 (s, 2H), 7.86 (d, J = 8.1 Hz, 1H), 6.87-6.83 (m, 1H), 6.78-6.74 (m, 1H), 5.97-5.86 (m, 2H), 5.31-5.15 (m, 1H), 4.48 (d, J = 5.1 Hz, 2H) |
| F155 | | 3214, 1664, 1554 | ESIMS m/z 633 ($[M + H]^+$) | $^1H$ NMR (400 MHz, $CDCl_3$) δ 7.86 (d, J = 1.8 Hz, 1H), 7.78 (dd, J = 8.1, 1.8 Hz, 1H), 7.57 (d, J = 8.0 Hz, 1H), 7.43 (s, 2H), 6.39 (s, 1H), 5.82 (dd, J = 32.6, 9.6 Hz, 1H), 4.78-4.42 (m, 1H), 2.89 (t, J = 6.8 Hz, 2H), 2.76 (s, 3H), 2.38-2.22 (m, 2H), 1.94-1.76 (m, 2H); $^{19}F$ NMR (376 MHz, $CDCl_3$) δ −58.89, −66.31, −69.32 (d, J = 2.4 Hz), −111.95 (d, J = 2.7 Hz) |
| F156 | | | ESIMS m/z 601 ($[M - H]^-$) | $^1H$ NMR (400 MHz, $CDCl_3$) δ 7.93-7.79 (m, 2H), 7.73 (dd, J = 8.1, 1.7 Hz, 1H), 7.59 (d, J = 8.1 Hz, 1H), 7.44 (s, 2H), 6.98 (dd, J = 7.8, 1.4 Hz, 1H), 6.91 (td, J = 7.6, 1.4 Hz, 1H), 6.77 (td, J = 7.6, 1.4 Hz, 1H), 6.74-6.71 (m, 1H), 6.69 (t, J = 2.0 Hz, 2H), 6.22 (s, 1H), 5.83 (dd, J = 32.5, 9.6 Hz, 1H), 4.61 (p, J = 8.9 Hz, 1H); $^{19}F$ NMR (376 MHz, $CDCl_3$) δ −59.07, −69.29, −112.04 |
| F157 | | 3243, 2961, 1655, 1553 | ESIMS m/z 565 ($[M + H]^+$) | $^1H$ NMR (400 MHz, $CDCl_3$) δ 7.87 (d, J = 1.7 Hz, 1H), 7.78 (dd, J = 8.1, 1.7 Hz, 1H), 7.59 (d, J = 8.0 Hz, 1H), 7.43 (s, 2H), 7.22 (s, 1H), 5.83 (dd, J = 32.5, 9.6 Hz, 1H), 4.82 (s, 1H), 4.60 (p, J = 8.8 Hz, 1H), 2.79 (d, J = 6.9 Hz, 2H), 1.79 (dq, J = 13.6, 6.8 Hz, 1H), 0.98 (d, J = 6.7 Hz, 6H); $^{19}F$ NMR (376 MHz, $CDCl_3$) δ −59.05, −69.32 (d, J = 2.4 Hz), −111.96 (d, J = 2.6 Hz) |
| F158 | | 3182, 2973, 1711, 1680, 1530 | ESIMS m/z 606 ($[M + H]^+$) | $^1H$ NMR (400 MHz, $CDCl_3$) δ 7.95-7.90 (m, 2H), 7.86-7.82 (m, 1H), 7.74 (d, J = 8.1 Hz, 1H), 7.44 (s, 2H), 7.25 (d, J = 4.2 Hz, 1H), 6.70 (d, J = 3.6 Hz, 1H), 5.86 (dd, J = 32.5, 9.6 Hz, 1H), 4.62 (p, J = 8.8 Hz, 1H), 3.51 (s, 3H); $^{19}F$ NMR (376 MHz, $CDCl_3$) |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^{1}H$, $^{13}C$, $^{19}F$) |
| | | | | δ −58.81, −69.29 (d, J = 2.1 Hz), −111.97 (d, J = 2.6 Hz) |
| F159 | | 3210, 3007, 1664, 1553 | ESIMS m/z 577 ([M + H]$^+$) | $^{1}H$ NMR (400 MHz, $CDCl_3$) δ 7.85 (s, 1H), 7.81-7.70 (m, 1H), 7.61 (d, J = 7.9 Hz, 1H), 7.48-7.41 (m, 2H), 6.53 (d, J = 8.5 Hz, 1H), 5.81 (ddd, J = 32.6, 9.6, 4.7 Hz, 1H), 4.70-4.51 (m, 1H), 2.78 (s, 3H), 2.74 (d, J = 6.7 Hz, 2H), 1.02 (d, J = 7.7 Hz, 1H), 0.61-0.47 (m, 2H), 0.22-0.05 (m, 2H); $^{19}F$ NMR (376 MHz, $CDCl_3$) δ −58.82, −69.32 (d, J = 2.1 Hz), −110.12-−112.59 (m) |
| F160 | | 3209, 2958, 1666, 1553 | ESIMS m/z 593 ([M + H]$^+$) | $^{1}H$ NMR (400 MHz, $CDCl_3$) δ 7.85 (s, 1H), 7.77 (d, J = 8.7 Hz, 1H), 7.59 (d, J = 8.0 Hz, 1H), 7.44 (d, J = 3.1 Hz, 2H), 6.29 (s, 1H), 5.81 (dd, J = 32.5, 9.6 Hz, 1H), 4.67-4.55 (m, 1H), 2.80 (dd, J = 9.2, 6.2 Hz, 2H), 2.72 (s, 3H), 1.67 (dq, J = 13.2, 6.7 Hz, 1H), 1.52-1.39 (m, 2H), 0.92 (d, J = 6.6 Hz, 6H); $^{19}F$ NMR (376 MHz, $CDCl_3$) δ −58.80, −69.32 (d, J = 2.2 Hz), −111.89 |
| F161 | | | ESIMS m/z 601 ([M − H]$^-$) | $^{1}H$ NMR (400 MHz, $CDCl_3$) δ 7.92 (s, 1H), 7.84 (s, 1H), 7.77 (d, J = 8.3 Hz, 1H), 7.68 (d, J = 8.1 Hz, 1H), 7.44 (s, 2H), 7.41 (d, J = 8.3 Hz, 1H), 7.36 (d, J = 8.2 Hz, 1H), 6.52 (s, 1H), 5.81 (ddd, J = 32.6, 9.6, 3.8 Hz, 1H), 4.59 (q, J = 9.1 Hz, 1H), 4.52 (s, 1H); $^{19}F$ NMR (376 MHz, $CDCl_3$) δ −59.61, −69.29, −112.09 |
| F162 | | | ESIMS m/z 563 ([M + H]$^+$) | $^{1}H$ NMR (400 MHz, $CDCl_3$) δ 7.87 (s, 1H), 7.79 (d, J = 8.1 Hz, 1H), 7.59 (d, J = 8.1 Hz, 1H), 7.43 (s, 2H), 5.83 (dd, J = 32.5, 9.6 Hz, 1H), 4.60 (p, J = 8.8 Hz, 1H), 2.84 (d, J = 7.1 Hz, 2H), 1.13 (d, J = 6.3 Hz, 1H), 1.06-0.87 (m, 1H), 0.63-0.46 (m, 2H), 0.27 (t, J = 5.1 Hz, 2H); $^{19}F$ NMR (376 MHz, $CDCl_3$) δ −59.24, −69.29, −112.08 |
| F163 | | 3224, 2970, 1680, 1581, 1472 | ESIMS m/z 661 ([M + H]$^+$) | $^{1}H$ NMR (400 MHz, $CDCl_3$) δ 8.42 (d, J = 4.9 Hz, 2H), 8.36 (s, 1H), 7.92-7.88 (m, 1H), 7.85 (d, J = 8.1 Hz, 1H), 7.80 (dd, J = 8.1, 1.7 Hz, 1H), 7.55 (d, J = 5.6 Hz, 2H), 6.82 (t, J = 4.9 Hz, 1H), 5.84 (dd, J = 32.5, 9.6 Hz, 1H), 4.61 (p, J = 9.0 Hz, 1H), 2.69 (s, 1H); $^{19}F$ NMR (376 MHz, $CDCl_3$) δ −59.16, −69.47 (d, J = 2.4 Hz), −98.44, −112.14 (d, J = 2.5 Hz) |
| F164 | | | ESIMS m/z 646 ([M − H]$^-$) | $^{1}H$ NMR (400 MHz, $CDCl_3$) δ 9.17 (s, 2H), 8.29 (s, 1H), 7.91 (s, 1H), 7.89-7.76 (m, 2H), 7.45 (s, 2H), 5.89 (dd, J = 32.5, 9.6 Hz, 1H), 4.63 (p, J = 8.8 Hz, 1H), 3.65 (s, 3H); $^{19}F$ NMR (376 MHz, $CDCl_3$) δ −59.02, −69.30, −112.02 |
| F165 | | | ESIMS m/z 664 ([M − H]$^-$) | $^{1}H$ NMR (400 MHz, $CDCl_3$) δ 8.47 (d, J = 3.5 Hz, 1H), 7.87 (s, 1H), 7.78 (d, J = 1.4 Hz, 2H), 7.45 (s, 3H), 7.35 (t, J = 7.9 Hz, 1H), 6.94 (d, J = 7.6 Hz, 1H), 6.67 (d, J = 8.1 Hz, 1H), 5.86 (dd, J = 32.6, 9.6 Hz, 1H), 4.62 (p, J = 8.7 Hz, 1H); $^{19}F$ NMR (376 MHz, $CDCl_3$) δ −59.08, −69.30, −109.45-−114.53 (m) |
| F166 | | | ESIMS m/z 618 ([M − H]$^-$) | $^{1}H$ NMR (400 MHz, $CDCl_3$) δ 8.26 (d, J = 28.3 Hz, 1H), 8.07-7.69 (m, 5H), 7.45 (s, 2H), 5.86 (ddd, J = |

TABLE 4-continued

Analytical data for molecules in Table 2

| No. | mp (° C.) | IR (thin film, $cm^{-1}$) | MASS SPEC | NMR ($^1H$, $^{13}C$, $^{19}F$) |
|---|---|---|---|---|
| | | | | 32.5, 9.6, 6.5 Hz, 1H), 4.69-4.53 (m, 1H), 3.54 (s, 3H, $CH_3$, major rotamer), 3.48 (s, 3H, $CH_3$, minor rotamer), 2.22 (s, 2H); $^{19}F$ NMR (376 MHz, $CDCl_3$) δ −59.01, −69.31, −111.92 |
| F167 | | 3226, 2979, 1679 | ESIMS m/z 587 ($[M + H]^+$) | $^1H$ NMR (400 MHz, $CDCl_3$) δ 8.43 (d, J = 4.8 Hz, 2H), 8.10 (s, 1H), 7.90 (s, 1H), 7.87-7.78 (m, 2H), 7.74 (d, J = 8.1 Hz, 1H), 7.55 (d, J = 18.5 Hz, 2H), 7.43 (d, J = 8.3 Hz, 1H), 6.83 (t, J = 4.9 Hz, 1H), 5.89 (dd, J = 32.6, 9.6 Hz, 1H), 4.72 (p, J = 9.0 Hz, 1H); $^{19}F$ NMR (376 MHz, $CDCl_3$) δ −59.18, −62.80, −69.09 (d, J = 2.5 Hz), −112.08 (d, J = 2.7 Hz) |
| F168 | | | ESIMS m/z 577 ($[M - H]^-$) | $^1H$ NMR (400 MHz, $CDCl_3$) δ 9.01 (s, 1H), 8.55 (s, 1H), 8.35 (d, J = 4.9 Hz, 2H), 7.86-7.79 (m, 2H), 7.73 (dd, J = 8.2, 2.0 Hz, 1H), 7.49-7.42 (m, 2H), 7.09 (dd, J = 17.5, 11.0 Hz, 1H), 6.73 (t, J = 4.9 Hz, 1H), 6.00-5.70 (m, 2H), 5.49 (d, J = 11.1 Hz, 1H), 4.79-4.51 (m, 1H); $^{19}F$ NMR (376 MHz, $CDCl_3$) δ −59.22, −69.33, −112.78 |
| F169 | | | ESIMS m/z 629 ($[M - H]^-$) | $^1H$ NMR (400 MHz, $CDCl_3$) δ 8.36 (d, J = 4.8 Hz, 2H), 7.96 (d, J = 8.0 Hz, 1H), 7.86 (d, J = 1.6 Hz, 1H), 7.79 (dd, J = 8.0, 1.7 Hz, 1H), 7.72 (s, 1H), 7.46 (s, 2H), 6.64 (t, J = 4.8 Hz, 1H), 5.87 (dd, J = 32.6, 9.6 Hz, 1H), 5.04 (p, J = 6.6 Hz, 1H), 4.63 (p, J = 8.9 Hz, 1H), 1.25 (d, J = 2.1 Hz, 6H); $^{19}F$ NMR (376 MHz, $CDCl_3$) δ −59.10, −69.38, −112.03 |
| F170 | | | ESIMS m/z 631 ($[M - H]^-$) | $^1H$ NMR (400 MHz, $CDCl_3$) δ 8.43 (d, J = 4.8 Hz, 1H), 7.73 (s, 1H), 7.58 (dd, J = 8.2, 2.3 Hz, 1H), 7.50-7.46 (m, 1H), 7.45 (d, J = 4.8 Hz, 1H), 7.40 (s, 2H), 7.15 (d, J = 1.9 Hz, 1H), 6.74 (td, J = 4.8, 0.9 Hz, 1H), 5.70 (ddd, J = 32.7, 9.6, 1.5 Hz, 1H), 5.01 (p, J = 6.7 Hz, 1H), 4.56 (q, J = 8.8 Hz, 1H), 1.13 (d, J = 6.8 Hz, 6H); $^{19}F$ NMR (376 MHz, $CDCl_3$) δ −60.15, −66.55-−72.15 (m), −112.11 |
| F171 | | 3248, 2928, 1693, 1175 | ESIMS m/z 647 ($[M + H]^+$) | $^1H$ NMR (300 MHz, DMSO-$d_6$) δ 10.86 (s, 1H), 8.50 (d, J = 4.8 Hz, 2H), 8.19-8.08 (m, 4H), 7.86 (d, J = 7.8 Hz, 1H), 6.86-6.84 (m, 2H), 5.26-5.20 (m, 1H), 3.37 (s, 3H) |
| F172 | | 3244, 2927, 1689, 1175 | ESIMS m/z 633 ($[M + H]^+$) | $^1H$ NMR (300 MHz, DMSO-$d_6$) δ 10.40 (s, 1H), 9.25 (s, 1H), 8.50 (d, J = 4.8 Hz, 2H), 8.20-8.10 (m, 2H), 8.01 (s, 2H), 7.87 (d, J = 8.1 Hz, 1H), 6.90-6.75 (m, 2H), 5.27-5.21 (m, 1H) |
| F173 | | 3376, 2925, 1587, 1173 | ESIMS m/z 599 ($[M + H]^+$) | $^1H$ NMR (400 MHz, DMSO-$d_6$) δ 10.38 (s, 1H), 9.23 (s, 1H), 8.43 (d, J = 4.8 Hz, 2H), 8.18 (s, 1H), 8.12 (d, J = 8.4 Hz, 1H), 7.94 (s, 1H), 7.85-7.76 (m, 3H), 6.87-6.76 (m, 2H), 5.24-5.19 (m, 1H) |
| F174 | | 3859, 2928, 1507, 1175 | ESIMS m/z 555 ($[M + H]^+$) | $^1H$ NMR (300 MHz, DMSO-$d_6$) δ 10.38 (s, 1H), 9.23 (s, 1H), 8.43 (d, J = 4.8 Hz, 2H), 8.17 (s, 1H), 8.12 (d, J = 8.1 Hz, 1H), 7.88-7.83 (m, 3H), 6.86-6.71 (m, 2H), 5.24-5.19 (m, 1H) |
| F175 | | 3779, 2925, 1504, 1176 | ESIMS m/z 570 ($[M + H]^+$) | $^1H$ NMR (300 MHz, DMSO-$d_6$) δ 10.90 (s, 1H), 8.50 (d, J = 4.8 Hz, 2H), 8.19 (s, 1H), 8.13 (d, J = 8.1 Hz, 1H), 7.91-7.84 (m, 3H), 6.87-6.72 |

TABLE 4-continued

Analytical data for molecules in Table 2

| No. | mp (° C.) | IR (thin film, $cm^{-1}$) | MASS SPEC | NMR ($^{1}H$, $^{13}C$, $^{19}F$) |
|---|---|---|---|---|
| | | | | (m, 2H), 5.25-5.19 (m, 1H), 3.37 (s, 3H) |
| F176 | | 3421, 2924, 1689, 844 | ESIMS m/z 641 ([M + H]$^+$) | $^{1}H$ NMR (300 MHz, DMSO-$d_6$) δ 10.44 (s, 1H), 9.23 (s, 1H), 8.43 (d, J = 4.8 Hz, 2H), 8.18 (s, 1H), 8.13 (d, J = 8.4 Hz, 1H), 7.97 (s, 2H), 7.92 (s, 1H), 7.85 (d, J = 8.1 Hz, 1H), 6.90-6.75 (m, 2H), 5.24-5.19 (m, 1H) |
| F177 | | 3421, 2925, 1668, 750 | ESIMS m/z 641 ([M + H]$^+$) | $^{1}H$ NMR (300 MHz, DMSO-$d_6$) δ 10.40 (s, 1H), 9.21 (s, 1H), 8.43-8.42 (m, 2H), 8.18 (s, 1H), 8.11-8.10 (m, 2H), 7.86-7.80 (m, 2H), 7.63 (d, J = 9.9 Hz, 1H), 6.88 (dd, J = 36.0, 9.9 Hz, 1H), 6.80-6.73 (m, 1H), 5.21-5.14 (m, 1H) |
| F178 | | 3444, 2929, 1670, 842 | ESIMS m/z 597 ([M + H]$^+$) | $^{1}H$ NMR (300 MHz, DMSO-$d_6$) δ 10.40 (s, 1H), 9.23 (s, 1H), 8.43-8.42 (m, 2H), 8.18-8.10 (m, 2H), 7.95 (s, 1H), 7.85 (d, J = 8.1 Hz, 1H), 7.72 (s, 2H), 6.89 (dd, J = 36.0, 9.9 Hz, 1H), 6.80-6.73 (m, 1H), 5.22-5.16 (m, 1H) |
| F179 | | 3256, 2923, 1697, 1176 | ESIMS m/z 631 ([M + H]$^+$) | $^{1}H$ NMR (300 MHz, DMSO-$d_6$) δ 11.00 (s, 1H), 8.55 (d, J = 4.5 Hz, 2H), 8.20 (s, 1H), 8.14 (d, J = 8.1 Hz, 1H), 8.05 (s, 2H), 7.90 (d, J = 8.1 Hz, 1H), 6.96-6.76 (m, 2H), 5.26-5.19 (m, 3H), 3.33 (s, 3H) |
| F180 | | 3447, 3308, 2926, 1396, 1118 | ESIMS m/z 639 ([M + H]$^+$) | $^{1}H$ NMR (300 MHz, DMSO-$d_6$) δ 8.58 (d, J = 4.8 Hz, 2H), 8.09 (s, 2H), 8.00 (s, 1H), 7.83 (d, J = 8.1 Hz, 1H), 7.41 (d, J = 7.8 Hz, 1H), 6.99 (t, J = 3.9 Hz, 1H), 6.79 (dd, J = 35.1, 9.6 Hz, 1H), 5.20 (t, J = 9.6 Hz, 1H), 4.91 (d, J = 17.4 Hz, 1H), 4.25 (d, J = 17.4 Hz, 1H), 3.21 (s, 3H), 2.97 (s, 1H) |
| F181 | | | ESIMS m/z 579 ([M − H]$^-$) | $^{1}H$ NMR (400 MHz, $CDCl_3$) δ 10.48 (s, 1H), 8.42 (d, J = 4.8 Hz, 2H), 7.98-7.70 (m, 6H), 7.46 (s, 1H), 6.81 (t, J = 4.9 Hz, 1H), 6.10-5.81 (m, 1H), 4.89-4.44 (m, 1H); $^{19}F$ NMR (376 MHz, $CDCl_3$) δ −59.28, −69.47, −111.86 |
| F182 | 169-173 | 1172, 1115 | ESIMS m/z 537 ([M + H]$^+$) | $^{1}H$ NMR (500 MHz, $CDCl_3$) δ 8.41 (d, J = 4.9 Hz, 2H), 8.30 (s, 1H), 7.90-7.87 (m, 1H), 7.85-7.81 (m, 2H), 7.79 (dd, J = 8.1, 1.7 Hz, 1H), 7.32-7.24 (m, 2H), 7.18 (t, J = 8.6 Hz, 1H), 6.80 (t, J = 4.8 Hz, 1H), 5.87 (dd, J = 32.7, 9.7 Hz, 1H), 4.63 (q, J = 9.0 Hz, 1H) |
| F183 | | 3317, 2931, 1649, 1168, 809 | ESIMS m/z 662 ([M + H]$^+$) | $^{1}H$ NMR (300 MHz, DMSO-$d_6$) δ 8.77 (t, J = 6.6 Hz, 1H), 8.12-7.90 (m, 4H), 7.53 (d, J = 7.8 Hz, 1H), 6.80 (dd, J = 35.7, 9.9 Hz, 1H), 5.26-5.20 (m, 1H), 4.91-4.87 (m, 1H), 4.30 (s, 2H), 4.05-3.90 (m, 2H), 2.25 (d, J = 5.7 Hz, 3H) |
| F184 | | 3335, 2927, 1657, 1168, 807 | ESIMS m/z 676 ([M + H]$^+$) | $^{1}H$ NMR (300 MHz, DMSO-$d_6$) δ 8.77 (t, J = 6.6 Hz, 1H), 8.06-8.01 (m, 4H), 7.53 (d, J = 8.7 Hz, 1H), 6.83 (dd, J = 36.0, 10.2 Hz, 1H), 5.26-5.20 (m, 1H), 4.16 (s, 2H), 4.01-3.95 (m, 2H), 2.32 (s, 6H) |
| F185 | 106-108 | | ESIMS m/z 675 ([M + H]$^+$) | $^{1}H$ NMR (400 MHz, DMSO-$d_6$) δ 10.38 (s, 1H), 9.23 (s, 1H), 8.43 (d, J = 4.8 Hz, 2H), 8.18 (t, J = 4.0 Hz, 2H), 8.12 (d, J = 8.0 Hz, 2H), 7.85 (d, J = 8.4 Hz, 1H), 6.88-6.76 (m, 2H), 5.26-5.22 (m, 1H) |
| F186 | | | ESIMS m/z 602 ([M − H]$^-$) | $^{1}H$ NMR (400 MHz, $CDCl_3$) δ 8.44 (dd, J = 4.8, 1.7 Hz, 2H), 8.15 (s, 1H), 7.98 (d, J = 8.5 Hz, 1H), 7.91 (s, 1H), 7.85-7.80 (m, 1H), 7.74 (d, J = |

TABLE 4-continued

| Analytical data for molecules in Table 2 | | | | |
|---|---|---|---|---|
| No. | mp (° C.) | IR (thin film, $cm^{-1}$) | MASS SPEC | NMR ($^{1}H$, $^{13}C$, $^{19}F$) |
| | | | | 8.4 Hz, 1H), 7.64 (d, J = 13.2 Hz, 1H), 7.51 (t, J = 7.4 Hz, 1H), 7.03 (t, J = 54.6 Hz, 1H), 6.85-6.78 (m, 1H), 5.89 (dd, J = 32.5, 9.6 Hz, 1H), 4.82-4.62 (m, 1H); $^{19}F$ NMR (376 MHz, $CDCl_3$) δ −59.18, −68.19−−75.44 (m), −76.99, −115.77 |
| F187 | | 3431, 2100, 1694, 806 | ESIMS m/z 665 ([M + H]$^+$) | $^{1}H$ NMR (400 MHz, DMSO-$d_6$) δ 8.71 (m, 2H), 8.12 (d, J = 5.6 Hz, 1H), 8.05 (s, 1H), 8.00 (s, 2H), 7.88 (t, J = 7.60 Hz, 1H), 7.47 (d, J = 8.4 Hz, 1H), 6.78 (dd, J = 10.4, 35.6 Hz, 1H), 5.62-5.20 (m, 1H), 4.97-4.56 (m, 4H) |
| F188 | 153-155 | | ESIMS m/z 555 ([M + H]$^+$) | $^{1}H$ NMR (300 MHz, DMSO-$d_6$) δ 10.37 (s, 1H), 9.21 (s, 1H), 8.43 (d, J = 4.8 Hz, 2H), 8.16 (s, 1H), 8.11 (d, J = 7.6 Hz, 1H), 7.85 (d, J = 8.0 Hz, 1H), 7.55 (d, J = 7.6 Hz, 2H), 6.83-670 (m, 2H), 5.26-5.22 (m, 1H) |
| F189 | 154-156 | | ESIMS m/z 626 ([M + H]$^+$) | $^{1}H$ NMR (400 MHz, $CDCl_3$) δ 11.20 (s, 1H), 8.62 (d, J = 4.4 Hz, 2H), 8.21 (s, 1H), 8.15 (d, J = 8.4 Hz, 1H), 8.05 (s, 2H), 7.92 (J = 8.4 Hz, 1H), 7.04 (t, J = 4.8 Hz, 1H ), 6.84 (dd, J = 10.4, 36.0 Hz, 1H), 5.32-5.23 (m, 1H), 4.89 (s, 2H) |
| F190 | | | ESIMS m/z 623 ([M + H]$^+$) | $^{1}H$ NMR (400 MHz, methanol-$d_4$) δ 8.43 (d, J = 4.8 Hz, 2H), 8.08-8.04 (m, 2H), 7.97 (d, J = 8.0 Hz, 1H), 7.75 (s, 1H), 7.63 (s, 1H), 6.85 (t, J = 4.8 Hz, 1H), 6.54-6.40 (m, 1H), 4.99-4.89 (m, 1H), 4.58-4.57 (m, 1H), 4.19-4.17 (m, 1H), 3.95-3.90 (m, 2H), 1.38-1.21 (m, 3H) $^{19}F$ NMR (376 MHz, methanol-$d_4$) δ −60.80, −71.19, −115.22 |
| F191 | | | ESIMS m/z 593 ([M + H]$^+$) | $^{1}H$ NMR (400 MHz, methanol-$d_4$) δ 8.43 (d, J = 2.4 Hz, 2H), 8.12-8.04 (m, 2H), 7.96 (d, J = 8.8 Hz, 1H), 7.59-7.56 (m, 1H), 7.14 (d, J = 2.0 Hz, 1H), 6.85 (t, J = 4.8 Hz, 1H), 6.44 (dd, J = 10.0, 34.4 Hz, 1H), 4.92-4.89 (m, 1H), 2.04-1.99 (m, 1H), 0.92-0.88 (m, 2H), 0.78-0.74 (m, 2H) $^{19}F$ NMR (376 MHz, methanol-$d_4$) δ −61.01, −71.22, −115.92 |
| F192 | | | ESIMS m/z 585 ([M − H]$^-$) | $^{1}H$ NMR (400 MHz, $CDCl_3$) δ 9.02 (d, J = 4.8 Hz, 2H), 8.03 (d, J = 1.6 Hz, 1H), 7.97 (d, J = 8.2 Hz, 1H), 7.85 (dd, J = 8.3, 1.8 Hz, 1H), 7.54 (t, J = 4.8 Hz, 1H), 7.44 (s, 2H), 5.95 (dd, J = 32.4, 9.6 Hz, 1H), 4.63 (p, J = 8.9 Hz, 1H); $^{19}F$ NMR (376 MHz, $CDCl_3$) δ −59.36, −69.27, −112.31 |

| BAW & CL Rating Table | |
|---|---|
| % Control (or Mortality) | Rating |
| 50-100 | A |
| More than 0-Less than 50 | B |
| Not Tested | C |
| No activity noticed in this bioassay | D |

| GPA & YFM Rating Table | |
|---|---|
| % Control (or Mortality) | Rating |
| 80-100 | A |
| More than 0-Less than 80 | B |
| Not Tested | C |
| No activity noticed in this bioassay | D |

TABLE ABC

| Biological Results | | | | |
|---|---|---|---|---|
| | Species | | | |
| No. | BAW | CL | GPA | YFM |
| F1 | A | A | C | A |
| F2 | A | A | C | C |
| F3 | A | A | C | A |
| F4 | A | A | B | C |
| F5 | A | A | C | C |
| F6 | A | A | C | C |
| F7 | C | C | C | C |
| F8 | A | A | C | A |
| F9 | A | A | C | A |
| F10 | A | A | B | C |
| F11 | A | A | C | A |
| F12 | A | A | C | C |
| F13 | A | A | C | C |
| F14 | A | A | C | A |
| F15 | A | A | C | C |
| F16 | A | A | C | A |
| F17 | A | A | C | C |
| F18 | A | A | C | C |
| F19 | A | A | C | C |
| F20 | A | A | C | C |
| F21 | A | A | C | C |
| F26 | A | A | C | C |
| F27 | A | A | C | C |
| F28 | A | A | C | C |
| F29 | A | A | C | C |
| F30 | A | A | C | C |
| F31 | A | A | C | C |
| F32 | A | A | C | C |
| F33 | A | A | C | C |
| F34 | A | A | C | C |
| F35 | A | A | C | A |
| F37 | A | A | C | C |
| F38 | A | A | C | C |
| F39 | A | A | C | A |
| F40 | A | A | C | C |
| F41 | A | A | C | C |
| F42 | A | A | C | C |
| F43 | A | A | C | C |
| F44 | A | A | C | C |
| F45 | A | A | C | C |
| F48 | D | D | C | C |
| F49 | A | A | C | C |
| F50 | A | A | C | C |
| F51 | A | A | C | C |
| F52 | A | A | C | A |
| F54 | A | A | C | A |
| F55 | A | A | C | C |
| F56 | A | A | C | A |
| F57 | A | A | C | C |
| F58 | A | A | C | C |
| F59 | A | A | C | C |
| F60 | A | A | C | C |
| F61 | A | A | C | C |
| F62 | A | A | C | C |
| F63 | A | A | B | A |
| F68 | A | A | C | C |
| F69 | D | D | C | C |
| F70 | A | A | C | C |
| F71 | A | A | A | C |
| F73 | A | B | C | C |
| F74 | A | A | C | C |
| F75 | A | A | C | C |
| F77 | A | A | C | C |
| F78 | A | A | C | A |
| F79 | A | A | C | C |
| F82 | A | A | C | A |
| F83 | A | A | C | C |
| F84 | A | A | C | C |
| F85 | A | A | C | C |
| F86 | A | A | C | C |
| F87 | D | D | C | C |
| F89 | A | A | C | C |
| F90 | A | A | C | C |
| F91 | A | A | C | C |

TABLE ABC-continued

| Biological Results | | | | |
|---|---|---|---|---|
| | Species | | | |
| No. | BAW | CL | GPA | YFM |
| F92 | A | A | C | C |
| F93 | A | A | C | C |
| F94 | A | A | C | C |
| F95 | A | A | C | A |
| F96 | A | A | C | C |
| F97 | A | A | A | C |
| F98 | A | A | C | C |
| F99 | A | A | C | A |
| F100 | A | A | C | A |
| F101 | A | A | C | C |
| F102 | A | A | C | A |
| F103 | A | A | C | C |
| F104 | A | A | C | C |
| F105 | A | A | C | C |
| F106 | A | A | C | C |
| F107 | A | A | C | C |
| F109 | A | A | C | A |
| F110 | A | A | C | C |
| F111 | A | A | C | A |
| F112 | A | A | C | C |
| F113 | A | A | C | C |
| F114 | A | A | C | C |
| F116 | A | A | C | C |
| F117 | A | A | C | A |
| F118 | A | A | C | C |
| F120 | A | A | C | C |
| F121 | A | A | C | C |
| F122 | A | A | C | D |
| F123 | A | A | C | C |
| F125 | A | A | C | C |
| F126 | A | A | C | A |
| F128 | A | A | C | A |
| F129 | A | A | C | C |
| F130 | A | A | C | A |
| F131 | D | D | C | C |
| F132 | A | A | C | C |
| F133 | A | A | C | A |
| F134 | A | A | C | A |
| F135 | A | A | C | C |
| F136 | A | A | C | C |
| F137 | A | A | C | C |
| F138 | A | A | C | C |
| F140 | A | A | C | C |
| F141 | A | A | C | C |
| F142 | A | A | C | C |
| F143 | A | B | C | C |
| F144 | A | A | C | C |
| F145 | A | A | C | C |
| F146 | A | A | C | C |
| F147 | A | A | C | C |
| F148 | A | A | C | A |
| F149 | A | A | C | C |
| F150 | A | A | C | C |
| F151 | A | A | C | C |
| F152 | A | A | C | A |
| F155 | A | A | C | C |
| F156 | A | A | C | C |
| F157 | A | A | C | C |
| F158 | A | A | C | A |
| F159 | A | A | C | C |
| F160 | A | A | C | C |
| F161 | C | C | C | C |
| F162 | A | A | C | C |
| F163 | A | A | C | C |
| F164 | A | A | C | C |
| F165 | A | A | C | C |

TABLE ABC-continued

| Biological Results | | | | |
|---|---|---|---|---|
| | Species | | | |
| No. | BAW | CL | GPA | YFM |
| F166 | A | A | C | C |
| F167 | A | A | C | C |
| F168 | A | A | C | C |
| F169 | A | A | C | C |
| F170 | A | A | C | C |
| F171 | A | A | C | C |
| F172 | A | A | C | A |
| F173 | A | A | C | C |
| F174 | A | A | C | C |
| F175 | A | A | C | C |
| F176 | A | A | C | A |
| F177 | A | A | C | C |
| F178 | A | A | C | C |
| F179 | A | A | C | C |
| F180 | A | A | B | A |

TABLE ABC-continued

| Biological Results | | | | |
|---|---|---|---|---|
| | Species | | | |
| No. | BAW | CL | GPA | YFM |
| F181 | C | C | C | C |
| F182 | A | A | C | C |
| F183 | A | A | C | A |
| F184 | A | A | C | A |
| F185 | A | A | C | C |
| F186 | A | A | C | C |
| F187 | A | A | C | C |
| F188 | A | A | C | C |
| F189 | A | A | C | C |
| F190 | A | A | C | C |
| F191 | A | A | C | C |
| F192 | A | A | C | C |
| C25 | A | A | C | A |

TABLE CD-1

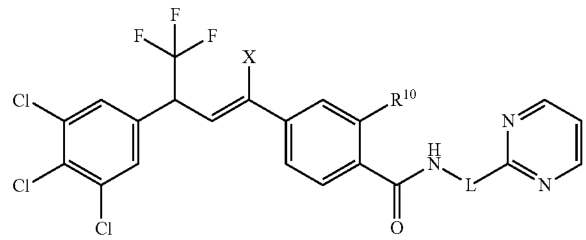

| | | | | 50 μg/cm² | | 5.0 μg/cm² | | 0.05 μg/cm² | |
|---|---|---|---|---|---|---|---|---|---|
| # | $R^{10}$ | L | X | BAW | CL | BAW | CL | BAW | CL |
| 1A | H | NH | F | 100 | 100 | 25 | 0 | 0 | 0 |
| F37 | $CH_3$ | NH | F | 100 | 100 | 100 | 100 | 0 | 0 |
| F97 | $CF_3$ | NH | F | 100 | 100 | 100 | 100 | 100 | 100 |

TABLE CD-2

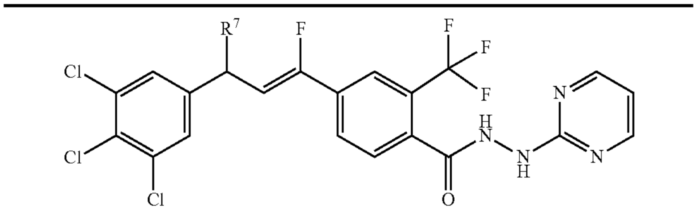

| | | 5.0 μg/cm² | | 0.5 μg/cm² | | 0.05 μg/cm² | | 0.005 μg/cm² | |
|---|---|---|---|---|---|---|---|---|---|
| | | BAW | CL | BAW | CL | BAW | CL | BAW | CL |
| F120 | R-$CF_3$ | 100 | 100 | 100 | 100 | 100 | 100 | 100 | 100 |
| F94 | S-$CF_3$ | 100 | 100 | 7 | 100 | 0 | 0 | 0 | 0 |

The invention claimed is:

1. A molecule having the following formula

Formula One

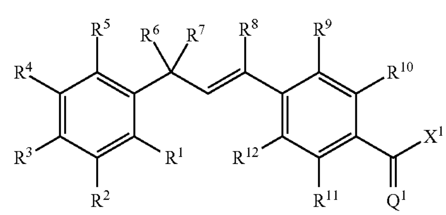

wherein:

(A) $R^1$ is selected from the group consisting of H, F, Cl, Br, I, CN, $NO_2$, $(C_1\text{-}C_6)$alkyl, $(C_1\text{-}C_6)$haloalkyl, $(C_1\text{-}C_6)$alkoxy, $(C_1\text{-}C_6)$haloalkoxy, $(C_2\text{-}C_6)$alkenyl, $(C_2\text{-}C_6)$alkenyl-O-$(C_1\text{-}C_6)$alkyl, $(C_2\text{-}C_6)$alkynyl, $(C_3\text{-}C_6)$cycloalkyl, C(=O)H, $SR^x$, $SOR^x$, $SO_2R^x$, wherein $R^x$ is selected from the group consisting of $(C_1\text{-}C_6)$alkyl and $(C_1\text{-}C_6)$haloalkyl;

(B) $R^2$ is selected from the group consisting of H, F, Cl, Br, I, CN, $NO_2$, $(C_1\text{-}C_6)$alkyl, $(C_1\text{-}C_6)$haloalkyl, $(C_1\text{-}C_6)$alkoxy, $(C_1\text{-}C_6)$haloalkoxy, $(C_2\text{-}C_6)$alkenyl, $(C_2\text{-}C_6)$alkenyl-O-$(C_1\text{-}C_6)$alkyl, $(C_2\text{-}C_6)$alkynyl, $(C_3\text{-}C_6)$ cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(C) $R^3$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(D) $R^4$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(E) $R^5$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl and $(C_1-C_6)$haloalkyl;

(F) $R^6$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy;

(G) $R^7$ is $(C_1-C_6)$haloalkyl;

(H) $R^8$ is F;

(I) $R^9$ is selected from the group consisting of (O), H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(J) $R^{10}$ is selected from the group consisting of (O), F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(K) $R^{11}$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(L) $R^{12}$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(M) $Q^1$ is selected from the group consisting of O and S;

(N) $X^1$ is selected from (1), (2), (3), and (4) wherein (1) $N(R^{13})N(R^{14})(R^{15})$ wherein (a) said $R^{13}$ is selected from the group consisting of H, $(C_1-C_6)$alkyl, $(C_1-C_6)$alkyl nitrile, $(C_1-C_6)$alkylC(═O)N(H)($(C_1-C_6)$alkyl), $(C_1-C_6)$alkylC(═O)N(H)($(C_1-C_6)$haloalkyl), $(C_1-C_6)$alkyl-O-$(C_1-C_6)$alkyl, $(C_1-C_6)$alkyl$(C_3-C_6)$cycloalkyl, $(C_2-C_6)$alkenyl, $(C_2-C_6)$alkynyl, $(C_1-C_6)$haloalkyl, $(C_1-C_6)$alkoxy, $(C_1-C_6)$haloalkoxy, $(C_3-C_6)$cycloalkyl, phenyl, heterocyclyl, substituted phenyl, and substituted heterocyclyl, wherein said substituted phenyl and substituted heterocyclyl are substituted with one or more substituents independently selected from the group consisting of F, Cl, Br, CN, $NO_2$, $NH_2$, OH, $(C_1-C_6)$alkyl, $(C_1-C_6)$haloalkyl, $(C_3-C_6)$cycloalkyl, $(C_1-C_6)$alkoxy, $(C_1-C_6)$haloalkoxy, C(═O)O$(C_1-C_6)$alkyl, oxo, C(═O)NH$(C_1-C_6)$alkyl, C(═O)NH$(C_1-C_6)$haloalkyl, S$(C_1-C_6)$alkyl, $S(O)_2(C_1-C_6)$alkyl, S(O)$(C_1-C_6)$alkyl, and $N((C_1-C_6)alkyl)_2$, (b) said $R^{14}$ is selected from the group consisting of H, $(C_1-C_6)$alkyl, $(C_1-C_6)$alkyl nitrile, $(C_1-C_6)$alkylC(═O)N(H)($(C_1-C_6)$alkyl), $(C_1-C_6)$alkylC(═O)N(H)($(C_1-C_6)$haloalkyl), $(C_1-C_6)$alkyl-O-$(C_1-C_6)$alkyl, $(C_1-C_6)$alkyl$(C_3-C_6)$cycloalkyl, $(C_2-C_6)$alkenyl, $(C_2-C_6)$alkynyl, $(C_1-C_6)$haloalkyl, $(C_1-C_6)$alkoxy, $(C_1-C_6)$haloalkoxy, $(C_3-C_6)$cycloalkyl, phenyl, heterocyclyl, substituted phenyl, and substituted heterocyclyl, wherein said substituted phenyl and substituted heterocyclyl are substituted with one or more substituents independently selected from the group consisting of F, Cl, Br, CN, $NO_2$, $NH_2$, OH, $(C_1-C_6)$alkyl, $(C_1-C_6)$haloalkyl, $(C_3-C_6)$cycloalkyl, $(C_1-C_6)$alkoxy, $(C_1-C_6)$haloalkoxy, C(═O)O$(C_1-C_6)$alkyl, oxo, C(═O)NH$(C_1-C_6)$alkyl, C(═O)NH$(C_1-C_6)$haloalkyl, S$(C_1-C_6)$alkyl, $S(O)_2(C_1-C_6)$alkyl, S(O)$(C_1-C_6)$alkyl, and $N((C_1-C_6)alkyl)_2$, (c) said $R^{15}$ is selected from the group consisting of (i) H, $(C_1-C_6)$alkyl, $(C_1-C_6)$haloalkyl, $(C_1-C_6)$alkyl nitrile, $(C_2-C_6)$alkenyl, $(C_2-C_6)$alkynyl, $(C_1-C_6)$alkoxy, $(C_1-C_6)$haloalkoxy, wherein each of which may be substituted with, F, Cl, Br, I, CN, $NO_2$, $NH_2$, OH, $(C_1-C_6)$haloalkyl, $(C_3-C_6)$cycloalkyl, O$(C_1-C_6)$alkyl, O$(C_1-C_6)$haloalkyl, C(═O)O$(C_1-C_6)$alkyl, S$(C_1-C_6)$alkyl, $S(O)_2(C_1-C_6)$alkyl, S(O)$(C_1-C_6)$alkyl, and $N((C_1-C_6)alkyl)_2$, (ii) $(C_1-C_6)$alkyl$(C_3-C_6)$cycloalkyl, $(C_1-C_6)$alkylphenyl, $(C_3-C_6)$cycloalkyl, phenyl, and heterocyclyl, wherein each of which may be substituted with, H to saturate an unsaturation, F, Cl, Br, I, CN, $NO_2$, $NH_2$, OH, $(C_1-C_6)$alkyl, $(C_1-C_6)$haloalkyl, O$(C_1-C_6)$alkyl, O$(C_1-C_6)$haloalkyl, C(═O)O$(C_1-C_6)$alkyl, oxo, S$(C_1-C_6)$alkyl, $S(O)_2(C_1-C_6)$alkyl, S(O)$(C_1-C_6)$alkyl, and $N((C_1-C_6)alkyl)_2$, (2) $N(R^{16})N═C(R^{17})(R^{18})$ wherein $R^{16}$ and $R^{17}$ are H, and $R^{18}$ is selected from the group consisting of substituted or unsubstituted phenyl, and substituted or unsubstituted heterocyclyl, wherein said substituents on said substituted phenyl and substituted heterocyclyl are selected from the group consisting of wherein each of which may be substituted with, H to saturate an unsaturation, F, Cl, Br, I, CN, $NO_2$, $NH_2$, OH, $(C_1-C_6)$alkyl, $(C_1-C_6)$haloalkyl, O$(C_1-C_6)$alkyl, oxo, $S(O)_2(C_1-C_6)$alkyl, S(O)$(C_1-C_6)$alkyl, and $N((C_1-C_6)alkyl)_2$, (3) $N═N(R^{19})$ wherein said $R^{19}$ is selected from the group consisting of substituted or unsubstituted phenyl, and substituted or unsubstituted heterocyclyl, wherein said substituents on said substituted phenyl and substituted heterocyclyl are selected from the group consisting of wherein each of which may be substituted with, H to saturate an unsaturation, F, $C_1$, Br, I, CN, $NO_2$, $NH_2$, OH, $(C_1-C_6)$alkyl, $(C_1-C_6)$ haloalkyl, $O(C_1-C_6)$alkyl, oxo, $S(O)_2(C_1-C_6)$alkyl, $S(O)(C_1-C_6)$alkyl, and $N((C_1-C_6)alkyl)_2$, (4) N(H)—$R^{20}$ wherein $R^{20}$ is a heterocyclyl containing at least one nitrogen atom, wherein said nitrogen atom is bonded to N(H)-, wherein said heterocyclyl may be substituted with, H to saturate an unsaturation, F, Cl, Br, I, CN, $NO_2$, $NH_2$, OH, $(C_1-C_6)$alkyl, $(C_1-C_6)$haloalkyl, $O(C_1-C_6)$alkyl, oxo, $S(O)_2(C_1-C_6)$ alkyl, $S(O)(C_1-C_6)$alkyl, and $N((C_1-C_6)alkyl)_2$;

(O) $R^9$ and $R^{10}$ together can optionally form a 3- to 5-membered saturated or unsaturated, hydrocarbyl link, wherein said hydrocarbyl link may optionally be substituted with one or more substituents independently selected from the group consisting of F, Cl, Br, I, CN, OH, and oxo;

and N-oxides, pro-insecticides, agriculturally acceptable acid addition salts, salt derivatives, solvates, ester derivatives, isotopes, resolved stereoisomers, and tautomers, of the molecules of Formula One with the proviso that the following molecules are excluded

EM-1

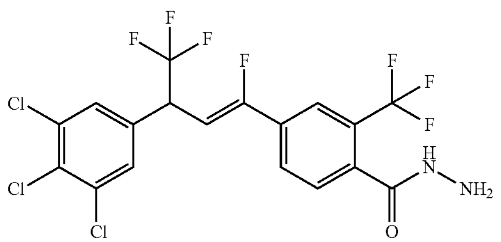

EM-2

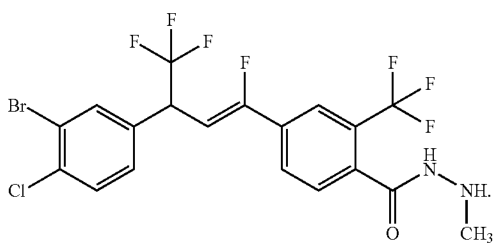

2. A molecule according to claim 1 wherein:

(A) $R^1$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$ cycloalkyl, C(═O)H, $SR^x$, $SOR^x$, $SO_2R^x$, wherein $R^x$ is selected from the group consisting of $(C_1-C_6)$alkyl and $(C_1-C_6)$haloalkyl;

(B) $R^2$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$ cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(C) $R^3$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$ cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(D) $R^4$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$ cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(E) $R^5$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$ cycloalkyl, C(═O)H, $SR^x$, $SOR^x$, $SO_2R^x$, wherein $R^x$ is selected from the group consisting of $(C_1-C_6)$alkyl and $(C_1-C_6)$haloalkyl;

(F) $R^6$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy;

(G) $R^7$ is $(C_1-C_6)$haloalkyl;

(H) $R^8$ is F;

(I) $R^9$ is selected from the group consisting of (O), H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$cycloalkyl, C(═O)H, $SR^x$, $SOR^x$, $SO_2R^x$, wherein $R^x$ is selected from the group consisting of $(C_1-C_6)$ alkyl, $(C_1-C_6)$haloalkyl, and $(C_3-C_6)$cycloalkyl;

(J) $R^{10}$ is selected from the group consisting of (O), F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$ cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(K) $R^{11}$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$ cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(L) $R^{12}$ is selected from the group consisting of H, F, Cl, Br, I, CN, $NO_2$, $(C_1-C_6)$alkyl, $(C_1-C_6)$haloalkyl, $(C_1-C_6)$alkoxy, $(C_1-C_6)$haloalkoxy, $(C_2-C_6)$alkenyl, $(C_2-C_6)$alkenyl-O-$(C_1-C_6)$alkyl, $(C_2-C_6)$alkynyl, $(C_3-C_6)$ cycloalkyl, C(═O)H, $SR^x$, $SOR^x$, $SO_2R^x$, wherein $R^x$ is selected from the group consisting of $(C_1-C_6)$alkyl, $(C_1-C_6)$haloalkyl, and $(C_3-C_6)$cycloalkyl;

(M) $C_2^1$ is selected from the group consisting of O and S;

(N) $X^1$ is selected from (1), (2), (3), and (4) wherein (1) $N(R^{13})N(R^{14})(R^{15})$ wherein (a) said $R^{13}$ is selected from the group consisting of H, $(C_1-C_6)$alkyl, $(C_1-C_6)$alkyl nitrile, $(C_1-C_6)$ alkylC(═O)N(H)($(C_1-C_6)$alkyl), $(C_1-C_6)$alkylC (═O)N(H)($(C_1-C_6)$haloalkyl), $(C_1-C_6)$alkyl-O-$(C_1-C_6)$alkyl, $(C_1-C_6)$alkyl$(C_3-C_6)$cycloalkyl, $(C_2-C_6)$alkenyl, $(C_2-C_6)$alkynyl, $(C_1-C_6)$haloalkyl, $(C_1-C_6)$alkoxy, $(C_1-C_6)$haloalkoxy, $(C_3-C_6)$cycloalkyl, phenyl, heterocyclyl, substituted phenyl, and substituted heterocyclyl, wherein said substituted phenyl and substituted heterocyclyl are substituted with one or more substituents independently selected from the group consisting of F, Cl, Br, CN, $NO_2$, $NH_2$, OH, $(C_1-C_6)$alkyl, $(C_1-C_6)$ haloalkyl, $(C_3-C_6)$cycloalkyl, $(C_1-C_6)$alkoxy, $(C_1-C_6)$haloalkoxy, C(═O)O$(C_1-C_6)$alkyl, oxo, $C(=O)NH(C_1-C_6)alkyl$, $C(=O)NH(C_1-C_6)haloalkyl$, $S(C_1-C_6)alkyl$, $S(O)_2(C_1-C_6)alkyl$, $S(O)(C_1-C_6)alkyl$, and $N((C_1-C_6)alkyl)_2$, (b) said $R^{14}$ is selected from the group consisting of H, $(C_1-C_6)alkyl$, $(C_1-C_6)alkyl$ nitrile, $(C_1-C_6)alkylC(=O)N(H)((C_1-C_6)alkyl)$, $(C_1-C_6)alkylC(=O)N(H)((C_1-C_6)haloalkyl)$, $(C_1-C_6)alkyl\text{-}O\text{-}(C_1-C_6)alkyl$, $(C_1-C_6)alkyl(C_3-C_6)cycloalkyl$, $(C_2-C_6)alkenyl$, $(C_2-C_6)alkynyl$, $(C_1-C_6)haloalkyl$, $(C_1-C_6)alkoxy$, $(C_1-C_6)haloalkoxy$, $(C_3-C_6)cycloalkyl$, phenyl, heterocyclyl, substituted phenyl, and substituted heterocyclyl, wherein said substituted phenyl and substituted heterocyclyl are substituted with one or more substituents independently selected from the group consisting of F, Cl, Br, CN, $NO_2$, $NH_2$, OH, $(C_1-C_6)alkyl$, $(C_1-C_6)haloalkyl$, $(C_3-C_6)cycloalkyl$, $(C_1-C_6)alkoxy$, $(C_1-C_6)haloalkoxy$, $C(=O)O(C_1-C_6)alkyl$, oxo, $C(=O)NH(C_1-C_6)alkyl$, $C(=O)NH(C_1-C_6)haloalkyl$, $S(C_1-C_6)alkyl$, $S(O)_2(C_1-C_6)alkyl$, $S(O)(C_1-C_6)alkyl$, and $N((C_1-C_6)alkyl)_2$, (c) said $R^{15}$ is selected from the group consisting of (i) H, $(C_1-C_6)alkyl$, $(C_1-C_6)haloalkyl$, $(C_1-C_6)alkyl$ nitrile, $(C_2-C_6)alkenyl$, $(C_2-C_6)alkynyl$, $(C_1-C_6)alkoxy$, $(C_1-C_6)haloalkoxy$, wherein each of which may be substituted with, F, Cl, Br, I, CN, $NO_2$, $NH_2$, OH, $(C_1-C_6)haloalkyl$, $(C_3-C_6)cycloalkyl$, $O(C_1-C_6)alkyl$, $O(C_1-C_6)haloalkyl$, $C(=O)O(C_1-C_6)alkyl$, $S(C_1-C_6)alkyl$, $S(O)_2(C_1-C_6)alkyl$, $S(O)(C_1-C_6)alkyl$, and $N((C_1-C_6)alkyl)_2$, (ii) $(C_1-C_6)alkyl(C_3-C_6)cycloalkyl$, $(C_1-C_6)alkylphenyl$, $(C_3-C_6)cycloalkyl$, phenyl, and heterocyclyl, wherein each of which may be substituted with, H to saturate an unsaturation, F, Cl, Br, I, CN, $NO_2$, $NH_2$, OH, $(C_1-C_6)alkyl$, $(C_1-C_6)haloalkyl$, $O(C_1-C_6)alkyl$, $O(C_1-C_6)haloalkyl$, $C(=O)O(C_1-C_6)alkyl$, oxo, $S(C_1-C_6)alkyl$, $S(O)_2(C_1-C_6)alkyl$, $S(O)(C_1-C_6)alkyl$, and $N((C_1-C_6)alkyl)_2$, (2) $N(R^{16})N=C(R^{17})(R^{18})$ wherein $R^{16}$ and $R^{17}$ are H, and $R^{18}$ is selected from the group consisting of substituted or unsubstituted phenyl, and substituted or unsubstituted heterocyclyl, wherein said substituents on said substituted phenyl and substituted heterocyclyl are selected from the group consisting of wherein each of which may be substituted with, H to saturate an unsaturation, F, Cl, Br, I, CN, $NO_2$, $NH_2$, OH, $(C_1-C_6)alkyl$, $(C_1-C_6)haloalkyl$, $O(C_1-C_6)alkyl$, oxo, $S(O)_2(C_1-C_6)alkyl$, $S(O)(C_1-C_6)alkyl$, and $N((C_1-C_6)alkyl)_2$, (3) $N=N(R^{19})$ wherein said $R^{19}$ is selected from the group consisting of substituted or unsubstituted phenyl, and substituted or unsubstituted heterocyclyl, wherein said substituents on said substituted phenyl and substituted heterocyclyl are selected from the group consisting of wherein each of which may be substituted with, H to saturate an unsaturation, F, $C_1$, Br, I, CN, $NO_2$, $NH_2$, OH, $(C_1-C_6)alkyl$, $(C_1-C_6)haloalkyl$, $O(C_1-C_6)alkyl$, oxo, $S(O)_2(C_1-C_6)alkyl$, $S(O)(C_1-C_6)alkyl$, and $N((C_1-C_6)alkyl)_2$, (4) $N(H)—R^{20}$ wherein $R^{20}$ is a heterocyclyl containing at least one nitrogen atom, wherein said nitrogen atom is bonded to N(H)-, wherein said heterocyclyl may be substituted with, H to saturate an unsaturation, F, Cl, Br, I, CN, $NO_2$, $NH_2$, OH, $(C_1-C_6)alkyl$, $(C_1-C_6)haloalkyl$, $O(C_1-C_6)alkyl$, oxo, $S(O)_2(C_1-C_6)alkyl$, $S(O)(C_1-C_6)alkyl$, and $N((C_1-C_6)alkyl)_2$; and (O) $R^9$ and $R^{10}$ together can optionally form a 3- to 5-membered saturated or unsaturated, hydrocarbyl link, wherein said hydrocarbyl link may optionally be substituted with one or more substituents independently selected from the group consisting of F, Cl, Br, I, CN, OH, and oxo.

3. A molecule according to claim 2 wherein:

(A) $R^1$ is H;

(B) $R^2$ is selected from the group consisting of H, F, Cl, Br, $CF_3$, $CHF_2$, $OCF_3$, $C(=O)H$, $C=CH_2$, and cyclopropyl;

(C) $R^3$ is selected from the group consisting of H, F, Cl, Br, $CF_3$, $OCF_3$, and $C(OCH_2CH_3)(=CH_2)$;

(D) $R^4$ is selected from the group consisting of H, F, Cl, Br, $CF_3$, $CHF_2$, $OCF_3$, $C(=O)H$, $C=CH_2$, and cyclopropyl;

(E) $R^5$ is H;

(F) $R^6$ is H;

(G) $R^7$ is $CF_3$;

(H) $R^8$ is F;

(I) $R^9$ is H;

(J) $R^{10}$ is selected from the group consisting of CI, Br, $CF_3$, and $CH_3$;

(K) $R^{11}$ is H;

(L) $R^{12}$ is H;

(M) $Q^1$ is O; and (N) $X^1$ is selected from (1) $N(R^{13})N(R^{14})(R^{15})$ wherein (a) said $R^{13}$ is selected from the group consisting of H, $CH_3$, $CH_2CH_3$, $CH(CH_3)_2$, $CH_2CN$, $CH_2C(=O)N(H)(CH_2CF_3)$, $CH_2CH=CH_2$, $CH_2—O—CH_3$, $CH_2$cyclopropyl, cyclopropyl, propargyl, dichloropyridazinyl, and methylthiazolyl, (b) said $R^{14}$ is selected from the group consisting of H, $CH_3$, $CH_2CH_3$, $CH(CH_3)_2$, $CH_2CN$, $CH_2C(=O)N(H)(CH_2CF_3)$, $CH_2CH=CH_2$, $CH_2\text{-}O—CH_3$, $CH_2$cyclopropyl, cyclopropyl, propargyl, dichloropyridazinyl, and methylthiazolyl, (c) said $R^{15}$ is selected from the group consisting of (i) H, $CH_3$, $CH_2CH_2$, $C(CH_3)_3$, $CH_2C(CH_3)_3$, $CH_2CH_2CH(CH_3)_2$, $CH_2CH(CH_3)_2$, $CH_2CF_3$, $CH_2CH_2CH_2CF_3$, $CH_2CH_2CN$, wherein each of which may be substituted with, F, Cl, Br, CN, $NO_2$, $NH_2$, OH, $CF_3$, $OCH_3$, $C(=O)OCH_3$, $SCH_3$, $S(O)_2CH_3$, $S(O)CH_3$, and $N(CH_3)_2$, (ii) $CH_2$-cyclopropyl, $CH_2$-phenyl, cyclohexyl, cyclopentyl, imidazolyl, phenyl, pyrazinyl, pyridazinyl, pyridinyl, pyrimidinyl, tetrahydrothiophenyl, tetrazolyl, thiazolyl, thienyl, and 1,3,5-triazinyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, $C(=O)OCH_3$, oxo, $SCH_3$, $S(O)_2CH_3$, $S(O)CH_3$, and $N(CH_3)_2$;

(2) $N(H)N=C(H)(R^{18})$ wherein $R^{18}$ is phenyl or a heterocyclyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, oxo, $S(O)_2CH_3$, $S(O)CH_3$, and $N(CH_3)_2$, (3) N═N($R^{19}$) wherein said $R^{19}$ is phenyl or a heterocyclyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, oxo, $S(O)_2CH_3$, $S(O)CH_3$, and $N(CH_3)_2$, (4) N(H)—$R^{20}$ wherein $R^{20}$ is selected from the group consisting of indolyl, imidazolyl, pyrrolyl, thiomorpholino, and triazolyl, wherein each of which may be substituted with, H to saturate an unsaturation, F, Cl, Br, CN, $NO_2$, $NH_2$, OH, $CH_3$, $CH_2CH_3$, $CF_3$, $OCH_3$, oxo, $S(O)_2CH_3$, $S(O)CH_3$, and $N(CH_3)_2$.

4. A molecule according to claim 2, wherein said molecule is selected from group consisting of the following molecules

| No. | Structure |
|---|---|
| F1 | 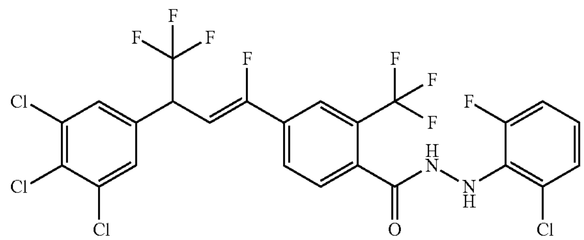 [SMILES: O=C(NNc1c(F)cccc1Cl)c1ccc(/C(F)=C/C(c2cc(Cl)c(Cl)c(Cl)c2)C(F)(F)F)cc1C(F)(F)F] |
| F2 | 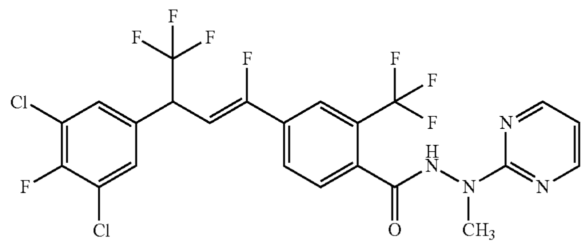 |
| F3 | 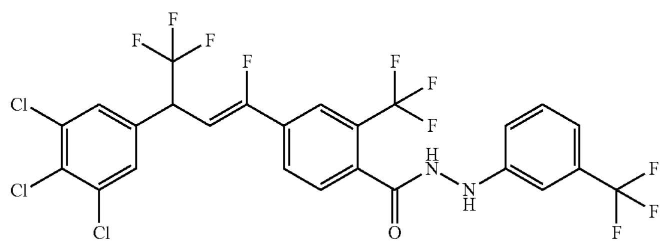 [SMILES: O=C(NNc1cccc(C(F)(F)F)c1)c1ccc(/C(F)=C/C(c2cc(Cl)c(Cl)c(Cl)c2)C(F)(F)F)cc1C(F)(F)F] |
| F4 | 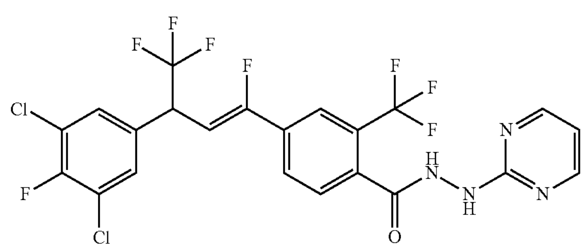 |
| F5 | 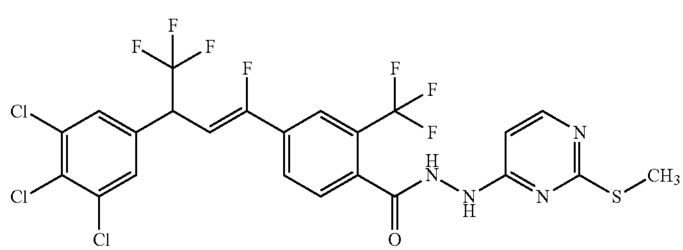 [SMILES: CSc1nccc(NNC(=O)c2ccc(/C(F)=C/C(c3cc(Cl)c(Cl)c(Cl)c3)C(F)(F)F)cc2C(F)(F)F)n1] |

-continued
| No. | Structure |
| --- | --- |
| F6 | 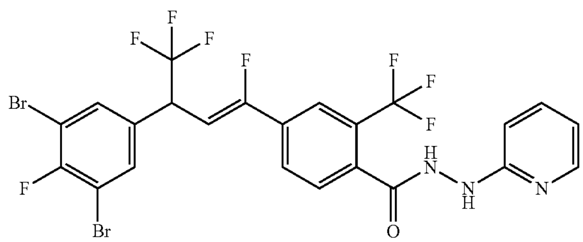 |
| F8 | 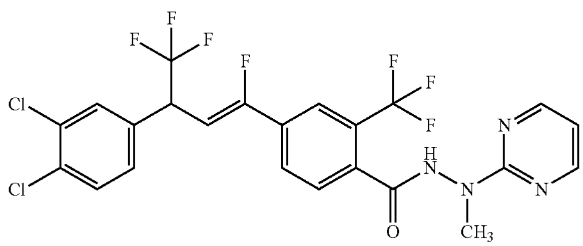 [SMILES: CN(NC(=O)c1ccc(/C(F)=C/C(c2ccc(Cl)c(Cl)c2)C(F)(F)F)cc1C(F)(F)F)c1ncccn1] |
| F9 | 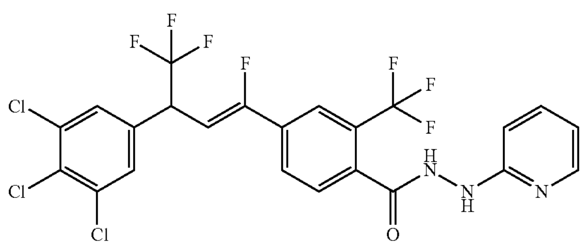 [SMILES: O=C(NNc1ccccn1)c1ccc(/C(F)=C/C(c2cc(Cl)c(Cl)c(Cl)c2)C(F)(F)F)cc1C(F)(F)F] |
| F10 | 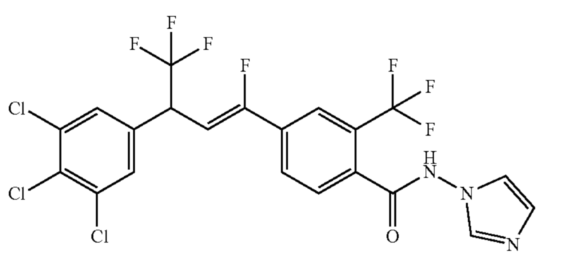 [SMILES: O=C(Nn1ccnc1)c1ccc(/C(F)=C/C(c2cc(Cl)c(Cl)c(Cl)c2)C(F)(F)F)cc1C(F)(F)F] |
| F11 | 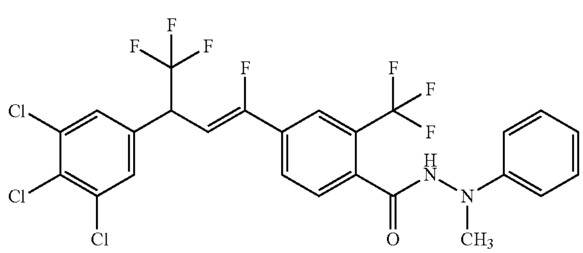 [SMILES: CN(NC(=O)c1ccc(/C(F)=C/C(c2cc(Cl)c(Cl)c(Cl)c2)C(F)(F)F)cc1C(F)(F)F)c1ccccc1] |
| F12 | 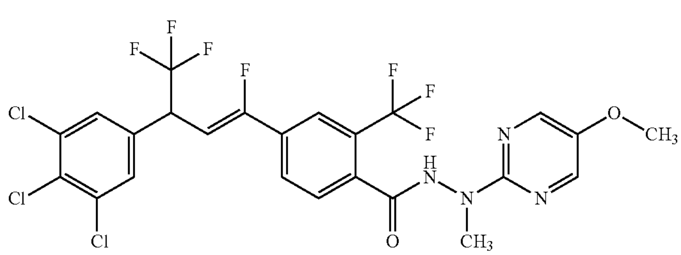 [SMILES: COc1cnc(N(C)NC(=O)c2ccc(/C(F)=C/C(c3cc(Cl)c(Cl)c(Cl)c3)C(F)(F)F)cc2C(F)(F)F)nc1] |

-continued
| No. | Structure |
|---|---|
| F13 | 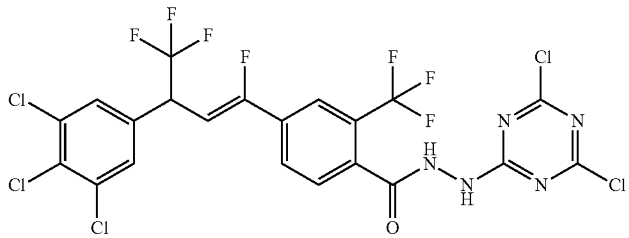 [SMILES: O=C(NNc1nc(Cl)nc(Cl)n1)c1ccc(/C(F)=C/C(c2cc(Cl)c(Cl)c(Cl)c2)C(F)(F)F)cc1C(F)(F)F] |
| F14 | 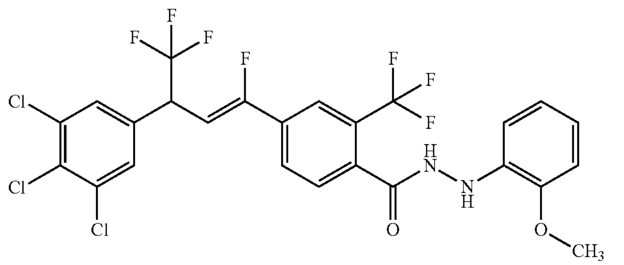 [SMILES: COc1ccccc1NNC(=O)c1ccc(/C(F)=C/C(c2cc(Cl)c(Cl)c(Cl)c2)C(F)(F)F)cc1C(F)(F)F] |
| F15 | 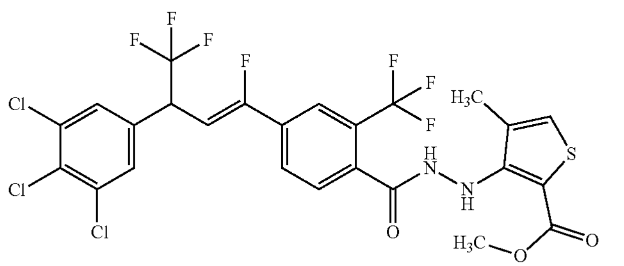 [SMILES: COC(=O)c1scc(C)c1NNC(=O)c1ccc(/C(F)=C/C(c2cc(Cl)c(Cl)c(Cl)c2)C(F)(F)F)cc1C(F)(F)F] |
| F16 | 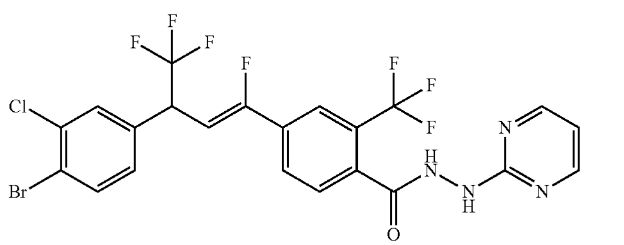 |
| F17 | 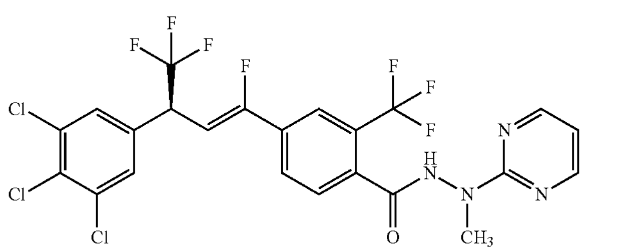 |
| F18 | 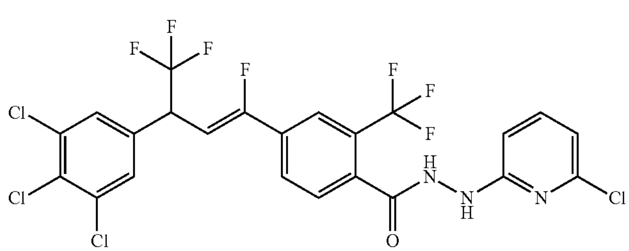 |

-continued
| No. | Structure |
|---|---|
| F19 | 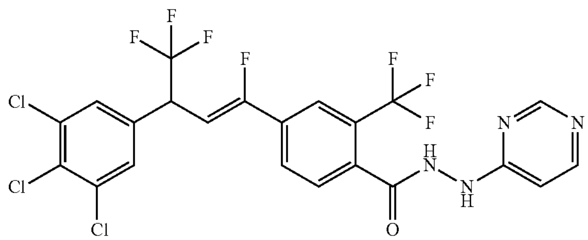 [SMILES: O=C(NNc1ccncn1)c1ccc(/C(F)=C/C(c2cc(Cl)c(Cl)c(Cl)c2)C(F)(F)F)cc1C(F)(F)F] |
| F20 | 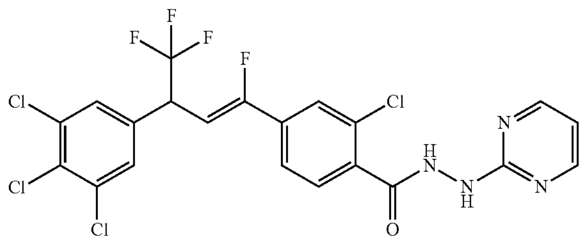 [SMILES: O=C(NNc1ncccn1)c1ccc(/C(F)=C/C(c2cc(Cl)c(Cl)c(Cl)c2)C(F)(F)F)cc1Cl] |
| F21 | 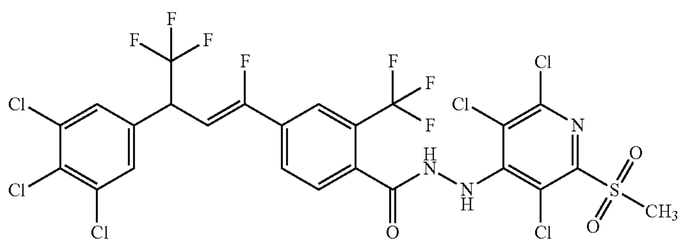 [SMILES: CS(=O)(=O)c1nc(Cl)c(Cl)c(NNC(=O)c2ccc(/C(F)=C/C(c3cc(Cl)c(Cl)c(Cl)c3)C(F)(F)F)cc2C(F)(F)F)c1Cl] |
| F26 | 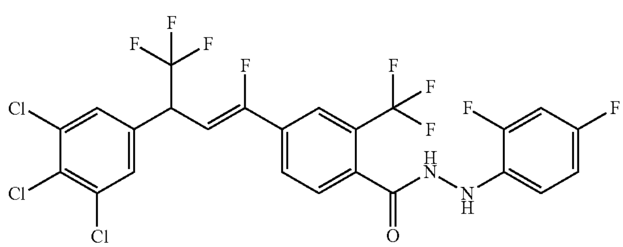 [SMILES: O=C(NNc1ccc(F)cc1F)c1ccc(/C(F)=C/C(c2cc(Cl)c(Cl)c(Cl)c2)C(F)(F)F)cc1C(F)(F)F] |
| F27 | 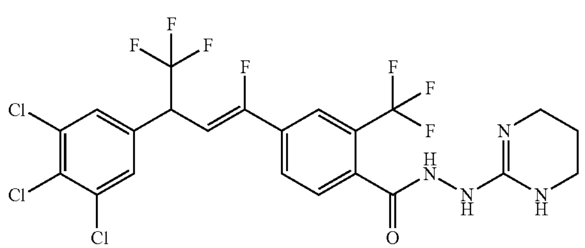 [SMILES: O=C(NNC1=NCCCN1)c1ccc(/C(F)=C/C(c2cc(Cl)c(Cl)c(Cl)c2)C(F)(F)F)cc1C(F)(F)F] |
| F28 | 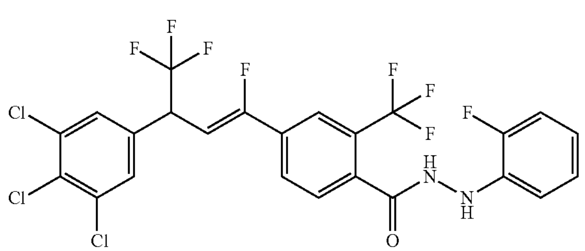 [SMILES: O=C(NNc1ccccc1F)c1ccc(/C(F)=C/C(c2cc(Cl)c(Cl)c(Cl)c2)C(F)(F)F)cc1C(F)(F)F] |

-continued
| No. | Structure |
|---|---|
| F29 | 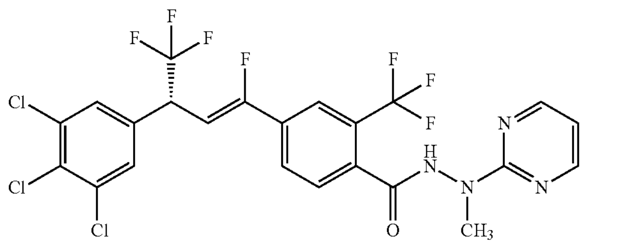 |
| F30 | 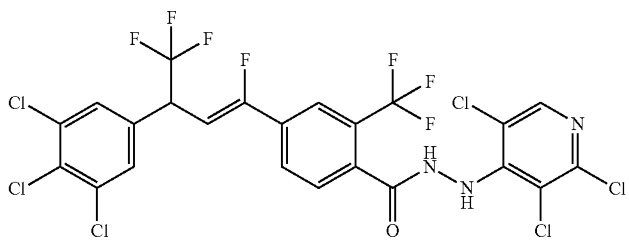 [SMILES: O=C(NNc1c(Cl)cnc(Cl)c1Cl)c1ccc(/C(F)=C/C(c2cc(Cl)c(Cl)c(Cl)c2)C(F)(F)F)cc1C(F)(F)F] |
| F31 | 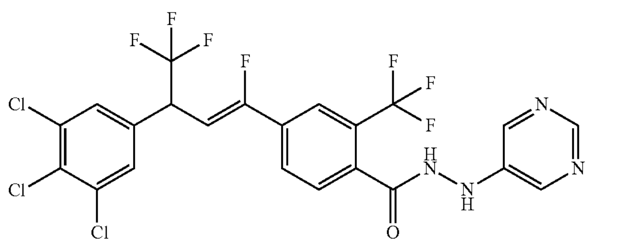 [SMILES: O=C(NNc1cncnc1)c1ccc(/C(F)=C/C(c2cc(Cl)c(Cl)c(Cl)c2)C(F)(F)F)cc1C(F)(F)F] |
| F32 | 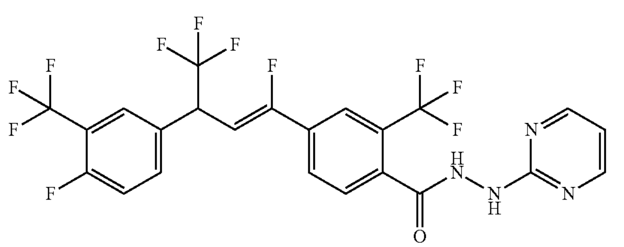 [SMILES: O=C(NNc1ncccn1)c1ccc(/C(F)=C/C(c2ccc(F)c(C(F)(F)F)c2)C(F)(F)F)cc1C(F)(F)F] |
| F33 | 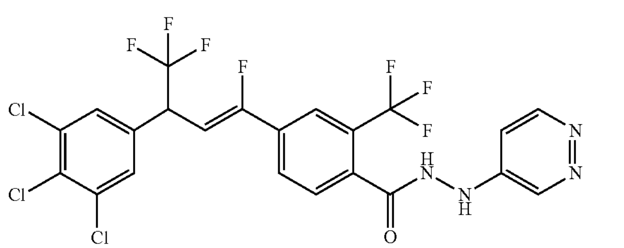 [SMILES: O=C(NNc1ccnnc1)c1ccc(/C(F)=C/C(c2cc(Cl)c(Cl)c(Cl)c2)C(F)(F)F)cc1C(F)(F)F] |
| F34 | 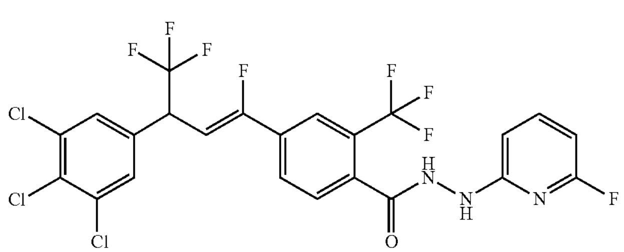 [SMILES: O=C(NNc1cccc(F)n1)c1ccc(/C(F)=C/C(c2cc(Cl)c(Cl)c(Cl)c2)C(F)(F)F)cc1C(F)(F)F] |

-continued
| No. | Structure |
|---|---|
| F35 | 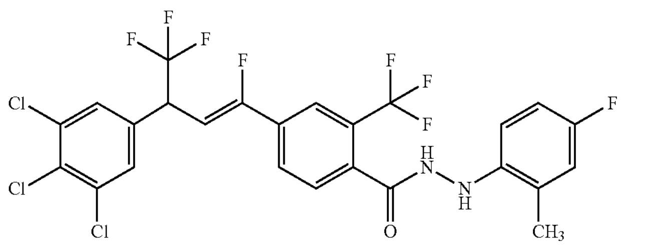 [SMILES: Cc1cc(F)ccc1NNC(=O)c1ccc(/C(F)=C/C(c2cc(Cl)c(Cl)c(Cl)c2)C(F)(F)F)cc1C(F)(F)F] |
| F37 | 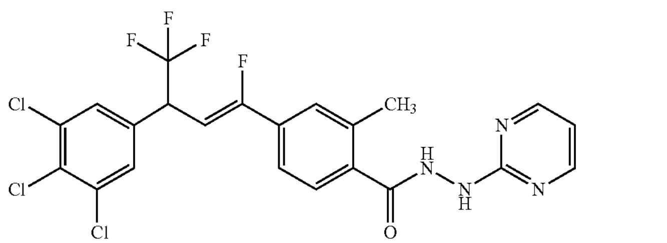 [SMILES: Cc1cc(/C(F)=C/C(c2cc(Cl)c(Cl)c(Cl)c2)C(F)(F)F)ccc1C(=O)NNc1ncccn1] |
| F38 | 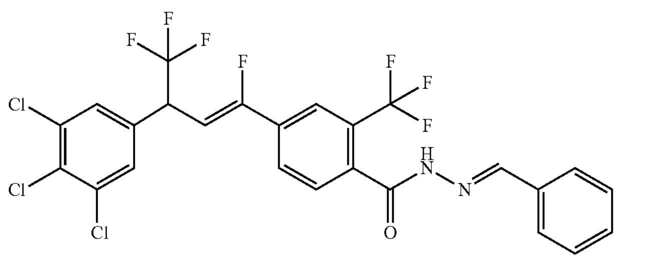 [SMILES: O=C(N/N=C/c1ccccc1)c1ccc(/C(F)=C/C(c2cc(Cl)c(Cl)c(Cl)c2)C(F)(F)F)cc1C(F)(F)F] |
| F39 | 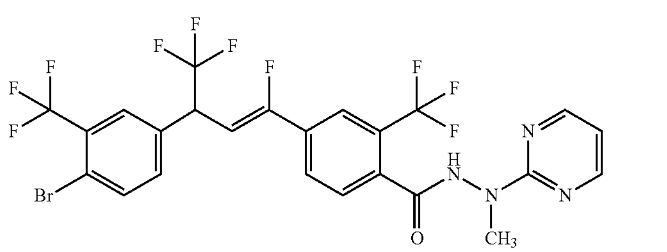 |
| F40 | 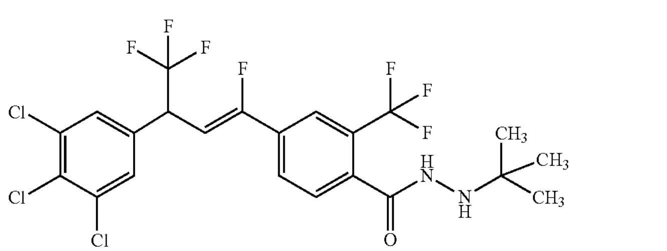 [SMILES: CC(C)(C)NNC(=O)c1ccc(/C(F)=C/C(c2cc(Cl)c(Cl)c(Cl)c2)C(F)(F)F)cc1C(F)(F)F] |
| F41 | 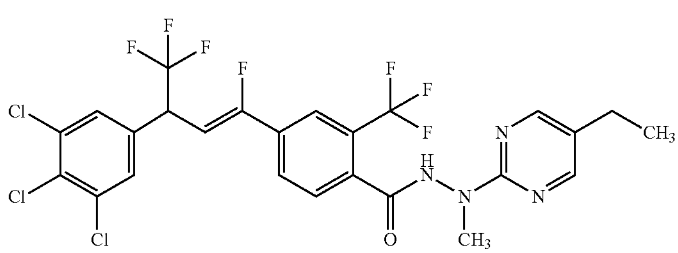 [SMILES: CCc1cnc(N(C)NC(=O)c2ccc(/C(F)=C/C(c3cc(Cl)c(Cl)c(Cl)c3)C(F)(F)F)cc2C(F)(F)F)nc1] |

-continued
| No. | Structure |
| --- | --- |
| F42 | 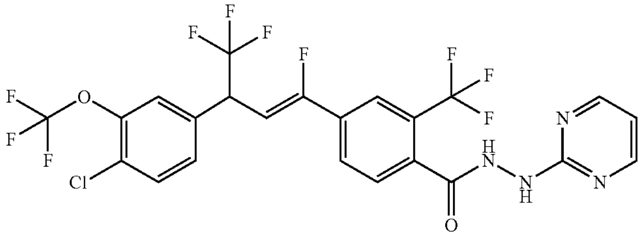 [SMILES: O=C(NNc1ncccn1)c1ccc(/C(F)=C/C(c2ccc(Cl)c(OC(F)(F)F)c2)C(F)(F)F)cc1C(F)(F)F] |
| F43 | 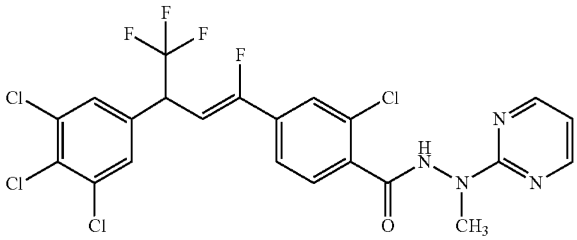 [SMILES: CN(NC(=O)c1ccc(/C(F)=C/C(c2cc(Cl)c(Cl)c(Cl)c2)C(F)(F)F)cc1Cl)c1ncccn1] |
| F44 | 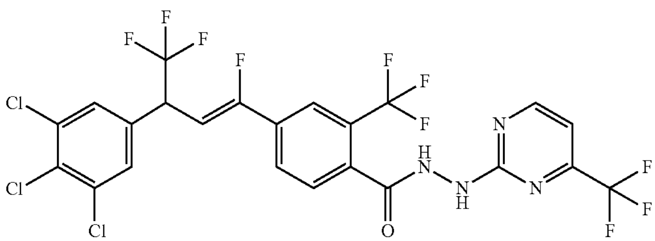 [SMILES: O=C(NNc1nccc(C(F)(F)F)n1)c1ccc(/C(F)=C/C(c2cc(Cl)c(Cl)c(Cl)c2)C(F)(F)F)cc1C(F)(F)F] |
| F45 | 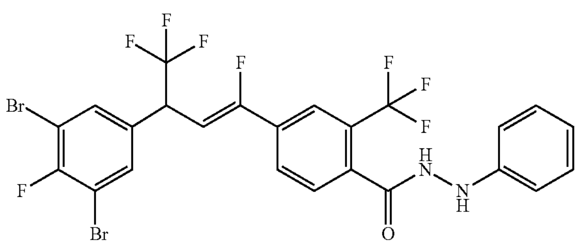 [SMILES: O=C(NNc1ccccc1)c1ccc(/C(F)=C/C(c2cc(Br)c(F)c(Br)c2)C(F)(F)F)cc1C(F)(F)F] |
| F49 | 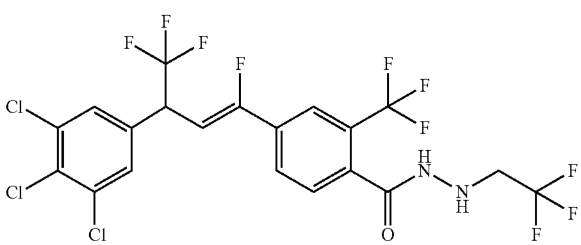 [SMILES: O=C(NNCC(F)(F)F)c1ccc(/C(F)=C/C(c2cc(Cl)c(Cl)c(Cl)c2)C(F)(F)F)cc1C(F)(F)F] |
| F50 | 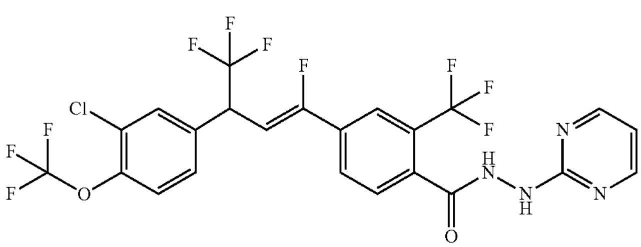 [SMILES: O=C(NNc1ncccn1)c1ccc(/C(F)=C/C(c2ccc(OC(F)(F)F)c(Cl)c2)C(F)(F)F)cc1C(F)(F)F] |

-continued
| No. | Structure |
| --- | --- |
| F51 | 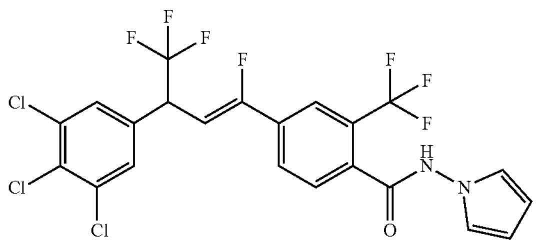 [SMILES: O=C(Nn1cccc1)c1ccc(/C(F)=C/C(c2cc(Cl)c(Cl)c(Cl)c2)C(F)(F)F)cc1C(F)(F)F] |
| F52 | 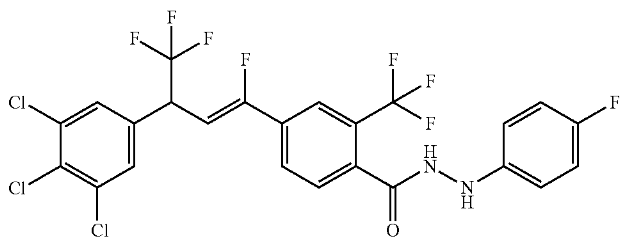 [SMILES: O=C(NNc1ccc(F)cc1)c1ccc(/C(F)=C/C(c2cc(Cl)c(Cl)c(Cl)c2)C(F)(F)F)cc1C(F)(F)F] |
| F54 | 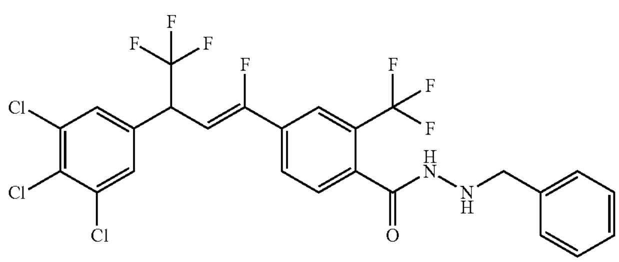 [SMILES: O=C(NNCc1ccccc1)c1ccc(/C(F)=C/C(c2cc(Cl)c(Cl)c(Cl)c2)C(F)(F)F)cc1C(F)(F)F] |
| F55 | 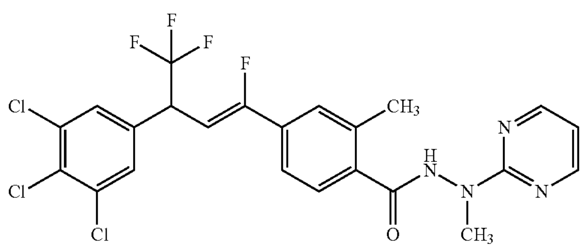 [SMILES: Cc1cc(/C(F)=C/C(c2cc(Cl)c(Cl)c(Cl)c2)C(F)(F)F)ccc1C(=O)NN(C)c1ncccn1] |
| F56 | 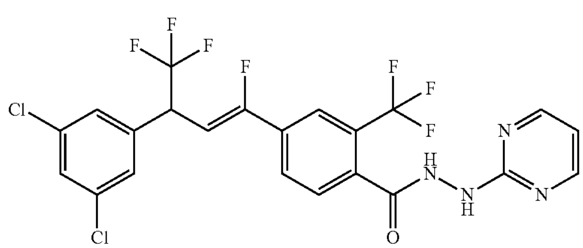 [SMILES: O=C(NNc1ncccn1)c1ccc(/C(F)=C/C(c2cc(Cl)cc(Cl)c2)C(F)(F)F)cc1C(F)(F)F] |
| F57 | 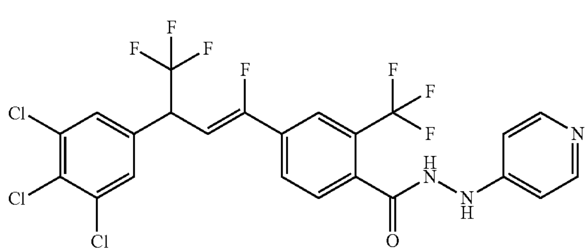 [SMILES: O=C(NNc1ccncc1)c1ccc(/C(F)=C/C(c2cc(Cl)c(Cl)c(Cl)c2)C(F)(F)F)cc1C(F)(F)F] |

-continued
| No. | Structure |
| --- | --- |
| F58 | 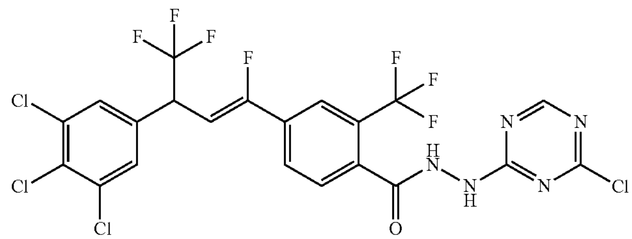 |
| F59 | 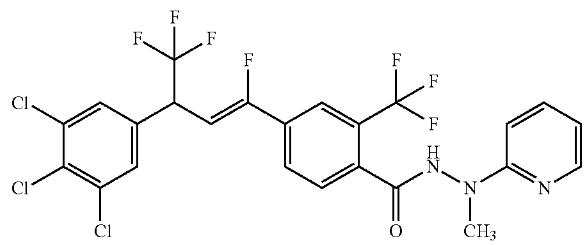 [SMILES: CN(NC(=O)c1ccc(/C(F)=C/C(c2cc(Cl)c(Cl)c(Cl)c2)C(F)(F)F)cc1C(F)(F)F)c1ccccn1] |
| F60 | 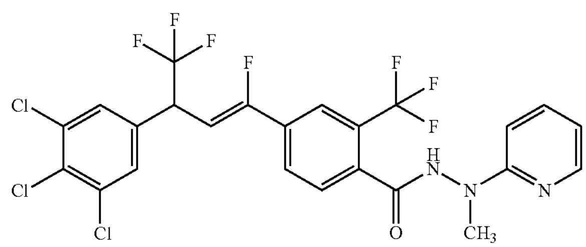 [SMILES: CN(NC(=O)c1ccc(/C(F)=C/C(c2cc(Cl)c(Cl)c(Cl)c2)C(F)(F)F)cc1C(F)(F)F)c1ccccn1] |
| F61 | 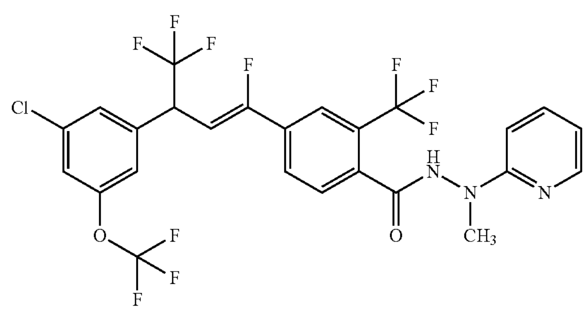 [SMILES: CN(NC(=O)c1ccc(/C(F)=C/C(c2cc(Cl)cc(OC(F)(F)F)c2)C(F)(F)F)cc1C(F)(F)F)c1ccccn1] |
| F62 | 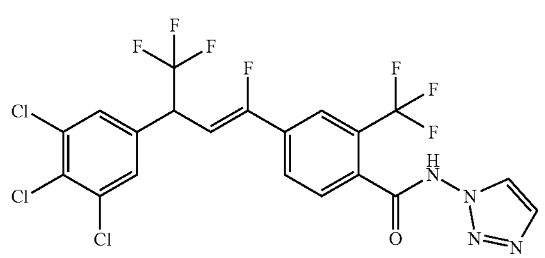 [SMILES: O=C(Nn1ccnn1)c1ccc(/C(F)=C/C(c2cc(Cl)c(Cl)c(Cl)c2)C(F)(F)F)cc1C(F)(F)F] |
| F63 | 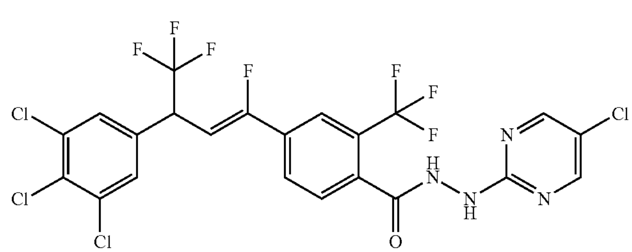 |

-continued
| No. | Structure |
| --- | --- |
| F68 | 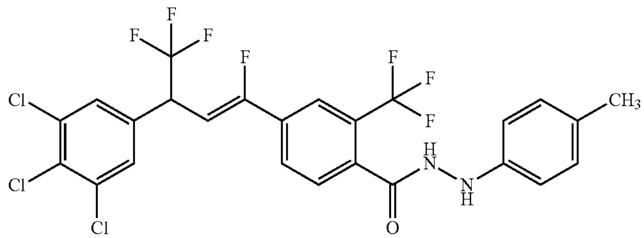 [SMILES: Cc1ccc(NNC(=O)c2ccc(/C(F)=C/C(c3cc(Cl)c(Cl)c(Cl)c3)C(F)(F)F)cc2C(F)(F)F)cc1] |
| F70 | 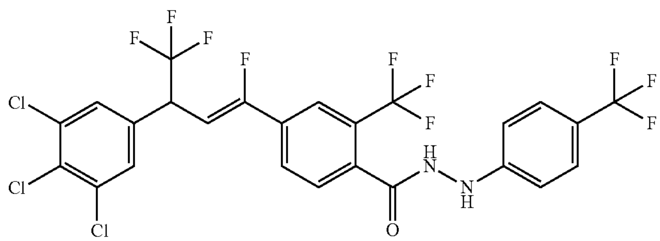 [SMILES: O=C(NNc1ccc(C(F)(F)F)cc1)c1ccc(/C(F)=C/C(c2cc(Cl)c(Cl)c(Cl)c2)C(F)(F)F)cc1C(F)(F)F] |
| F71 | 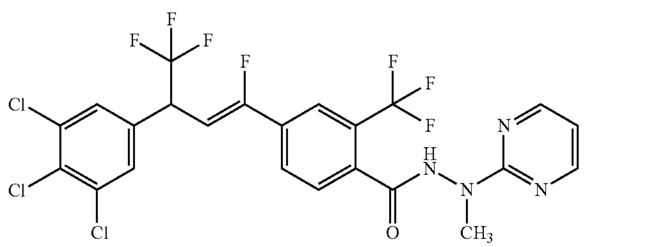 [SMILES: CN(NC(=O)c1ccc(/C(F)=C/C(c2cc(Cl)c(Cl)c(Cl)c2)C(F)(F)F)cc1C(F)(F)F)c1ncccn1] |
| F73 | 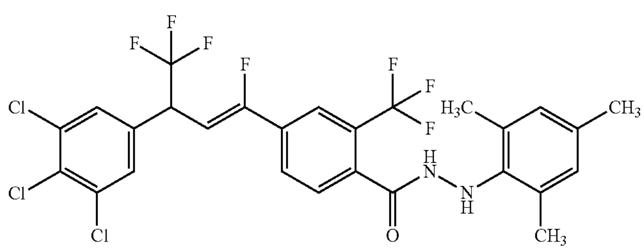 [SMILES: Cc1cc(C)c(NNC(=O)c2ccc(/C(F)=C/C(c3cc(Cl)c(Cl)c(Cl)c3)C(F)(F)F)cc2C(F)(F)F)c(C)c1] |
| F74 | 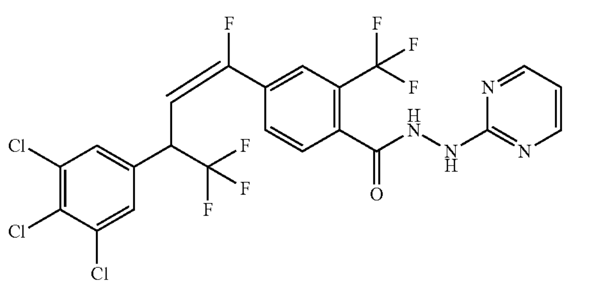 [SMILES: O=C(NNc1ncccn1)c1ccc(/C(F)=C\C(c2cc(Cl)c(Cl)c(Cl)c2)C(F)(F)F)cc1C(F)(F)F] |
| F75 | 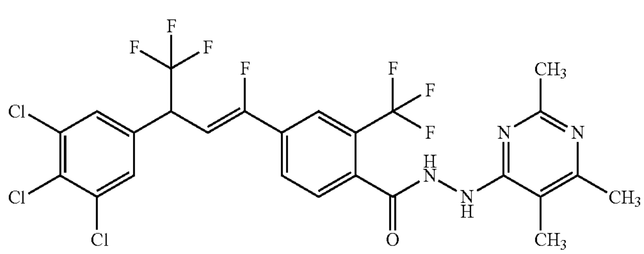 [SMILES: Cc1nc(C)c(C)c(NNC(=O)c2ccc(/C(F)=C/C(c3cc(Cl)c(Cl)c(Cl)c3)C(F)(F)F)cc2C(F)(F)F)n1] |

-continued
| No. | Structure |
|---|---|
| F77 | 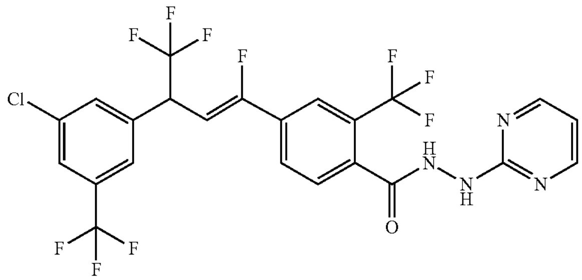 [SMILES: O=C(NNc1ncccn1)c1ccc(/C(F)=C/C(c2cc(Cl)cc(C(F)(F)F)c2)C(F)(F)F)cc1C(F)(F)F] |
| F78 | 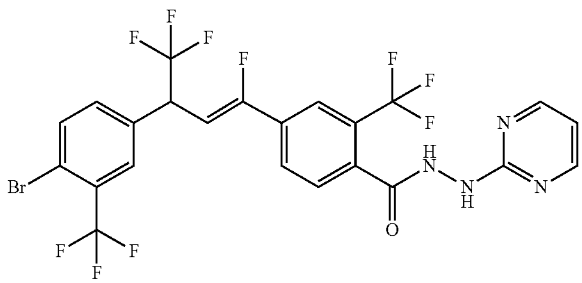 [SMILES: O=C(NNc1ncccn1)c1ccc(/C(F)=C/C(c2ccc(Br)c(C(F)(F)F)c2)C(F)(F)F)cc1C(F)(F)F] |
| F79 | 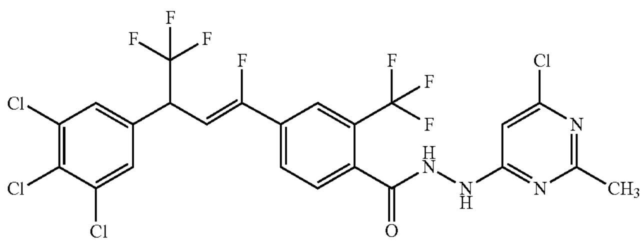 [SMILES: Cc1nc(Cl)cc(NNC(=O)c2ccc(/C(F)=C/C(c3cc(Cl)c(Cl)c(Cl)c3)C(F)(F)F)cc2C(F)(F)F)n1] |
| F82 | 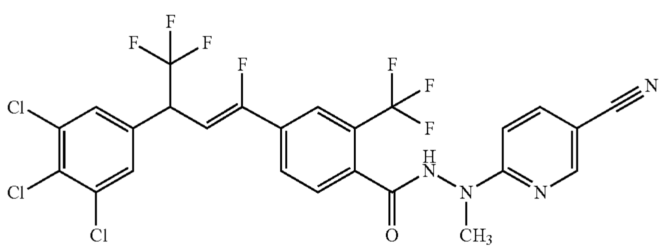 [SMILES: CN(NC(=O)c1ccc(/C(F)=C/C(c2cc(Cl)c(Cl)c(Cl)c2)C(F)(F)F)cc1C(F)(F)F)c1ccc(C#N)cn1] |
| F83 | 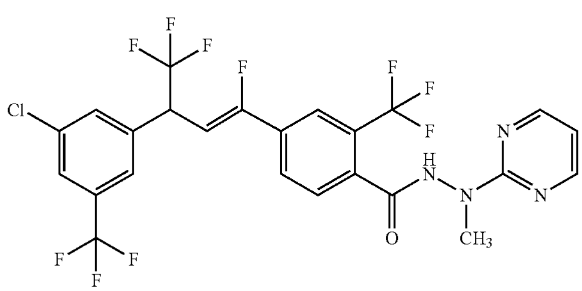 [SMILES: CN(NC(=O)c1ccc(/C(F)=C/C(c2cc(Cl)cc(C(F)(F)F)c2)C(F)(F)F)cc1C(F)(F)F)c1ncccn1] |
| F84 | 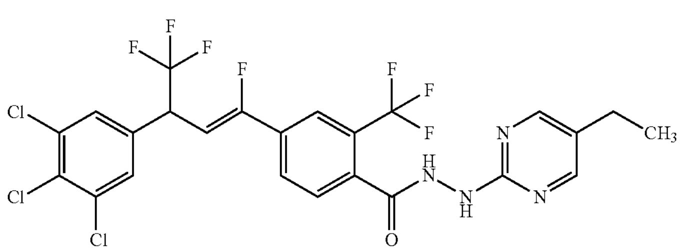 [SMILES: CCc1cnc(NNC(=O)c2ccc(/C(F)=C/C(c3cc(Cl)c(Cl)c(Cl)c3)C(F)(F)F)cc2C(F)(F)F)nc1] |

-continued
| No. | Structure |
|---|---|
| F85 | 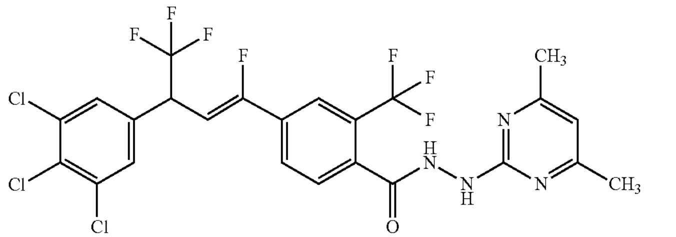 [SMILES: Cc1cc(C)nc(NNC(=O)c2ccc(/C(F)=C/C(c3cc(Cl)c(Cl)c(Cl)c3)C(F)(F)F)cc2C(F)(F)F)n1] |
| F86 | 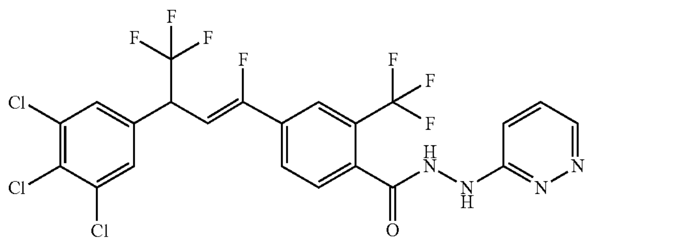 [SMILES: O=C(NNc1cccnn1)c1ccc(/C(F)=C/C(c2cc(Cl)c(Cl)c(Cl)c2)C(F)(F)F)cc1C(F)(F)F] |
| F89 | 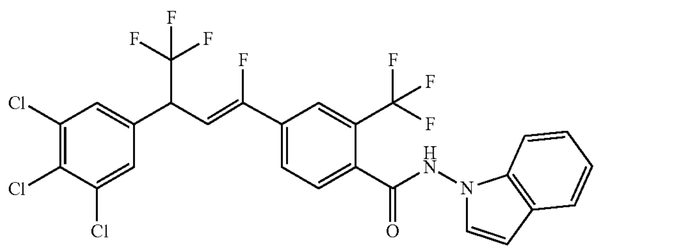 [SMILES: O=C(Nn1ccc2ccccc21)c1ccc(/C(F)=C/C(c2cc(Cl)c(Cl)c(Cl)c2)C(F)(F)F)cc1C(F)(F)F] |
| F90 | 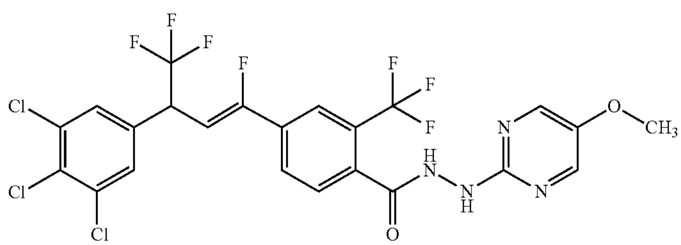 [SMILES: COc1cnc(NNC(=O)c2ccc(/C(F)=C/C(c3cc(Cl)c(Cl)c(Cl)c3)C(F)(F)F)cc2C(F)(F)F)nc1] |
| F91 | 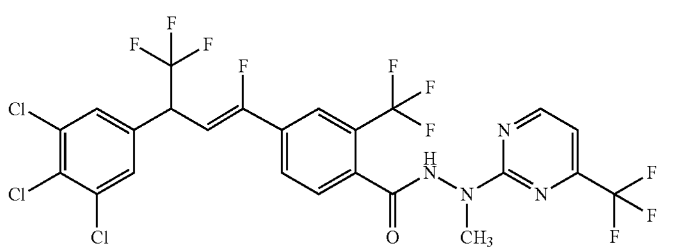 [SMILES: CN(NC(=O)c1ccc(/C(F)=C/C(c2cc(Cl)c(Cl)c(Cl)c2)C(F)(F)F)cc1C(F)(F)F)c1nccc(C(F)(F)F)n1] |
| F92 | 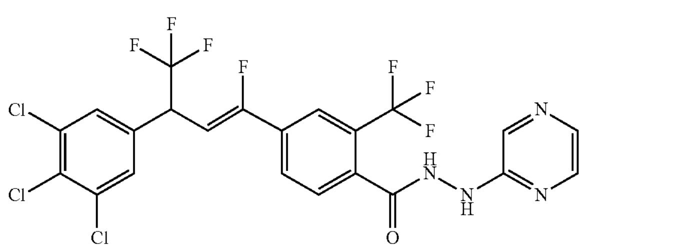 [SMILES: O=C(NNc1cnccn1)c1ccc(/C(F)=C/C(c2cc(Cl)c(Cl)c(Cl)c2)C(F)(F)F)cc1C(F)(F)F] |

-continued
| No. | Structure |
|---|---|
| F93 | 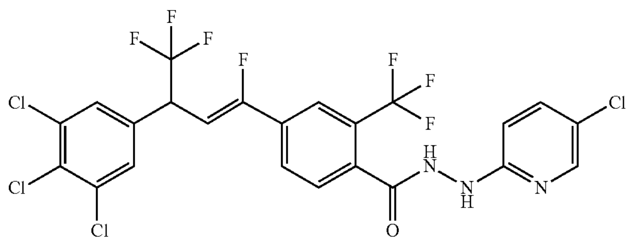 [SMILES: O=C(NNc1ccc(Cl)cn1)c1ccc(/C(F)=C/C(c2cc(Cl)c(Cl)c(Cl)c2)C(F)(F)F)cc1C(F)(F)F] |
| F94 | 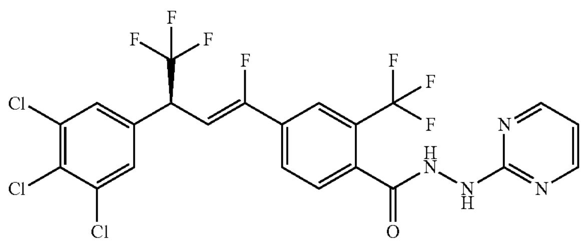 [SMILES: O=C(NNc1ncccn1)c1ccc(/C(F)=C/[C@@H](c2cc(Cl)c(Cl)c(Cl)c2)C(F)(F)F)cc1C(F)(F)F] |
| F95 | 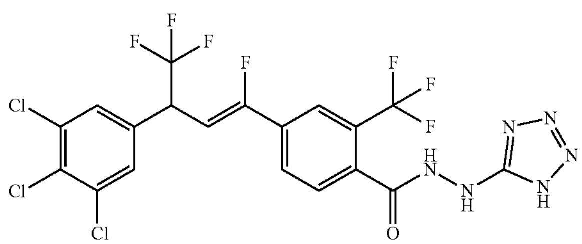 [SMILES: O=C(NNc1nnn[nH]1)c1ccc(/C(F)=C/C(c2cc(Cl)c(Cl)c(Cl)c2)C(F)(F)F)cc1C(F)(F)F] |
| F96 | 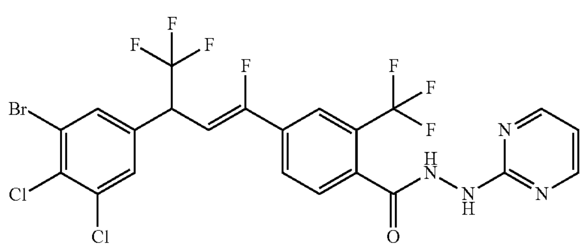 |
| F97 | 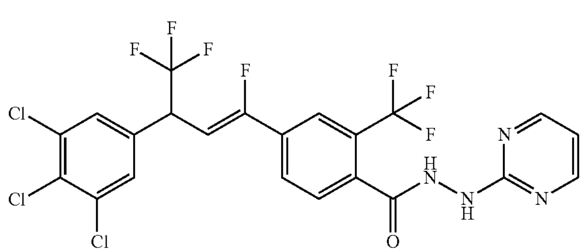 [SMILES: O=C(NNc1ncccn1)c1ccc(/C(F)=C/C(c2cc(Cl)c(Cl)c(Cl)c2)C(F)(F)F)cc1C(F)(F)F] |
| F98 | 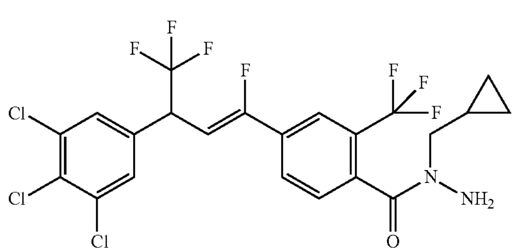 [SMILES: NN(CC1CC1)C(=O)c1ccc(/C(F)=C/C(c2cc(Cl)c(Cl)c(Cl)c2)C(F)(F)F)cc1C(F)(F)F] |

-continued
| No. | Structure |
|---|---|
| F99 | 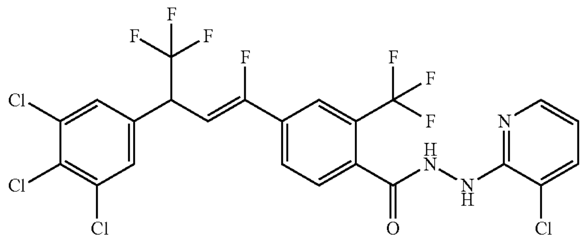 [SMILES: O=C(NNc1ncccc1Cl)c1ccc(/C(F)=C/C(c2cc(Cl)c(Cl)c(Cl)c2)C(F)(F)F)cc1C(F)(F)F] |
| F100 | 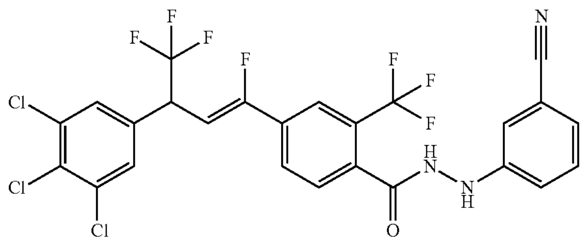 [SMILES: N#Cc1cccc(NNC(=O)c2ccc(/C(F)=C/C(c3cc(Cl)c(Cl)c(Cl)c3)C(F)(F)F)cc2C(F)(F)F)c1] |
| F101 | 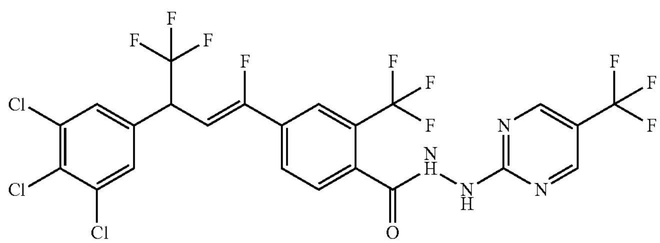 [SMILES: O=C(NNc1ncc(C(F)(F)F)cn1)c1ccc(/C(F)=C/C(c2cc(Cl)c(Cl)c(Cl)c2)C(F)(F)F)cc1C(F)(F)F] |
| F102 | 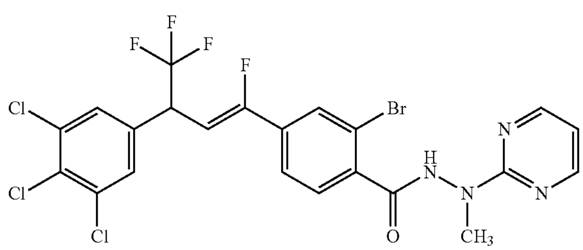 [SMILES: CN(NC(=O)c1ccc(/C(F)=C/C(c2cc(Cl)c(Cl)c(Cl)c2)C(F)(F)F)cc1Br)c1ncccn1] |
| F103 | 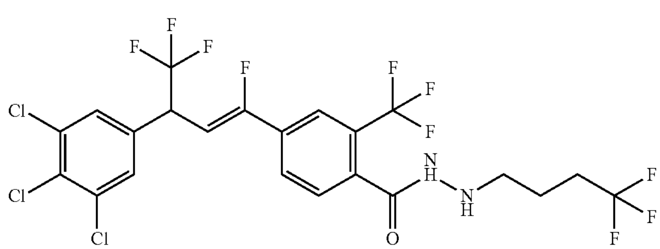 [SMILES: O=C(NNCCCC(F)(F)F)c1ccc(/C(F)=C/C(c2cc(Cl)c(Cl)c(Cl)c2)C(F)(F)F)cc1C(F)(F)F] |
| F104 | 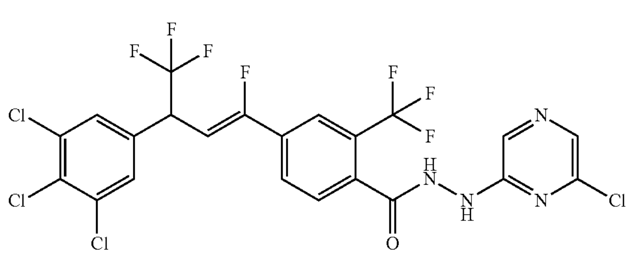 [SMILES: O=C(NNc1cncc(Cl)n1)c1ccc(/C(F)=C/C(c2cc(Cl)c(Cl)c(Cl)c2)C(F)(F)F)cc1C(F)(F)F] |

-continued
| No. | Structure |
| --- | --- |
| F105 | 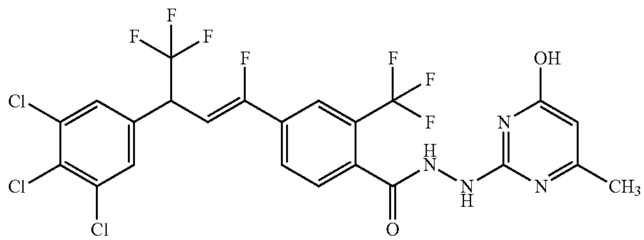 [SMILES: Cc1cc(O)nc(NNC(=O)c2ccc(/C(F)=C/C(c3cc(Cl)c(Cl)c(Cl)c3)C(F)(F)F)cc2C(F)(F)F)n1] |
| F106 | 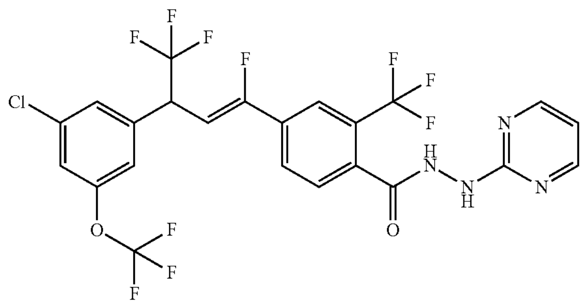 [SMILES: O=C(NNc1ncccn1)c1ccc(/C(F)=C/C(c2cc(Cl)cc(OC(F)(F)F)c2)C(F)(F)F)cc1C(F)(F)F] |
| F107 | 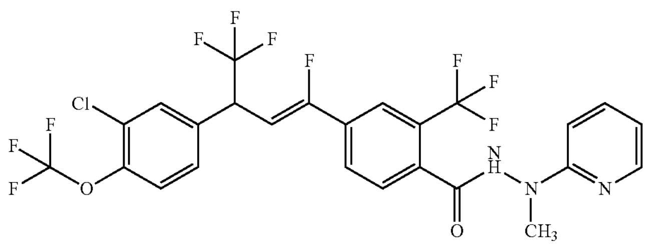 [SMILES: CN(NC(=O)c1ccc(/C(F)=C/C(c2ccc(OC(F)(F)F)c(Cl)c2)C(F)(F)F)cc1C(F)(F)F)c1ccccn1] |
| F109 | 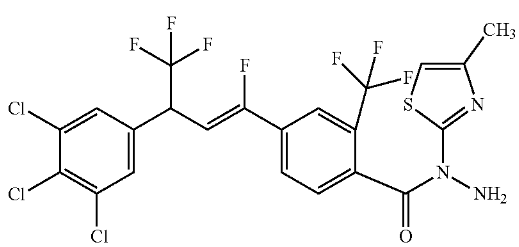 [SMILES: Cc1csc(N(N)C(=O)c2ccc(/C(F)=C/C(c3cc(Cl)c(Cl)c(Cl)c3)C(F)(F)F)cc2C(F)(F)F)n1] |
| F110 | 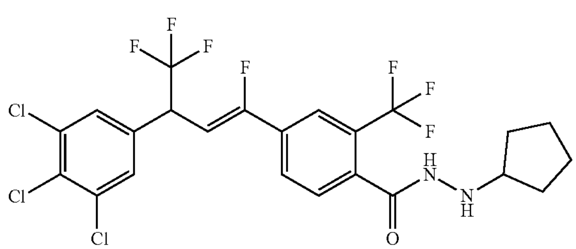 [SMILES: O=C(NNC1CCCC1)c1ccc(/C(F)=C/C(c2cc(Cl)c(Cl)c(Cl)c2)C(F)(F)F)cc1C(F)(F)F] |
| F111 | 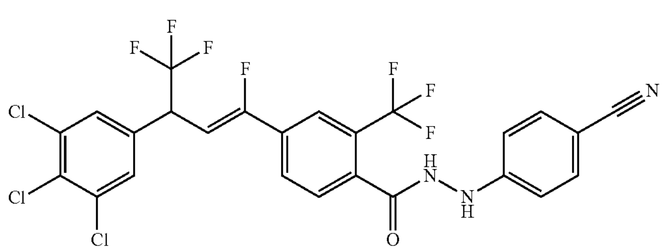 [SMILES: N#Cc1ccc(NNC(=O)c2ccc(/C(F)=C/C(c3cc(Cl)c(Cl)c(Cl)c3)C(F)(F)F)cc2C(F)(F)F)cc1] |

-continued
| No. | Structure |
|---|---|
| F112 | 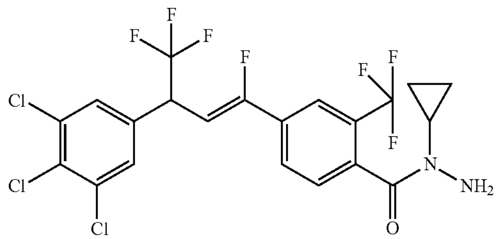 [SMILES: NN(C(=O)c1ccc(/C(F)=C/C(c2cc(Cl)c(Cl)c(Cl)c2)C(F)(F)F)cc1C(F)(F)F)C1CC1] |
| F113 | 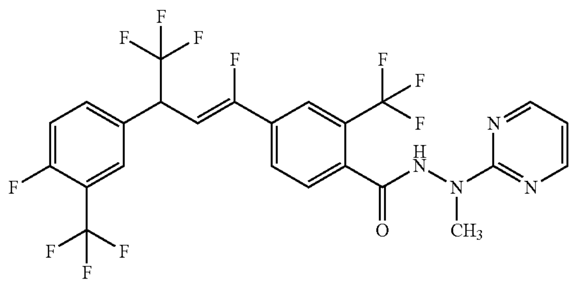 [SMILES: CN(NC(=O)c1ccc(/C(F)=C/C(c2ccc(F)c(C(F)(F)F)c2)C(F)(F)F)cc1C(F)(F)F)c1ncccn1] |
| F114 | 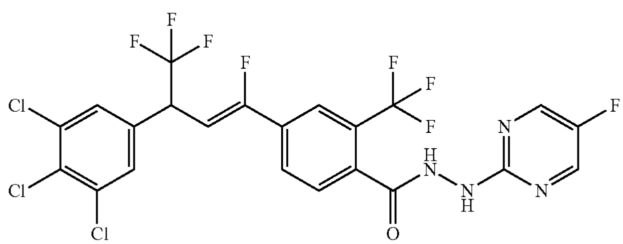 [SMILES: O=C(NNc1ncc(F)cn1)c1ccc(/C(F)=C/C(c2cc(Cl)c(Cl)c(Cl)c2)C(F)(F)F)cc1C(F)(F)F] |
| F116 | 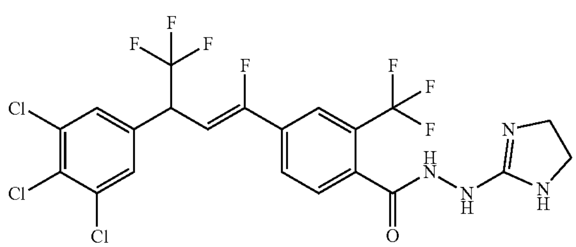 [SMILES: O=C(NNC1=NCCN1)c1ccc(/C(F)=C/C(c2cc(Cl)c(Cl)c(Cl)c2)C(F)(F)F)cc1C(F)(F)F] |
| F117 | 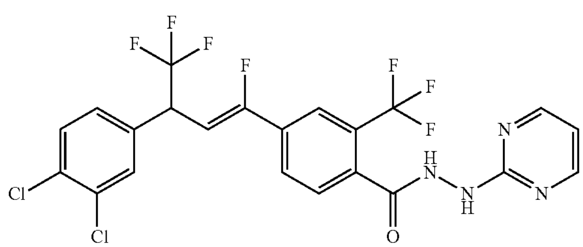 [SMILES: O=C(NNc1ncccn1)c1ccc(/C(F)=C/C(c2ccc(Cl)c(Cl)c2)C(F)(F)F)cc1C(F)(F)F] |
| F118 | 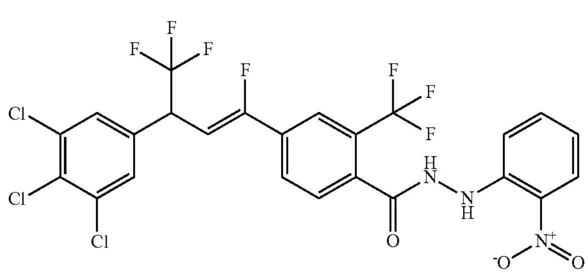 |

-continued
| No. | Structure |
|---|---|
| F120 | 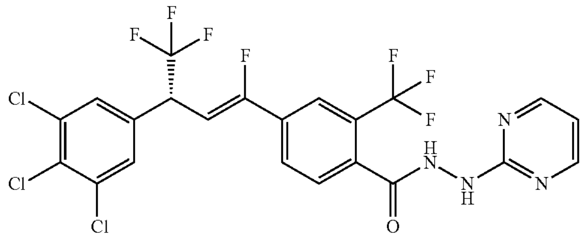 [SMILES: O=C(NNc1ncccn1)c1ccc(/C(F)=C/[C@H](c2cc(Cl)c(Cl)c(Cl)c2)C(F)(F)F)cc1C(F)(F)F] |
| F121 | 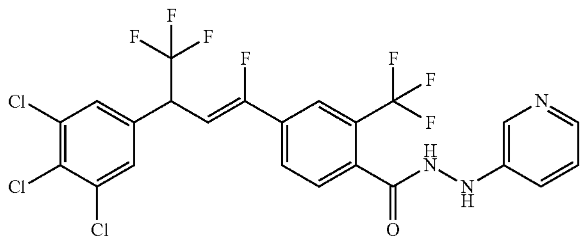 [SMILES: O=C(NNc1cccnc1)c1ccc(/C(F)=C/C(c2cc(Cl)c(Cl)c(Cl)c2)C(F)(F)F)cc1C(F)(F)F] |
| F122 | 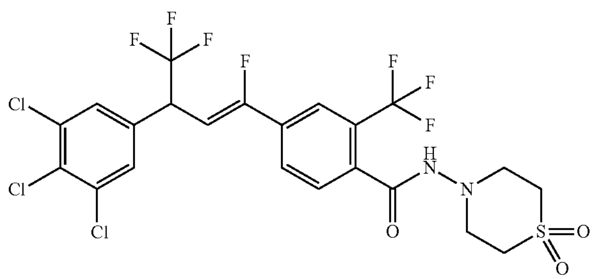 [SMILES: O=C(NN1CCS(=O)(=O)CC1)c1ccc(/C(F)=C/C(c2cc(Cl)c(Cl)c(Cl)c2)C(F)(F)F)cc1C(F)(F)F] |
| F123 | 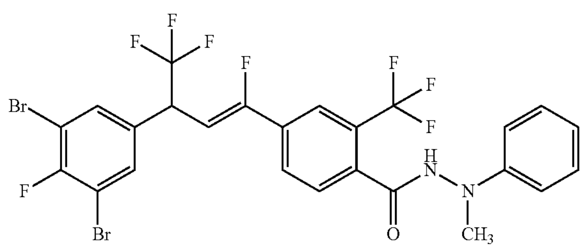 |
| F125 | 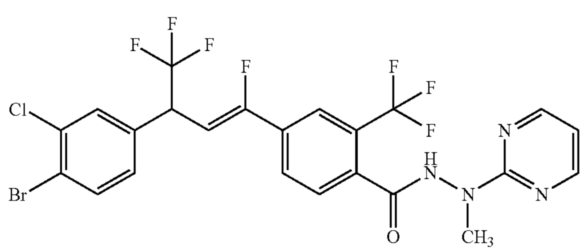 [SMILES: CN(NC(=O)c1ccc(/C(F)=C/C(c2ccc(Br)c(Cl)c2)C(F)(F)F)cc1C(F)(F)F)c1ncccn1] |
| F126 | 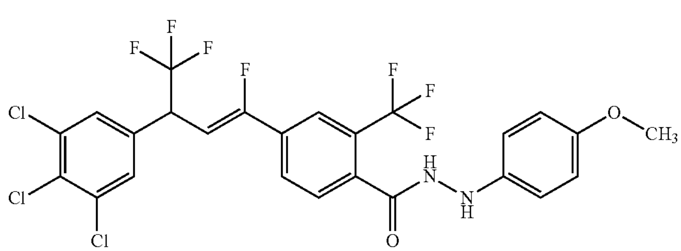 [SMILES: COc1ccc(NNC(=O)c2ccc(/C(F)=C/C(c3cc(Cl)c(Cl)c(Cl)c3)C(F)(F)F)cc2C(F)(F)F)cc1] |

-continued
| No. | Structure |
| --- | --- |
| F128 | 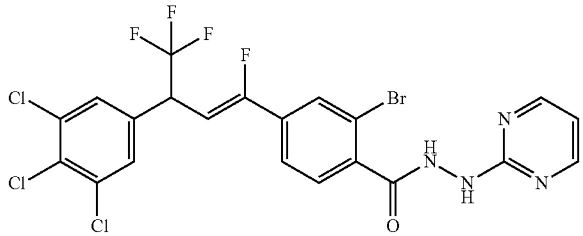 [SMILES: O=C(NNc1ncccn1)c1ccc(/C(F)=C/C(c2cc(Cl)c(Cl)c(Cl)c2)C(F)(F)F)cc1Br] |
| F129 | 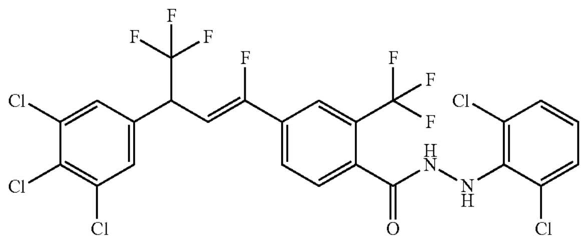 [SMILES: O=C(NNc1c(Cl)cccc1Cl)c1ccc(/C(F)=C/C(c2cc(Cl)c(Cl)c(Cl)c2)C(F)(F)F)cc1C(F)(F)F] |
| F130 | 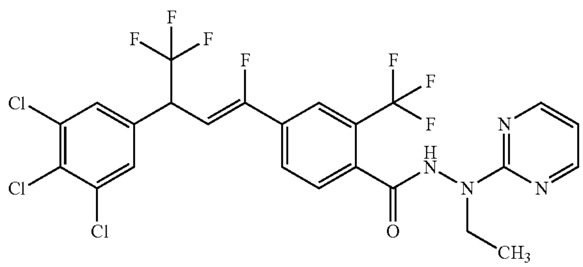 [SMILES: CCN(NC(=O)c1ccc(/C(F)=C/C(c2cc(Cl)c(Cl)c(Cl)c2)C(F)(F)F)cc1C(F)(F)F)c1ncccn1] |
| F132 | 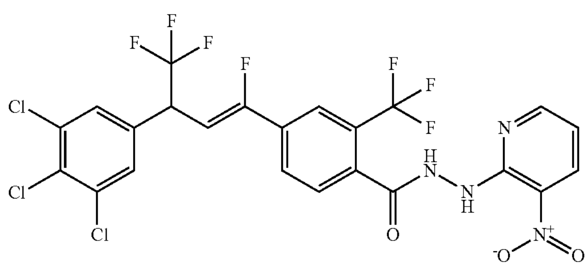 |
| F133 | 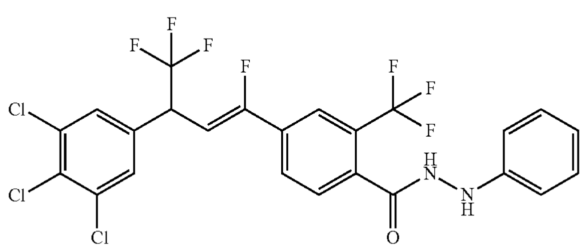 [SMILES: O=C(NNc1ccccc1)c1ccc(/C(F)=C/C(c2cc(Cl)c(Cl)c(Cl)c2)C(F)(F)F)cc1C(F)(F)F] |
| F134 | 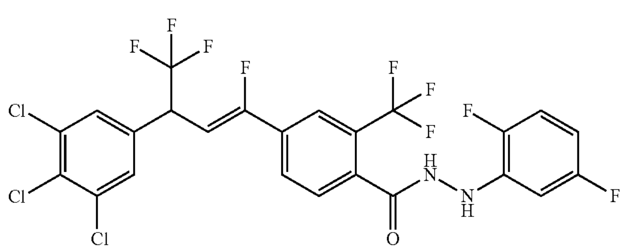 [SMILES: O=C(NNc1cc(F)ccc1F)c1ccc(/C(F)=C/C(c2cc(Cl)c(Cl)c(Cl)c2)C(F)(F)F)cc1C(F)(F)F] |

-continued
| No. | Structure |
|---|---|
| F135 | 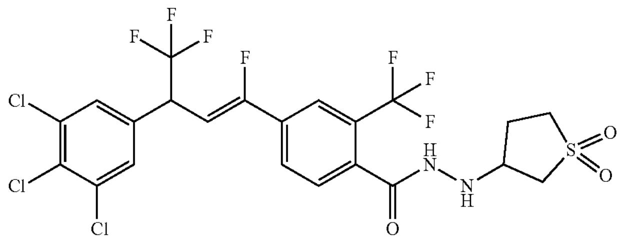 [SMILES: O=C(NNC1CCS(=O)(=O)C1)c1ccc(/C(F)=C/C(c2cc(Cl)c(Cl)c(Cl)c2)C(F)(F)F)cc1C(F)(F)F] |
| F136 | 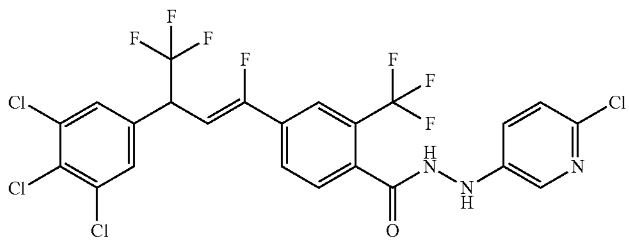 [SMILES: O=C(NNc1ccc(Cl)nc1)c1ccc(/C(F)=C/C(c2cc(Cl)c(Cl)c(Cl)c2)C(F)(F)F)cc1C(F)(F)F] |
| F137 | 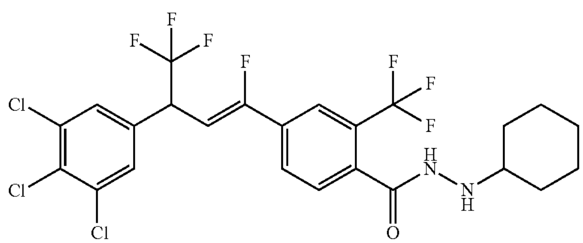 [SMILES: O=C(NNC1CCCCC1)c1ccc(/C(F)=C/C(c2cc(Cl)c(Cl)c(Cl)c2)C(F)(F)F)cc1C(F)(F)F] |
| F138 | 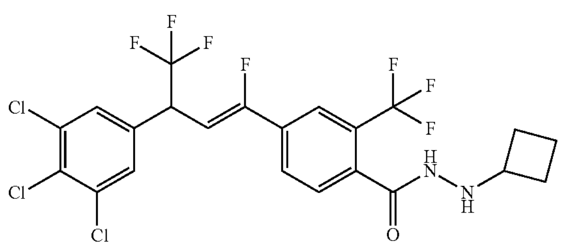 [SMILES: O=C(NNC1CCC1)c1ccc(/C(F)=C/C(c2cc(Cl)c(Cl)c(Cl)c2)C(F)(F)F)cc1C(F)(F)F] |
| F140 | 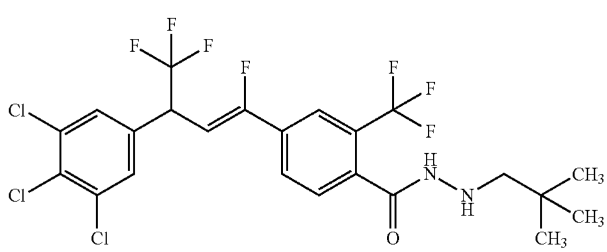 [SMILES: CC(C)(C)CNNC(=O)c1ccc(/C(F)=C/C(c2cc(Cl)c(Cl)c(Cl)c2)C(F)(F)F)cc1C(F)(F)F] |
| F141 | 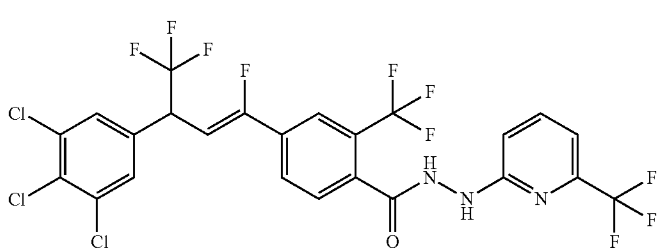 [SMILES: O=C(NNc1cccc(C(F)(F)F)n1)c1ccc(/C(F)=C/C(c2cc(Cl)c(Cl)c(Cl)c2)C(F)(F)F)cc1C(F)(F)F] |

-continued
| No. | Structure |
|---|---|
| F142 | 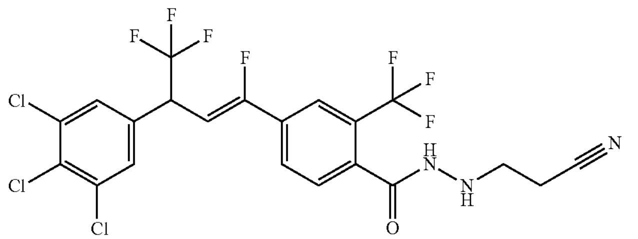 [SMILES: N#CCCNNC(=O)c1ccc(/C(F)=C/C(c2cc(Cl)c(Cl)c(Cl)c2)C(F)(F)F)cc1C(F)(F)F] |
| F143 | 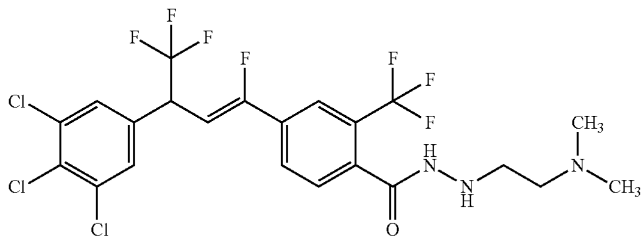 |
| F144 | 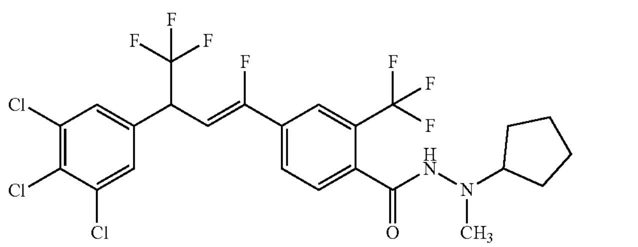 [SMILES: CN(NC(=O)c1ccc(/C(F)=C/C(c2cc(Cl)c(Cl)c(Cl)c2)C(F)(F)F)cc1C(F)(F)F)C1CCCC1] |
| F145 | 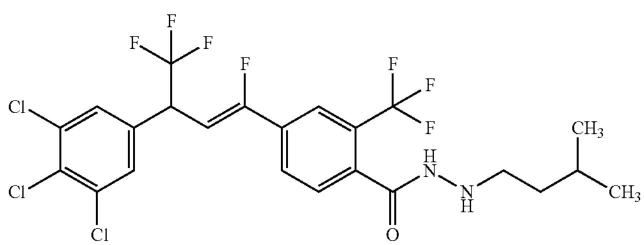 |
| F146 | 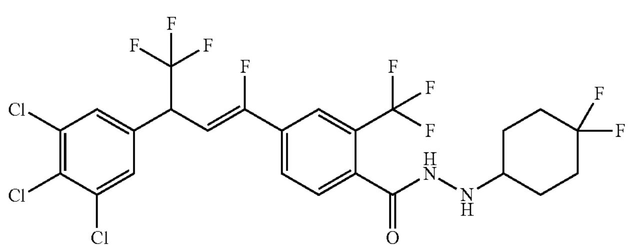 [SMILES: O=C(NNC1CCC(F)(F)CC1)c1ccc(/C(F)=C/C(c2cc(Cl)c(Cl)c(Cl)c2)C(F)(F)F)cc1C(F)(F)F] |
| F147 | 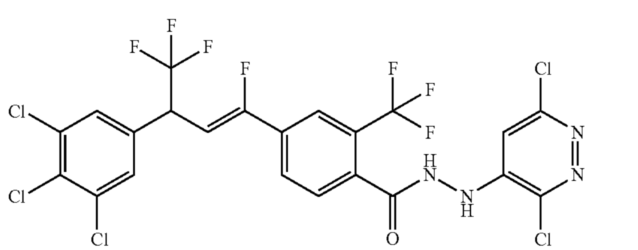 [SMILES: O=C(NNc1cc(Cl)nnc1Cl)c1ccc(/C(F)=C/C(c2cc(Cl)c(Cl)c(Cl)c2)C(F)(F)F)cc1C(F)(F)F] |

-continued
| No. | Structure |
| --- | --- |
| | 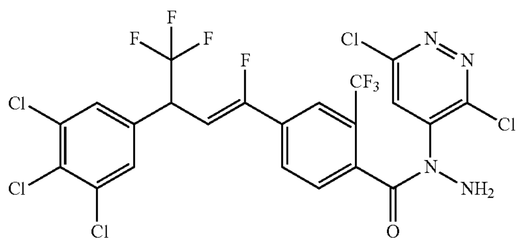 [SMILES: NN(C(=O)c1ccc(/C(F)=C/C(c2cc(Cl)c(Cl)c(Cl)c2)C(F)(F)F)cc1C(F)(F)F)c1cc(Cl)nnc1Cl] |
| F148 | 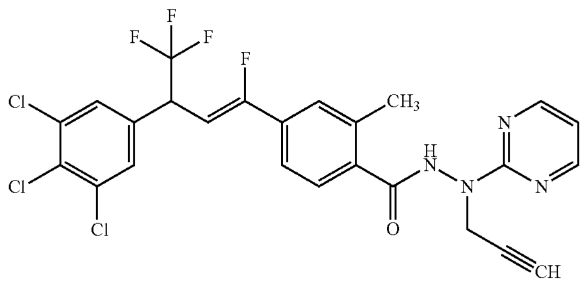 [SMILES: C#CCN(NC(=O)c1ccc(/C(F)=C/C(c2cc(Cl)c(Cl)c(Cl)c2)C(F)(F)F)cc1C)c1ncccn1] |
| F149 | 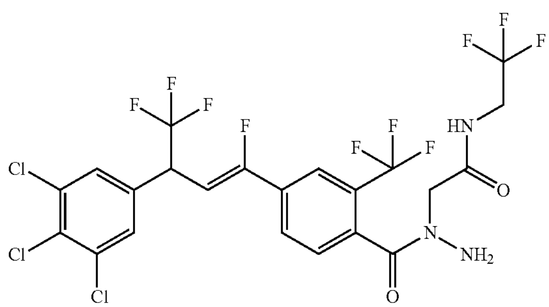 [SMILES: NN(CC(=O)NCC(F)(F)F)C(=O)c1ccc(/C(F)=C/C(c2cc(Cl)c(Cl)c(Cl)c2)C(F)(F)F)cc1C(F)(F)F] |
| F150 | 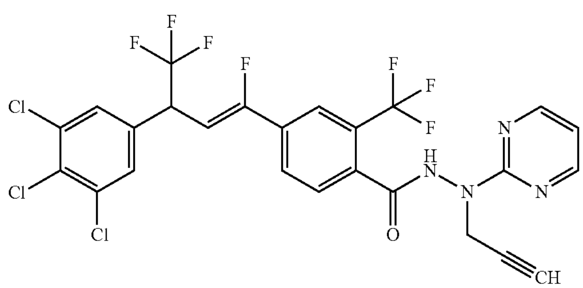 [SMILES: C#CCN(NC(=O)c1ccc(/C(F)=C/C(c2cc(Cl)c(Cl)c(Cl)c2)C(F)(F)F)cc1C(F)(F)F)c1ncccn1] |
| F151 | 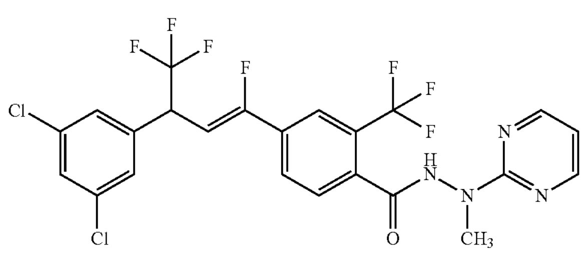 |

-continued
| No. | Structure |
|---|---|
| F152 | 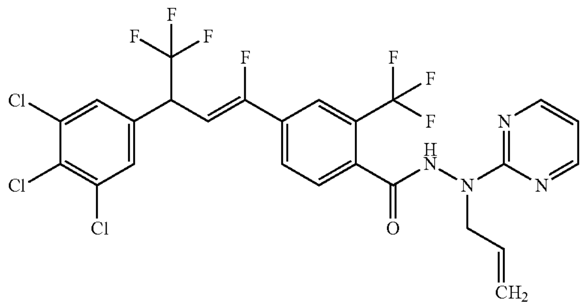 [SMILES: C=CCN(NC(=O)c1ccc(/C(F)=C/C(c2cc(Cl)c(Cl)c(Cl)c2)C(F)(F)F)cc1C(F)(F)F)c1ncccn1] |
| F155 | 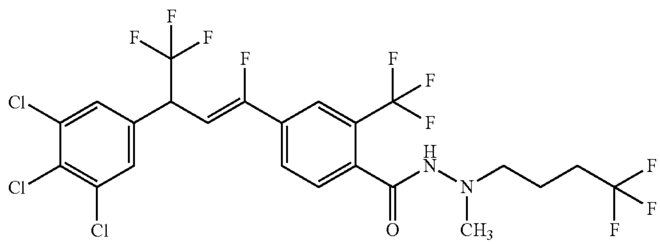 [SMILES: CN(CCCC(F)(F)F)NC(=O)c1ccc(/C(F)=C/C(c2cc(Cl)c(Cl)c(Cl)c2)C(F)(F)F)cc1C(F)(F)F] |
| F156 | 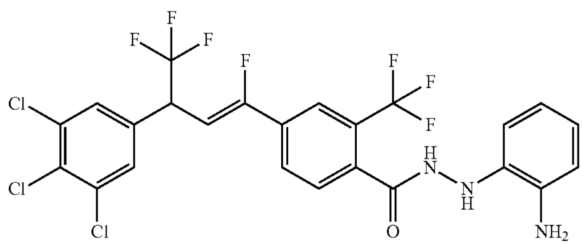 |
| F157 | 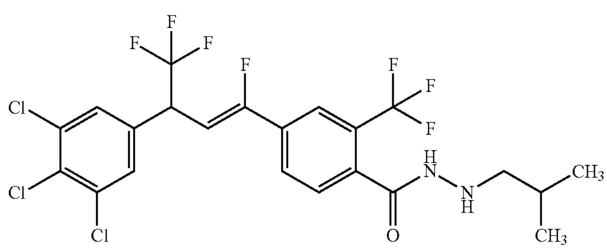 [SMILES: CC(C)CNNC(=O)c1ccc(/C(F)=C/C(c2cc(Cl)c(Cl)c(Cl)c2)C(F)(F)F)cc1C(F)(F)F] |
| F158 | 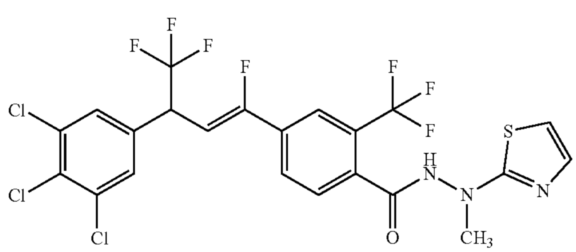 [SMILES: CN(NC(=O)c1ccc(/C(F)=C/C(c2cc(Cl)c(Cl)c(Cl)c2)C(F)(F)F)cc1C(F)(F)F)c1nccs1] |
| F159 | 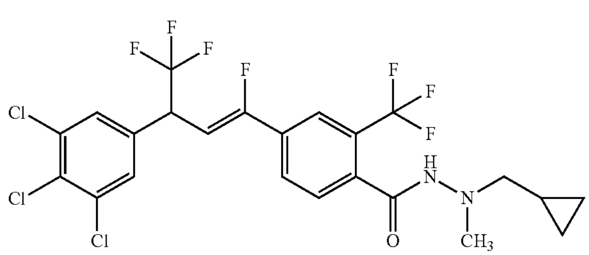 [SMILES: CN(CC1CC1)NC(=O)c1ccc(/C(F)=C/C(c2cc(Cl)c(Cl)c(Cl)c2)C(F)(F)F)cc1C(F)(F)F] |

-continued
| No. | Structure |
| --- | --- |
| F160 | 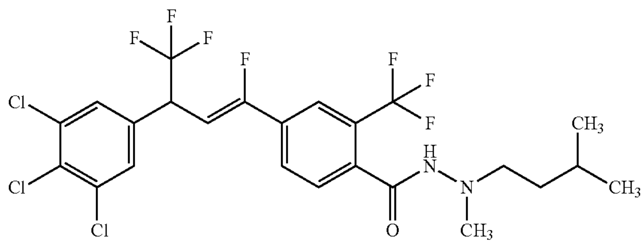 [SMILES: CC(C)CCN(C)NC(=O)c1ccc(/C(F)=C/C(c2cc(Cl)c(Cl)c(Cl)c2)C(F)(F)F)cc1C(F)(F)F] |
| F162 | 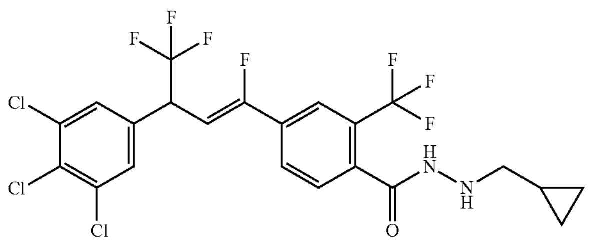 [SMILES: O=C(NNCC1CC1)c1ccc(/C(F)=C/C(c2cc(Cl)c(Cl)c(Cl)c2)C(F)(F)F)cc1C(F)(F)F] |
| F163 | 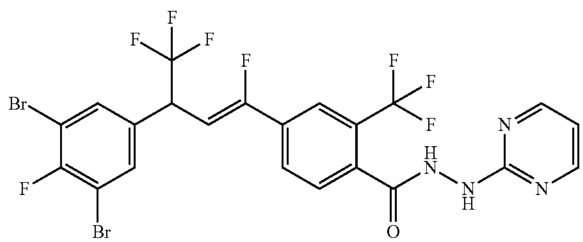 |
| F164 | 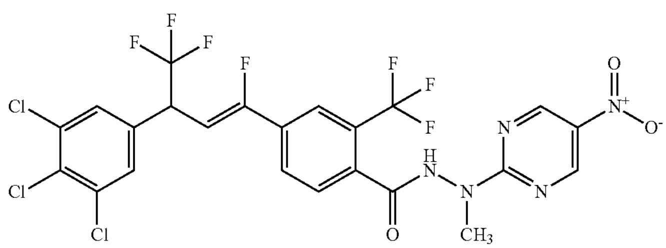 [SMILES: CN(NC(=O)c1ccc(/C(F)=C/C(c2cc(Cl)c(Cl)c(Cl)c2)C(F)(F)F)cc1C(F)(F)F)c1ncc([N+](=O)[O-])cn1] |
| F165 | 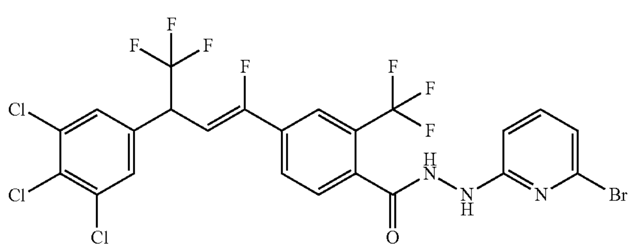 [SMILES: O=C(NNc1cccc(Br)n1)c1ccc(/C(F)=C/C(c2cc(Cl)c(Cl)c(Cl)c2)C(F)(F)F)cc1C(F)(F)F] |
| F166 | 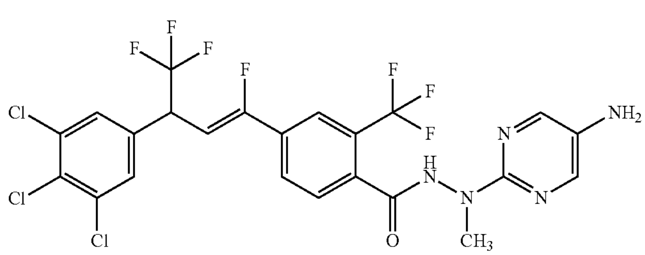 [SMILES: CN(NC(=O)c1ccc(/C(F)=C/C(c2cc(Cl)c(Cl)c(Cl)c2)C(F)(F)F)cc1C(F)(F)F)c1ncc(N)cn1] |

-continued
| No. | Structure |
|---|---|
| F167 | 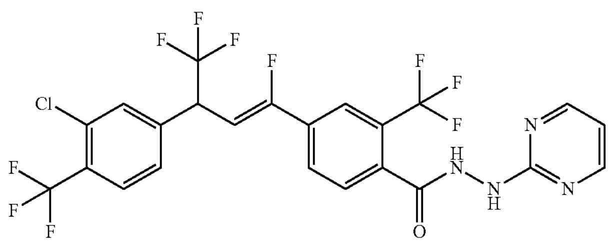 [SMILES: O=C(NNc1ncccn1)c1ccc(/C(F)=C/C(c2ccc(C(F)(F)F)c(Cl)c2)C(F)(F)F)cc1C(F)(F)F] |
| F168 | 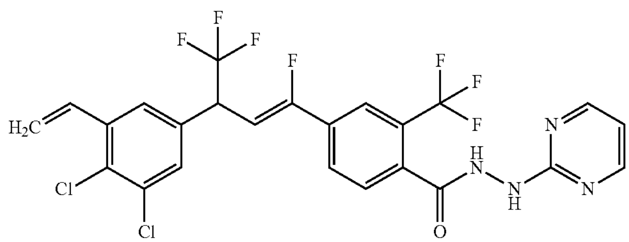 [SMILES: C=Cc1cc(C(/C=C(\F)c2ccc(C(=O)NNc3ncccn3)c(C(F)(F)F)c2)C(F)(F)F)cc(Cl)c1Cl] |
| F169 | 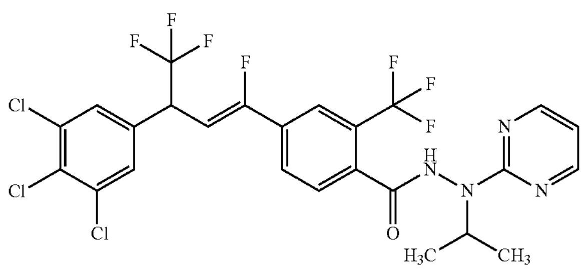 [SMILES: CC(C)N(NC(=O)c1ccc(/C(F)=C/C(c2cc(Cl)c(Cl)c(Cl)c2)C(F)(F)F)cc1C(F)(F)F)c1ncccn1] |
| F170 | 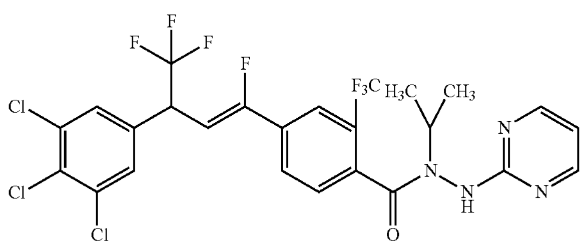 [SMILES: CC(C)N(Nc1ncccn1)C(=O)c1ccc(/C(F)=C/C(c2cc(Cl)c(Cl)c(Cl)c2)C(F)(F)F)cc1C(F)(F)F] |
| F171 | 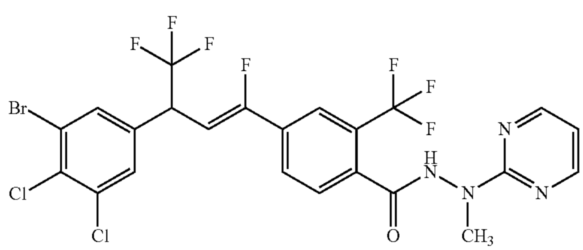 |
| F172 | 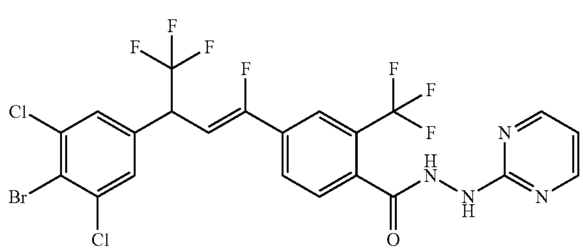 |

-continued
| No. | Structure |
|---|---|
| F173 | 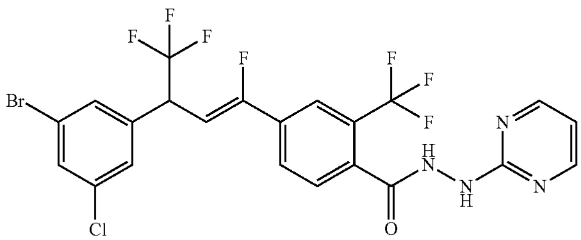 |
| F174 | 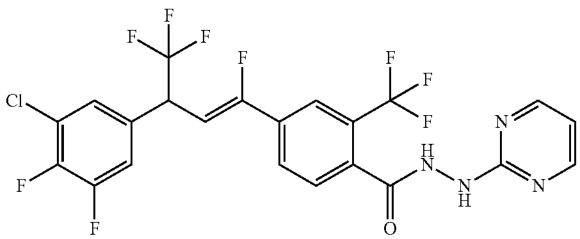 [SMILES: O=C(NNc1ncccn1)c1ccc(/C(F)=C/C(c2cc(F)c(F)c(Cl)c2)C(F)(F)F)cc1C(F)(F)F] |
| F175 | 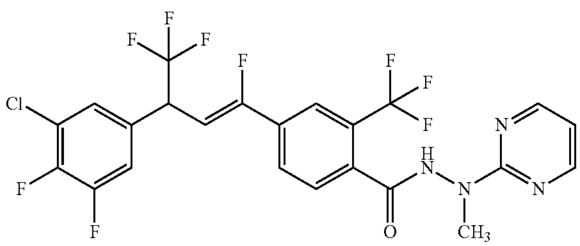 [SMILES: CN(NC(=O)c1ccc(/C(F)=C/C(c2cc(F)c(F)c(Cl)c2)C(F)(F)F)cc1C(F)(F)F)c1ncccn1] |
| F176 | 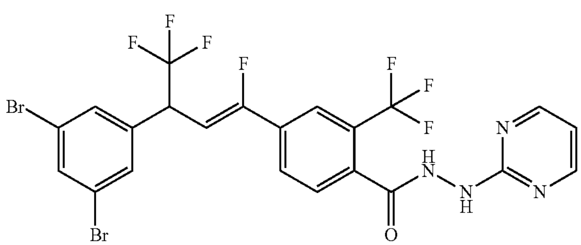 |
| F177 | 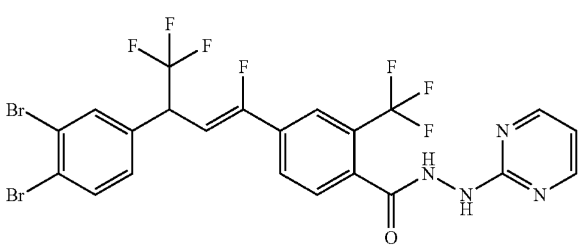 |
| F178 | 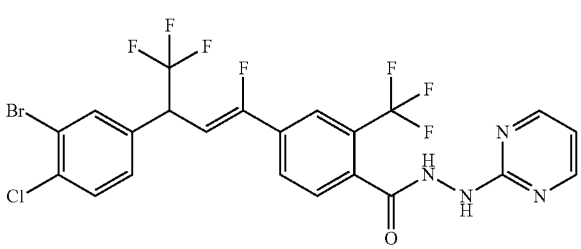 [SMILES: O=C(NNc1ncccn1)c1ccc(/C(F)=C/C(c2ccc(Cl)c(Br)c2)C(F)(F)F)cc1C(F)(F)F] |

-continued
| No. | Structure |
|---|---|
| F179 | 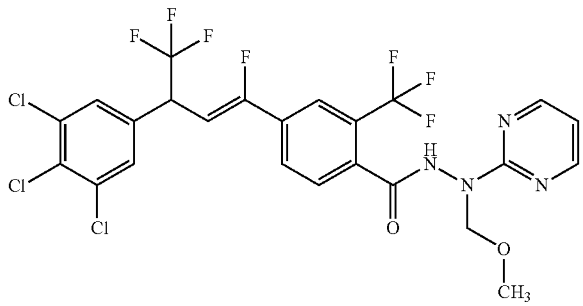 [SMILES: COCN(NC(=O)c1ccc(/C(F)=C/C(c2cc(Cl)c(Cl)c(Cl)c2)C(F)(F)F)cc1C(F)(F)F)c1ncccn1] |
| F180 | 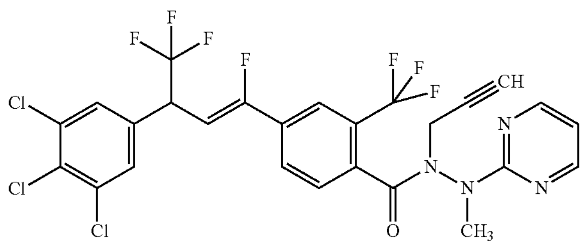 [SMILES: C#CCN(C(=O)c1ccc(/C(F)=C/C(c2cc(Cl)c(Cl)c(Cl)c2)C(F)(F)F)cc1C(F)(F)F)N(C)c1ncccn1] |
| F182 | 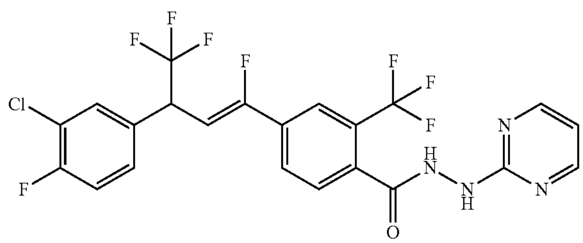 [SMILES: O=C(NNc1ncccn1)c1ccc(/C(F)=C/C(c2ccc(F)c(Cl)c2)C(F)(F)F)cc1C(F)(F)F] |
| F183 | 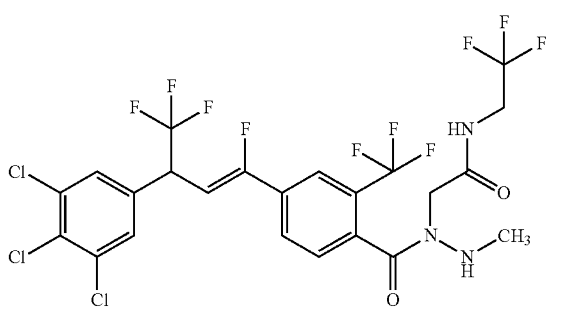 [SMILES: CNN(CC(=O)NCC(F)(F)F)C(=O)c1ccc(/C(F)=C/C(c2cc(Cl)c(Cl)c(Cl)c2)C(F)(F)F)cc1C(F)(F)F] |
| F184 | 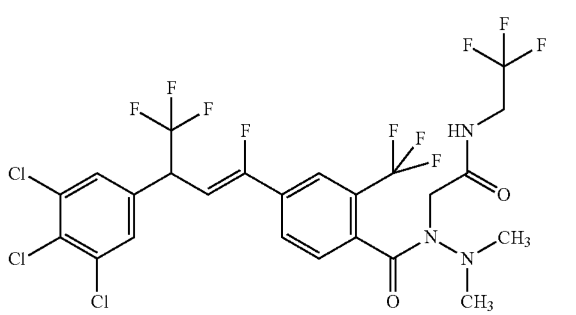 [SMILES: CN(C)N(CC(=O)NCC(F)(F)F)C(=O)c1ccc(/C(F)=C/C(c2cc(Cl)c(Cl)c(Cl)c2)C(F)(F)F)cc1C(F)(F)F] |

-continued
| No. | Structure |
|---|---|
| F185 | 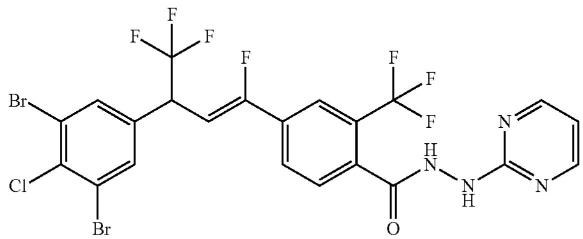 |
| F186 | 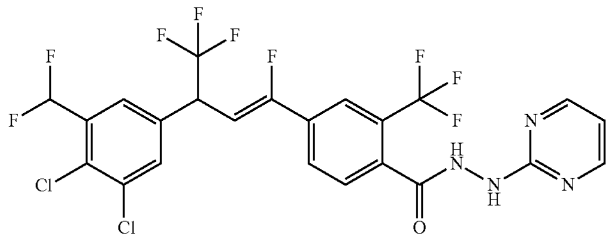 [SMILES: O=C(NNc1ncccn1)c1ccc(/C(F)=C/C(c2cc(Cl)c(Cl)c(C(F)F)c2)C(F)(F)F)cc1C(F)(F)F] |
| F187 | 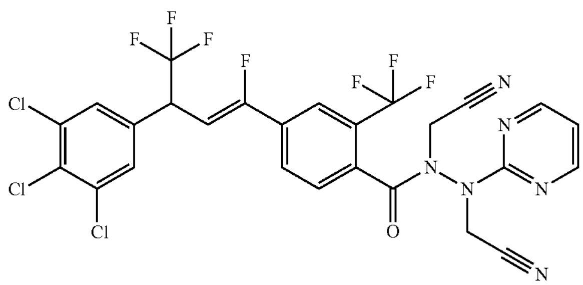 [SMILES: N#CCN(C(=O)c1ccc(/C(F)=C/C(c2cc(Cl)c(Cl)c(Cl)c2)C(F)(F)F)cc1C(F)(F)F)N(CC#N)c1ncccn1] |
| F188 | 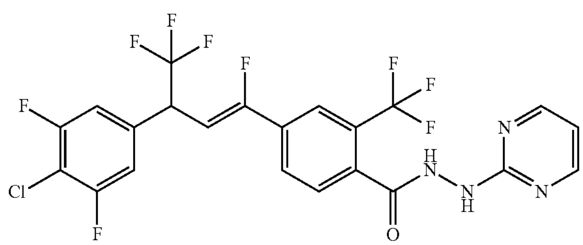 [SMILES: O=C(NNc1ncccn1)c1ccc(/C(F)=C/C(c2cc(F)c(Cl)c(F)c2)C(F)(F)F)cc1C(F)(F)F] |
| F189 | 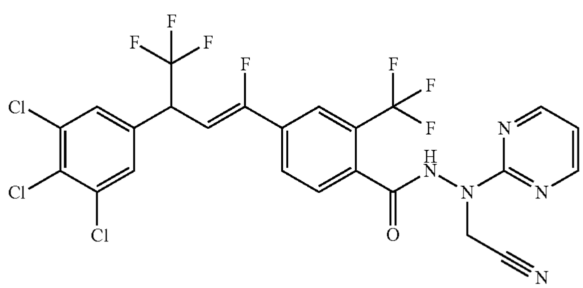 [SMILES: N#CCN(NC(=O)c1ccc(/C(F)=C/C(c2cc(Cl)c(Cl)c(Cl)c2)C(F)(F)F)cc1C(F)(F)F)c1ncccn1] |
| F190 | 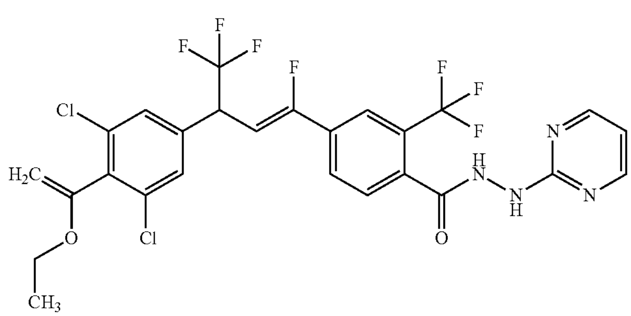 [SMILES: C=C(OCC)c1c(Cl)cc(C(/C=C(\F)c2ccc(C(=O)NNc3ncccn3)c(C(F)(F)F)c2)C(F)(F)F)cc1Cl] |

-continued

| No. | Structure |
| --- | --- |
| F191 | 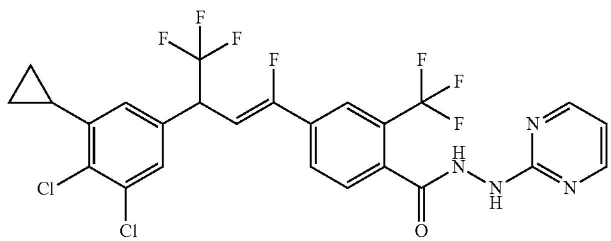 [SMILES: O=C(NNc1ncccn1)c1ccc(/C(F)=C/C(c2cc(Cl)c(Cl)c(C3CC3)c2)C(F)(F)F)cc1C(F)(F)F] |
| F192 | 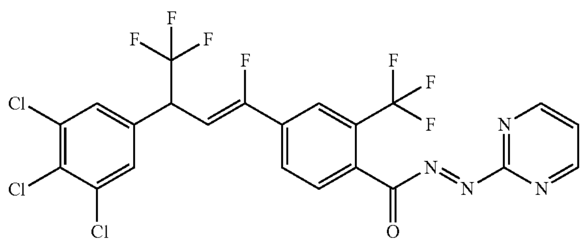 [SMILES: O=C(/N=N/c1ncccn1)c1ccc(/C(F)=C/C(c2cc(Cl)c(Cl)c(Cl)c2)C(F)(F)F)cc1C(F)(F)F] |
| P1 | 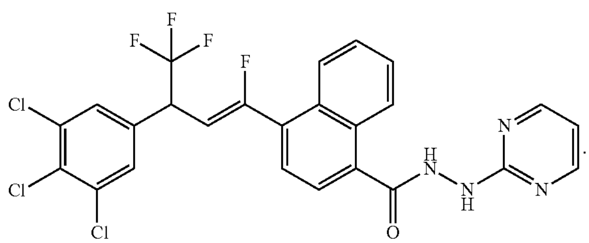 [SMILES: O=C(NNc1ncccn1)c1ccc(/C(F)=C/C(c2cc(Cl)c(Cl)c(Cl)c2)C(F)(F)F)c2ccccc12] |

5. A composition comprising a molecule according to claim 2 and one or more active ingredients.

6. A composition comprising a molecule according to claim 2 and one or more active ingredients wherein at least one active ingredient is selected from AIGA.

7. A composition comprising a molecule according to claim 2 and one or more active ingredients wherein at least one active ingredient is selected from AIGA-2.

8. A composition comprising a molecule according to claim 2 and one or more active ingredients wherein at least one active ingredient is selected from AIGA-3.

9. A composition comprising a molecule according to claim 2 and one or more active ingredients wherein at least one active ingredient is selected from AIGA-4.

10. A composition according to claim 5 wherein the weight ratio of (a) a molecule according to claim 2, to (b) at least one active ingredient, is selected from Table C.

11. A composition according to claim 6 wherein the weight ratio of (a) a molecule according to claim 2, to (b) at least one active ingredient selected from AIGA, is selected from Table C.

12. A composition according to claim 7 wherein the weight ratio of (a) a molecule according to claim 2, to (b) at least one active ingredient selected from AIGA-2, is selected from Table C.

13. A composition according to claim 8 wherein the weight ratio of (a) a molecule according to claim 2, to (b) at least one active ingredient selected from AIGA-3, is selected from Table C.

14. A composition according to claim 9 wherein the weight ratio of (a) a molecule according to claim 2, to (b) at least one active ingredient selected from AIGA-4, is selected from Table C.

* * * * *